United States Patent [19]

Christopher et al.

[11] 4,437,156

[45] Mar. 13, 1984

[54] PROGRAMMABLE CALCULATOR

[75] Inventors: Chris J. Christopher; Fred W. Wenninger; Donald E. Morris; Wayne F. Covington; Jerry B. Folsom; Joseph W. Beyers, all of Loveland; John H. Nairn; Jeffrey C. Osborne, both of Longmont, all of Colo.

[73] Assignee: Hewlett-Packard Company, Palo Alto, Calif.

[21] Appl. No.: 227,019

[22] Filed: Jan. 21, 1981

Related U.S. Application Data

[60] Continuation of Ser. No. 31,341, Apr. 19, 1979, abandoned, which is a continuation of Ser. No. 835,371, Sep. 21, 1977, abandoned, which is a division of Ser. No. 638,381, Dec. 8, 1975, Pat. No. 4,075,679.

[51] Int. Cl.[3] .......................... G06F 9/06; G06F 9/40; G06F 3/023

[52] U.S. Cl. .......................... 364/200

[58] Field of Search .......................... 364/200, 900

[56] References Cited

U.S. PATENT DOCUMENTS

| | | | |
|---|---|---|---|
| 3,839,630 | 10/1974 | Olander et al. | 364/200 X |
| 4,012,725 | 3/1977 | Spangler et al. | 364/200 |
| 4,015,245 | 3/1977 | Mercurio et al. | 364/200 |
| 4,075,679 | 2/1978 | Christopher et al. | 364/900 |

*Primary Examiner*—Harvey E. Springborn
*Attorney, Agent, or Firm*—William E. Hein

[57] ABSTRACT

An adaptable programmable calculator employs modular read-write and read-only memories separately expandable to provide additional program and data storage functions within the calculator oriented toward the environment of the user, and an LSI NMOS central processing unit, which includes the capability of bidirectionally transferring information between itself and various input/output units. The input/output units include a keyboard input unit having a full complement of alphanumeric keys, a magnetic tape cassette reading and recording unit capable of bidirectionally transferring programs and data between the calculator and a magnetic tape, a 32-character solid state output display unit capable of displaying every alphabetic and numeric character. The calculator employs a natural algebraic program language that allows the user to enter lines of one or more alphanumeric algebraic statements into the calculator from the keyboard input unit while visually observing each line as it is entered to check for errors therein. The user may immediately execute each entered line or store that line as part of a program in the read-write memory, may subsequently recall the executed or stored line so that it may be reinspected, and, if necessary, edited and re-executed or re-stored, thereby automatically replacing the previously stored line. The program language of the calculator is contained within a plug-in language read-only memory and may be changed by inserting a different language read-only memory.

4 Claims, 229 Drawing Figures

MAINFRAME LANGUAGE ROM MAP

| MEMORY SIZE | STARTING ADDRESS |
|---|---|
| 4K | 70000 |
| 8K | 60000 |

—— NOTES ——

① OPTION ROM AT 30K TAKES MEMORY FIRST, BINARY PROGRAMS TAKE MEMORY LAST.

② ADVANCED PROGRAMING ROM.

③ STRING VARIABLES ORGANIZATION INFORMATION AND VALUES.

STATEMENT PARAMETER STACK ENTITIES

"WHAT" WORD DESCRIPTION:

| 1 | 2 | 3 | 4 | 5 | X | 6 |
|---|---|---|---|---|---|---|

1. 1=VARIABLE
   0=CONSTANT
2. CLASS
   0
   1 FULL PRECISION NO.
   2
   3
   4
   5
   6 ENTIRE ARRAY
   7 EMPTY
3. COMMA LINK
4. COLON LINK
5. SUB CLASS
6. ADDRESSING MODE
   0 ABSOLUTE
   1 RELATIVE TO "WHAT" WORD
   2 RELATIVE TO END$
   3 RELATIVE TO AP2

NUMERIC CONSTANT

| |
|---|
| WHAT |
| LENGTH=7 |
| WHERE=3 |
| VALUE |

SIMPLE VARIABLE
ARRAY ELEMENT
R=REGISTER

| |
|---|
| WHAT |
| LENGTH=3 |
| WHERE |

EMPTY

| |
|---|
| WHAT |
| LENGTH= 3 |
| WHERE = 0 |

ENTIRE ARRAY

| |
|---|
| WHAT |
| LENGTH=4 |
| WHERE |
| SIZE OF ARRAY |

STRING CONSTANT

| | |
|---|---|
| WHAT | |
| LENGTH | |
| WHERE | |
| NO. OF CHAR. | |
| CH. 1 | CH. 2 |
| | |
| | |
| CH. N-1 | CH. N |

FIG 11

NOTE: THIS STACK IS NULL UNLESS THE ADVANCED PROGRAMMING ROM IS IN USE.

PRESET CIRCUIT

Base Page Description

CURRENT PAGE ABSOLUTE ADDRESSING CORRESPONDENCE
FOR MEMORY REFERENCE INSTRUCTIONS

| LEAST 10 BITS OF ASSEMBLER OUTPUT (octal) | "REAL ADDRESS" | |
|---|---|---|
| | TOP 5 BITS (of P) | LOWER 10 BITS (octal) |
| 1 0 0 0 | X X X X X | 0 0 0 0 START OF PAGE |
| 1 0 0 1 | X X X X X | 0 0 0 1 |
| 1 0 0 2 | X X X X X | 0 0 0 2 |
| . | . | . |
| . | . | . |
| . | . | . |
| . | . | . |
| . | . | . |
| . | . | . |
| 1 7 7 7 | . | 0 7 7 7 |
| 0 0 0 0 | . | 1 0 0 0 |
| 0 0 0 1 | . | 1 0 0 1 |
| 0 0 0 2 | . | 1 0 0 2 |
| . | . | . |
| . | . | . |
| . | . | . |
| . | . | . |
| . | . | . |
| . | . | . |
| 0 7 7 7 | X X X X X | 1 7 7 7 END OF PAGE |

FIG 22

RELATIVE ADDRESSING

BPC INSTRUCTION BIT PATTERNS

GROUP: MEMORY REFERENCE

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| LDA | D/I | 0 | 0 | 0 | 0 | $B/\overline{B}$ | | | | | | | | | | |
| LDB | D/I | 0 | 0 | 0 | 1 | $B/\overline{B}$ | | | | | | | | | | |
| CPA | D/I | 0 | 0 | 1 | 0 | $B/\overline{B}$ | | | | | | | | | | |
| CPB | D/I | 0 | 0 | 1 | 1 | $B/\overline{B}$ | | | | | | | | | | |
| ADA | D/I | 0 | 1 | 0 | 0 | $B/\overline{B}$ | | | | | | | | | | |
| ADB | D/I | 0 | 1 | 0 | 1 | $B/\overline{B}$ | | | | | | | | | | |
| STA | D/I | 0 | 1 | 1 | 0 | $B/\overline{B}$ | | | | | | | | | | |
| STB | D/I | 0 | 1 | 1 | 1 | $B/\overline{B}$ | | | | | | | | | | |
| JSM | D/I | 1 | 0 | 0 | 0 | $B/\overline{B}$ | | | | | | | | | | |
| ISZ | D/I | 1 | 0 | 0 | 1 | $B/\overline{B}$ | | | | | | | | | | |
| AND | D/I | 1 | 0 | 1 | 0 | $B/\overline{B}$ | | | | | | | | | | |
| DSZ | D/I | 1 | 0 | 1 | 1 | $B/\overline{B}$ | | | | | | | | | | |
| IOR | D/I | 1 | 1 | 0 | 0 | $B/\overline{B}$ | | | | | | | | | | |
| JMP | D/I | 1 | 1 | 0 | 1 | $B/\overline{B}$ | | | | | | | | | | |

Bits 9–0:

- * 10 BIT ADDRESS FIELD.
- * ADDRESSES $0\text{-}37_8$ ARE REGISTERS.
- * FOR BIT 9=0, BITS 0-8 = POSITIVE ADDR.
- * FOR BIT 9=1, ADDRESS IS NEGATIVE. IGNORE BIT 9, COMPLIMENT BITS 0-8, THEN ADD ONE.
- * BASE PAGE ADDRESS ENCODING IS ALWAYS WITH RESPECT TO MEMORY LOCATION ZERO.
- * CURRENT PAGE ENCODING:

(ABSOLUTE) RELATIVE TO THE MIDDLE OF THE PAGE (1000B, 3000B, ETC.)

(RELATIVE) RELATIVE TO THE CURRENT VALUE OF P, +511, -512.

D/I (DIRECT/INDIRECT) AND $B/\overline{B}$ (BASE PAGE/ NOT BASE PAGE) ARE CODED AS 0/1.

FIG 24A

BPC INSTRUCTION BIT PATTERNS (CONTINUED)

GROUP: SHIFT-ROTATE

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| AAR | 1 | 1 | 1 | 1 | 0 | 0 | 0 | 1 | 0 | 0 | 0 | 0 | | | | |
| ABR | 1 | 1 | 1 | 1 | 1 | 0 | 0 | 1 | 0 | 0 | 0 | 0 | | | | |
| SAR | 1 | 1 | 1 | 1 | 0 | 0 | 0 | 1 | 0 | 1 | 0 | 0 | | | | |
| SBR | 1 | 1 | 1 | 1 | 1 | 0 | 0 | 1 | 0 | 1 | 0 | 0 | | | | |
| SAL | 1 | 1 | 1 | 1 | 0 | 0 | 0 | 1 | 1 | 0 | 0 | 0 | | | | |
| SBL | 1 | 1 | 1 | 1 | 1 | 0 | 0 | 1 | 1 | 0 | 0 | 0 | | | | |
| RAR | 1 | 1 | 1 | 1 | 0 | 0 | 0 | 1 | 1 | 1 | 0 | 0 | | | | |
| RBR | 1 | 1 | 1 | 1 | 1 | 0 | 0 | 1 | 1 | 1 | 0 | 0 | | | | |

(Bits 3–0:)
* 4 BITS OF SHIFT-ROTATE FIELD.
* IN SOURCE $1 \leq N \leq 16$.
* BINARY IN THIS FIELD IS N-1.

FIG 24B

BPC INSTRUCTION BIT PATTERNS (CONTINUED)

GROUP: ALTER

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| RLA | 0 | 1 | 1 | 1 | 0 | 1 | 1 | 1 | $H/\overline{H}$ | C/S | | | | | | |
| RLB | 0 | 1 | 1 | 1 | 1 | 1 | 1 | 1 | $H/\overline{H}$ | C/S | | | | | | |
| SLA | 0 | 1 | 1 | 1 | 0 | 1 | 1 | 0 | $H/\overline{H}$ | C/S | | | | | | |
| SLB | 0 | 1 | 1 | 1 | 1 | 1 | 1 | 0 | $H/\overline{H}$ | C/S | | | | | | |
| SAP | 1 | 1 | 1 | 1 | 0 | 1 | 0 | 0 | $H/\overline{H}$ | C/S | | | | | | |
| SBP | 1 | 1 | 1 | 1 | 1 | 1 | 0 | 0 | $H/\overline{H}$ | C/S | | | | | | |
| SAM | 1 | 1 | 1 | 1 | 0 | 1 | 0 | 1 | $H/\overline{H}$ | C/S | | | | | | |
| SBM | 1 | 1 | 1 | 1 | 1 | 1 | 0 | 1 | $H/\overline{H}$ | C/S | | | | | | |
| SOC | 1 | 1 | 1 | 1 | 0 | 1 | 1 | 0 | $H/\overline{H}$ | C/S | | | | | | |
| SOS | 1 | 1 | 1 | 1 | 0 | 1 | 1 | 1 | $H/\overline{H}$ | C/S | | | | | | |
| SEC | 1 | 1 | 1 | 1 | 1 | 1 | 1 | 0 | $H/\overline{H}$ | C/S | | | | | | |
| SES | 1 | 1 | 1 | 1 | 1 | 1 | 1 | 1 | $H/\overline{H}$ | C/S | | | | | | |

(Bits 5–0:)

* 6 BIT SKIP FIELD, +31, -32.

* IF BIT 5=0, SKIP TO P+#; #=BITS 0 THRU 4.

* IF BIT 5=1, SKIP TO P-#, #=1+ COMP OF BITS 0-4.

$H/\overline{H}$ (HOLD/DON'T HOLD) AND C/S (CLEAR/SET) ARE CODED AS 0/1.

HOWEVER: $H/\overline{H}$ IS SET BY THE ASSEMBLER ITSELF. IF NEITHER S NOR C IS PRESENT, BOTH $H/\overline{H}$ AND C/S ARE MADE 0'S. THE PRESENCE OF EITHER A C OR AN S PRODUCES H (A 1).

FIG 24C

BPC INSTRUCTION BIT PATTERNS (CONTINUED)

GROUP: SKIP

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| RZA | 0 | 1 | 1 | 1 | 0 | 1 | 0 | 0 | 0 | 0 | | | | | | |
| RZB | 0 | 1 | 1 | 1 | 1 | 1 | 0 | 0 | 0 | 0 | | | | | | |
| SZA | 0 | 1 | 1 | 1 | 0 | 1 | 0 | 1 | 0 | 0 | | | | | | |
| SZB | 0 | 1 | 1 | 1 | 1 | 1 | 0 | 1 | 0 | 0 | | | | | | |
| RIA | 0 | 1 | 1 | 1 | 0 | 1 | 0 | 0 | 0 | 1 | | | | | | |
| RIB | 0 | 1 | 1 | 1 | 1 | 1 | 0 | 0 | 0 | 1 | | | | | | |
| SIA | 0 | 1 | 1 | 1 | 0 | 1 | 0 | 1 | 0 | 1 | | | | | | |
| SIB | 0 | 1 | 1 | 1 | 1 | 1 | 0 | 1 | 0 | 1 | | | | | | |
| SFS | 0 | 1 | 1 | 1 | 0 | 1 | 0 | 0 | 1 | 0 | | | | | | |
| SFC | 0 | 1 | 1 | 1 | 0 | 1 | 0 | 1 | 1 | 0 | | | | | | |
| SSS | 0 | 1 | 1 | 1 | 1 | 1 | 0 | 0 | 1 | 0 | | | | | | |
| SSC | 0 | 1 | 1 | 1 | 1 | 1 | 0 | 1 | 1 | 0 | | | | | | |
| SDS | 0 | 1 | 1 | 1 | 0 | 1 | 0 | 0 | 1 | 1 | | | | | | |
| SDC | 0 | 1 | 1 | 1 | 0 | 1 | 0 | 1 | 1 | 1 | | | | | | |
| SHS | 0 | 1 | 1 | 1 | 1 | 1 | 0 | 0 | 1 | 1 | | | | | | |
| SHC | 0 | 1 | 1 | 1 | 1 | 1 | 0 | 1 | 1 | 1 | | | | | | |

(Bits 5–0:)

* 6 BIT SKIP FIELD, +31, -32.
* IF BIT 5=0, SKIP TO P+#; #=BITS 0 THRU 4.
* IF BIT 5=1, SKIP TO P-#; #=1+ COMP OF BITS 0-4.

FIG 24D

BPC INSTRUCTION BIT PATTERNS (CONT.)

GROUP: RETURN

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| RET | 1 | 1 | 1 | 1 | 0 | 0 | 0 | 0 | 1 | $\overline{P}$/P | 6 BIT, 2'S COMPLIMENT SKIP FIELD (ALLOWS -32 THRU +31). | | | | | |

$\overline{P}$/P (DON'T POP/POP THE IOC) ENCODED AS 0/1.

FIG 24E

GROUP: COMPLIMENT

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| CMA | 1 | 1 | 1 | 1 | 0 | 0 | 0 | 0 | 0 | 1 | 1 | 0 | 0 | 0 | 0 | 0 |
| CMB | 1 | 1 | 1 | 1 | 1 | 0 | 0 | 0 | 0 | 1 | 1 | 0 | 0 | 0 | 0 | 0 |
| TCA | 1 | 1 | 1 | 1 | 0 | 0 | 0 | 0 | 0 | 0 | 1 | 0 | 0 | 0 | 0 | 0 |
| TCB | 1 | 1 | 1 | 1 | 1 | 0 | 0 | 0 | 0 | 0 | 1 | 0 | 0 | 0 | 0 | 0 |

FIG 24F

GROUP: EXECUTE

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| EXE | D/I | 1 | 1 | 1 | 0 | 0 | 0 | 0 | 0 | 0 | 0 | 5 BIT REGISTER ADDRESS $(0-37_8)$. | | | | |

D/I (DIRECT/INDIRECT) ENCODED AS 0/1.

FIG 24G

NOTES:

1.  DENOTES A MICRO-INSTRUCTION DECODED IN THE ROM.

2.  AND 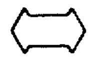 DENOTE ONE- AND TWO-WAY INTERCONNECTIONS TO A BUS; ALWAYS CONTROLLED BY A ROM MICRO-INSTRUCTION.

3. 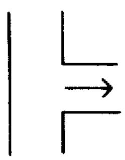 DENOTES A DIRECT CONNECTION BETWEEN TWO ITEMS.

4. 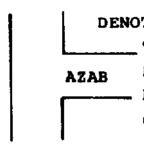

DENOTES A CONNECTION BETWEEN TWO ITEMS THAT IS ACTIVE ONLY WHEN THE STATED SIGNAL IS GIVEN. SUCH SIGNALS ARE NOT ROM DECODED MICRO-INSTRUCTIONS. SOME ARE PRESENT THROUGHOUT AN ENTIRE EXECUTION CYCLE, WHILE OTHERS REFLECT MORE TEMPORARY CONDITIONS.

OR

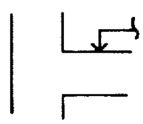

5. 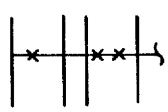 DENOTES THAT THE STATED LINE REPRESENTS A DECODED CONDITION.

6. 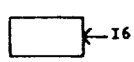

REPRESENTS A NON-MICRO-INSTRUCTION CONTROL LINE OR SOME OTHER SIGNAL.

7. 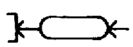 REPRESENTS AN INPUT TERMINAL TO THE BPC

8.  REPRESENTS AN OUTPUT TERMINAL FROM THE BPC

9.  REPRESENTS A TERMINAL THAT IS BOTH AN INPUT AND AN OUTPUT.

10. NUMBERS IN PARENTHESES INDICATE THE NUMBER OF BITS A MECHANISM HANDLES.

11. THE LOGICAL SENSE (XXX VERSUS $\overline{XXX}$) OF THE I/O TERMINALS IS CORRECTLY INDICATED. HOWEVER, THE DRAWING IS NOT A RELIABLE INDICATOR OF THE EXACT SENSE OF THE INTERNAL SIGNALS. TYPICALLY BOTH SENSES EXIST, AND FREQUENTLY THE PHYSICAL PROXIMITY OF SIGNALS TO THEIR DESTINATIONS WAS MORE IMPORTANT IN DECIDING WHICH SENSE TO USE, RATHER THAN AGREEMENT OF LOGICAL SENSE.
BECAUSE STRICT ACCURACY IN REPORTING SIGNAL SENSES ON SUCH A GENERAL LEVEL DRAWING WOULD SHARPLY INCREASE THE NUMBER OF INTERCONNECTIONS, WITH ONLY A SLIGHT INCREASE IN USEFULNESS, WE USUALLY SHOW ONLY THE NAME OF THE SIGNAL.

FIG 25C

NOTES:

1) THIS ACCOMPLISHES THE INVERSION OF INCOMING DATA.
2) REGISTER OUTPUTS ARE NORMALLY TAKEN AT THE OUTPUT OF THE INVERTER DRIVEN BY THE Ø2 TRANSFER GATE. BY TAKING IT HERE, IDB BUS DATA IS REINVERTED BACK TO NORMAL BEFORE GOING ONTO THE IDA BUS.

| SIGNAL NAME | MEANING AND ASSOCIATED ASSEMBLY LANGUAGE INSTRUCTIONS | FORMULA FOR GENERATION |
|---|---|---|
| LD* | INSTRUCTION IS EITHER LDA OR LDB (LOAD A OR LOAD B). $\overline{I11}$ DIFFERENTIATES BETWEEN THE TWO. | $\bar{I}_{14}\cdot\bar{I}_{13}\cdot\bar{I}_{12}$ |
| ST* | INSTRUCTION IS EITHER STA OR STB (STORE A OR STORE B). $\overline{I11}$ DIFFERENTIATES BETWEEN THE TWO. | $\bar{I}_{14}\cdot I_{13}\cdot I_{12}$ |
| AD* | INSTRUCTION IS EITHER ADA OR ADB (ADD TO A OR ADD TO B). $\overline{I11}$ DIFFERENTIATES BETWEEN THE TWO. | $\bar{I}_{14}\cdot I_{13}\cdot\bar{I}_{12}$ |
| CP* | INSTRUCTION IS EITHER CPA OR CPB (COMPARE TO A OR COMPARE TO B). $\overline{I11}$ DIFFERENTIATES BETWEEN THE TWO. | $\bar{I}_{14}\cdot\bar{I}_{13}\cdot I_{12}$ |
| $\overline{I11}$ | DIFFERENTIATES BETWEEN INSTRUCTIONS INVOLVING THE A REGISTER AND THOSE INVOLVING THE B REGISTER. | $\bar{I}_{11}$ |
| JMP | INSTRUCTION IS JMP (JUMP). | $I_{14}\cdot I_{13}\cdot\bar{I}_{12}\cdot I_{11}$ |
| JSM | INSTRUCTION IS JSM (JUMP TO SUBROUTINE). | $I_{14}\cdot\bar{I}_{13}\cdot\bar{I}_{12}\cdot\bar{I}_{11}$ |
| ISZ | INSTRUCTION IS ISZ (INCREMENT AND THEN SKIP IF ZERO). | $I_{14}\cdot\bar{I}_{13}\cdot\bar{I}_{12}\cdot I_{11}$ |
| DSZ | INSTRUCTION IS DSZ (DECREMENT AND THEN SKIP IF ZERO). | $I_{14}\cdot\bar{I}_{13}\cdot I_{12}\cdot I_{11}$ |
| AND | INSTRUCTION IS AND (AND TO A). | $I_{14}\cdot\bar{I}_{13}\cdot I_{12}\cdot\bar{I}_{11}$ |
| IOR | INSTRUCTION IS IOR (INCLUSIVE OR WITH A). | $I_{14}\cdot I_{13}\cdot\bar{I}_{12}\cdot\bar{I}_{11}$ |
| ASG | INSTRUCTION IS AND ALTER-SKIP GROUP INSTRUCTION:<br>RLA SKIP IF $A_0$=1, ALTER $A_0$.<br>RLB SKIP IF $B_0$=1, ALTER $B_0$.<br>SLA SKIP IF $A_0$=0, ALTER $A_0$.<br>SLB SKIP IF $B_0$=0, ALTER $B_0$.<br>SAP SKIP IF $A_{15}$=0, ALTER $A_{15}$.<br>SBP SKIP IF $B_{15}$=0, ALTER $B_{15}$.<br>SAM SKIP IF $A_{15}$=1, ALTER $A_{15}$.<br>SBM SKIP IF $B_{15}$=1, ALTER $B_{15}$. | $I_{14}\cdot I_{13}\cdot I_{12}\cdot I_{10}$ |

FIG 34A

| SIGNAL NAME | MEANING AND ASSOCIATED ASSEMBLY LANGUAGE INSTRUCTIONS | FORMULA FOR GENERATION |
|---|---|---|
| ASG (CONT.) | SOC SKIP IF OVERFLOW=0, ALTER OVERFLOW.<br>SOS SKIP IF OVERFLOW=1, ALTER OVERFLOW.<br>SEC SKIP IF EXTEND=0, ALTER EXTEND.<br>SES SKIP IF EXTEND=1, ALTER EXTEND.<br>RZA SKIP IF A IS NOT ZERO.<br>RZB SKIP IF B IS NOT ZERO.<br>SZA SKIP IF A IS ZERO.<br>SZB SKIP IF B IS ZERO.<br>RIA RZA, THEN INCREMENT A.<br>RIB RZB, THEN INCREMENT B.<br>SIA SZA, THEN INCREMENT A.<br>SIB SZB, THEN INCREMENT B.<br>SFS SKIP IF FLAG SET.<br>SFC SKIP IF FLAG CLEAR.<br>SSS SKIP IF STATUS SET.<br>SSC SKIP IF STATUS CLEAR.<br>SDS SKIP IF DECIMAL CARRY SET.<br>SDC SKIP IF DECIMAL CARRY CLEAR.<br>SHS SKIP IF HALT SET.<br>SHC SKIP IF HALT CLEAR. | |
| I7 | DIFFERNETIATES BETWEEN HOLD, AND ALTER BY SETTING OR CLEARING, THE TESTED BIT IN THE FOLLOWING ALTER INSTRUCTIONS: RLA, RLB, SLA, SLB, SAP, SBP, SAM, SBM, SOC, SOS, SEC, SES. I7=0 IMPLIES HOLD; I7=1 IMPLIES ALTER. | $I_7$ |
| $\overline{I6}$ | IF I7=0, $\overline{I6}$ DIFFERENTIATES BETWEEN CLEARING OR SETTING THE TESTED BIT, WHEN DOING AN ALTER INSTRUCTION. $\overline{I6}$=1 IMPLIES CLEAR; $\overline{I6}$=0 IMPLIES SET. | $\overline{I}_6$ |
| LSC | INSTRUCTION IS AN ALTER INSTRUCTION INVOLVING A LEAST-SIGNIFICANT BIT: RLA, RLB, SLA, SLB. | $\overline{I}_{15} \cdot I_{14} \cdot I_{13} \cdot I_{12} \cdot I_{10} \cdot I_9$ |
| MSC | INSTRUCTION IS AN ALTER INSTRUCTION INVOLVING A MOST-SIGNIFICANT BIT, EXTEND, OR OVERFLOW: SAP, SAM, SBP, SBM, SOC, SOS, SEC, SES. | $I_{15} \cdot I_{14} \cdot I_{13} \cdot I_{12} \cdot I_{10}$ |

FIG 34B

| SIGNAL NAME | MEANING AND ASSOCIATED ASSEMBLY LANGUAGE INSTRUCTIONS | FORMULA FOR GENERATION |
|---|---|---|
| RSS | DIFFERENTIATES BETWEEN THE SKIP AND REVERSE-SKIP SENSES AMONG THE ALTER AND SKIP GROUP INSTRUCTIONS. | $I_{14} \cdot I_{13} \cdot I_{12} \cdot I_{10} \cdot I_8$ |
| EQ | INSTRUCTION IS EITHER SEC OR SES. RSS DIFFERENTIATES BETWEEN THE TWO. | $I_{15} \cdot I_{14} \cdot I_{13} \cdot I_{12} \cdot I_{11} \cdot I_{10} \cdot I_9$ |
| OQ | INSTRUCTION IS EITHER SOC OR SOS. RSS DIFFERENTIATES BETWEEN THE TWO. | $I_{15} \cdot I_{14} \cdot I_{13} \cdot I_{12} \cdot \overline{I}_{11} \cdot I_{10} \cdot I_9$ |
| S/RI | INSTRUCTIONS IS A "SKIP/REVERSE-SKIP, THEN INCREMENT" INSTRUCTION: SIA, RIA, SIB, RIB. | $\overline{I}_{15} \cdot I_{14} \cdot I_{13} \cdot I_{12} \cdot I_{10} \cdot \overline{I}_9 \cdot \overline{I}_7 \cdot I_6$ |
| S/RZ | INSTRUCTION IS A "SKIP/REVERSE-SKIP, WITHOUT INCREMENT" INSTRUCTION: SZA, RZA, SZB, RZB. | $\overline{I}_{15} \cdot I_{14} \cdot I_{13} \cdot I_{12} \cdot I_{10} \cdot \overline{I}_9 \cdot \overline{I}_7 \cdot \overline{I}_6$ |
| FGC | IF ASG IS A 1, AND EACH OF S/RI, S/RZ, MSC AND LSC ARE 0'S, INSTRUCTION IS EITHER SFS OR SFC. RSS DIFFERENTIATES BETWEEN THE TWO. | $\overline{I}_{11} \cdot \overline{I}_6$ |
| STC | IF ASG IS A 1, AND EACH OF S/RI, S/RZ, MSC AND LSC ARE 0'S, INSTRUCTION IS EITHER SSS OR SSC. RSS DIFFERENTIATES BETWEEN THE TWO. | $I_{11} \cdot \overline{I}_6$ |
| HTC | IF ASG IS A 1, AND EACH OF S/RI, S/RZ, MSC AND LSC ARE 0'S, INSTRUCTION IS EITHER SHS OR SHC. RSS DIFFERENTIATES BETWEEN THE TWO. SEE NOTE AT BOTTOM. | $I_{11} \cdot I_6$ |
| RET | INSTRUCTION IS RET (RETURN). [THE $\overline{P}$/P BIT ($I_6$) IS A DON'T CARE BIT FOR THE BINARY PROCESSOR CHIP.] | $I_{15} \cdot I_{14} \cdot I_{13} \cdot I_{12} \cdot \overline{I}_{11} \cdot \overline{I}_{10} \cdot \overline{I}_9 \cdot \overline{I}_8 \cdot I_7$ |
| EXE | INSTRUCTION IS EXE (EXECUTE). | $I_{14} \cdot I_{13} \cdot I_{12} \cdot \overline{I}_{11} \cdot \overline{I}_{10} \cdot \overline{I}_9 \cdot \overline{I}_8 \cdot \overline{I}_7 \cdot \overline{I}_6 \cdot \overline{I}_5$ |

NOTE: THE NOR OF FGC, STC AND HTC, IF TRUE WHILE ASG IS ALSO TRUE, WHILE S/RI, S/RZ, MSC AND LSC ARE FALSE, SPECIFIES EITHER SDS OR SDC. RSS DIFFERENTIATES BETWEEN THE TWO.

FIG 34C

| SIGNAL NAME | MEANING AND ASSOCIATED ASSEMBLY LANGUAGE INSTRUCTIONS | FORMULA FOR GENERATION |
|---|---|---|
| T/CM | INSTRUCTION IS ANY COMPLEMENT INSTRUCTION: CMA, CMB, TCA, TCB (ONE'S COMPLEMENT OF A, ONE'S COMPLEMENT OF B, TWO'S COMPLEMENT OF A, TWO' COMPLEMENT OF B). | $I_{15}\cdot I_{14}\cdot I_{13}\cdot I_{12}\cdot \bar{I}_{10}\cdot \bar{I}_{9}\cdot \bar{I}_{8}\cdot \bar{I}_{7}\cdot I_{5}$ |
| TC* | INSTRUCTION IS EITHER TCA OR TCB (TWO'S COMPLEMENT A OR TWO'S COMPLEMENT B). | $I_{15}\cdot I_{14}\cdot I_{13}\cdot I_{12}\cdot \bar{I}_{10}\cdot \bar{I}_{9}\cdot \bar{I}_{8}\cdot \bar{I}_{7}\cdot \bar{I}_{6}\cdot I_{5}$ |
| SRG | SHIFT-ROTATE GROUP—INSTRUCTION IS ONE OF THE FOLLOWING:<br>AAR ARITHMETIC RIGHT SHIFT OF A.<br>ABR ARITHMETIC RIGHT SHIFT OF B.<br>SAR SHIFT A RIGHT.<br>SBR SHIFT B RIGHT.<br>SAL SHIFT A LEFT.<br>SBL SHIFT B LEFT.<br>RAR ROTATE A RIGHT.<br>RBR ROTATE B RIGHT.<br>$\overline{I6}$, I7 AND $\overline{I11}$ ARE USED TO DISTINGUISH BETWEEN THESE INSTRUCTIONS. | $I_{15}\cdot I_{14}\cdot I_{13}\cdot I_{12}\cdot \bar{I}_{10}\cdot \bar{I}_{9}\cdot I_{8}\cdot \bar{I}_{5}$ |

GROUP: MEMORY REFERENCE $\overline{I11}$ DIFFERENTIATES BETWEEN A&B FOR THESE INSTRUCTIONS

| | INST. NAME | 15 | 14 | 13 | 12 | 11 | 10 | 9 – 0 |
|---|---|---|---|---|---|---|---|---|
| LD* | LDA | D/I | 0 | 0 | 0 | 0 | $B/\overline{B}$ | |
| | LDB | D/I | 0 | 0 | 0 | 1 | $B/\overline{B}$ | |
| CP* | CPA | D/I | 0 | 0 | 1 | 0 | $B/\overline{B}$ | |
| | CPB | D/I | 0 | 0 | 1 | 1 | $B/\overline{B}$ | |
| AD* | ADA | D/I | 0 | 1 | 0 | 0 | $B/\overline{B}$ | |
| | ADB | D/I | 0 | 1 | 0 | 1 | $B/\overline{B}$ | |
| ST* | STA | D/I | 0 | 1 | 1 | 0 | $B/\overline{B}$ | |
| | STB | D/I | 0 | 1 | 1 | 1 | $B/\overline{B}$ | |
| JSM | JSM | D/I | 1 | 0 | 0 | 0 | $B/\overline{B}$ | |
| ISZ | ISZ | D/I | 1 | 0 | 0 | 1 | $B/\overline{B}$ | |
| AND | AND | D/I | 1 | 0 | 1 | 0 | $B/\overline{B}$ | |
| DSZ | DSZ | D/I | 1 | 0 | 1 | 1 | $B/\overline{B}$ | |
| IOR | IOR | D/I | 1 | 1 | 0 | 0 | $B/\overline{B}$ | |
| JMP | JMP | D/I | 1 | 1 | 0 | 1 | $B/\overline{B}$ | |

Bits 9–0:

- * 10 BIT ADDRESS FIELD.
- * ADDRESSES $0\text{-}37_8$ ARE REGISTERS.
- * FOR BIT 9=0, BITS 0-8 = POSITIVE ADDR.
- * FOR BIT 9=1, ADDRESS IS NEGATIVE. IGNORE BIT 9, COMPLEMENT BITS 0-8, THEN ADD ONE.
- * BASE PAGE ADDRESS ENCODING IS ALWAYS WITH RESPECT TO MEMORY LOCATION ZERO.
- * CURRENT PAGE ENCODING:
  - (ABSOLUTE) RELATIVE TO THE MIDDLE OF THE PAGE (1000B, 3000B, ETC.)
  - (RELATIVE) RELATIVE TO THE CURRENT VALUE OF P, +511, -512.

NONE OF THESE INSTRUCTIONS HAVE 111 IN THESE BIT POSITIONS, ALL OTHER INSTRUCTIONS DO.

D/I (DIRECT/INDIRECT) AND $B/\overline{B}$ (BASE PAGE/ NOT BASE PAGE) ARE CODED AS 0/1.

FIG 35D

GROUP: COMPLEMENT (T/CM; TC* = TCA, TCB)

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| CMA | 1 | 1 | 1 | 1 | 0 | 0 | 0 | 0 | 0 | 1 | 1 | 0 | 0 | 0 | 0 | 0 |
| CMB | 1 | 1 | 1 | 1 | 1 | 0 | 0 | 0 | 0 | 1 | 1 | 0 | 0 | 0 | 0 | 0 |
| TCA | 1 | 1 | 1 | 1 | 0 | 0 | 0 | 0 | 0 | 0 | 1 | 0 | 0 | 0 | 0 | 0 |
| TCB | 1 | 1 | 1 | 1 | 1 | 0 | 0 | 0 | 0 | 0 | 1 | 0 | 0 | 0 | 0 | 0 |

GROUP: RETURN

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| RET | 1 | 1 | 1 | 1 | 0 | 0 | 0 | 0 | 1 | $\overline{P}$/P | 6 BIT, 2'S COMPLEMENT SKIP FIELD (ALLOWS -32 THRU +31). | | | | | |

$\overline{P}$/P (DON'T POP/POP THE IOC) ENCODED AS 0/1.

GROUP: EXECUTE

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| EXE | D/I | 1 | 1 | 1 | 0 | 0 | 0 | 0 | 0 | 0 | 0 | 5 BIT REGISTER ADDRESS ($0-37_8$). | | | | |

D/I (DIRECT/INDIRECT) ENCODED AS 0/1.

GROUP: SHIFT-ROTATE $\overline{I11}$ → bit 11; I7 → bit 7; $\overline{I6}$ → bit 6

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| AAR | 1 | 1 | 1 | 1 | 0 | 0 | 0 | 1 | 0 | 0 | 0 | 0 | * 4 BITS OF SHIFT-ROTATE FIELD. | | | |
| ABR | 1 | 1 | 1 | 1 | 1 | 0 | 0 | 1 | 0 | 0 | 0 | 0 | * IN SOURCE 1≤N≤16. | | | |
| SAR | 1 | 1 | 1 | 1 | 0 | 0 | 0 | 1 | 0 | 1 | 0 | 0 | * BINARY IN THIS FIELD IS N-1. | | | |
| SBR | 1 | 1 | 1 | 1 | 1 | 0 | 0 | 1 | 0 | 1 | 0 | 0 | | | | |
| SAL | 1 | 1 | 1 | 1 | 0 | 0 | 0 | 1 | 1 | 0 | 0 | 0 | | | | |
| SBL | 1 | 1 | 1 | 1 | 1 | 0 | 0 | 1 | 1 | 0 | 0 | 0 | | | | |
| RAR | 1 | 1 | 1 | 1 | 0 | 0 | 0 | 1 | 1 | 1 | 0 | 0 | | | | |
| RBR | 1 | 1 | 1 | 1 | 1 | 0 | 0 | 1 | 1 | 1 | 0 | 0 | | | | |

SRG (AAR through RBR)

FIG 35E

TABLE OF GROUP
ENCODING QUALIFIER GENERATION

| INSTRUCTION CATEGORY | GROUP QUALIFIERS GENERATED G3 | G2 | G1 | G0 |
|---|---|---|---|---|
| ST* | 1 | 1 | 1 | 1 |
| AD* | 0 | 1 | 1 | 1 |
| JMP | 1 | 0 | 1 | 0 |
| EXE | 1 | 1 | 1 | 0 |
| ASG | 1 | 1 | 0 | 0 |
| LD* | 0 | 1 | 1 | 1 |
| SRG | 0 | 1 | 0 | 0 |
| ISZ | 0 | 0 | 1 | 0 |
| JSM | 1 | 0 | 1 | 1 |
| DSZ | 0 | 0 | 1 | 0 |
| RET | 1 | 0 | 0 | 0 |
| T/CM | 0 | 1 | 0 | 1 |
| CP* | 0 | 1 | 1 | 0 |
| AND | 0 | 1 | 1 | 1 |
| IOR | 0 | 1 | 1 | 1 |

FIG 36

RULE FOR COMPUTING NTH STATE COUNT FROM N-1TH STATE COUNT:

1. ↘ DENOTES NTH SC(I)= N-1TH SC(I-1)

2. ↘ (with circle) DENOTES NTH SC(I)= N-1TH $\overline{\text{SC(I-1)}}$

ROM STATE-COUNTS

| ASM CHART STATE # | ROM STATE-COUNTER OUTPUTS SC 3 | SC 2 | SC 1 | SC 0 |
|---|---|---|---|---|
| 14 | 0 | 1 | 1 | 1 |
| 0 | 1 | 0 | 1 | 0 |
| 1 | 0 | 1 | 0 | 0 |
| 2 | 1 | 0 | 1 | 1 |
| 3 | 1 | 1 | 0 | 0 |
| 4 | 1 | 1 | 1 | 1 |
| 5 | 1 | 1 | 1 | 0 |
| 6 | 0 | 1 | 1 | 0 |
| 7 | 0 | 0 | 1 | 0 |
| 8 | 0 | 0 | 0 | 0 |
| 9 | 1 | 0 | 0 | 1 |
| 10 | 0 | 1 | 0 | 1 |
| 11 | 0 | 0 | 1 | 1 |
| 12 | 1 | 0 | 0 | 0 |
| 13 | 1 | 1 | 0 | 1 |
| 14 | 0 | 1 | 1 | 1 |

THESE STATES NOT USED (11, 12, 13)

START-UP STATE (CAUSED BY POP) (14)

"FORBIDDEN" STATE (TRANSITIONS TO ITSELF ONLY)

| | | | |
|---|---|---|---|
| 0 | 0 | 0 | 1 |
| 0 | 0 | 0 | 1 |

THE ASM CHART HAS THESE 20 NON-SEQUENTIAL STATE-COUNT TRANSITIONS:

| | | | | |
|---|---|---|---|---|
| 0 TO 0 | 3 TO 2 | 2 TO 4 | 3 TO 7 | 2 TO 10 |
| 5 TO 0 | 4 TO 2 | 4 TO 4 | 5 TO 7 | 6 TO 10 |
| 10 TO 0 | 3 TO 3 | 2 TO 6 | 4 TO 9 | 7 TO 10 |
| 2 TO 2 | 6 TO 3 | 3 TO 6 | 9 TO 9 | 14 TO 10 |

REQUIRING THESE 8 "NEXT-STATE IS..." NON-SEQUENTIAL STATE-COUNT MICRO-INSTRUCTIONS:

| | | | |
|---|---|---|---|
| NS0 | NS3 | NS6 | NS9 |
| NS2 | NS4 | NS7 | NS10 |

DEFINITION OF THE "NEXT-STATE IS..." NON-SEQUENTIAL MICRO-INSTRUCTIONS:

| NON-SEQUENTIAL STATE-COUNT MICRO-INSTRUCTION | STATE-COUNTER CONTROL LINES | | | | |
|---|---|---|---|---|---|
| | INCI | NSC3 | $\overline{NSC2}$ | $\overline{NSC1}$ | $\overline{NSC0}$ |
| NS0 | 0 | 1 | 1 | 0 | 1 |
| NS2 | 0 | 1 | 1 | 0 | 0 |
| NS3 | 0 | 1 | 0 | 1 | 1 |
| NS4 | 0 | 1 | 0 | 0 | 0 |
| NS6 | 0 | 0 | 0 | 0 | 1 |
| NS7 | 0 | 0 | 1 | 0 | 1 |
| NS9 | 0 | 1 | 1 | 1 | 0 |
| NS10 | 0 | 0 | 0 | 1 | 0 |
| NONE OF THE ABOVE | 1 | - | - | - | - |

← THESE PATTERNS, WHEN PUT THROUGH THE STATE-COUNTER'S RULE FOR STATE-TO-STATE TRANSITIONS, RESULT IN THE DESIRED STATE-COUNTS.

FIG 43

S REGISTER OPERATIONS:
SET S ($\overline{IDB}$ BUS TO S)
RIGHT SHIFT WITH $0 \rightarrow S_{15}$
ARITHMETIC RIGHT SHIFT ($S_{15}$ UNALTERED)
ROTATE S RIGHT ($S_0 \rightarrow S_{15}$)
SHIFT S LEFT WITH $0 \rightarrow S_0$

| INSTRUCTION | ACTION | $I_7$ | $I_6$ | CONTROL SIGNALS |
|---|---|---|---|---|
| AAR, ABR | SHIFT RIGHT/KEEP BIT 15 | 0 | 0 | SSE, SR, AMS |
| SAR, SBR | SHIFT RIGHT/0→BIT 15 | 0 | 1 | SSE, SR, SRM |
| SAL, SBL | SHIFT LEFT/0→BIT 15 | 1 | 0 | SSE, SL |
| RAR, RBR | ROTATE RIGHT/BIT 0→BIT 15 | 1 | 1 | SSE, SR, RSM |

RULES FOR GENERATING SUM AND CARRY BITS

| SERVICE LOGIC SIGNALS | INPUTS | | | OUTPUTS | |
|---|---|---|---|---|---|
| | $CIN_i$ | $ZAB_i$ | $S_i$ | $COUT_i$ | $SUM_i$ |
| NOR | 0 | 0 | 0 | 0 | 0 |
| XOR | 0 | 0 | 1 | 0 | 1 |
| XOR | 0 | 1 | 0 | 0 | 1 |
| AND | 0 | 1 | 1 | 1 | 0 |
| CIN•NOR | 1 | 0 | 0 | 0 | 1 |
| CIN•XOR | 1 | 0 | 1 | 1 | 0 |
| CIN•XOR | 1 | 1 | 0 | 1 | 0 |
| CIN•AND | 1 | 1 | 1 | 1 | 1 |

"AND","NOR" AND "XOR" ARE MUTUALLY EXCLUSIVE CONDITIONS, AMONG WHICH EXACTLY ONE MUST ALWAYS BE TRUE. NOW:

A. $SUM_i=1$ IF EXACTLY ONE OR THREE INPUTS (AMONG $S_i$, $ZAB_i$ AND $CIN_i$)=1.

B. $COUT_i=1$ IF $AND_i+(XOR_i \cdot CIN_i)=1$.

A AND B CAN BE IMPLEMENTED BY CIRCUITRY THAT PERFORMS THE FOLLOWING OPERATIONS:

1. IF $NOR_i=1$, THEN $SUM_i=CIN_i$; $COUT_i=0$ (FOR ODD BITS), $\overline{COUT_i}=1$ (FOR EVEN BITS)
2. IF $XOR_i=1$, THEN $SUM_i=\overline{CIN_i}$; $COUT_i=CIN_i$
3. IF $AND_i=1$, THEN $SUM_i=CIN_i$; $COUT_i=1$

FIG 55

D/I (DIRECT/INDIRECT) AND B/B̄ (BASE PAGE/NOT BASE PAGE) CODED AS 0/1

*ACTIVE PULL-UP DURING MECD
**ACTIVE PULL-UP DURING MECR

HOW TO INTERPRET THE BPC ASM CHART

1. What we usually refer to simply as a state ("state 4 for LOAD A") is generally a coincidence of that particular state-count and some group encoding qualifier pattern (representing a particular group). The most precise way to refer to a location on the ASM chart is indicate both the group and state-counts, (say, B4). Some states (0,1,and 14) are completely group independent. States are indicated by circles with numbers in them: (4). Group information is prominently displayed next to sections to which it pertains.

2. Each state represents a Ø2 pre-charge and Ø1 decode in the ROM. The ASM chart represents what is decoded from the ROM in the various states; it does not necessarily represent end-results that occur simultaneously. If, for instance, two instructions decoded in the same state have different delays coming from the ROM, then they do not result in simultaneous activity, even though they are drawn as being in the same state.

3. Rectangular boxes ([SET A]) denote micro-instructions. Diamonds (<MEC=1?>) denote qualifiers affecting the decoding of micro-instructions. Ovals ((STM)) denote micro-instructions that are actually decoded and given, but that are "don't-cares". That is, they are present but do not affect the algorithmic process. Sometimes these don't-cares are the result of minimization, and sometimes they are a result of the way the flow charts have been drawn (in an attempt to make them more easily understood).

4. All activity within a state is decoded and initiated (its delay is begun) at the same time. The fact that a state is shown as a sequential arrangement of boxes and diamonds does not imply sequential activity; the entire state is decoded simultaneously. For example, state 0 is represented below:

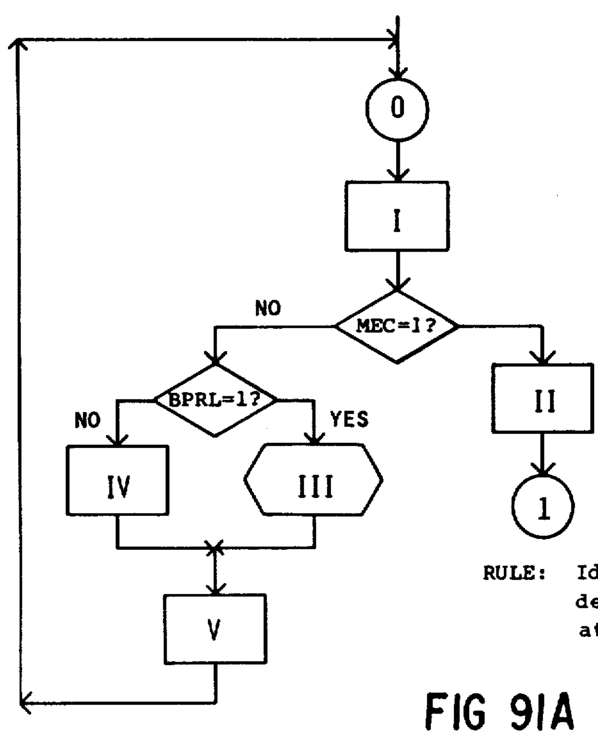

RULE: Identify the path, then decode all instructions at once.

FIG 91A

HOW TO INTERPRET THE BPC ASM CHART, CONT.

Another way to represent the same activity is illustrated below. We don't draw the ASM chart that way because of the increased size and because of problems in achieving connectedness. Also, overall algorithmic process would be hard to see; the more compact notation results in a more effective visual outline. Within a state however, the expanded notation is often less confusing as it more closely represents the actual way things are done.

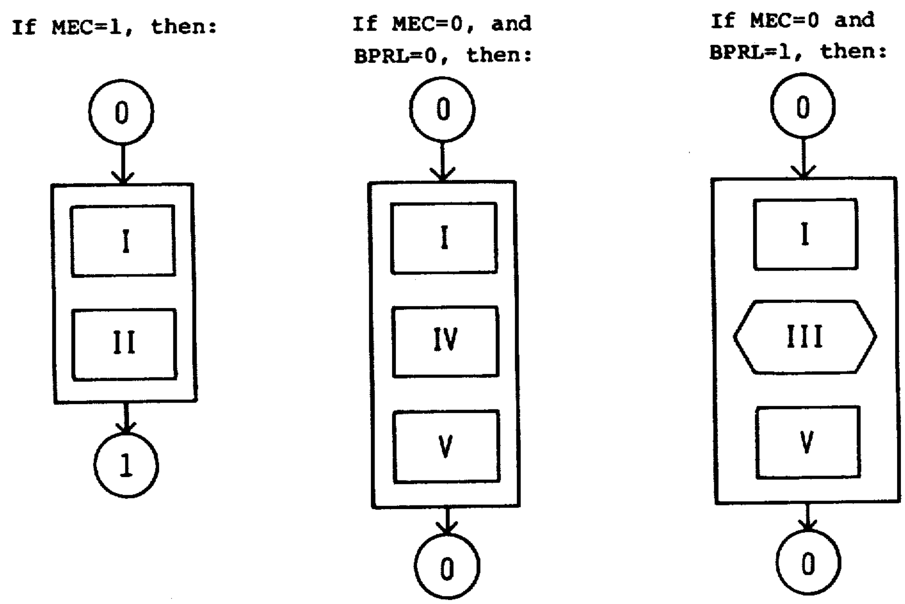

5. Within a state, related instructions are grouped together in the same box solely for the sake of algorithmic clarity.

6. Because of limitations on transistor device size, and the large capacitances of the IDA lines, two consecutive SET IDA's are required to ensure that IDA lines assume their proper final values. If what is being transmitted with the SET IDA is an address for Memory, the STM will accompany the second SET IDA. If data is being written to Memory, DVAL will accompany the second and all subsequent SET IDA's until Memory Complete is received. In either case, the IDA lines will be stable before the start of the second SET IDA.

7. The symbol 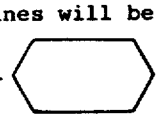 represents activity controlled by the M-Section. The micro-instructions shown inside are encoded in the ROM, just as are any other micro-instructions. However, these particular instances of decoding those micro-instructions are independent of all group and state-count qualifier lines in the ROM. They are decoded against qualifiers generated by the M-Section and Address Decode. ($\overline{RDR}$, $\overline{WTR}$, $\overline{DRQ}$, M00-M03).

8. The qualifiers that enable such M-Section activity are generated when STM occurs in conjuction with an address on the IDA lines that specifies a register within the BPC. These qualifiers are not always generated immediately, nor are they necessarily co-incident with one another.

FIG 91B

HOW TO INTERPRET THE BPC ASM CHART, CONT.

9. Consider the following typical situation:

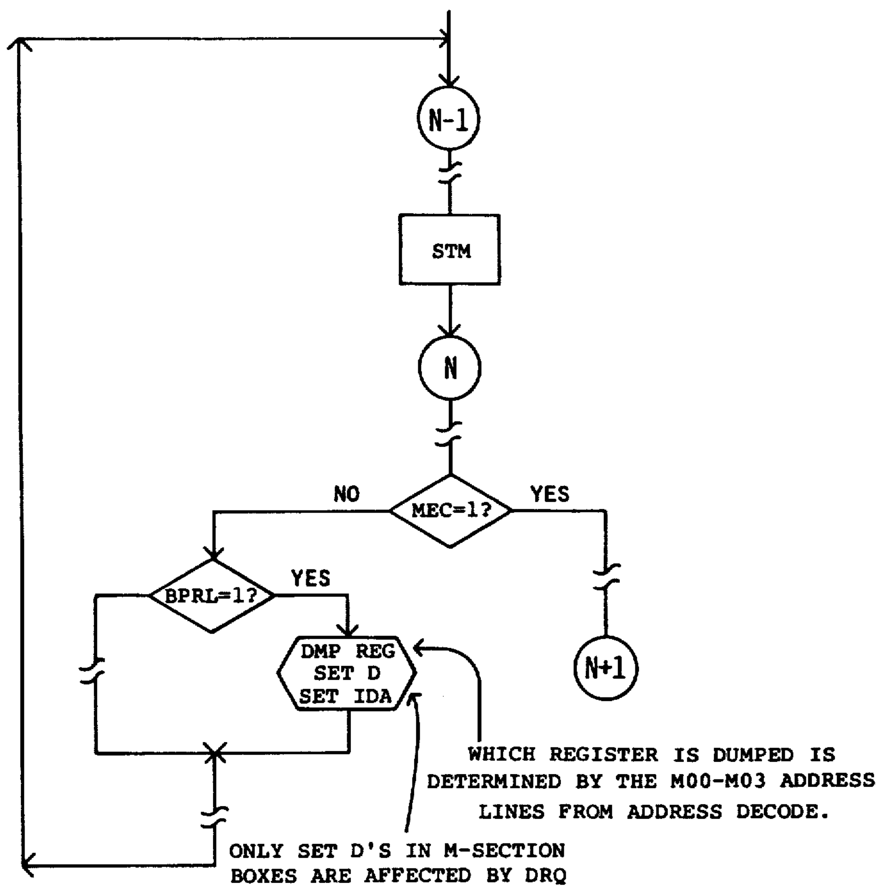

In this example the STM occurs in the state prior to the one with the M-Section activity. The machine will stay in state N for 4 consecutive state-times: 3 "no's" and a "yes" for the MEC qualifier. The BPRL qualifier (from Address Decode) will be met each time, but due to delays in the M-Section the first pass through state N generates none of the M-Section activity. The second and third passes do perform the indicated activity, except for the SET D. It is done during the second pass, but not during the third. This is a result of $\overline{DRQ}$, and prevents D from tracking the pre-charge of the $\overline{IDB}$ Bus which follows the execution of the SET D. This prevents the second SET IDA from producing a glitch on the IDA lines.

Sometimes the STM is given in state N-2. In such a case the one state of M-Section delay is spent while in state N-1, and only three state-times are spent in state N. When this happens the M-Section activity occurs immediately on the first and second of these; the third meets the MEC qualifier. As before, the SET D is done only once.

Such an instance occurs between states C2 and C9. There are several others.

FIG 9IC

HOW TO INTERPRET THE BPC ASM CHART, CONT.

10. Sometimes, as in state C9, the BPRL qualifier is shown by a dotted line: BPRL=1? This occurs only when the machine represented by the ASM chart has no activity in that state that is conditional upon BPRL. Therefore, BPRL is a don't-care for the ASM chart at that state, and indeed is not used in the ROM there. However, it still initiates M-Section activity when met. And when it is met no externally caused MEC will be forthcoming, since no memory external to the BPC is involved. The MEC will be supplied by the M-Section itself, as soon as its activity is finished. In these cases the timing is as outlined in 9 above, and we show a BPRL qualifier that affects the M-Section, but not that point in the ROM, to remind the reader of what's happening.

11. Finally, a word about the correspondence between what's in the ROM and how the flow charts are drawn. The flow charts have been "de-minimized" to promote their ease of understanding. For instance, state A5 is shown as:

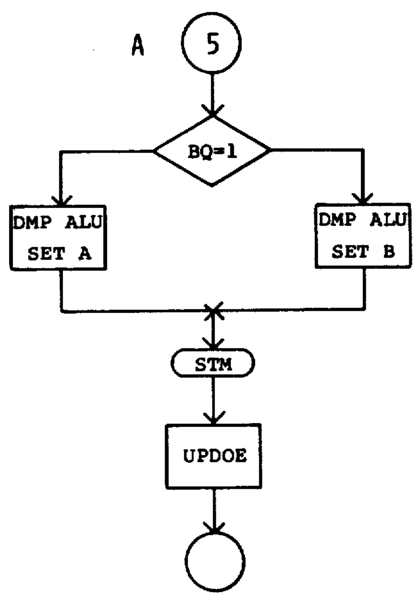

There are not two instances of decoding DMP ALU for state A5. The decoding of DMP ALU in that state is independent of the BQ qualifier, as it is done regardless of that qualifiers outcome.

State A5 could just as easily be drawn with a single DMP ALU in the same box as the UPDOE, or in a separate box of its own, ahead of the BQ qualifier.

Such redrawing often adds a welcome measure of clarity in loops involving repeated SET IDA's and multiple qualifiers. It lets us indicate what's in D at the time a SET IDA is given after certain qualifiers have been met or failed.

FIG 91D

HOW TO INTERPRET THE BPC ASM CHART, CONT.

Not all instances of the same instruction appearing twice in the same state are the result of de-minimization, however. The two SET D's in state A/B3 represent separate instances of decoding that instruction. The partial structure of the state is shown below:

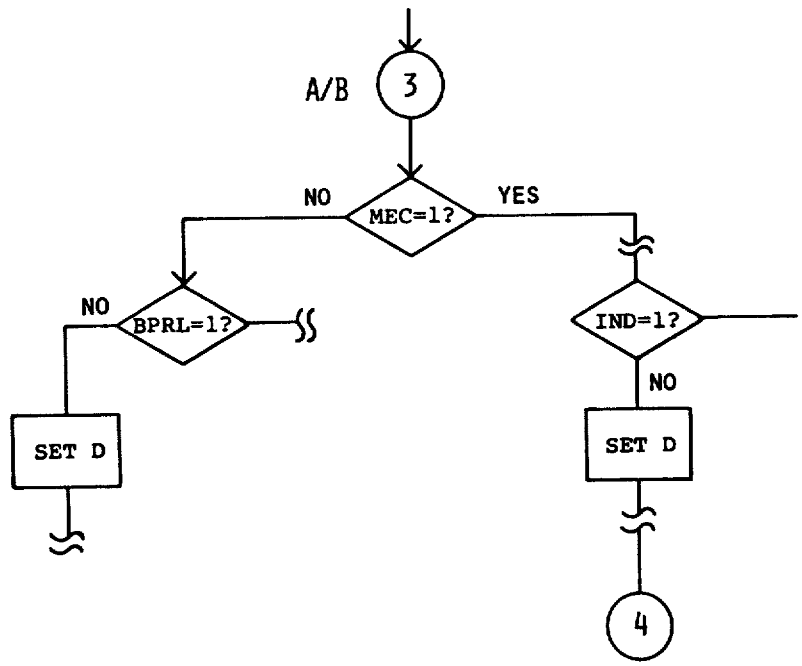

Here each SET D is conditional upon a different qualifier. Because of the way the ROM is organized, an instance of an instruction being decoded represents the "AND" of selected conditions:

IF STATE 3 AND GROUP A/B AND NOT BPRL, THEN SET D

GP1• GP2• $\overline{GP3}$ ⟵ (GP0=1 for A, 0 for B)

The other instance of decoding SET D in that state is:

IF STATE 3 AND GROUP A/B AND NOT IND, THEN SET D

The combination:

THE CONDITION OR CONDITION, THEN SET D does not exist as a single encoding. It is simply the "OR" (during fan-in) of the two separate "AND's" as shown above.

FIG 91E

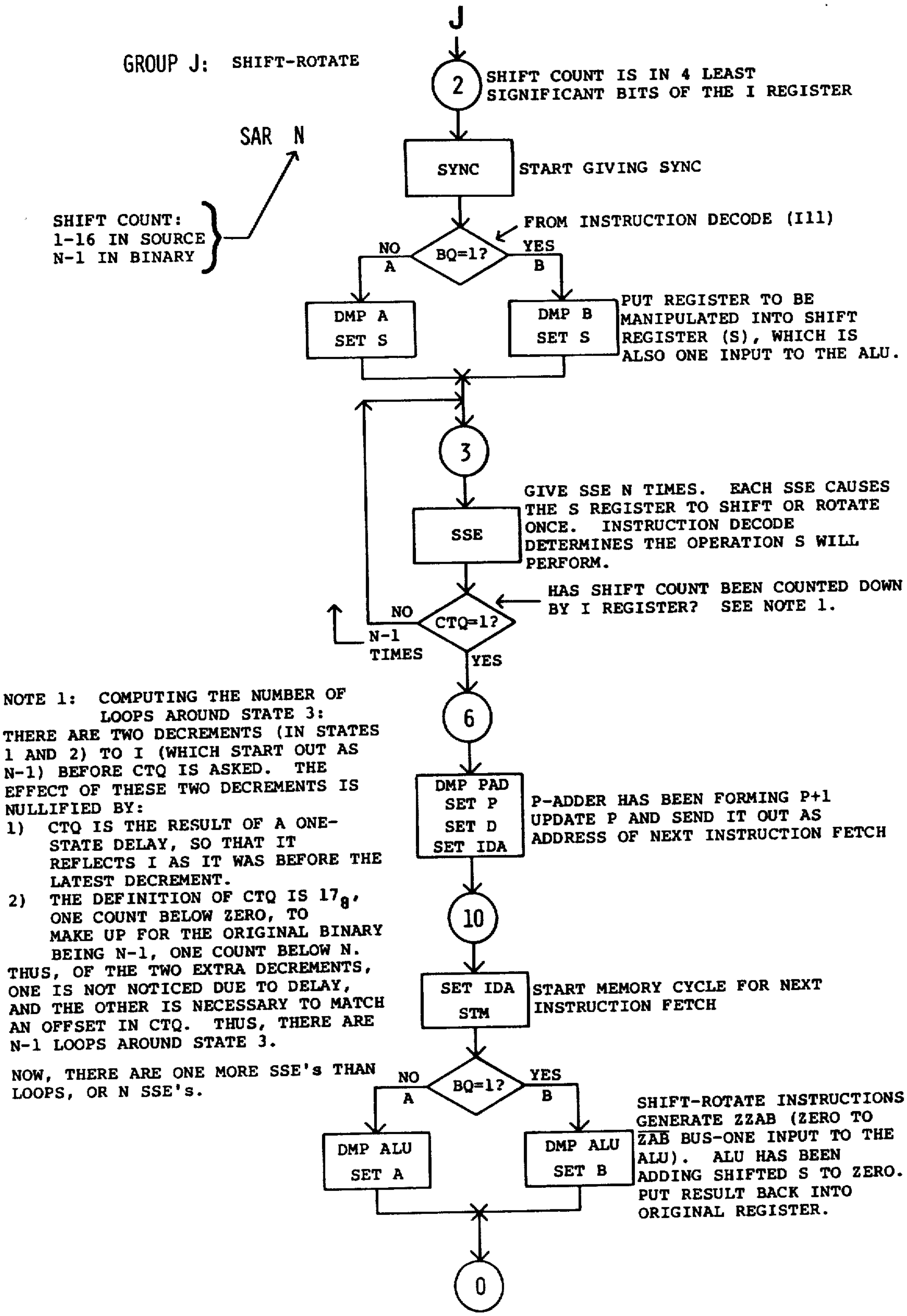

NOTE 1: COMPUTING THE NUMBER OF LOOPS AROUND STATE 3:
THERE ARE TWO DECREMENTS (IN STATES 1 AND 2) TO I (WHICH START OUT AS N-1) BEFORE CTQ IS ASKED. THE EFFECT OF THESE TWO DECREMENTS IS NULLIFIED BY:

1) CTQ IS THE RESULT OF A ONE-STATE DELAY, SO THAT IT REFLECTS I AS IT WAS BEFORE THE LATEST DECREMENT.
2) THE DEFINITION OF CTQ IS $17_8$, ONE COUNT BELOW ZERO, TO MAKE UP FOR THE ORIGINAL BINARY BEING N-1, ONE COUNT BELOW N.

THUS, OF THE TWO EXTRA DECREMENTS, ONE IS NOT NOTICED DUE TO DELAY, AND THE OTHER IS NECESSARY TO MATCH AN OFFSET IN CTQ. THUS, THERE ARE N-1 LOOPS AROUND STATE 3.

NOW, THERE ARE ONE MORE SSE's THAN LOOPS, OR N SSE's.

FIG 101

BPC ERA ADDRESSING

| IDA ADDRESS (OCTAL) | READ/WRITE | RESULTING u-INSTRUCTION (S) |
|---|---|---|
| (NOTE 1) | | |
| 40 | R | DMP PAD (,INC P) (NOTE 2) |
| 41 | R | DMP PAD, ADS (NOTE 2) |
| 42 | R | DMP PAD, ADM (NOTE 2) |
| 42 | R | DMP PAD (,INC P) (NOTE 2) |
| 44 | R | DMP EX |
| 44 | W | SET EX |
| 45 | R | DMP OV |
| 45 | W | SET OV |
| 46 | R | DMP T |
| 46 | W | SET T |
| 47 | W | SET D |
| 51 | R | DMP ALU (NOTE 3) |
| 52 | W | SET S |
| 53 | R | DMP ST |
| 53 | W | SET I |
| 54 | R | DMP A |
| 54 | W | SET A |
| 55 | R | DMP B |
| 55 | W | SET B |
| 56 | R | DMP P |
| 56 | W | SET P |
| 57 | R | DMP R |
| 57 | W | SET R |

NOTES

1. IN THE ERA MODE, THE BPC REGISTER ADDRESS DETECTOR RESPONDS TO IDA BUS ADDRESSES, AS SHOWN. HOWEVER, ONLY THE FOUR LEAST SIGNIFICANT BITS OF THAT ADDRESS ARE USED AS QUALIFIERS IN THE ROM. HENCE, WHILE $57_8$ IS DECODED (FOR R), THE SET R AND DMP R IN THE ROM RESPOND TO $17_8$ ON THE M-ADDRESS LINES.
2. INC P (P-ADDER OUTPUT = P+1) IS THE NOR OF ADM AND ADS. IN GENERAL, THE RESULT OF A DUM PAD IS DIFFICULT TO PREDICT, AS IT DEPENDS UPON WHERE IN ITS FLOW CHART THE BPC IS STOPPED.
3. IN GENERAL, THE RESULT OF A DMP ALU IS DIFFICULT TO PREDICT. IT DEPENDS UPON WHAT IS IN THE I, A, AND B REGISTERS.

FIG 105

1. 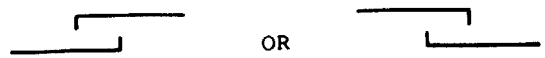

TRANSITION UP OR TRANSITION DOWN CAN OCCUR ANYTIME WITHIN THE INDICATED INTERVAL. USED TO INDICATE TIME-WINDOWS WITHIN WHICH EXTERNALLY ORIGINATED EVENTS CAN HAPPEN. REPRESENTS IDEALIZED LOGICAL ACTIVITY; RISE TIMES AND DELAYS ARE NOT TAKEN INTO CONSIDERATION.

2. 

REPRESENTS THE SET-UP TIME OF A SIGNAL BEING DRIVEN.

3. 

REPRESENTS A LINE THAT IS EITHER UNDEFINED OR A DON'T CARE.

4. 

REPRESENTS A LINE THAT IS ACTIVELY PULLED-UP.

5. CAPITAL LETTERS FROM THE START OF THE ALPHABET REPRESENT EXPLANATORY NOTES. LETTERS FROM THE END OF ALPHABET ARE SOMETIMES USED TO DENOTE DIFFERENT STATES (IN THE ROM).

6. NUMERALS IN THE $\phi 2$-$\phi 1$ WAVEFORMS ARE STRICTLY FOR REFERENCE WITHIN ANY PARTICULAR SET OF WAVEFORMS, AND HAVE NO SIGNIFICANCE OUTSIDE THAT SET.

7. IN GENERAL, THE WAVEFORMS ARE QUITE IDEALIZED. THEY EXPLAIN THE LOGICAL RELATIONSHIPS BETWEEN SIGNALS, BUT ACTUAL DELAYS, RISE TIMES, SIGNAL LEVELS AND THRESHOLDS ARE NOT INDICATED.

CONVENTIONS USED IN THE WAVEFORMS

FIG 106

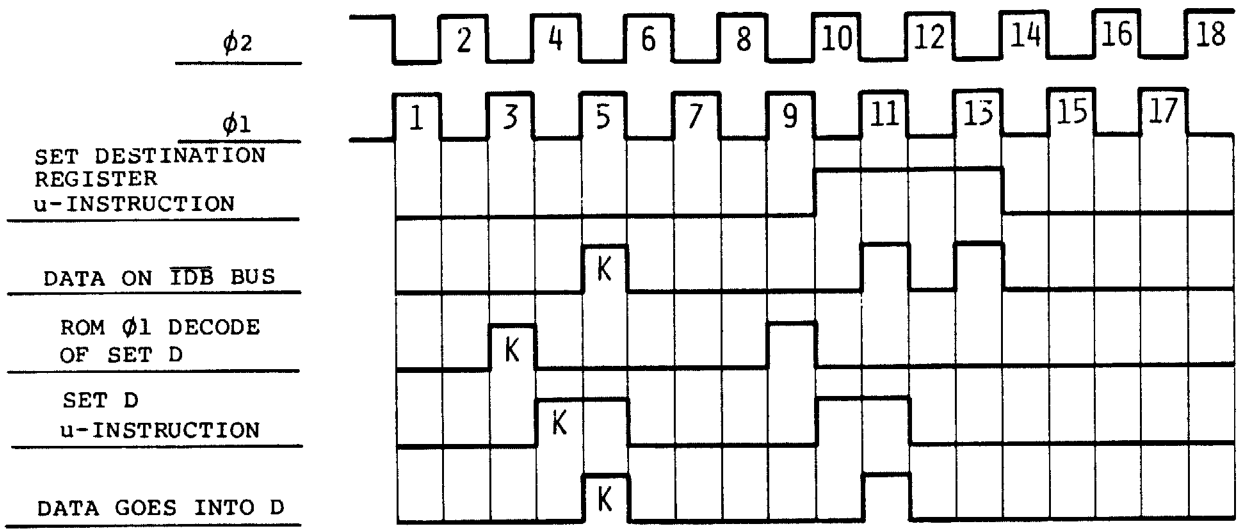

NOTES

A. PRESENT ONLY IF THE BPC IS THE ORIGINATOR OF THE MEMORY CYCLE.

B. DEPENDS UPON WHEN THE ADDRESS ON THE IDA BUS STABILIZES.

C. LATCHED WHEN STMA IS TRUE.

D. IF THIS READ MEMORY CYCLE IMMEDIATELY FOLLOWS A PREVIOUS WRITE CYCLE, THE START OF THIS φ2 IS WHEN RDW WILL GO HIGH.

E. ACTIVE PULL-UP OF RDW AND $\overline{\text{STM}}$ DURING MECD.

F. THIS NOTE HAS BEEN DELETED.

G. LATCHED WHEN STMP IS FALSE.

H. TRANSITIONS AT THE START OF φ1 IF THE BPC IS THE ORIGINATOR. AN EXTERNAL AGENCY HAS UNTIL PRIOR TO φ2.

I. EARLIEST NEXT STM.

J. FOLLOWS STM.

K. PRESENT ONLY IF THE BPC IS THE ORIGINATOR OF THE MEMORY CYCLE. PART OF SENDING OUT THE ADDRESS AND THE DATA ON THE IDA BUS TO PRESERVE THE BUS CONVENTIONS.

FIG 107C

BPC READS MEMORY (TWO CONSECUTIVE FASTEST CYCLES SHOWN)

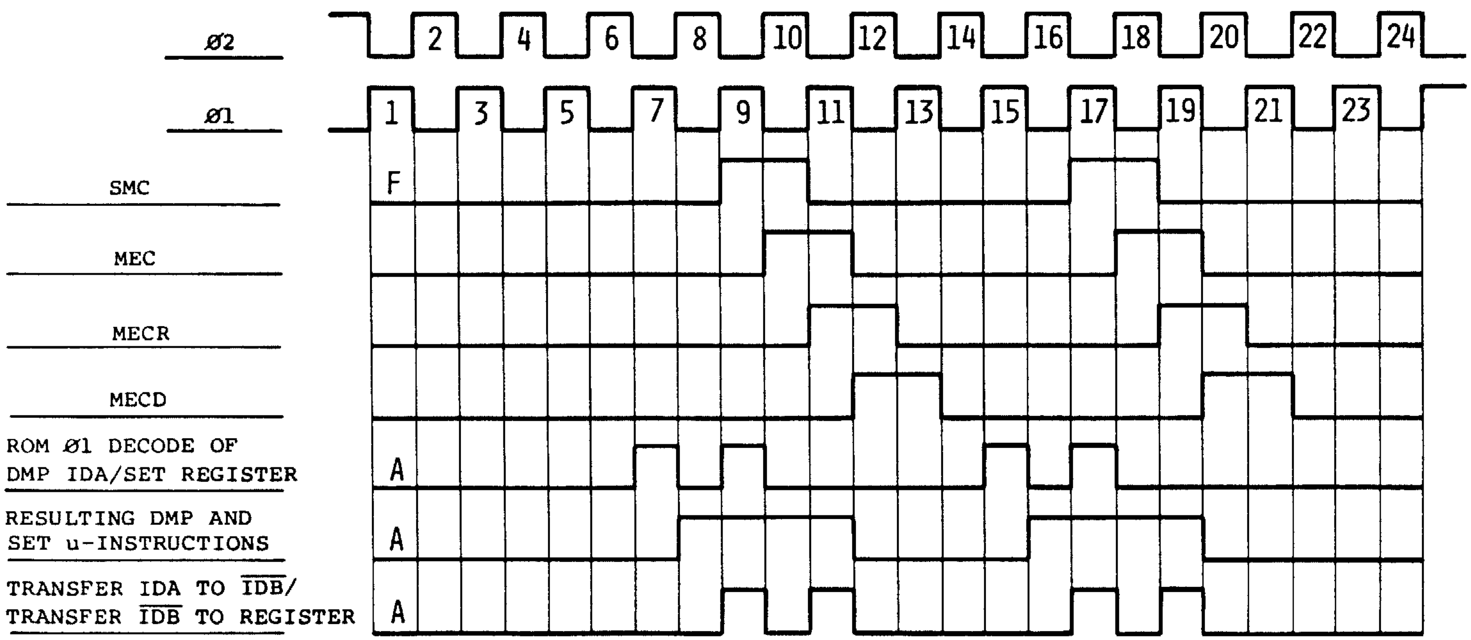

NOTES

A. PRESENT ONLY IF THE BPC IS THE ORIGINATOR OF THE MEMORY CYCLE. (SOME OTHER ENTITY ON THE BUS COULD BE READING MEMORY)

B. MEANINGFUL DURING THIS TIME, BUT LATCHED DURING STMA ONLY. SHOULD BE LOOKED AT DURING STM ONLY.

C. SOONEST POSSIBLE TRANSITION TO WRITE IF NEXT MEMORY CYCLE WERE A WRITE INSTEAD OF A READ.

D. TRANSITIONS IMMEDIATELY AT THE START OF Ø1 IF THE BPC IS THE ORIGINATOR OF THE MEMORY CYCLE.

E. ACTIVE PULL-UP ON $\overline{\text{STM}}$.

F. FOLLOWS STM.

G. UMC NEED NOT BE USED IF SMC IS GIVEN BY THE ORIGINATOR EXACTLY AS SHOWN, INSTEAD. HOWEVER, IF UMC IS GIVEN AS SHOWN, IT WILL ALSO RESULT IN SMC AS SHOWN. UMC IS IDLE IF THE BPC IS THE ORIGINATOR.

BPC READS MEMORY (TWO CONSECUTIVE FASTEST CYCLES SHOWN)

FIG 108B

NOTES

A. ACTIVE PULL UP DURING MECD.

B. DOTTED LINES REPRESENT ZERO OR ANY INTEGRAL NUMBER OF Ø1-Ø2 PAIRS.

C. NOTE THAT UMC COULD EQUAL STM.

GENERALIZED 4-STATE BPC READ MEMORY CYCLE (WITH IMPLICIT HANDSHAKE BASED ON UMC AND SMC)

WRITE TO A BPC REGISTER

WRITE TO A BPC REGISTER

WRITE TO A BPC REGISTER

NOTES

A. PRESENT ONLY IF THE BPC IS THE ORIGINATOR OF THE MEMORY CYCLE.
B. ACTIVE PULL-UP OF $\overline{DVAL}$, RDW AND $\overline{STM}$ DURING MECD.
C. DEPENDS UPON WHEN THE ADDRESS ON THE IDA BUS STABILIZES.
D. LATCHED WHEN STMA GOES TRUE.
E. IF THE BPC IS THE ORIGINATOR, RDW WILL TRANSITION AT THE START OF Ø2. AN EXTERNAL AGENCY HAS UNTIL THE END OF Ø2.
F. EARLIEST RELEASE OF RDW IF AN EXTERNAL AGENCY WERE THE ORIGINATOR OF THE MEMORY CYCLE.
G. THIS NOTE HAS BEEN DELETED.
H. LATCHED WHEN STMP GOES FALSE.
I. TRANSITIONS AT THE START OF Ø1 IF THE BPC IS THE ORIGINATOR. AN EXTERNAL AGENCY HAS UNTIL PRIOR TO Ø2.
J. FOLLOWS STM.
K. FOR THE ADDRESS.
L. FOR THE DATA.
M. FOR THE ADDRESS. SEE NOTE N.
N. FOR THE DATA. ADDRESS AND DATA TYPICALLY INVOLVE DIFFERENT REGISTERS.

WRITE TO A BPC REGISTER

FIG 110D

WRITE MEMORY (TWO CONSECUTIVE FASTEST CYCLES SHOWN)

WRITE MEMORY (TWO CONSECUTIVE FASTEST CYCLES SHOWN)

NOTES

A. THIS WAVE FORM PRESENT ONLY IF THE BPC IS THE ORIGINATOR OF THE MEMORY CYCLE.

B. ACTIVE PULL-UP DURING MECD ON $\overline{DVAL}$, RDW, AND $\overline{STM}$.

C. MEANING DURING THIS TIME, BUT LATCHED DURING STMA ONLY. SHOULD BE LOOKED AT DURING STM ONLY.

D. WAVEFORM SHOWN ASSUMES BPC AS THE ORIGINATOR OF THE MEMORY CYCLE. IF THE ORIGINATOR WERE AN EXTERNAL AGENCY, RDW COULD TRANSITION TOGETHER WITH STM.

E. EARLIEST RELEASE OF RDW IF AN EXTERNAL AGENCY WERE THE ORIGINATOR OF THE MEMORY CYCLE.

F. TRANSITIONS IMMEDIATELY AT THE START OF Ø1 IF THE BPC IS THE ORIGINATOR OF THE MEMORY CYCLE.

G. FOLLOWS STM.

H. UMC NEED NOT BE USED IF SMC IS GIVEN BY THE ORIGINATOR EXACTLY AS SHOWN, INSTEAD. HOWEVER, IF UMC IS GIVEN AS SHOWN, IT WILL RESULT IN SMC AS SHOWN.
UMC IS IDLE IF THE BPC IS THE ORIGINATOR.

I. FOR ADDRESS.

J. FOR DATA.

WRITE MEMORY (TWO CONSECUTIVE FASTEST CYCLES SHOWN)

FIG 111C

NOTES

A. ACTIVE PULL-UP DURING MECD.

B. DOTTED LINES REPRESENT ZERO ON ANY INTEGRAL NUMBER OF Ø1-Ø2 PAIRS.

C. NOTE THAT $\overline{\text{UMC}}$ COULD EQUAL $\overline{\text{STM}}$.

GENERALIZED 4-STATE BPC WRITE MEMORY CYCLE WITHOUT HANDSHAKE

NOTES

A. ACTIVE PULL-UP DURING MECD.

B. DOTTED LINES REPRESENT ZERO OR ANY INTEGRAL NUMBER OF Ø1-Ø2 PAIRS.

C. NOTE THAT $\overline{\text{SMC}}$ CANNOT EQUAL $\overline{\text{DVAL}}$; $\overline{\text{DVAL}}$ LASTS TOO LONG.

GENERALIZED 5-STATE BPC WRITE MEMORY CYCLE WITH HANDSHAKE
(LEADING EDGE OF DVAL USED TO INITIATE SMC)

NOTES

A. ACTIVE PULL-UP DURING MECD.

B. DOTTED LINES REPRESENT ZERO OR ANY INTEGRAL NUMBER OF Ø1-Ø2 PAIRS.

C. NOTE THAT UMC COULD EQUAL DVAL.

GENERALIZED 6-STATE BPC WRITE MEMORY CYCLE WITH HANDSHAKE (LEADING EDGE OF DVAL USED TO INITIATE UMC)

BPC START-UP AND FIRST INSTRUCTION FETCH SEQUENCE

BPC START-UP AND FIRST INSTRUCTION FETCH SEQUENCE

NOTES

A. IDA EQUALS THE INSTRUCTION FETCHED FROM LOCATION $40_8$. IN THIS EXAMPLE WE ASSUME THAT IT IS JMP $41_8$, I.

B. ACTIVE PULL-UP ON $\overline{STM}$ DURING MECD.

C. MEC RESETS THE LATCHED ROM OUTPUT FOR SYNC.

D. POP FORCES AN INITIAL SYNC. SYNC IS ALWAYS PRE-CHARGED ON Ø1.

E. DOTTED LINES REPRESENT AN INDEFINITE DELAY.

BPC START-UP AND FIRST INSTRUCTION FETCH SEQUENCE

FIG 115C

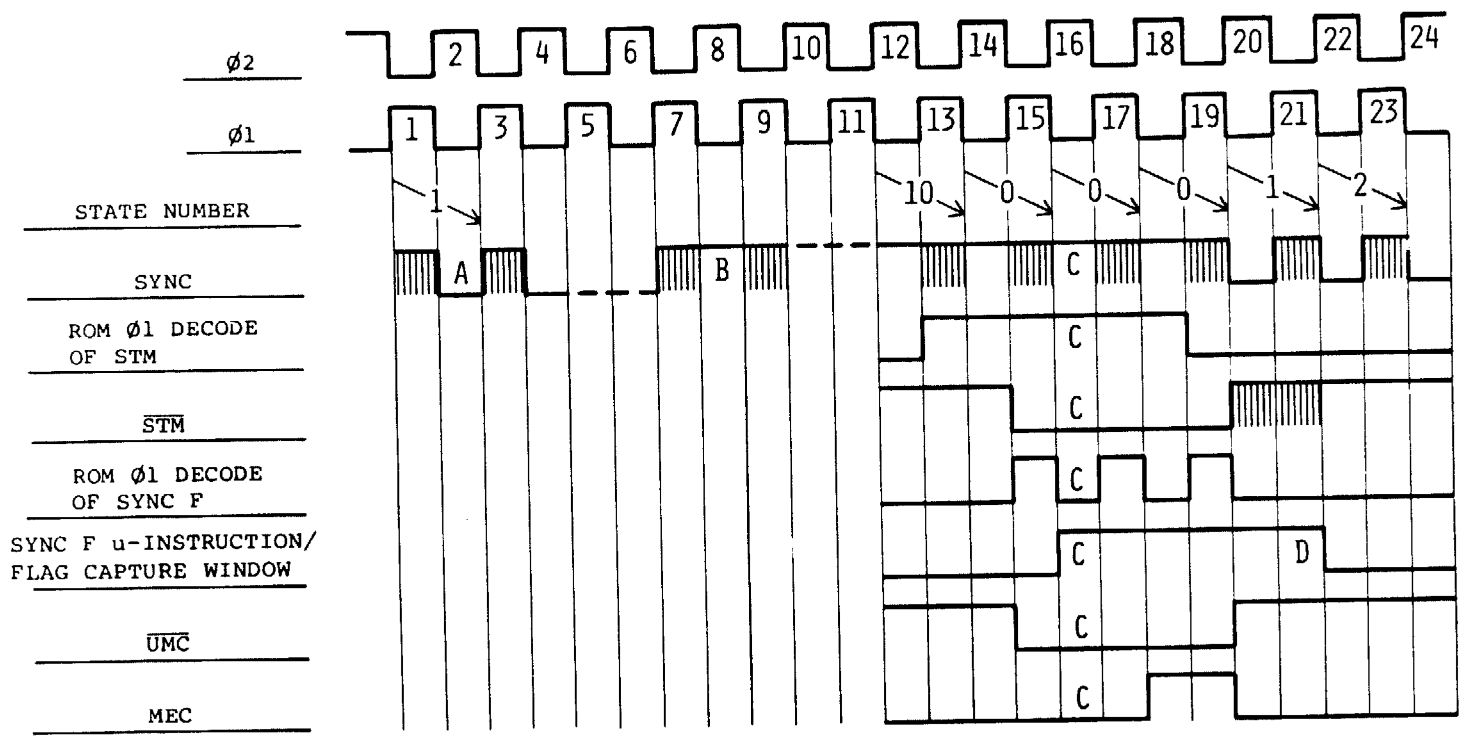

NOTES

A. SYNC IS FALSE AT THE END OF THE PREVIOUS INSTRUCTION FETCH.

B. DURING THE EXECUTION OF THE PREVIOUS INSTRUCTION, SYNC GOES TRUE ON OR BEFORE STATE 10.

C. CAN BE IN STATE 0 FOR 2, 3, OR 4 STATES. TYPICALLY IT IS 3. THE EXACT NUMBER DEPENDS UPON WHEN STM WAS GIVEN, AND WHETHER OR NOT THE FETCH IS FROM A BPC REGISTER.

D. AT VERY LEAST, FLAGS MUST BE TRUE DURING THIS Ø2.

CAPTURE OF FLAGS DURING BPC INSTRUCTION FETCH

FIG 116

INTERRUPT DURING A BPC INSTRUCTION FETCH

NOTES

A. $\overline{INT}$ MUST NOT BE PULLED BEFORE SYNC IS GIVEN.
B. IF THE PREVIOUS INSTRUCTION WAS A GROUP A INSTRUCTION, ONE LESS STATE-TIME IS SPENT IN STATE 0, AND THIS PULSE DOES NOT OCCUR. ALSO, THE STATE NUMBERS CHANGE AS INDICATED IN THE PARENTHESIS.
C. DEPENDS UPON $\overline{INT}$. IF NOTE B APPLIES, YINT TRANSITIONS AT START OF CLOCK #16.
D. FETCHED INSTRUCTION THAT IS ABORTED AND REPLACED INTERNALLY BY JSM $10_8$, I.
E. PRESENT VERSION OF THE BPC DOES NOT ALLOW AN INSTRUCTION FETCH FROM A BPC REGISTER TO BE INTERRUPTED.

INTERRUPT DURING A BPC INSTRUCTION FETCH

FIG 117B

BUS REQUEST AND BUS GRANT DURING MEMORY CYCLES

BUS REQUEST AND BUS GRANT DURING MEMORY CYCLES

NOTES

A. THIS IS THE FIRST OF TWO SET IDA'S. THE SECOND ONE IS NOT DECODED DUE TO THE GRANTING OF THE BUS. NOTE THAT EXTERNAL USE OF THE BUS MUST WAIT UNTIL THE EFFECT OF THIS SET IDA IS OVER.

B. THIS IS A RE-DECODING OF THE SAME SET IDA MENTIONED IN NOTE A. IN THIS WAY THE SET IDA/SET IDA-STM SEQUENCE IS PRESERVED.

C. MEMORY DATA. IT SO HAPPENS WE SHOW DATA FOR A READ CYCLE, AS OPPOSED TO THAT FOR A WRITE CYCLE. IT DOESN'T MATTER.

D. EARLIEST POSSIBLE USE OF THE BUS.

E. ACTIVE PULL-UP ON $\overline{STM}$ DURING MECD.

F. DOTTED LINES REPRESENT AN INDEFINITE INTERRUPTION.

G. IF AN IOC IS IN THE SYSTEM, IT WILL PRE-CHARGE $\overline{BR}$ DURING Ø2.

H. ACTIVE PULL-UP OF BG DURING Ø1.

I. SSTP ENDS SOONER THAN STP. THIS ALLOWS A POSSIBLE SET IDA TO BE RE-DECODED 1 STATE PRIOR TO ALL OTHER RESUMED ROM ACTIVITY.

BUS REQUEST AND BUS GRANT DURING MEMORY CYCLES

FIG 119B

TABLE OF BPC ROM CONTENTS

| MICRO-INSTRUCTION | ROM LINE | GIVEN IN ANY OF THESE GROUPS | WHEN IN ANY OF THESE STATES | PROVIDED ALL OF THESE CONDITIONS ARE MET |
|---|---|---|---|---|
| INTE | 1 | ABCDEFGHIJKM | 0 | $\overline{MEC}$ |
| SET IDA | 2 | ABCDEFGHIJKM | 0 1 2 3 4 5 6 7 8 9 10 14 | RDR |
| | 3 | ABCDEFGHIJKM | 1 6 7 8 10 14 | $\overline{SSTP}$ |
| | 4 | ABCDEFG | 1 3 8 9 10 | MEC · $\overline{SSTP}$ |
| | 5 | ABCDEFG | 2 4 14 | $\overline{SSTP}$ |
| | 6 | ABCDEFGHIJKM | 9 10 | $\overline{SSTP}$ |
| | 7 | EFH | 2 9 | $\overline{SSTP}$ |
| | 8 | HM | 1 3 8 9 10 | $\overline{SSTP}$ |
| SET D | 9 | ABCDEFGHIJKM | 0 1 2 3 4 5 6 7 8 9 10 14 | RDR · DRQ |
| | 10 | ABCDEFGHIJKM | 0 1 2 3 4 5 6 7 8 9 10 14 | M-ADD 7 · WTR |
| | 11 | ABCDEFGHIJKM | 6 14 | $\overline{STP}$ |
| | 12 | ABCDEFGHIJKM | 1 8 | $\overline{STP}$ |
| | 13 | ABCDEFG | 1 3 8 | BPRL · $\overline{MEC}$ · $\overline{STP}$ |
| | 14 | ABD | 1 3 8 | $\overline{IND}$ · MEC · $\overline{STP}$ |
| | 15 | ABCGIJK | 7 8 | STP |
| | 16 | CGI | 4 | |
| | 17 | ABCDEFGHIJKM | 9 | MEC |
| | 18 | H | 2 9 | $\overline{STP}$ |
| | 19 | H | 2 9 | $\overline{STP}$ |
| DMP IDA | 20 | ABCDEFG | 3 | $\overline{BPRL}$ · $\overline{MEC}$ |
| | 21 | ABCDEFGHIJKM | 0 1 2 3 4 5 6 7 8 9 10 14 | WTR |
| | 22 | D | 2 | $\overline{STP}$ |
| | 23 | DEF | 2 | $\overline{IND}$ · $\overline{STP}$ |
| | 24 | H | 4 | $\overline{BPRL}$ · $\overline{MEC}$ |
| | 25 | ABCDEFGHIJKM | 0 | $\overline{BPRL}$ · $\overline{MEC}$ |
| DMP T | 27 | ABCDEFGHIJKM | 0 1 2 3 4 5 6 7 8 9 10 14 | M-ADD 6 · RDR |
| | 30 | D | 3 4 5 | $\overline{IND}$ · MEC |
| | 31 | EFH | 9 | MEC |
| STM | 28 | ABD | 2 | $\overline{STP}$ |
| | 29 | AK | 4 5 | $\overline{STP}$ |
| | 32 | ABCDEFGHIJKM | 10 | $\overline{STP}$ |
| | 33 | AC | 2 | $\overline{STP}$ |
| | 36 | ABCDEFG | 2 | IND · $\overline{STP}$ |

FIG 120A

TABLE OF BPC ROM CONTENTS

| MICRO-INSTRUCTION | ROM LINE | GIVEN IN ANY OF THESE GROUPS | WHEN IN ANY OF THESE STATES | PROVIDED ALL OF THESE CONDITIONS ARE MET |
|---|---|---|---|---|
| STM (CONT.) | 37 | DEF | 7 8 | $\overline{STP}$ |
| | 40 | HM | 3 9 | $\overline{STP}$ |
| SET T | 34 | ABCDEFGHIJKM | 0 1 2 3 4 5 6 7 8 9 10 14 | M-ADD 6·WTR |
| | 35 | ABCDEFGHIJKM | 0 | $\overline{MEC}$ |
| | 38 | DM | 2 | $\overline{STP}$ |
| | 39 | F | 2 | $\overline{IND}\cdot\overline{STP}$ |
| | 41 | F | 2 | $\overline{IND}\cdot\overline{STP}$ |
| ADM | 42 | ABCDEFGHIJKM | 0 1 2 3 4 5 6 7 8 9 10 14 | M-ADD 2·RDR |
| | 43 | ABCDEFGHIJKM | 0 | |
| | 45 | ABCDEFGHIJKM | 1 | |
| DVAL | 44 | ABCDEFGHIJKM | 9 | $\overline{MEC}$ |
| SET P | 46 | ABCDEFGHIJKM | 0 1 2 3 4 5 6 7 8 9 10 14 | M-ADD 16·WTR |
| | 47 | AB | 3 | $\overline{IND}$·MEC |
| | 48 | ABD | 7 | $\overline{STP}$ |
| | 49 | ABCDEFGHIJKM | 9 | MEC |
| | 50 | E | 2 4 14 | $\overline{IND}$·STP |
| | 51 | HIJKM | 6 14 | $\overline{STP}$ |
| | 52 | H | 4 | $\overline{MEC}$ |
| | 53 | ABCDEFGHIJKM | 14 | |
| DMP P | 54 | ABCDEFGHIJKM | 0 1 2 3 4 5 6 7 8 9 10 14 | M-ADD 16·RDR |
| | 55 | CEFGHI | 8 | |
| | 56 | ABD · | 9 | $\overline{SKP}$·MEC |
| | 57 | ABCG | 7 8 | $\overline{SKP}\cdot\overline{STP}$ |
| DMP R | 58 | ABCDEFGHIJKM | 0 1 2 3 4 5 6 7 8 9 10 14 | M-ADD 17·RDR |
| | 59 | ABCDEFGHIJKM | 0 | MEC |
| | 61 | H | 2 | $\overline{STP}$ |
| WRITE | 60 | C | 2 4 | $\overline{IND}\cdot\overline{STP}$ |
| | 64 | ABCDEFGHIJKM | 9 | $\overline{MEC}$ |
| | 65 | DEF | 7 8 | $\overline{STP}$ |
| SET R | 62 | ABCDEFGHIJKM | 0 1 2 3 4 5 6 7 8 9 10 14 | M-ADD 17·WTR |
| | 63 | ABCDEFG | 6 14 | $\overline{STP}$ |
| | 66 | H | 9 10 | $\overline{STP}$ |

FIG 120B

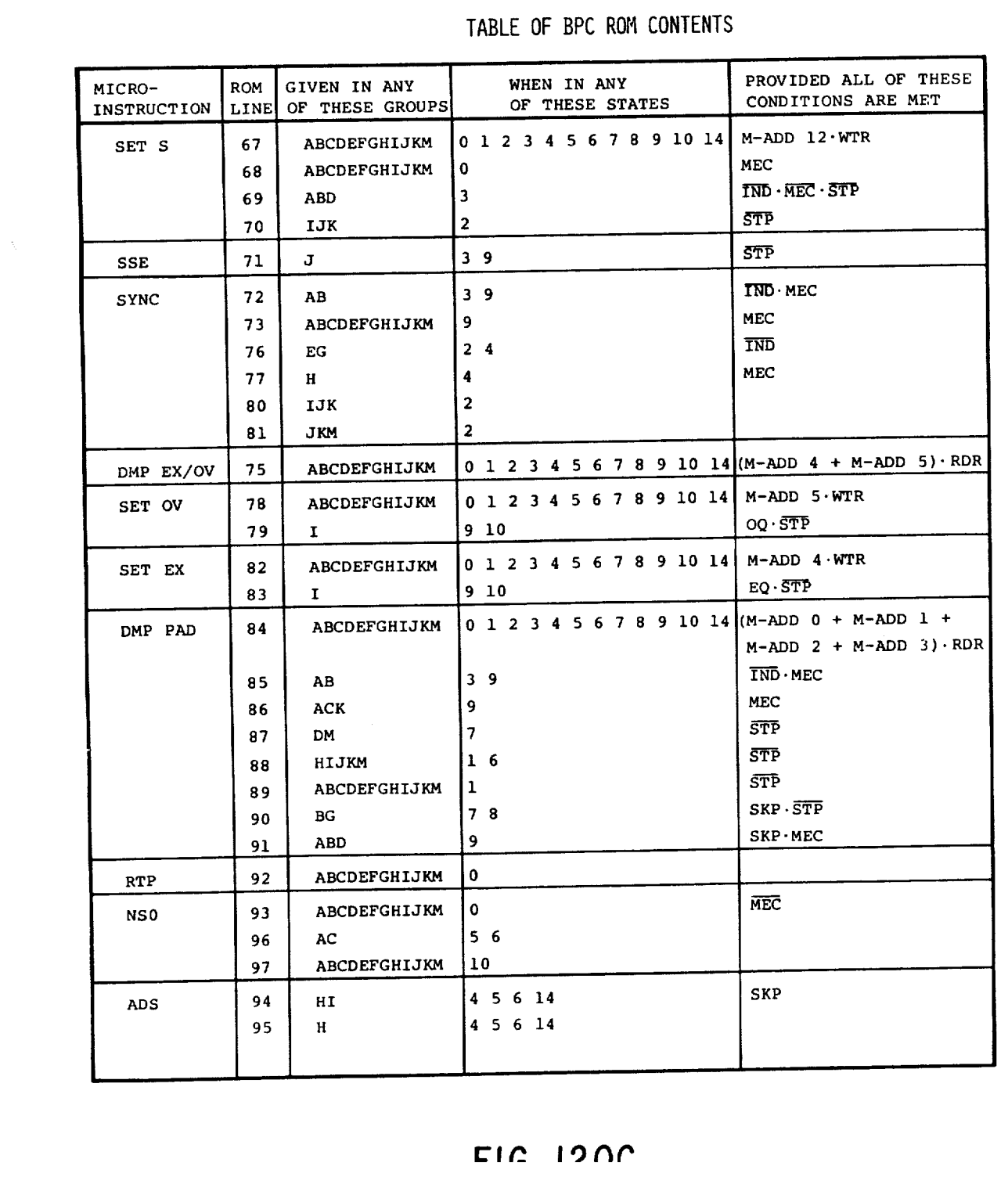

TABLE OF BPC ROM CONTENTS

| MICRO-INSTRUCTION | ROM LINE | GIVEN IN ANY OF THESE GROUPS | WHEN IN ANY OF THESE STATES | PROVIDED ALL OF THESE CONDITIONS ARE MET |
|---|---|---|---|---|
| SET S | 67 | ABCDEFGHIJKM | 0 1 2 3 4 5 6 7 8 9 10 14 | M-ADD 12·WTR |
| | 68 | ABCDEFGHIJKM | 0 | MEC |
| | 69 | ABD | 3 | $\overline{\text{IND}}\cdot\overline{\text{MEC}}\cdot\overline{\text{STP}}$ |
| | 70 | IJK | 2 | $\overline{\text{STP}}$ |
| SSE | 71 | J | 3 9 | $\overline{\text{STP}}$ |
| SYNC | 72 | AB | 3 9 | $\overline{\text{IND}}\cdot$MEC |
| | 73 | ABCDEFGHIJKM | 9 | MEC |
| | 76 | EG | 2 4 | $\overline{\text{IND}}$ |
| | 77 | H | 4 | MEC |
| | 80 | IJK | 2 | |
| | 81 | JKM | 2 | |
| DMP EX/OV | 75 | ABCDEFGHIJKM | 0 1 2 3 4 5 6 7 8 9 10 14 | (M-ADD 4 + M-ADD 5)·RDR |
| SET OV | 78 | ABCDEFGHIJKM | 0 1 2 3 4 5 6 7 8 9 10 14 | M-ADD 5·WTR |
| | 79 | I | 9 10 | OQ·$\overline{\text{STP}}$ |
| SET EX | 82 | ABCDEFGHIJKM | 0 1 2 3 4 5 6 7 8 9 10 14 | M-ADD 4·WTR |
| | 83 | I | 9 10 | EQ·$\overline{\text{STP}}$ |
| DMP PAD | 84 | ABCDEFGHIJKM | 0 1 2 3 4 5 6 7 8 9 10 14 | (M-ADD 0 + M-ADD 1 + M-ADD 2 + M-ADD 3)·RDR |
| | 85 | AB | 3 9 | $\overline{\text{IND}}\cdot$MEC |
| | 86 | ACK | 9 | MEC |
| | 87 | DM | 7 | $\overline{\text{STP}}$ |
| | 88 | HIJKM | 1 6 | $\overline{\text{STP}}$ |
| | 89 | ABCDEFGHIJKM | 1 | $\overline{\text{STP}}$ |
| | 90 | BG | 7 8 | SKP·$\overline{\text{STP}}$ |
| | 91 | ABD | 9 | SKP·MEC |
| RTP | 92 | ABCDEFGHIJKM | 0 | |
| NS0 | 93 | ABCDEFGHIJKM | 0 | $\overline{\text{MEC}}$ |
| | 96 | AC | 5 6 | |
| | 97 | ABCDEFGHIJKM | 10 | |
| ADS | 94 | HI | 4 5 6 14 | SKP |
| | 95 | H | 4 5 6 14 | |

FIG. 120C

TABLE OF BPC ROM CONTENTS

| MICRO-INSTRUCTION | ROM LINE | GIVEN IN ANY OF THESE GROUPS | WHEN IN ANY OF THESE STATES | PROVIDED ALL OF THESE CONDITIONS ARE MET |
|---|---|---|---|---|
| UPDOE | 98 | K | 10 | |
| | 99 | A | 5 6 | |
| NS9 | 100 | C | 4 | |
| | 101 | ABCDEFGHIJKM | 9 | $\overline{MEC}$ |
| DMP ALU | 102 | ABCDEFGHIJKM | 0 1 2 3 4 5 6 7 8 9 10 14 | M-ADD 11·RDR |
| | 103 | ABCDEFG | 5 6 | $\overline{STP}$ |
| | 106 | ABDJKM | 8 | |
| | 107 | HIJKM | 10 | $\overline{STP}$ |
| NS7 | 104 | BG | 5 6 | |
| | 105 | D | 3 4 5 | $\overline{IND}$·MEC |
| NS4 | 108 | CF | 2 | $\overline{IND}$ |
| | 109 | HM | 4 | $\overline{MEC}$ |
| SET B | 111 | ABCDEFGHIJKM | 0 1 2 3 4 5 6 7 8 9 10 14 | M-ADD 15·WTR |
| | 114 | ACK | 5 | BQ |
| | 115 | IJK | 9 10 | BQ·$\overline{STP}$ |
| NS6 | 112 | JK | 3 | CTQ |
| | 113 | M | 2 | SYNCQ |
| | 116 | K | 3 | |
| | 117 | M | 2 | GNI |
| DMP B | 118 | ABCDEFGHIJKM | 0 1 2 3 4 5 6 7 8 9 10 14 | M-ADD 15·RDR |
| | 119 | J | 2 4 | BQ·$\overline{STP}$ |
| | 122 | C | 4 | BQ·$\overline{STP}$ |
| NS10 | 120 | ABCG | 7 8 | |
| | 121 | HIJM | 6 14 | $\overline{GNI}$ |
| | 124 | IJK | 6 14 | |
| | 125 | ABCDEFGHIJKM | 14 | |
| | 128 | EG | 2 4 9 | $\overline{IND}$ |
| DMP A | 123 | ABCDEFGHIJKM | 0 1 2 3 4 5 6 7 8 9 10 14 | M-ADD 14·RDR |
| | 126 | J | 2 4 | AQ·$\overline{STP}$ |
| | 127 | C | 4 | AQ·$\overline{STP}$ |

FIG 120D

TABLE OF BPC ROM CONTENTS

| MICRO-INSTRUCTION | ROM LINE | GIVEN IN ANY OF THESE GROUPS | WHEN IN ANY OF THESE STATES | PROVIDED ALL OF THESE CONDITIONS ARE MET |
|---|---|---|---|---|
| NS2 | 129 | ABD | 3 | IND·MEC |
| | 132 | CEFG | 3 | MEC |
| | 133 | I | 2 | $\overline{SYNCQ}$ |
| | 136 | M | 2 | $\overline{SYNCQ}\cdot\overline{GNI}$ |
| | 137 | DM | 4 | MEC |
| SET A | 130 | ABCDEFHGIJKM | 0 1 2 3 4 5 6 7 8 9 10 14 | M-ADD 14·WTR |
| | 131 | ACK | 5 | AQ |
| | 134 | IJK | 9 10 | AQ·$\overline{STP}$ |
| DMP ST | 135 | ABCDEFGHIJKM | 0 1 2 3 4 5 6 7 8 9 10 14 | M-ADD 13·RDR |
| | 138 | ABCDEFGHIJKM | 14 | $\overline{STP}$ |
| SET I | 139 | ABCDEFGHIJKM | 0 1 2 3 4 5 6 7 8 9 10 14 | M-ADD 13·WTR |
| | 142 | ABCDEFGHIJKM | 0 | $\overline{MEC}$ |
| NS3 | 140 | ABCDEFG | 3 | $\overline{MEC}$ |
| | 141 | DM | 5 6 | GNI |
| | 144 | J | 3 4 5 | $\overline{CTQ}$ |
| SYNC F | 143 | ABCDEFGHIJKM | 0 | |

FIG 120E

NOTES

1. THIS I/O BUS CYCLE WAS INITIATED BY ANY WRITE-INTO-MEMORY INSTRUCTION WHICH REFERENCED ONE OF R4 THRU R7.
2. CONTROL INFORMATION IS VALID ON BOTH EDGES OF IOSB.
3. DATA IS LATCHED INTO THE INTERFACE ON THE TRAILING EDGE OF IOSB.

WRITE I/O BUS CYCLE

NOTES

1. THIS I/O BUS CYCLE WAS INITIATED BY ANY READ-FROM-MEMORY INSTRUCTION WHICH REFERENCED ONE OF R4 THRU R7.
2. CONTROL INFORMATION IS VALID ON BOTH EDGES OF IOSB.
3. DATA FROM THE INTERFACE IS LATCHED INTO THE BPC DURING T4.

READ I/O BUS CYCLE

JSM THROUGH THE INTERRUPT TABLE

THE IOC IS NOT REQUESTING THE IDA BUS. IT PASSES BUS GRANT ALONG AS EXBG. THE TESTER IS REQUESTING THE BUS; IT USES EXBG AS BUS GRANT, AND DOES NOT PASS EXBG ALONG.

EXTENDED BUS GRANT

IOC INSTRUCTION BIT PATTERNS

GROUP: STACK

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| PWC | 0 | 1 | 1 | 1 | 0 | 0 | 0 | 1 | I/D | 1 | 1 | 0 | 0 | | | |
| PBC | 0 | 1 | 1 | 1 | 1 | 0 | 0 | 1 | I/D | 1 | 1 | 0 | 0 | | | |
| PWD | 0 | 1 | 1 | 1 | 0 | 0 | 0 | 1 | I/D | 1 | 1 | 0 | 1 | | | |
| PBD | 0 | 1 | 1 | 1 | 1 | 0 | 0 | 1 | I/D | 1 | 1 | 0 | 1 | | | |
| WWC | 0 | 1 | 1 | 1 | 0 | 0 | 0 | 1 | I/D | 1 | 1 | 1 | 0 | | | |
| WBC | 0 | 1 | 1 | 1 | 1 | 0 | 0 | 1 | I/D | 1 | 1 | 1 | 0 | | | |
| WWD | 0 | 1 | 1 | 1 | 0 | 0 | 0 | 1 | I/D | 1 | 1 | 1 | 1 | | | |
| WBD | 0 | 1 | 1 | 1 | 1 | 0 | 0 | 1 | I/D | 1 | 1 | 1 | 1 | | | |

* 3 BIT REGISTER ADDRESS FIELD $(0\text{-}7_8)$.
* PLACE INST'S INC/DEC THE STACK POINTER BEFORE THE OPERATION.
* WITHDRAW INST'S INC/DEC THE STACK POINTER AFTERWARDS.

1. I/D (INCREMENT/DECREMENT) IS ENCODED AS 0/1
2. FOR BYTE INSTRUCTIONS, A 1 IN BIT 15 OF THE POINTER REGISTER IMPLIES A LEFT-HALF

FIG 125A

IOC INSTRUCTION BIT PATTERNS (CONTINUED)

GROUP: INTERRUPT

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| EIR | 0 | 1 | 1 | 1 | 0 | 0 | 0 | 1 | 0 | 0 | 0 | 1 | 0 | 0 | 0 | 0 |
| DIR | 0 | 1 | 1 | 1 | 0 | 0 | 0 | 1 | 0 | 0 | 0 | 1 | 1 | 0 | 0 | 0 |

FIG 125B

GROUP: DMA

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| DMA | 0 | 1 | 1 | 1 | 0 | 0 | 0 | 1 | 0 | 0 | 1 | 0 | 0 | 0 | 0 | 0 |
| PCM | 0 | 1 | 1 | 1 | 0 | 0 | 0 | 1 | 0 | 0 | 1 | 0 | 1 | 0 | 0 | 0 |
| DDR | 0 | 1 | 1 | 1 | 0 | 0 | 0 | 1 | 0 | 0 | 1 | 1 | 1 | 0 | 0 | 0 |

FIG 125C

NOTES:

1.  DENOTES A MICRO-INSTRUCTION DECODED IN THE ROM.

2.  AND  DENOTE ONE- AND TWO-WAY INTERCONNECTIONS TO A BUS; ALWAYS CONTROLLED BY A ROM MICRO-INSTRUCTION.

3. 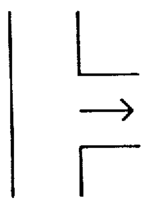 DENOTES A DIRECT CONNECTION BETWEEN TWO ITEMS.

4. 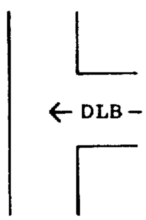

DENOTES A CONNECTION BETWEEN TWO ITEMS THAT IS ACTIVE ONLY WHEN THE STATED SIGNAL IS GIVEN. SOME SUCH SIGNALS ARE ROM DECODED MICRO-INSTRUCTIONS, WHILE OTHERS ARE PRESENT THROUGHOUT AN ENTIRE EXECUTION CYCLE.

5. 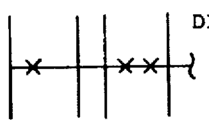 DENOTES THAT THE STATED LINE REPRESENTS A DECODED CONDITION.

6. 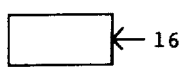

REPRESENTS A NON-MICRO-INSTRUCTION CONTROL LINE OR SOME OTHER SIGNAL.

7.  REPRESENTS AN INPUT TERMINAL TO THE IOC.

8.  REPRESENTS AN OUTPUT TERMINAL FROM THE IOC.

9.  REPRESENTS A TERMINAL THAT IS BOTH AN INPUT AND AN OUTPUT.

10. NUMBERS IN PARENTHESES INDICATE THE NUMBER OF BITS A MECHANISM HANDLES.

11. THE LOGICAL SENSE (XXX VERSUS $\overline{XXX}$) OF THE I/O TERMINALS IS CORRECTLY INDICATED. HOWEVER, THE DRAWING IS NOT A RELIABLE INDICATOR OF THE EXACT SENSE OF THE INTERNAL SIGNALS. TYPICALLY BOTH SENSES EXIST, AND FREQUENTLY THE PHYSICAL PROXIMITY OF SIGNALS TO THEIR DESTINATIONS WAS MORE IMPORTANT IN DECIDING WHICH SENSE TO USE, RATHER THAN AGREEMENT OF LOGICAL SENSE.

BECAUSE STRICT ACCURACY IN REPORTING SIGNAL SENSES ON SUCH A GENERAL LEVEL DRAWING WOULD SHARPLY INCREASE THE NUMBER OF INTERCONNECTIONS, WITH ONLY A SLIGHT INCREASE IN USEFULNESS, WE USUALLY SHOW ONLY THE NAME OF THE SIGNAL.

FIG 126C

| ADDRESS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| M | $E_S$ | TWO'S COMPLEMENT EXPONENT | | | | | | | | | EMPTY | | | | | $M_S$ |
| M + 1 | $D_1$ | | | | $D_2$ | | | | $D_3$ | | | | $D_4$ | | | |
| M + 2 | $D_5$ | | | | $D_6$ | | | | $D_7$ | | | | $D_8$ | | | |
| M + 3 | $D_9$ | | | | $D_{10}$ | | | | $D_{11}$ | | | | $D_{12}$ | | | |

| THE BCD DIGITS | | | |
|---|---|---|---|
| 0 | 0000 | 5 | 0101 |
| 1 | 0001 | 6 | 0110 |
| 2 | 0010 | 7 | 0111 |
| 3 | 0011 | 8 | 1000 |
| 4 | 0100 | 9 | 1001 |

THE INTERNAL FLOATING POINT REPRESENTATION OF

.003587219 ( $= 3.587219 \times 10^{-3}$ )

| ADDRESS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| M | 1 | 1 | 1 | 1 | 1 | 1 | 1 | 1 | 0 | 1 | 0 | 0 | 0 | 0 | 0 | 0 |
| M + 1 | 0011 | | | | 0101 | | | | 1000 | | | | 0111 | | | |
| M + 2 | 0010 | | | | 0001 | | | | 1001 | | | | 0000 | | | |
| M + 3 | 0000 | | | | 0000 | | | | 0000 | | | | 0000 | | | |

BCD FLOATING POINT FORMAT

FIG 127

EMC INSTRUCTION BIT PATTERNS

GROUP: ARITHMETIC

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| FXA | 0 | 1 | 1 | 1 | 0 | 0 | 1 | 0 | 1 | 0 | 0 | 0 | 0 | 0 | 0 | 0 |
| MWA | 0 | 1 | 1 | 1 | 0 | 0 | 1 | 0 | 0 | 0 | 0 | 0 | 0 | 0 | 0 | 0 |
| CMX | 0 | 1 | 1 | 1 | 0 | 0 | 1 | 0 | 0 | 1 | 1 | 0 | 0 | 0 | 0 | 0 |
| CMY | 0 | 1 | 1 | 1 | 0 | 0 | 1 | 0 | 0 | C | 1 | 0 | 0 | 0 | 0 | 0 |
| FMP | 0 | 1 | 1 | 1 | 1 | 0 | 1 | 0 | 0 | 0 | 0 | 0 | 0 | 0 | 0 | 0 |
| FDV | 0 | 1 | 1 | 1 | 1 | 0 | 1 | 0 | 0 | 0 | 1 | 0 | 0 | 0 | 0 | 1 |
| MPY | 0 | 1 | 1 | 1 | 1 | 0 | 1 | 1 | 1 | 0 | 0 | 0 | 1 | 1 | 1 | 1 |
| CDC | 0 | 1 | 1 | 1 | 0 | 0 | 1 | 1 | 1 | 1 | 0 | 0 | 0 | 0 | 0 | 0 |

FIG 128A

EMC INSTRUCTION BIT PATTERNS (CONTINUED)

GROUP: FOUR WORD OPERATION

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| CLR | 0 | 1 | 1 | 1 | 0 | 0 | 1 | 1 | 1 | 0 | 0 | 0 | * 4 BIT FIELD # OF WORDS * BINARY = N-1 | | | |
| XFR | 0 | 1 | 1 | 1 | 0 | 0 | 1 | 1 | 0 | 0 | 0 | 0 | | | | |

FIG 128B

GROUP: MANTISSA SHIFT

| INST. NAME | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| MRX | 0 | 1 | 1 | 1 | 1 | 0 | 1 | 1 | 0 | 0 | 0 | 0 | 0 | 0 | 0 | 0 |
| DRS | 0 | 1 | 1 | 1 | 1 | 0 | 1 | 1 | 0 | 0 | 1 | 0 | 0 | 0 | 0 | 1 |
| MLY | 0 | 1 | 1 | 1 | 1 | 0 | 1 | 1 | 0 | 1 | 1 | 0 | 0 | 0 | 0 | 1 |
| MRY | 0 | 1 | 1 | 1 | 1 | 0 | 1 | 1 | 0 | 1 | 0 | 0 | 0 | 0 | 0 | 0 |
| NRM | 0 | 1 | 1 | 1 | 0 | 0 | 1 | 1 | 0 | 1 | 0 | 0 | 0 | 0 | 0 | 0 |

FIG 128C

NOTES:

1.  DENOTES A MICRO-INSTRUCTION DECODED IN THE ROM.

2.  AND  DENOTE ONE- AND TWO-WAY INTERCONNECTIONS TO A BUS; ALWAYS CONTROLLED BY A ROM MICRO-INSTRUCTION.

3. 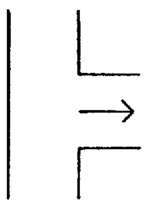 DENOTES A DIRECT CONNECTION BETWEEN TWO ITEMS.

4. 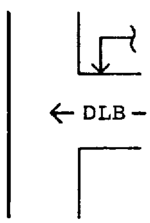

DENOTES A CONNECTION BETWEEN TWO ITEMS THAT IS ACTIVE ONLY WHEN THE STATED SIGNAL IS GIVEN. SOME SUCH SIGNALS ARE ROM DECODED MICRO-INSTRUCTIONS, WHILE OTHERS ARE PRESENT THROUGHOUT AN ENTIRE EXECUTION CYCLE.

5. 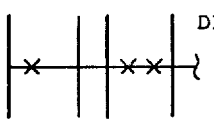 DENOTES THAT THE STATED LINE REPRESENTS A DECODED CONDITION.

6. 

REPRESENTS A NON-MICRO-INSTRUCTION CONTROL LINE OR SOME OTHER SIGNAL.

7. 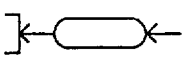 REPRESENTS AN INPUT TERMINAL TO THE EMC.

8. 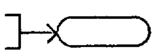 REPRESENTS AN OUTPUT TERMINAL FROM THE EMC.

9. 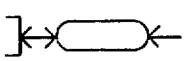 REPRESENTS A TERMINAL THAT IS BOTH AN INPUT AND AN OUTPUT.

10. NUMBERS IN PARENTHESES INDICATE THE NUMBER OF BITS A MECHANISM HANDLES.

11. THE LOGICAL SENSE (XXX VERSUS $\overline{XXX}$) OF THE I/O TERMINALS IS CORRECTLY INDICATED. HOWEVER, THE DRAWING IS NOT A RELIABLE INDICATOR OF THE EXACT SENSE OF THE INTERNAL SIGNALS. TYPICALLY BOTH SENSES EXIST, AND FREQUENTLY THE PHYSICAL PROXIMITY OF SIGNALS TO THEIR DESTINATIONS WAS MORE IMPORTANT IN DECIDING WHICH SENSE TO USE, RATHER THAN AGREEMENT OF LOGICAL SENSE.

BECAUSE STRICT ACCURACY IN REPORTING SIGNAL SENSES ON SUCH A GENERAL LEVEL DRAWING WOULD SHARPLY INCREASE THE NUMBER OF INTERCONNECTIONS, WITH ONLY A SLIGHT INCREASE IN USEFULNESS, WE USUALLY SHOW ONLY THE NAME OF THE SIGNAL.

FIG 129C

MEMORY TIMING AND CONTROL

READ/WRITE MEMORY CONTROL TIMING

① UMC IS GIVEN BY MEMORY TIMING AND CONTROL CIRCUIT.
② CS AND RW ARE NECESSARY DURING A REFRESH FOR A MOTOROLA OR AMI PART. TI'S PART DOESN'T CARE.

KDP CONTROL I/O INTERFACE

KDP CONTROL KEYBOARD SCAN CIRCUIT

BASIC TIMING

KDP CLOCK IS 1.5 MHZ (DERIVED FROM 6MHZ SYSTEM CLOCK)

MAIN TIMING SIGNALS (COMPLEMENTS ALSO USED)

KDP CONTROL MEMORY SECTION

*A1-A8 DISPLAY CHARACTER & COLUMN ADDRESS

B1-B8 PRINTER CHARACTER & ROW ADDRESS

KDP CONTROL-PRINTER CONTROL SECTION

KDP CONTROL-PRINTER BURN CONTROL

PRINTER BLOCK DIAGRAM

LIVE KEYBOARD KEY PROCESSING

LIVE KEYBOARD

CODE TO CALCULATE PARTITION LENGTHS
AS TAPE IS MOVING-WRITING INNER-PARTITION GAP

CODE FOR RECORDING

THE FOLLOWING CHARTS OUTLINE THE STEPS TAKEN IN LOADING A FILE. (READING THE RECORD'S PARTITIONS)

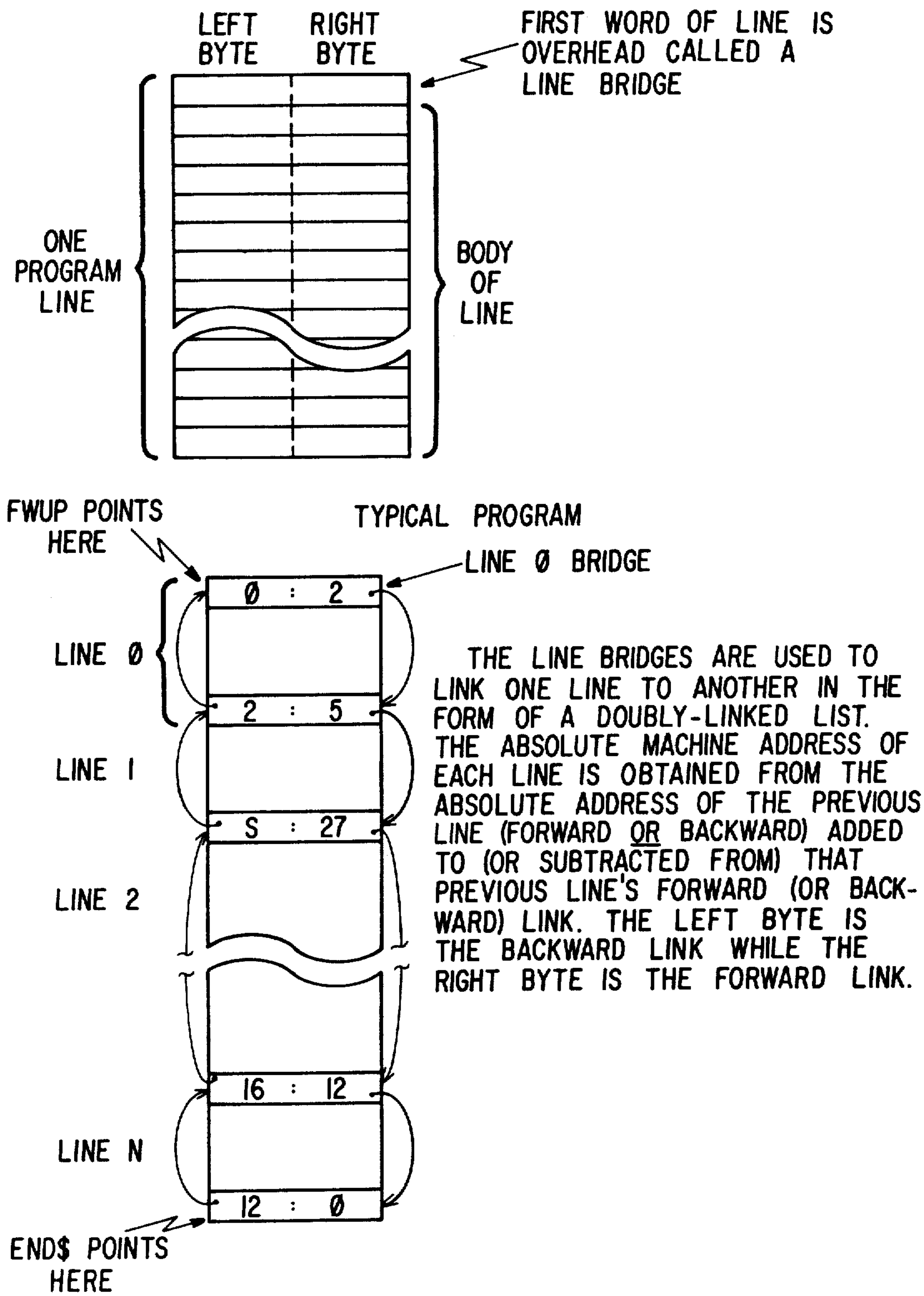

THE LINE BRIDGES ARE USED TO LINK ONE LINE TO ANOTHER IN THE FORM OF A DOUBLY-LINKED LIST. THE ABSOLUTE MACHINE ADDRESS OF EACH LINE IS OBTAINED FROM THE ABSOLUTE ADDRESS OF THE PREVIOUS LINE (FORWARD <u>OR</u> BACKWARD) ADDED TO (OR SUBTRACTED FROM) THAT PREVIOUS LINE'S FORWARD (OR BACKWARD) LINK. THE LEFT BYTE IS THE BACKWARD LINK WHILE THE RIGHT BYTE IS THE FORWARD LINK.

FIG 173

ENTER EXECUTION PROLOGUE:

EOL EXECUTION

CSTAT SETTING

| | |
|---|---|
| 0 IDLE | 1 EXECUTE |
| 2 RUN | 3 LIVE-KEYBOARD RUN |
| 4 ENT WAIT | 5 ENT RUN |
| 6 GSB IN LIVE KEYBOARD | |

PROGRAMMABLE CALCULATOR

CROSS REFERENCE TO RELATED APPLICATIONS

This application is a continuation of application Ser. No. 31,341, filed Apr. 19, 1979, abandoned, which is in turn a continuation of application Ser. No. 835,371, filed Sept. 21, 1977, abandoned, which is in turn a divisional of application Ser. No. 638,381, filed Dec. 8, 1975, now issued as U.S. Pat. 4,075,679, the subject matter of which is incorporated herein by reference.

BACKGROUND OF THE INVENTION

This invention relates generally to calculators and improvements therein and more particularly to programmable calculators that may be controlled both manually from the keyboard input unit and automatically by means of a stored program that has previously been loaded into the calculator memory from the keyboard input unit or an external magnetic record member.

Computational problems may be solved manually, with the aid of a calculator (a dedicated computational keyboard-driven machine that may be either programmable or nonprogrammable) or a general purpose computer. Manual solution of computational problems is often very slow, so slow in many cases as to be an impractical, expensive, and ineffective use of the human resource, particularly when there are other alternatives for solution of the computational problems.

Nonprogrammable calculators may be employed to solve many relatively simple computational problems more efficiently than they could be solved by manual methods. However, the keyboard operations or language employed by these calculators is typically trivial in structure, thereby requiring many keyboard operations to solve more general arithmetic problems. Programmable calculators may be employed to solve many additional computational problems at rates hundreds of times faster than manual methods. However, the keyboard language employed by these calculators is also typically relatively simple in structure, thereby again requiring many keyboard operations to solve more general arithmetic problems.

Conventional programmable calculators have also been restricted to operation in accordance with a single fixed program language. It would be advantageous to provide a programmable calculator in which the user may select at will any one of a number of different calculator or computer languages.

SUMMARY OF THE INVENTION

The principal object of this invention is to provide an improved programmable calculator that has more capability and flexibility than conventional programmable calculators, that is smaller, less expensive, and more efficient in evaluating mathematical functions than are conventional computer systems, and that is much easier for the unskilled user to operate than either conventional programmable calculators or computer systems.

Another object of this invention is to provide a programmable calculator in which the user may employ a reset key at any time during operation of the calculator to initialize the calculator without thereby erasing any information stored in the calculator memory.

Another object of this invention is to provide a programmable calculator in which a visual cursor can be selectively entered into displayed line of alphanumeric characters from either the left-hand end of that line or the right-hand end of that line.

Another object of this invention is to provide a programmable calculator in which the user may execute statements manually from the keyboard at the same time the calculator is executing a program stored in the calculator memory.

Another object of this invention is to provide a programmable calculator in which the user may obtain, under program control, a printed listing of selected information stored in the calculator memory.

Another object of this invention is to provide a programmable calculator in which the user may, at any point during execution of a program stored in the calculator read-write memory, transfer the entire contents of the read-write memory, including all data and relevant housekeeping information existing at the time of transfer, to an external magnetic tape, and may thereafter load that transferred information back into the calculator read-write memory for automatic resumption of execution of the program at the point therein at which the transfer occurred.

Another object of this invention is to provide a programmable calculator in which the user may insert additional characters at a designated position in a line of alphanumeric information by moving an insert cursor to that position and by then simply actuating keys representing the desired characters to be inserted.

Another object of this invention is to provide a programmable calculator in which the user may coarsely and finely position, within a display, a line of alphanumeric information whose length exceeds that of the display by selectively actuating a group of display position control keys.

Another object of this invention is to provide a programmable calculator in which an attempt to store a line of alphanumeric statements containing a syntax error results in a visual error message being indicated to the user and in which subsequent actuation of a recall key results in that erroneous line being visually displayed with a cursor indicating the location of the syntax error.

Another object of this invention is to provide a programmable calculator in which the user may select either one of two visual cursors to designate separate editing functions to be performed in connection with a diplayed line of alphanumeric information.

Another object of this invention is to provide a programmable calculator in which interrupt service routines employed in connection with peripheral input/output units may be written by the user in keyboard language.

Another object of this invention is to provide a programmable calculator in which the user can declare an interrupt priority among a plurality of peripheral input/output units to eliminate user attention to interrupt requests.

Another object of this invention is to provide a programmable calculator that automatically adjusts addresses designated in relative branch statements of a program stored in the calculator memory in accordance with any program editing performed by the user.

Another object of this invention is to provide a programmable calculator in which the user may specify any array through use of a dimension statement that includes one or more variables to represent the size of the array.

Another object of this invention is to provide a programmable calculator in which the user may specify, as part of an enter statement, an array that may include an expression to specify a subscript thereof and in which the expression is automatically evaluated by the calculator and the result thereof displayed for the user.

Another object of this invention is to provide a programmable calculator in which a specified array may include an expression to designate a subscript thereof and in which a trace mode of operation is provided to automatically evaluate the expression and display the result thereof to the user.

Another object of this invention is to provide a progammable calculator in which the user may completely change the language of the calculator by replacing a plug-in language read-only memory.

Another object of this invention is to provide a programmable calculator in which the user may call a rounding function for rounding a number to a specified number of digits.

Another object of this invention is to provide a programmable calculator in which the user may call a tangent function and specify as an argument of that function any angle up to $10^{99}$ degrees.

Another object of this invention is to provide a programmable calculator in which the user may direct execution of a program to begin or continue at a labelled program statement.

Another object of this invention is to provide a programmable calculator in which the user may select an exclusive or logic operator for use in constructing alphanumeric statements.

Another object of this invention is to provide a programmable calculator in which the user may recall into the display either the last or the penultimate line of one or more alphanumeric statements executed by the calculator or stored in the calculator memory by actuating a recall key either once or twice, respectively.

Another object of this invention is to provide a programmable calculator in which the user may, during program execution, direct execution of the program to any one of a plurality of program lines by simply actuating an appropriate one of the keys of a keyboard input unit.

Another object of this invention is to provide a programmable calculator in which the user may communicate via the calculator keyboard with a plurality of peripheral input/output units connected to the calculator by means of a universal interface bus without regard for conventions of that universal interface bus.

Other and incidental objects of this invention will become apparent to those persons skilled in the art upon detailed examination of the following portions of this specification.

These objects are accomplished in accordance with the illustrated preferred embodiment of this invention by employing a keyboard input unit, a magnetic tape cassette reading and recording unit, a 32-character light-emitting diode (LED) display, a 16-character thermal printer unit, a memory unit, and a central processing unit (CPU) to provide an adaptable programmable calculator having manual operating, automatic operating, program entering, magnetic tape reading, and magnetic tape recording modes.

The keyboard input unit includes a group of numeric data keys for entering data into the calculator, a group of algebraic operator keys for use in entering algebraic statements into the calculator, a second set of numeric keys, a complete set of alphabetic keys and a group of special character keys all arranged in a configuration slightly modified from that of a typewriter keyboard, a group of program editing and display control keys useful in editing displayed lines of a alphanumeric information, a group of system command keys for listing programs of alphanumeric statements stored in the calculator memory, for controlling the operation of the magnetic tape cassette reading and recording unit, for controlling the calculator memory, and for otherwise controlling operation of the calculator, and a group of user-definable keys. Many of these groups of keys are useful in both the manual and automatic operating modes of the calculator.

The magnetic tape cassette reading and recording unit includes a reading and recording head, a drive mechanism for driving a magnetic tape past the reading and recording head, and reading and recording drive circuits coupled to the reading and recording head for bidirectionally transferring information between the magnetic tape and the calculator as determined by alphanumeric statements executed from the keyboard or as part of a program stored in the calculator memory.

The memory unit includes a modular random-access read-write memory having a dedicated system area and a separate user area for storing alphanumeric program statements and/or data. The user portion of the read-write memory may be expanded without increasing the overall dimensions of the calculator by the addition of a plug-in read-write memory module. Additional read-write memory made available to the user is automatically accommodated by the calculator, and the user is automatically informed of the number of available program storage locations and when the storage capacity of the read-write memory has been exceeded.

The memory unit also includes a modular read-only memory in which routines and subroutines of assembly language instructions for performing the various functions of the calculator are stored. The read-only memory comprises a plug-in mainframe language read-only memory for defining the language of the calculator and a group of optional plug-in function read-only memories that may be selectively added by the user to increase the functional capability of the calculator within the framework of the language defined by the mainframe language ROM. Receptacles are provided in the front base of the calculator housing to accommodate up to four plug-in function read-only memories. A receptacle is likewise provided on the right side panel of the calculator housing to accommodate the single mainframe language ROM. By plugging an appropriate different mainframe language ROM into the receptacle provided therefore, the operating language of the calculator can be changed from the standard algebraic language described hereinafter to either BASIC, FORTRAN, ALGOL or APL computer language, for example. Different mainframe language plug-in read-only memories, as well as any plug-in function read-only memories added by the user, are automatically accommodated by the calculator.

Exemplary of the plug-in function read-only memories that the user may add to increase the functional capabilities of the calculator are a plotter ROM, a string variables ROM, a general input/output ROM, a matrix ROM, an advanced programming ROM, an extended input/output ROM, and a disc memory ROM.

The LED display unit is hardware-refreshed and features 32-character 5×7 dot matrix alphanumeric capability. Hardware refreshing of the display allows the user to use the display in connection with keyboard calculations at the same time the microprocessor is executing a program stored in the calculator memory.

The central processing unit (CPU) may comprise, for example, an LSI MOS hybrid microprocessor that includes a binary processor chip, an input/output (I/O) chip, and an extended math chip together with necessary buffering circuitry. This processor utilizes 16-bit parallel bus architecture which, at various points in time, handles address, instruction or data information. Also included are two 16-bit general purpose accumulators, memory stack instruction capability, two-level vectored interrupt capability, a single direct memory access channel, and math instructions for handling binary-coded-decimal floating point numbers.

In the run mode of operation, the calculator is controlled by an internal stored format generated by the calculator in response to actuation by the user of selected keys of the keyboard input unit. Each internal stored format is employed as a pointer to the address of the routine stored in the calculator read-only memory that is required for execution of the selected keyboard instruction.

In the program mode of operation, the internal stored format generated by the calculator during entry of a program is stored in the program storage area of the user read-write memory. This internal stored format, compiled from lines of alphanumeric statements entered into the calculator by the user, constitutes a program that may be automatically executed by the calculator upon request by the user. During program entry, the output printer may be commanded, by means of a keyboard switch, to provide a printed listing of the keyboard statements entered by the user together with the corresponding program line at which the associated internal stored format is stored. Since several key actuations may result in generation by the calculator of a single compiled instruction code and since the calculator executes only these internal instruction codes, a complex program can be stored and executed by the calculator very efficiently and in a short period of time.

DESCRIPTION OF THE DRAWINGS

FIG. 11 is a detailed memory map of the portion of the read-write memory of FIG. 8 that is employed as a statement parameter stack.

FIG. 22 is a diagram illustrating current page absolute addressing employed by the BPC of FIG. 19.

FIGS. 24A–G are a tabular illustration of the instruction set and corresponding bit patterns associated with the BPC of FIG. 19.

FIGS. 25A–C are a detailed block diagram of the BPC of FIG. 19.

FIGS. 34A–D are a table of the 29 instruction categories decoded by the instruction category identifier of FIG. 33.

FIGS. 35A–E are a tabular illustration of the relationship between the 29 instruction categories of FIGS. 34A–D and the instruction bit patterns of FIGS. 24A–G.

FIG. 36 is a tabular illustration of the details of generation of the instruction group qualifiers appearing at the output of the instruction group decoder of FIG. 33 from the outputs of the instruction category identifier of FIG. 33.

FIG. 43 is a diagram illustrating the logical properties of the non-sequential state-count generator of FIG. 38.

FIG. 51 is a detailed schematic diagram of the S register shift control block of FIG. 49.

FIG. 55 is a diagram illustrating the rules for generating sum and carry bits addition operations performed by the ALU of FIG. 52.

FIG. 81 is a detailed schematic diagram of the BPC-register address detector of FIG. 79.

FIGS. 91A–E are illustrations of the conventions used in the BPC ASM chart of FIGS. 92–103.

FIG. 101 is a flow chart segment of the shift-rotate group of machine instructions executed by the BPC of FIG. 19.

FIG. 105 is a tabular illustration of the addressing capability embodied in the flow chart of FIG. 104.

FIG. 106 is an illustration of the conventions used in the waveform diagrams of FIGS. 107A–119B.

FIGS. 107A–C are a waveform diagram illustrating a read memory cycle in which the source address is a BPC register.

FIGS. 108A–B are a waveform diagram illustrating two consecutive read memory cycles originating with the BPC in which the source addresses are in the external memory.

FIGS. 110A–D are a waveform diagram illustating a write memory cycle in which the destination address is a BPC register.

FIGS. 111A–C are a waveform diagram illustrating the two consecutive write memory cycles originating with the BPC in which the destination addresses are in the external memory.

FIGS. 115A–C are a waveform diagram illustrating the initial start up and first instruction etch of the BPC.

FIG. 116 is a waveform diagram illustrating the capture of external flags during a BPC instruction fetch.

Figure 117A:
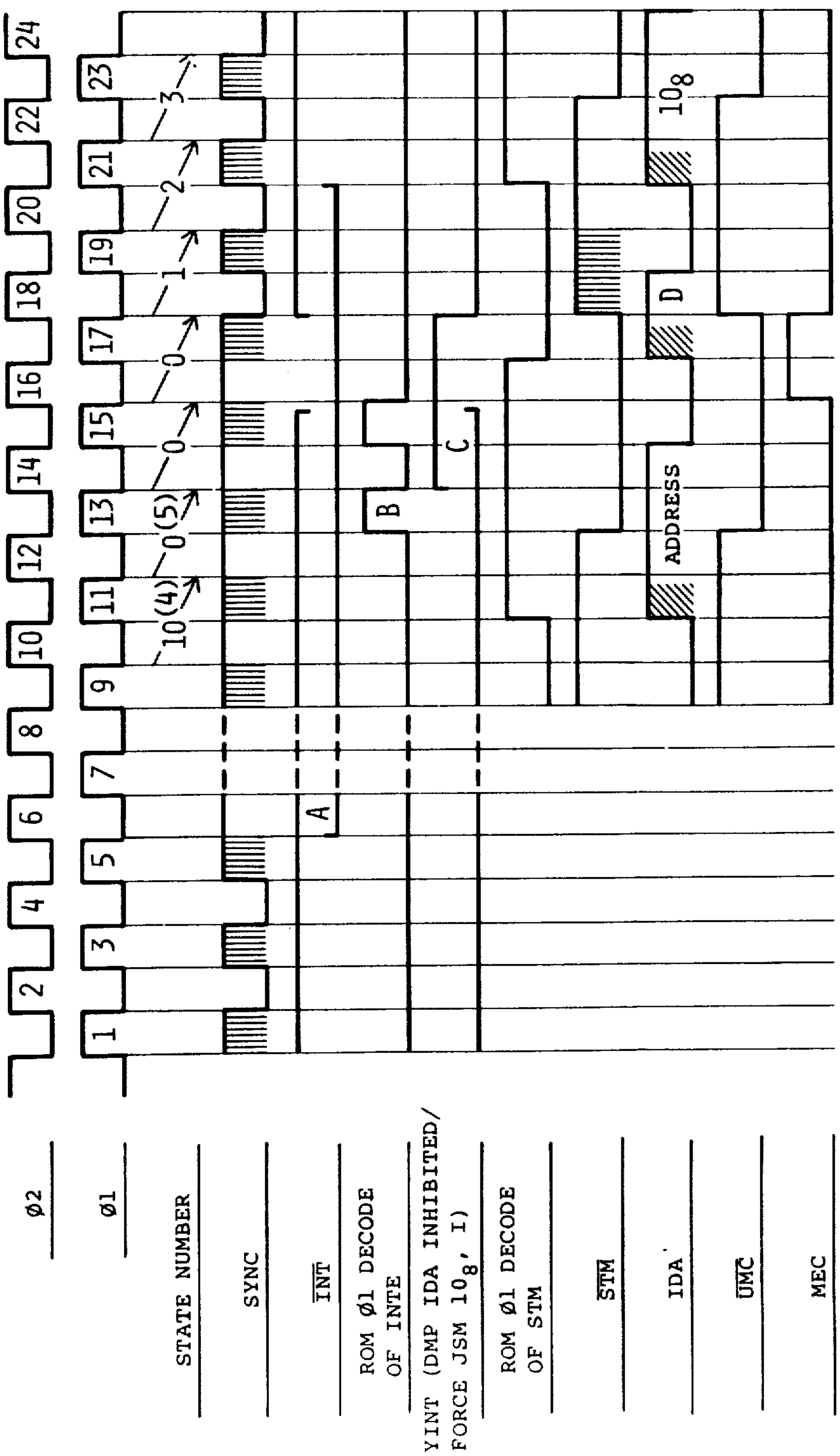

FIGS. 117A–B are a waveform diagram illustrating an interrupt of the BPC during an instruction fetch.

Figure 118:
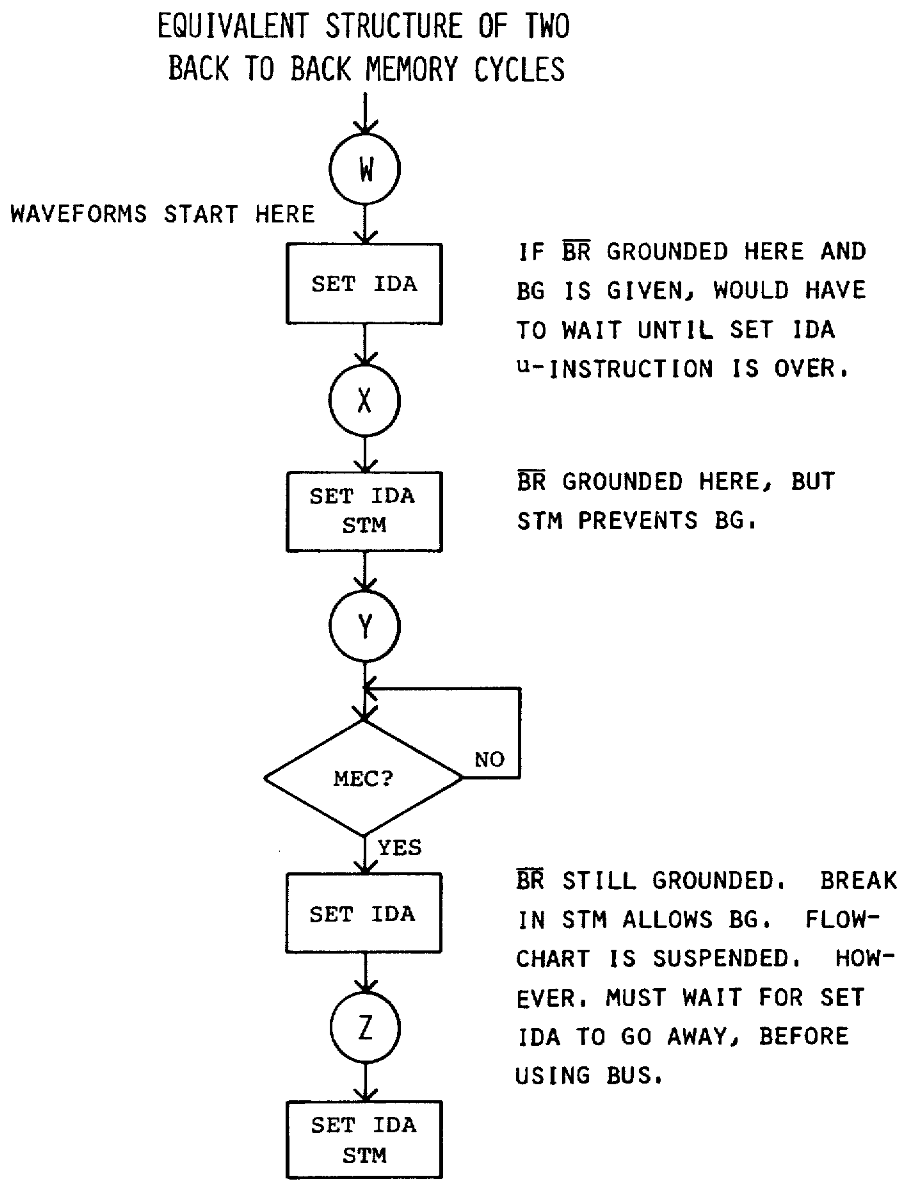

FIG. 118 is a flow chart illustrating the logical relationship between a bus request and a bus grant.

Figure 119A:
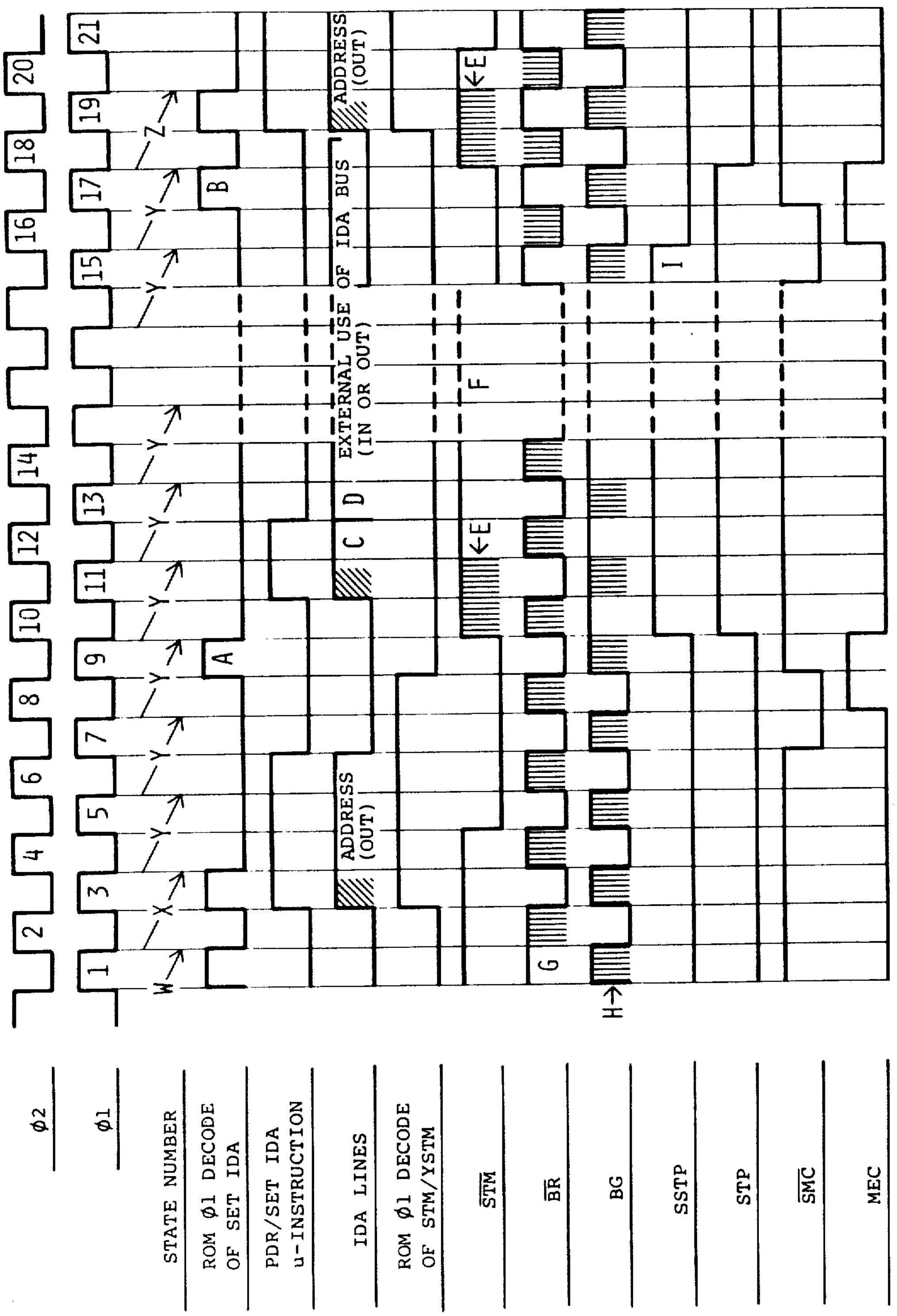

FIGS. 119A–B are a waveform diagram illustrating the timing relationship between a bus request and a bus grant.

Figure 19:
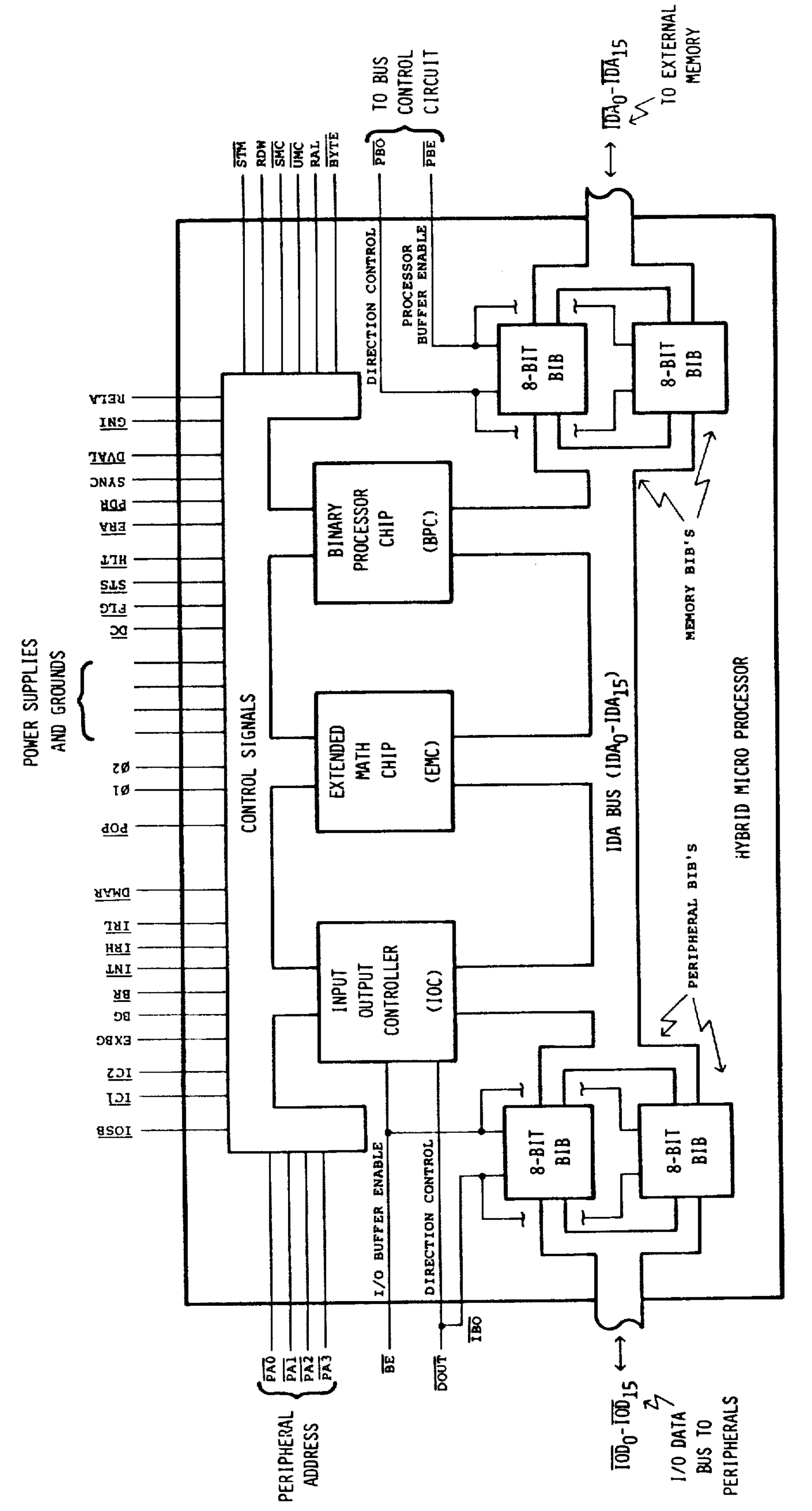
FIG. 19 is a detailed block diagram of the microprocessor of FIG. 16.
Figure 25A:
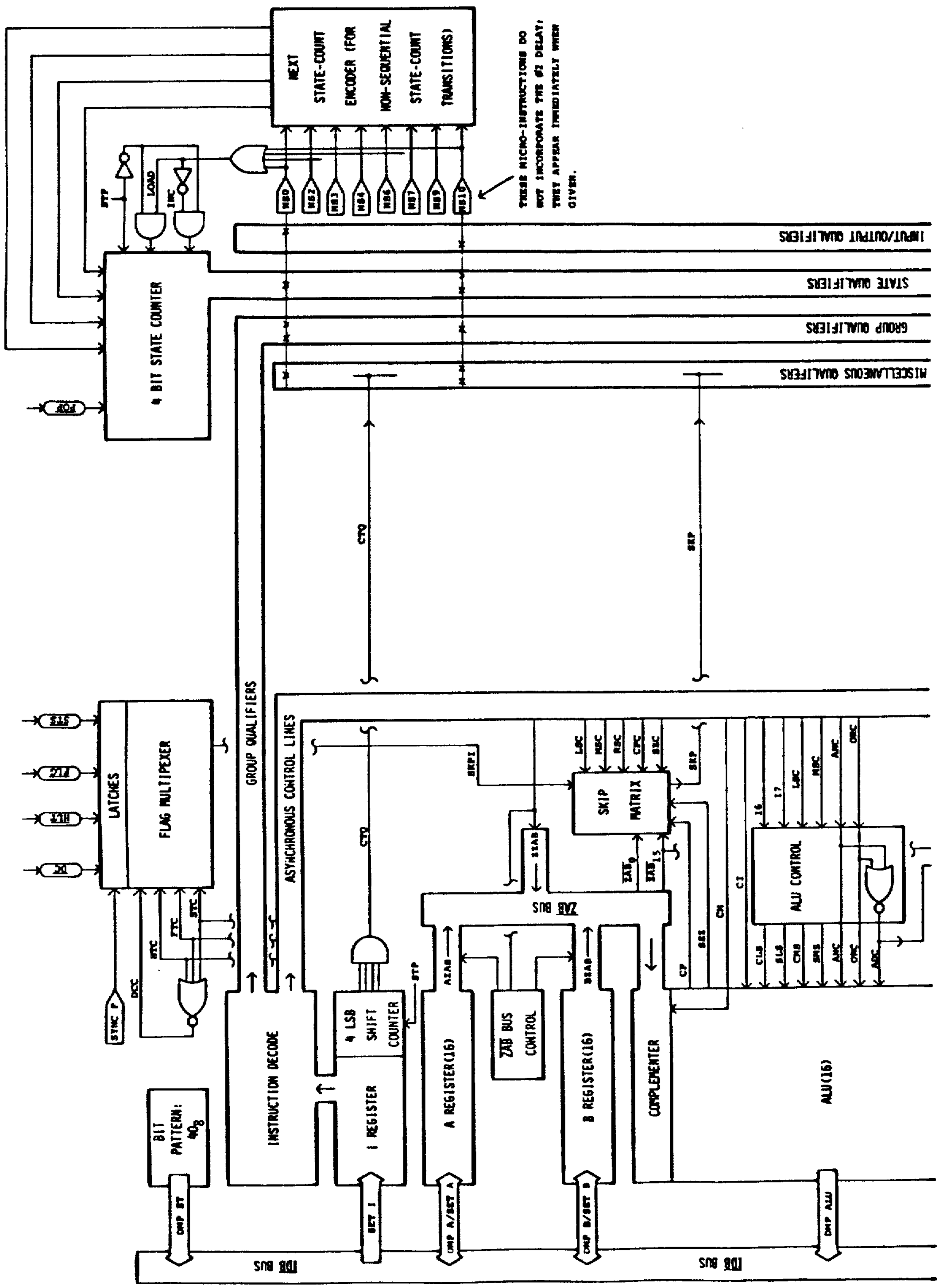
Figure 25B:
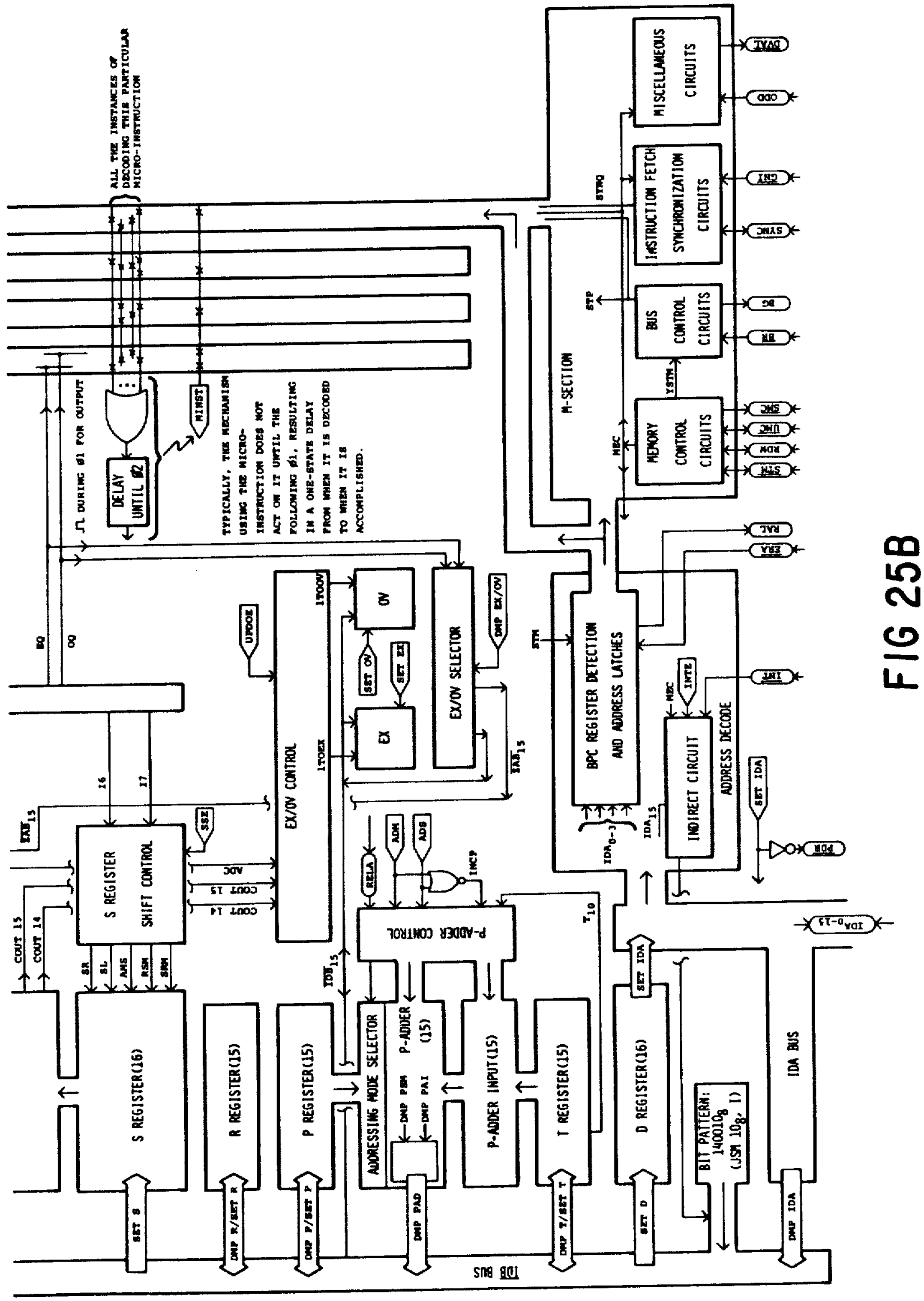
Figure 26:
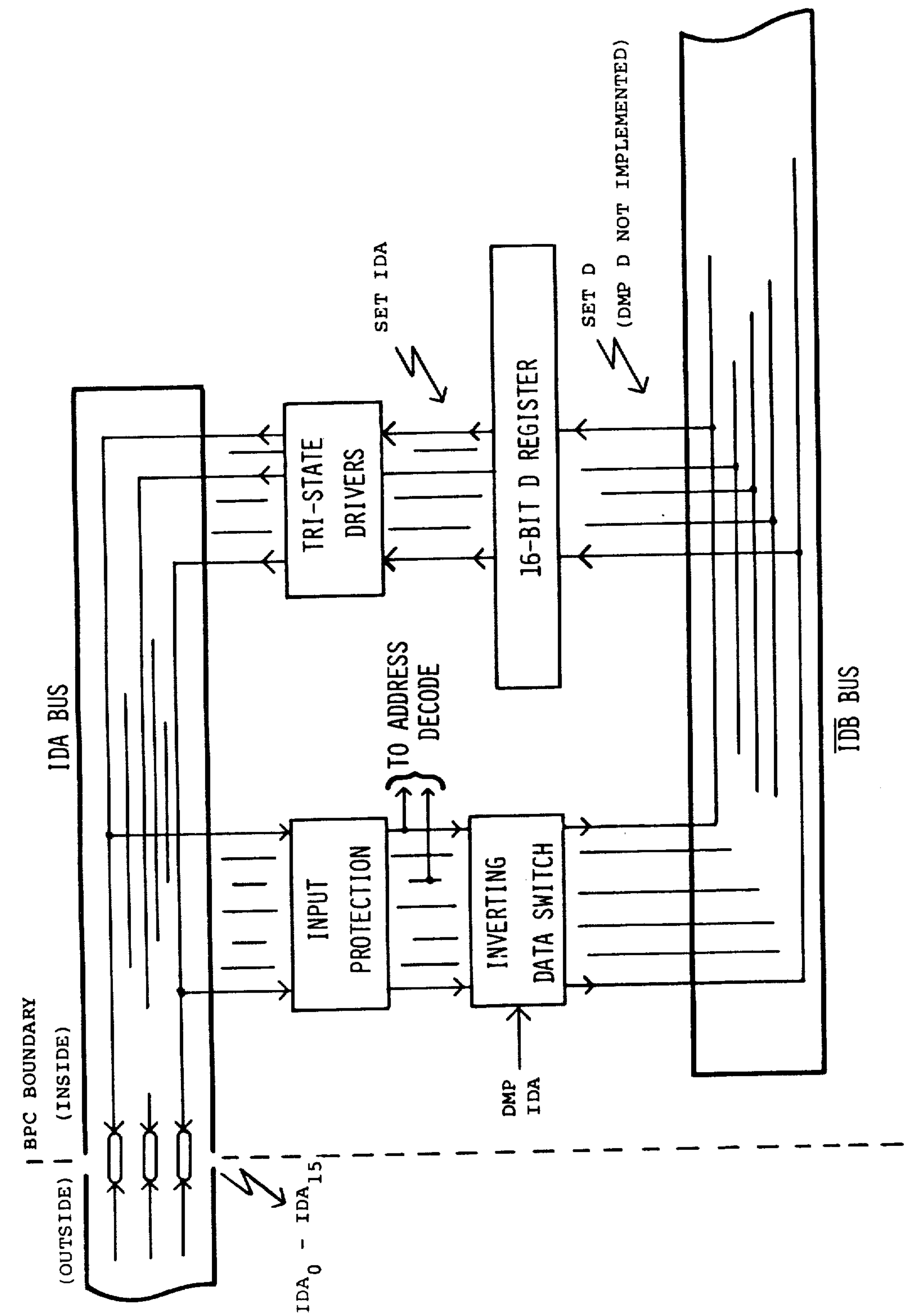
FIG. 26 is a detailed block diagram of the connection between the IDA bus of FIG. 19 and the $\overline{\text{IDB}}$ bus of FIGS. 25A–B.
Figure 27:
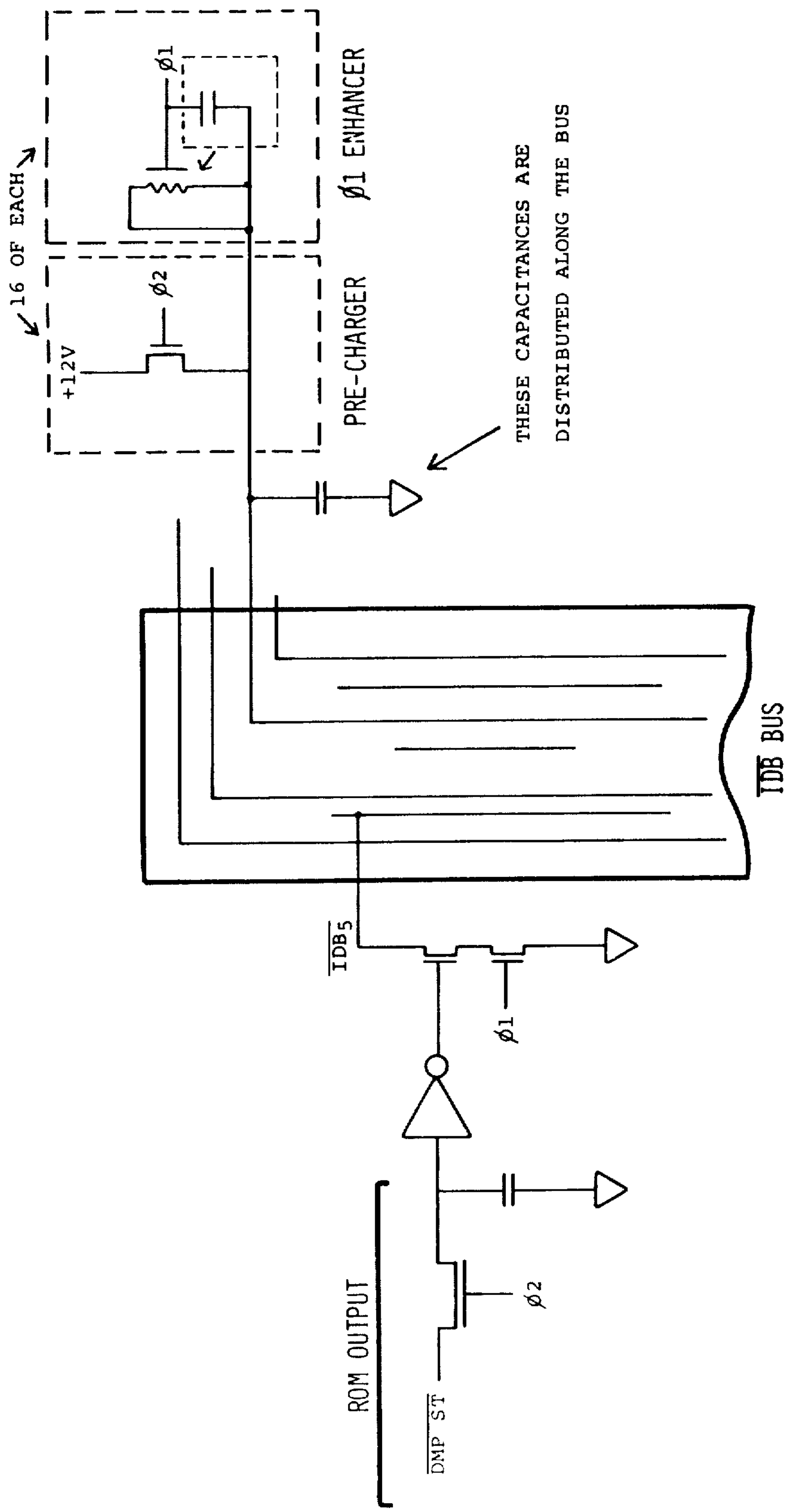
FIG. 27 is a detailed schematic diagram illustrating how the DMP ST microinstruction is placed on the $\overline{\text{IDB}}$ bus of FIGS. 25A–B and illustrating the details of a pre-charger and a Ø1 enhancer associated with the $\overline{\text{IDB}}$ bus.
Figure 28:
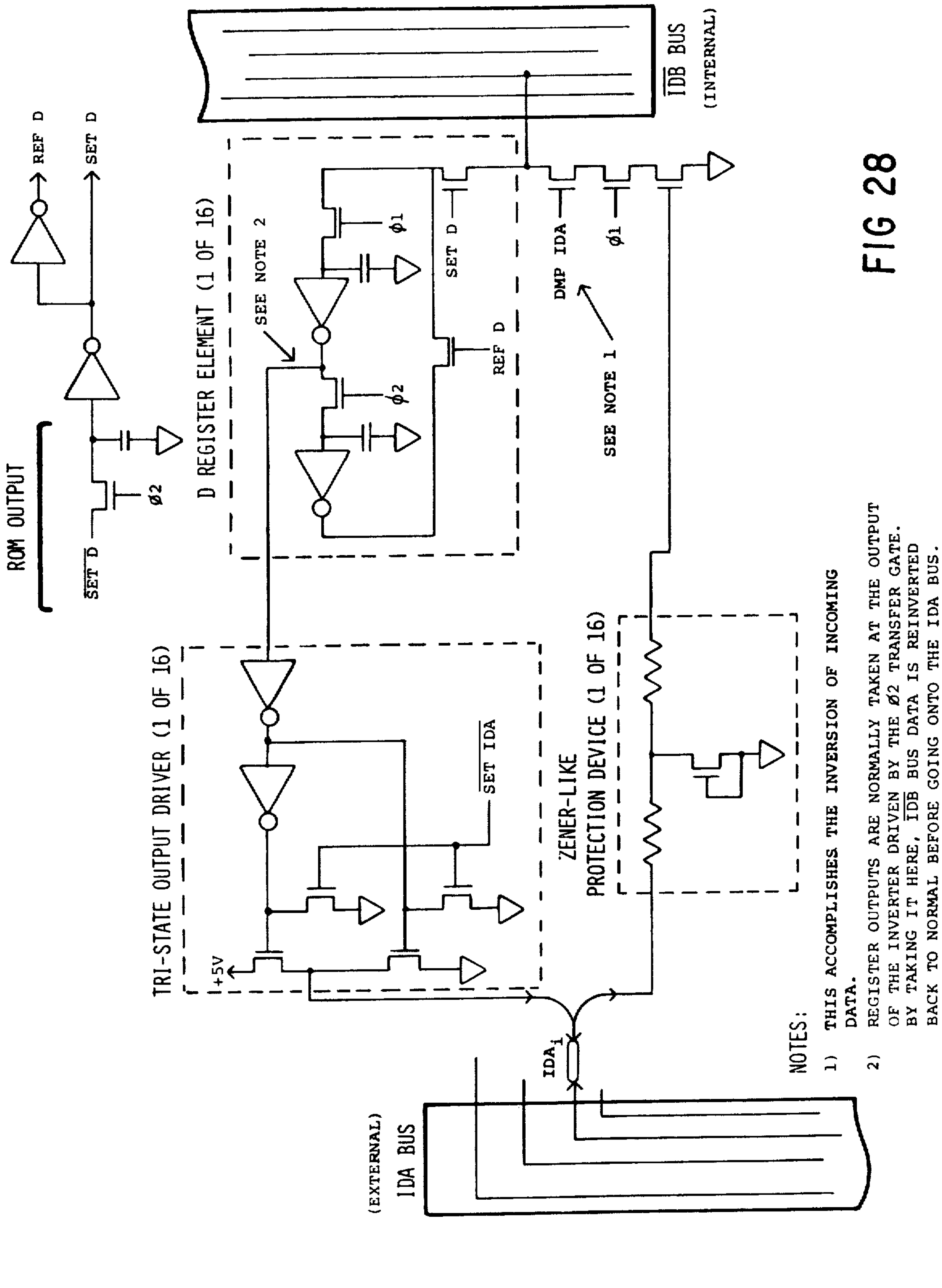
FIG. 28 is a detailed schematic diagram of the D register of FIGS. 25A–B.
Figure 29:
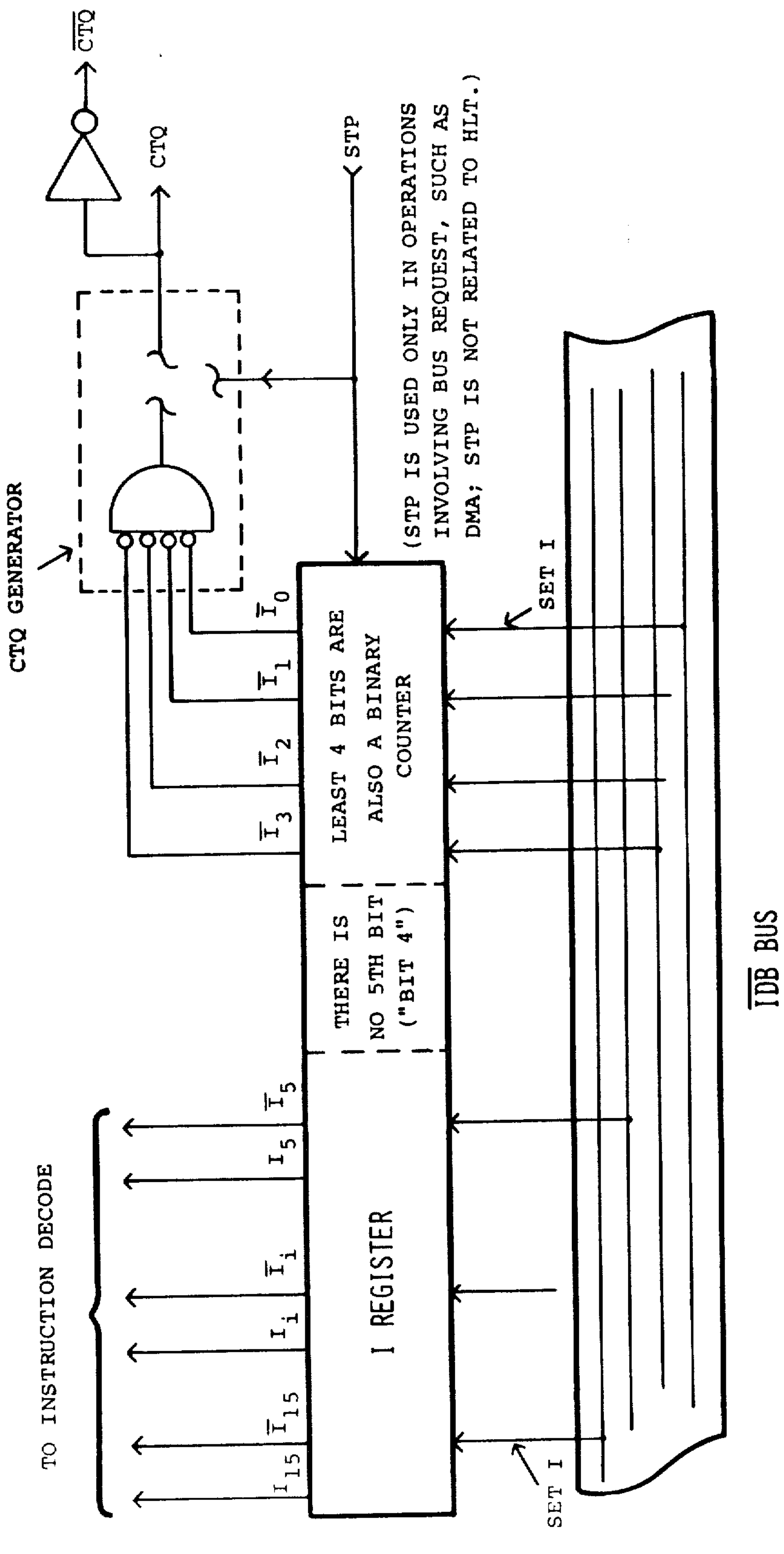
FIG. 29 is a detailed block diagram of the I register of FIGS. 25A–B.
Figure 30:
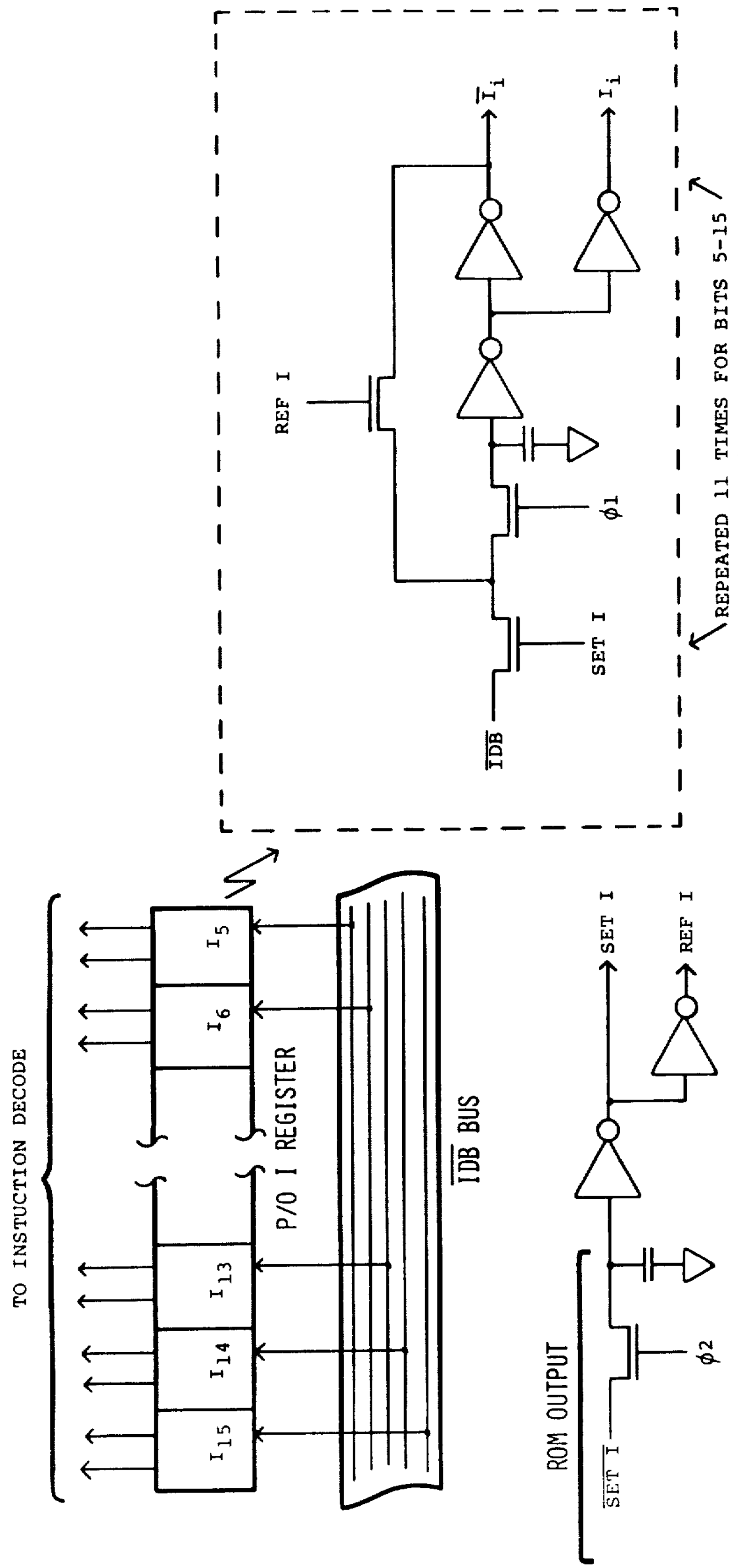
FIG. 30 is a detailed schematic diagram of the upper twelve bits of the I register of FIG. 29.
Figure 31:
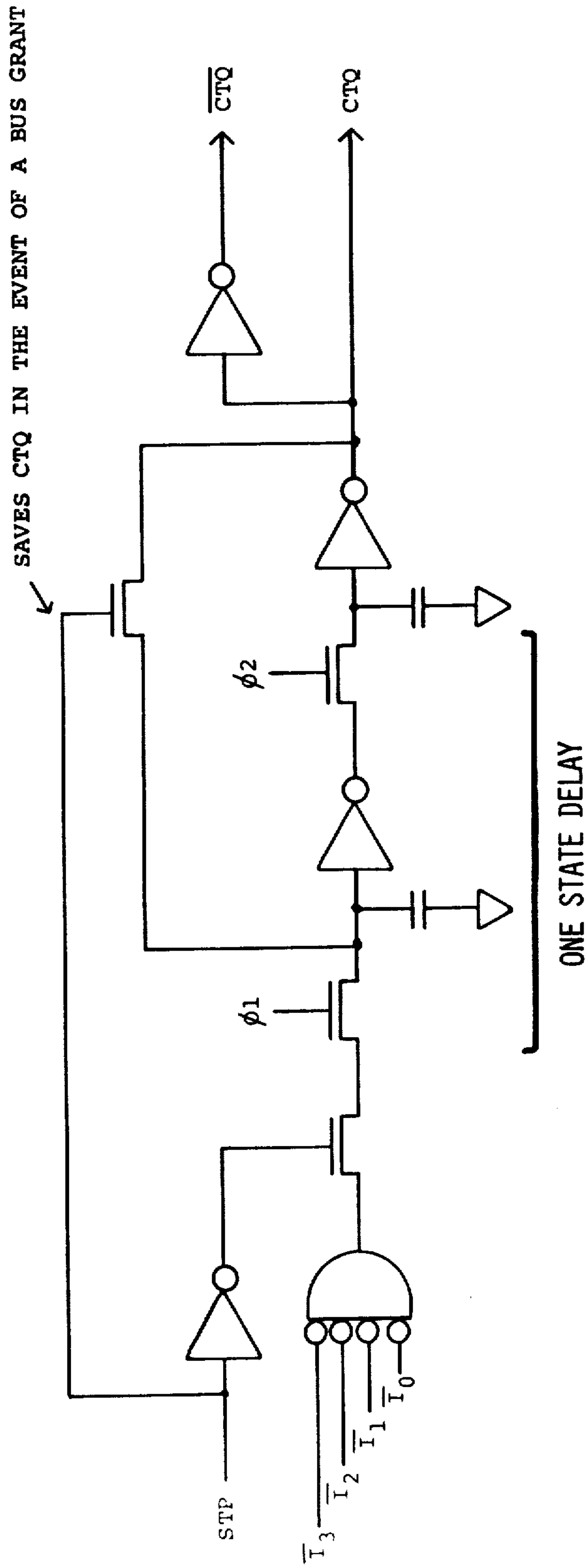
FIG. 31 is a detailed schematic diagram of the CTQ generator of FIG. 29.
Figure 32:
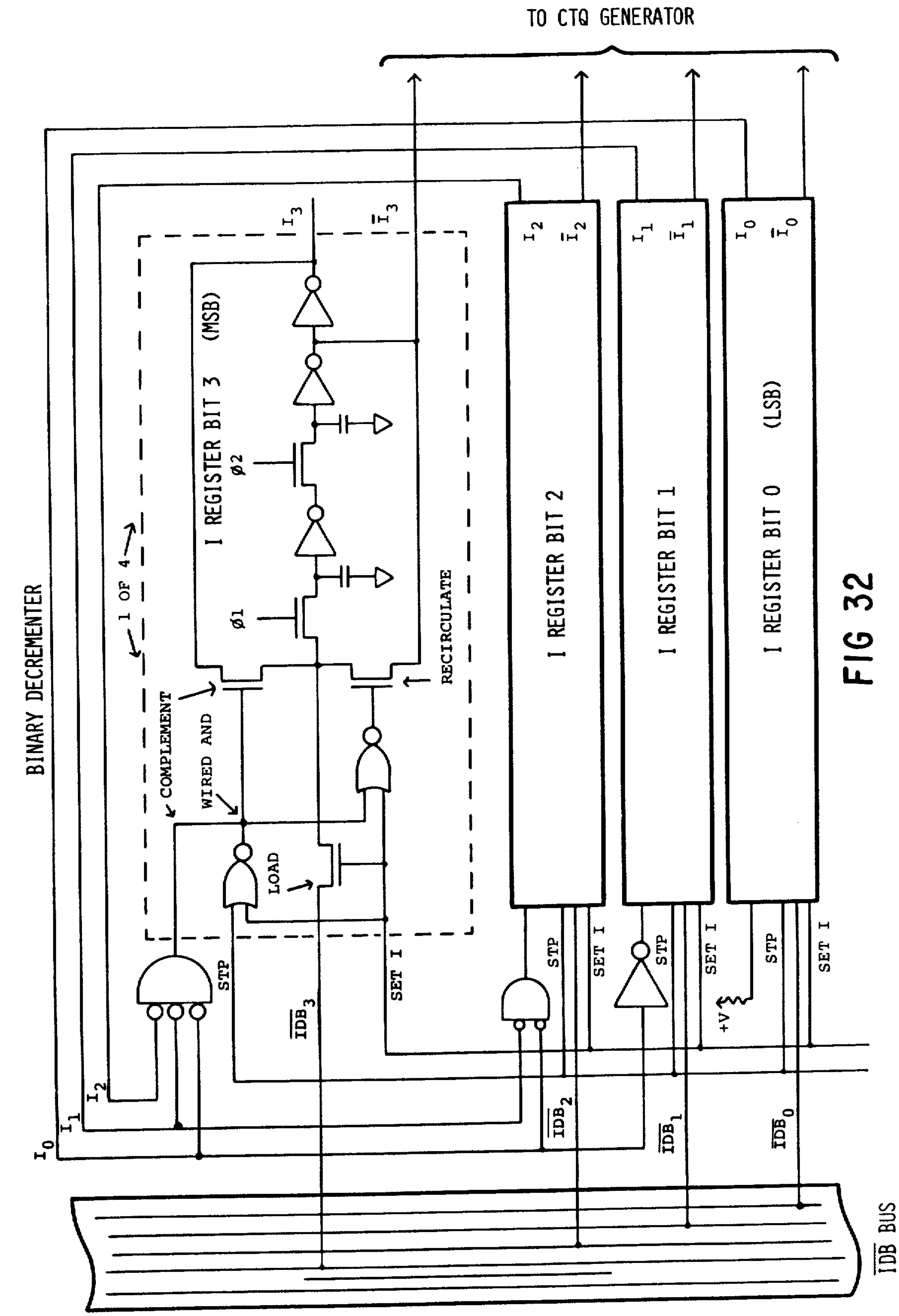
FIG. 32 is a detailed schematic diagram of the lower four bits of the I register of FIG. 29.
Figure 33:
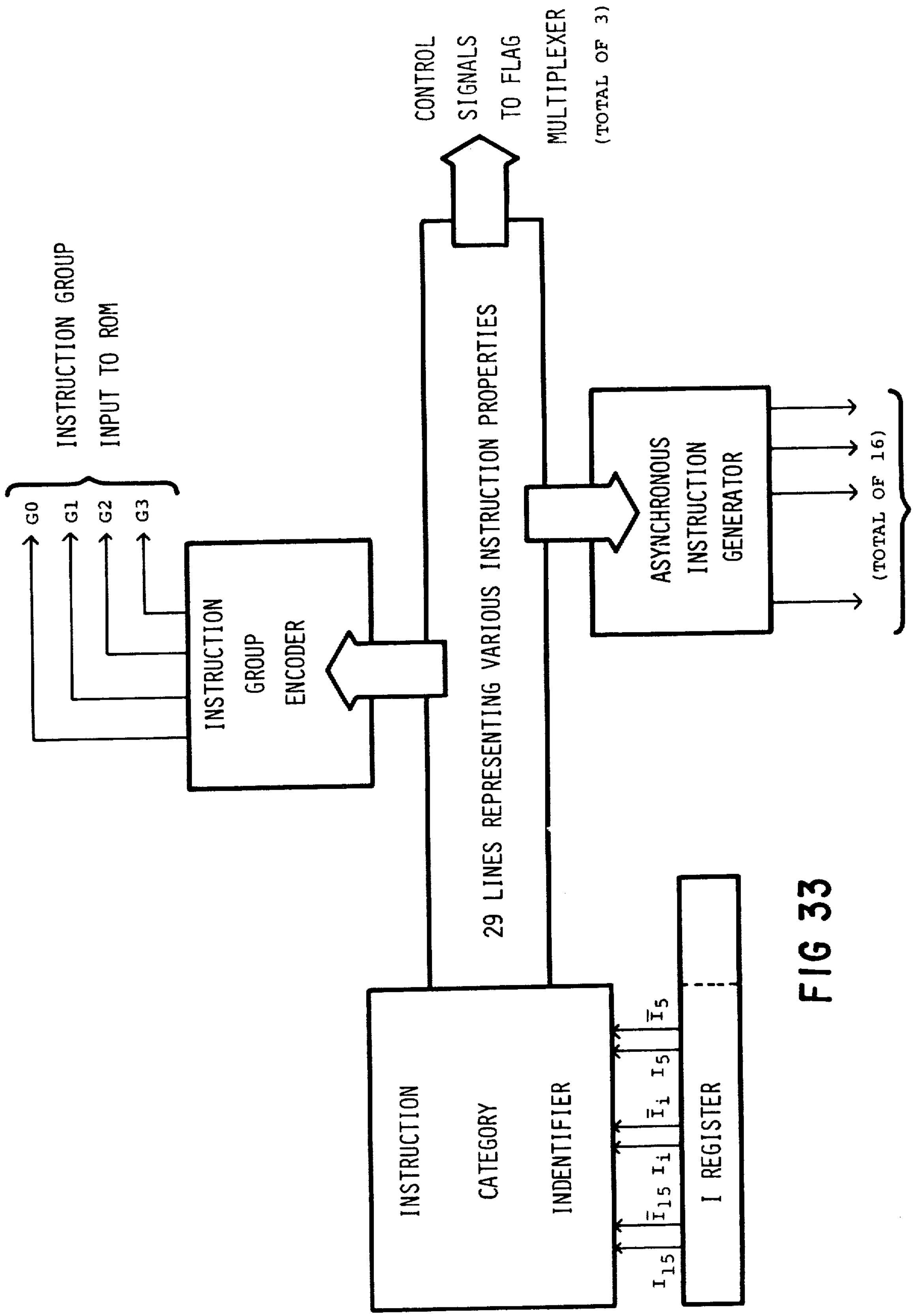
FIG. 33 is a detailed block diagram of the instruction decode block of FIGS. 25A–B.
Figure 35B:
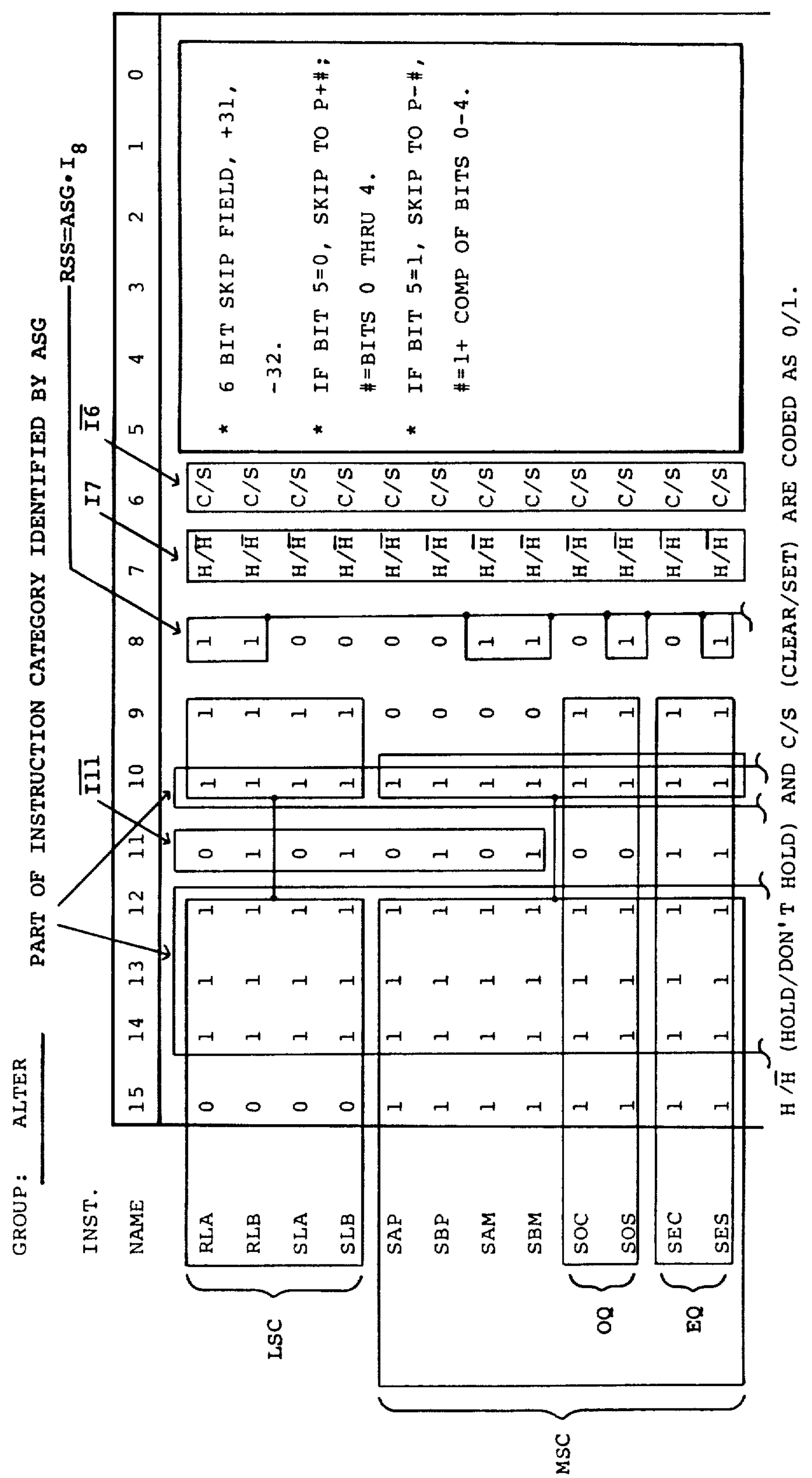
Figure 35C:
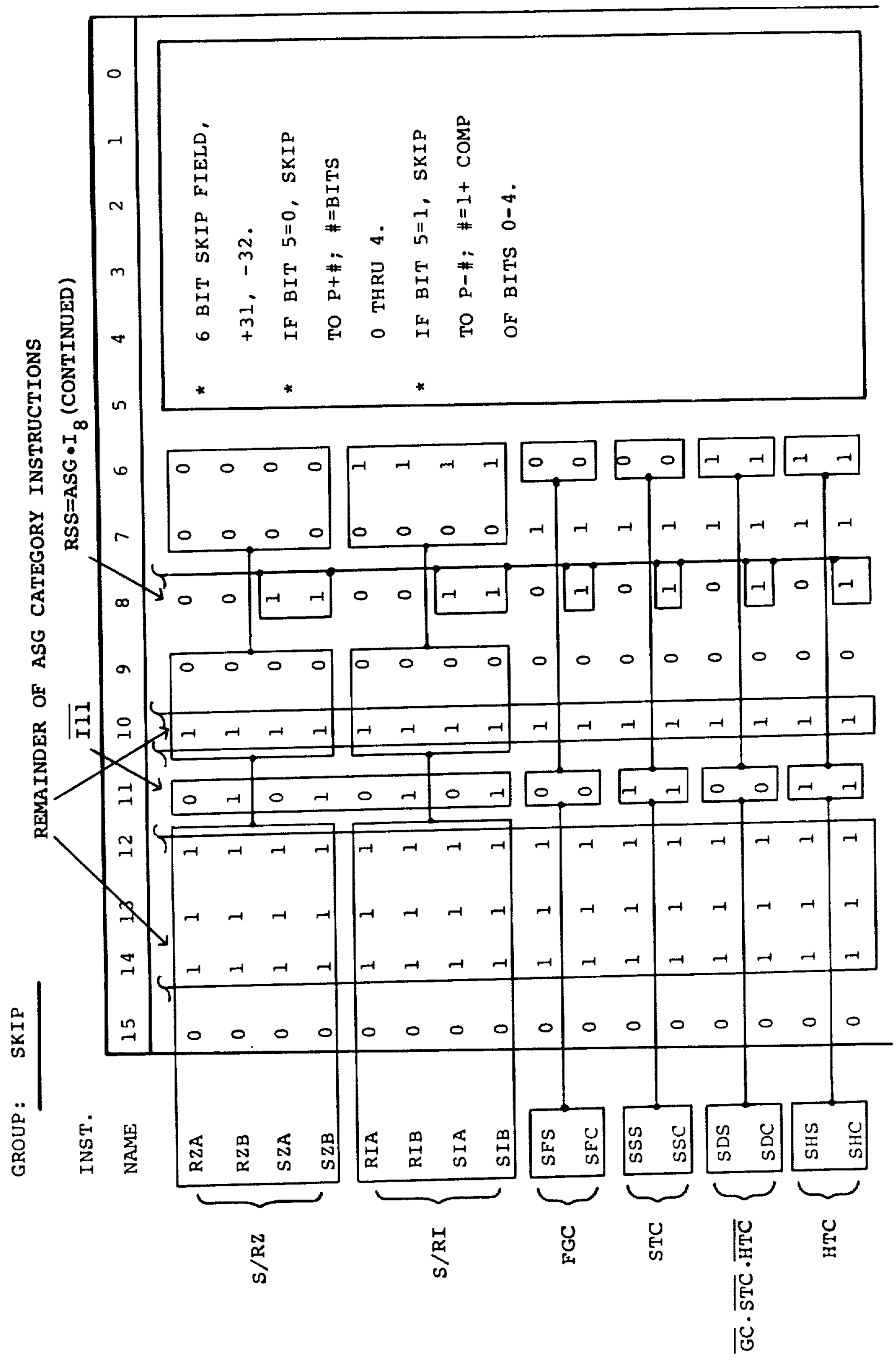
Figure 37:
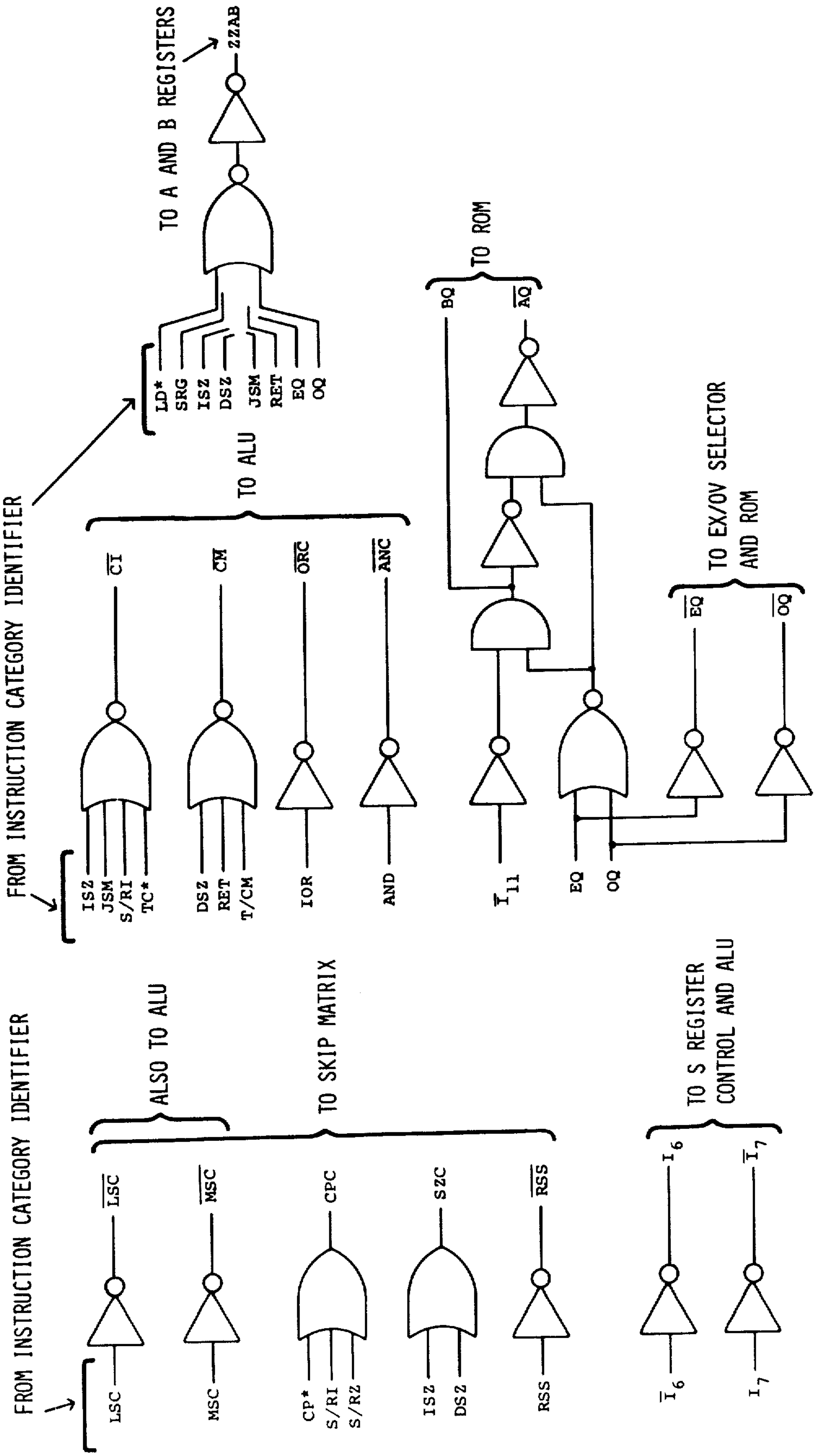
FIG. 37 is a detailed schematic diagram of the asynchronous instruction generator of FIG. 33.
Figure 38:
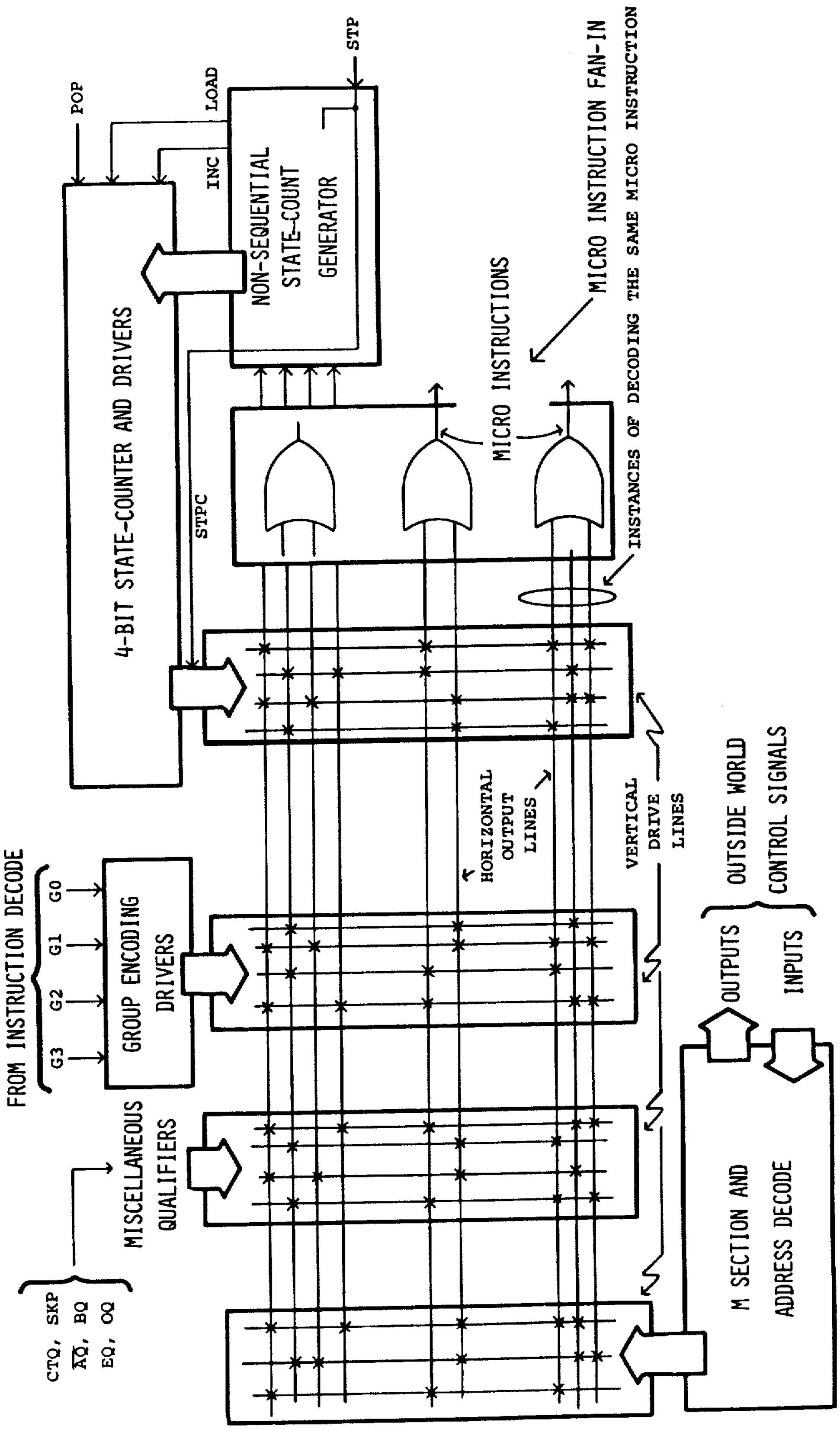
FIG. 38 is a detailed block diagram of the control ROM included within the BPC of FIGS. 25A–B.
Figure 39:
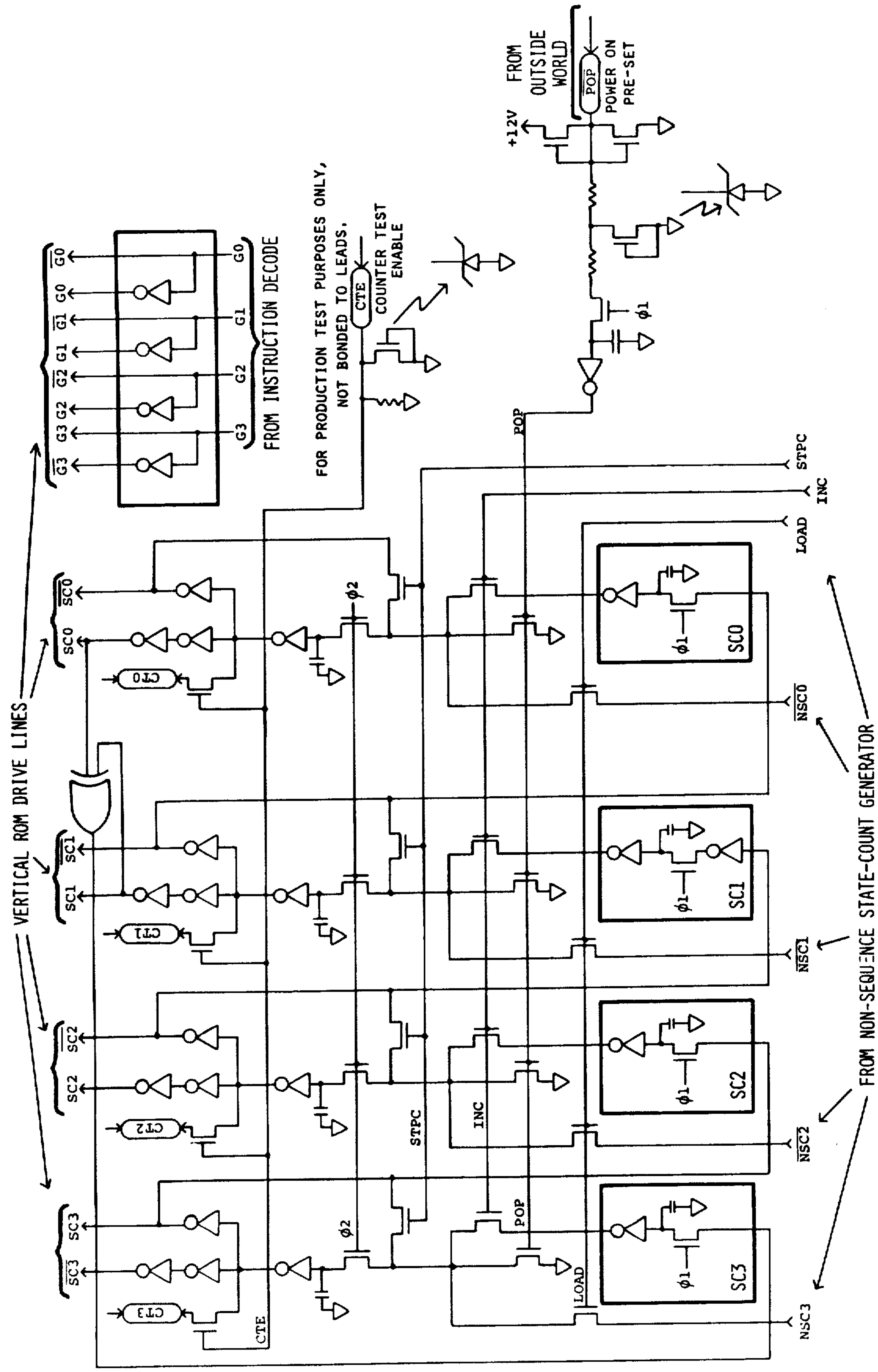
FIG. 39 is a detailed schematic diagram of the 4-bit state counter and drivers of FIG. 38.
Figure 40:
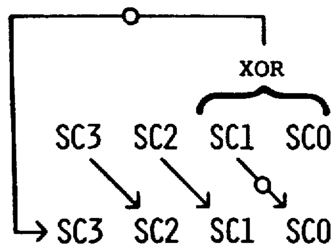
FIG. 40 is a diagram illustrating the natural state sequence of the state counter of FIG. 38.
Figure 41:
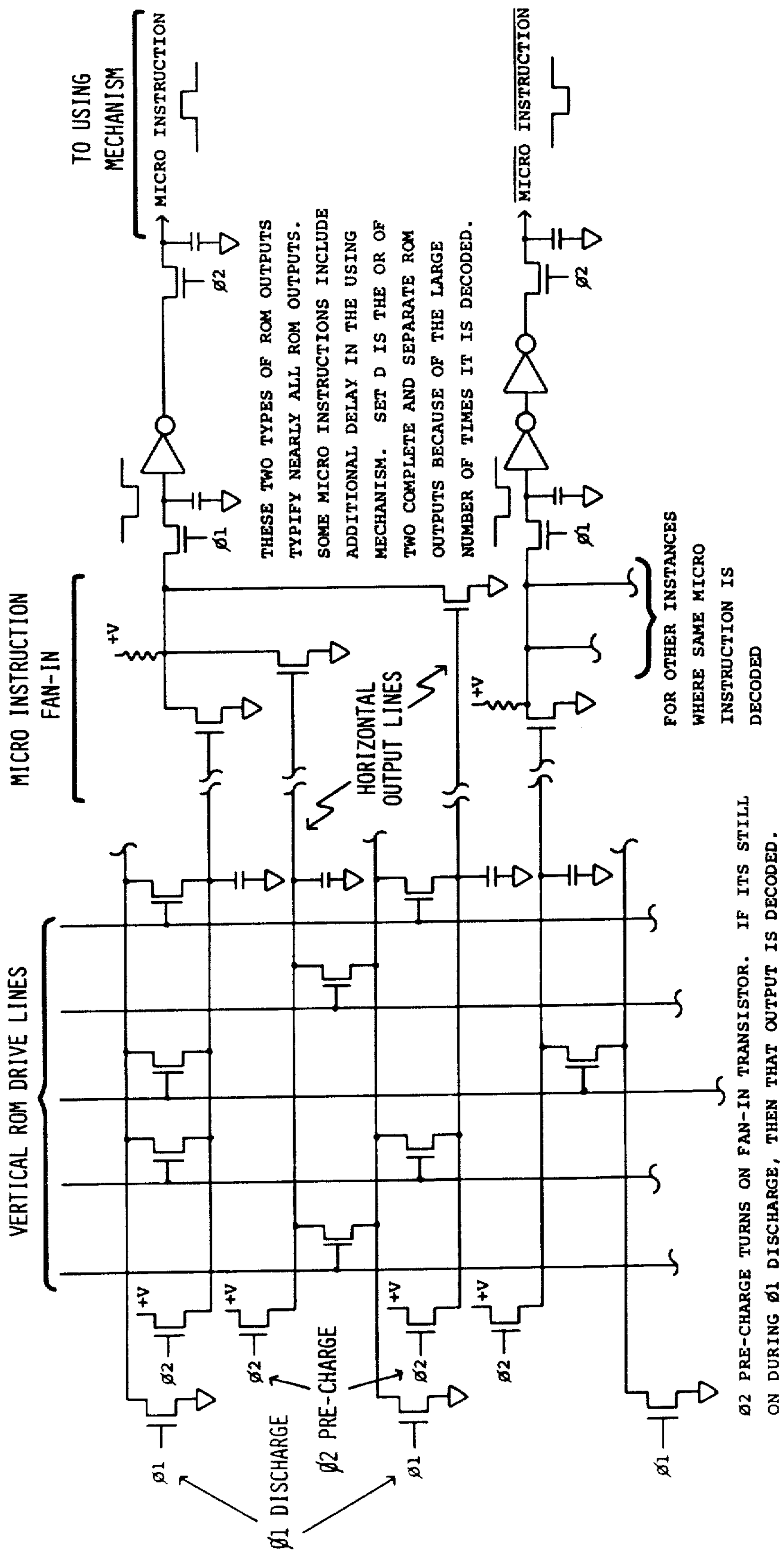
FIG. 41 is a detailed schematic diagram of the microinstruction decoding circuitry of FIG. 38.
Figure 42:
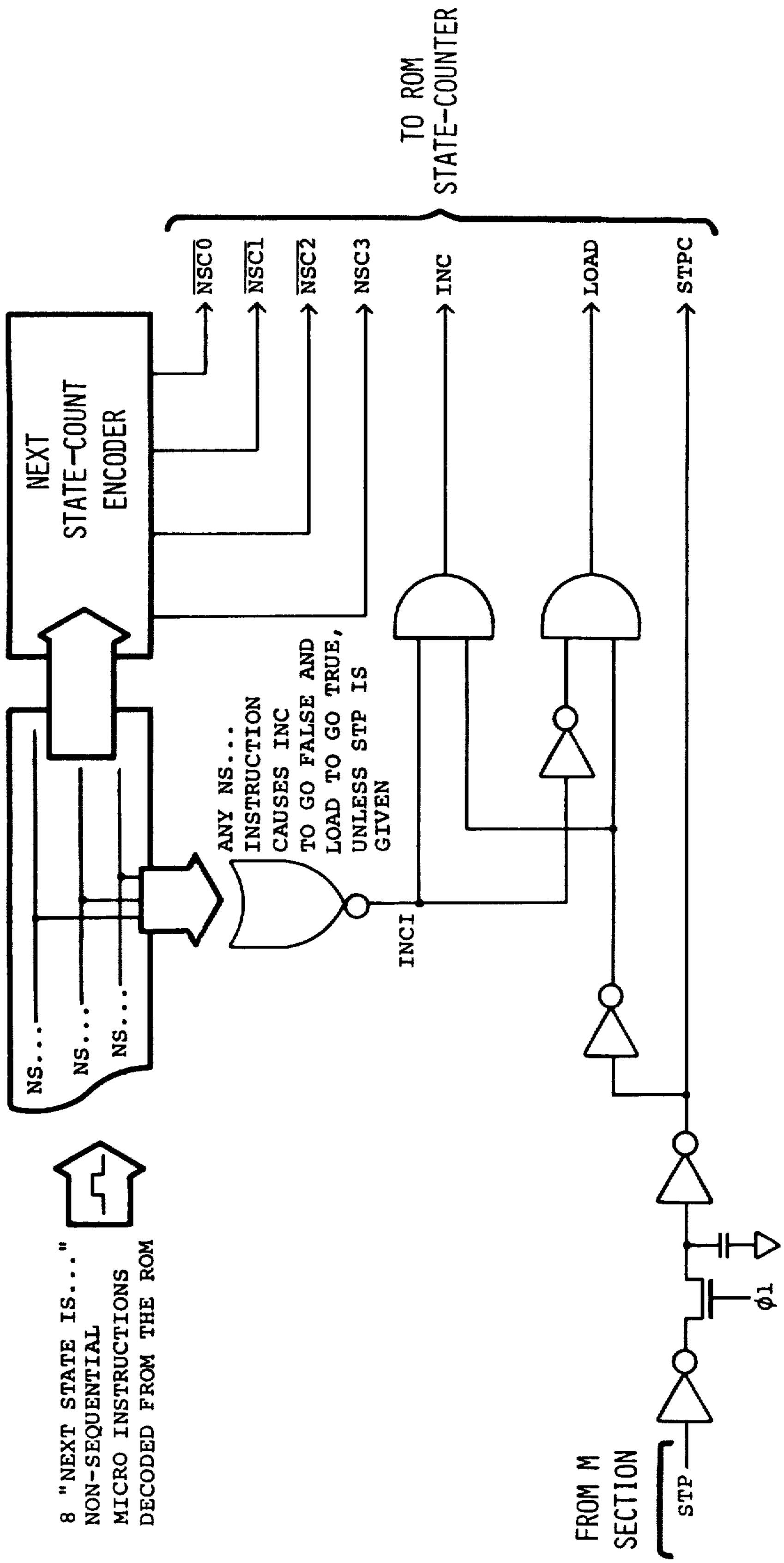
FIG. 42 is a detailed schematic diagram of the non-sequential state-count generator of FIG. 38.
Figure 44:
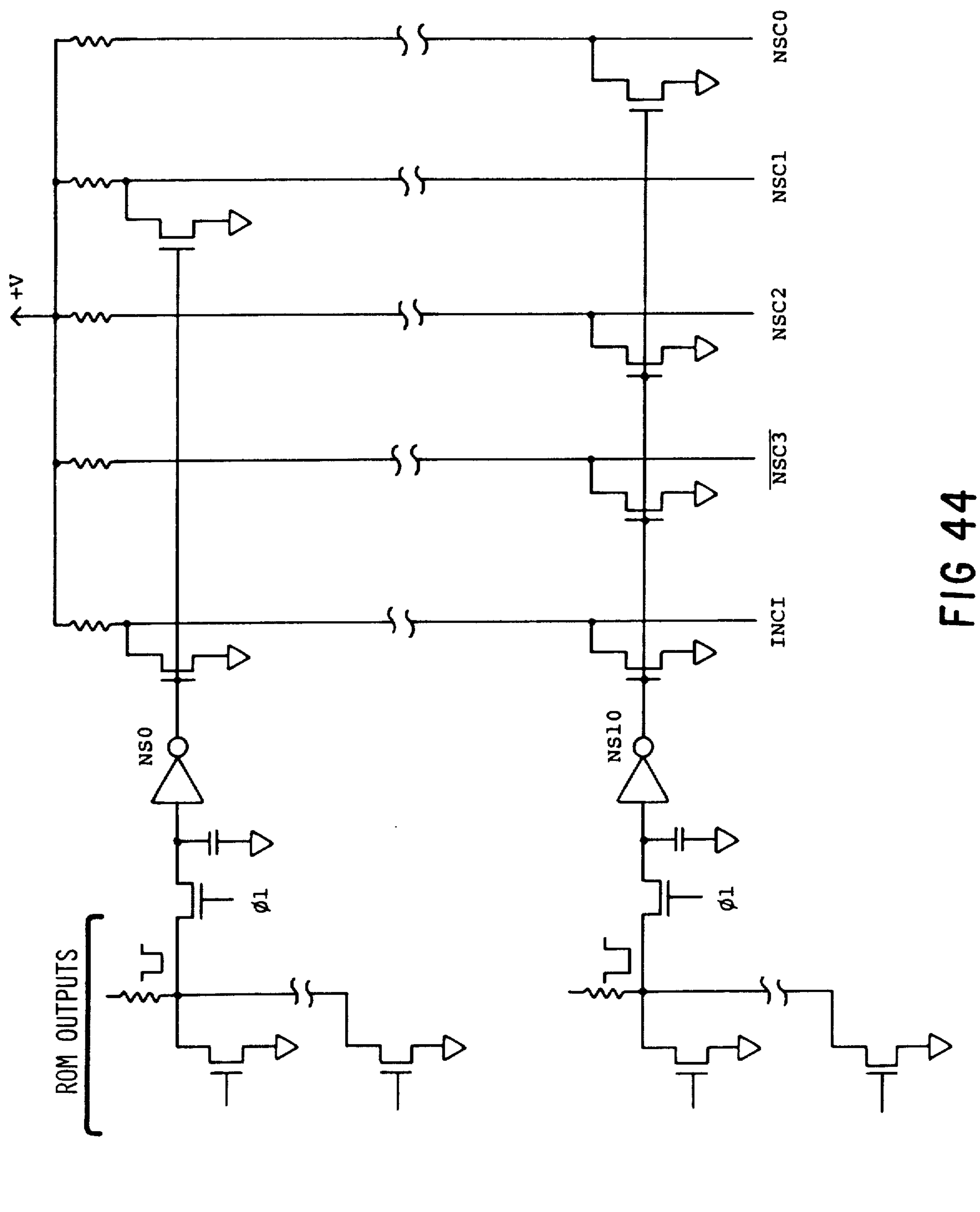
FIG. 44 is a detailed schematic diagram of the next state-count encoder of FIG. 42.
Figures 45A, 45B, 45C:
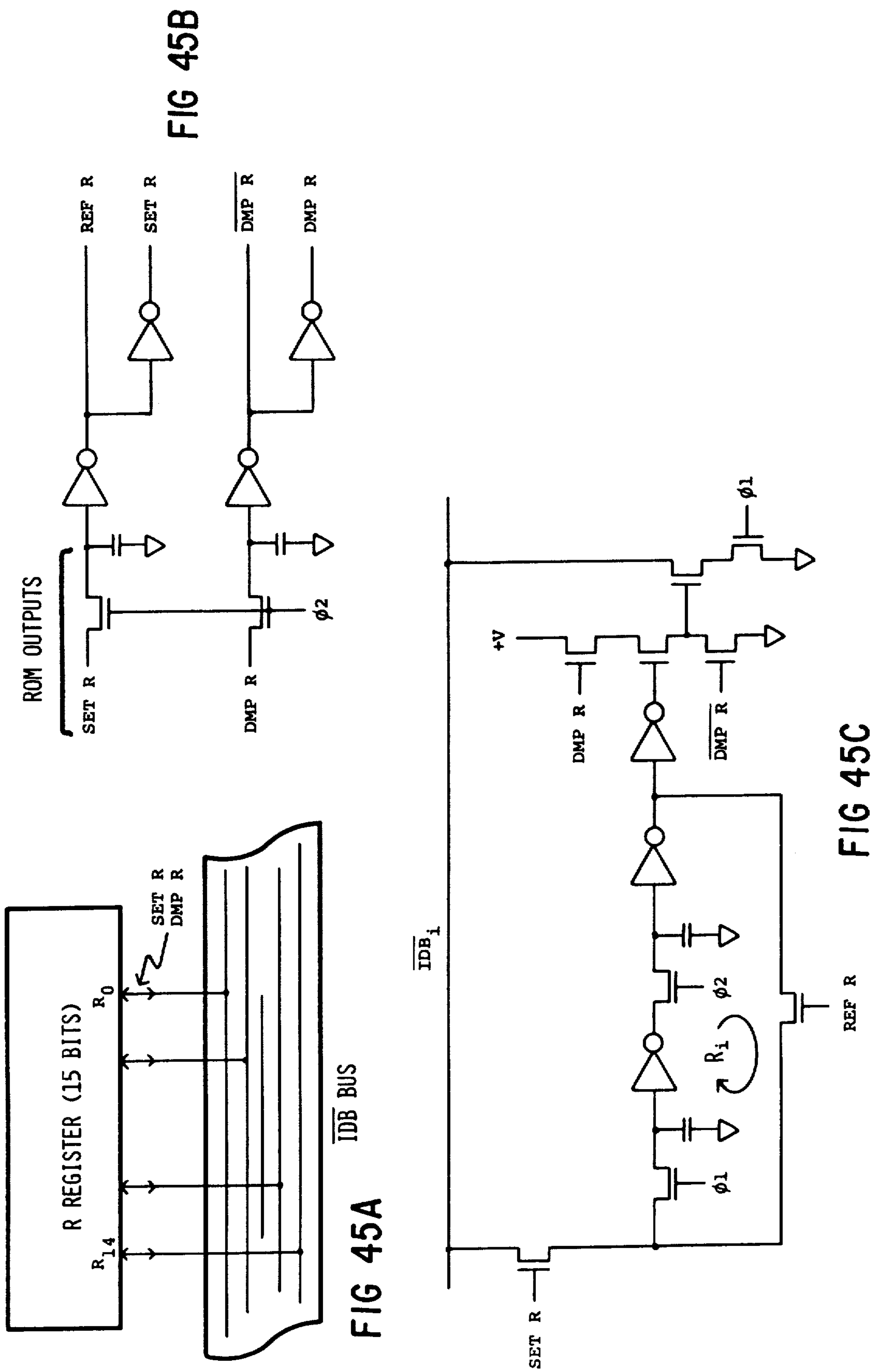
FIG. 45A is a detailed block diagram of the R register of FIG. 24A–B.
FIG. 45B is a detailed schematic diagram showing the origin of various signals employed by the R register of FIG. 45A.
FIG. 45C is a detailed schematic diagram of one of the bits of the R register of FIG. 45A.
Figure 46B:
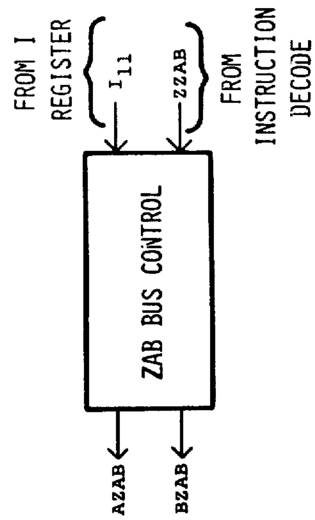
FIG. 46B is a detailed block diagram of the ZAB bus control of FIGS. 25A–B.
Figure 46A:
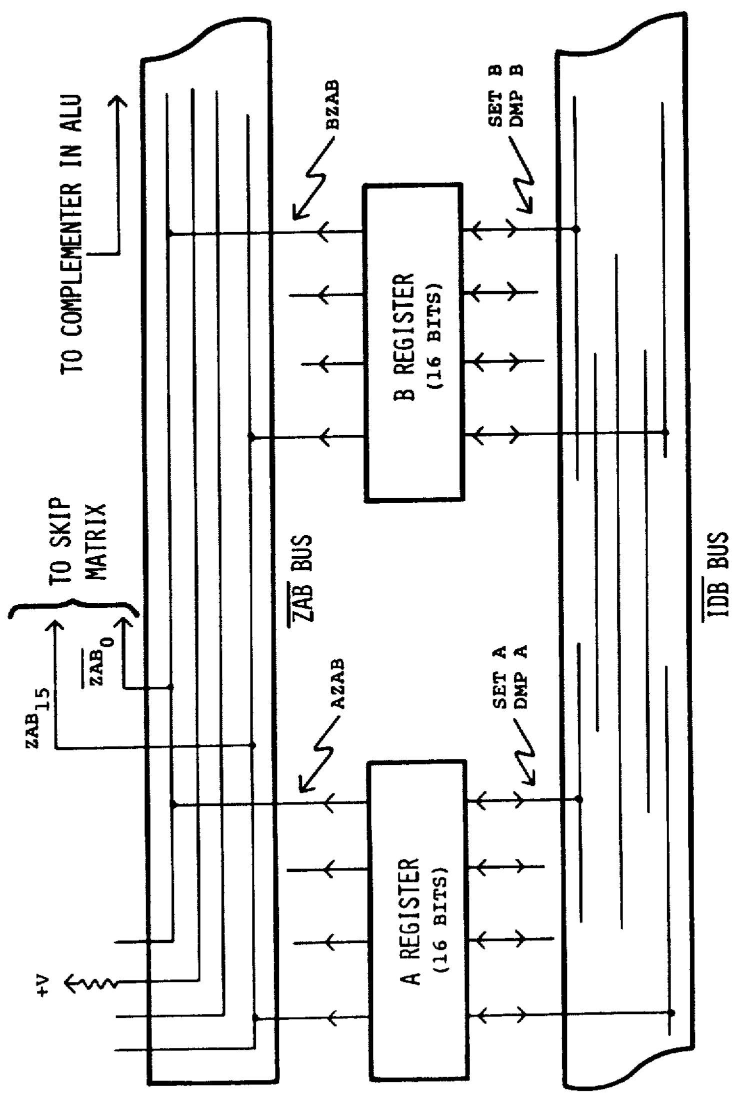
FIG. 46A is a detailed block diagram of the A and B registers of FIGS. 25A–B.
Figure 47B:
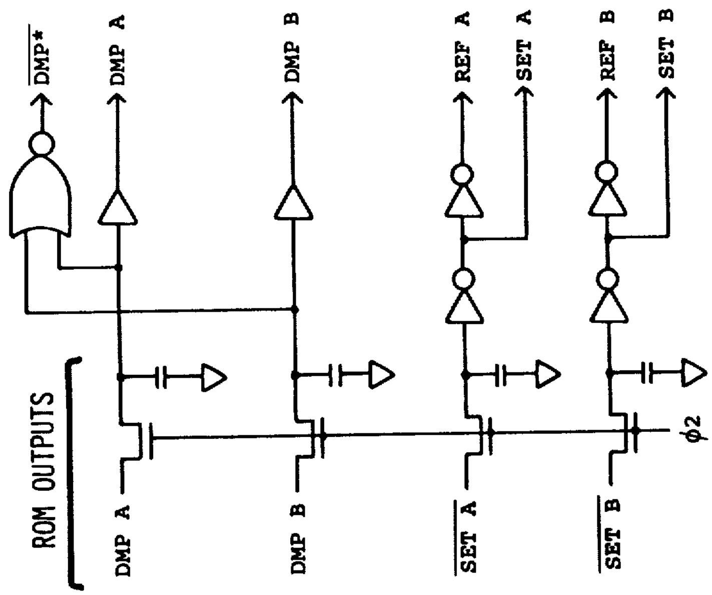
FIG. 47A is a detailed schematic diagram of one of the bits of each of the A and B registers of FIG. 46A.
Figure 47A:
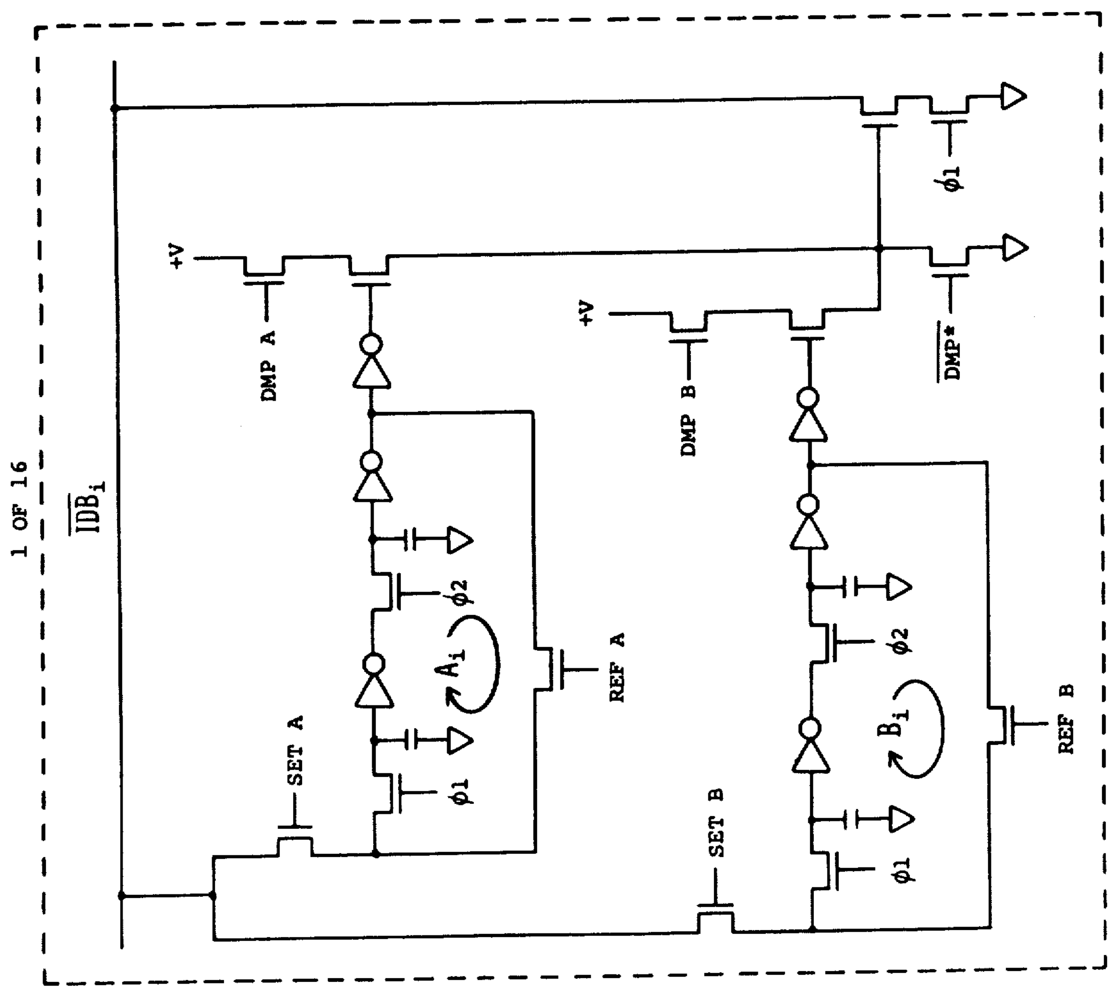
Figure 48:
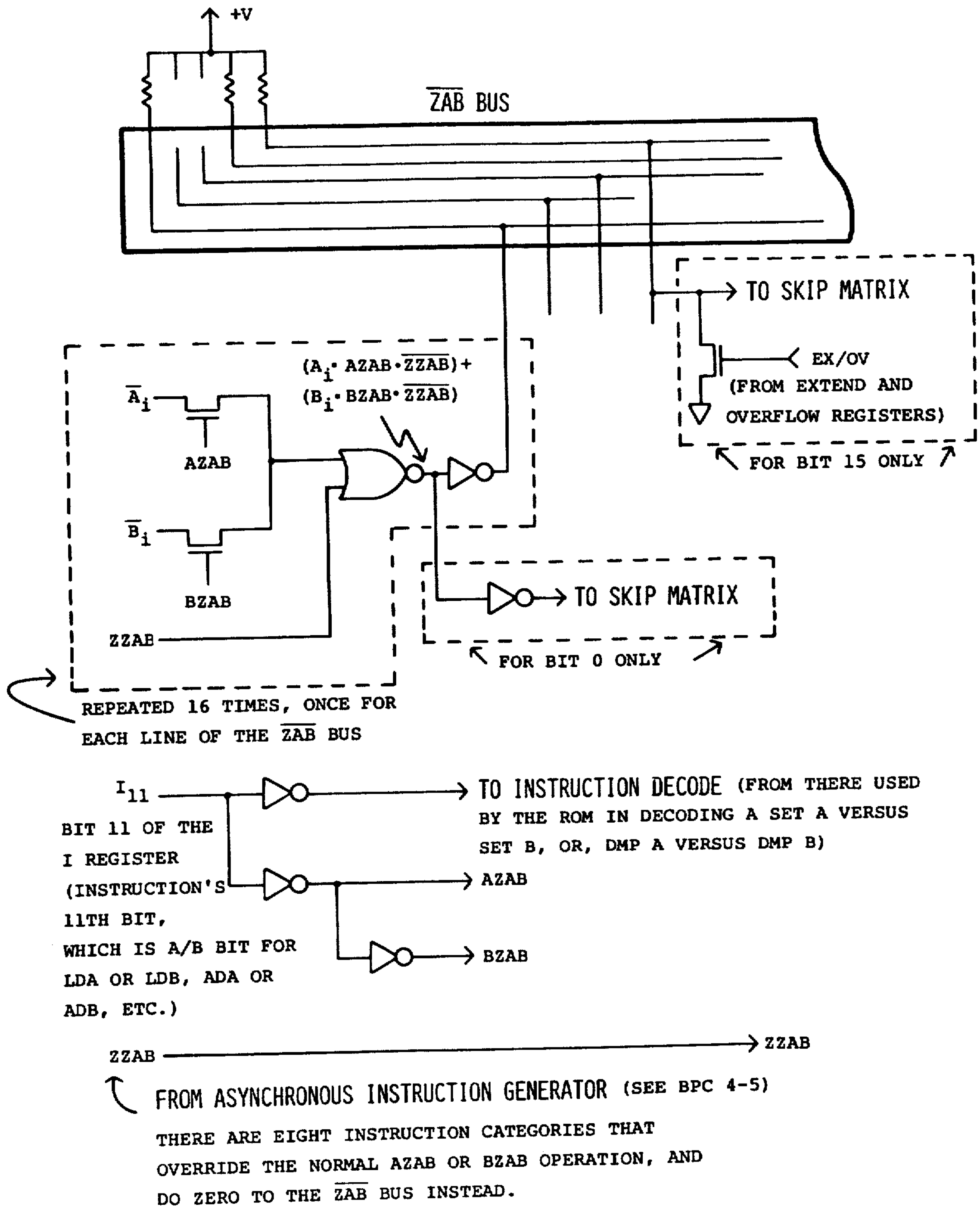
FIG. 48 is a detailed schematic diagram of the $\overline{ZAB}$ bus and the $\overline{ZAB}$ bus control block of FIGS. 25A–B.

FIGS. 120A–E are a tabular representation of the contents of the read-only memory portion of the BPC of FIGS. 19 and 25A–B.

Figure 121:
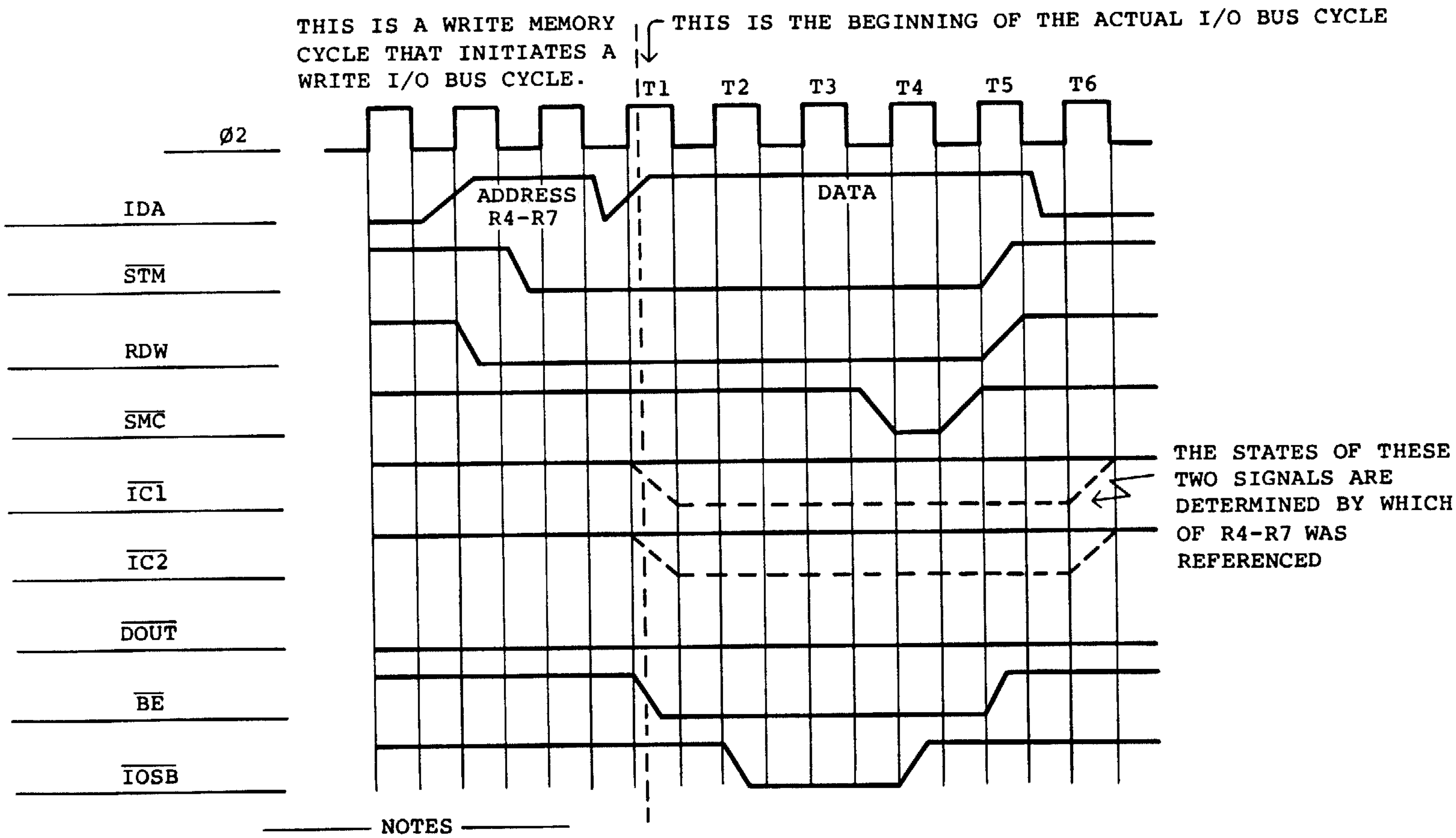

FIG. 121 is a waveform diagram illustrating a write I/O bus cycle.

Figure 122:
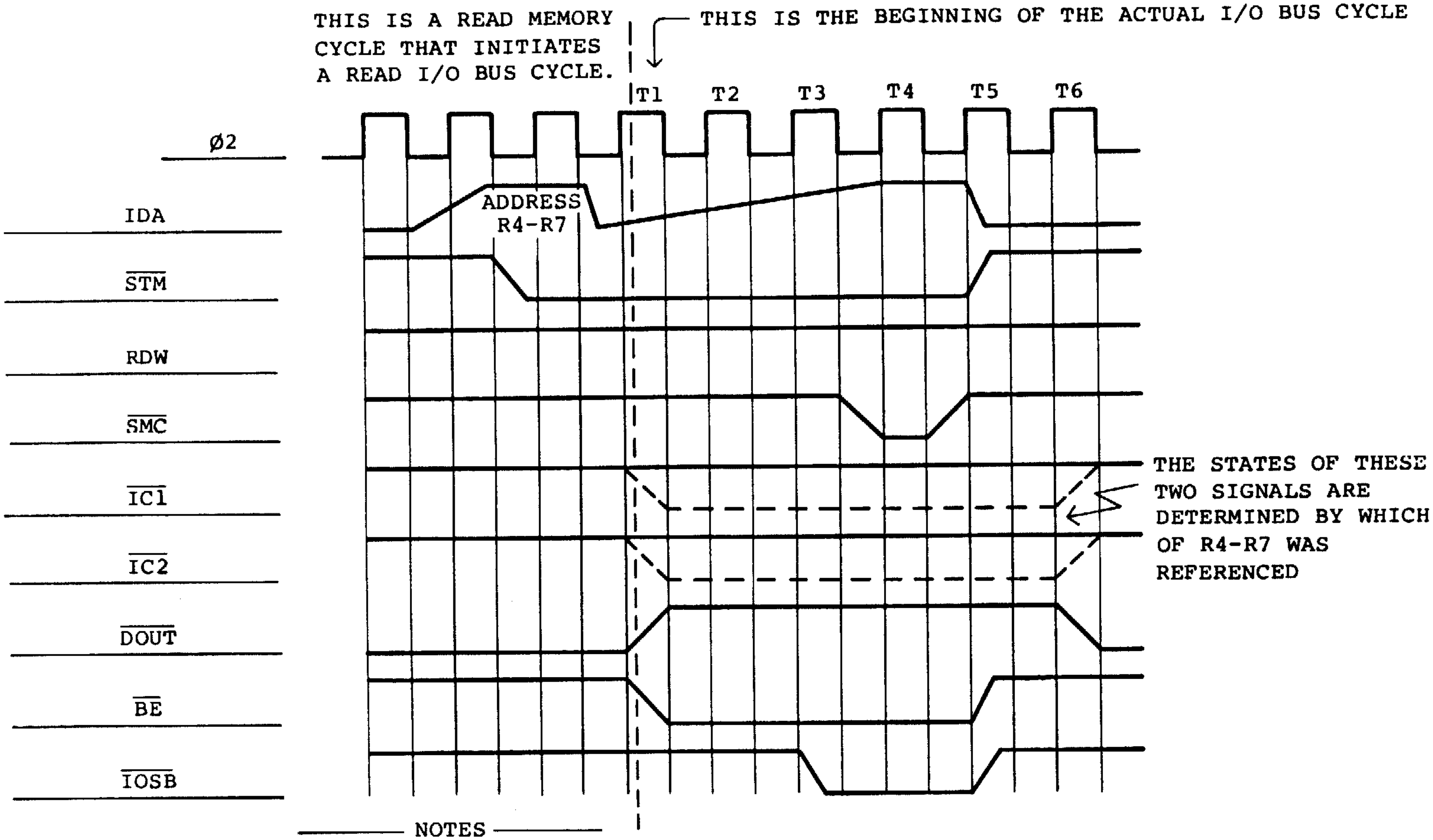

FIG. 122 is a waveform diagram illustrating a read I/O bus cycle.

Figure 123:
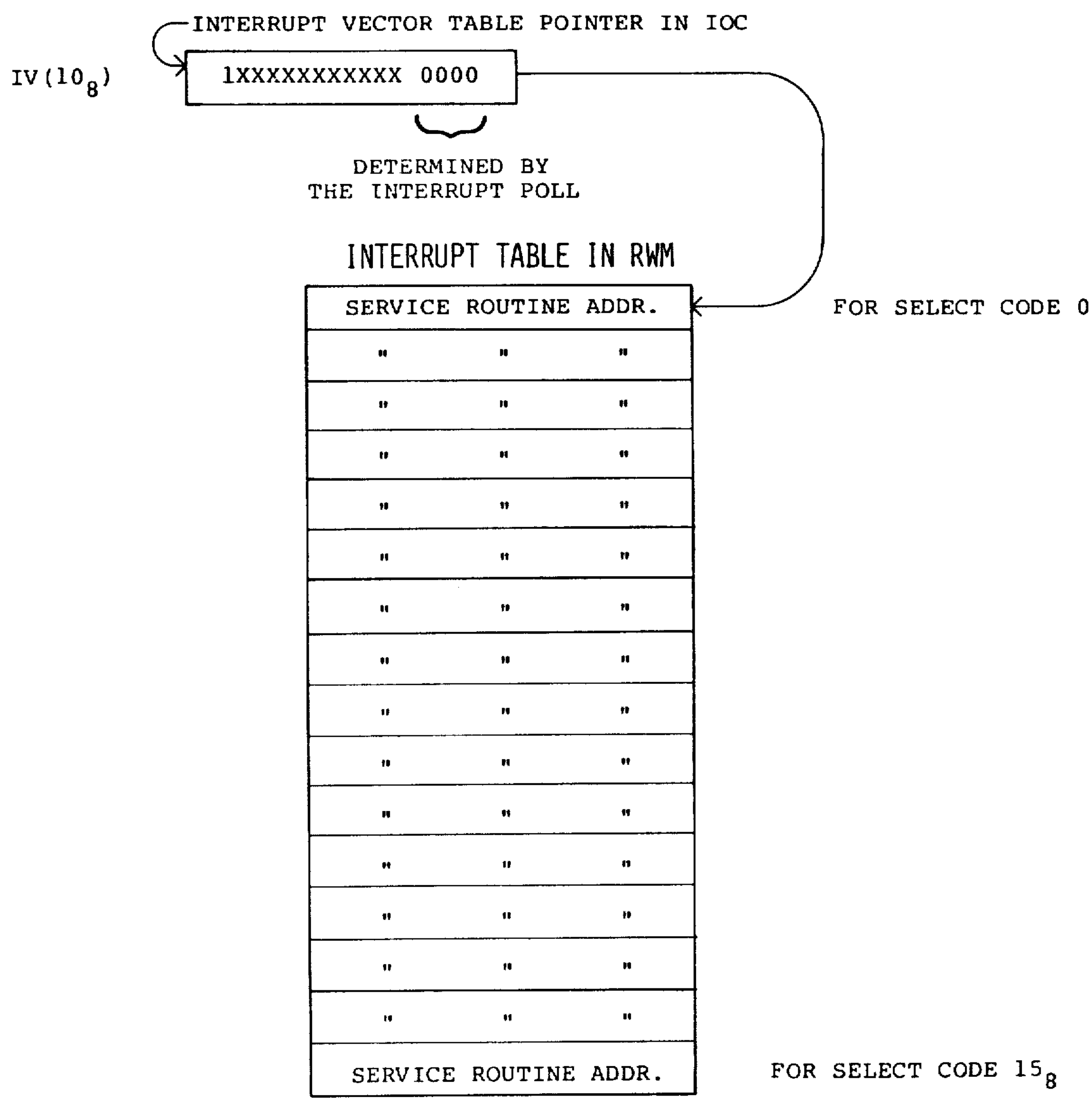

FIG. 123 is a diagram illustrating the indirect addressing sequence implemented by the BPC and IOC of FIG. 19 during an interrupt.

Figure 124:
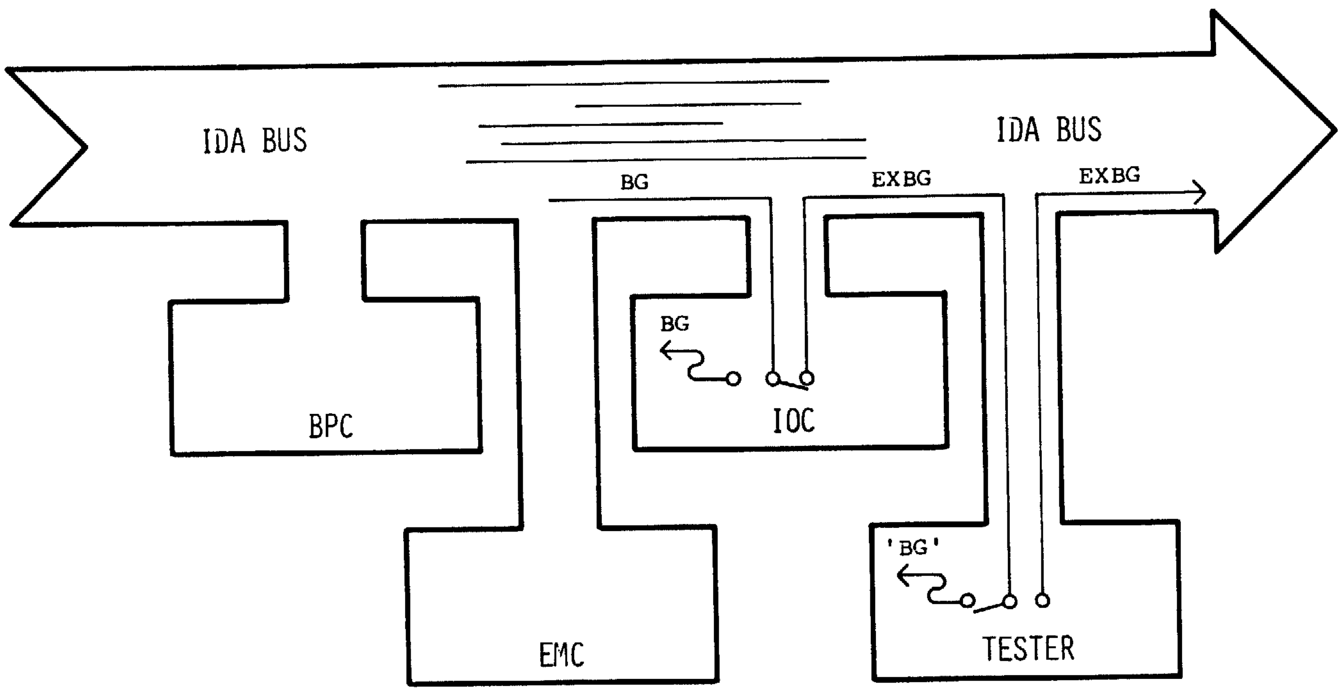

FIG. 124 is a pictorial representation of the use of the extended bus grant capability of the microprocessor of FIG. 19.

FIGS. 125A–C are a tabular illustration of the instruction set and corresponding bit patterns associated with the IOC of FIG. 19.

Figure 126A:
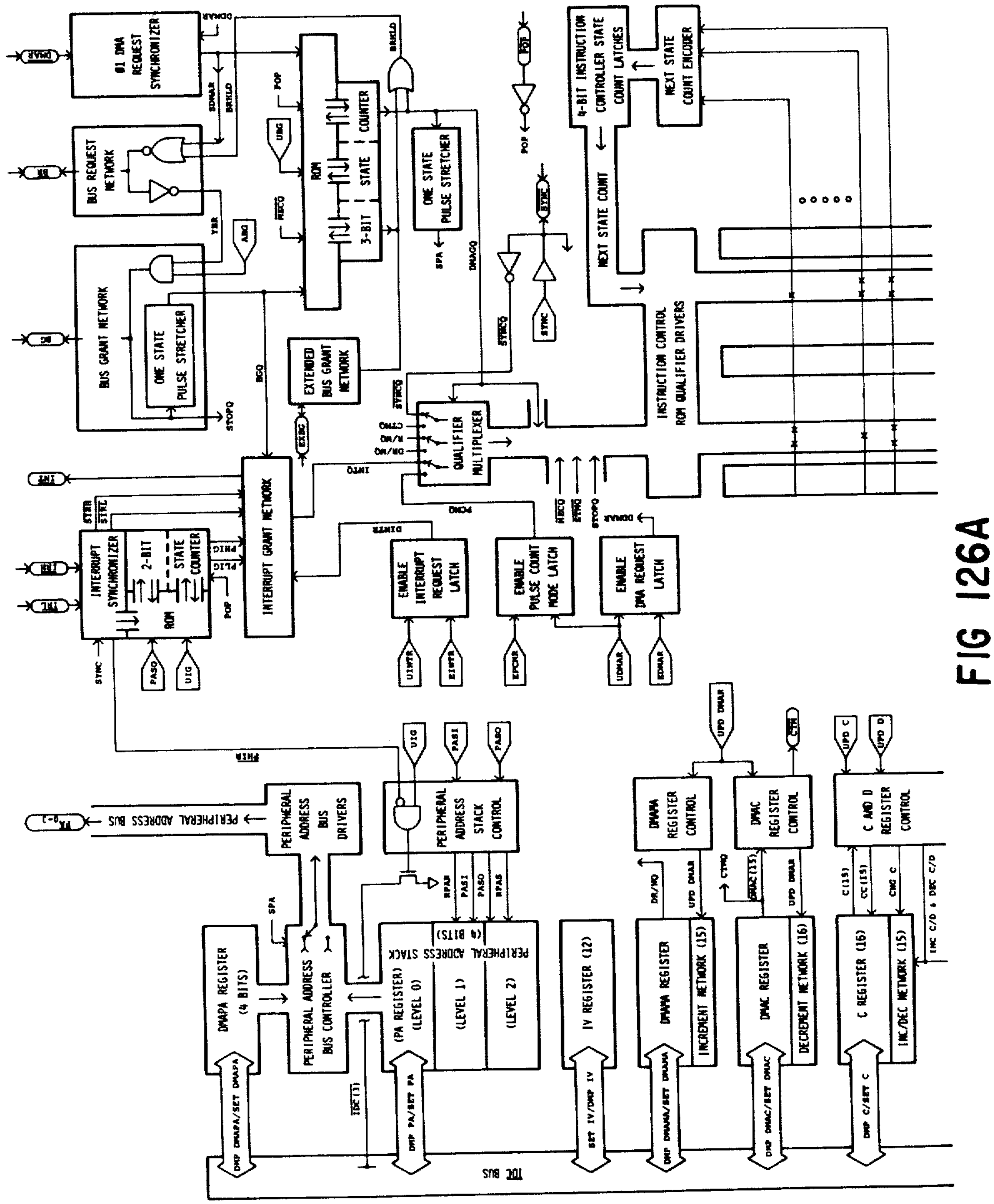
Figure 126B:
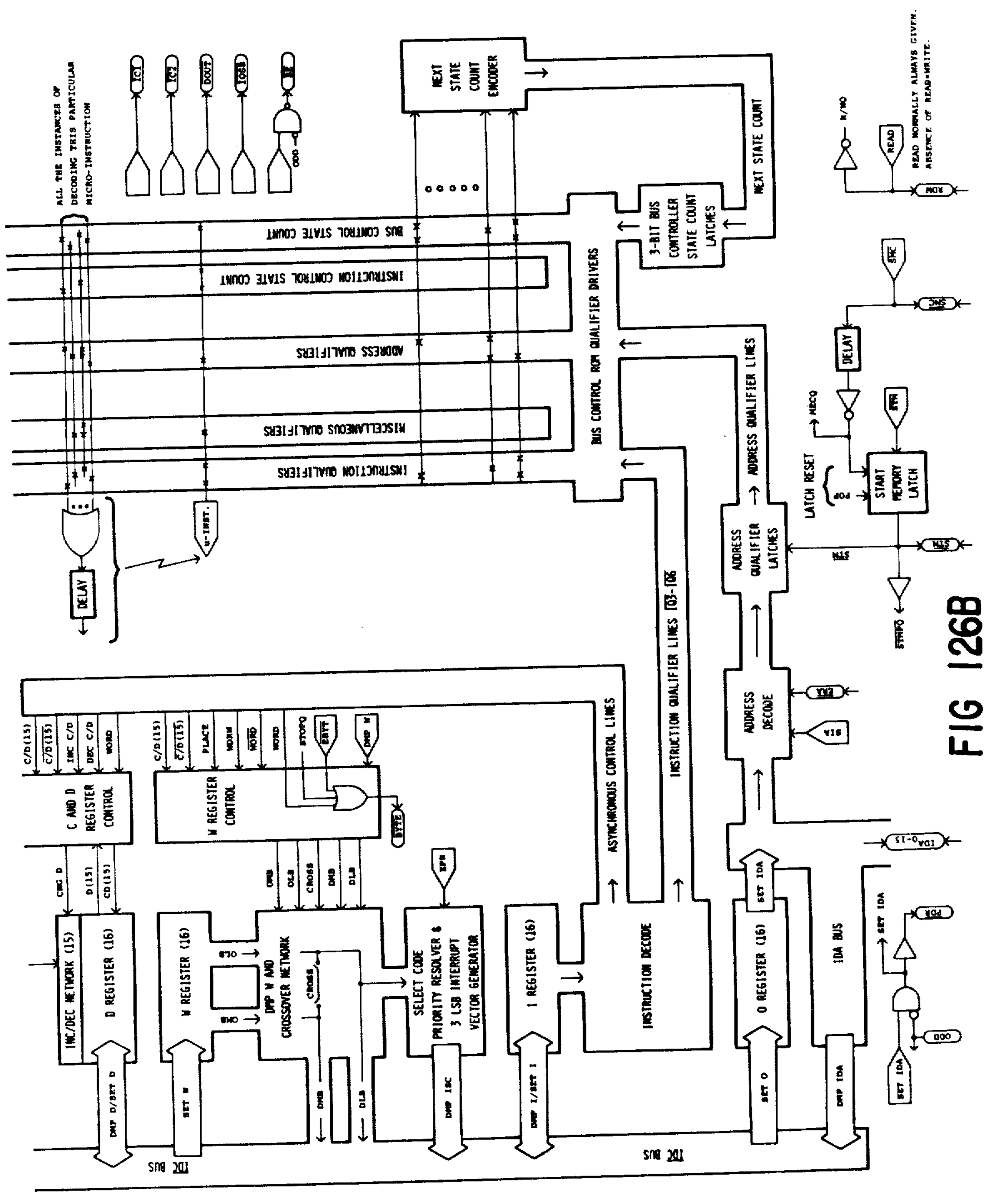

FIGS. 126A–C are a detailed block diagram of the IOC of FIG. 19.

FIG. 127 is a diagram illustrating the format in which 12-digit floating point binary-coded-decimal numbers are encoded for use by the EMC of FIG. 19.

FIGS. 128A–C are a tabular illustration of the instruction set and corresponding bit patterns associated with the EMC of FIG. 19.

Figure 129A:
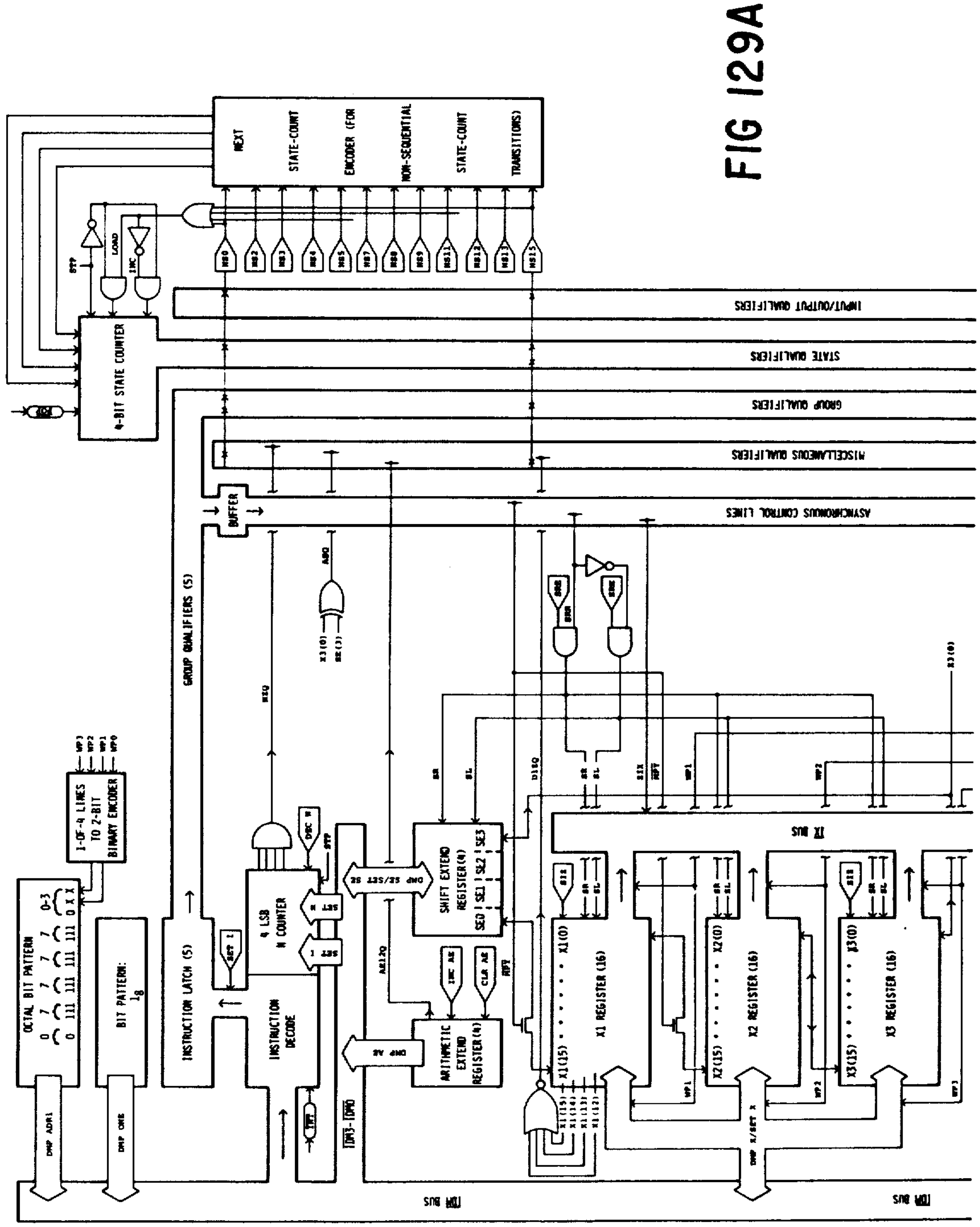
Figure 129B:
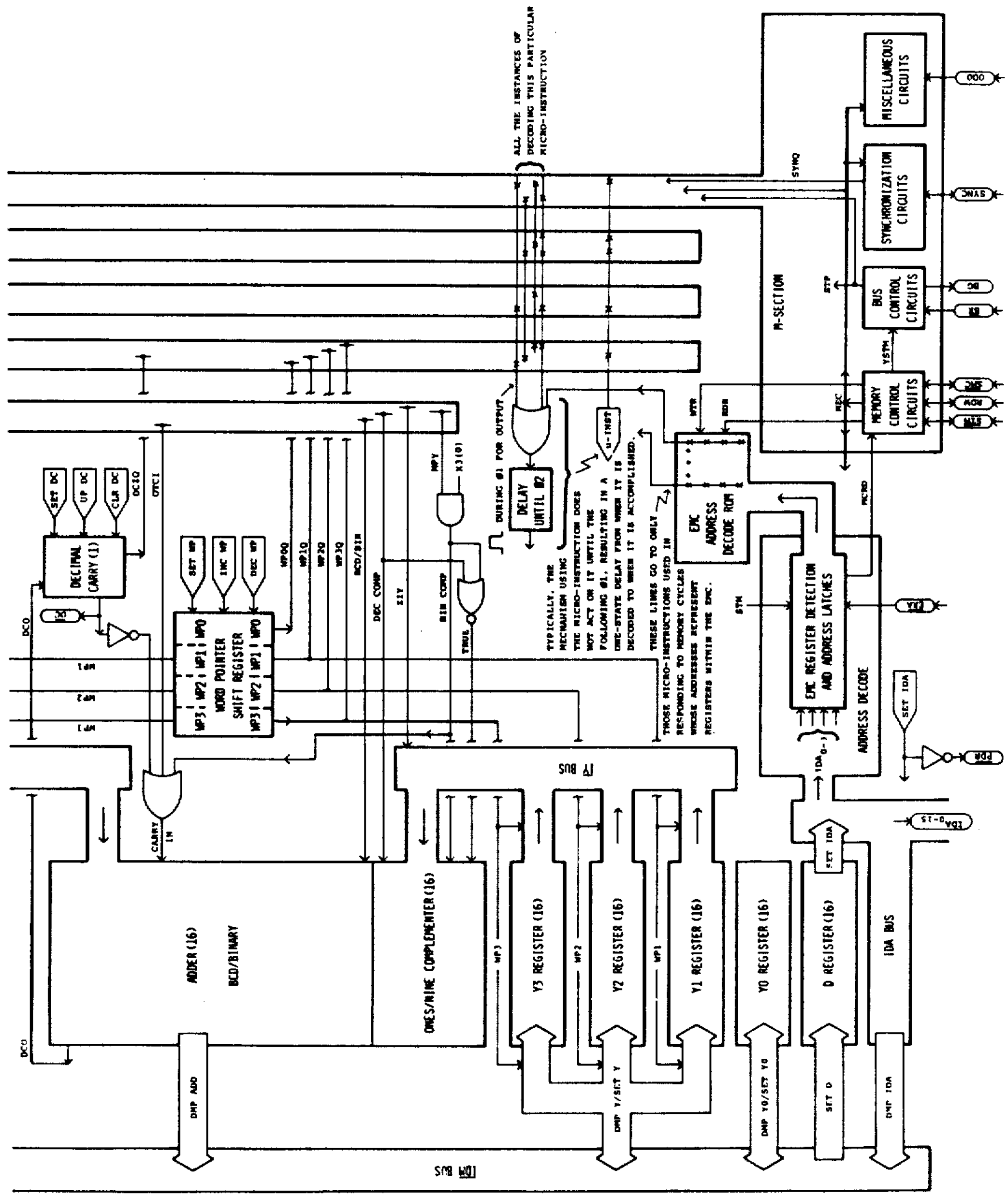

FIGS. 129A–C are a detailed block diagram of the EMC of FIG. 19.

Figure 16:
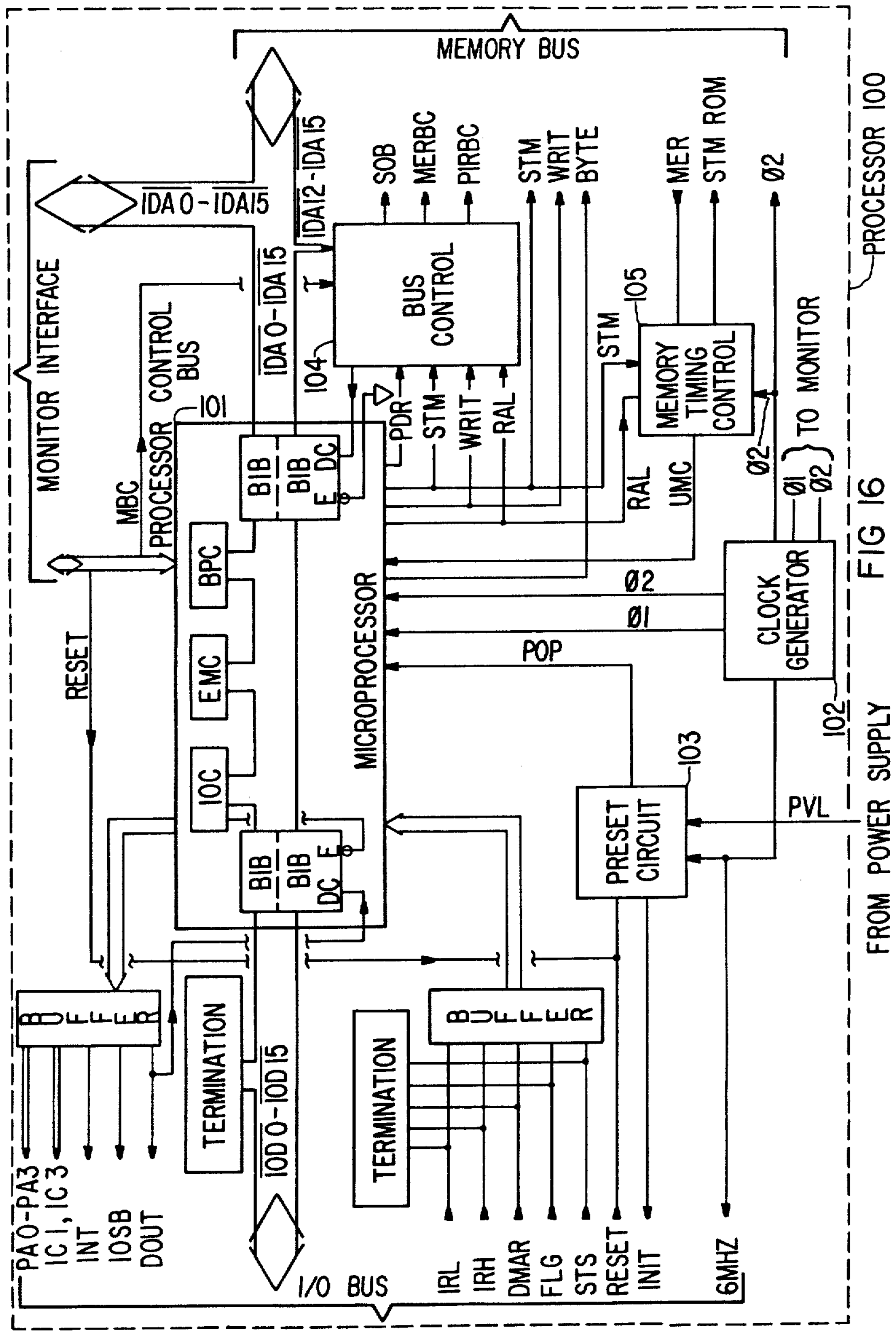
FIG. 16 is a detailed block diagram of the processor of FIG. 4.
Figure 130:
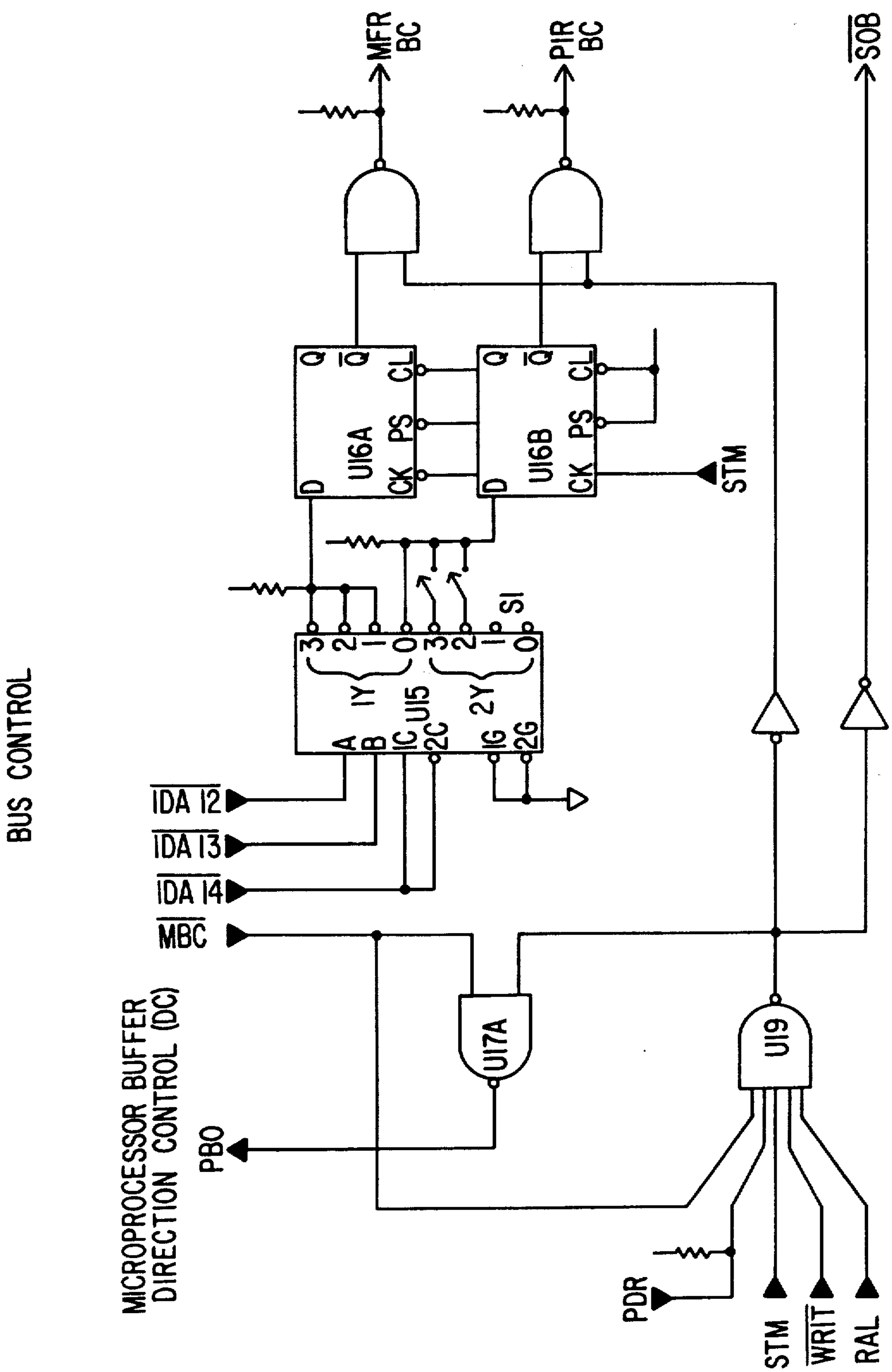

FIG. 130 is a detailed schematic diagram of the bus control block of FIG. 16.

Figure 131:
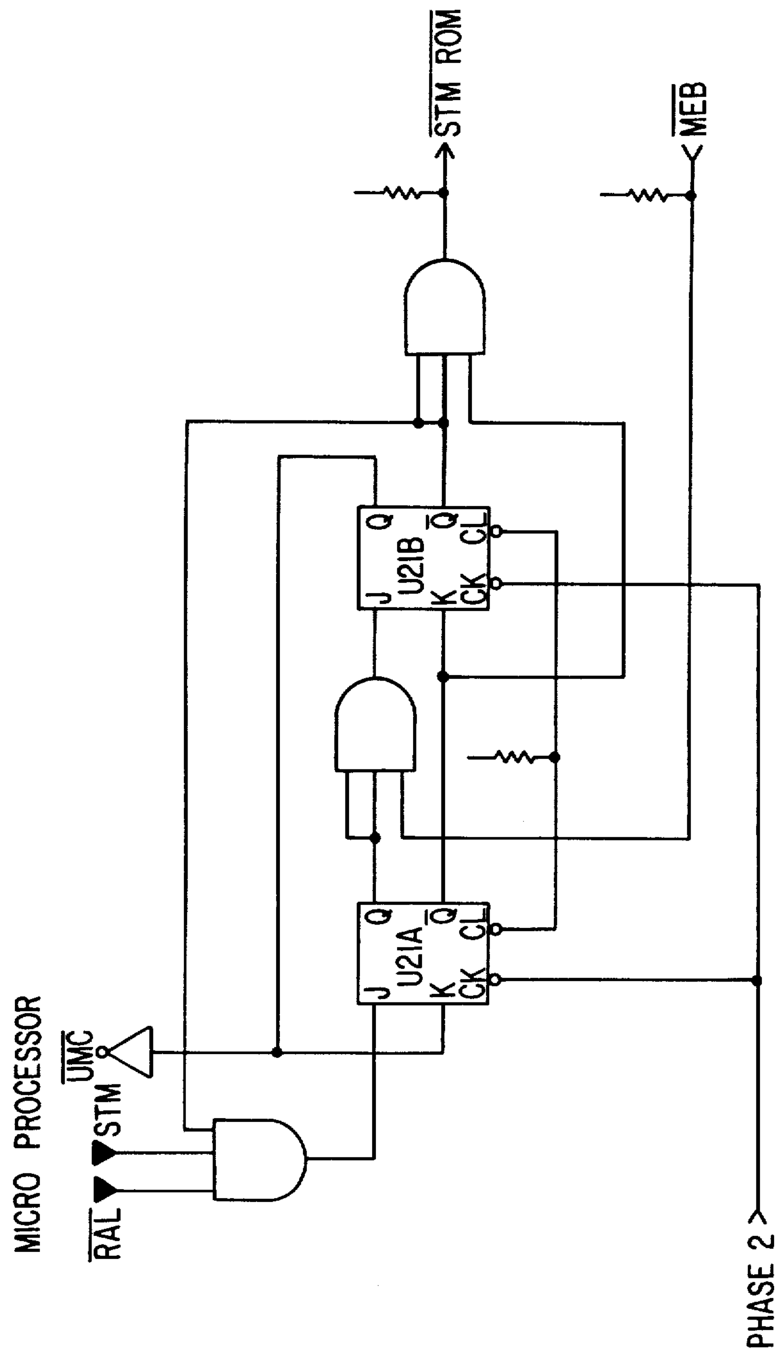

FIG. 131 is a detailed schematic diagram of the memory timing control block of FIG. 16.

Figure 4:
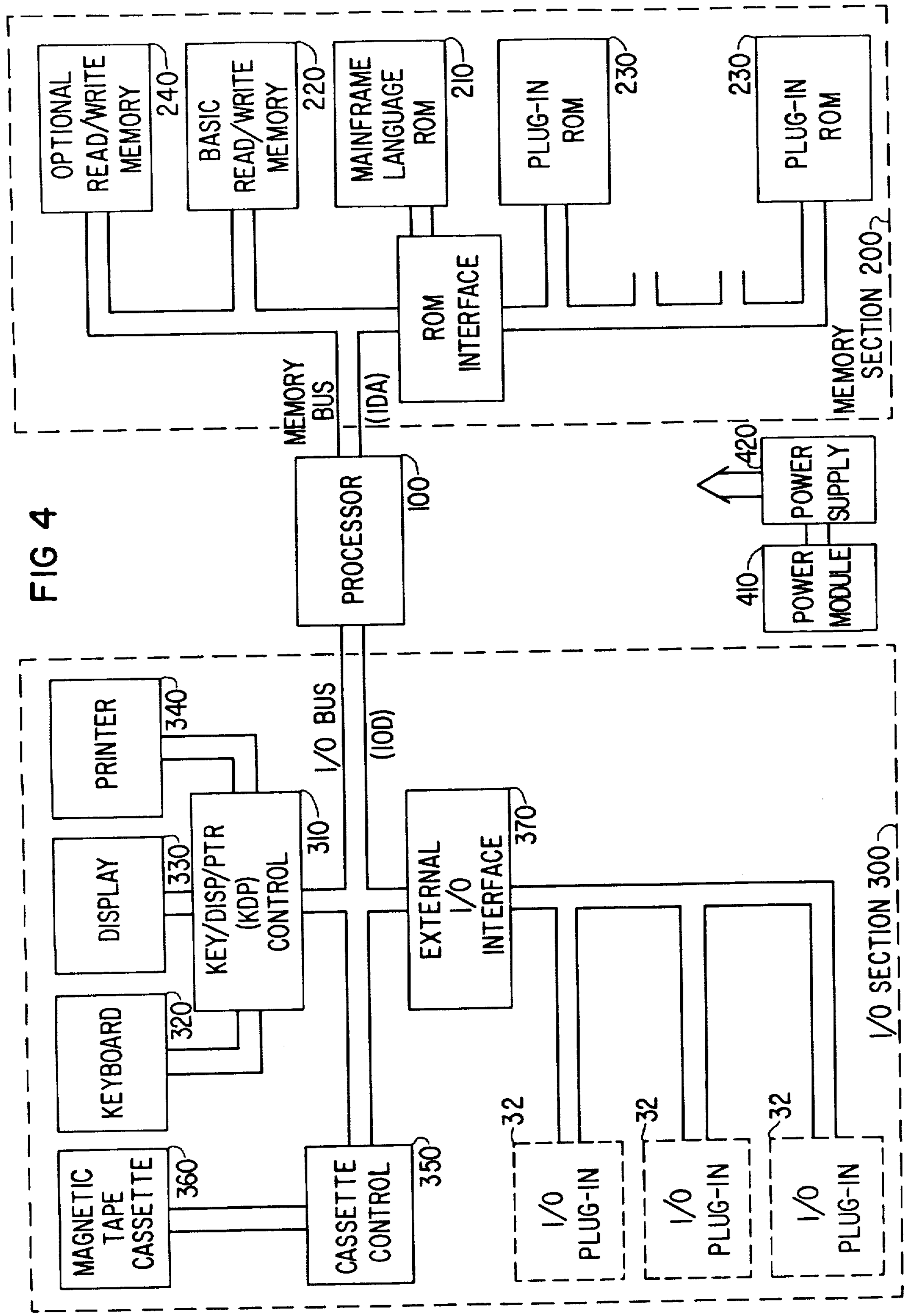
FIG. 4 is a simplified block diagram of the hardware associated with the calculator of FIG. 1.
Figure 132:
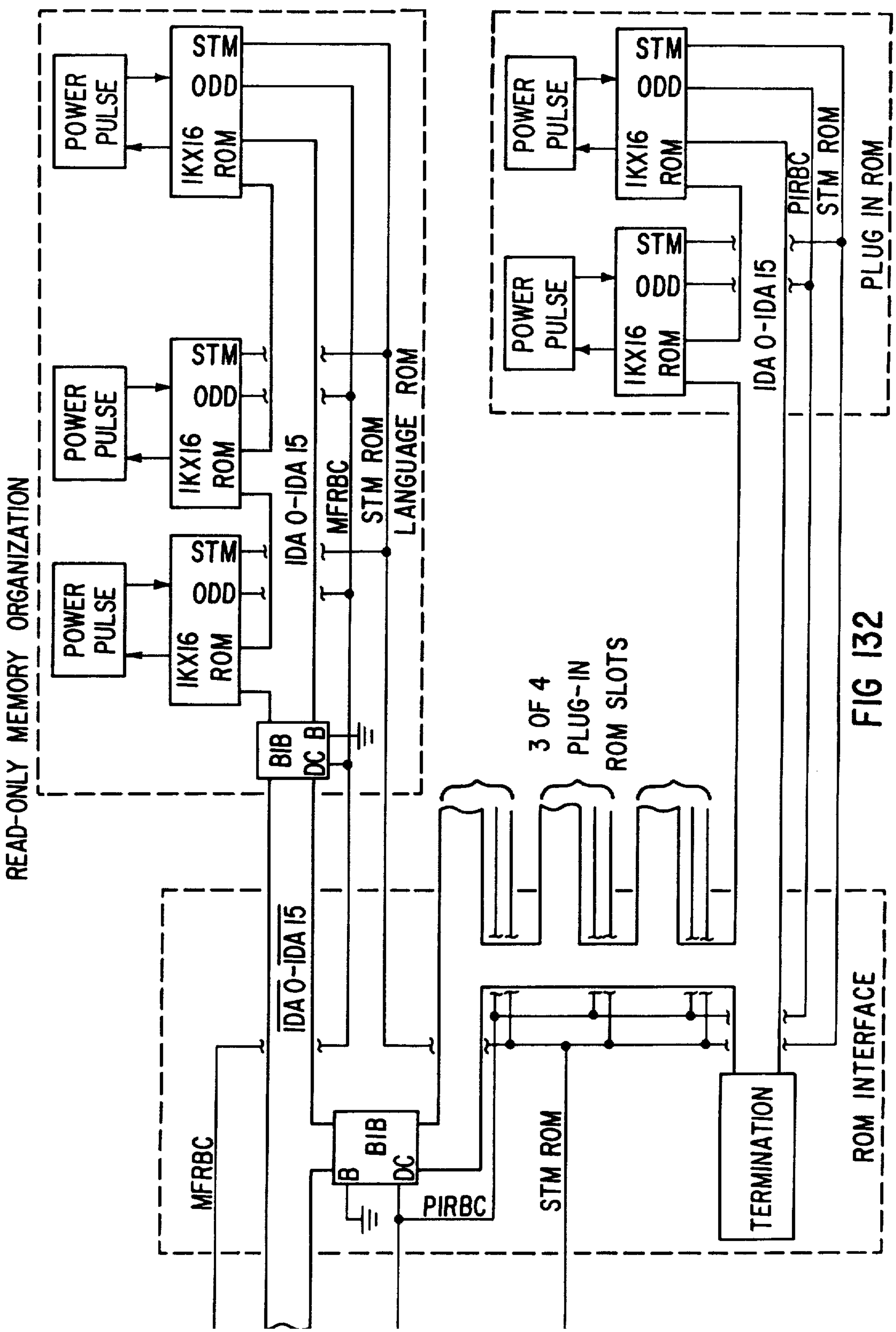

FIG. 132 is a detailed block diagram of the mainframe language ROM, ROM interface, and plug-in ROM of FIG. 4.

Figure 133:
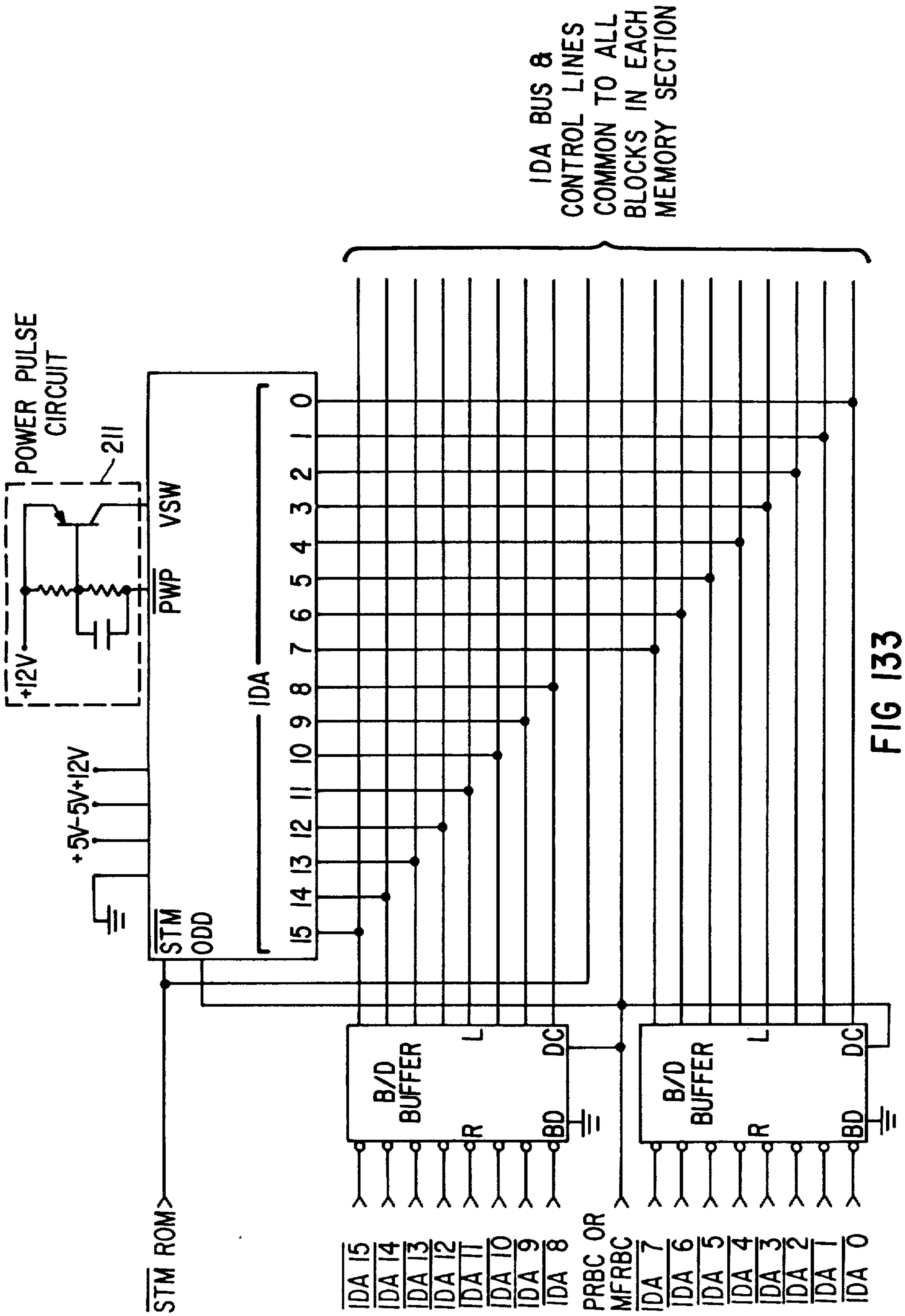

FIG. 133 is a detailed schematic diagram of one of the individual ROM chips employed in the mainframe language ROM, ROM interface, and plug-in ROM of FIGS. 4 and 132.

Figure 134:
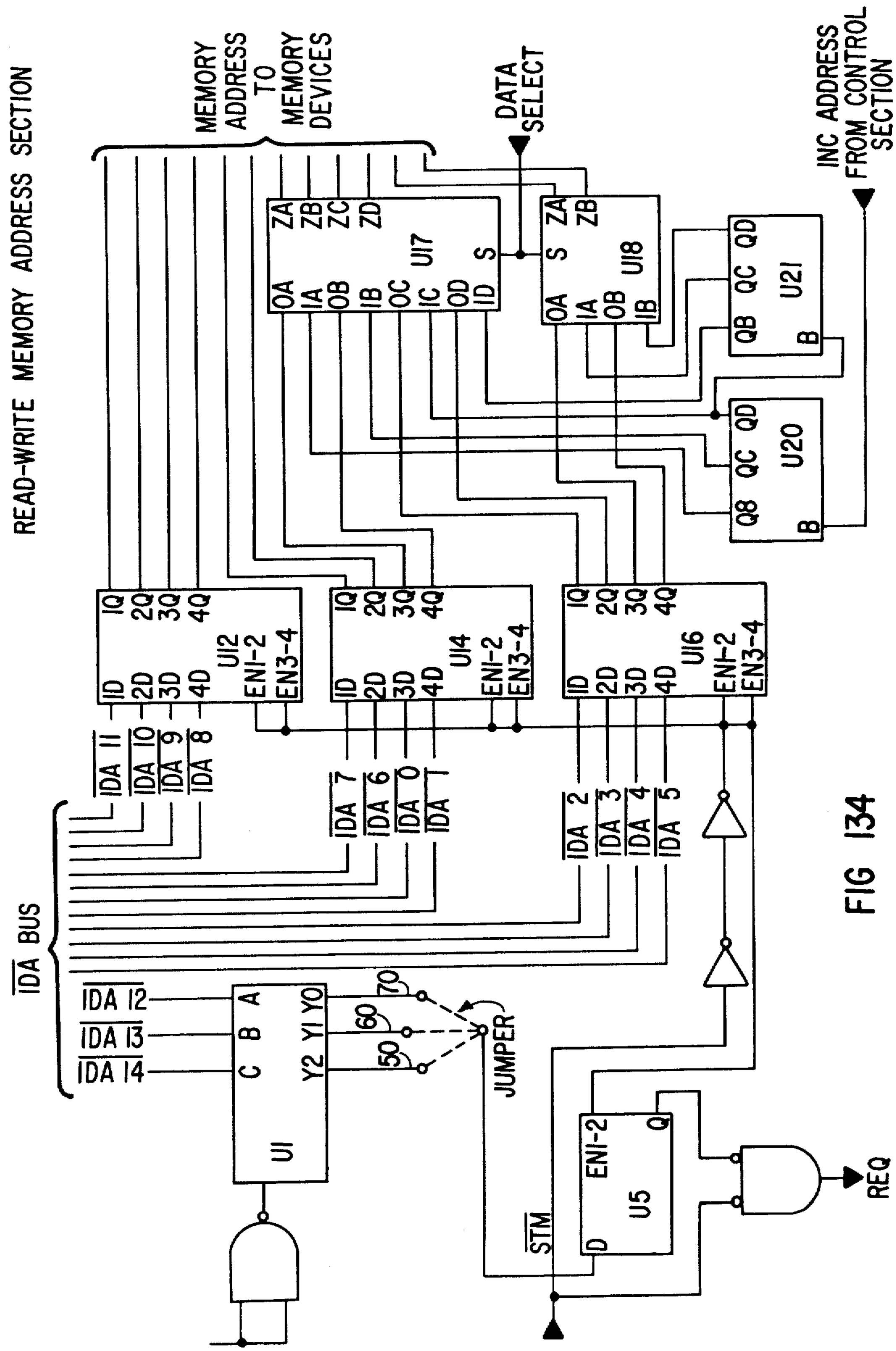

FIG. 134 is a detailed schematic diagram of an address section of the basic and optional read-write memories of FIG. 4.

Figure 135:
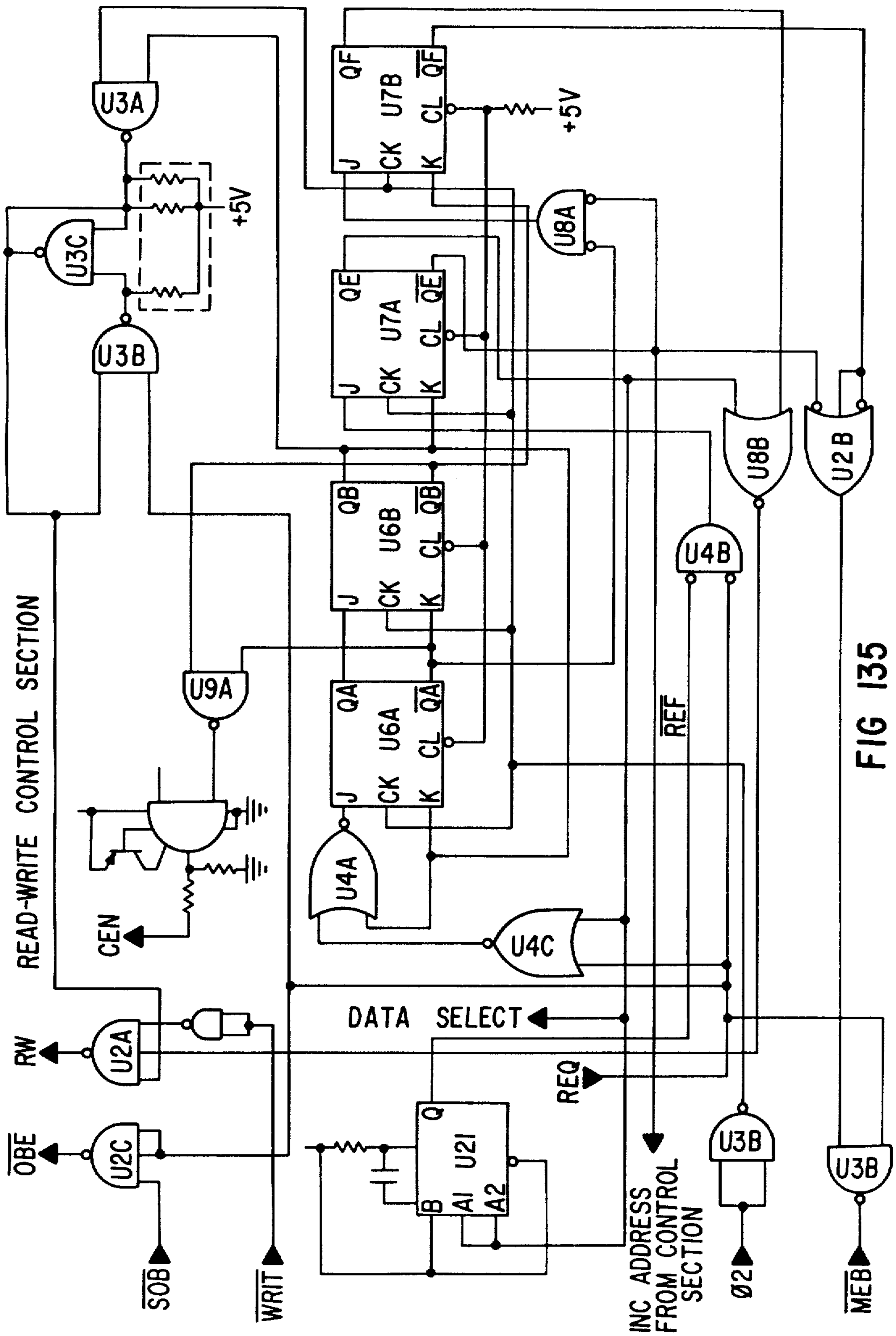

FIG. 135 is a detailed schematic diagram of a memory control section of the basic and optional read-write memories of FIG. 4.

Figure 136:
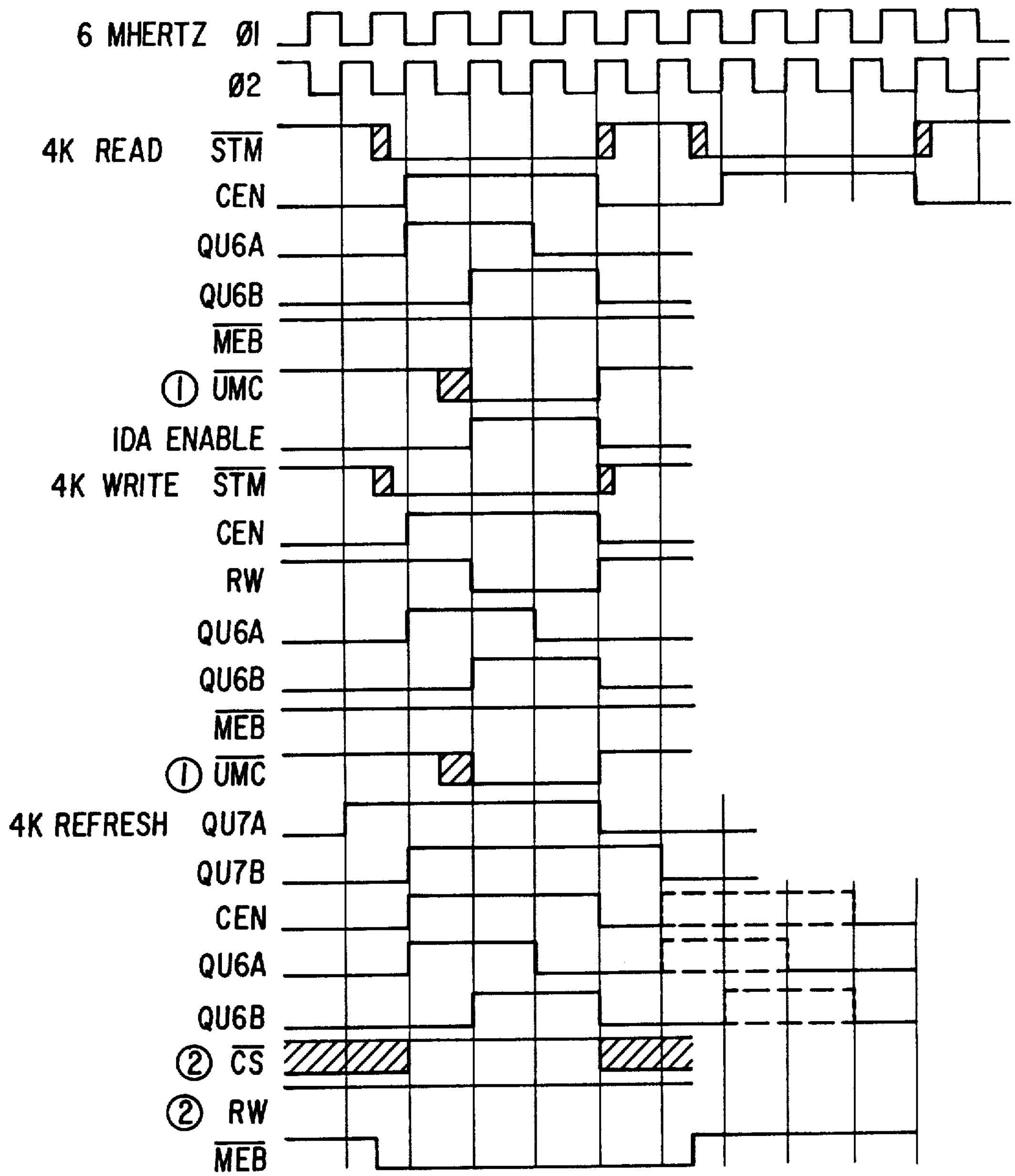

FIG. 136 is a waveform diagram illustrating the timing relationship between various signals involved in the read-write memory control section circuitry of FIG. 135.

Figure 137:
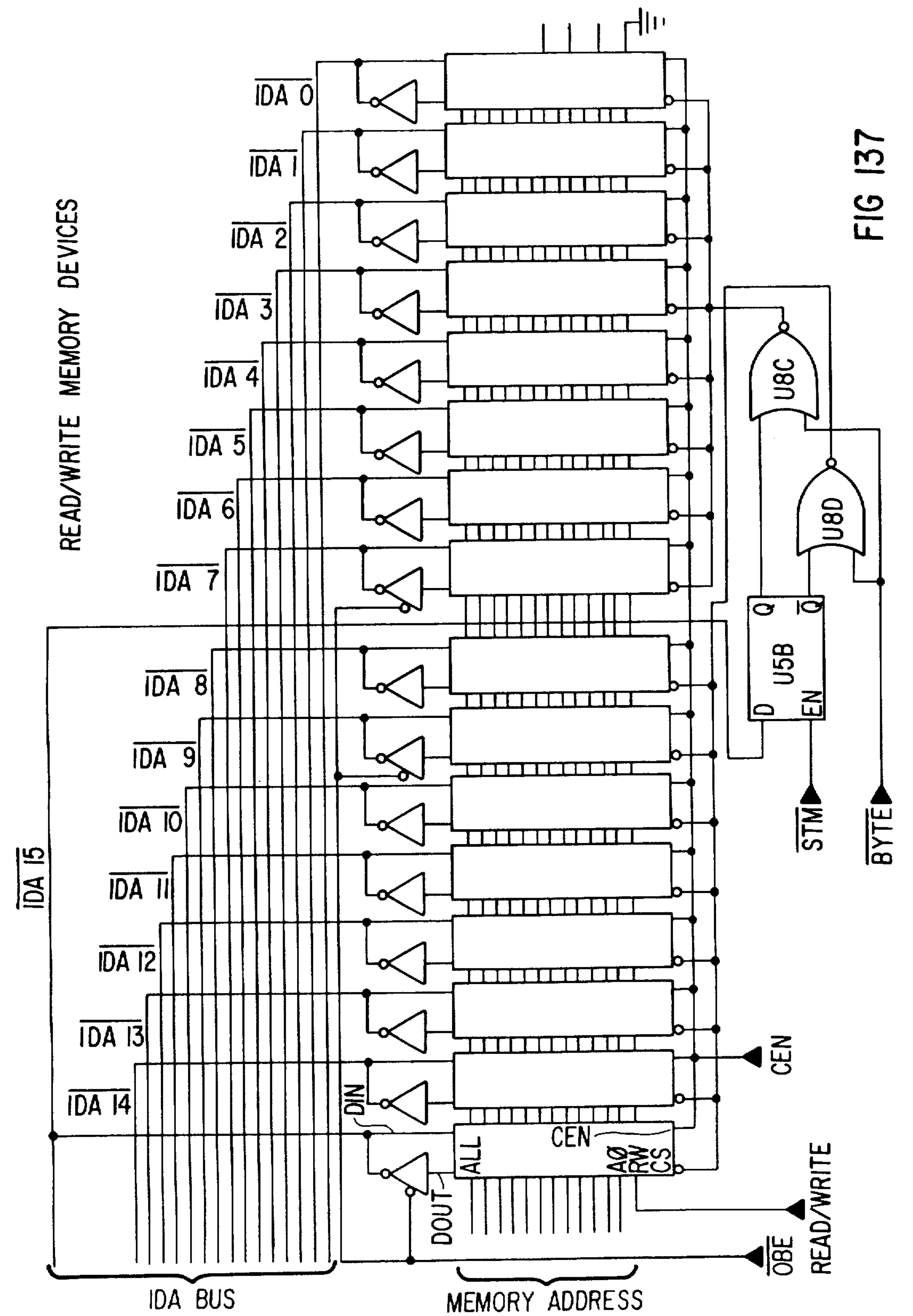

FIG. 137 is a detailed schematic diagram of a read-write memory devices section of the basic and optional read-write memories of FIG. 4.

Figure 138:
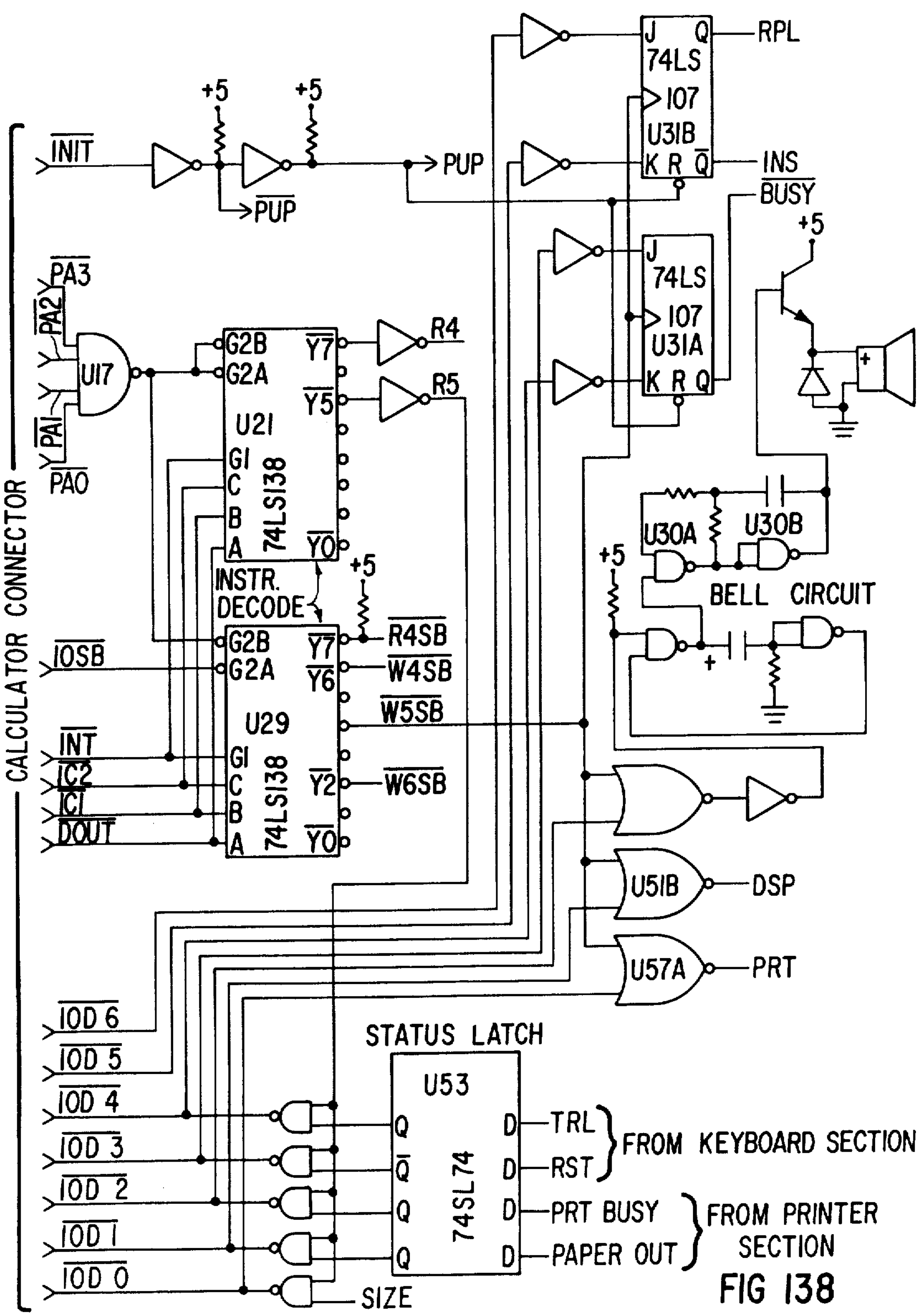

FIG. 138 is a detailed schematic diagram of an I/O interface section of the KDP control block of FIG. 4.

Figure 139:
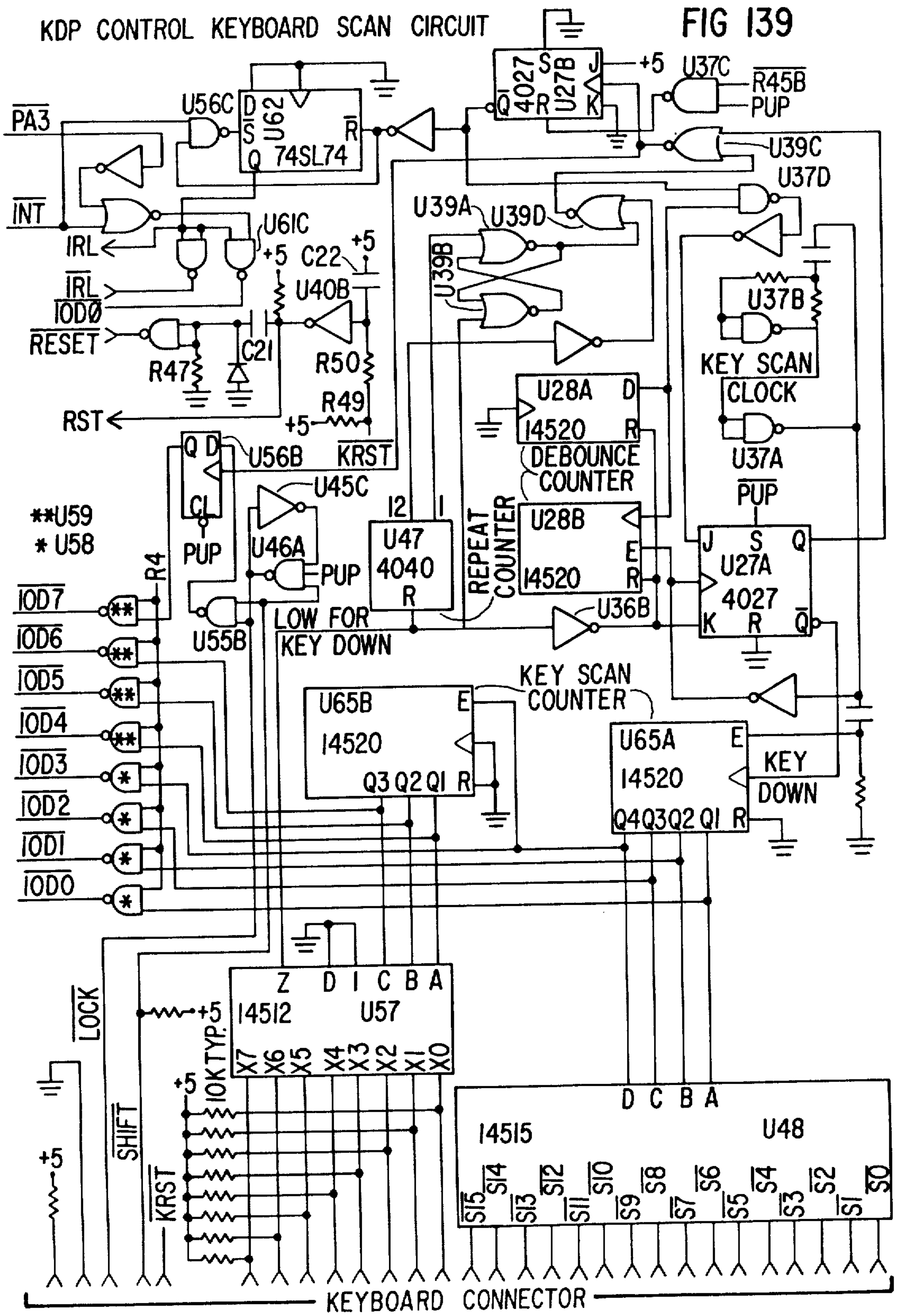

FIG. 139 is a detailed schematic diagram of a keyboard scan circuit section of the KDP control block of FIG. 4.

Figure 140:
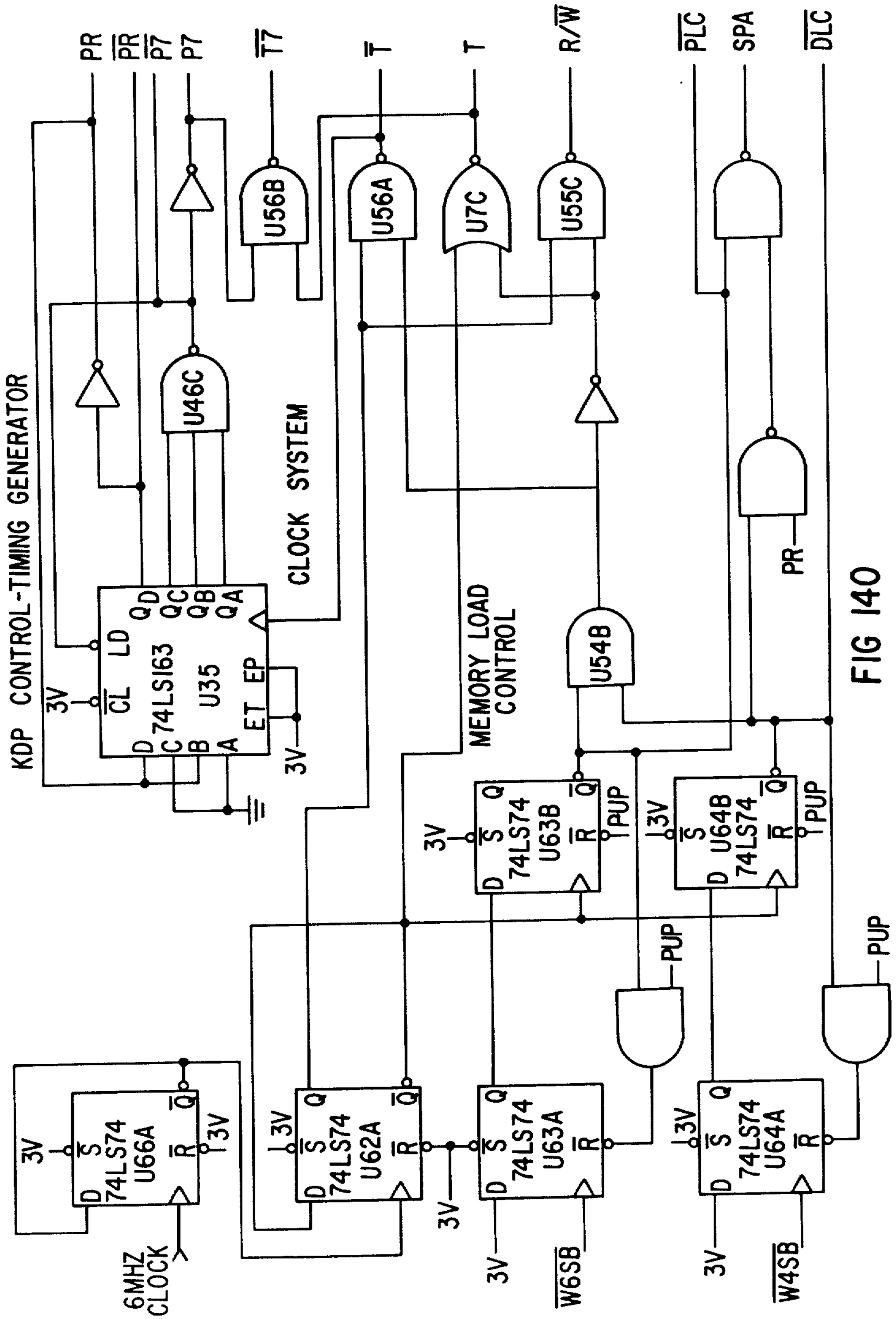

FIG. 140 is a detailed schematic diagram of a timing generator section of the KDP control block of FIG. 4.

Figure 141:
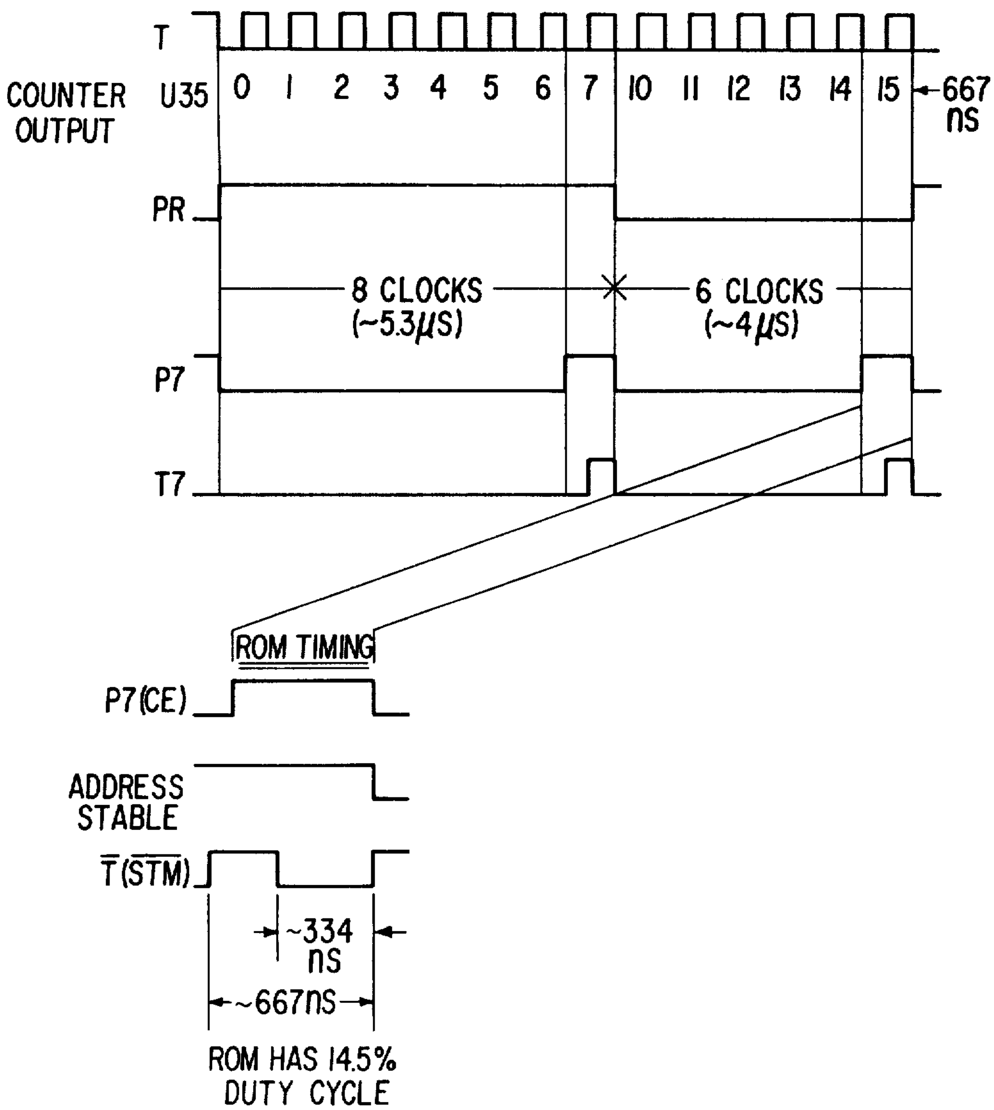

FIG. 141 is a waveform diagram illustrating the timing relationship between various signals involved in the timing generator section of FIG. 140.

Figure 142:
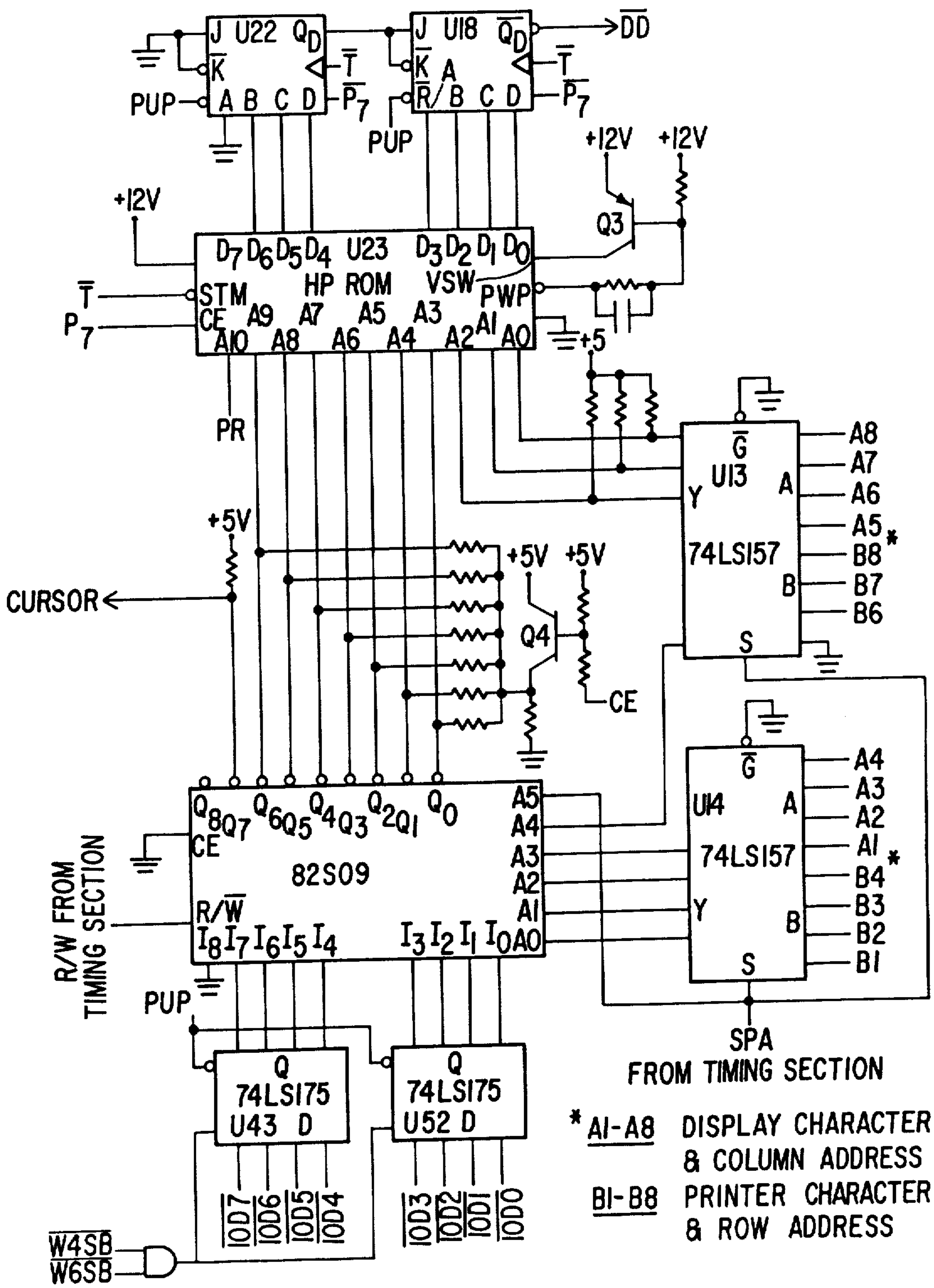

FIG. 142 is a detailed schematic diagram of a memory section of the KDP control block of FIG. 4.

Figure 143:
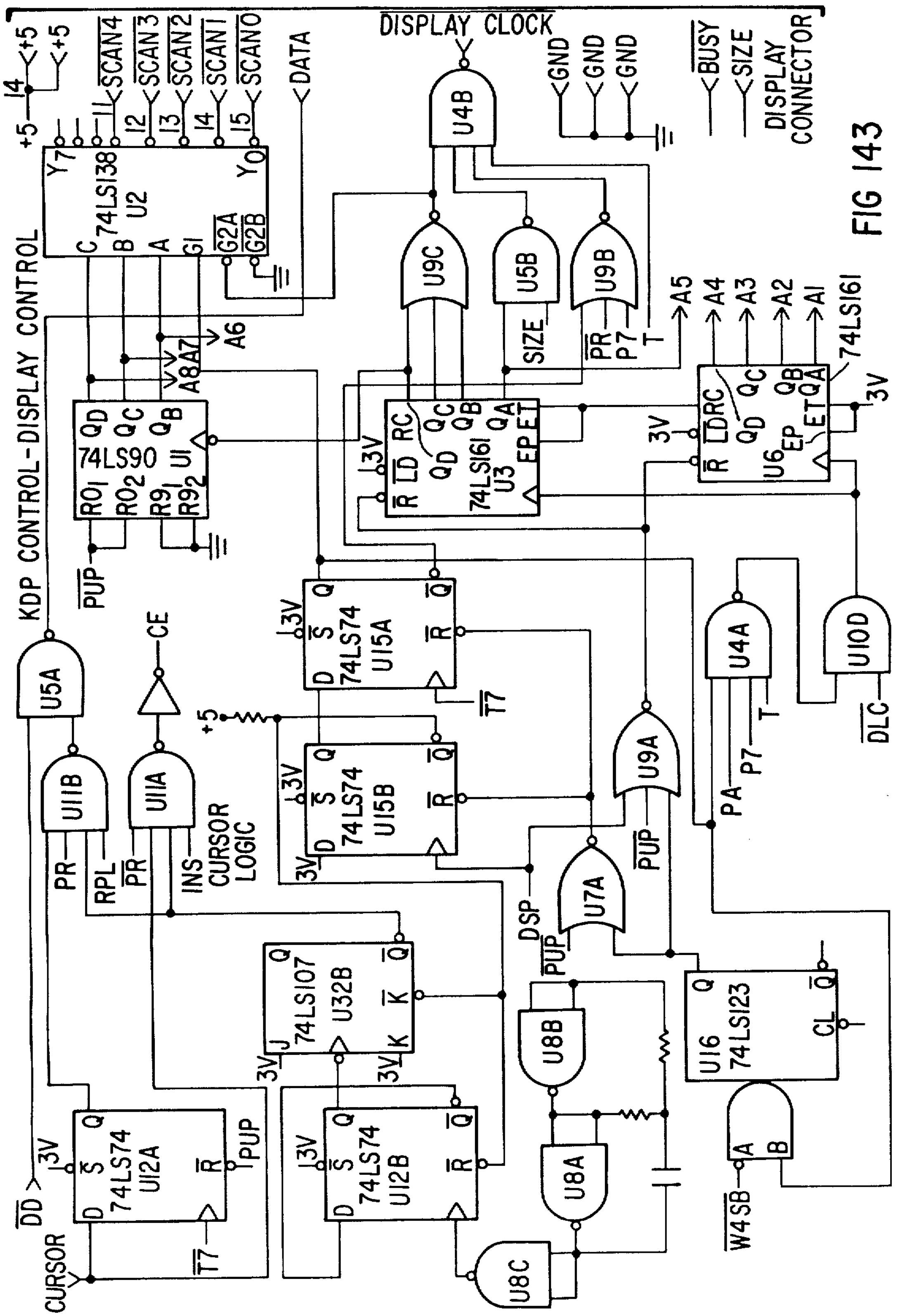

FIG. 143 is a detailed schematic diagram of a display control section of the KDP control block of FIG. 4.

Figure 144:
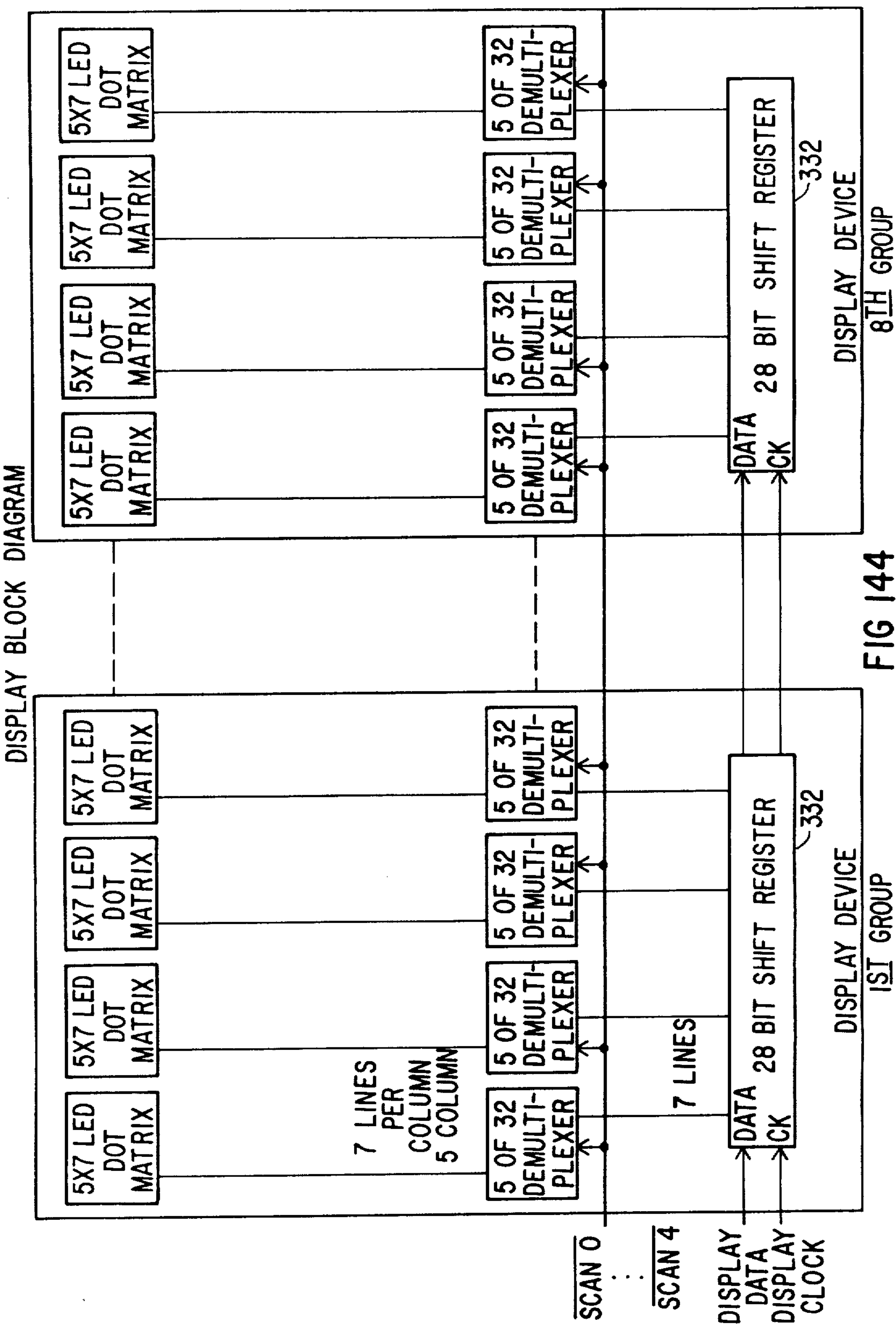

FIG. 144 is a detailed block diagram of the display of FIG. 4.

Figure 145:
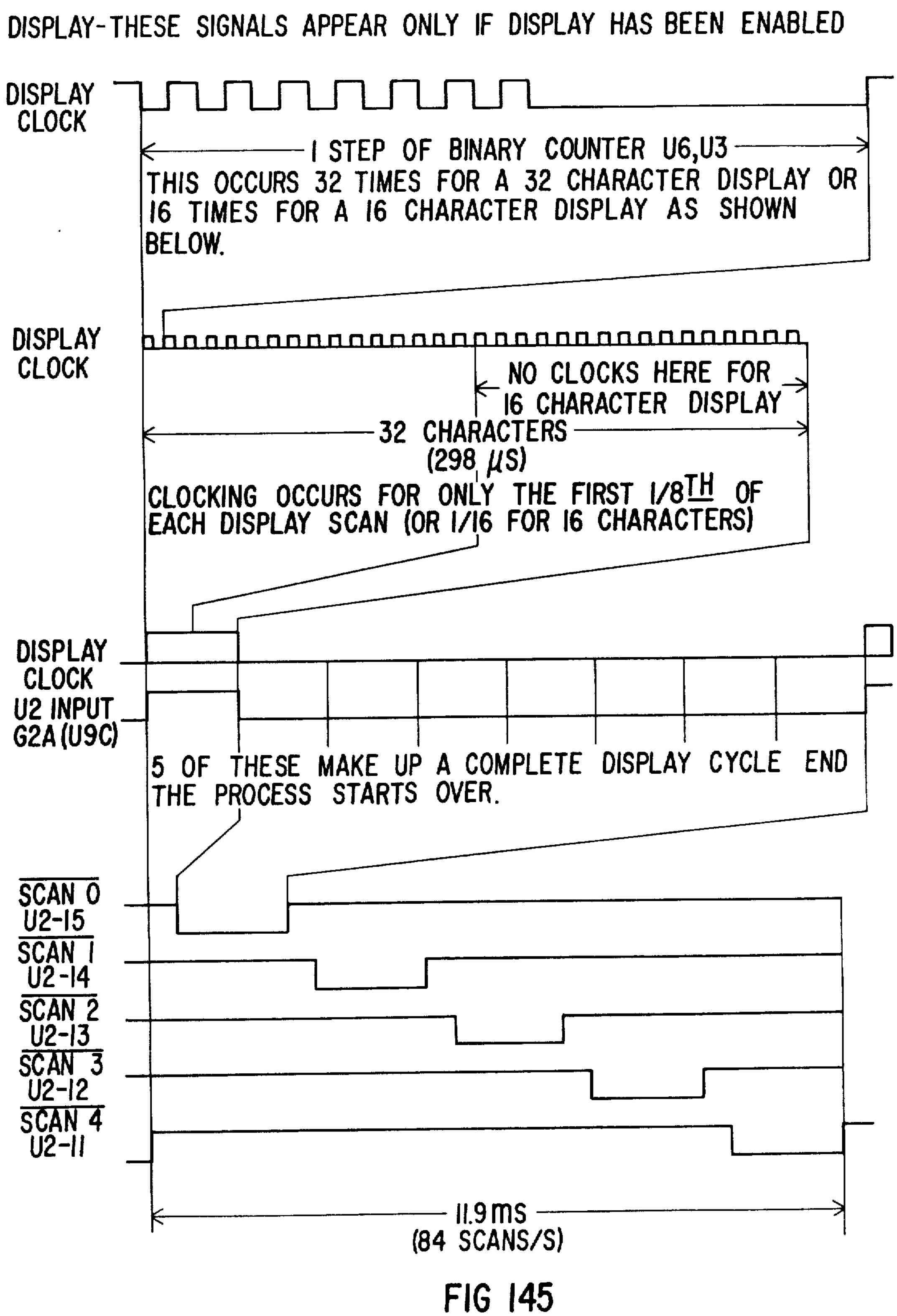

FIG. 145 is a waveform diagram illustrating the timing relationship between various signals involved in the display control section of FIG. 143.

Figure 146A:
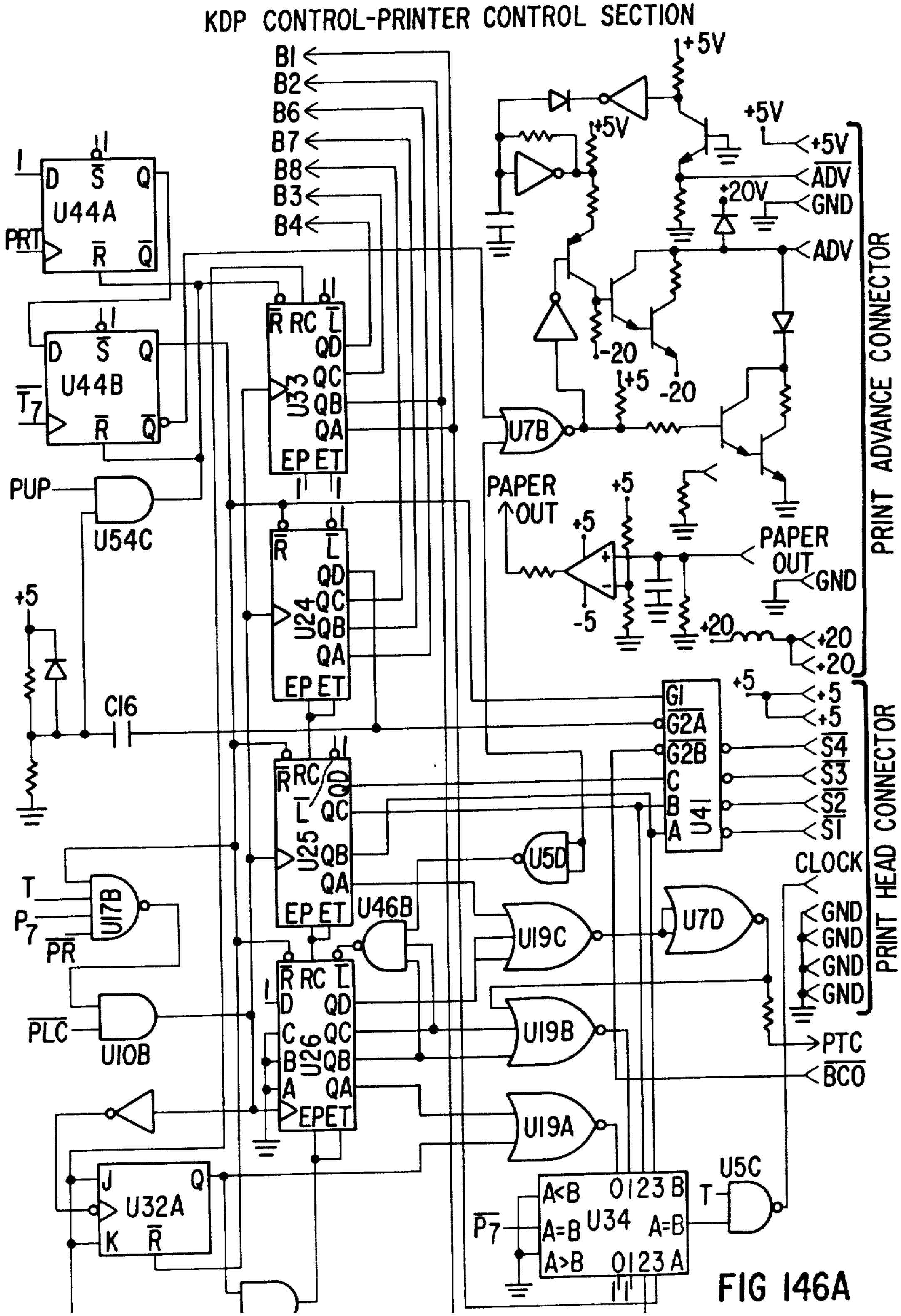
Figure 146B:
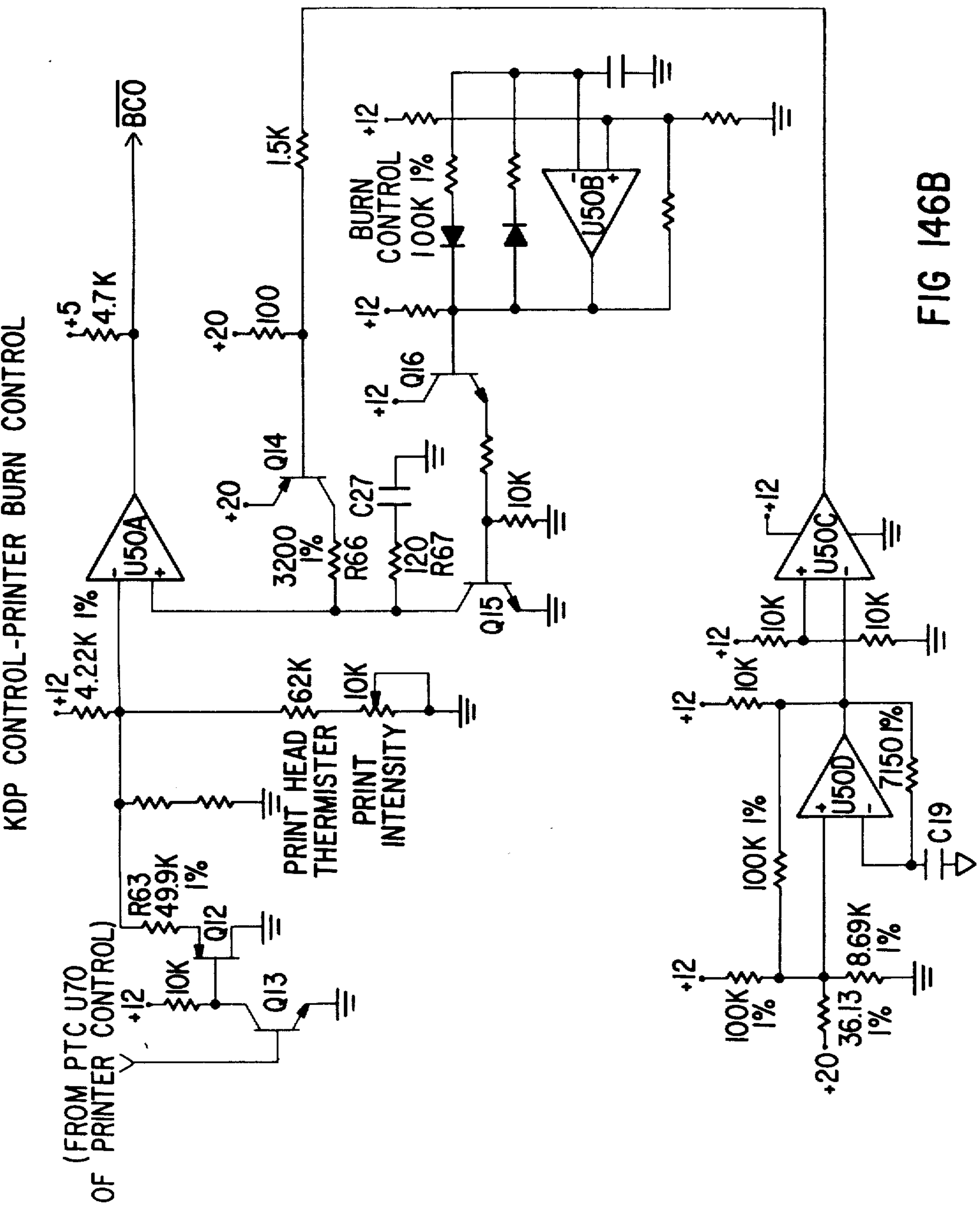

FIGS. 146A-B are a detailed schematic diagram of a printer control section of the KDP control block of FIG. 4.

Figure 147:
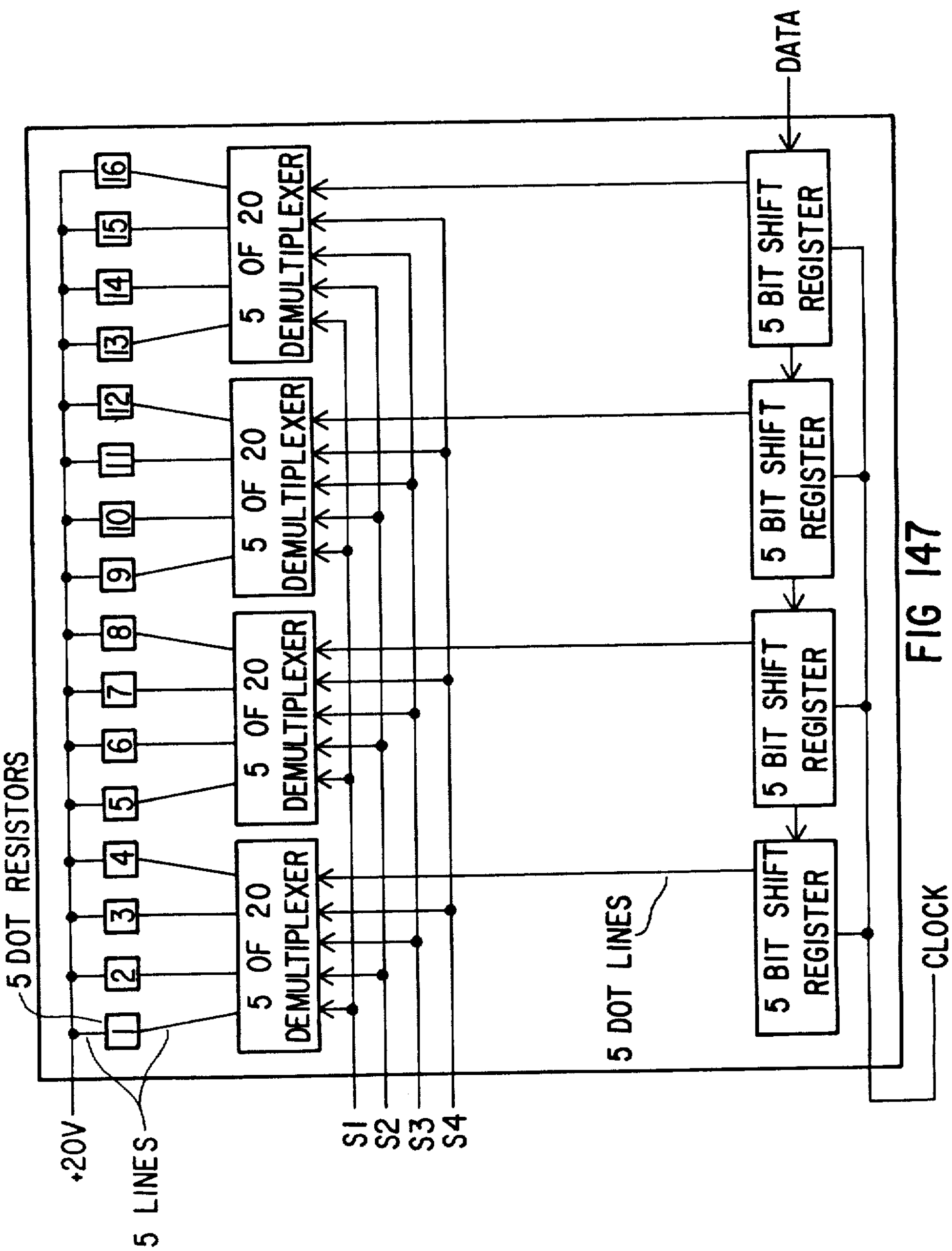

FIG. 147 is a detailed block diagram of the printer of FIG. 4.

Figure 148A:
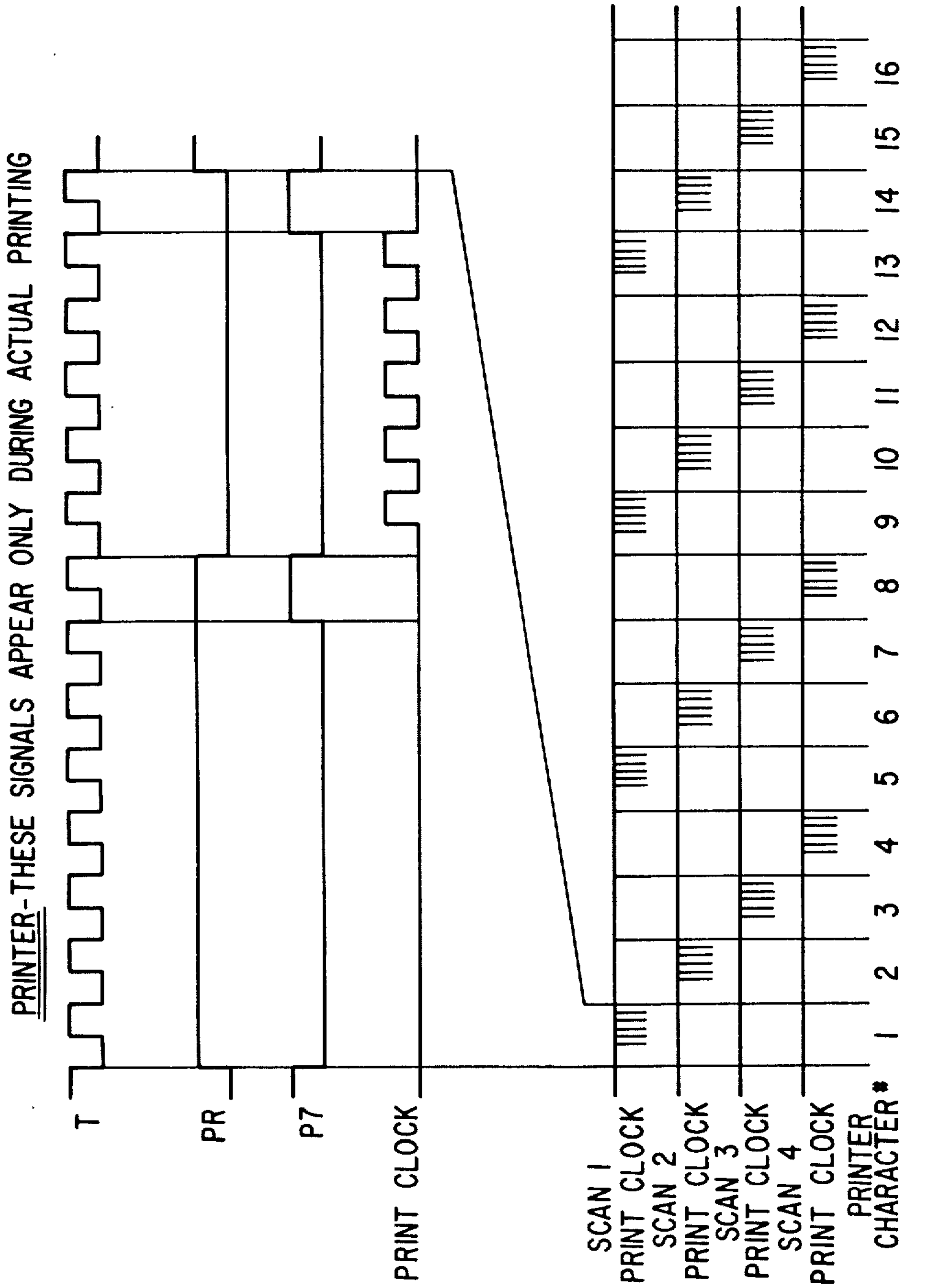
Figure 148B:
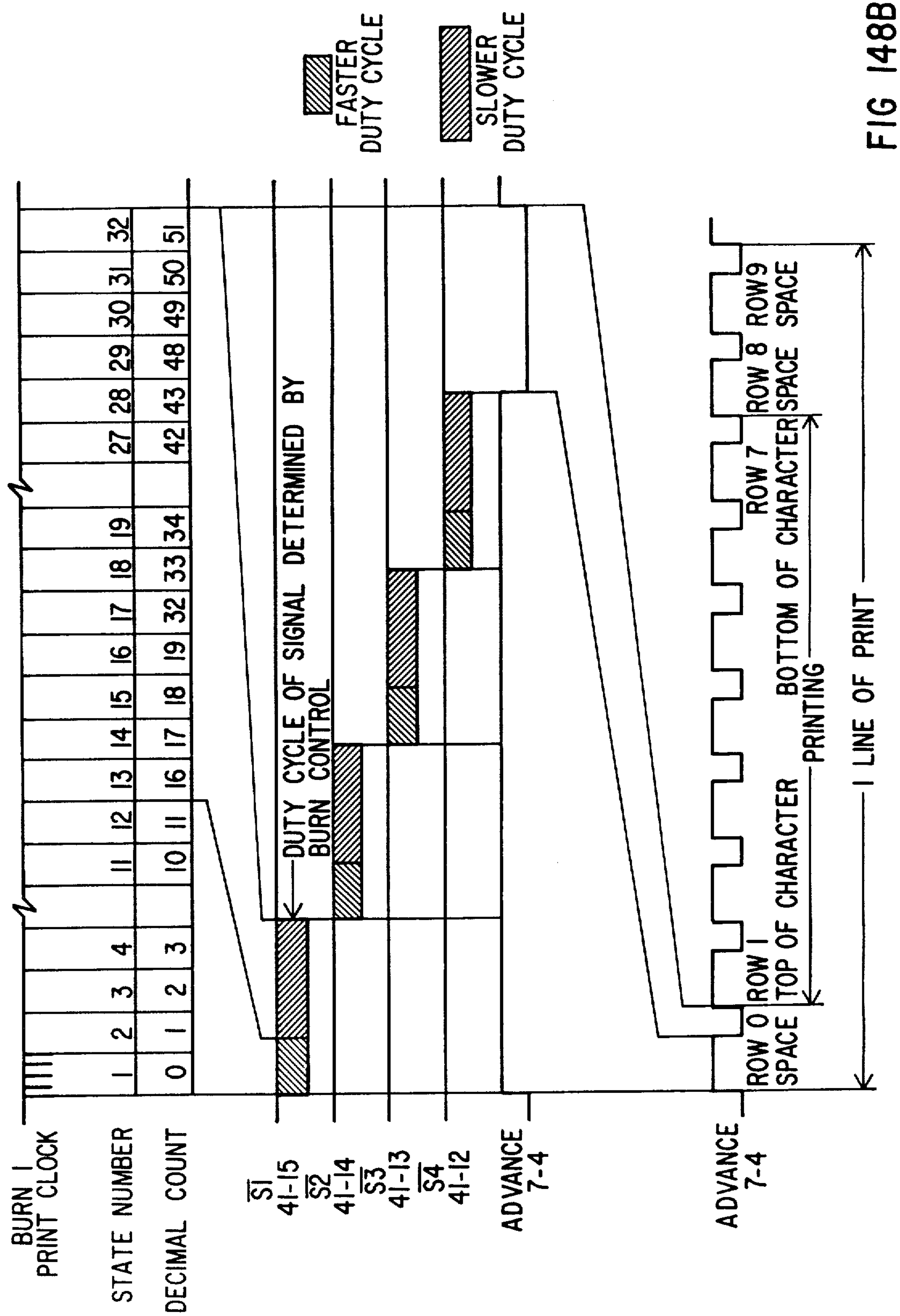

FIG. 148A-B are a waveform diagram illustrating the timing relationship between various signals involved in the printer control section of FIGS. 146A-B.

Figure 149A:
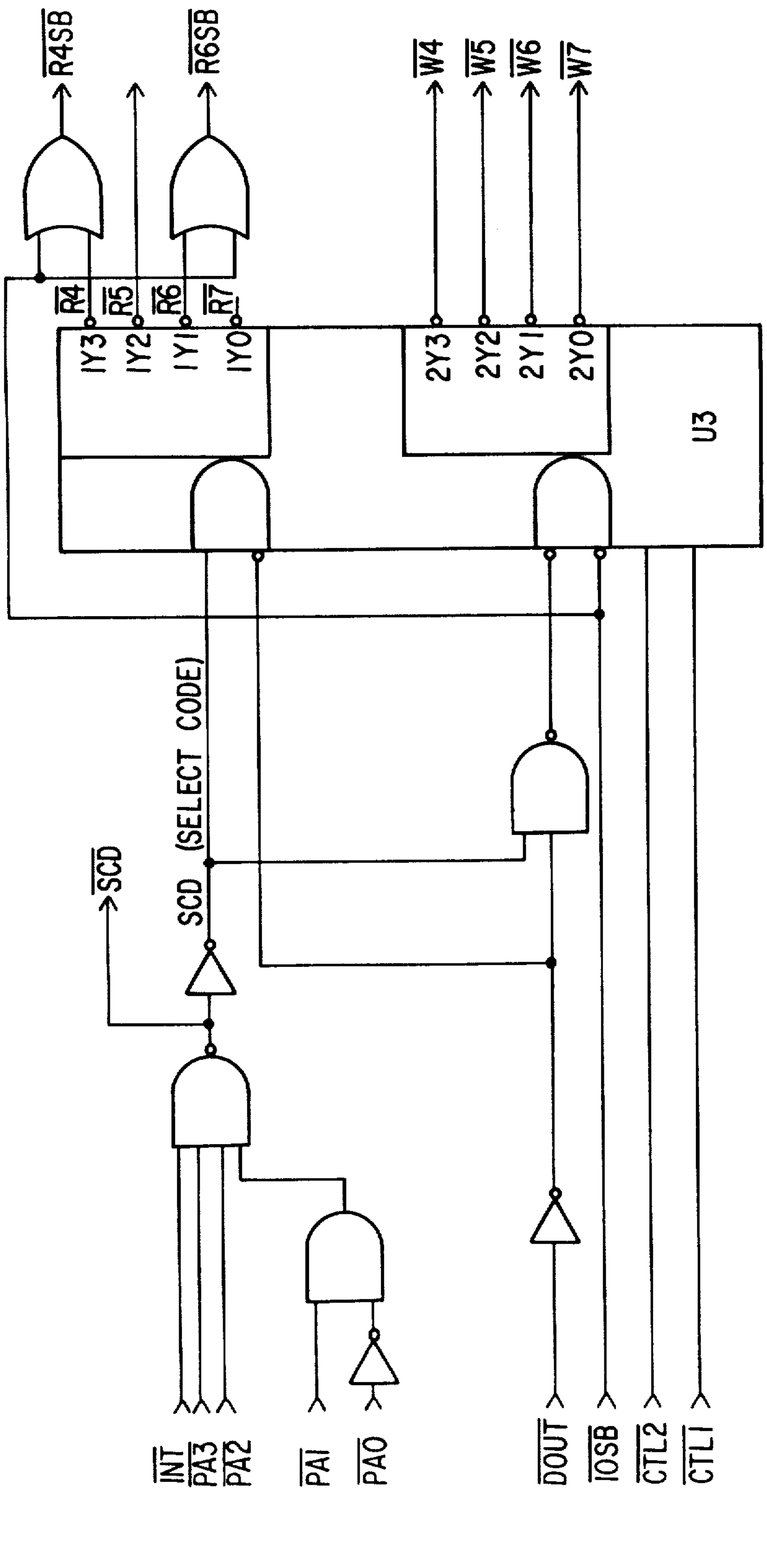
Figure 149B:
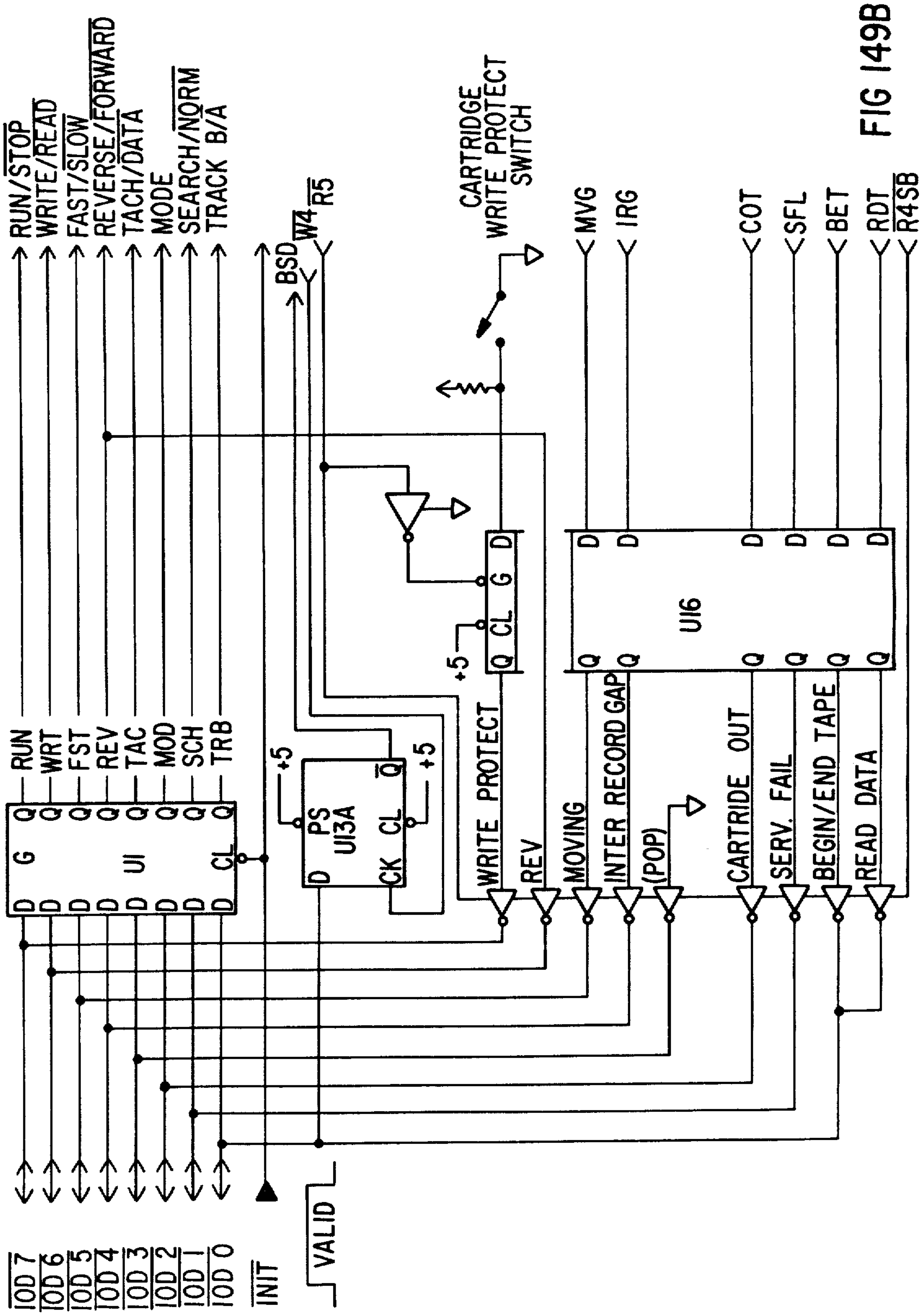
Figure 149C:
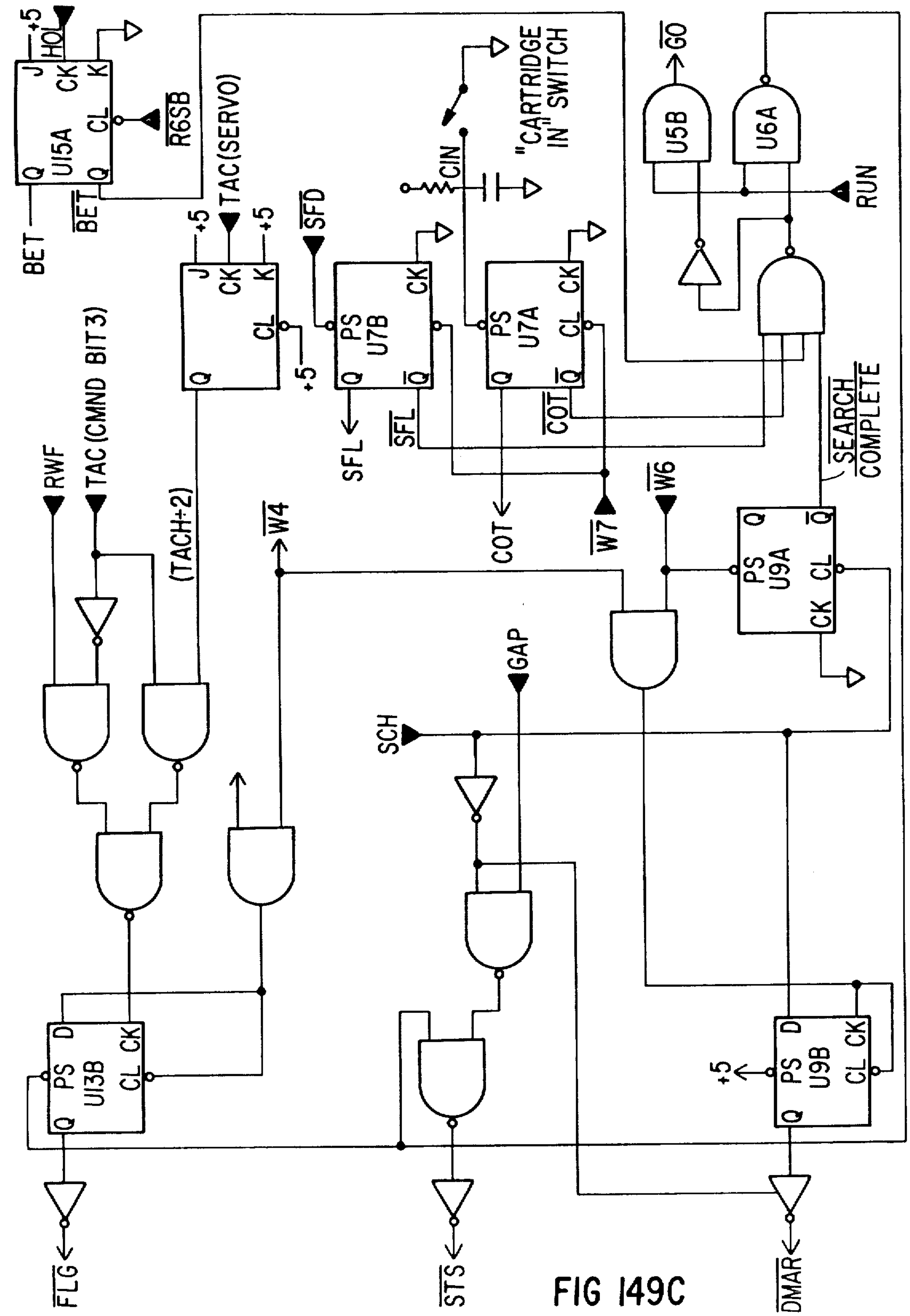

FIG. 149A-C are a detailed schematic diagram of an I/O interface section of the cassette control block of FIG. 4.

Figure 150:
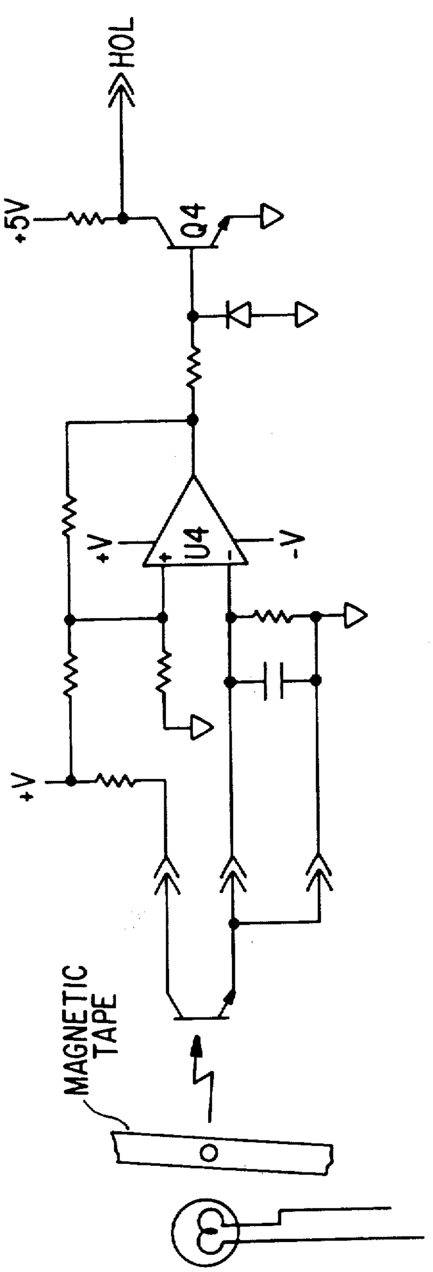

FIG. 150 is a detailed schematic diagram of a tape hole detection circuit section of the magnetic tape cassette unit of FIG. 4.

Figure 151A:
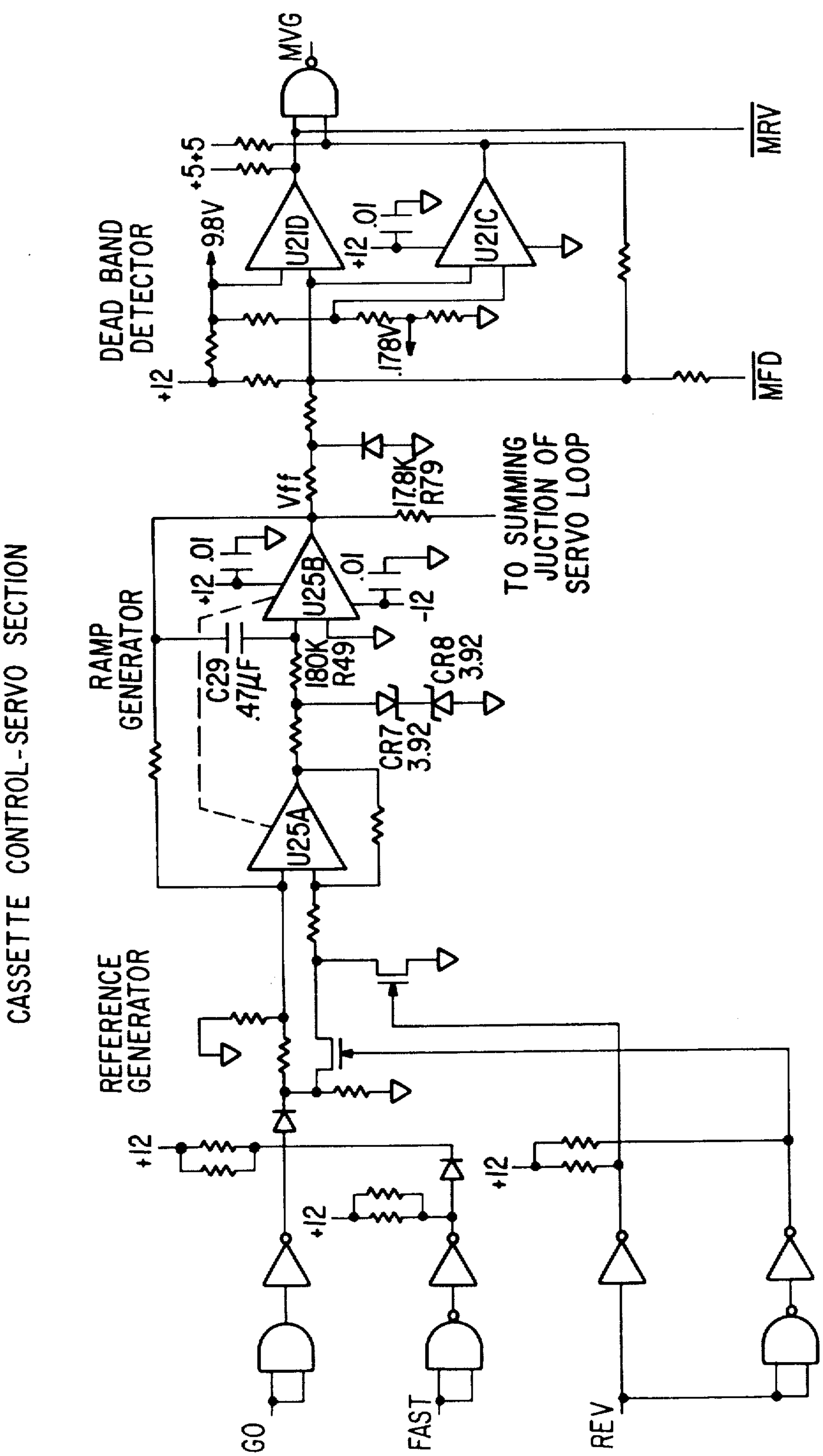
Figure 151B:
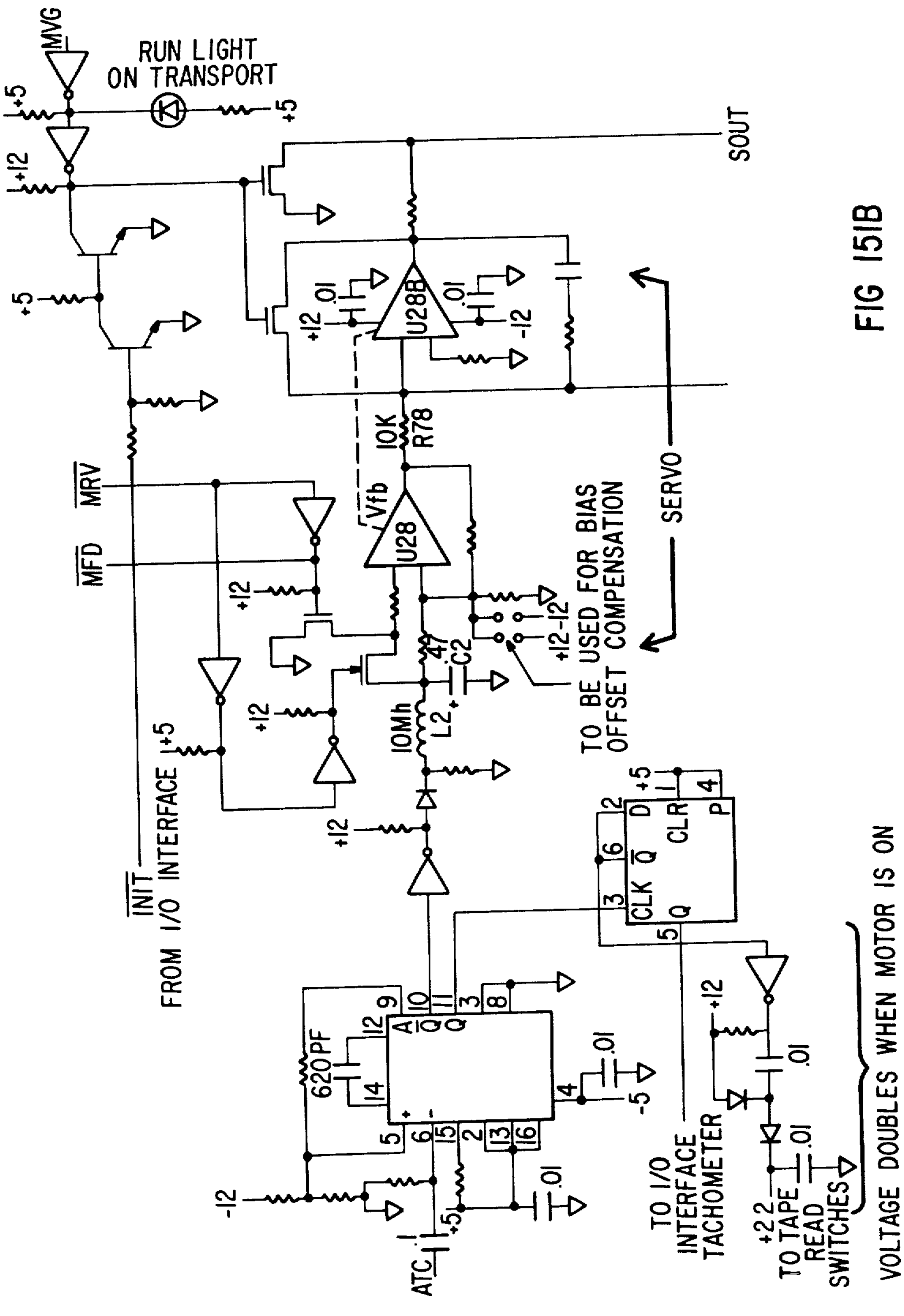
Figure 151C:
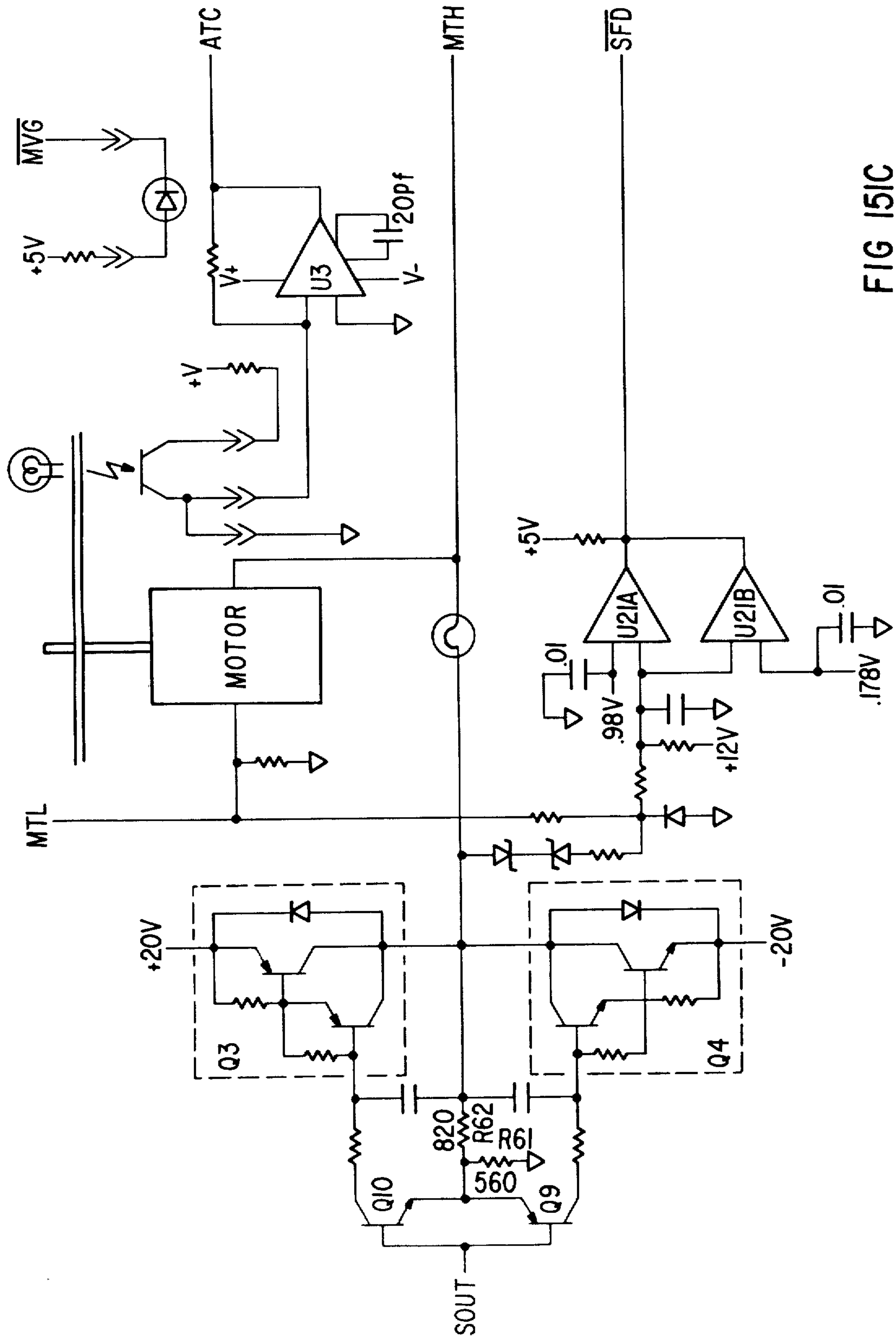

FIGS. 151A-C are a detailed schematic diagram of a servo section of the cassette control block of FIG. 4.

Figure 152:
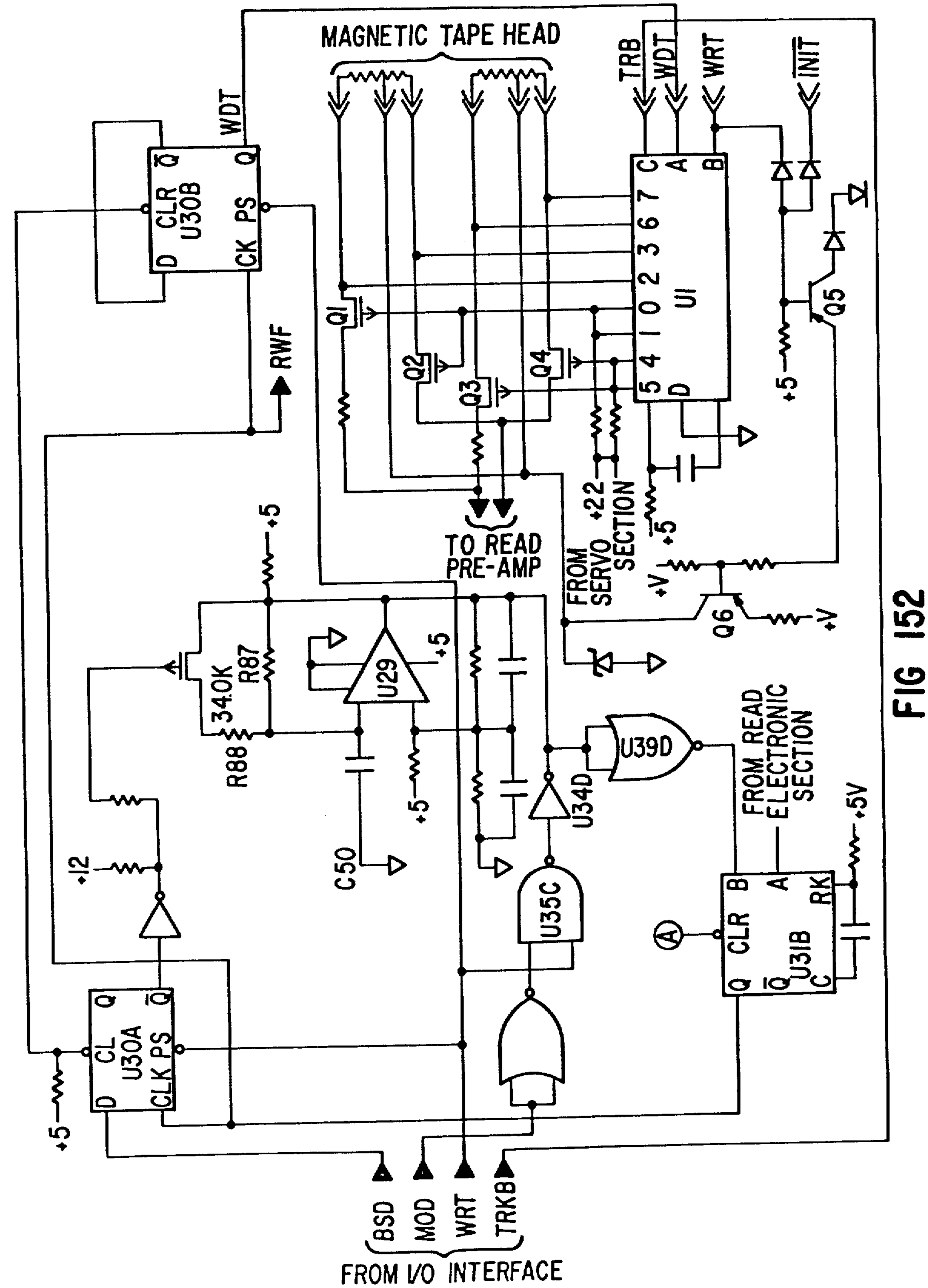

FIG. 152 is a detailed schematic diagram of a write electronics section of the cassette control block of FIG. 4.

Figure 153A:
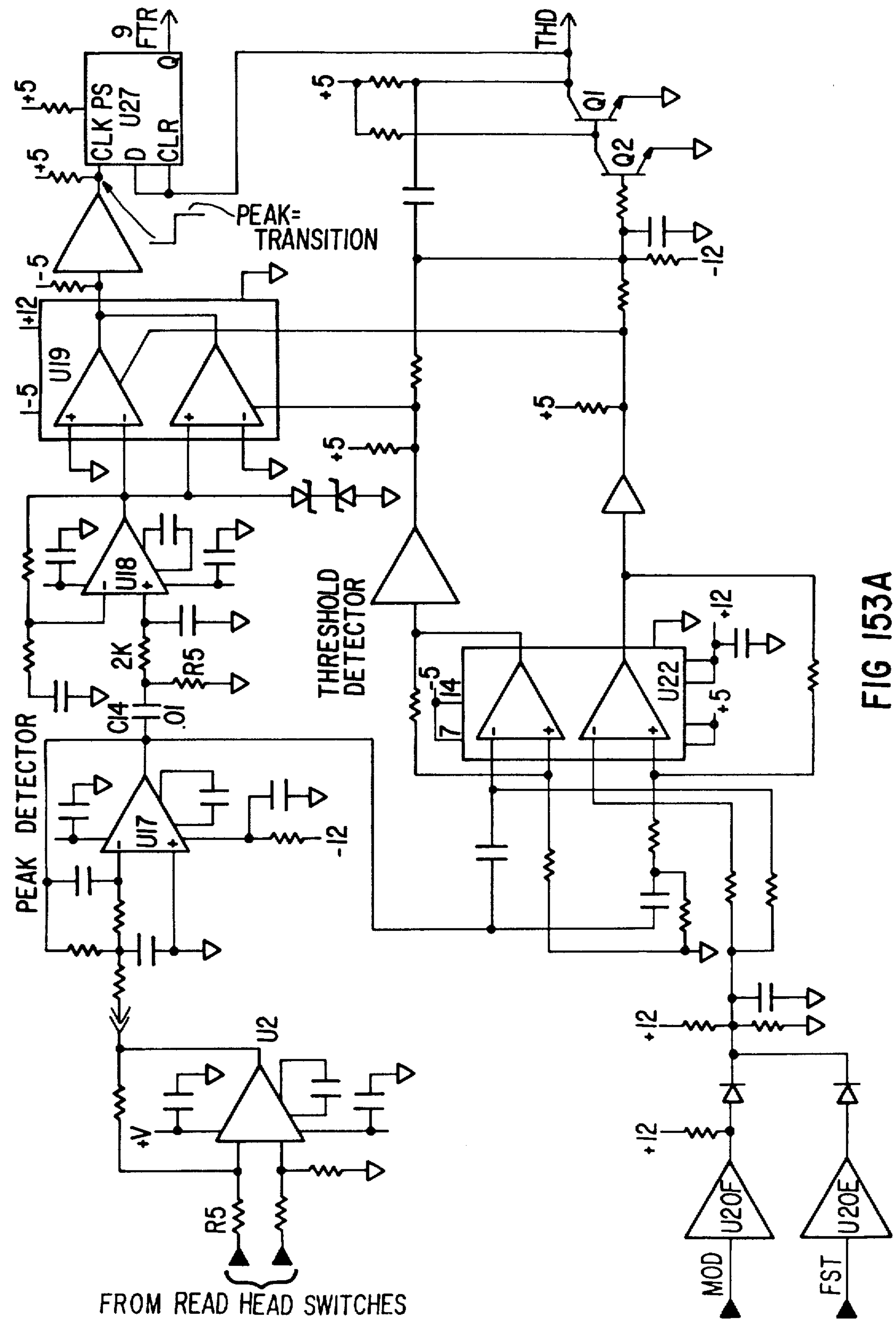
Figure 153B:
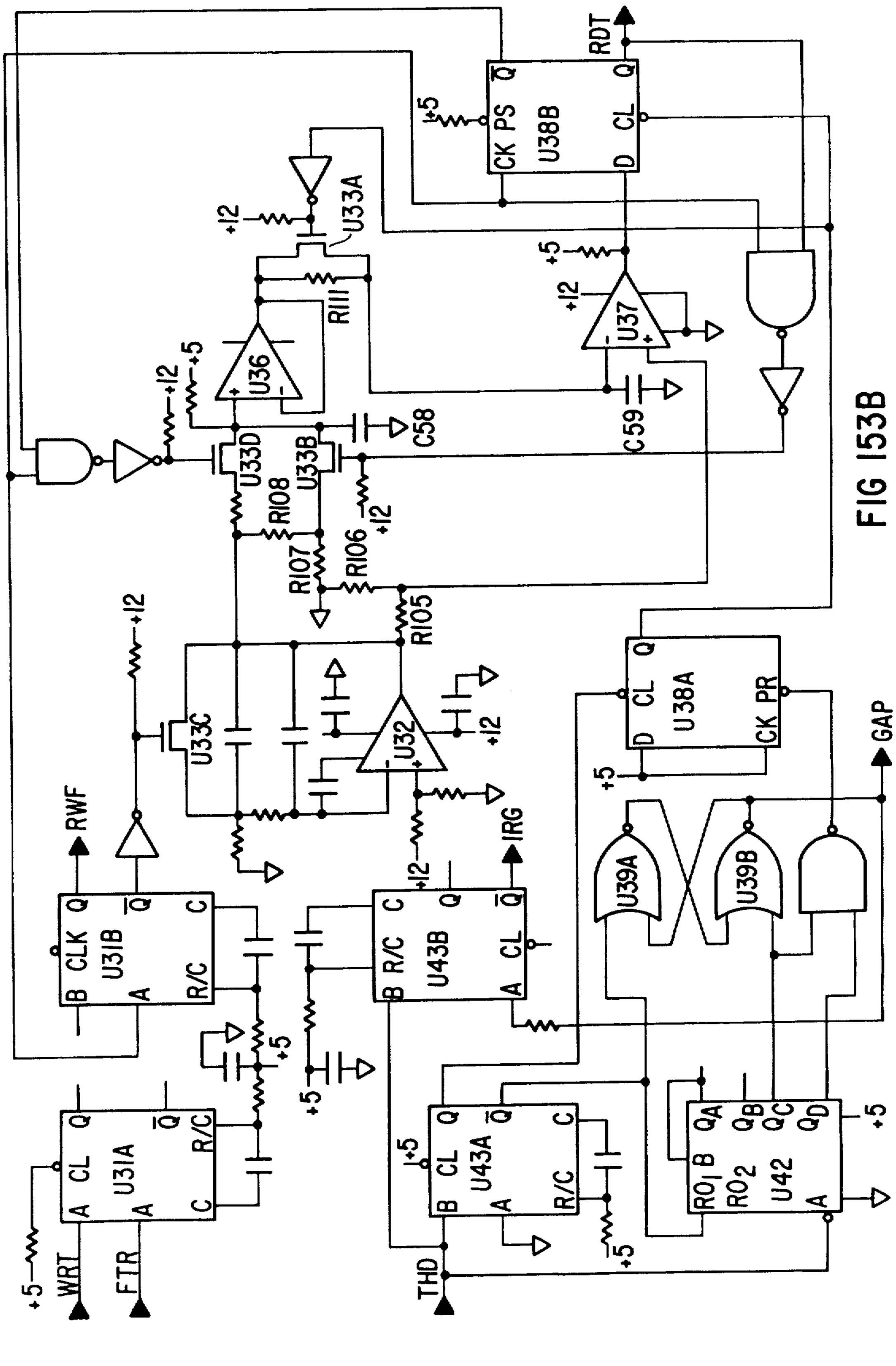

FIGS. 153A-B are a detailed schematic diagram of a read electronics section of the cassette control block of FIG. 4.

Figure 154A:
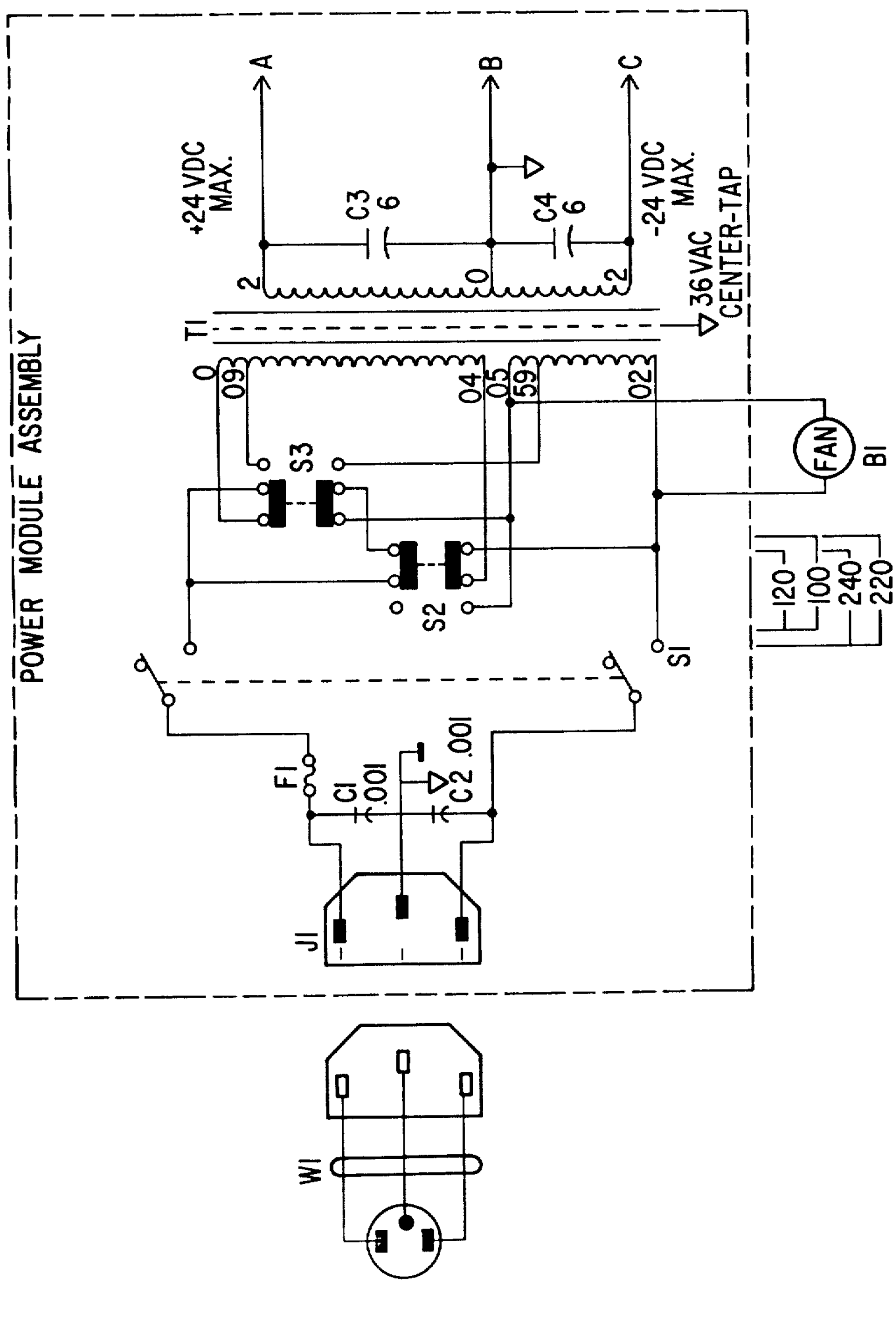
Figure 154B:
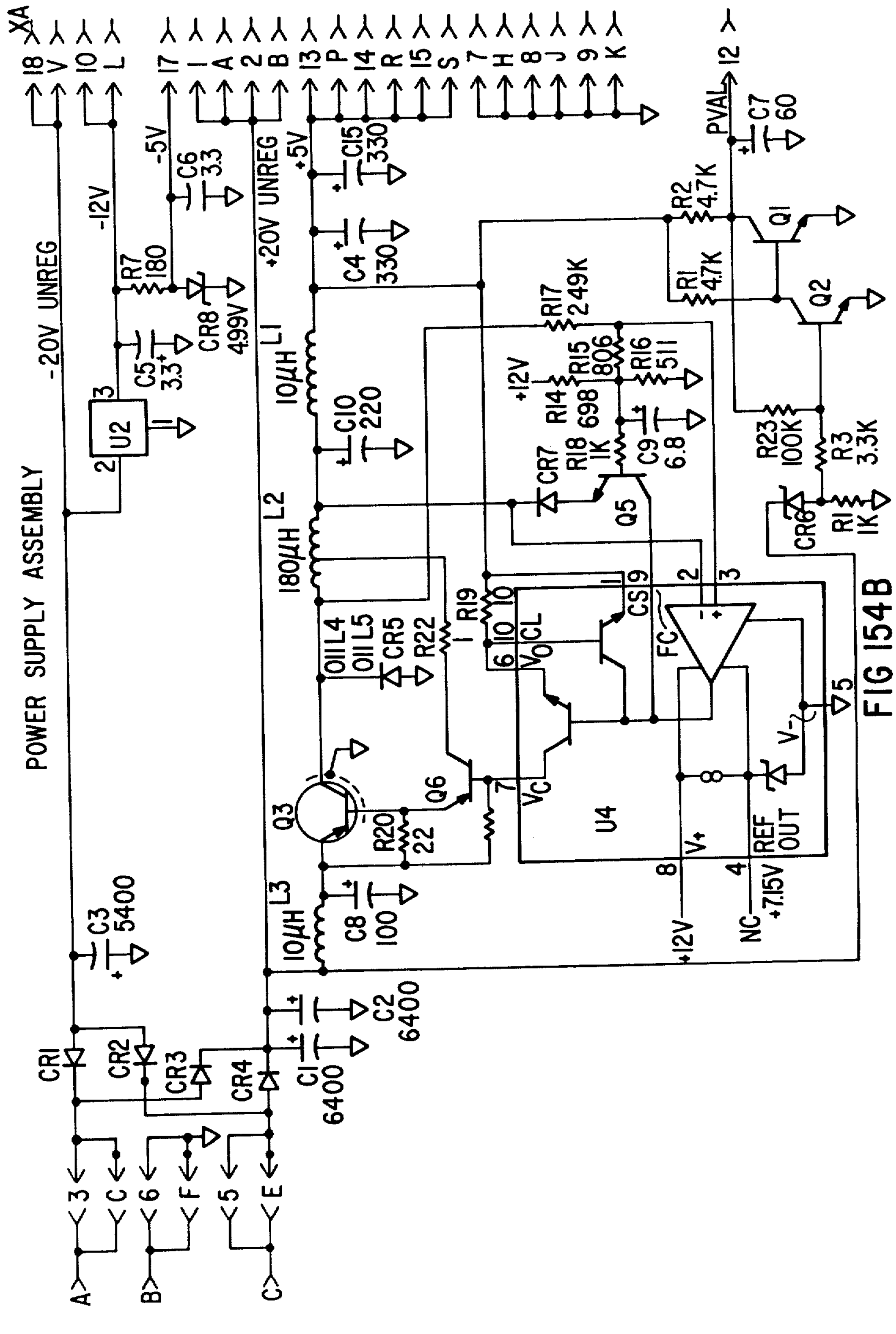
Figure 154C:
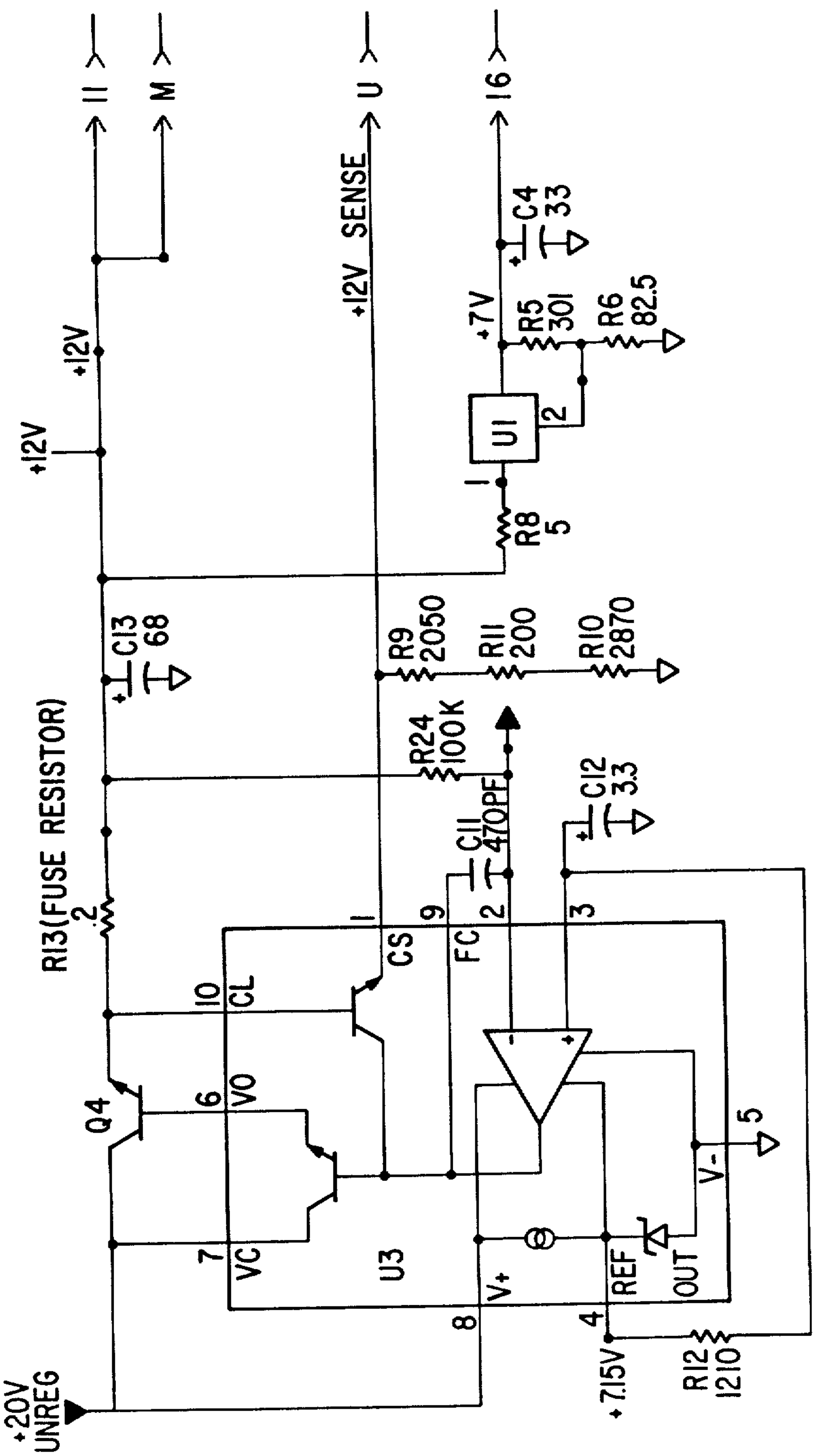

FIGS. 154A-C are a detailed schematic diagram of the power module and power supply blocks of FIG. 4.

Figure 7:
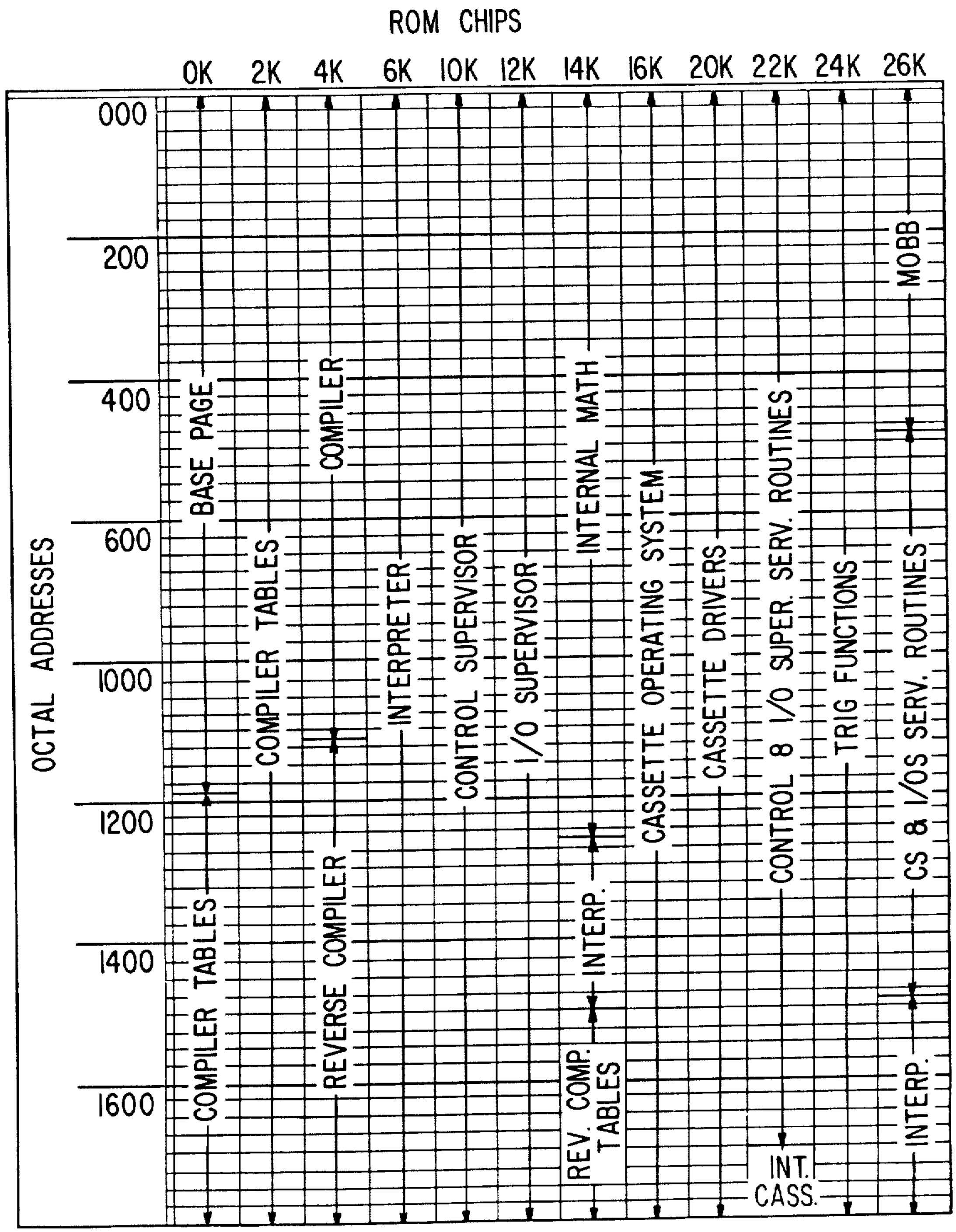
FIG. 7 is a memory map showing the format of each of the twelve individual read-only memory chips within the mainframe language ROM of FIG. 4.
Figure 8:
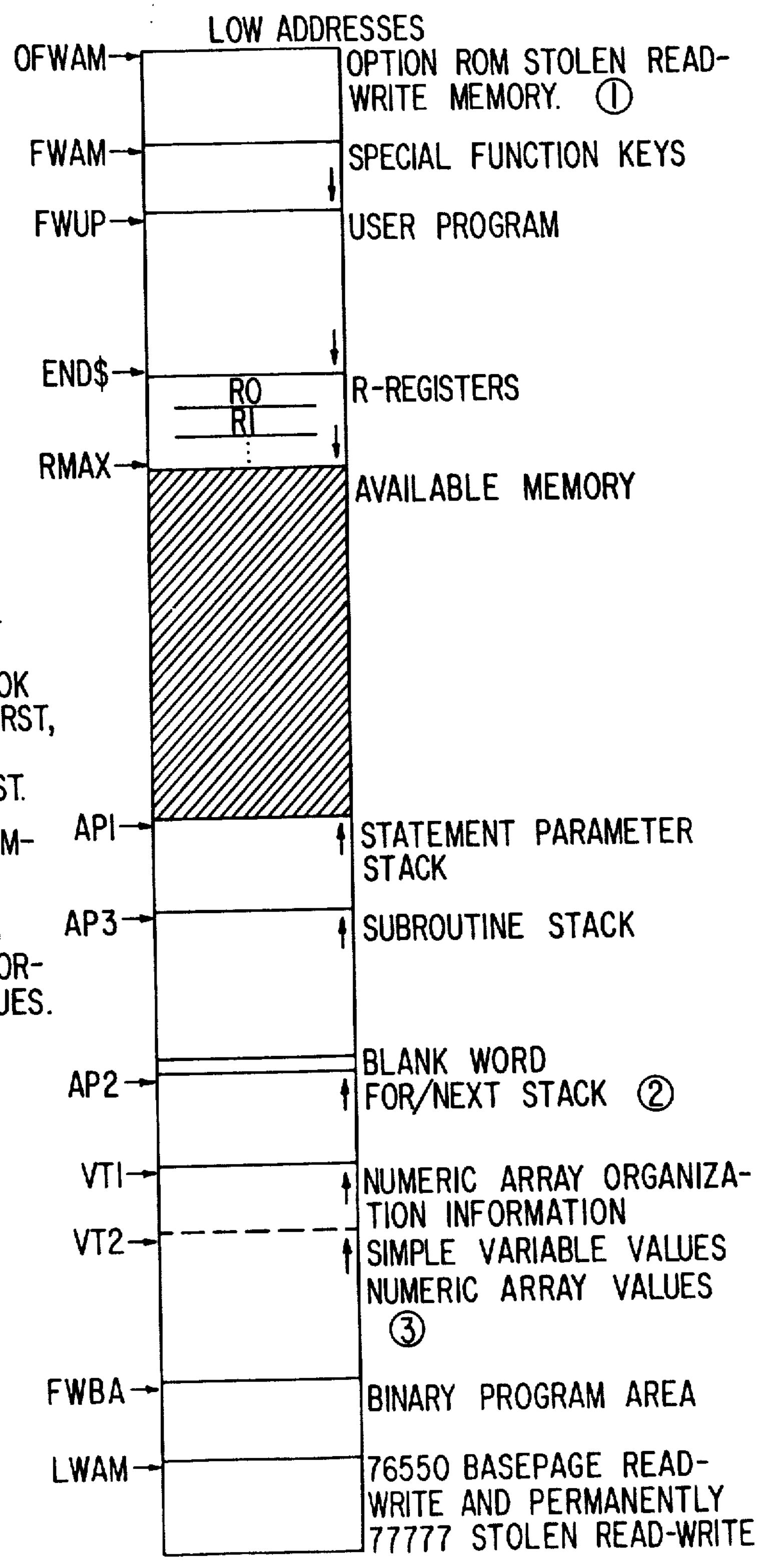
FIG. 8 is a memory map of the basic and optional read-write memories of FIGS. 4 and 6.
Figure 9:
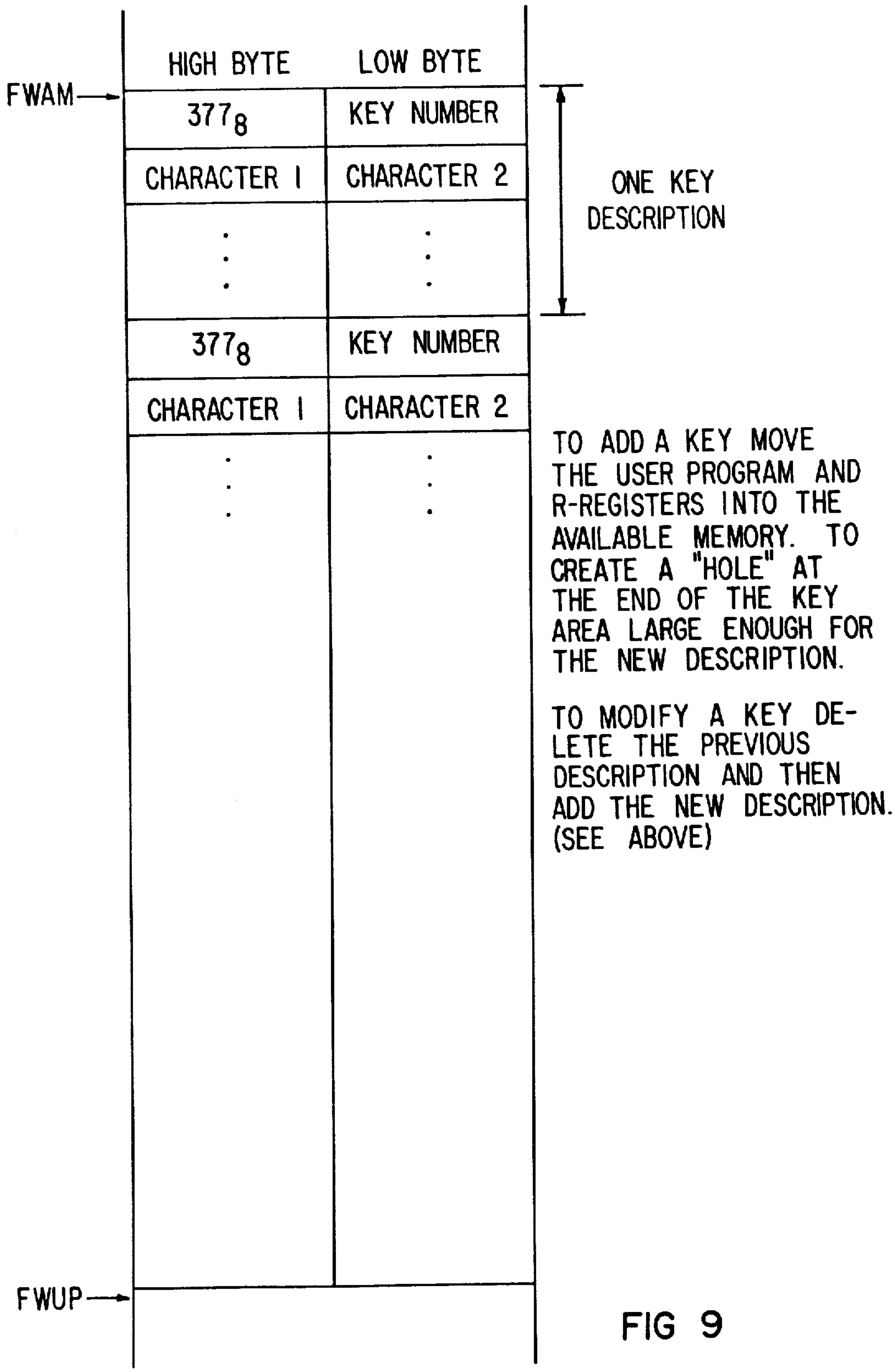
FIG. 9 is a detailed memory map of a portion of the read-write memory of FIG. 8 that is reserved for the special function keys.
Figure 10:
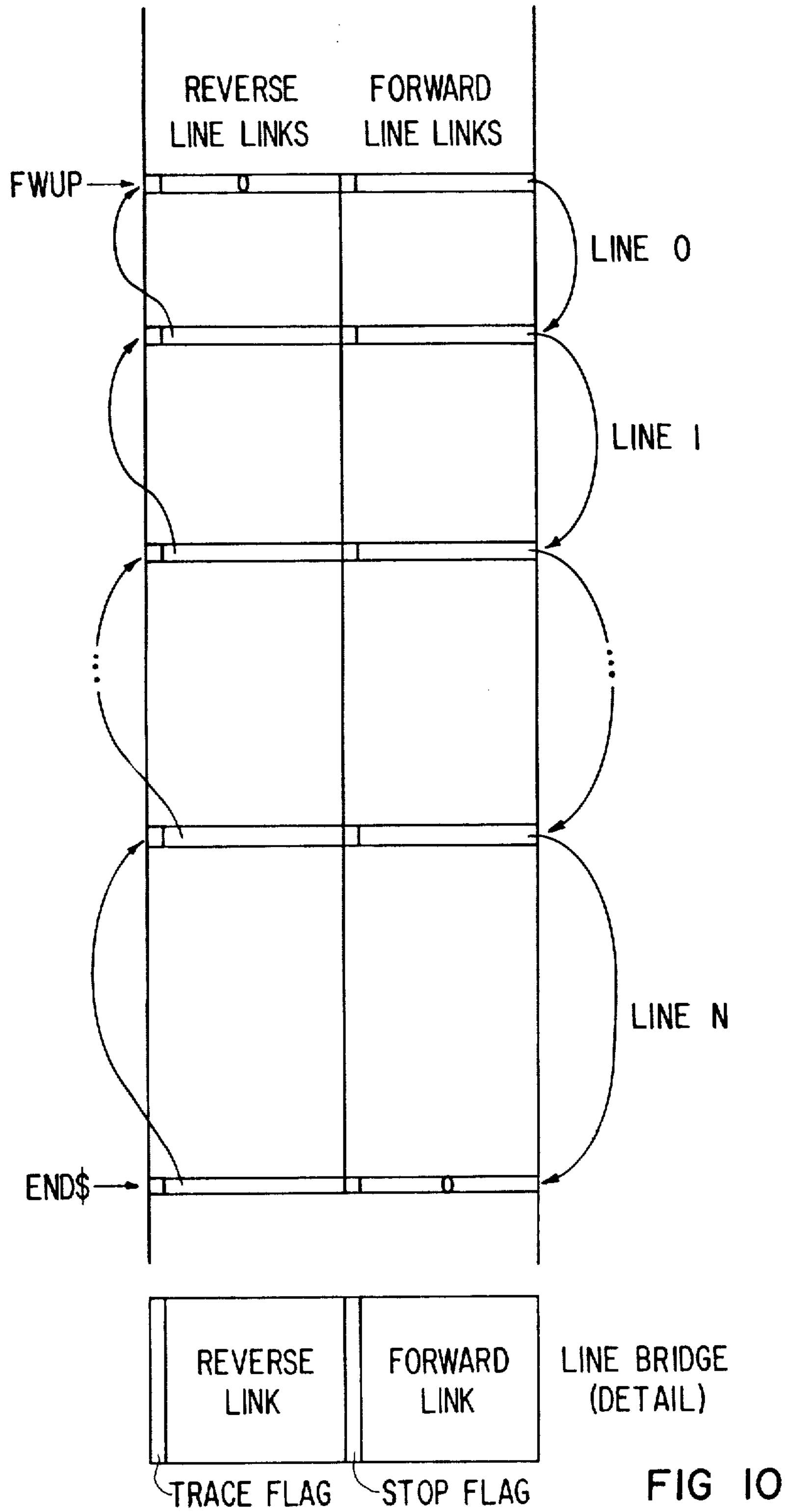
FIG. 10 is a detailed memory map of the portion of the read-write memory of FIG. 8 that is employed as a user program area.
Figure 12:
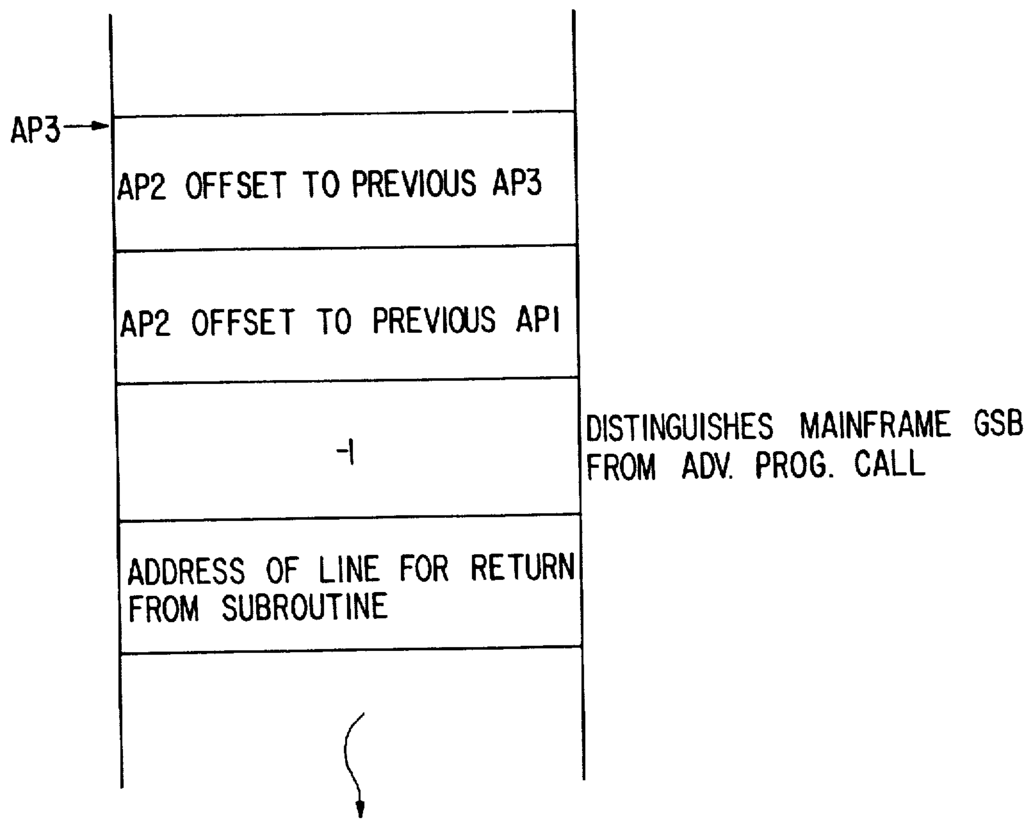
FIG. 12 is a detailed memory map of the portion of the read-write memory of FIG. 8 that is employed as a subroutine stack.
Figure 13:
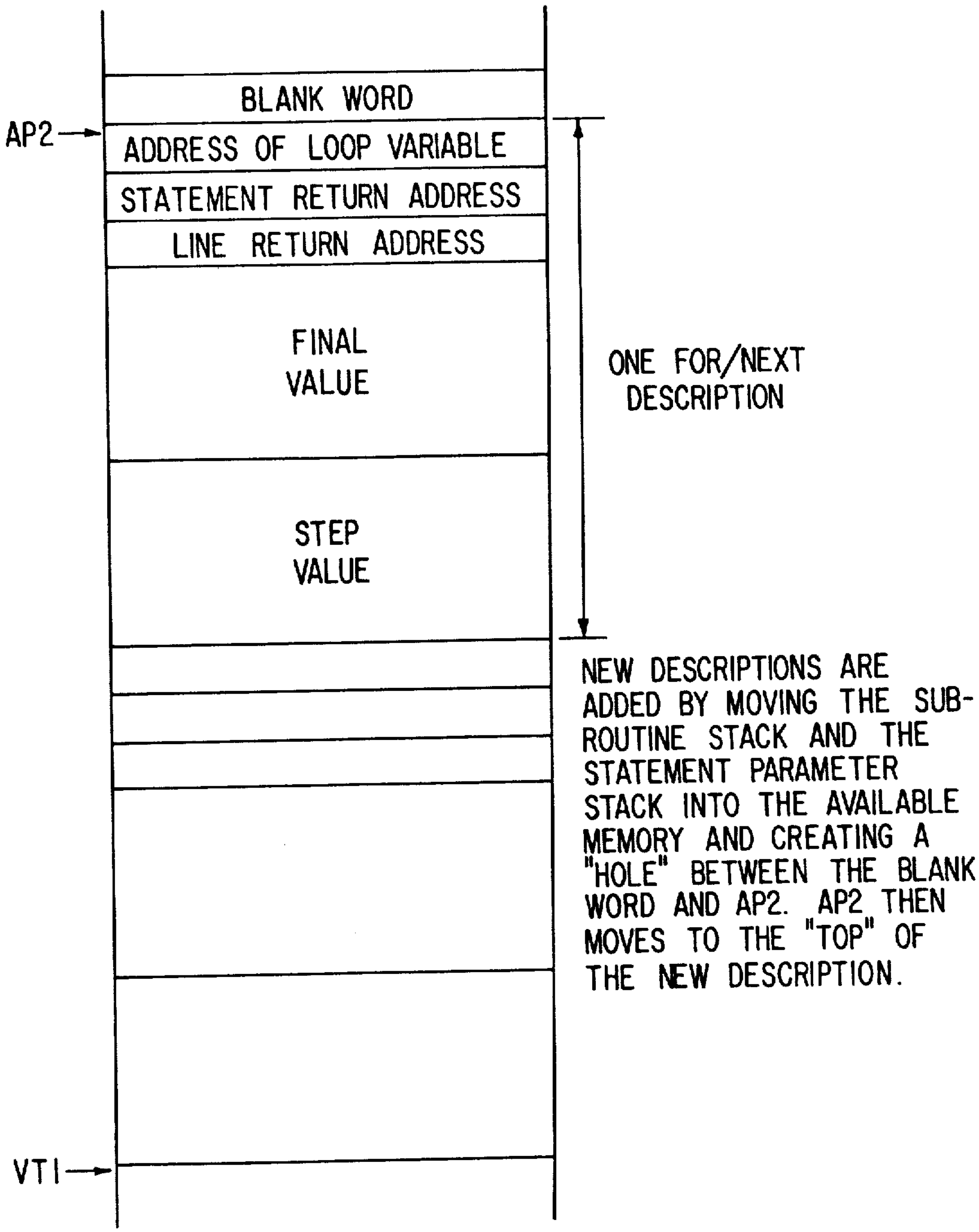
FIG. 13 is a detailed memory map of the portion of the read-write memory of FIG. 8 that is employed as a for/next stack.
Figure 14A:
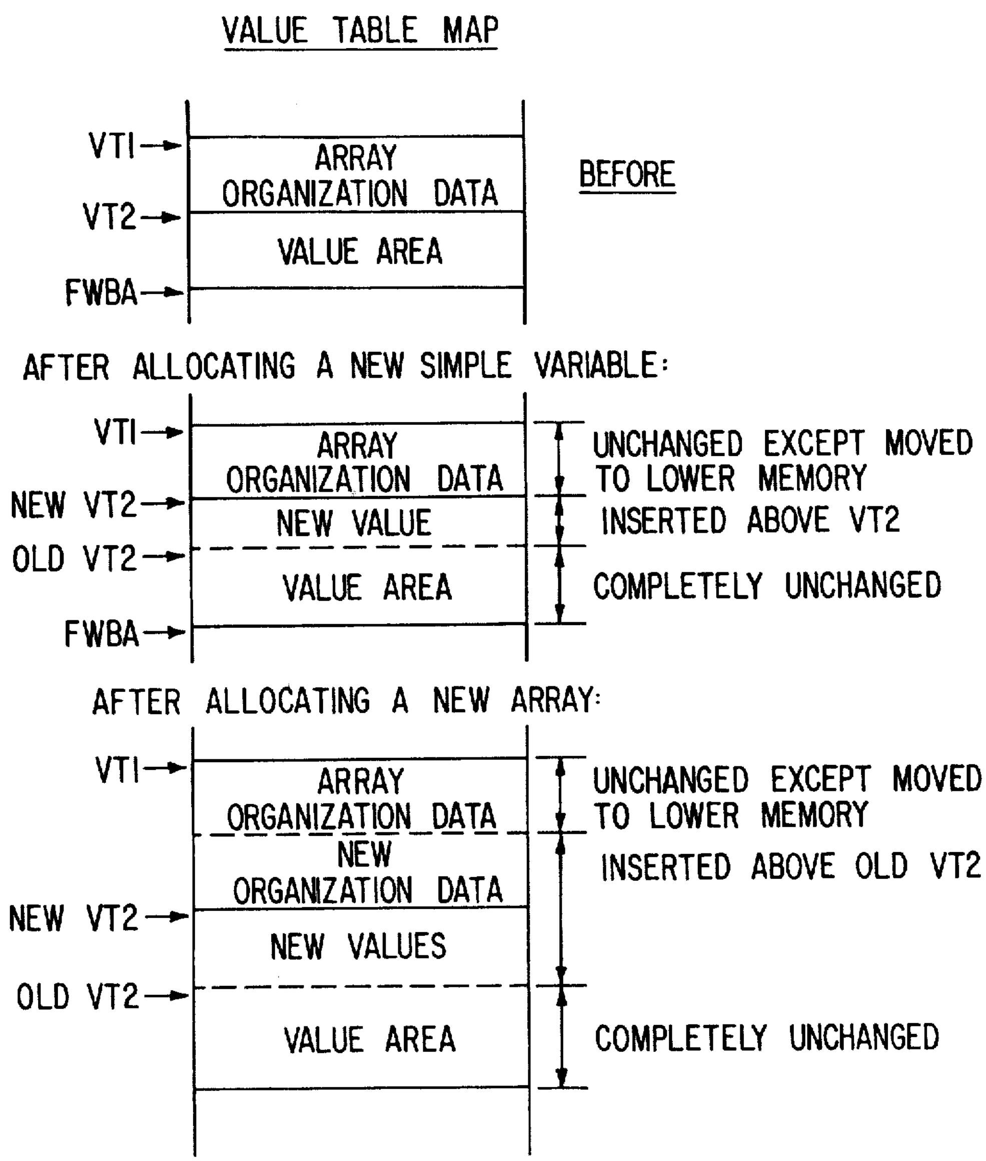
FIGS. 14A–B are a detailed memory map of the portion of the read-write memory of FIG. 8 that is employed as a value table.
Figure 14B:
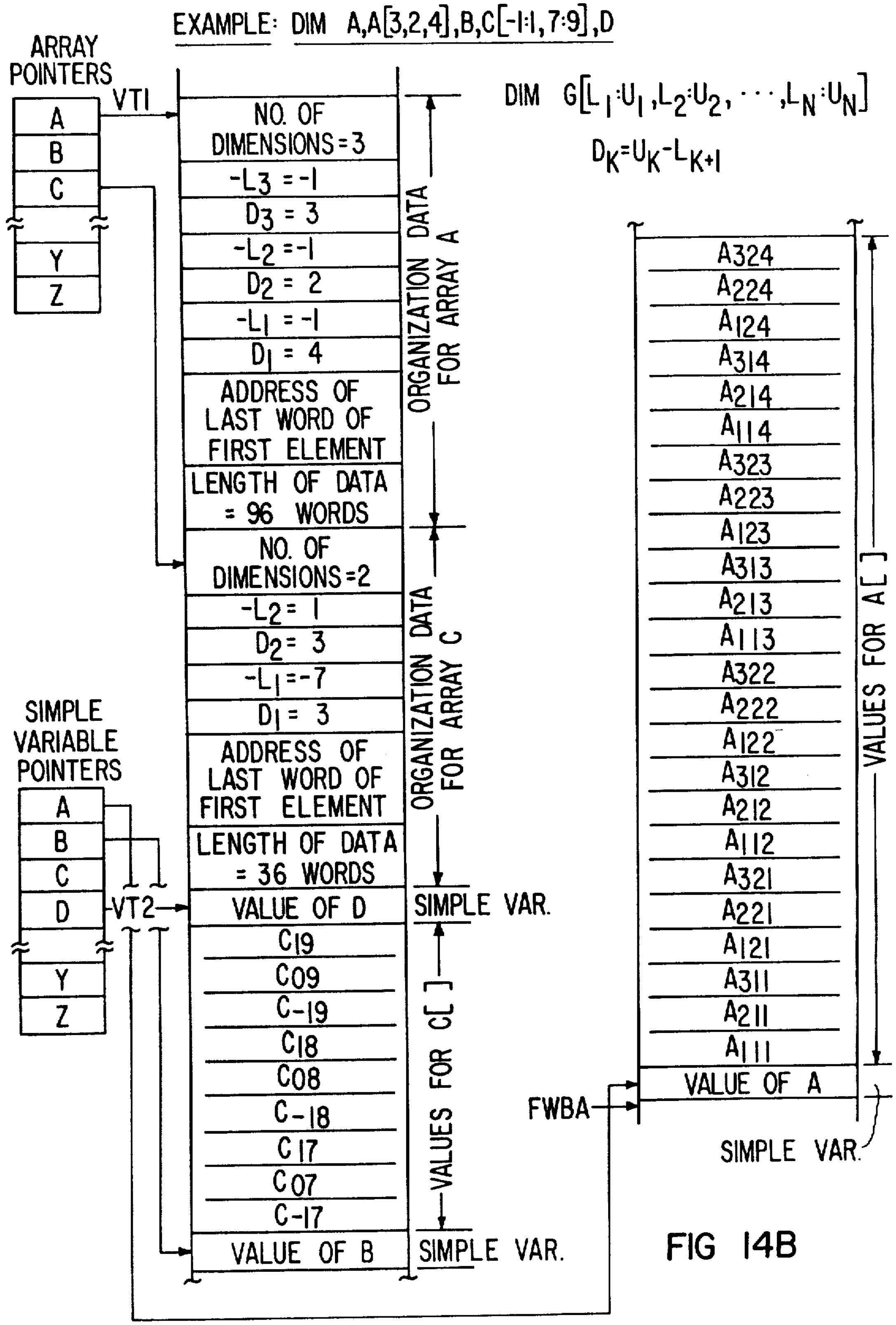
Figure 15:
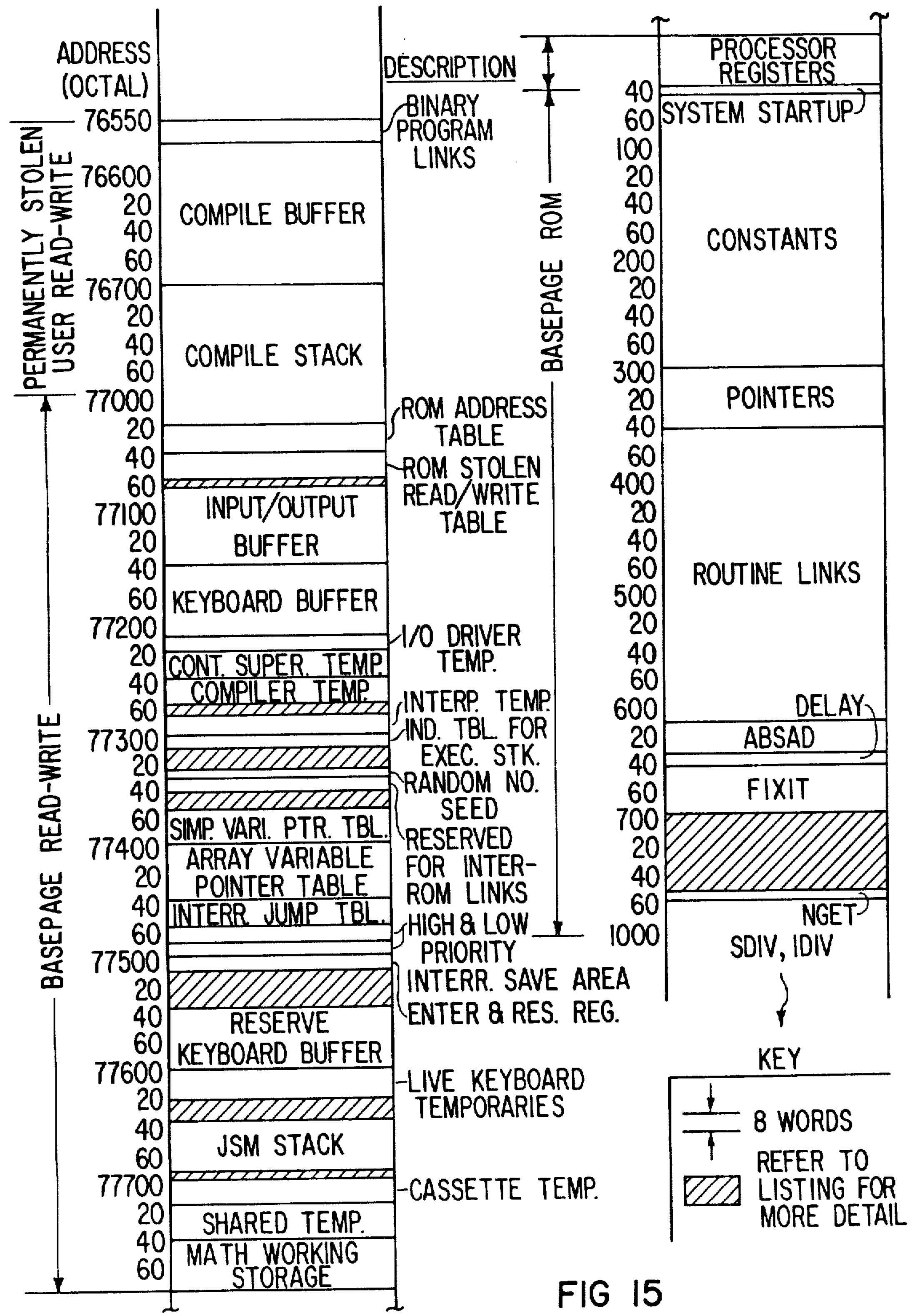
FIG. 15 is a detailed memory map of the base page portions of the language read-only memory of FIG. 7 and the read-write memory of FIG. 8.
Figure 155:
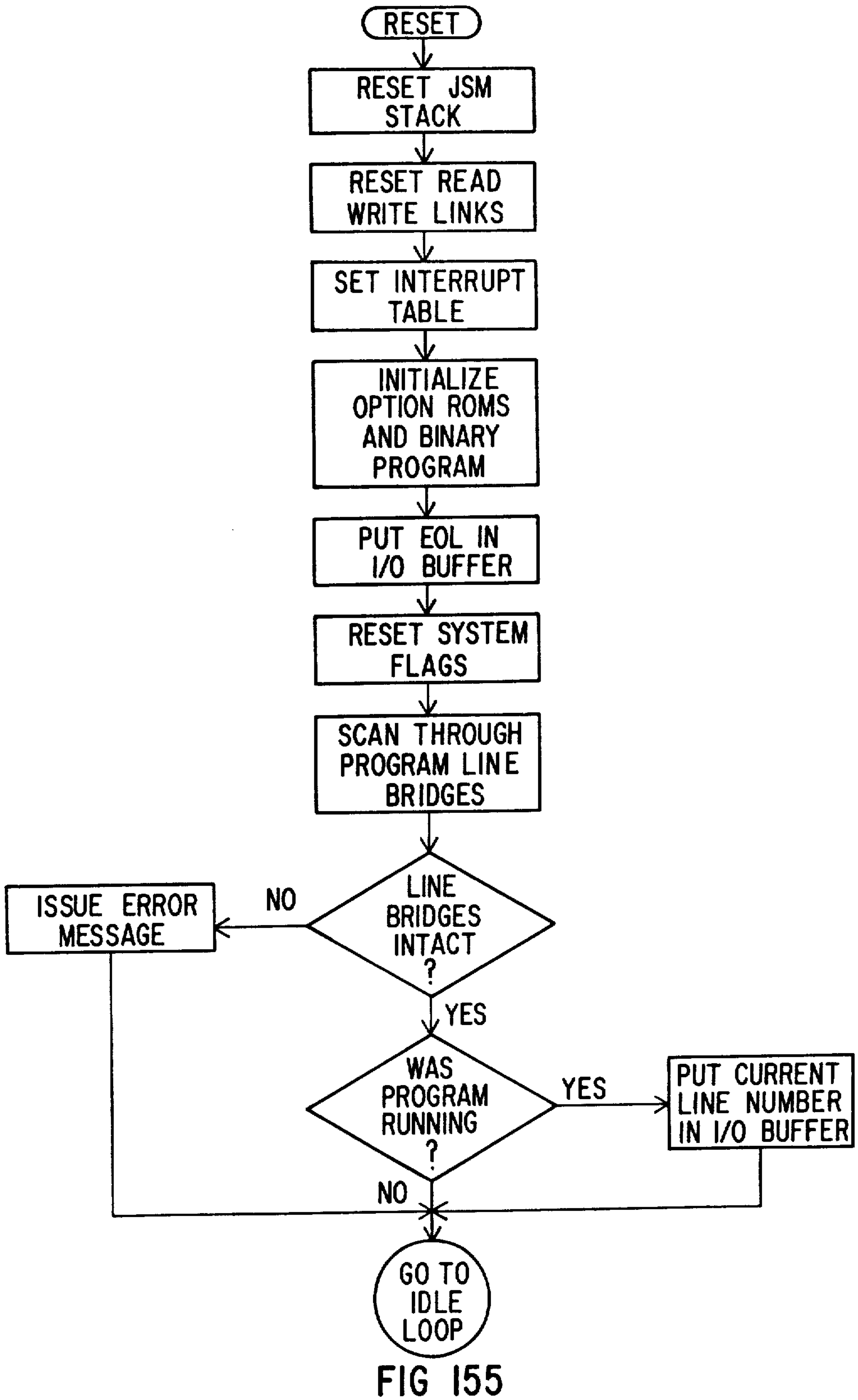

FIG. 155 is a flow chart of a reset subroutine stored in the mainframe language ROM of FIGS. 4 and 7.

Figure 156A:
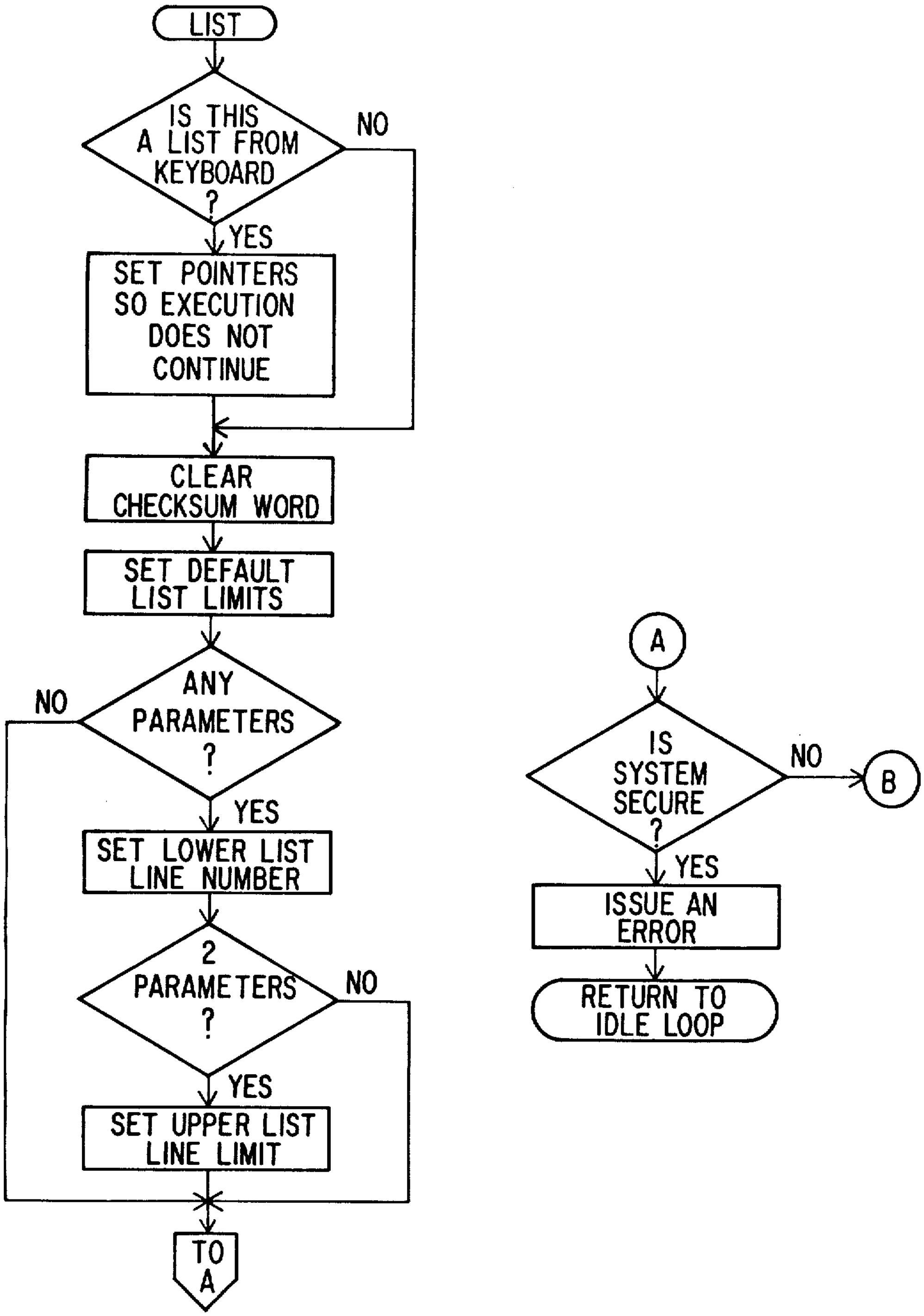
Figure 156B:
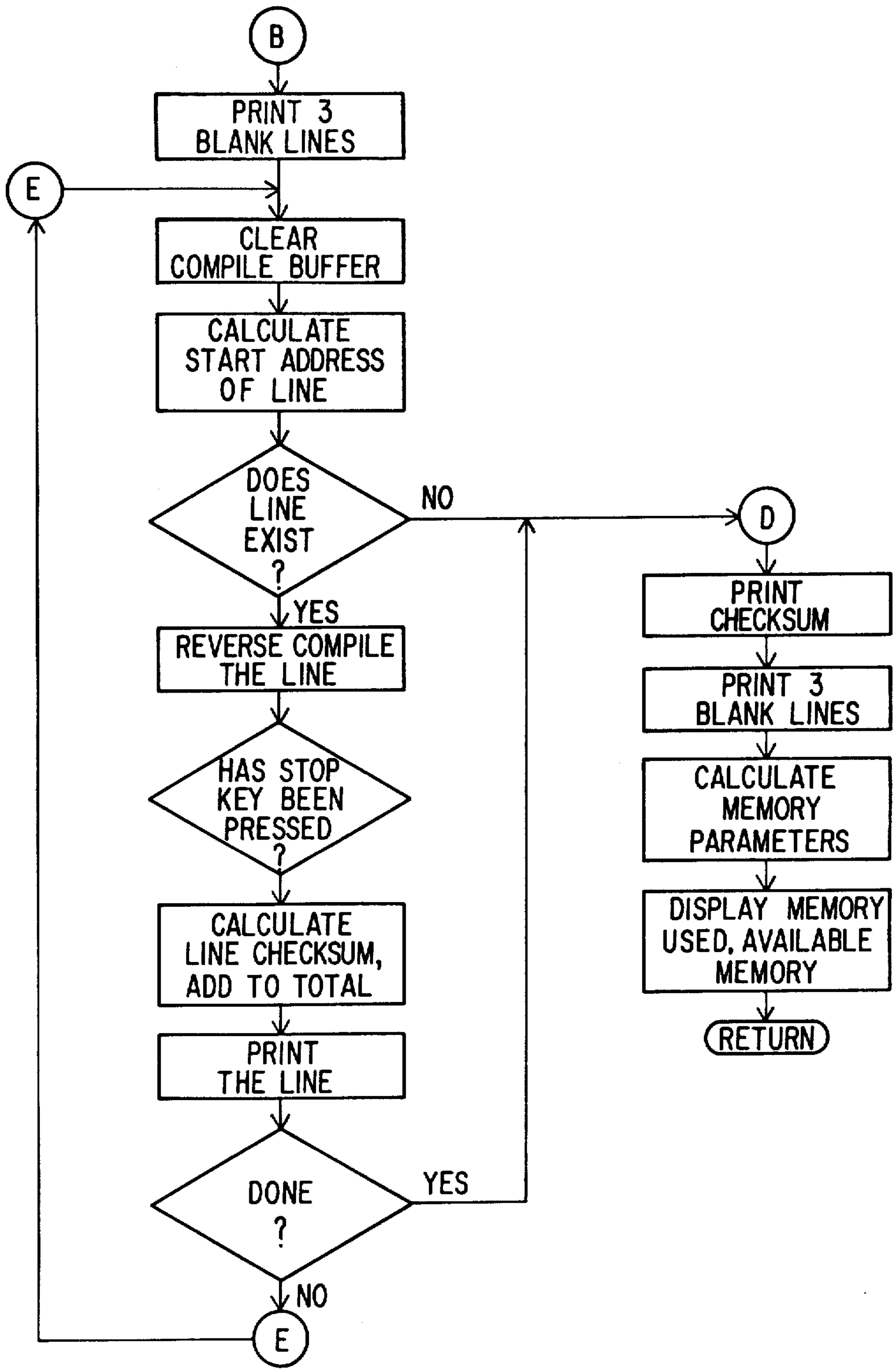

FIGS. 156A-B are a flow chart of a list subroutine stored in the mainframe language ROM of FIGS. 4 and 7.

Figure 157:
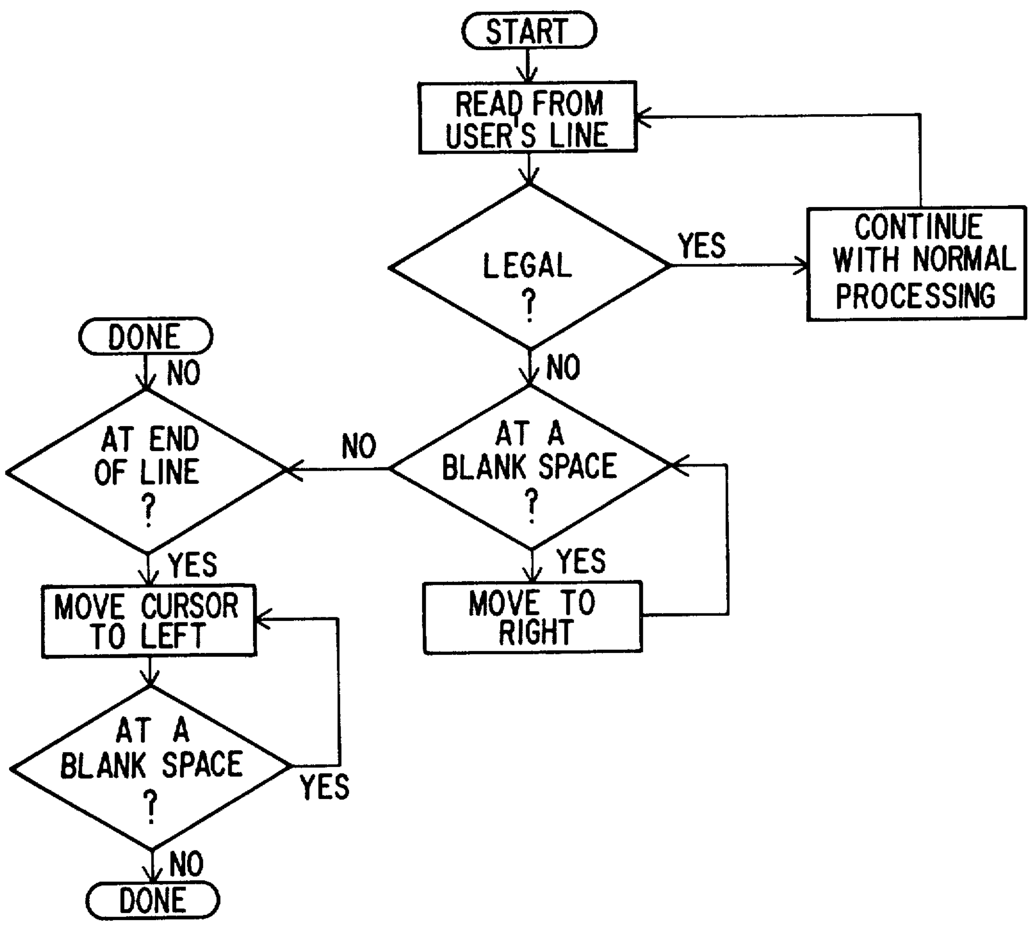

FIG. 157 is a flow chart of a flashing cursor subroutine stored in the mainframe language ROM of FIGS. 4 and 7.

Figure 1:
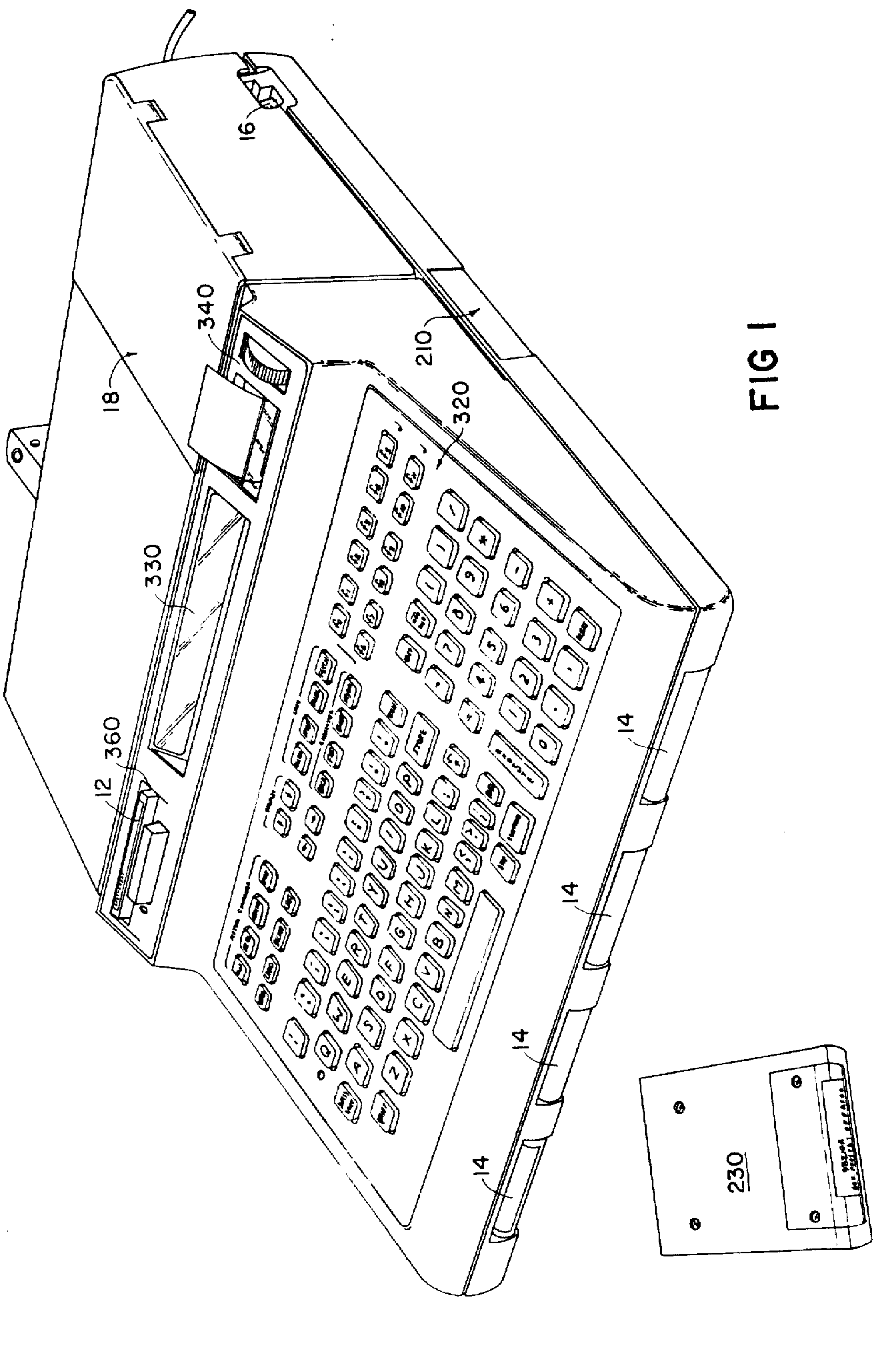
FIG. 1 is a front perspective viw of a programmable calculator according to the preferred embodiment of this invention.
Figure 158A:
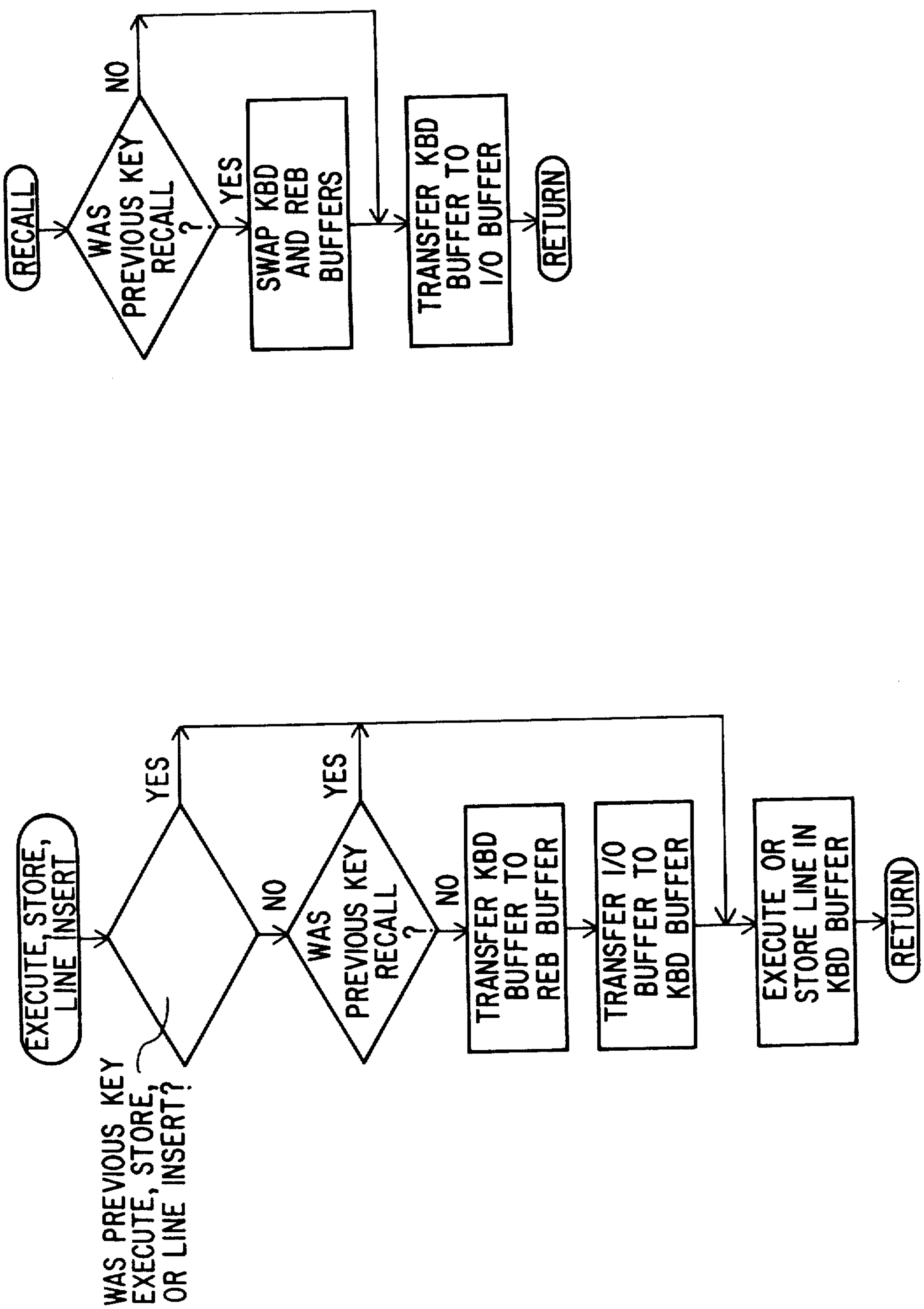
Figure 158B:
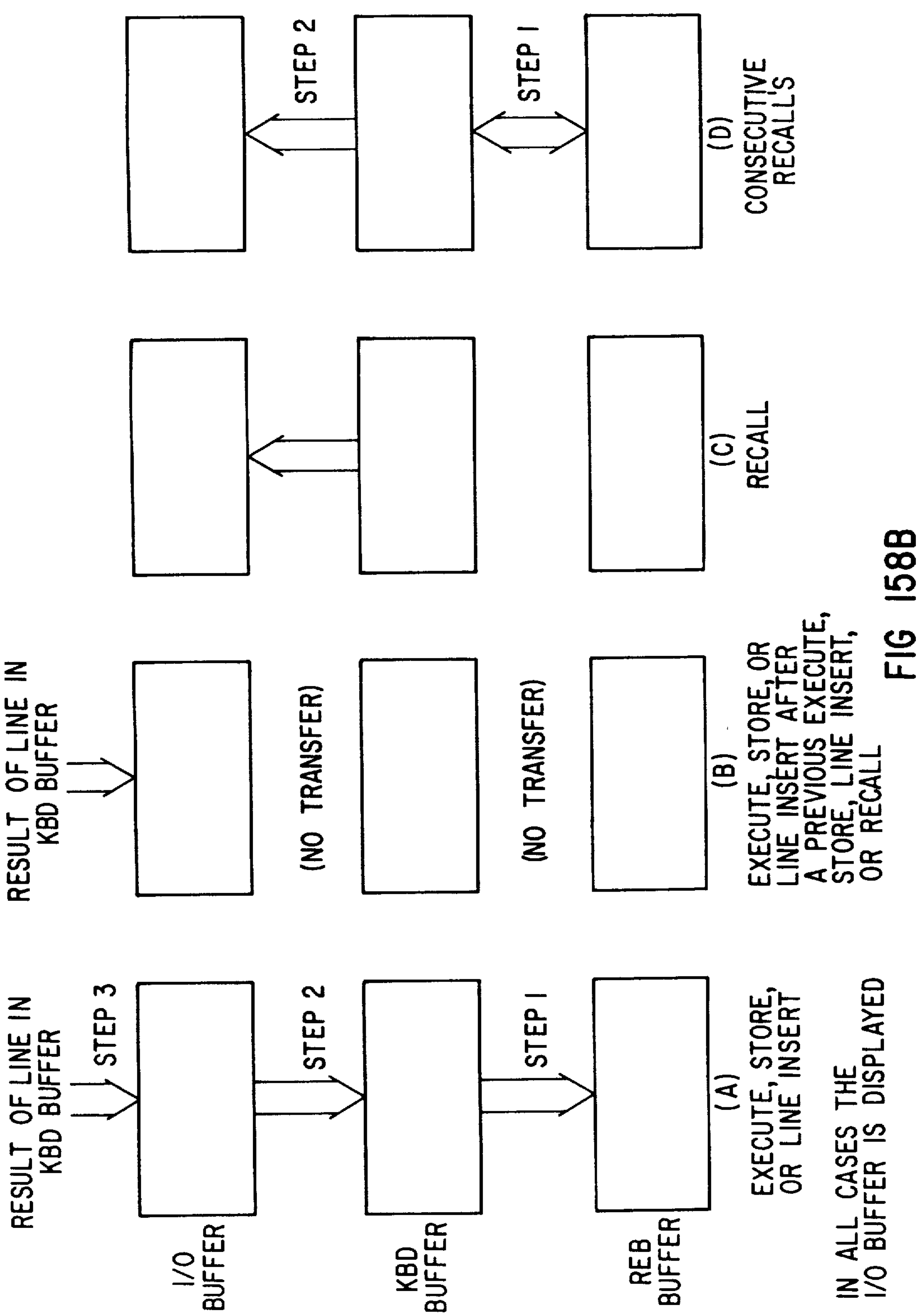

FIGS. 158A-B are a flow chart illustrating a double buffering feature of the calculator of FIG. 1.

FIGS. 159A-L are a flow chart of line editing subroutines stored in the mainframe language ROM of FIGS. 4 and 7.

FIGS. 160A-D are a flow chart of array allocation subroutines stored in the mainframe language ROM of FIGS. 4 and 7.

Figure 161:
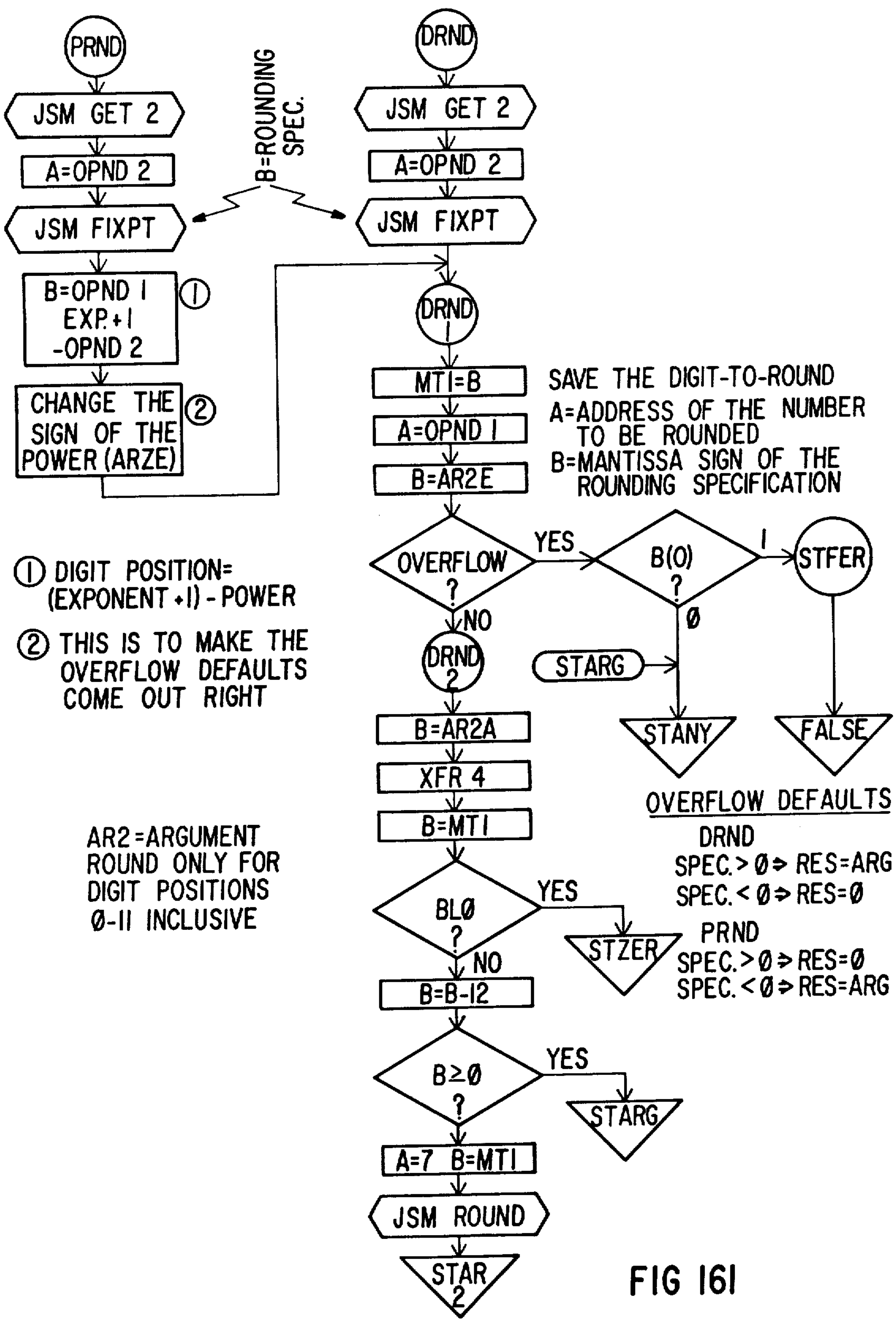

FIG. 161 is a flow chart of two rounding subroutines stored in the mainframe language ROM of FIGS. 4 and 7.

Figure 162:
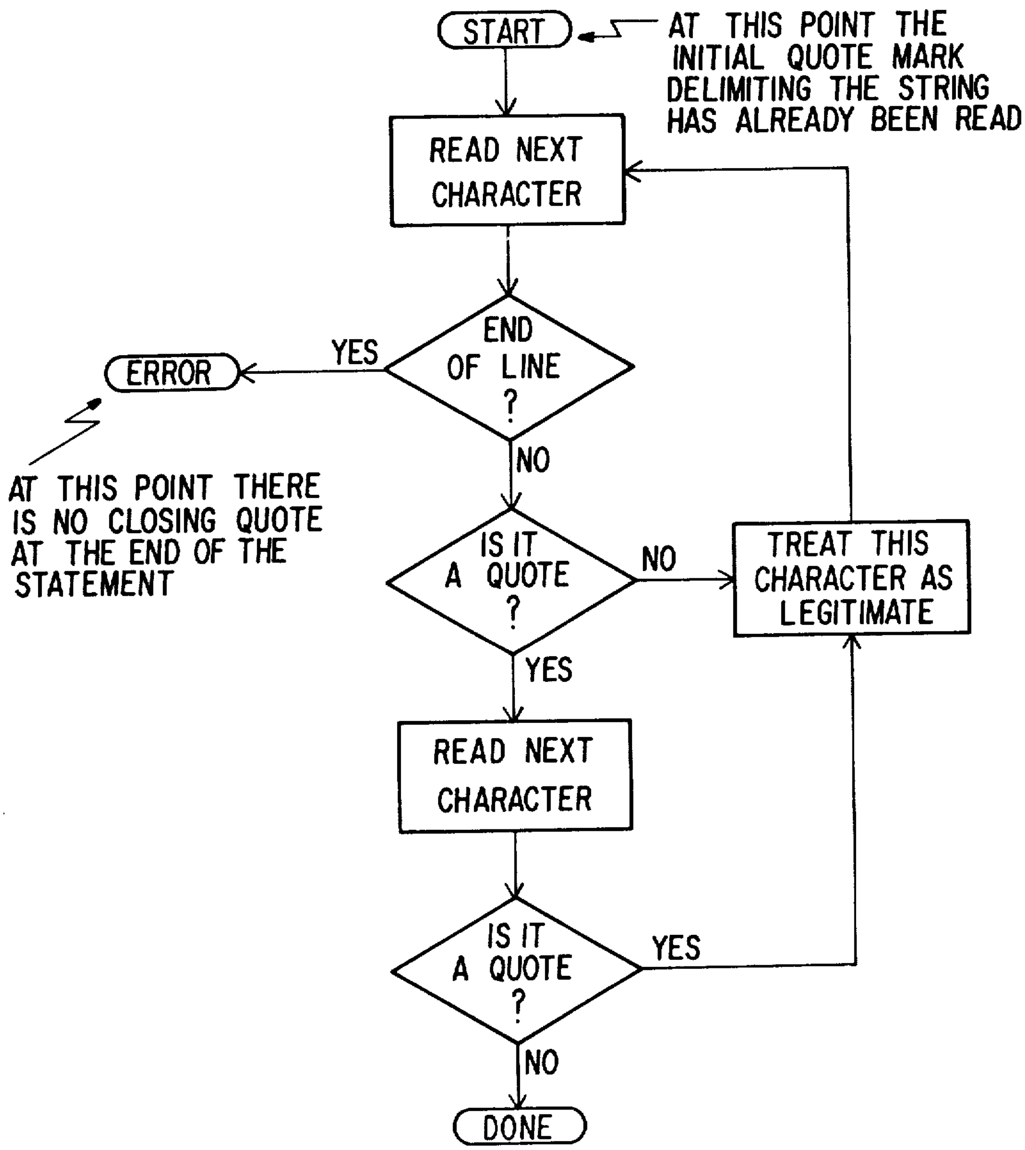
Figure 163A:
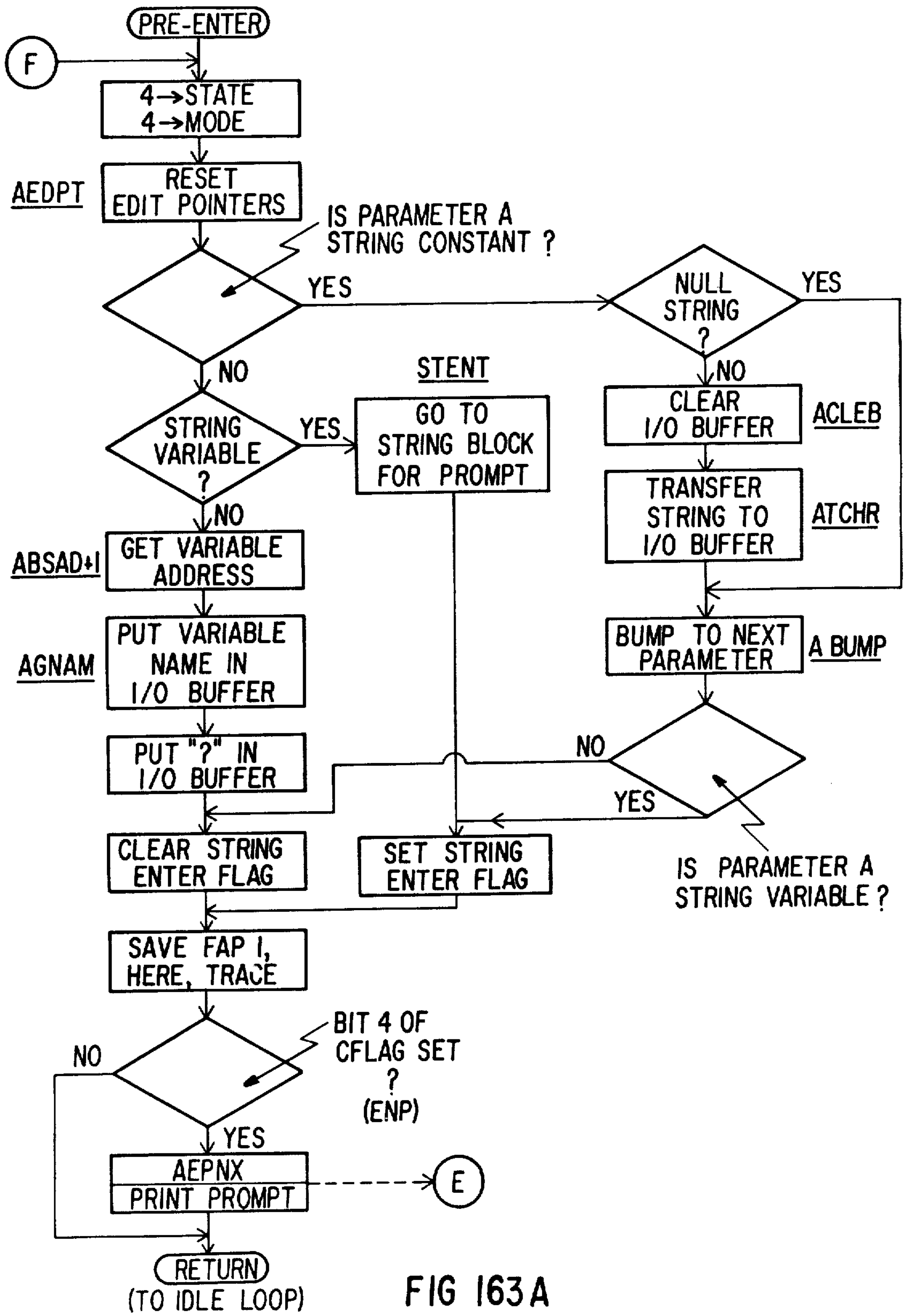
Figure 163B:
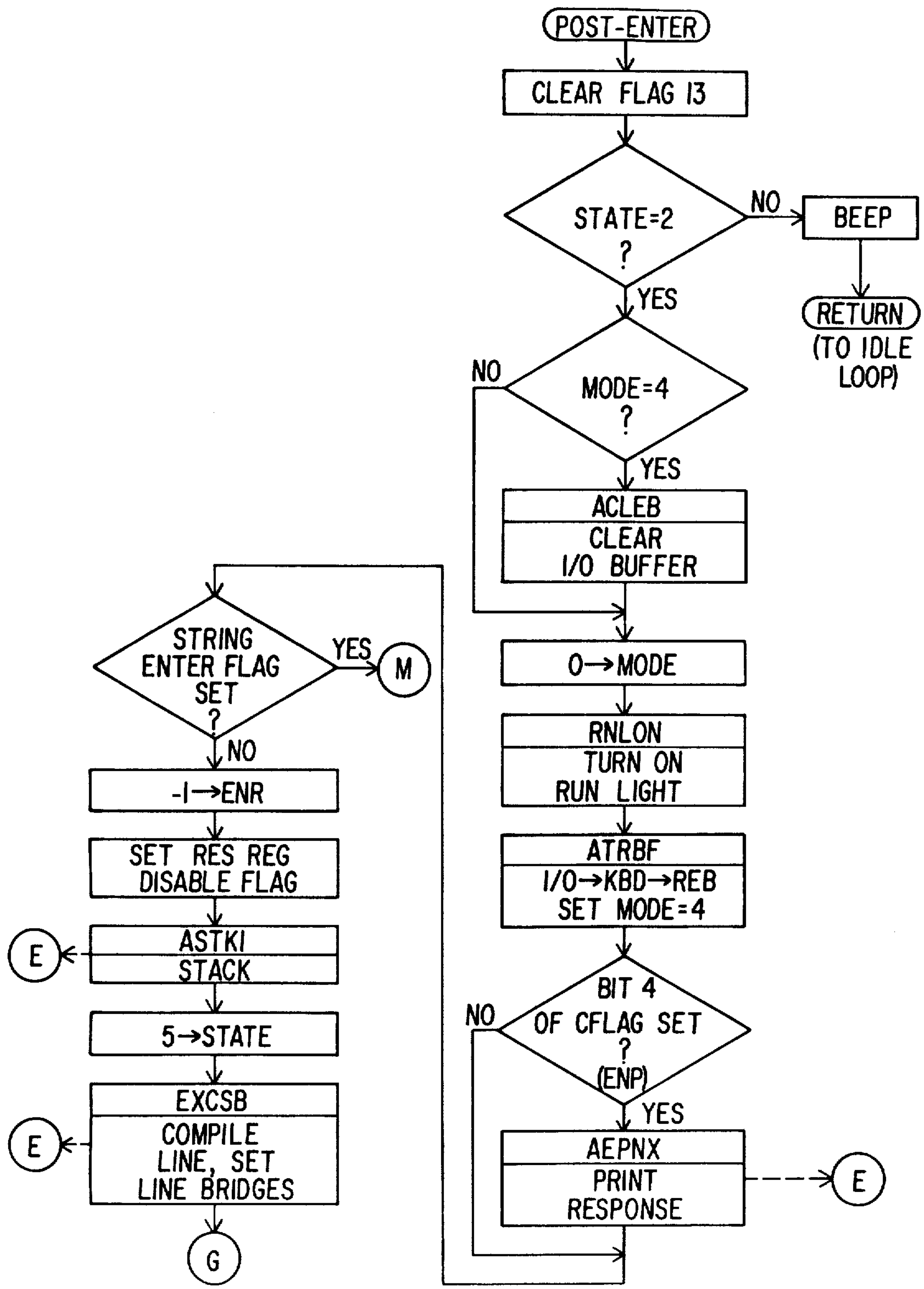
Figure 163C:
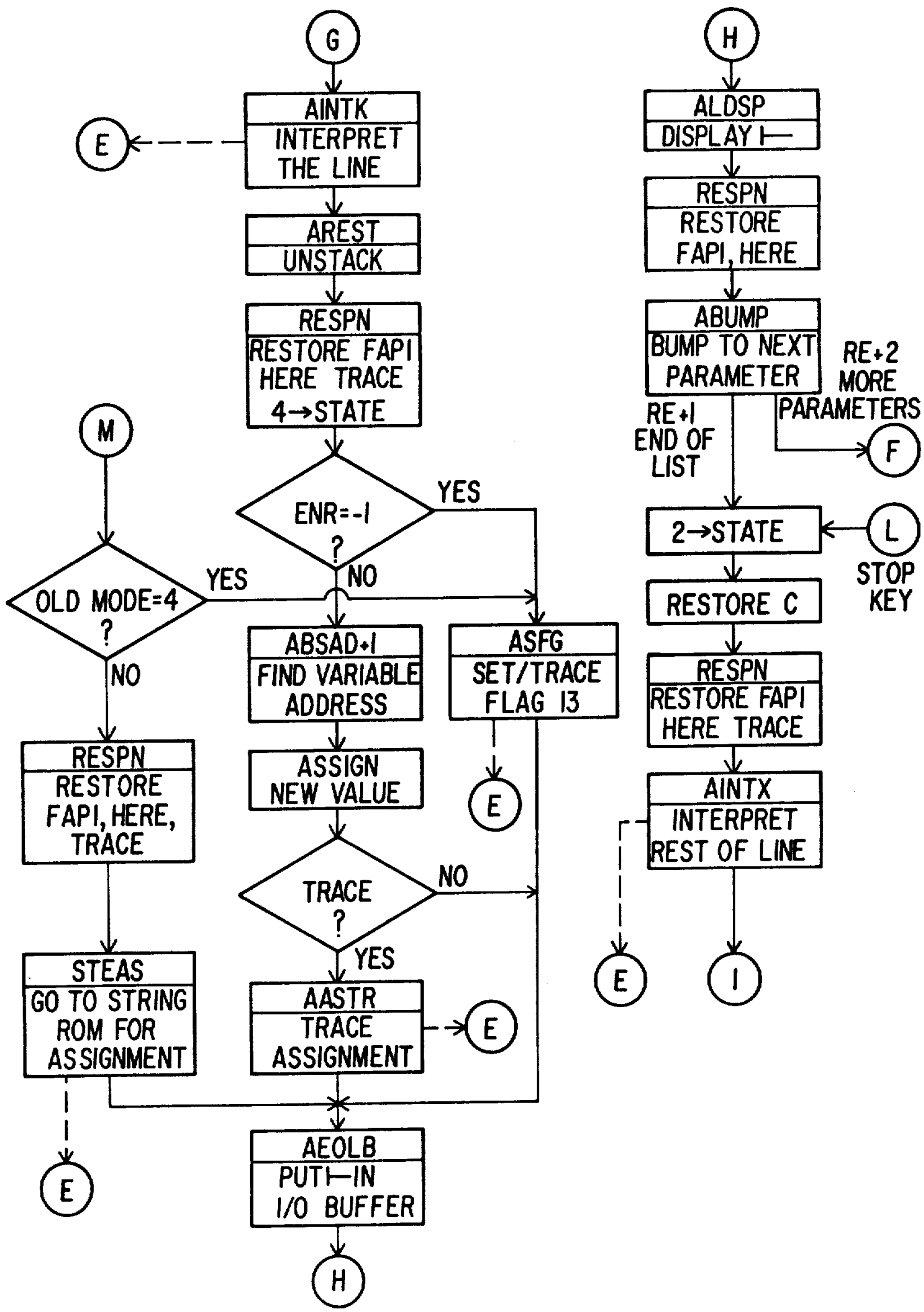
Figure 163D:
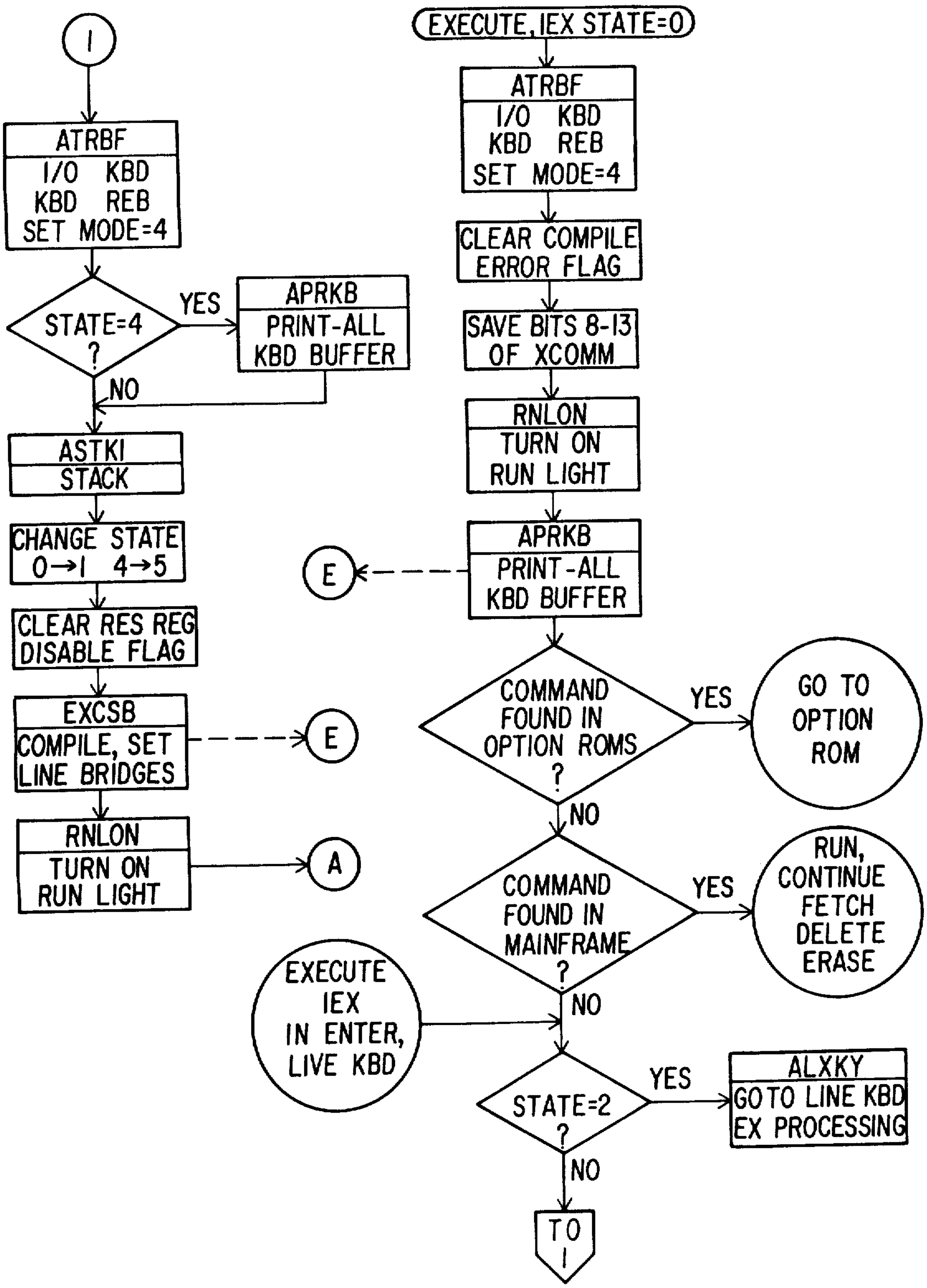
Figure 163E:
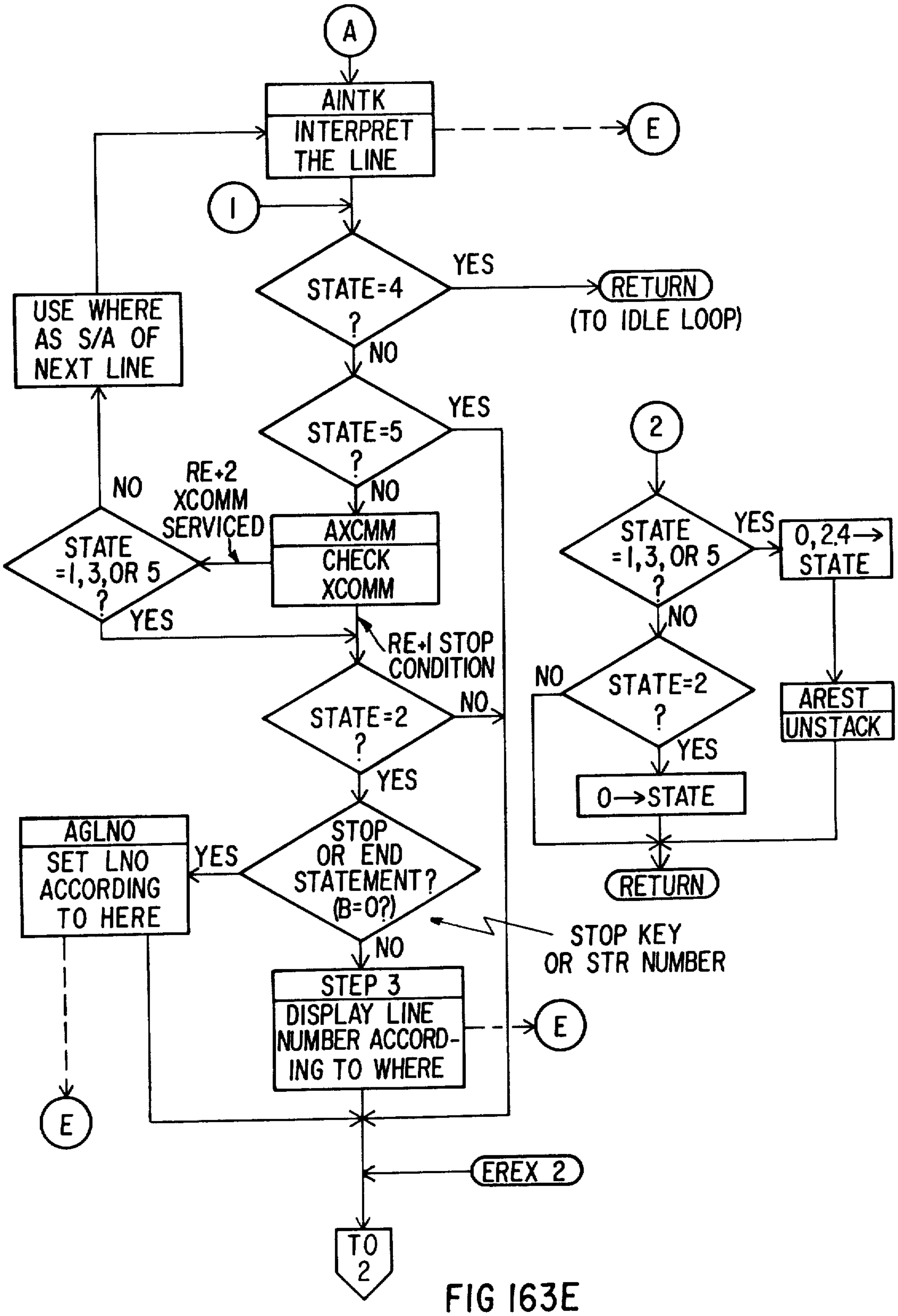
Figure 163F:
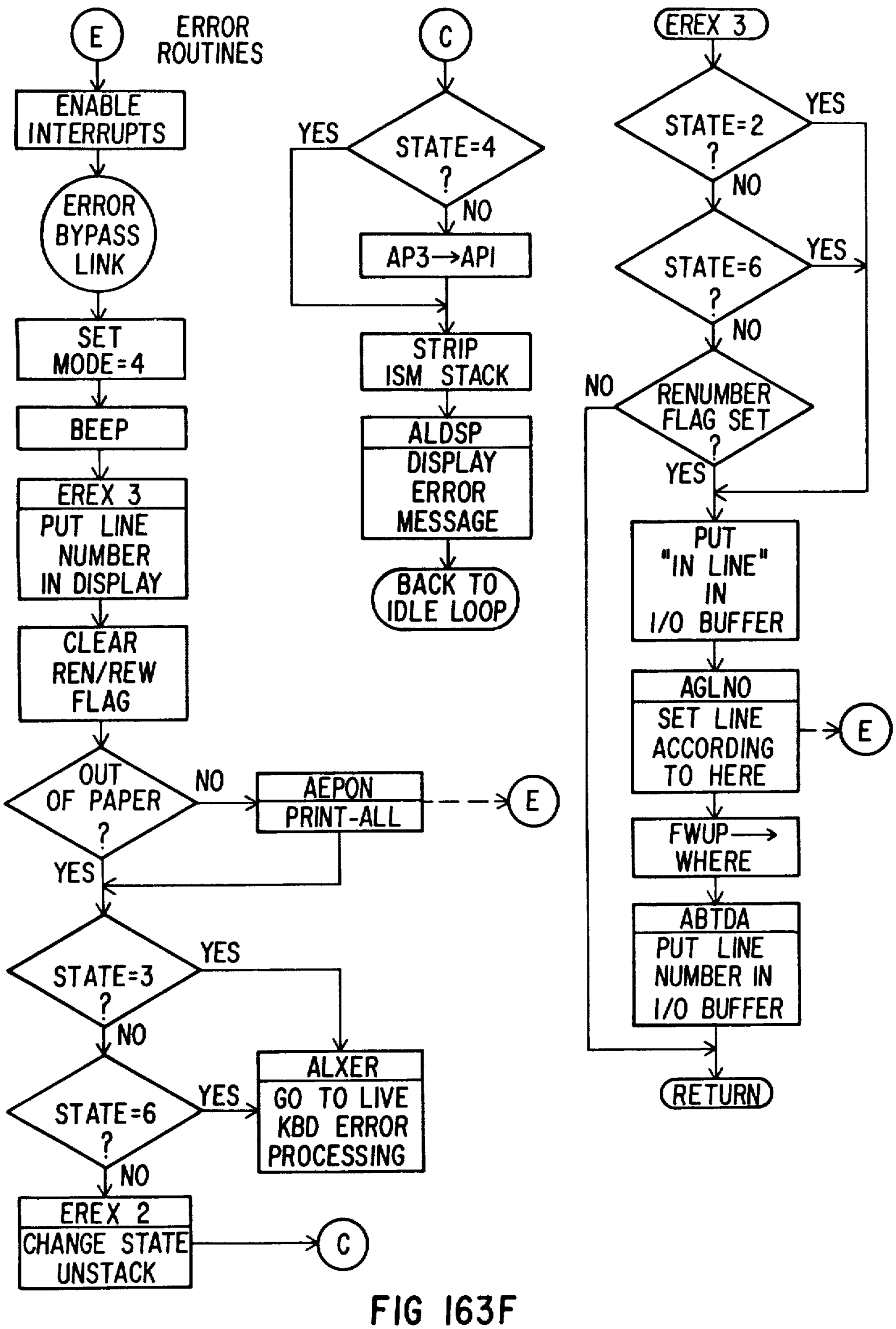

FIG. 162 is a flow chart of a quote recognition subroutine stored in the mainframe language ROM of FIGS. 4 and 7.

FIGS. 163A-F are a flow chart of enter statement subroutines stored in the mainframe language ROM of FIGS. 4 and 7.

Figure 164:
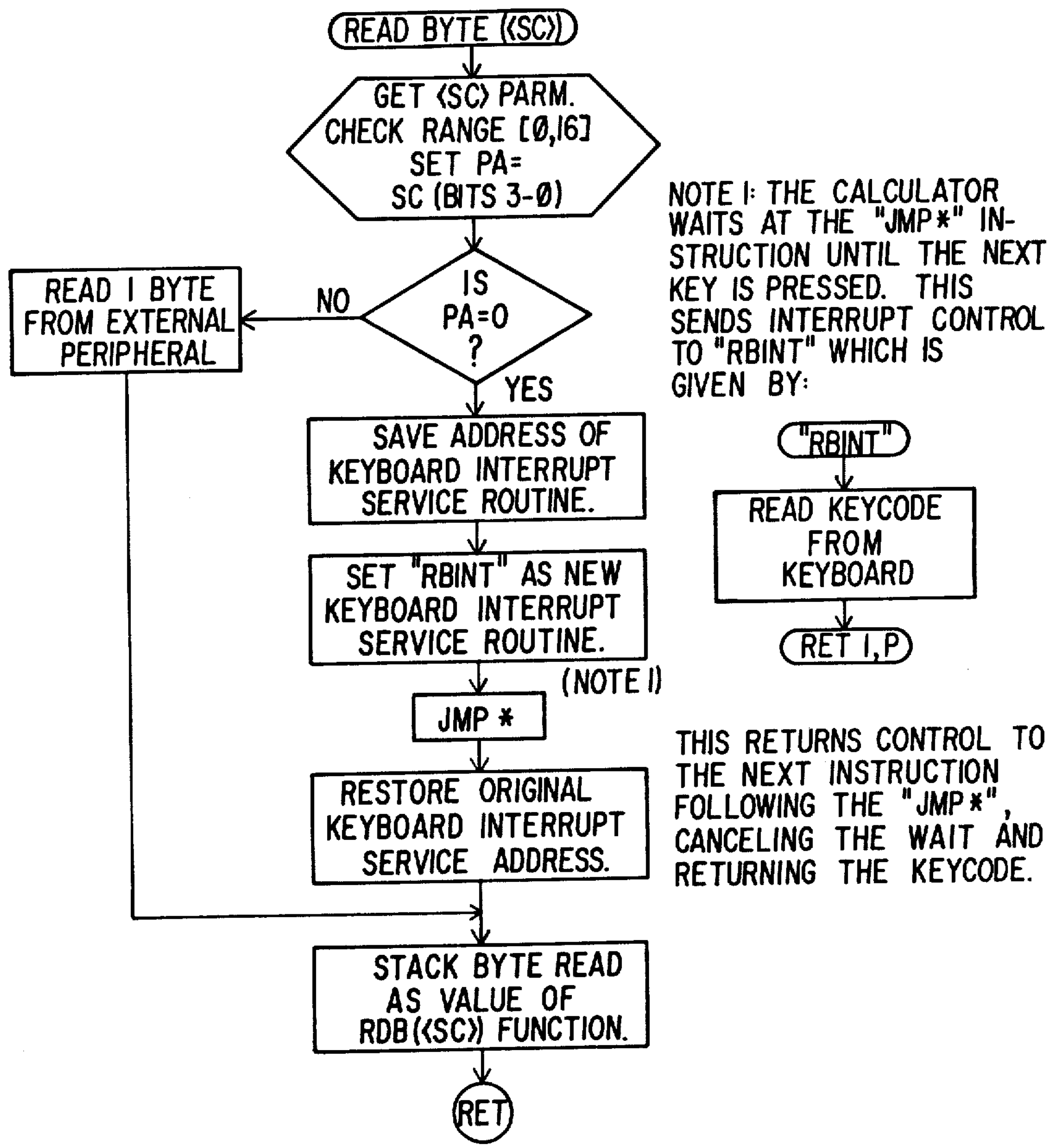

FIG. 164 is a flow chart of a read binary subroutine stored in the calculator read-only memory.

Figure 165:
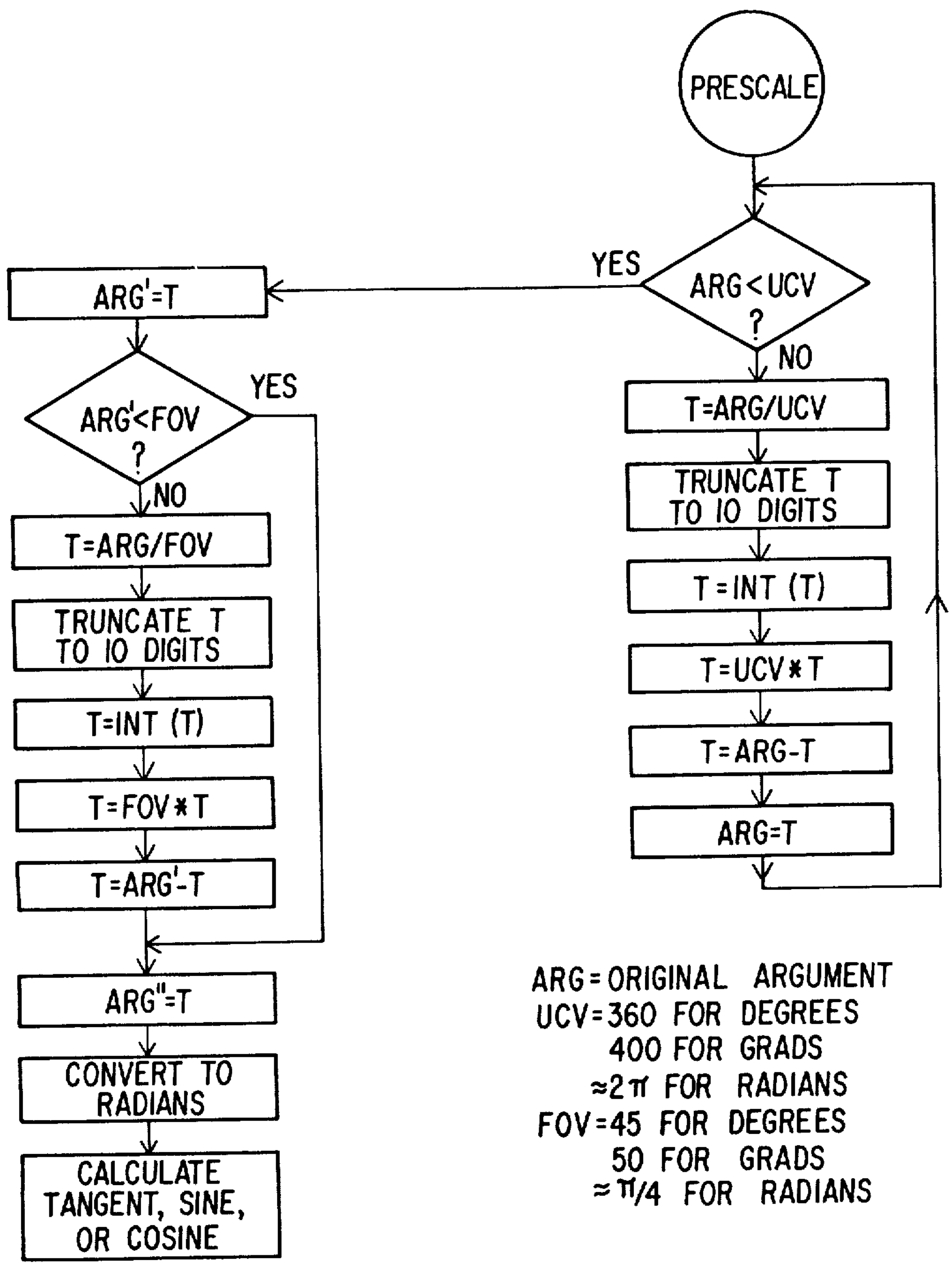

FIG. 165 is a flow chart of a prescale subroutine stored in the mainframe language ROM of FIGS. 4 and 7.

Figure 166:
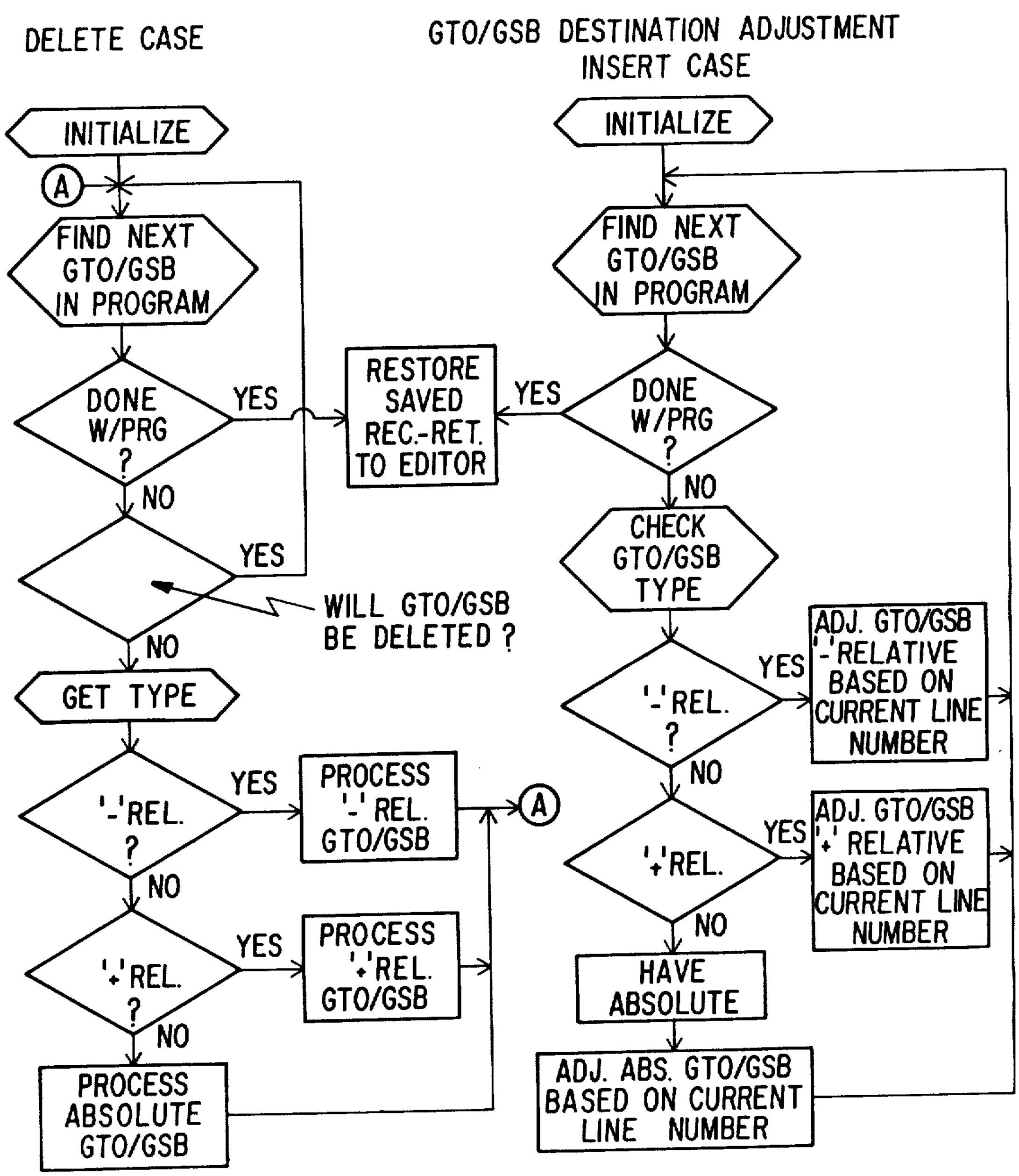

FIG. 166 is a flow chart of a GTO/GSB destination adjustment subroutine stored in the mainframe language ROM of FIGS. 4 and 7.

Figure 167A:
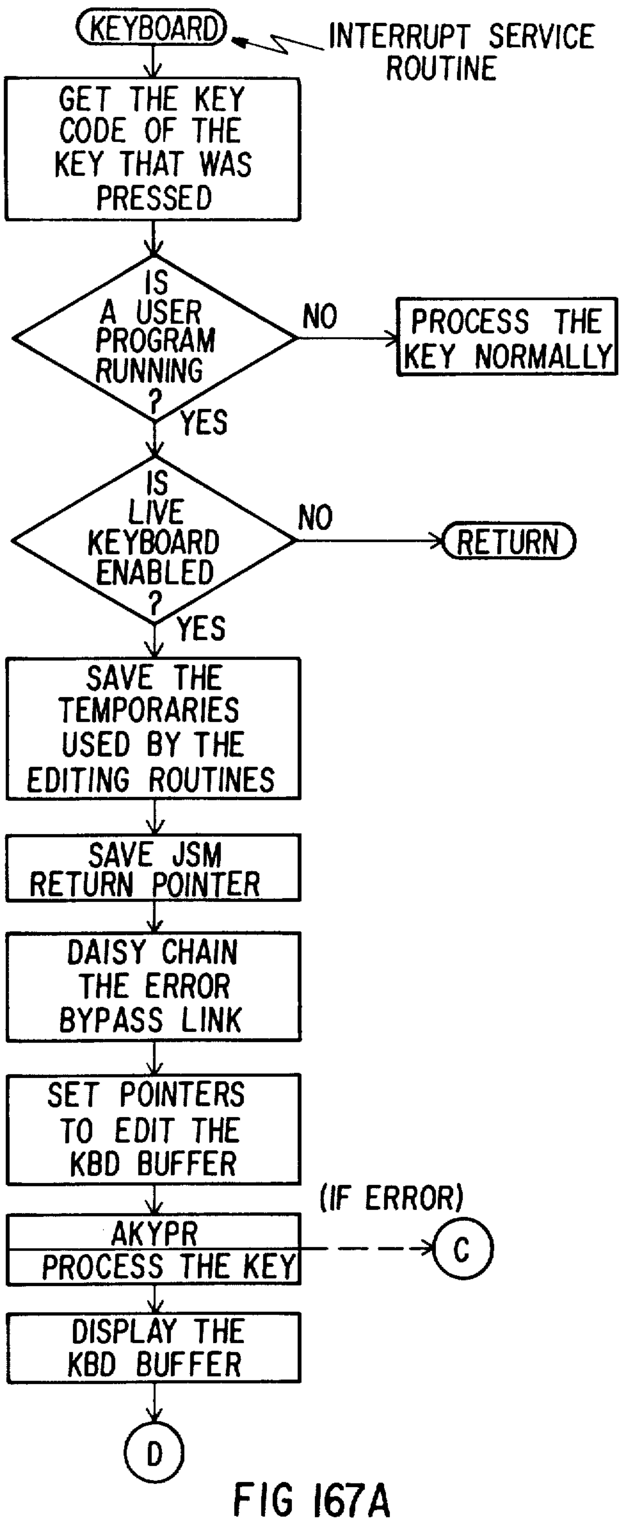
Figure 167B:
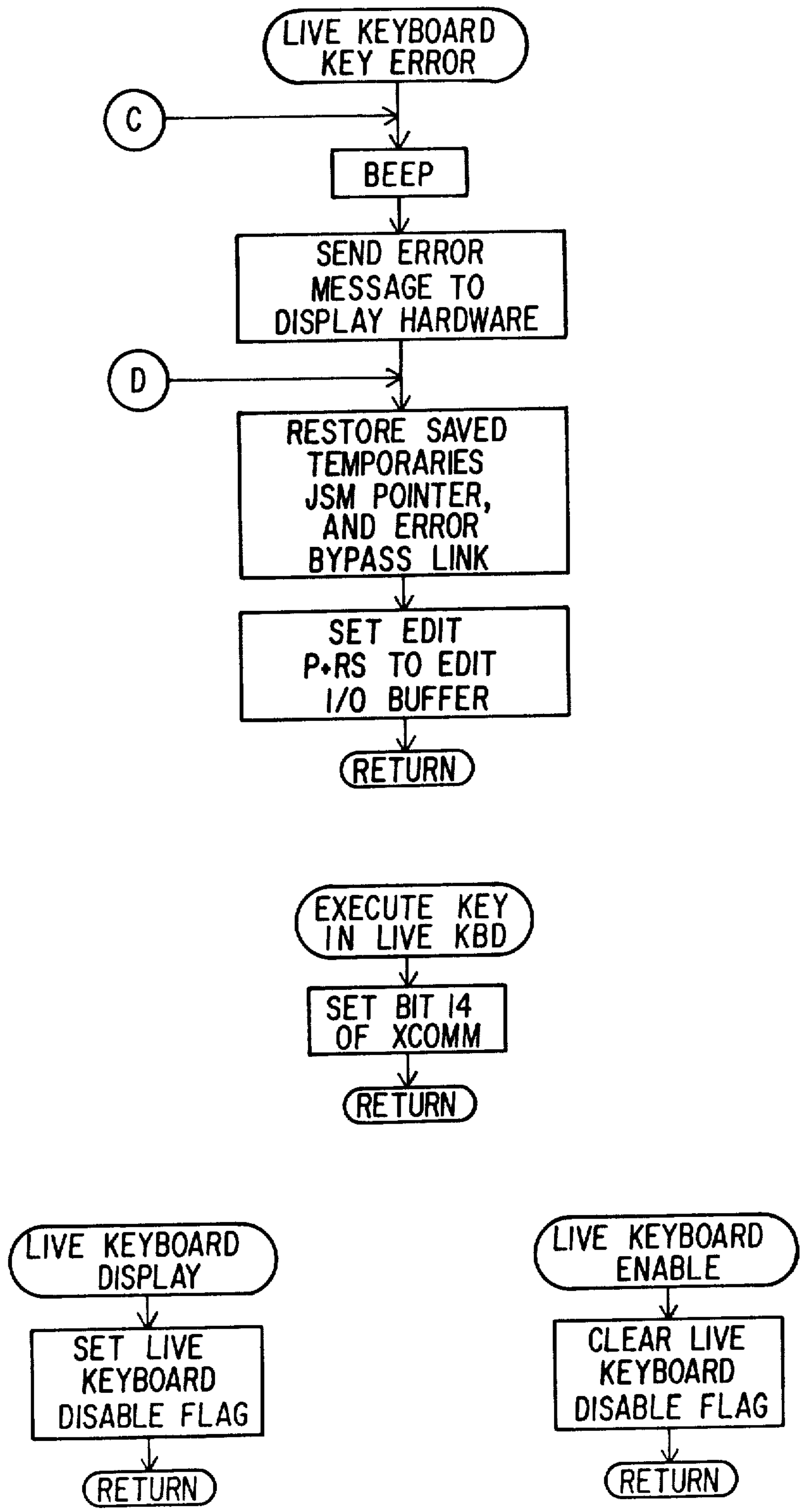

FIGS. 167A-B are a flow chart of live keyboard key processing subroutines stored in the mainframe language ROM of FIGS. 4 and 7.

Figure 168A:
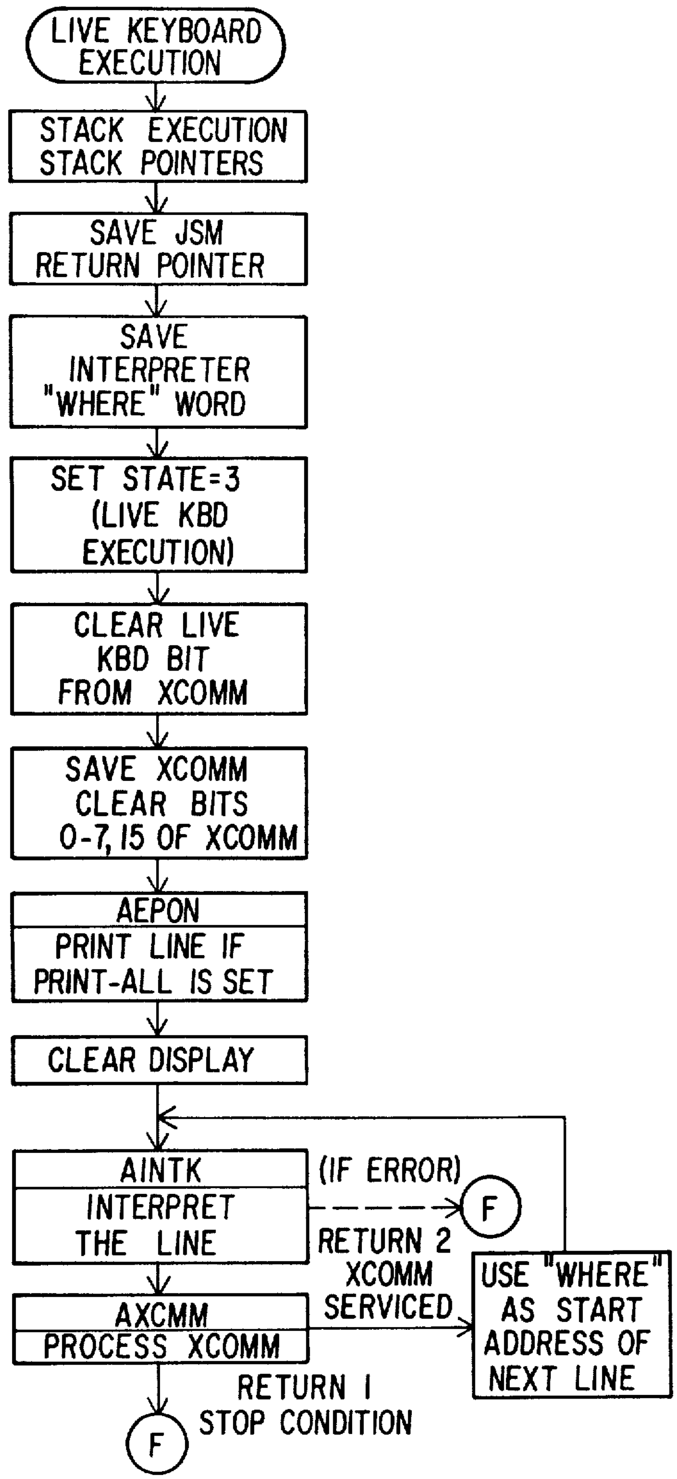
Figure 168B:
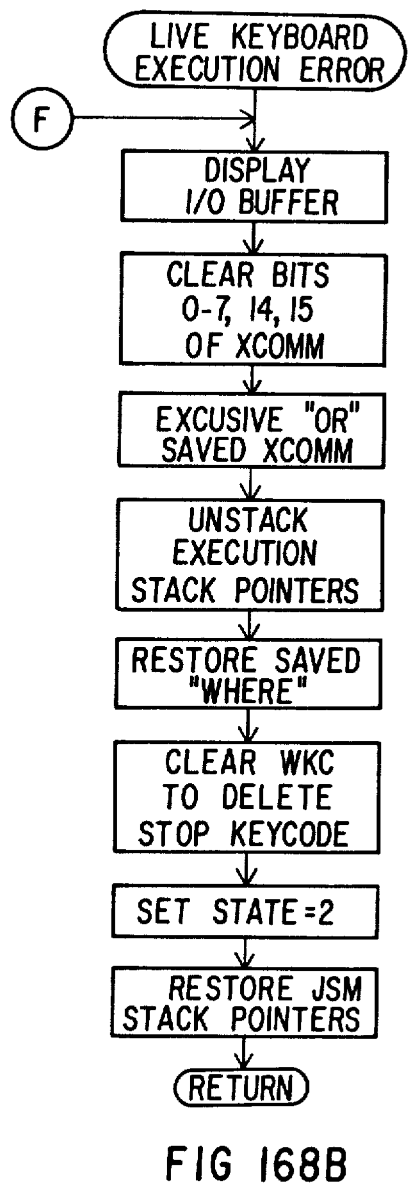

FIGS. 168A-B are a flow chart of live keyboard execution routines stored in the mainframe language ROM of FIGS. 4 and 7.

Figure 169A:
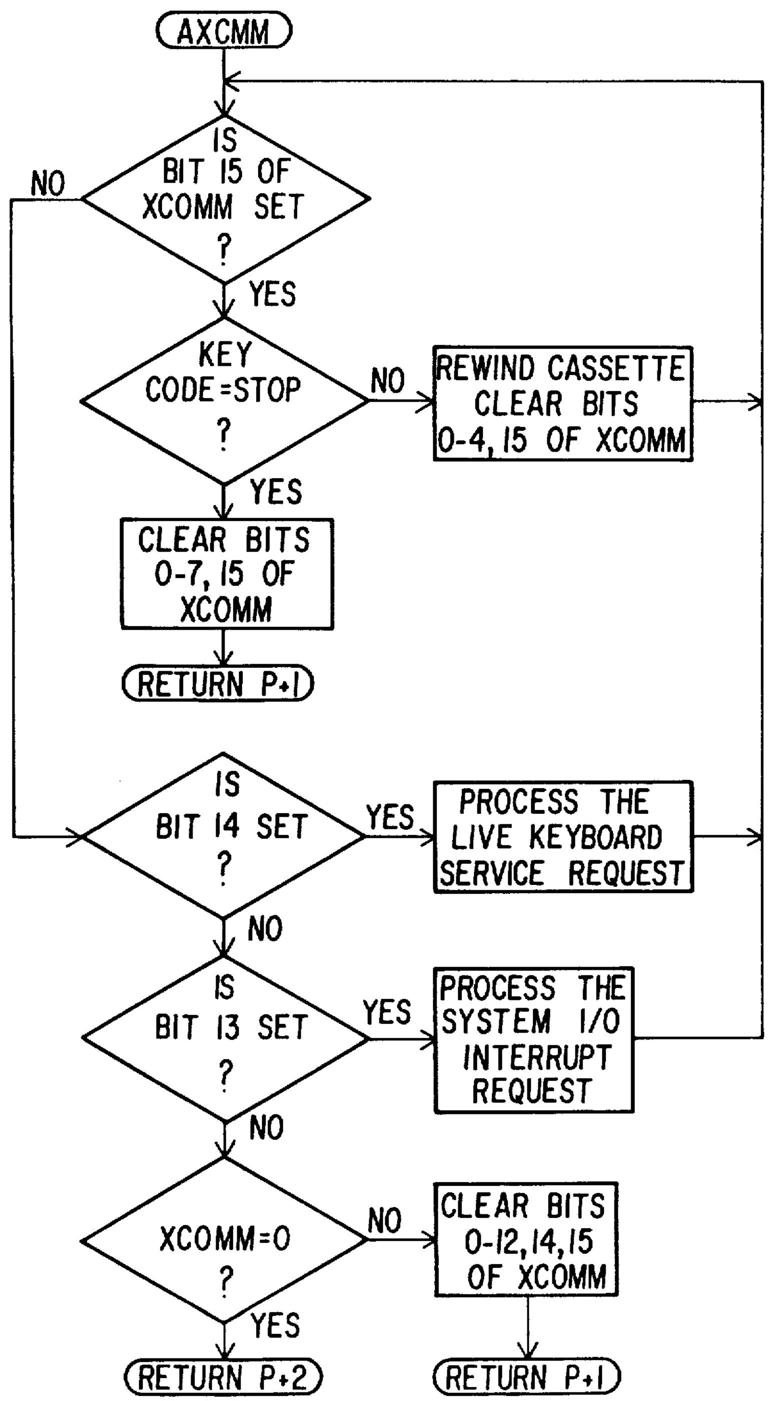
Figure 169B:
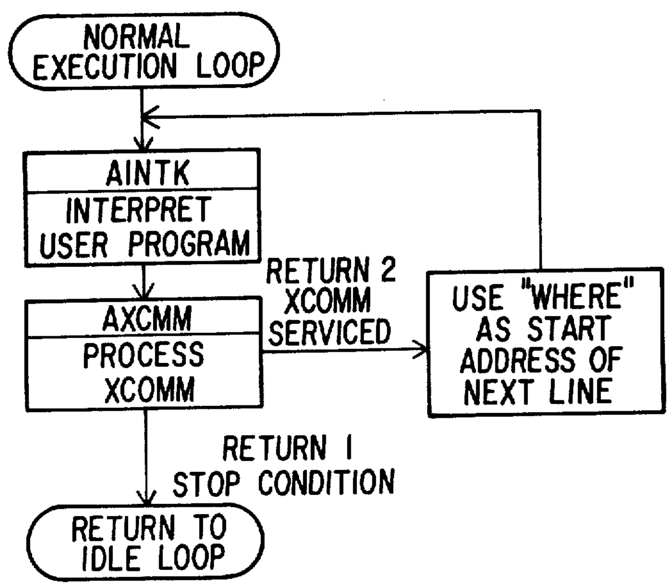

FIGS. 169A-B are a flow chart of live keyboard interpreter routines stored in the mainframe language ROM of FIGS. 4 and 7.

FIGS. 170A-D illustrate the information structure of a magnetic tape employed in the magnetic tape cassette reading and recording unit of the calculator.

Figure 171A:
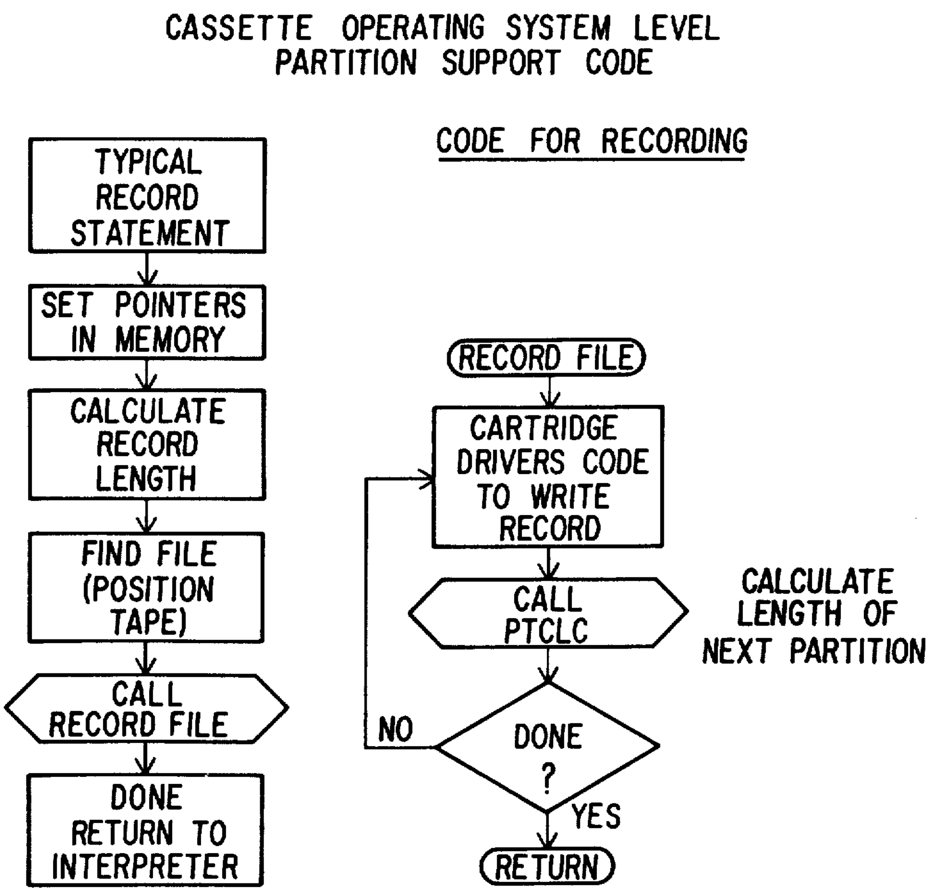
Figure 171B:
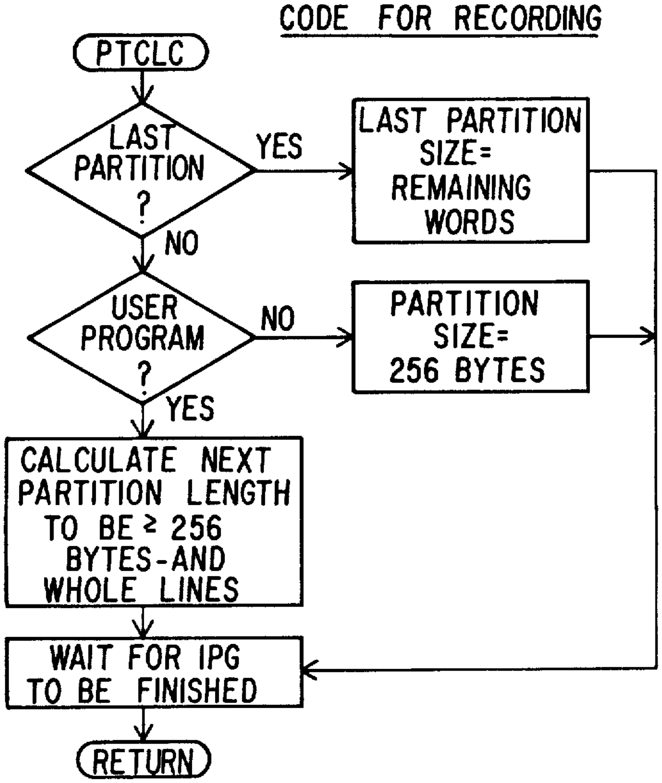

FIGS. 171A-B are a flow chart of a magnetic tape recording routine and subroutines stored in the mainframe language ROM of FIGS. 4 and 7.

Figure 172A:
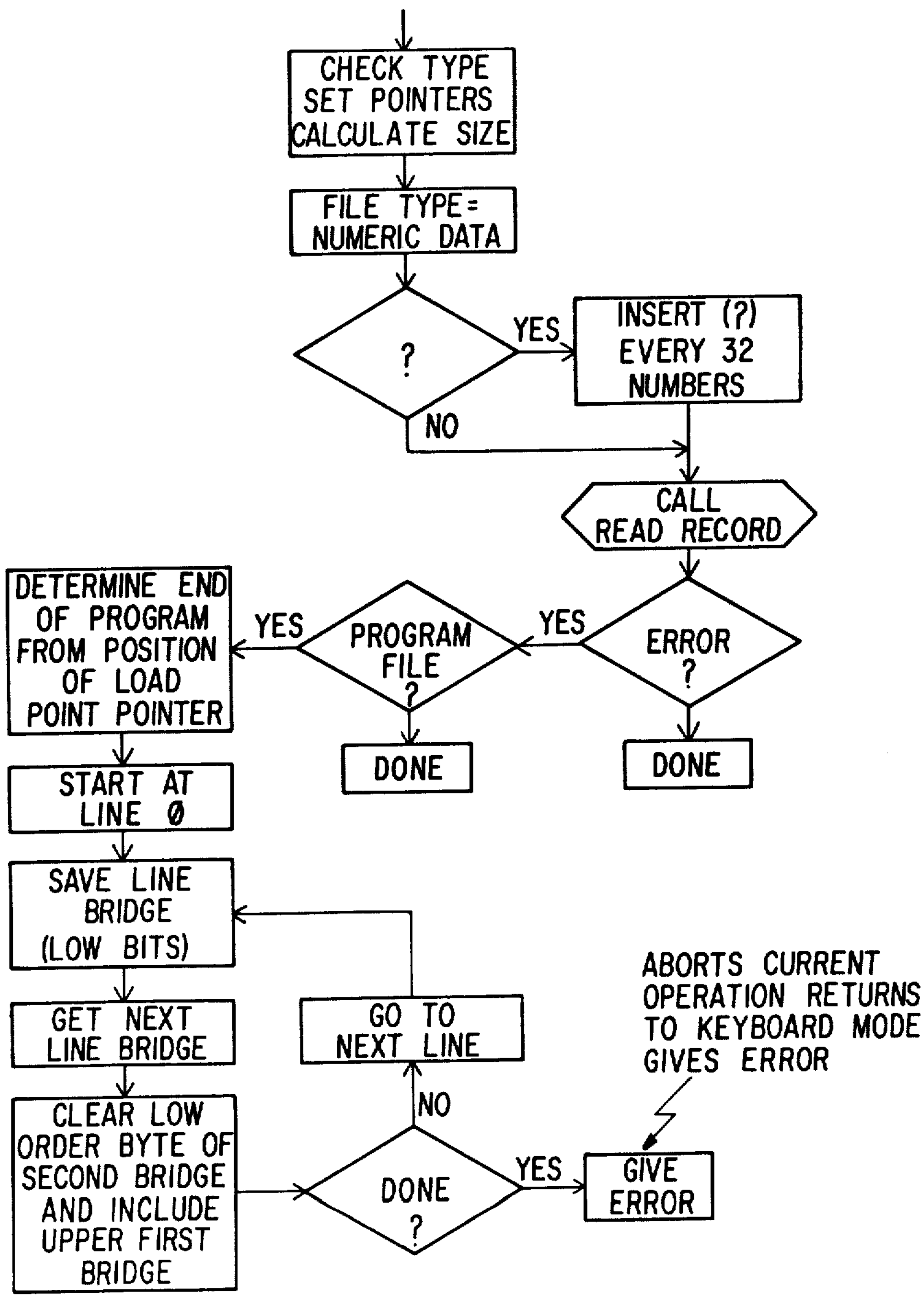
Figure 172B:
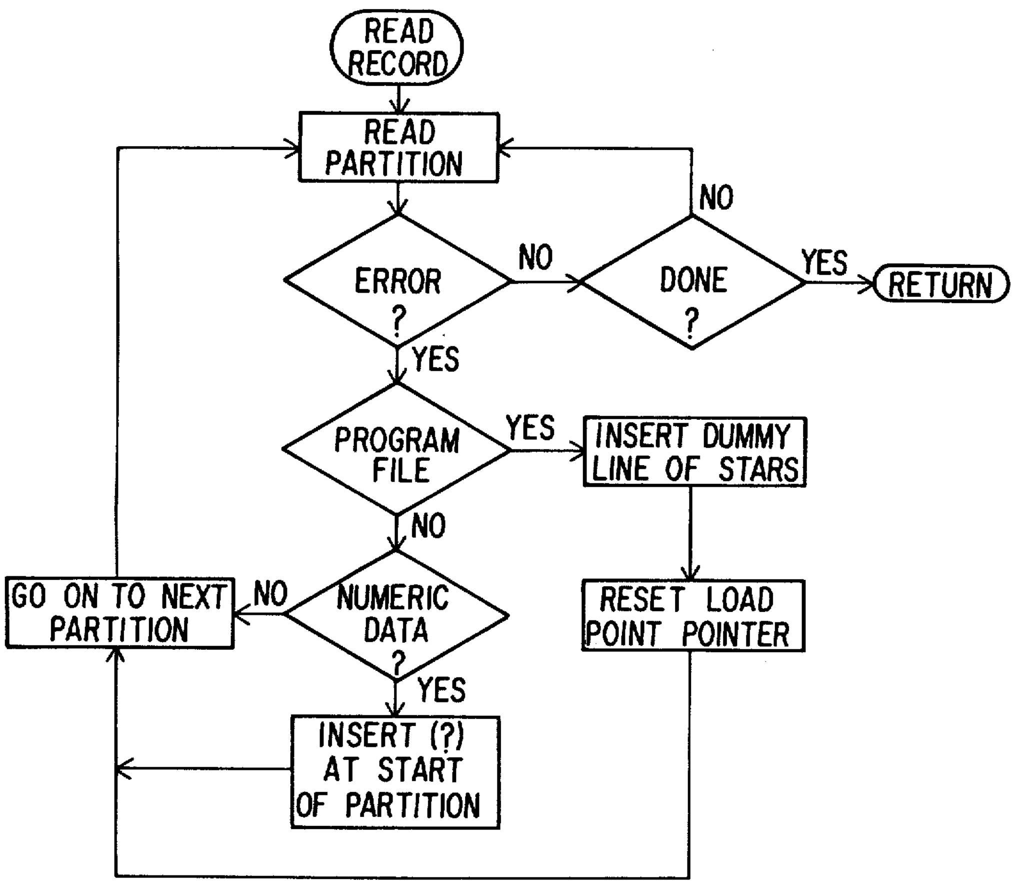

FIGS. 172A-B are a flow chart of a magnetic tape reading routine and subroutines stored in the mainframe language ROM of FIGS. 4 and 7.

FIG. 173 is a diagram illustrating line bridging performed by the routine of FIGS. 172A-B.

Figure 174:
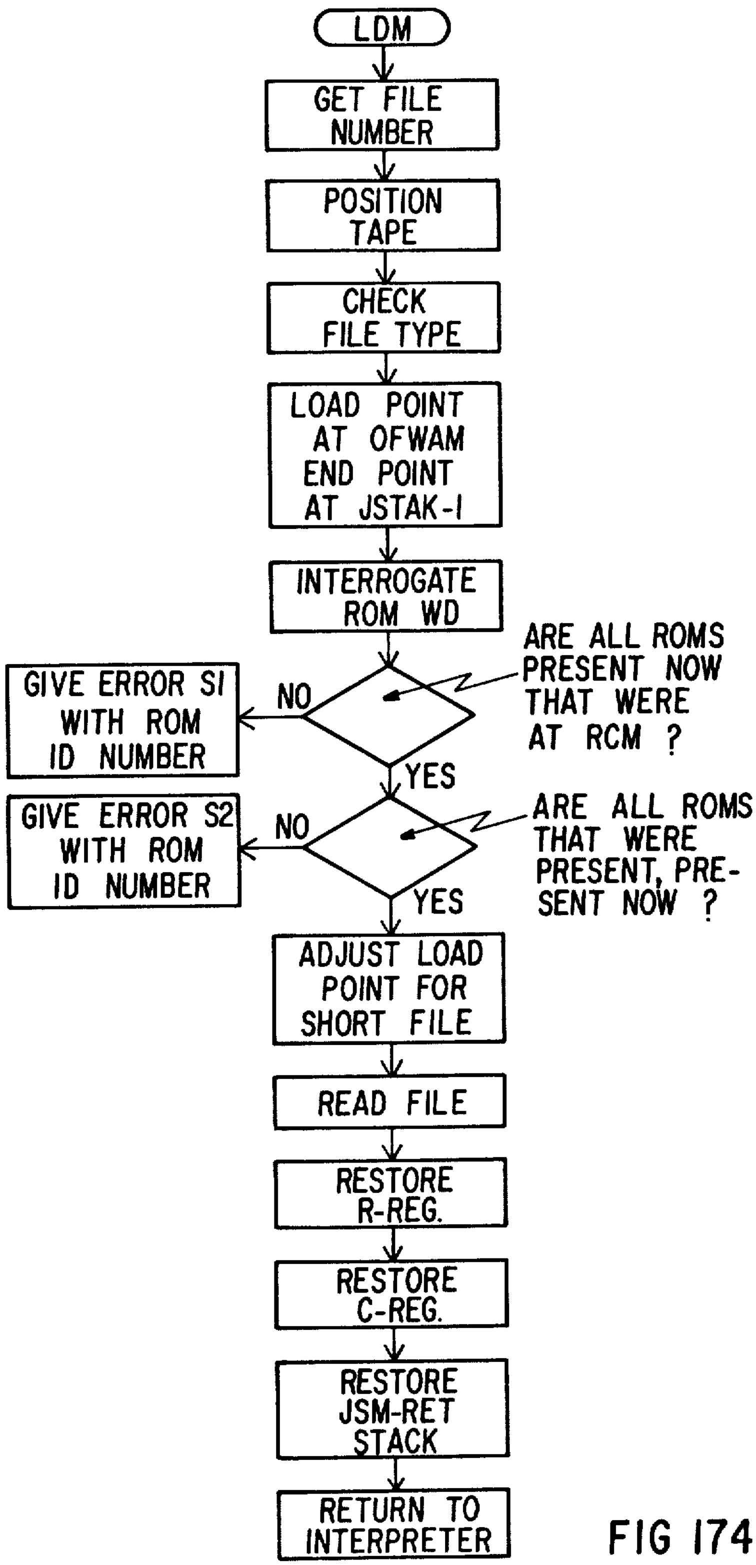

FIG. 174 is a flow chart of a load memory subroutine stored in the mainframe language ROM of FIGS. 4 and 7.

Figure 175:
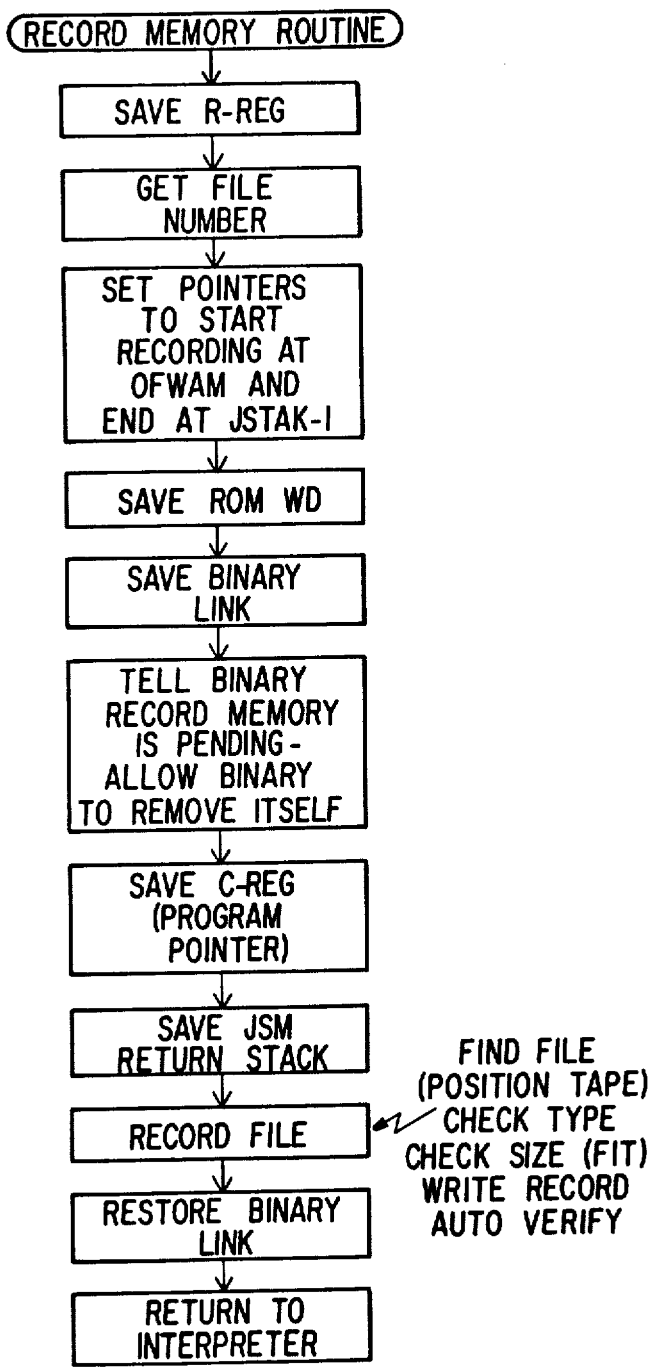

FIG. 175 is a flow chart of a record memory subroutine stored in the mainframe language ROM of FIGS. 4 and 7.

Figure 176:
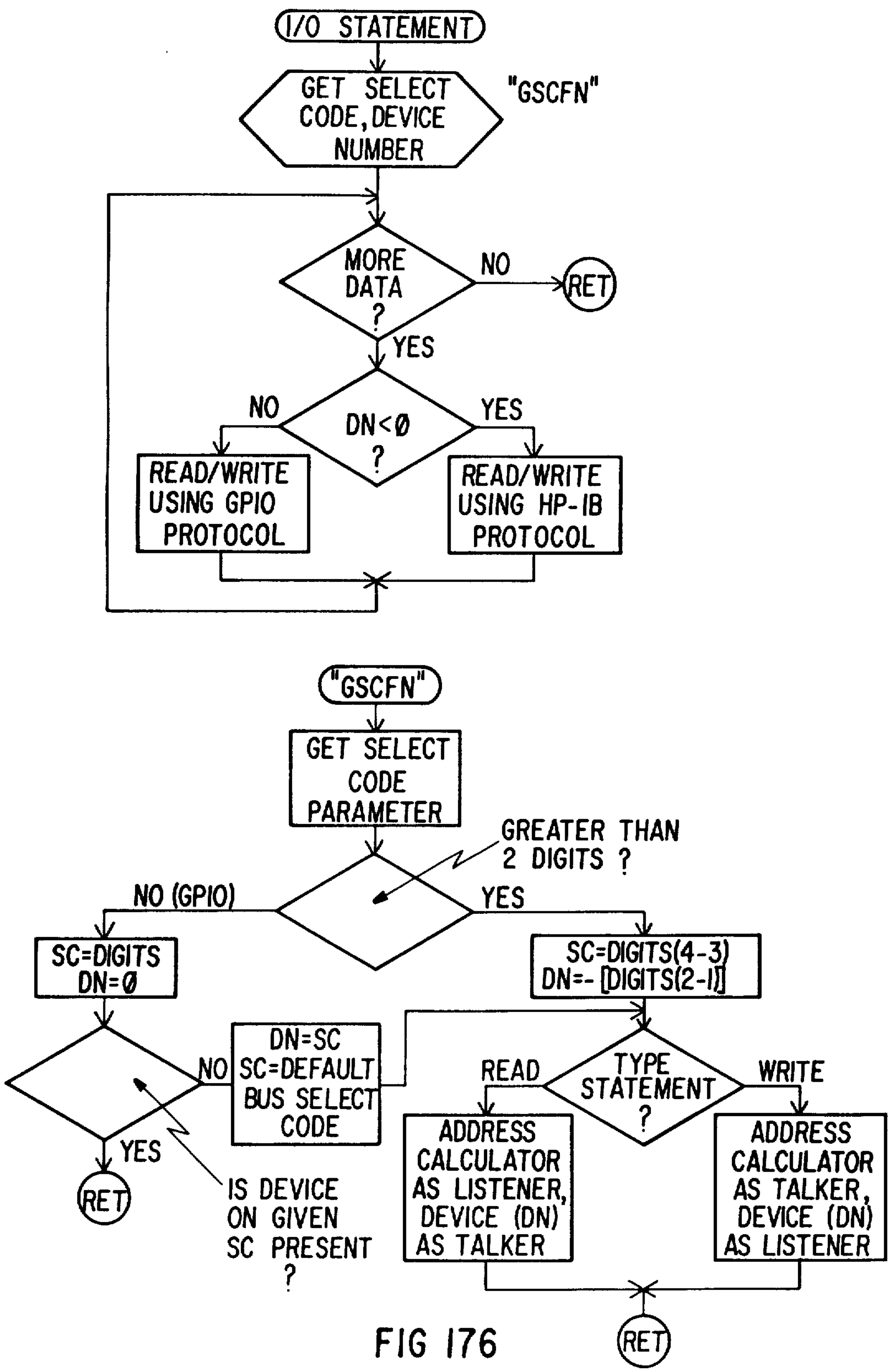

FIG. 176 is a flow chart of an HPIB transparency routine and subroutine stored in the calculator read-only memory.

Figure 177A:
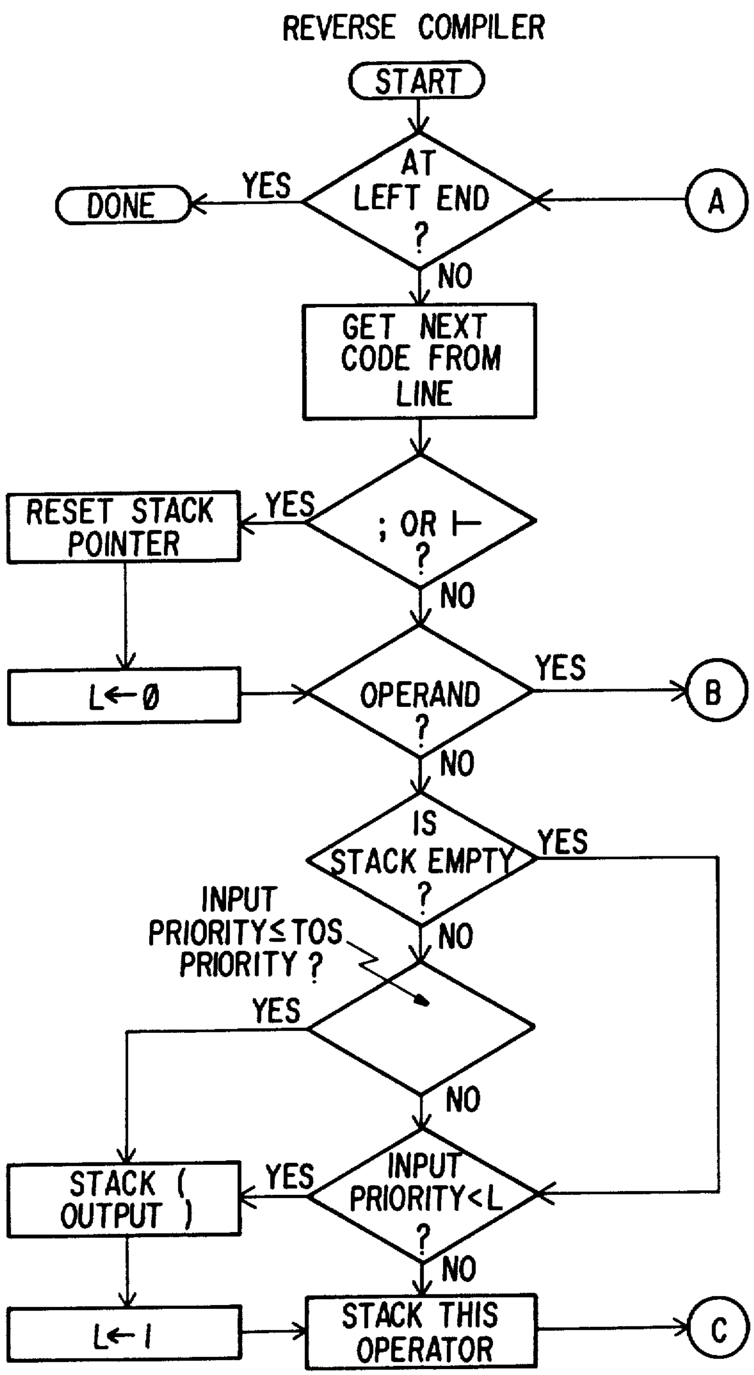
Figure 177B:
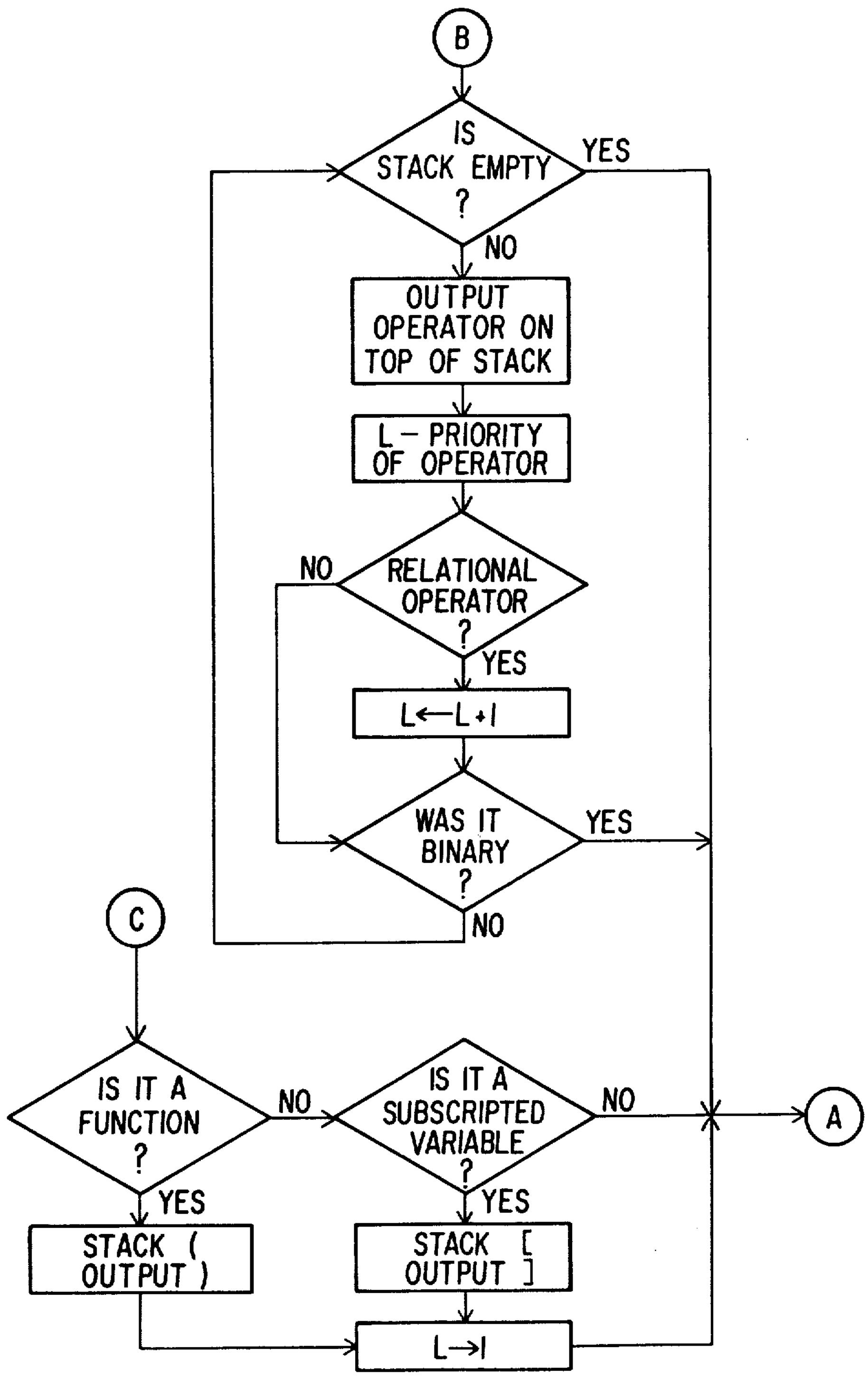

FIGS. 177A-B are a flow chart of a reverse compiler routine stored in the mainframe language ROM of FIGS. 4 and 7.

Figure 178A:
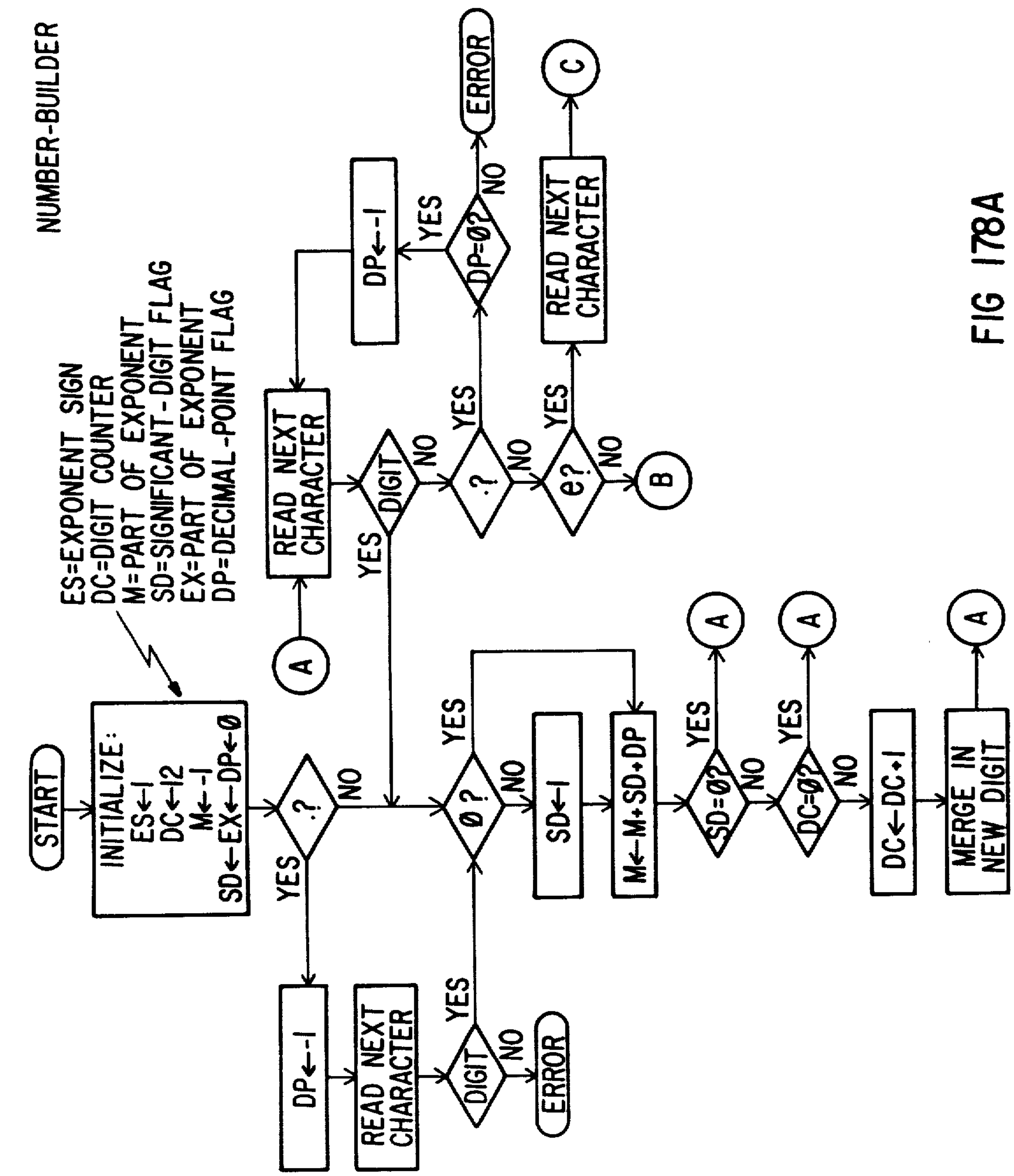
Figure 178B:
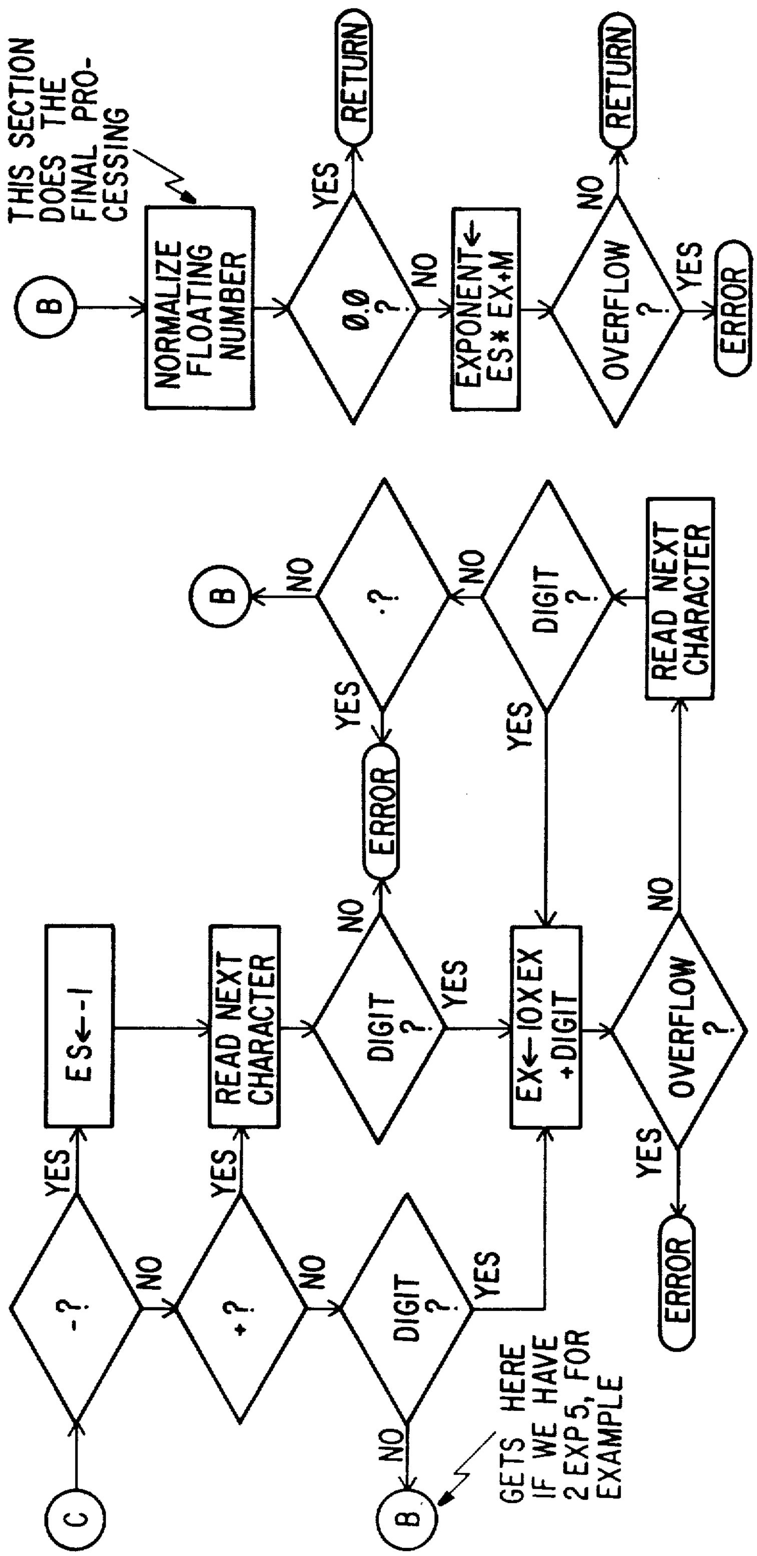

FIGS. 178A-B are a flow chart of a number builder routine stored in the mainframe language ROM of FIGS. 4 and 7.

Figure 179A:
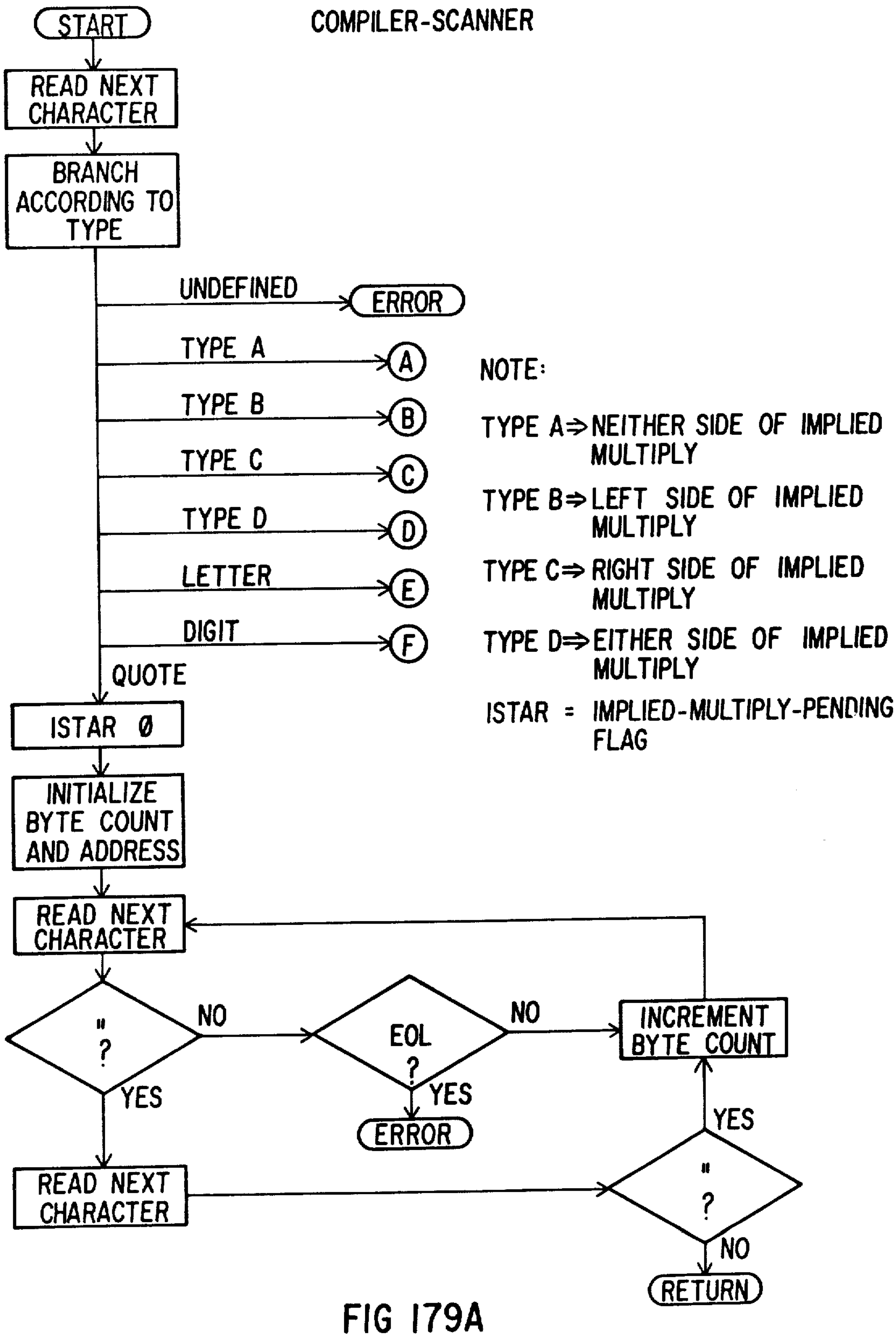
Figure 179B:
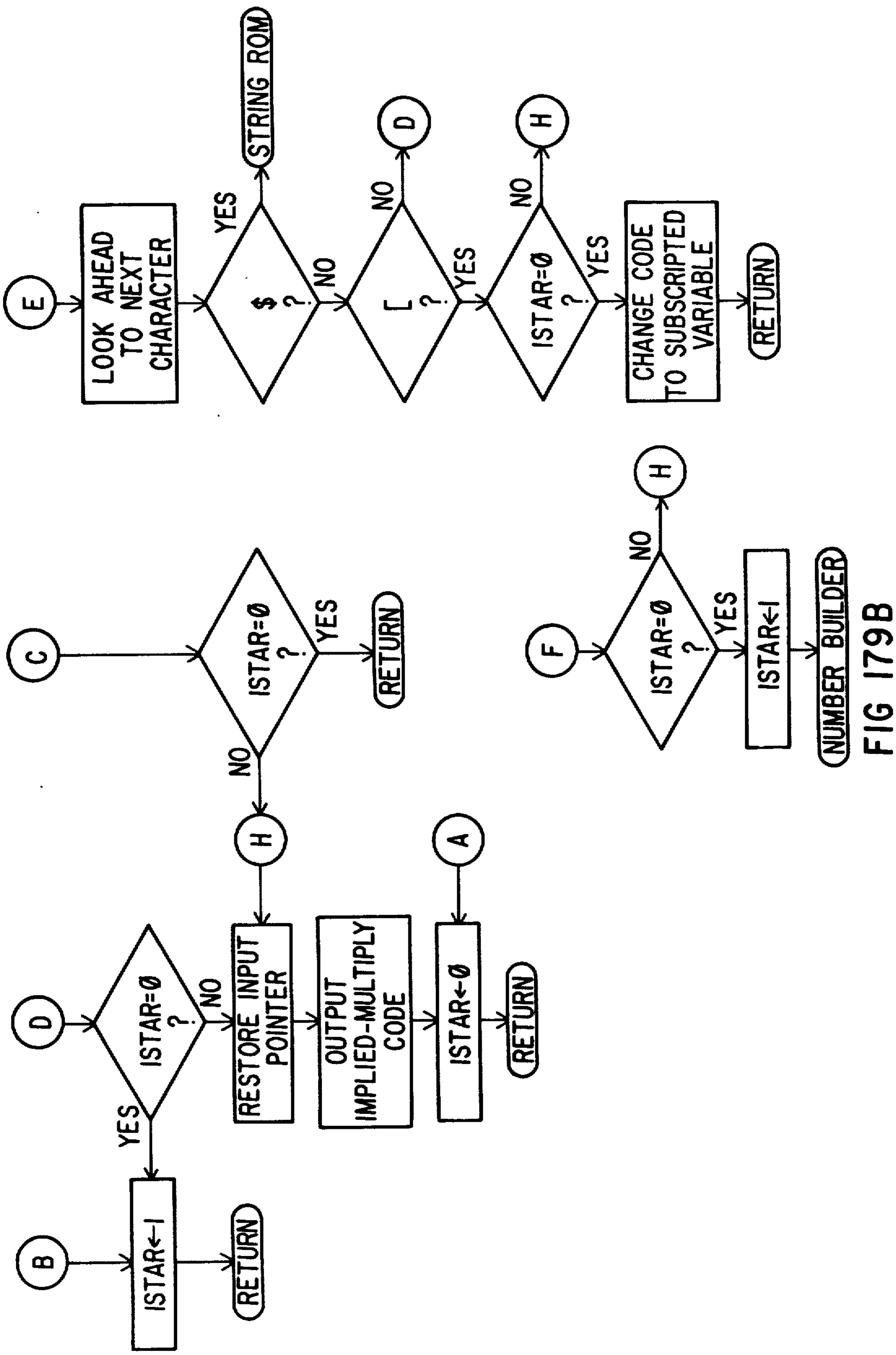

FIGS. 179A-B are a flow chart of a compiler-scanner routine stored in the mainframe language ROM of FIGS. 4 and 7.

Figure 180A:
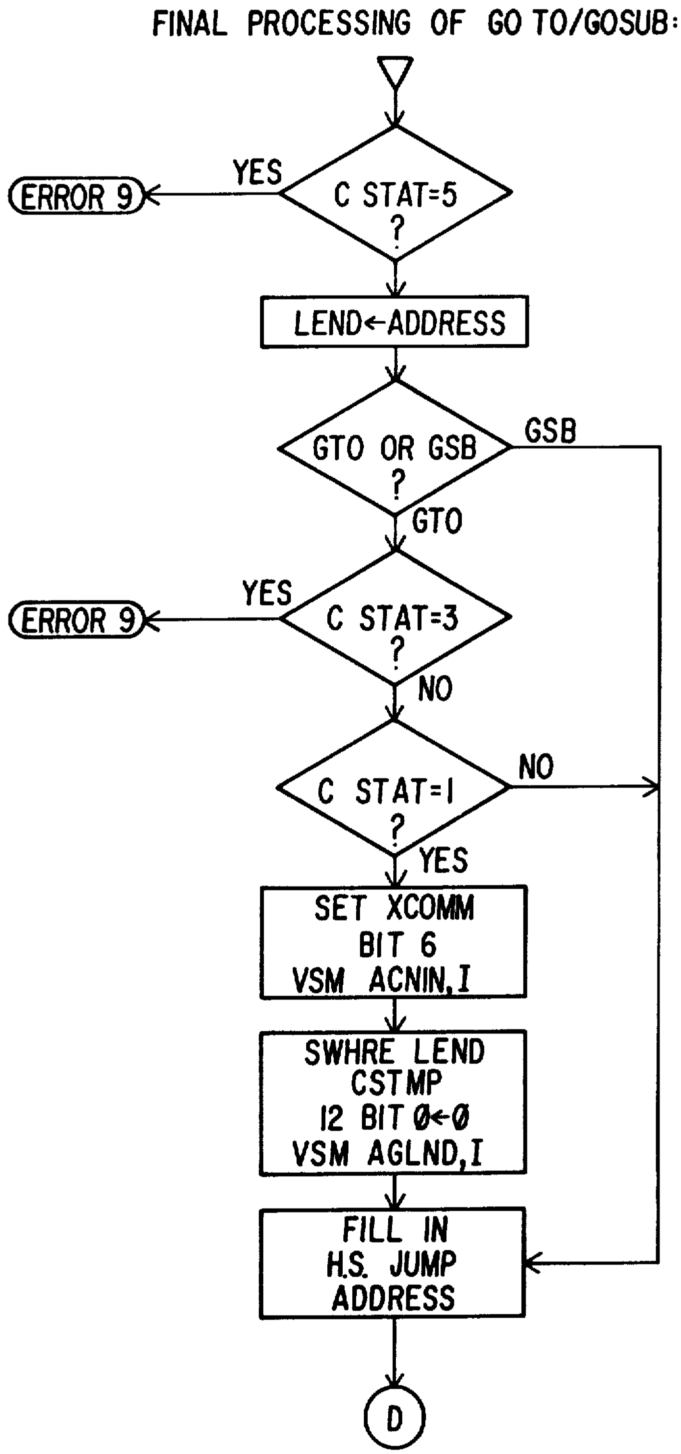
Figure 180B:
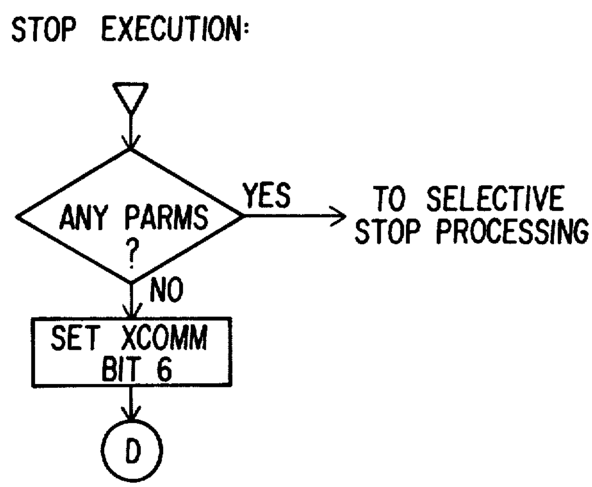
Figure 180C:
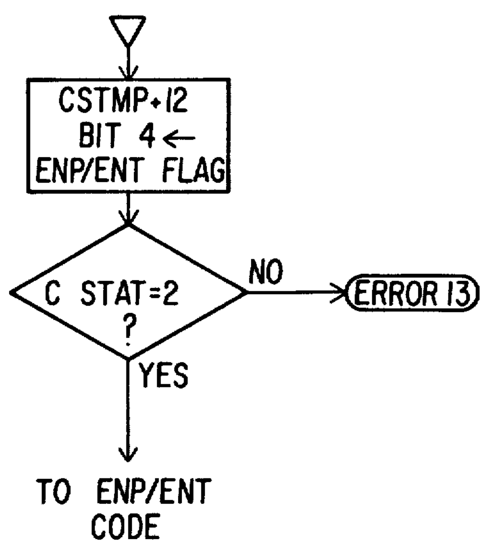
Figure 181A:
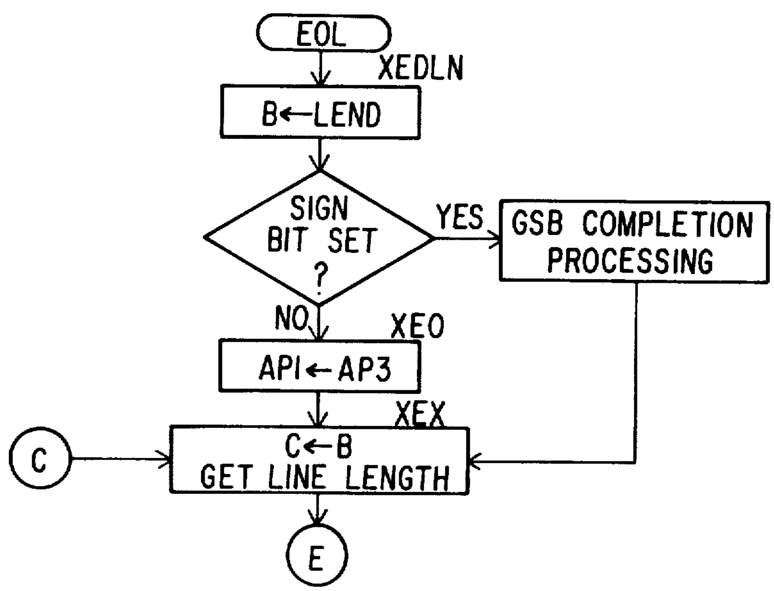
Figure 181B:
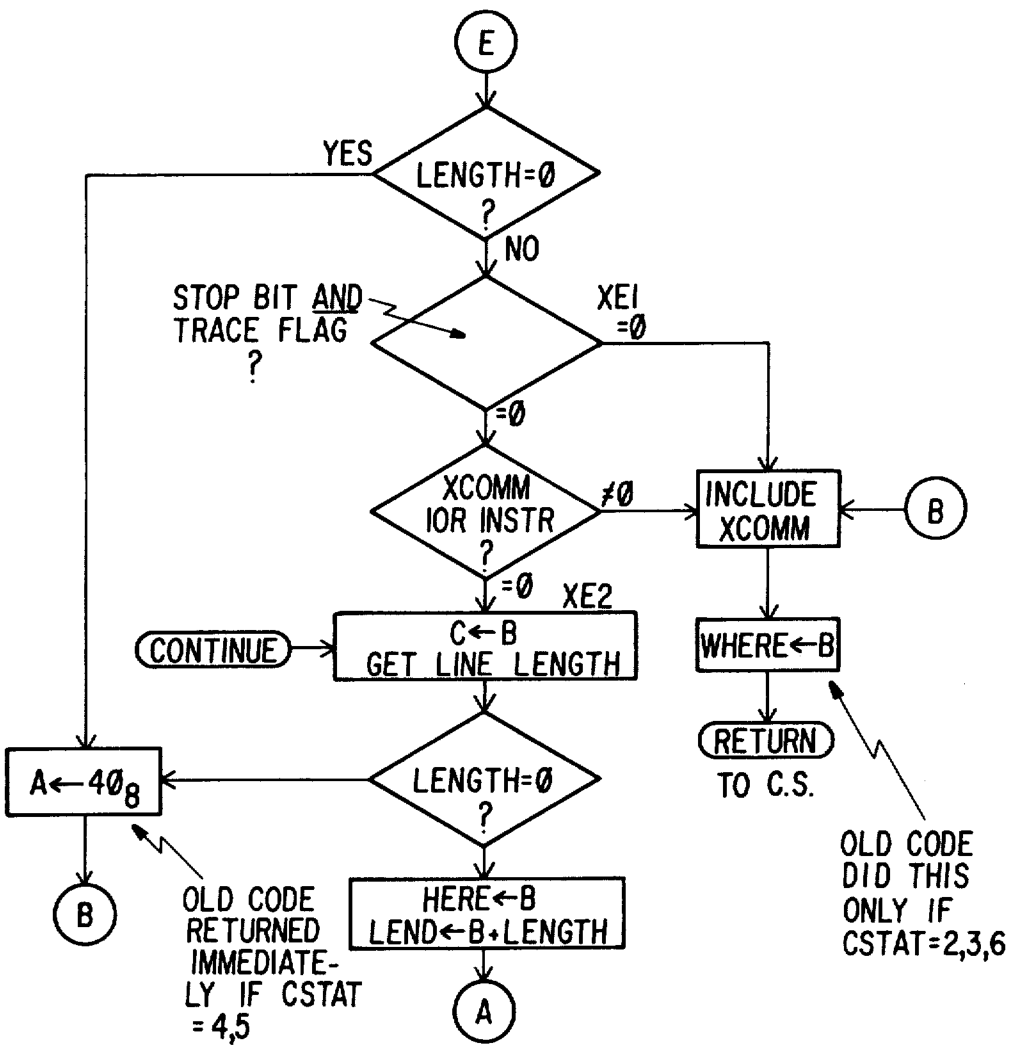
Figure 181C:
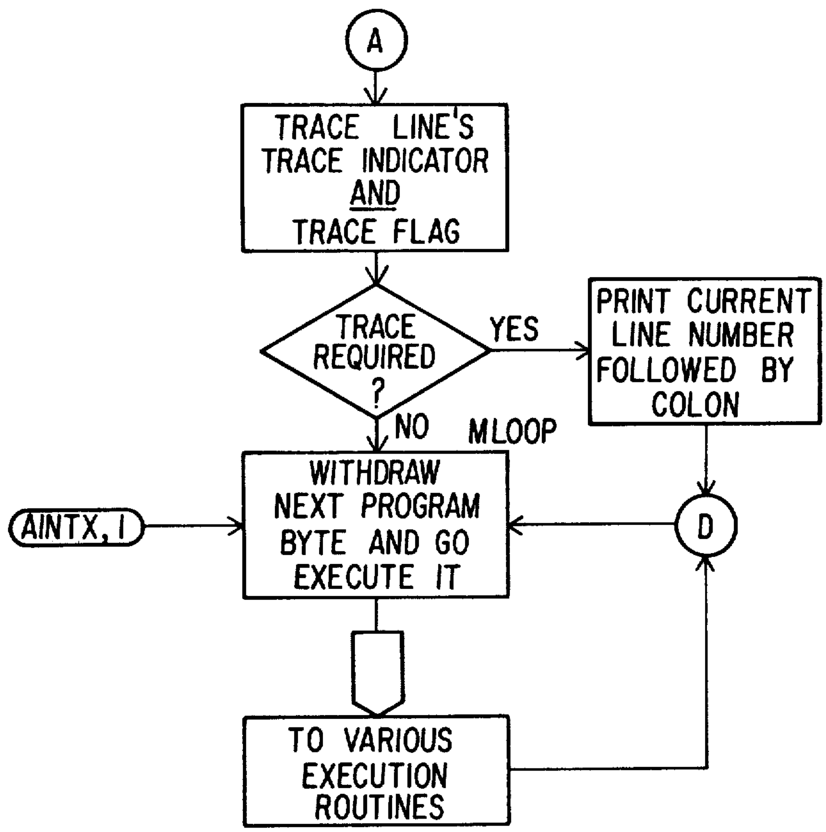
Figure 181D:
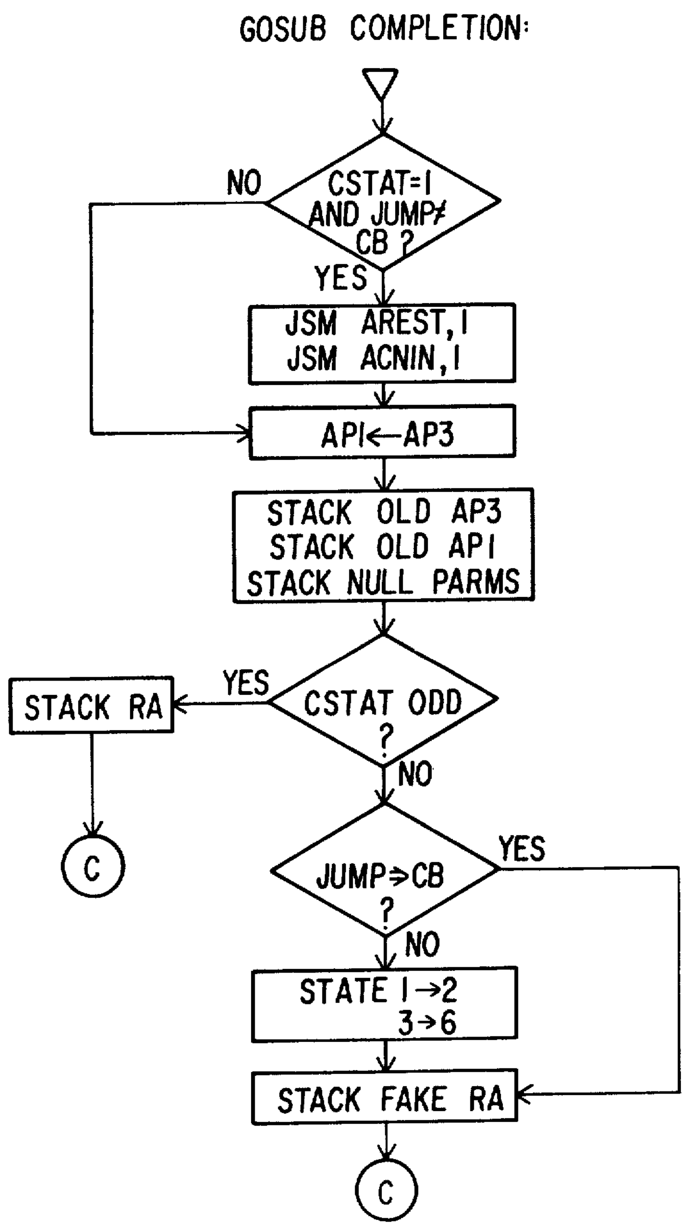

FIGS. 180A-C are a flow chart of GOTO/GOSUB processing subroutines stored in the mainframe language ROM of FIGS. 4 and 7.

FIGS. 181A-D are a flow chart of end-of-line execution routines stored in the mainframe language ROM of FIGS. 4 and 7.

Figure 182A:
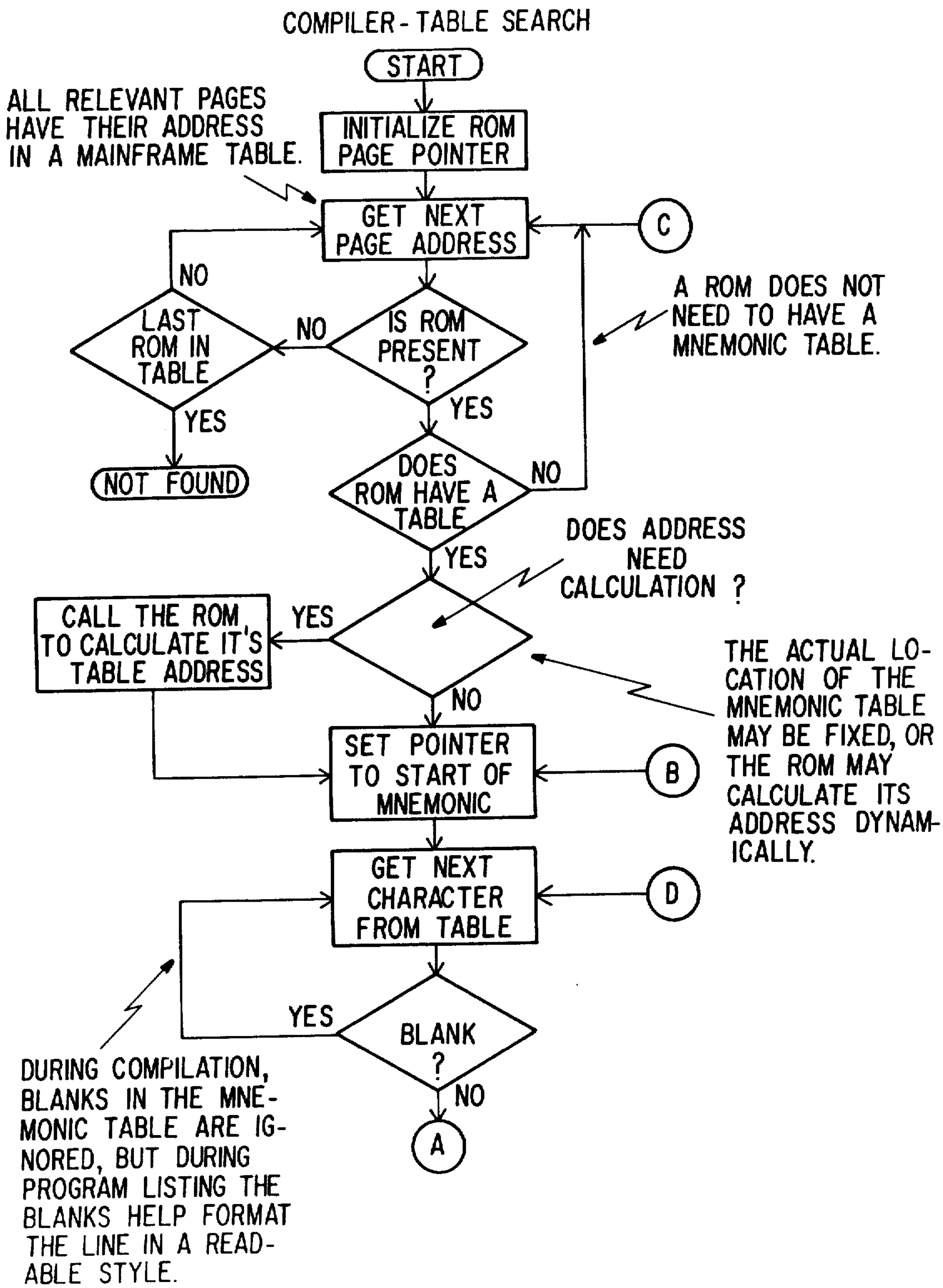
Figure 182B:
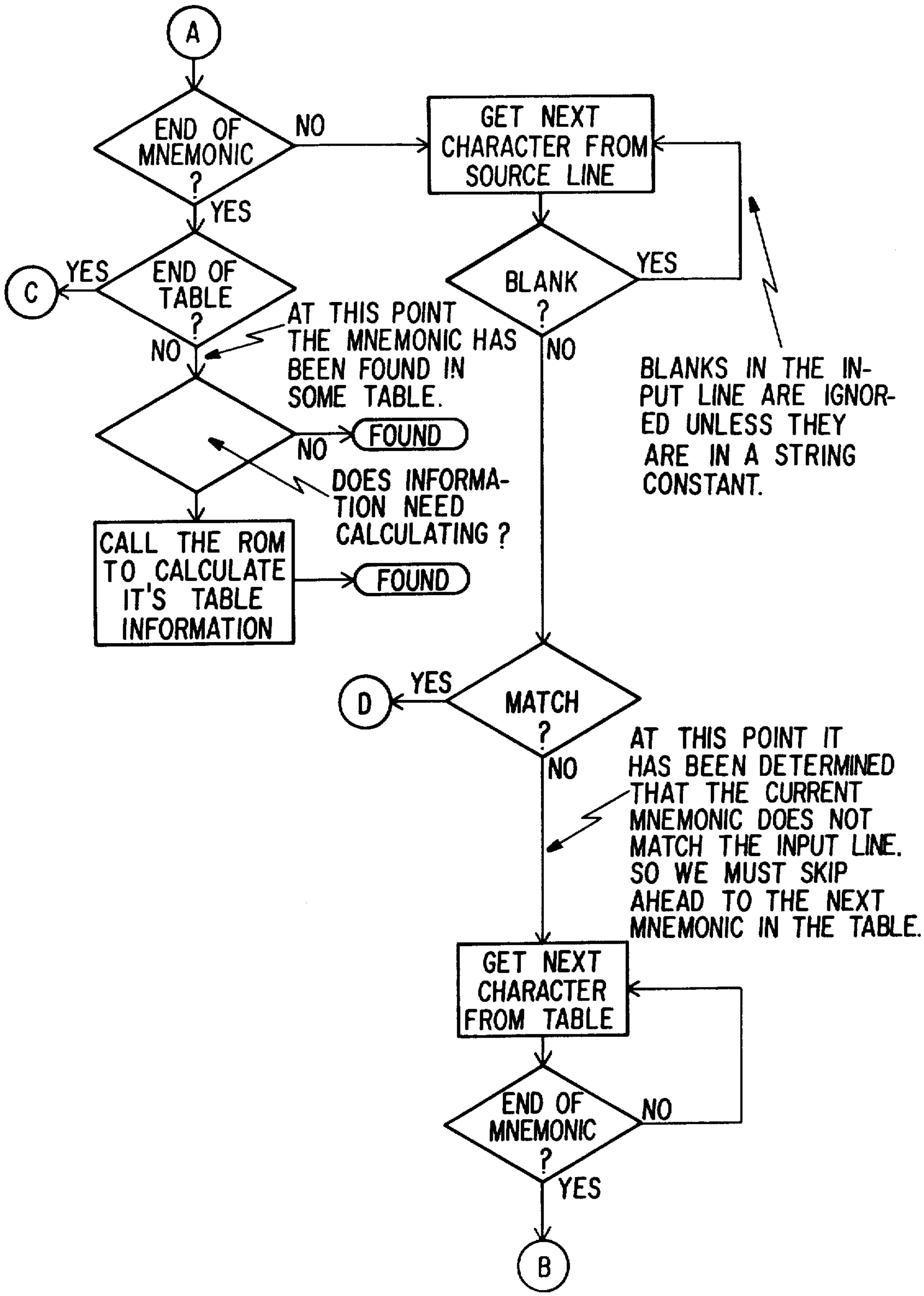

FIGS. 182A-B are a flow chart of a compiler-table search routine stored in the mainframe language ROM of FIGS. 4 and 7.

DESCRIPTION OF THE PREFERRED EMBODIMENT

General Description

Referring to FIG. 1, there is shown a programmable calculator including both a keyboard 320 for entering information into the calculator and for controlling the operation of the calculator and a magnetic tape cassette reading and recording unit 360 for recording information stored within the calculator onto one or more external tape cartridges 12 and for loading information stored on such tape cartridges back into the calculator. The calculator also includes a 32-character 5×7 dot matrix light-emitting diode (LED) display 330 for displaying alphanumeric statements entered into the calculator, results of statement execution, error conditions encountered during operation of the calculator, and messages and data prompts generated during program execution. The calculator further includes a 16-column alphanumeric thermal printer 340 for printing computation results, program listings, and messages generated by the calculator or the user. One or more plug-in read-only memories 230 for increasing the functional capability of the calculator may be plugged into a group of four ROM receptacles 14 provided in the front base of the calculator. A plug-in mainframe language ROM 210 that defines the operating language of the calculator resides in a slot provided on the right base of the calculator. By replacing the mainframe language ROM, the operating language of the calculator may be changed, for example, to either BASIC, FORTRAN, ALGOL or APL computer language.

Figure 2:
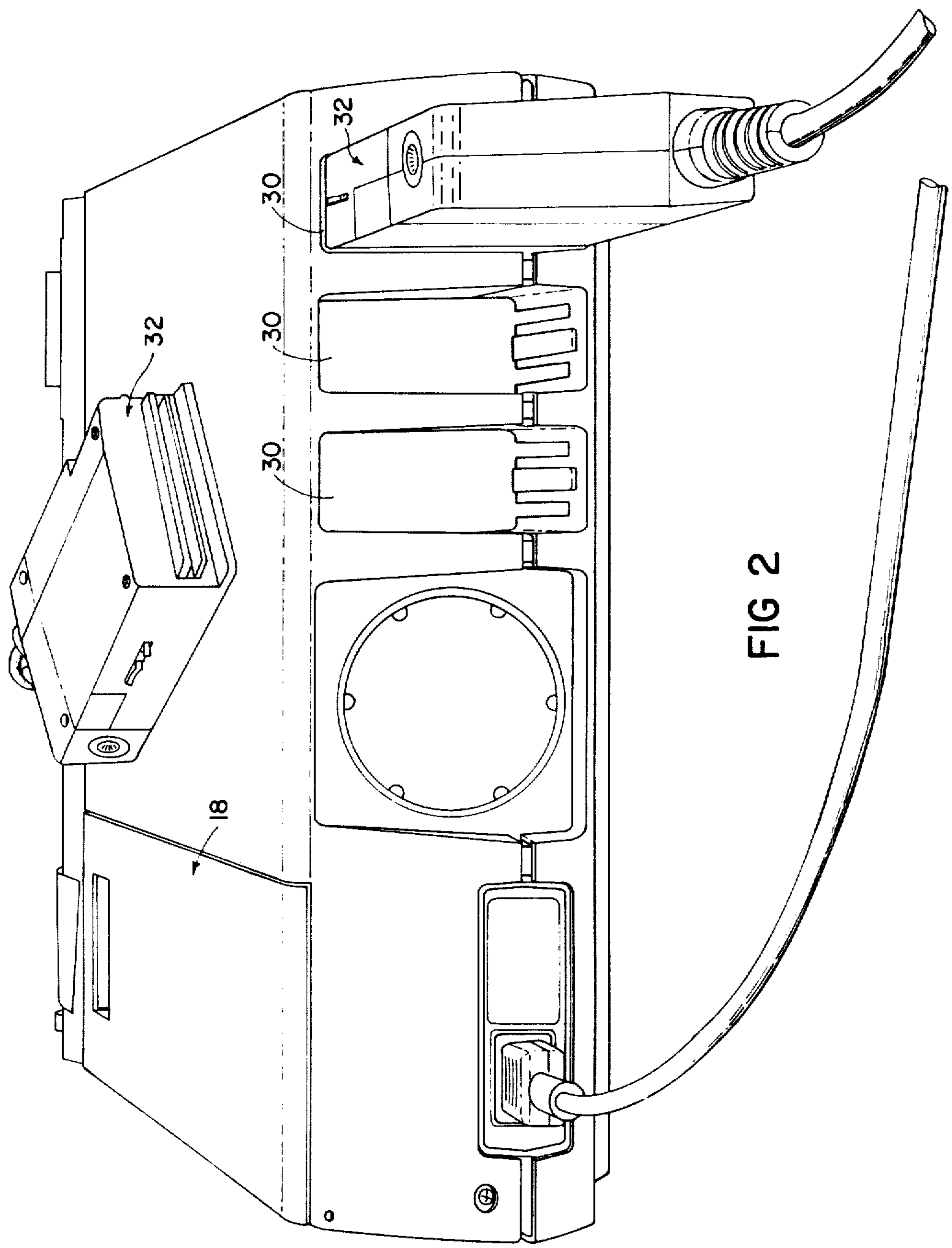
FIG. 2 is a rear perspective view of the programmable calculator of FIG. 1.

As shown in FIG. 2, the rear panel of the calculator includes three input/output (I/O) receptacles 30 for accepting I/O interface modules 32. These I/O interface modules serve to couple the calculator to various selected peripheral I/O units such as X-Y plotters, printers, typewriters, photoreaders, paper tape punches, digitizers, BCD-compatible data gathering instruments such as digital voltmeters, frequency synthesizers, and network analyzers, and a universal interface bus for interfacing to most bus-compatible instrumentation.

The overall operation of the calculator hardware may be understood with reference to the block diagram of FIG. 4. A central processing unit (CPU) 100 handles all data processing performed by the calculator and is arranged to cooperate with a memory section 200 and an I/O section 300. Memory section 200 comprises the mainframe language ROM 210, a basic read-write memory 220, the optional plug-in read-only memory modules 230, and an optional read-write memory 240. I/O section 300 includes a keyboad/display/printer (KDP) control circuit 310, the keyboard input unit 320, the display 330, the thermal printer 340, the magnetic tape cassette reading and recording unit 360, a magnetic tape control circuit 350, and an I/O interface circuit 370. A power module 410 includes a line transformer, a power switch 16 located on the right panel of the calculator, a group of line voltage selection switches, and a group of fuses. The fuses and line voltage selection switches are located within a printer paper supply compartment that is accessible through a hinged cover 18 on the top panel of the calculator.

CENTRAL PROCESSING UNIT

Referring now to FIG. 16, there is shown a more detailed block diagram of the central processing unit 100 of FIG. 4. The heart of the CPU 100 is a microprocessor 101. Microprocessor 101 is a hybrid combination of three NMOS integrated circuits and four schottky TTL bidirectional data buffers.

Microprocessor 101 requires two-phase clocking that is generated by a clock generator circuit 102. A preset circuit 103 initializes the microprocessor 101 by means of a signal POP when the power is not valid, as indicated by a line PVL, or when a RESET key on keyboard input unit 320 is actuated, as indicated by a RESET line. A bus control circuit 104 determines the direction of data flow on the memory bus and further determines which memory section is allowed to place data on the memory bus. A memory timing and control circuit 105 provides the proper timing signals for interfacing the microprocessor 101 to the various memory sections.

Clock Generator

Figure 17:
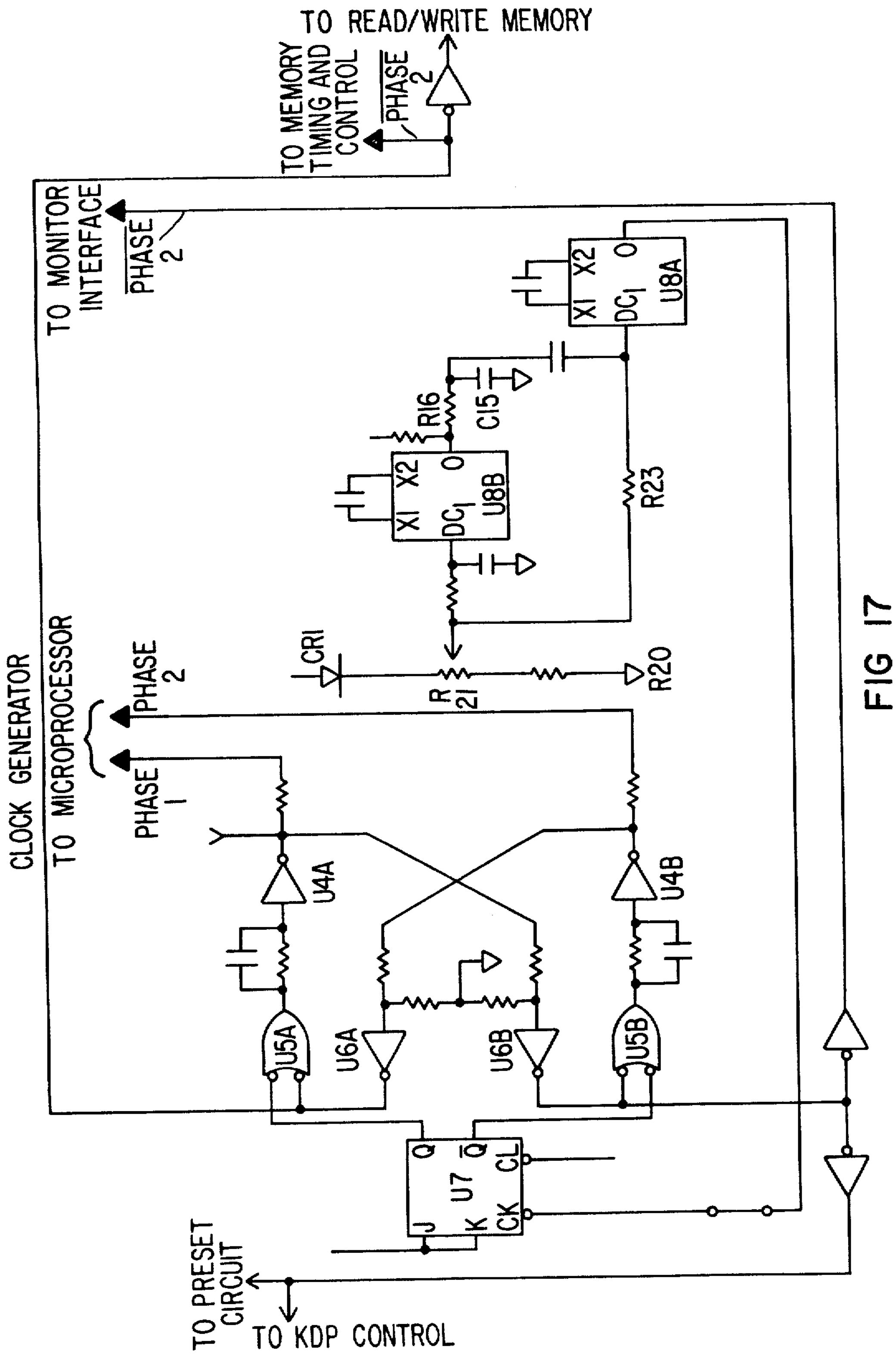
FIG. 17 is a detailed schematic diagram of the clock generator of FIG. 16.

Operation of the clock generator circuit 102 of FIG. 16 may be understood with reference to the detailed schematic diagram of FIG. 17 and with further reference to copending U.S. Pat. application Ser. No. 599,500 entitled TWO-PHASE CLOCK CIRCUIT, filed July 28, 1975, by Loyd F. Nelson et al. and assigned to the same assignee as the present application. A dual voltage controlled multivibrator U8 may comprise, for example, a Motorola MC4024 package. Section U8A of this package and its associated components are employed to generate a nominal frequency of 11.6 megahertz. Section UBA is biased at a nominal voltage of 4.0 volts via resistor R23 from a power supply and a divider network comprising diode CR1 and resistors R20 and R21. Section U8B, similarly biased, generates a signal having a nominal frequency of 10 kilohertz that is integrated by resistor R16 and capacitor C15 to produce a triangular waveform. The triangular waveform is then used to modulate the nominal 10-kilohergtz frequency, thus spreading the energy associated with the basic frequency over a frequency spectrum of 11.2 megahertz to 12 megahertz and reducing both the conducted and radiated energy to an acceptable limit at any given frequency. The resulting frequency is divided by a flip-flop U7 to produce the clock frequency used in the calculator. Devices U4, U5, and U6 provide the two non-overlapping clock signals required by the microprocessor 101. Device U4, which may comprise, for example, a Motorola MMH0026, converts the TTL signal levels to MOS levels, as required by microrprocessor 101. A pair of inverters U6A and U6B feed back the clock signals to U5B and U5A to inhibit each clock signal from proceeding to the high logic tate until the other clock signal has reached the low logic state. Schottky TTL devices are utilized for the gates of devices U5 and U6 to minimize the amount of time each clock signal resides in the low logic state while insuring that the two clock signals will not overlap. The feedback signals of both inverters U6A and U6B are also distributed to various circuits within the calculator synchronization with the microprocessor. Examplary of these circuits are the memory timing control circuit 105, the basic and optional read-write memories 220 and 240, a monitor interface circuit, and the present circuit 103. An output of clock generator 102 is also provided for the KDP control circuit 310 of FIG. 4 for display and printer timing purposes.

Preset Circuit

Figure 18:
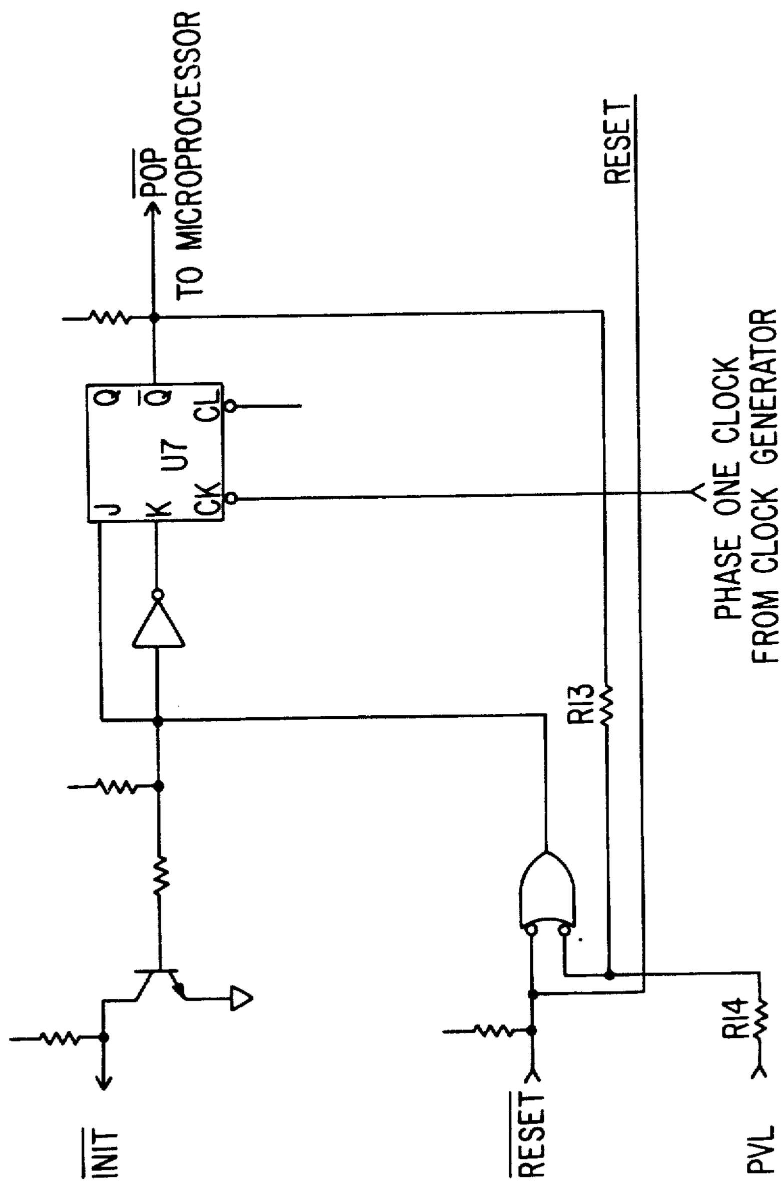
FIG. 18 is a detailed schematic diagram of the preset circuit of FIG. 16.

Operation of the preset cicuit 103 of FIG. 16 may be understood with reference to the detailed schematic diagram of FIG. 18. The output of a flip-flop U7 is a poweer-on pulse POP that is employed to initialize microprocessor 101. Flip-flop U7 synchronizes a power valid line PVL and a reset key line RESET for the microprocessor 101. The PVL line indicates when the power supply voltages are valid. Since the signal on the PVL line transitions slowly, a pair of resistors R13 and R14 are employed to provide sufficient hysteresis to protect against false transitions. Preset circuit 103 also generates an initialization signal INIT that is coupled via the I/O bus of FIG. 16 to the various I/O control circuits 310, 350, and 370 of FIG. 4 to initialize I/O section 300 simultaneously with initialization of microprocessor 101.

Microprocessor

Operation of the microprocessor 101 of FIG. 16 may be understood with reference to the detailed block and schematic diagrams of FIGS. 19–129C. Microprocessor 101 is employed to fetch and execute programmed machine language instructions stored in the memory and to provide a means of communication with various peripheral I/O units. Microprocessor 101 is a hybrid assembly whose active components are four 8-bit bidiectional interface buffers (BIB), a binary processor chip (BPC), an input/output controller (IOC), and an extended math chip (EMC), as shown in the detailed block diagram of FIG. 19. The BPC, IOC, and EMC are each NMOS LSI integrated circuis, while each BIB comprises bipolar devices exclusively.

Figure 20:
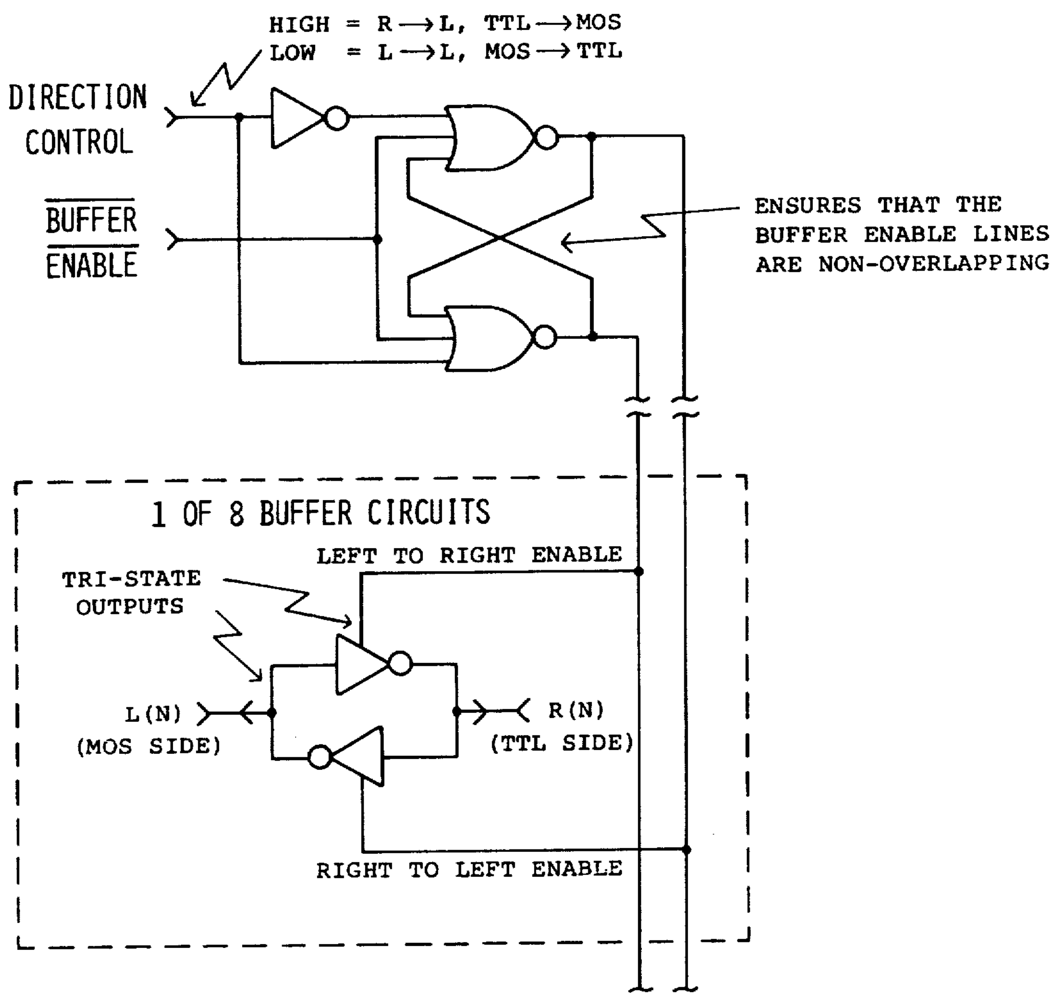
FIG. 20 is a detailed logic diagram of one of the BIBs of FIGS. 16 and 19.

Referring now to FIG. 20, there is shown a detailed diagram of the internal logic of each 8-bit BIB. Each bit is buffered in both directions by tri-state buffers controlled by non-overlapping buffer enable signals. A pair of 8-bit BIBs forms a 16-bit buffer between the three NMOS chips of the microprocessor and the calculator memory. Those BIBs are hereinafter referred to as the memory BIBs. The remaining pair of 8-bit BIBs forms a 16-bit buffer used for communication with peripheral input/output units and are hereinafter referred to as the peripheral BIBs.

The elements of the microprocessor are interconnected by an MOS-level instruction-data bus (IDA). Within the microprocessor 101, the IDA bus comprises sixteen lines labelled $IDA_0$–$IDA_{15}$ that are common to the memory and peripheral BIBs as well as the BPC, IOC, and EMC. Also included are a number of other MOS-level lines, some of which are common to all of the chips within microprocessor 101 and some of which form interconnections with only certain ones of the chips. The IDA bus is employed to transmit encoded information representing either machine language instructions, memory or register addresses, or memory or register data to and from various peripheral input/output units. The remaining lines comprise control lines, clock lines, power supply lines, etc.

The peripheral and member BIBs selectively connect the MOS-level IDA bus within microprocessor 101 to the TTL-level circuitry outside the microprocessor. In the case of operations involving the microprocessor and portions of the calculator memory outside the microprocessor such as transmission of address, data, and instruction information, the memory BIBs are enabled in the direction determined by a bus control circuit 104. The peripheral BIBs are enabled in the appropriate direction by the IOC whenever a word of information is to be exchanged between a peripheral I/O unit and the microprocessor.

As referred to in the following detailed description of the microprocessor 101, the term "memory" means any addressable memory location of the calculator both within and without the microprocessor itself. The term "external memory" refers to the calculator memory section 200 of FIG. 4. The term "register" refers to the various storage locations within the microprocessor itself. These registers range in size from one bit to sixteen bits. The term "addressable register" refers to a register within one of the microprocessor chips that responds as memory when addressed. Most registers are not addressable. In most discussions that follow the context clarifies whether or not a resiter has addressability so that it is not deemed necessary to explicitly differentiate between addressable register and registers. Those registers that are addressable are included in the meaning of the term "memory". The term "memory cycle" refers to a read or write operation operation involving a memory location.

The first 32 memory addresses do not refer to external memory. Instead, these addresses ($0$–$37_8$) are reserved to designate addressable registers within the microprocessor. Table 1 elow lists the addressable registers within the microprocessor.

TABLE 1

| Register | Location | Octal Address | Description and # of Bits |
|---|---|---|---|
| A | BPC | 0 | Arithmetic Accumulator (16) |
| B | BPC | 1 | Arithmetic Accumulator (16) |
| P | BPC | 2 | Program Location Counter (least 15) |
| R | BPC | 3 | Return Stack Pointer (least 15) |
| R4 | IOC | 4 | Peripheral Activity Designator (−) |
| R5 | IOC | 5 | Peripheral Activity Designator (−) |
| R6 | IOC | 6 | Peripheral Activity Designator (−) |
| R7 | IOC | 7 | Peripheral Activity Designator (−) |
| SE | EMC | 24 | Shift Extend Register (least 4) |
| IV | IOC | 10 | Interrupt Vector (upper 12) |
| PA | IOC | 11 | Peripheral Address Register (least 4) |
| W | IOC | 12 | Working Register (16) |
| DMAPA | IOC | 13 | DMA Peripheral Address Register (least 4) |
| DMAC | IOC | 14 | DMA Count Register (16) |
| DMAMA | IOC | 15 | DMA Memory Address & Direction Register (16) |
| C | IOC | 16 | Stack Pointer (16) |
| D | IOC | 17 | Stack Pointer (16) |
| AR2 | EMC | 20 | BCD Arithmetic Accumulator (4 × 16) |

Among several service functions performed by the BOC for the IOC and EMC is the generation of a signal on a register access line RAL whenever an address on the IDA bus is within the range reserved for register designation. The signal on line RAL functions to prevent the external memory from responding to any memory cycle having such an address.

Functional Description of the BPC

The BPC has two main functions. The first is to fetch machine instructions from memory for itself, the IOC, and for the EMC. A fetched instruction may pertain to one or more of those elements. An element that is not associated with a fetched instruction simply ignores that instruction. The second main function of the BPC is to execute the 56 instructions in its repertoire. These instructions include general purpose register and memory reference instructions, branching instructions, bit manipulation instructions, and some binary arithmetic instructions. Most of the BPC's intructions involve one of the two accumulator registers: A and B.

The four addressable registers within the BPC have the following functions: The A and B registers are used as accumulator registers for the arithmetic operations, and also as source and destination locations for most BPC machine-instructions referencing memory. The R register is an indirect pointer into an area of RWM designated to store return addresses associated with nests of subroutines encountered during program execution. The P register contains the program counter; its value is the address of the memory location from which the next machine-instruction will be fetched.

Upon the completion of each instruction the program counter (P register) has been incremented by one, except for the instructions JMP, JSM, RET, and SKIP instructions whose SKIP condition has been met. For those instructions the value of P will depend on the activity of the particular instruction.

Indirect Addressing

Memory addresses on the IDA Bus as 15-bit patterns during the address portion of a memory cycle. The BPC machine-instructions that reference memory are capable of multi-level indirect addressing. The initial indirect indicator is a particular bit in the machine-instruction itself (the most-significant, or left-most, bit: bit 15). The internal operation of the BPC is so arranged that if the memory content of that address also has a one in bit 15, the other bits of the contents are themselves taken as an indirect address. The process of accessing via an indirect address continues until a location is accessed which does not have a one in bit 15. At that time the content of that location is taken as the final address; that is, it is taken to be the address of the desired location and the memory cycle is completed when that location is accessed.

Page Addressing

Machine-instructions fetched from memory are 16-bit instructions. Some of those bits represent the particulr type of instruction, and if it is an instruction that requires a memory cycle, other bits represent the address to be referenced. Only ten bits of a memory reference instruction are devoted to indicating that address. Those ten bits represent one of $1024_{10}$ locations on either the base page or the current page of memory. An additional bit in the machine-instruction indicates which. The base page is always a particular, non-changing, range of addresses, exactly $1024_{10}$ in number. A memory reference machine-instruction fetched from any location in memory (i.e., from any value of the program counter) may directly reference (that is, need not use indirect addressing) any location on the base page.

There are two types of current pages. Each type is also $1024_{10}$ consecutive words in length. A memory referenc machine-instruction can directly reference only locations that are on the same page as it; that is, locations that are within the page containing the current value of the program counter (P). thus the value of P determines the particular collection of addresses that are the current page at any given time. This is done in one of two distinct ways, and the particular way is determined by whether the signal called RELA is grounded or not. If RELA is ungrounded, the BPC is said to address memory in the "relative" mode. If RELA is grounded it is said to operate in the "absolute" mode.

Figure 21:
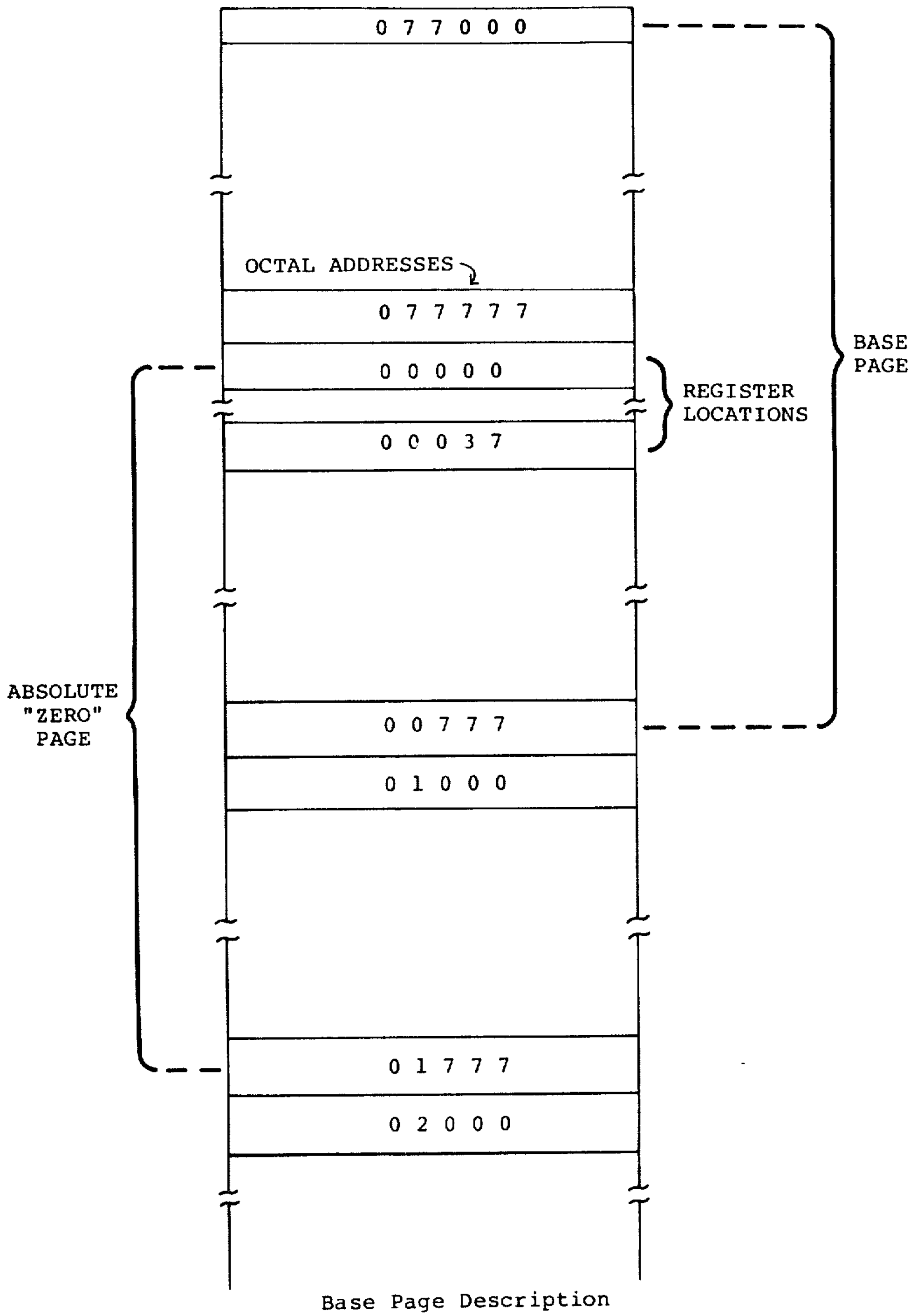
FIG. 21 is a diagram illustrating the memory addressing convention employed by the BPC of FIG. 19.

During its execution each memory reference machine-instruction causes the BPC to form a full 15-bit address based on the ten bits contained within the instruction. How the supplied ten bits are manipulated before becoming part of the address, and how the remaining five bits are supplied, depends upon whether the instruction calls for a base page reference or not, and upon whether the addressing mode is relative or absolute. The differences are determined primarily by the two different definitions of the current page; one for each mode of addressing. Base page addressing is the same in either mode. FIG. 21 depicts the base page.

Absolute Addressing

In the absolute mode of addressing the memory address space is diviced into a base page and 32 possible current pages. The base page consists of addresses $\mathbf{77000}_8$–$\mathbf{77777}_8$ and $\mathbf{00000}_8$–$\mathbf{00777}_8$. the possible current pages are the consecutive $1024_{10}$ word groups beginning with $\mathbf{00000}_8$. The possible current pages can be numbered, 0 through $\mathbf{31}_{10}$. Thus the "zero page" is addressed $\mathbf{00000}_8$–$\mathbf{17777}_8$. Note that the base page is not the same as the zero page; the base page overlaps the zero page and page 31.

Relative Addressing

In relative addressing there are as many possible current pages as there are values of the program counter. In the relative addressing mode a current page is the $\mathbf{512}_{10}$ consecutive locations prior (that is, having lower valued addresses) to the current location (value of P), snd the $\mathbf{511}_{10}$ consecutive locations following the current location.

Base Page Addressing

All memory reference instructions include a 10-bit field that specifies the location referenced by the instruction. What goes in this field is a displacement from some reference location; an actual complete address has too many bits in it to fit in the instruction. This 10-bit field is bit 0 through bit 9. Bit 10 tells whether the referenced location is on the base page, or someplace else. Bit 10 is called the $B/\overline{B}$ bit, as it alone is used to indicate base page references. Bit 10 will be a zero if it is on the base page, and a one if otherwise. In addition, bit 15 indicates whether the reference is indirect, or not. (A one implies indirect.)

If bit 10 is a zero for a memory reference instruction (base page reference), the 10-bit field is sufficient to indicate completely which of the 1024 loctions is to be referenced. There are two ways to describe the rule that is the correspondence between bit patterns in the 10-bit field, and the locations that are the base page: (1) the least significant 10 bits of the "real address" (i.e., $\mathbf{77{,}000}_8$ through $777_8$) are put into the 10-bit field, bit for bit. (2) Another way to describe this is as a displacement of $+\mathbf{777}_8$ or $-\mathbf{1000}_8$ about 0, with bit 9 being the sign.

The 32 register addresses are considered to be a part of the base page. Base page addressing is always done in the manner indicated above, regardless of whether relative or non-relative addressing is employed by the BPC.

Current Page Addressing

Current page addressing refers to memory reference instructions which reference a location which is not on the base page. The same 10-bit field of the machine-instruction is involved, but the $B/\overline{B}$ bit is a one ($\overline{B}$). Now, since there are more than 1024 locations that are not the base page, the 10-bit field by itself, is not enough to completely specify the exact location involved. An "assumption" has to be made about which page of the memory is involved.

The hardware inside the BPC handles 15 bits of address and thus can reference any address in a 32K address space. The "assumption" is that the most significant 5 bits correspond the page, and last 10 bits determine the location within that page.

The assumption for absolute addressing requires that there will be no page changes except by certain ways. This means that once the program counter is set to a particular location the top 5 bits need not be changed for any addressing on that (which ever it is) page. When the assembler assembles a memory reference instruction, it computes the least 10 bits and puts them in the instruction. When the BPC executes the instruction it concatenates its own top 5 bits of P with the address represented by the least 10 bits of the instruction; that produces the complate address for the location referenced by the instruction.

However, the least 10 bits produced by the assembler and placed in the machine-instruction do not correspond exactly to the "real" memory address that is referenced. Bit 9 (the 10th bit) is complemented before it is placed in the address field of the instruction. The other 9 bits are left unchanged. This induces a one-half page offset whose effect is to make current page addressing relative to the middle of the page. FIG. 22 depicts current page absolute addressing. This similarity between current page and base page addressing is deliberate, and results in simplified hardware in the BPC.

Page changes can be accomplished in two ways: incrementing or decrementing the program counter in the BPC, and through indirect addressing. An example of incrementing to a new page is a continuous block of code that spans two adjacent pages. A page change through an increment or decrement can occur in the same general way due to skip instructions.

Indirect addressing allows page changes because the object of an indirect reference is always taken as a full 15-bit address. Indirect addressing is the method used for an instruction on a given page to either reference a memory location on another page (LDA, STA, etc.), or, to jump (JMP or JSM) to a location on another page.

Instructions on any page can make references to any location on the base page without using indirect addressing. This is because the $B/\overline{B}$ bit designates whether the 10-bit field in the instruction refers to the base page or to the current page. If $B/\overline{B}$ is a zero (B), the BPC automatically assumes the upper 5 bits are all zeros, and thus the 10-bit field refers to the base page. If $B/\overline{B}$ is a one ($\overline{B}$), the top 5 bits are taken for what they are, and the current page is referenced (whichever it is).

It is the responsibility of the assembler to control the $B/\overline{B}$ bit at the time the machine-instruction is assembled. It does this easily enough by determining if the address of the operand (or its "value") of an instruction is in the range of $\mathbf{77{,}000_8}$ or, 0 through $\mathbf{777_8}$. If it is, then it's a base page reference and $B/\overline{B}$ is made a zero for that instruction.

Relative addressing does not require the concept of a fixed page, as in absolute addressing. The word "page" can still be used, but requires a new definition:

In relative addressing, a page is $1024_{10}$ consecutive locations, having $512_{10}$ locations prior to the current location, and $511_{10}$ locations following the current location.

As before, direct addressing is possible anywhere within the page. But off-page references (other than to the base page) require indirect addressing, which, once started, works as before—it is not relative, but produces a full 15-bit absolute address.

Figure 23:
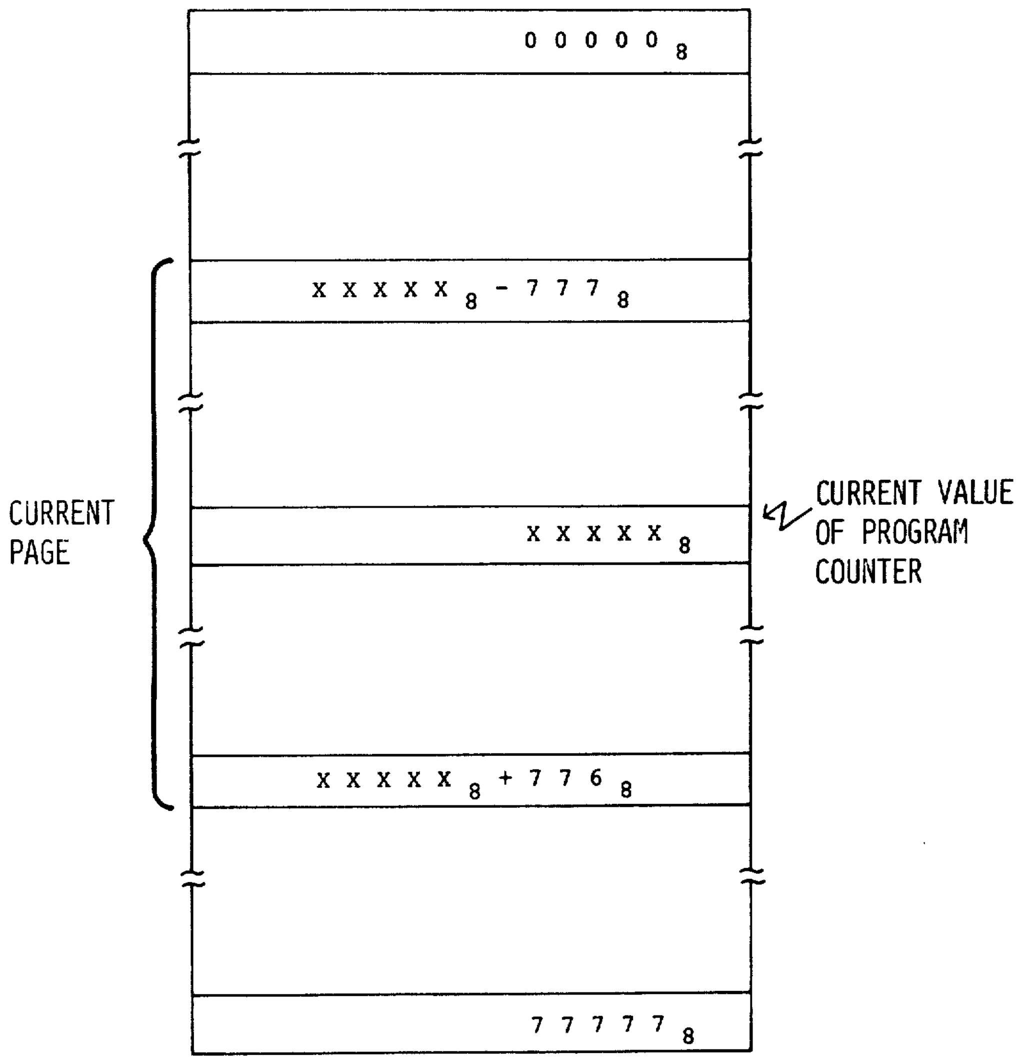
FIG. 23 is a diagram illustrating relative addressing employed by the BPC of FIG. 19.

FIG. 23 illustrates relative addressing. Relative current page addressing is done in much the same was as base page addressing. The 10-bit field in the memory reference instructions is encoded with a displacement relative to the current location.

Bit 9 (the 10th, and most significant bit of the 10) is a sign bit. If it is a zero, then the displacement is positive, and bits 0–8 are taken at face value. If bit 9 is a one, the displacement is negative. Bits 0–8 have been complemented and then incremented (two's complement) before being placed in the field. To get the absolute value of the displacement, simply complement them again, and increment, ignoring bit 9.

BPC Machine Instructions

The Assembly language representation of the BPC machine instructions are three-letter mnemonics. Each machine instruction source statement corresponds to a machine operation in the object program produced by an assembler.

The symobilic notation used in representing the BPC machine instructions is explained in Table 2 below.

TABLE 2

| | |
|---|---|
| m | Memory location |
| n | Numerical quantity. A numeric value that is not an address, but represents a shift or skip amount. |
| I | Indirect addressing indicator. |
| S,C,P | Instruction modifiers. These indicators have various meanings, depending upon the instruction. Each will be explained as it is encountered. |
| ,S/,C | The slash indicates that either item (but not both) may be used at this place in the source statement. |
| [ ] | Brackets indicate that the item contained within them is optional. |

Memory Reference Group of Instructions

The 14 memory reference instructions listed below refer to a specified address in memory determined by the 10-bit address field (m), by the B/B bit, and by the Direct/Indirect bit (I).

LDA m[, I]

Load A from m. The A register is loaded with the contents of the addressed memory location.

LDB m[, I]

Load B from m. The B register is loaded with the contents of the addressed memory location.

CPA m[, I]

Compare the contents of m with the contents of A; skip if unequal. The two 16-bit words are compared bit by bit. If they differ the next instruction is skipped, otherwise it is executed next.

CPB m[, I]

Compare the contents of m with the contents of B; skip if unequal. The two 16-bit words are compared bit by bit. If they differ the next instruction is skipped, otherwise it is executed next.

ADA m[, I]

Add the contents of m to A. The contents of the addressed memory location are added to that of A. The binary sum remains in A, while the contents of m remain unchanged. If a carry occurs from bit 15 the E register is loaded with one, otherwise, E is left unchanged. If an overflow occurs the O register is loaded with one, otherwise the O register is left unchanged. The overflow condition occurs if there is a carry from either bits 14 or 15, but not both together. The E and O registers are one-bit registers within the BPC. They represent the extend (carry out from bit 15) and overflow conditions for binary arithmetic performed by the BPC.

ADB m[, I]

Add the contents of m to B. Otherwise identical to ADA.

STA m[, I]

Store the contents of A in m. The contents of the A register are stored into the addressed memory location, whose previous contents are lost.

STB m[, I]

Store the contents of B in m. The contents of the B register are stored into the addressed memory location, whose previous contents are lost.

JSM m[, I]

Jump to subroutine. JSM permits jumping to subroutines in either ROM or R/W memory. The contents of the return stack register (R) are incremented by one and the contents of P stored in R,I. Program resumes at m.

JMP m[, I]

Jump to m. Program execution continues at location m.

ISZ m[, I]

Increment m; skip if zero. ISZ adds one to the contents of the referenced location, and writes the sum into that location. If the sum is zero, the next instruction is skipped.

DSZ m[, I]

Decrement m; skip if zero. DSZ subtracts one from the contents of the referenced location, and writes the difference into that location. If the difference is zero, the next instruction is skipped.

AND m[, I]

Logical and of A and m. The contents of A and m are anded, bit by bit, and the result is left in A.

IOR m[, I]

Inclusive or of A and m. The contents of A and m are inclusive or'ed, bit by bit, and the result is left in A.

Shift-Rotate Group of Instructions

Each shift-rotate instruction listed below includes a four-bit field in which the shift or rotate amount is encoded. The number to be encoded in the field is represented by n, and may range from 1 to 16, inclusive. The four-bit field (bits 0 through 3) will contain the binary code for n-1.

AAR n

Arithmetic right shift of A. The A register is shifted right n places with the sign bit (bit 15) filling all vacated bit positions; the n-1 most significant bits become equal to the sign bit.

SAR n

Shift A right. The A register is shifted right n places with all vacated bit positions cleared; the n most significant bits become zeros.

SBR n

Shift B right. The B register is shifted right n places with all vacated bit positions cleared; the n most significant bits become zeros.

SAL n

Shift A left. The A register is shifted left n places; the n least significant bits become zeros.

SBL n

Shift B left. The B register is shifted left n places; the least significant bits become zeros.

RAR n

Rotate A right. The A register is rotated right n places, with bit 0 rotating into bit 15.

RBR n

Rotate B right. The B register is rotated right n places, with bit 0 rotating into bit 15.

Alter-Skip Group of Instructions

The alter-skip instructions each contain a six bit field which allows a relative branch to any of 64 locations. The distance of the branch is represented by a displacement, n; n may be within the range of $-32_{10}$ to $31_{10}$ inclusive. Bits 0 through 5 are coded with the value of n as follows: if the value is positive or zero, bit 5 is zero, and bits 0 through 4 receive the straight binary code for the value of n; if the value is negative, bit 5 is a one, and bits 0 through 4 receive a complemented and incremented binary code. Table 3 below illustrates this convention.

TABLE 3

| For n = | bits 5-0 | meaning: (*denotes current value of P) |
|---|---|---|
| -32 | 100000 | if skip, next instruction is *-32 |
| -7 | 111001 | if skip, next instruction is *-7 |
| -1 | 111111 | if skip, next instruction is *-1 |
| 0 | 000000 | if skip, repeat this instruction |
| 1 | 000001 | do next instruction, regardless |
| 7 | 000111 | if skip, next instruction is *+15 |
| 31 | 011111 | if skip, next instruction is *+31 |

All instructions in the alter-skip group have the "skip" properties outlined above. Some of the instructions also have an optional "alter" property. This is where the general instruction form "skip if . . . <some one bit condition>" is supplemented with the ability to alter the state of the bit mentioned in the condition. The alteration is to either set the bit, or clear it. If specified, the alteration is done after the condition is tested, never before.

To indicate in a source statement that an instruction includes the alter option, and to specify whether to clear or to set the tested bit, a C or S follows n. The C indicates clearing the bit, while an S indicates setting the bit.

The "alter" information is encoded into the 16-bit instruction word with 2 bits. Bit 7 is called the H/$\overline{H}$ (Hold/Don't Hold) bit, and bit 6 is the C/S (Clear/Set) bit, for such instructions. If bit 7 is a zero (specifying $\overline{H}$) the "alter" option is not active; neither S nor C followed n in the source statement of the instruction, and the tested bit is left unchanged. If bit 7 is a one (specifying H), then "alter" option is active, and bit 6 specifies whether it is S or C. The alter-skip instruction are listed below.

SZA n

Skip if A is zero. If all 16 bits of the A register are zero, skip the amount indicated by n.

SZB n

Skip if B is zero. If all 16 bits of the B register are zero, skip the amount indicated by n.

RZA n

Skip if A is not zero. If any of the 16 bits of the A register are set, skip the amount indicated by n.

RZB n

Skip if B is not zero. If any of the 16 bits of the B register are set, skip the amount indicated by n.

SIA n

Skip is A is zero, and then increment A. The A register is tested, and then incremented by one. If all 16 bits of A were zero before the increment, skip the amount indicated by n.

SIB n

Skip if B is zero, and then increment B. The B register is tested, and then incremented by one. If all 16 bits of B were zero before the increment, skip the amount indicated by n.

RIA n

Skip if A is not zero, and then increment A. The A register is tested, and then incremented by one. If any bits of A were one before the increment, skip the amount indicated by n.

In connection with the next four instructions, Flag and Status are controlled by the peripheral interface addressed by the current select code. The select code is the number that is stored in the register named PA, located in the IOC. Both Status and Flag originate as negative true signals, so that when a missing interface is addressed Status and Flag will appear to be false, or not set.

SFS n

Skip if Flag line is set. If the Flag line is true, skip the amount indicated by n.

SFC n

Skip if Flag line is clear. If the flag line is false, skip the amount indicated by n.

SSS n

Skip is Status line set. If the status line is true, skip the amount indicated by n.

SSC n

Skip if Status line is clear. If the status line is false, skip the amount indicated by n.

SDS n

Skip if decimal carry set. Decimal carry (DC) is a one bit register in the EMC. It is controlled by the EMC, but connected to the decimal carry input of the BPC. If DC is set, skip the amount indicated by n.

SDC n

Skip if decimal carry clear. Decimal carry (DC) is a one bit register in the EMC. It is controlled by the EMC, but connected to the decimal carry input of the BPC. If DC is clear, skip the amount indicated by n.

SHS n

Skip if halt line set. If the halt line is true, skip the amount indicated by n.

SHC n

Skip if halt line clear. If the halt line is false, skip the amount indicated by n.

SLA n[, S/,C]

Skip if the least significant bit of A is zero. If the least significant bit (bit 0) of the A register is a zero, skip the amount indicated by n. If either S or C is present, bit 0 of A is altered accordingly after the test.

SLB n[,S/,C]

Skip if the least significant bit of B is zero. If the least significant bit (bit 0) of the B register is a zero, skip the amount indicated by n. If either S or C is present, bit 0 of B is altered accordingly after the test.

RLA n[,S/,C]

Skip if the least significant bit of A is non-zero. If the least significant bit (bit 0) of the A register is a one, skip the amount indicated by n. If either S or C is present, bit 0 of A is altered accordingly after the test.

RLB n[,S/,C]

Skip if the least significant bit of B is non-zero. If the least significant bit (bit 0) of the A register is a one, skip the amount indicated by n. If either S or C is present, bit 0 of B is altered accordingly after the test.

SAP n[,S/,C]

Skip if A is positive. If the sign bit (bit 15) of the A register is a zero, skip the amount indicated by n. If either S or C is present, bit 15 of A is altered accordingly after the test.

SBP n[,S/,C]

Skip if B is positive. If the sign bit (bit 15) of the A register is a zero, skip the amount indicated by n. If either S or C is present, bit 15 of B is altered accordingly after the test.

SAM n[,S/,C]

Skip if A is minus. If the sign bit (bit 15) of the A register is a one, skip the amount indicated by n. If either S or C is present, bit 15 of A is altered accordingly after the test.

SBM n[,S/,C]

Skip if B is minus. If the sign bit (bit 15) of the B register is a one, skip the amount indicated by n. If either S or C is present, bit 15 of B is altered accordingly after the test.

SOS n[,S/,C]

Skip if Overflow is set. If the one-bit Overflow register (0) is set, skip the amount indicated by n. If either S or C is present, the 0 register is altered accordingly after the test.

SOC n[,S/,C]

Skip if Overflow is clear. If the one-bit Overflow register is clear, skip the amount indicated by n. If either S or C is present, the O register is altered accordingly after the test.

SES n[,S/,C]

Skip if Extend is set. If the Extend register (E) is set, skip the amount indicated by n. If either S or C is present, E is altered accordingly after the test.

SEC n[,S/,C]

Skip if Extend is clear. If the Extend register (E) is clear, skip the amount indicated by n. If either S or C is present, E is altered accordingly after the test.

Return Group of Instructions

Listed below is the return instruction for the BPC.

RET n[,P]

Return. The R register is a pointer into a stack of words containing the addresses of previous subroutine calls. A read R,I occurs. That produces the address (value of P) for the latest JSM that occurred. The BPC then jumps to address P+n. The valve of n may range from −32 to 31, inclusive. The value of n is encoded into bits 0 through 5 of the instructions as a 6 bit, two's complement, binary number. The ordinary, non-interrupt-service routine return, is RET 1. If a P is present, it "pops" the interrupt system. Two things in the IOC occur when this happens: first, the peripheral address stack in the IOC is popped, and second, the interrupt grant network of the IOC is "decremented".

The peripheral address stack is a hardware stack in the IOC, 4 bits wide, and three levels deep. On the top of this stack is the current select code for I/O operations. Select codes are stacked as interrupts occur during I/O operations. A RET n, P at the end of an interrupt service routine puts the select code of the interrupted device back on the top of the stack.

The interrupt grant network in the IOC keeps track of which interrupt priority level is currently in use. From this it determines whether or not to grant an interrupt request. A RET n, P at the end of an interrupt service routine causes the interrupt grant network to change the current interrupt priority level to the next lower level (unless it is already at the lowest level).

Complement Group of Instructions

Listed below are the complement group machine-instructions of the BPC.

CMA

COmplement A. The A register is replaced by its one's (bit by bit) complement.

CMB

Complement B. The B register is replaced by its one's (bit by bit) complement.

TCA

Two's complement A. The A register is replaced by its one's (bit by bit) complement, and then imcremented by one.

TCB

Two's complement B. The B register is replaced by its one's (bit by bit) complement, and then incremented by one.

Execute Group of Instructions

Listed below is the execute machine-instruction for the BPC.

EXE $O \leq m \leq 37_8$[,I]

Execute register m. The contents of any addressable register can be treated as the current instruction, and executed in the normal manner. The register is left unchanged unless the fetched machine-instruction causes it to be altered. The next instruction executed will be the one following the EXE m, unless the instruction in m cause a branch.

Multi-level indirect addressing is allowed. An EXE m,I causes the contents of m to be taken as the address of the place in memory whose contents are to be executed; this can be anywhere in memory, and need not be another register. But regardless, only 15 bits are required to specify this location. If the 16th bit of m is set, the lower 15 bits are taken as the address of the address, instead of the address of the instruction. This continues until an address is encounted whose 16th bit is zero. Then that address is taken as the final address of the instruction. Using that address one more fetch is done, and the bit pattern found executed as an instruction, even if it has a one in the 16th bit. FIGS. 24A–G depict the bit patterns of th BPC machine-instructions.

Internal Description of the BPC

The details of the BPC may be understood with reference to the block diagram of FIGS. 25A–C. The majority of activity within the BPC is controlled by a ROM.

This is a programmed logic array whose input qualifiers are a 4-bit state-count, group, miscellaneous, and input-output qualifiers. From the ROM are decoded micro-instructions. Each machine-instruction that the BPC executes, and the BPC's response to memory cycles directed at its addressable registers, is a complex series of micro-instructions. This activity is represented by the flow charts depicted in FIGS. 91A through 105.

Changes in the state-count correspond to the step-by-step sequence of activity shown in the flow charts. The State-Counter has a natural sequence that was chosen by computer simulation to reduce the complexity of the necessary number of non-sequential transitions. When a section of the flow chart requires a non-sequential transition it decodes a special micro-instruction whose purpose is to override the natural sequence and produce the desired alteration in the state-count.

The Group Qualifiers are generated by Instruction Decode. The Group Qualifiers represent the instruction that has been fetched and that must now be executed.

The Input-Output Qualifiers are controlled by the M-Section. Those qualifiers are used in decoding micro-instructions, and in flow chart branching, that are dependent upon or have to do with input and output to the BPC.

The $\overline{\text{IDB}}$ Bus is the internal BPC representation of the IDA Bus. To conserve power, this bus is used dynamically; it is precharged on phase two, and is available for data transmission only during phase one. Data on the $\overline{\text{IDB}}$ Bus is transmitted in negative true form; a logical one is encoded on a given line of the bus by grounding that line.

The main means of inter-register communication within the BPC is via the $\overline{\text{IDB}}$ Bus and the various set and dump micro-instructions. For instance, a SET I loads the I Register with the contents of the $\overline{\text{IDB}}$ Bus. A DMP IDA places the contents of the IDA Bus onto the $\overline{\text{IDB}}$ Bus. A simultaneous DMP IDA and SET I loads the I Register with the word encoded on the IDA Bus. As a further instance, that very activity is part of what is decoded from the ROM at the conclusion of a memory cycle that is an instruction fetch. FIGS. 115A–C and 116 illustrate the waveforms associated with the start-up sequence and an instruction fetch.

Once the instruction is in the I Register, the bit pattern of the instruction is felt by Instruction Decode. Aside from the afore-mentioned Group Qualifies, Instruction Decode generates two other groups of signals. One of these are control lines that go to the Flag Multiplexer to determine which, if any, of the external flag lines is involved in the execution of the current machine-instruction. The remaining group of signals are called the Asynchronous Control Lines. These are signals that, unlike micro-instructions, are steady-state signals present the entire time that the macine-instruction is in the I Register. The Asynchronous Control Lines are used to determine the various modes in which much of the remaining hardware will operate during the execution of the machine-instruction. For example, the S Register is capable of several types of shifting operations, and the micro-instruction that causes S to shift (SSE) means only that S should now shift one time. The exact nature of the particular type of shift to be done corresponds to the type of shift machine-instruction in the I Register. This in turn affects Instruction Decode and the Asynchronous Control Lines, which in turn affect the circuitry called S Register Shift Control. It is that circuitry that determines the particular type of shift operation that S will perform when an SSE is given.

In a similar way the Asynchronous Control Lines affect the nature of the operation of the Arithmetic-Logic Unit (ALU), the Skip Matrix, and the A and B registers.

The least four bits of the I Register are a binary decrementer and CTQ Qualifier network. This circuitry is used in conjuction with machine-instructions that involve shift operations. Such machine-instructions have the number of shifts to be performed encoded in their least four bits. When such an instruction is in the I Register, the least four bits are decremented once for each shift that is performed. The CTQ Qualifier indicates when the last shift has been performed.

The A and B Registers are primarily involved in machine-instructions that; read to, or write from, memory; do binary arithmetic; shift; or, branch. Machine-instructions that simply read from, or, write to, memory, are relatively easily executed, as the main activity consists of dumping or setting the A or B Register. The arithmetic instruction involve the ALU.

The ALU has three inputs. One is the $\overline{\text{ZAB}}$ Bus. This bus can transmit either zero, the A Register, or the B Register. The choice is determined by the Asynchronous Control Lines. The input from the $\overline{\text{ZAB}}$ Bus can be understood in its true, or in its complemented form. The second input to the ALU is the S Register. The remaining input is a carry-in signal.

The ALU can perform three basic operations: logical and, logical inclusive or, and binary addition. The choice is determined by th Asynchronous Control Lines.

Whatever operation is performed is done between the complemented or uncomplemented contents of the $\overline{\text{ZAB}}$ Bus, and the contents of the S Register. The output of the ALU is avaiable through the DMP ALU micro-instruction, as well as through lines representing the carry-out from the 14th and 15th bits of the result. These carry-outs are used to determine whether or not to set the one-bit Extend and Overflow Registers.

The R Register is the return stack pointer for the RET machine-instruction.

The P Register is the program counter. Associated with it are several other pieces of circuitry used for incrementing the program counter, as well as for forming complete 15-bit addresses for memory cycles needed in the execution of memory reference or skip machine-instructions. These other pieces of circuitry are the T Register, the P-Adder Input, P-Adder Control, and the P-Adder.

The P-Adder mechanism can operate in one of the three modes. These modes are established by micro-instructions, not by the Asynchronous Control Lines. In the memory reference machine-instruction mode (established for the duration of the ADM micro-instruction) the T Register will contain a duplicate copy of the memory reference machine-instruction being executed. Thus the 10-bit address field of the machine-instruction and the base page bit (bit 10) as well as top 5 bits of all the program counter, are available to the adder mechanism. In accordance with the rules for either relative or absolute addressing (as determined by RELA) the P-Adder Input and P-Adder operate to produce the correct full 15-bit address needed for the assoicated memory cycle.

The ADS micro-instruction establishes a mode where only the least five bits of a skip machine-instruction are combined with the program counter to produce a new value for the program counter.

In the absence of either an ADM or ADS micro-instruction the P-Adder mechanism defaults to an increment-P mode. In this mode the value of P+1 is continuously being formed. This is the typcial way in which the value of the program counter is changed at the end of non-branching machine-instructions.

The output of the P-Adder mechanism is available to the $\overline{IDB}$ Bus through the DMP PAD micro-instruction.

The D Register is used to drive the IDA Bus through the SET IDA micro-instruction. Because of limitations on transitor device sizes and the large capacitances possible on the IDA Bus, two consecutive SET IDA's are required to ensure that the IDA Bus properly represents the desired data.

The BPC has special circuitry to detect a machine-instruction that requires an indirect memory cycle. This circuitry generates a qualifier used in the ROM. The flow-charting that corresponds to a machine-instruction that can do indirect addressing has special activity to handle the occurrence of an indirect reference.

In the event of an interrupt request generated by the IOC, the BPC aborts the execution of the machine-instruction just fetched, and without incrementing the program counter, executes the following machine-instruction instead: JMP $10_8$,I. Register $10_8$ is the Interrupt Vector Register (IV) in the IOC. This is part of the means by which vetored interrupt is implemented. FIGS. 117A–B illustrate interrupt operation.

In the event that an addressable register within the BPC is the object of a memory cycle, whether the memory cycle is originated by he BPC itself, or by an agency external to the BPC, a BPC Register Detection and Address Latch circuit detects that fact (by the value of the address) and latches the address, and also latches whether the operation is a read or a write. The result of this action is two-fold: First, it supplies qualifier information to the ROM so that micro-instructions necessary to the completion of the memory cycle may be issued. Secondly, it initiates action within the M-Section that aids in the handling of the various memory cycle control signals.

FIGS. 106–114 are waveforms that illustrate the various memory cycles that can occur.

The BPC can interrupt the execution of a machine-instruction to allow some other agency to use the IDA Bus. The BPC will do this whenever Bus Request ($\overline{BR}$) is active, and the BPC is not in the middle of a memory cycle. When these conditions are met, the BPC issues a signal called Bus Grant (BG) to inform the requesting agency that the IDA Bus is available, and the BPC also generates an internal signal called Stop (STP) that halts the operation of the decrementer in the I Register, and halts the change of the ROM state-counter. In addition, STP inhibits the decoding from the ROM of all but those micro-instructions needed to respond to memory cycles under the control of the M-Section. STP and BG are given until the requesting agency signals that its use of the IDA Bus is over by releasing $\overline{BR}$. This capability is the basis of Direct Memory Access, as implemented by the IOC. FIGS. 118 and 119A–B illustrate the operation of Bus Request and Bus Grant. Communication Between the BPC and IOC Each major element in the microporcessor is connected to the IDA Bus and some related control lines. The IDA Bus allows elements of the system to both "send" and "receive" 16-bit words.

The term "chip" refers to any of the BPC, IOC, or EMC.

Consider this question: "Since there are some separate instructions for the IOC, and since the BPC is sort of the 'head processor' that does the fetching of instructions from memory, how is it that the IOC receives its instructions and that the BPC is not disturbed by fetching such an instruction?"

The answer is: All chips in the microprocessor are exposed to instructions via the IDA Bus as they are fetched. A chip will either execute an instruction, or idle until the next instruction fetch. An instruction can cause activity in more than one chip.

There is a singal called Sync, which is issued by common consent of all the chips in the microprocessor, and whose significance is that the next memory cycle is an instruction fetch. During that fetch, the instruction word appears on the IDA Bus. Each chip in the microprocessor looks at the word and puts it through an instruction decode process to determine if that chip needs to initiate some activity. If a chip recongnizes a machine-instruction, it pulls Sync to ground and beings the activity.

More than one chip can recognize the same instruction, and this does happen (the RET n,P machine-instruction affects both the BPC and the IOC). While each chip is busy, it keeps Sync grounded, releasing it when its activity is completed. When all activity is complete, (i.e., Sync is allowed to go high by all chips), the BPC initiates the next instruction fetch. The other chips in the microporcessor can recognize this memory access as an instruction fetch because Sync has gone high.

If a chip is not affected by an instruction, it idles until either another Sync/instruction fetch, or, until some other mechanism causes the chip to respond. For instance, the IOC can be the object of a memory cycle required by the BPC's execution of a memory reference instruction (which the IOC has decoded as "not me").

Each element in the system decodes the addresses for which it contains addressable registers. To initiate a register memory cycle, an element of the microprocessor puts the address of the desired location on the IDA Bus, sets the Read/Write line high or low, and giv es Start Memory. Then, elsewhere in the microporcessor the address is decoded and recognized, and an element of the microprocessor begins to function as memory. It is part of the system definition that whatever is on the IDA Bus when a Start Memory is given is an address of a memory (or register) location.

Here is a complete description of the entire process: An originator originates a memory cycle by putting the address on the IDA Bus, setting the the Read/Write line, and giving a Start Memory. The respondent identifies itself as containing the object location of the memory cycle, and handles the data. If the originator is a sender (write) it puts and holds the data on the IDA Bus until the respondent acknowledges receipt by sending Memory Complete. If the originator is a receiver (read) the respondent obtains and puts the data onto the IDA Bus and then sends Memory Complete. The originator then has one clock time to capture the data; no additional acknowledgement is involved.

Description of the IOC

The IOC includes a register called the Peripheral Address Register (PA) which is used in establishing the select code currently in use. The bottom four bits of this register are brough out of the IOC as PA0 through PA3. Each Peripheral Interface decodes PA0–PA3 and thus determines if it is the addressed interface.

The peripheral address is established by storing the desired select code into PA with an ordinary memory reference instruction.

Flag, Status and Control

The peripheral interface is the source of the Flag and Status bits for the BPC instructions SFS, SFC, SSS, and SSC. Since there can be many interfaces, but only one each of Flag and Status, only the interface addressed by the select code is allowed to ground these lines. Their logic is negative-true, and a result of this is that if the addressed peripheral is not present on the I/O Bus, $\underline{\text{Status}}$ and $\underline{\text{Flag}}$ are logically false.

$\overline{\text{IC1}}$ and $\overline{\text{IC2}}$ are two control lines that are sent to each peripheral interface by the IOC. The state of these two lines during the transfer of information can be decoded to mean something by the interface. Just what 'something' will be is subject to agreement between the firmware designer and the interface designer—it can be anything they want, and might not be the same for different interfaces. These two lines act as a four position mode switch on the interface, controlled by the IOC during an I/O operation.

I/O Bus Cycles

An I/O Bus cycle is an exchange of a word between the IDA Bus and the IOD Bus. The information transfer between the processor and an interface is not of the handshake variety.

Timing diagrams for read and write I/O Bys cycles are shown in FIGS. 121 and 122. These cycles are initiated by standard (programmed) I/O instructions, interrupts, and by DMA.

For example, during a standard I/O instruction, an I/O Bus cycle is initiated by a reference to one of R4 through R7 in the IOC. One way that can be done is with a BPC memory reference instruction; for instance, STA R4 (for a write cycle), or LDA R4 (for a read cycle).

Consider a write I/O Bus cycle as illustrated in FIG. 121. This is initiated with a refernce to one of R4–R7. The IOC sees this as an address between 4 and 7 on the IDA Bus while $\overline{\text{STM}}$ is low. The Read line is low to denote a write operation. The IOC enables the peripheral BIB's and specifies the direction. It also sets the control lines $\overline{\text{IC1}}$ and $\overline{\text{IC2}}$, according to which register was referenced. Meanwhile, the BPC has put the word that is to be written onto the IDA Bus. That word is felt at all peripheral interfaces. The interface that is addressed used $\overline{\text{DOUT}}$ to understand it's to read something, and uses $\overline{\text{IOSB}}$ as a strobe for doing it. After $\overline{\text{IOSB}}$ is given, the IOC gives [Synchronized] memory Complete ($\overline{\text{SMC}}$) and the process terminates. The BPC has written a word to the interface whose select code matched the number in the PA register.

A read I/O Bus cycle is similar, as shown in FIG. 122. Here the BPC expects to receive a word from the addressed peripheral interface. Read, $\overline{\text{DOUT}}$ and $\overline{\text{BE}}$ are different because the data is now moving in the other direction.

In either case, the cirtical control signals $\overline{\text{SMC}}$ and $\overline{\text{IOSB}}$ are given by the IOC, and their timing is fixed. There can be no delays due to something's not being ready, nor is there any handshake between the interface and the IOC.

It is the responsibility of the firmware not to initiate an I/O Bus cycle involving a device that is not ready. To do so will result in lost data, and there will be no warning that this has happened.

Place and Withdraw

The IOC includes some firmware-stack manipulation instructions. Two registers are provided as stack pointers: C and D. There are eight place and withdraw instructions for putting things into stacks and getting them out. Furthermore, the place and withdraw instructions can handle full 16-bit words, or pack 8-bit bytes in words of a stack. And last, there are provisions for automatic incrementing and decrementing of the stack pointer registers, C and D.

The mnemonics for the place and withdraw instructions are easy to decipher. All place instructions begin with P, and all withdraw instructions begin with W. The next character is a W or B, for word or byte, respectively. The next character is either a C or D, depending upon which stack pointer is to be used. There are eight combinations, and each is a legitimate instruction.

A PWD A,1 reads as follows: place the entire word of A into the stack pointed at by D, and increment the pointer before the operation. The instruction WWC B,D is read: Withdraw an entire word from the stack pointed at by C, put the word into B, and decrement the stack pointer D after the operation.

The place and withdraw instruction outwardly resembles the memory reference instructions of the BPC: a mnemonic followed by an operand that is understood as an address, followed by an optional 'behavior modifier'. The range of values that the operand may have is restricted, however. The value of the operand must be between O and 7, inclusive. Thus, the place and withdraw instructions can place from, or, withdraw into, the first eight registers. These are A, B, P, R, and R4 though R7. Therefore, the place and withdraw instructions can initiate I/O Bus cycles; they can do I/O.

The place and withdraw instructions automatically change the value of the stack pointer each time the stack is accessed. In the source text an increment or decrement is specified by including a ,I or a ,D respectively, after the operand.

Regardless of which of increment or decrement is specified, a place instruction will do the increment or decrement of the pointer prior to the actual place operation. Contrariwise, the withdraw instructions do the increment or decrement after actual withdraw operation. The reason for this is that it always leaves the stack with the pointer pointing at the now 'top-of-the-stack'.

Place and Withdraw for Bytes

The following explains how the place and withdraw instructions are used for placing and withdrawing bytes as opposed to complete words. First, the stack is always a stack composed of words. However, for byte operations bit 15 of the pointer register assumes added significance; it selects the left-half or right-half of the word on top of the stack. If bit 15 of the pointer register is a one, the left-half is selected. Also, only the right-half of the registers A, B, P, R, and R4–R7 are taken as the operands; the left halves are ignored.

Thus, the instructions place from, or, withdraw into, the right-half of the referenced register. The left-half of the destination register is cleared during a withdraw operation. The instructions place into, or, withdraw from, the left or right half of the top of the stack, as determined by bit 15 of the pointer register. A place operation does not disturb the unreferenced half of the destination word in the stack, provided the memory entity properly utilizes the $\overline{BYTE}$ line. After each place or withdraw, bit 15 is automatically toggled, to provide a left-right-left-right- . . . sequence.

However, it is up to the firmware to see to it that bit 15 of the pointer register is properly set prior to beginning stack operations.

When incrementing the stack pointer, bit 15 automatically changes state each time. But, the address contained in the lower 15 bits increments only during the zero-to-one transition of bit 15. Similarly, when decrementing the transition of bit 15 from a one to a zero is accompanied by a decrement of the lower 15 bits.

The incrementing and decrementing schemes just described are only for increments and decrements brought about by a ,I or ,D following the operand of a Place or Withdraw instruction. Increments or decrements to the pointer register with ISZ or DSZ do not automatically toggle bit 15.

The place-byte instruction cannot be used to place bytes into the registers within the BPC, EMC, and IOC. The reason for this is that these chips do not utilize the $\overline{BYTE}$ line of the IDA Bus during references to their internal registers.

The $\overline{BYTE}$ line is a signal supplied by the IOC for use by any interested memory entity. The $\overline{BYTE}$ line indicates that whatever is being transferred to or from memory is a byte (8 bits) and that bit 15 of the address indicates right or left half. If is up to the memory (if it is a 16-bit mechanism) to merge the byte in question with its companion byte in the addressed word.

In the case of a withdraw-byte the memory can supply the full 16-bit word (that is, igonre the $\overline{BYTE}$ line). The IOC will extract the proper byte from the full word and store it as the right-half of the referenced register; the left half of the referenced register is cleared. In the case of a place-byte, however the IOC copies the entire referenced register into W, and outputs its right as either the upper or lower byte (according to bit 15 of the address) in a full 16-bit word. The full word is transmitted to the memory, and the "other" byte is all zeros. Thus, in this case the memory must utilize the $\overline{BYTE}$ line.

The consequence of the above is that any byte-oriented stacks to be managed using the place instruction must not include registers in any of the BPC, EMC, or IOC; that is, C and D must not assume any value between 0 and $37_8$ inclusive for a place-byte instruction.

Standard I/O

Standard programmed I/O involves three activites:

(1) Setting the peripheral address (2) Investigating the status of the peripheral (3) Initiating an I/O Bus Cycle

Addressing the Peripheral

A peripheral is selected as the addressed peripheral by storing its octal select code into the register called PA (Peripheral Address—address $11_8$). Only the four least significant bits are used to represent the select code.

Checking Status

The addressed peripheral is allowed to control the Flag and Status lines. (That is, it is up to the interface to not ground Flag or Status unless it is the addressed interface.) These lines have an electrically negative-true logic so that when floating they appear false (clear, or not set) for SFS, SFC, SSS, and SSC.

The basic idea (and it can be done in a variety of ways) is to use sufficient checks of Flag and Status before and amongst the I/O Bus Cycles such that there is no possibility of initiating an I/O Bus Cycle to a device that is not ready to handle it. One way to do this with standard I/O is to precede ever Bus Cycle with the appropriate checks.

Initiating I/O Bus Cycles

An I/O Bus Cycle occurs once each time one of R4–R7 ($4_8$–$7_8$) is accessed as memory. An instruction that "puts" something into R4–R7 results in an output (write) I/O Bus Cycle. Conversely, an instruction that "gets" something from R4–R7 results in an input (read) I/O Bus Cycle. However, there are no R4 through R7. The use of address 4–7 is just a device to get an I/O Bus Cycle started; they do not correspond to actual physical registers in the IOC.

The Interrupt System

The idea behind interrupt is that for certain kinds of peripheral activity, the calculator can go about other business once the I/O activity is initiated, leaving the bulk of the I/O activity to an interrupt service routine. When the peripheral is ready to handle another ration of data (it might be a single byte or a whole string of words) it requests an interrupt. When the micro-processor grants the interrupt, the firmware program currently being executed is automatically suspended, and there is an automatic JSM to an interrupt service routine that corresponds to the device that interrupted. The service routine uses standard programmed I/O to accomplish its task. A RET O,P terminates the activity of the service routine and causes resumption of the suspended program.

Priority

The interrupt system allows even an interrupt service routine to be interrupted and is therefore a multi-level interrupt system, and it has a priority scheme to determine whether to grant or ignore an interrupt request.

The IOC allows two levels of interrupt, and has an accompanying two levels of priority. Priority is determined by select code; select codes $0$–$7_8$ are the lower level (priority level 1), and select codes $10_8$–$17_8$ are the higher level (priority level 2). Level 2 devices have priority over level 1 devices; that is, a disc driver operating at level 2 could interrupt a plotter operating at level 1, but not vice versa. Within a priority level all devices are of "equal" priority, and operation is of a first come-first served basis; a level 1 device cannot be interrupted by another level 1 device, but only by a level 2 device. Within a level priorities are not equal in the case of simultaneous requests by two or more devices within a level. In such an instance the device with the higher numbered select code has priority. With no interrupt routine in progress, any interrupt will be granted.

Vectored Interrupts

Devices request an interrupt by pulling on one or two interrupt request lines ($\overline{IRL}$ and $\overline{IRH}$—one for each priority level). The IOC determines the requesting select code by means of an interrupt poll, to be described in the next paragraph. If the IOC grants the interrupt it saves the existing select code located in PA, puts the interrupting select code in PA, and does a JSM-Indirect through an interrupt table to get to the interrupt service routine.

An interrupt poll is a special I/O Bus Cycle to determine which interface(s) is (are) requesting an interrupt. An interrupt poll is restricted to one level of priority at a time, and is done only when the IOC is prepared to grant an interrupt for that level.

The interfaces distinguish an Interrupt Poll Bus Cycle from an ordinary I/O Bus Cycle through the $\overline{\text{INT}}$ line being low. Also, during this Bus Cycle $\overline{\text{PA3}}$ specifies which priority level the poll is for. An interface that is requesting an interrupt on the level being polled responds by grounding the nth I/O Data line of the I/O Bus, where n equals the device's select code modulo eight. If more than one device is requesting an interrupt, the one with the higher select code will have priority.

Automatic Peripheral Addressing

The IOC has a three-deep first-in last-out hardware stack. The top of the stack is the Peripheral Address register (PA-$11_8$). The stack is deep enough to hold the select code in use prior to any interrupts, plus the select codes for two levels of interrupt. When an interrupt is granted, the IOC automatically pushes the select code of the interrupting device (as determined by the interrupt poll) onto the stack. Thus the previous select code-in-use is saved, and the new select code-in-use becomes the one of the interrupting device.

Interrupt Table

It is the responsibility of the firmware to maintain an interrupt table of 16 consecutive words, starting at some RWM address whose four least significant bits are zeros. The firmware is also to see to it that the starting address of the table is stored in the IV register (Interrupt Vector register - $10_8$), and that bit 15 of IV is set. (IV is the first of two levels in an indirect chain. For an address in the interrupt table to be taken indirectly, the previous address (IV) must have had bit 15 set.)

The words in the interrupt table contain the addresses of the interrupt service routines for the 16 different select codes. FIG. 123 depicts the interrupt table.

After the interrupt poll is complete the select code of the interrupting device is made to be the four least significant bits of the IV register. Thus IV now points at the word in the Interrupt Table which has the address of the appropriate interrupt service routine.

All that is needed now is a JSM IV,I, and the interrupt service routine will be under way. This is accomplished by the BPC as explained below.

Interrupt Process Summary

The IOC inspects the interrupt requests $\overline{\text{IRL}}$ and $\overline{\text{IRH}}$ during the time sync is given. Based on the priority of the interrupt requests, and the priority of any interrupt in progress, the IOC decides whether or not to grant an interrupt. If it decides to allow an interrupt it immediately pulls $\overline{\text{INT}}$ to ground, and also begins an interrupt poll.

The grounding of $\overline{\text{INT}}$ serves three purposes: It allows the interfaces to identify the forthcoming I/O Bus Cycle as an interrupt poll; it causes all the chips in the system, except the BPC, to abort their instruction decode process (which by this time is in progress) and return to their idle states; and it causes the BPC to abort its instruction decode and execute a JSM $10_8$, I instead.

The IOC uses the results of the interrupt poll to form the interrupt vector, which is then used by the JSM $10_8$, I. It also pushes the new select code onto the peripheral address stack, and puts itself into a configuration where all interrupt requests except those of a higher priority will be ignored.

Interrupt Service Routines

The majority of the interrupt activity described so far is accomplished automatically by the hardware. All the firmware has been responsible for has been the IV register, the maintenance of the interrupt table, and (probably) the initiation of the particular peripheral operation involved (plotting a point, backspace, finding a file, etc.). Such operations (initiated through a command given by simple programmed I/O) may involve many subsequent I/O Bus Cycles, done at odd time-intervals, and requested by the peripheral through an interrupt. It is the responsibility of the interrupt service routine to handle the I/O activity required by the peripheral without upsetting the routine that was interrupted.

The last things done by an interrupt service routine are to: (if necessary) shut off the interrupt mode of the interface; restore any saved values; and to execute a RET O,P.

The RET O part acts to return to the routine that was interrupted, so that its execution will continue. The P acts to pop the peripheral address stack and adjust the IOC's internal indicator of what priority level of interrupt is in progress. By popping the peripheral address stack, PA is set back to whatever it was prior to the most recent interrupt.

Disabling the Interrupt System

The interrupt system can be "turned off" by a DIR intruction. After this instruction is given the IOC will refuse to grant any interrupts whatsoever, until the interrupt system is turned back on with the instruction EIR. While the IOC won't grant any interrupts, the RET O,P works as usual so that interrupt service routines may be safely terminated, even while the interrupt system is turned off.

Pop On Turn-On

There is a signal called $\overline{\text{POP}}$ generated by the power supply. Its purpose is to initialize all the chips in the calculator system during turn-on. $\overline{\text{POP}}$ leaves the IOC with the DMA and Pulse Count Modes turned off, and with the interrupt system turned off. The contents of the internal registers are random.

Direct Memory Access

Direct Memory Access is a means to exchange entire blocks of data between memory and peripherals. A block is a series of consecutive memory locations. Once started, the process is mostly automatic; it is done under control of hardware in the IOC, and regulated by the interface.

The DMA process transfers a word at a time, on a cycle-steal basis. This means that to transfer a word the IOC requests control of the IDA Bus with $\overline{\text{BR}}$, halting all other system activity for the duration of IOC control over the Bus, which is one memory cycle. When granted the Bus the IOC uses it to accomplish the necessary memory activity.

A transfer of a word is initiated at the request of the interface. To request a DMA transfer a device grounds the DMA Request line ($\overline{DMAR}$). Since there is only one channel of DMA hardware, and one DMA Request line, only one peripheral at a time may use DMA. A situation where two or more devices compete for the DMA channel must be resolved by the firmware, and it is absolutely forbidden for two or more devices to ground $\overline{DMAR}$ at the same time. (A data request for DMA is not like an interrupt request; there is no priority scheme, and no means for the hardware to select, identify and notify an interface as the winner of a race for DMA service.) Furthermore, a device must not begin requesting DMA transfers on its own; it must wait until instructed to do so by the firmware.

During a DMA transfer of a block of data the IOC knows the next memory location involved, whether input or output, which select code, (and possibly) whether or not the transfer of the entire block is complete. This information is in registers in the IOC, which are set up by the firmware before the peripheral is told to begin DMA activity.

The DMA process is altogether independent of the operation of standard I/O and of the interrupt system, and except for cycle-stealing, does not interfere with them in any way.

Enabling and Disabling the DMA Mode

DMA transfers as described above are referred to as the DMA Mode. The DMA Mode can be disabled two ways: by a DDR (Disable Data Request), or by a PCM (Pulse Count Mode—described later). A DDR causes the IOC to simply ignore $\overline{DMAR}$; no more, no less. The instruction DMA (DMA Mode) causes the IOC to resume DMA Mode operation; DMA cancels DDR, and vice versa. DMA also cancels PCM, and vice versa. Also, DDR cancels PCM, and vice versa.

Also, the IOC turns on as if it has just been given a DDR. DDR (along with DIR) is useful during system initialization (or possible error recovery) routines, where it is unsafe to allow any system activity to proceed until the system is properly initialized (or restarted).

Register Set-Up

There are three registers that must be set up prior to the onset of DMA activity. These are shown in Table 4 below.

TABLE 4

| Name | Address | Meaning |
|---|---|---|
| DMAPA | (=$13_8$) | DMA Peripheral Address |
| DMAMA | (=$14_8$) | DMA Memory Address (and direction) |
| DMAC | (=$15_8$) | DMA Count |

The four least significant bits of DMAPA specify the select code that is the peripheral side of the DMA activity. During an I/O Bus Cycle given in response to a DMA data request, the four least significant bits of DMAPA will determine the states of the PA lines, not the PA register.

DMAC can, if desired, be set to n−1, where n is the number of words to be transferred. During each transfer the count in DMAC is decremented. During the last transfer the IOC automatically generates signals which the interface can use to recognize the last transfer. In the case of a transfer of unknown size, DMAC should be set to a very large count, to thwart the automatic termination mechanism. In such cases it is up to the interface to identify the last transfer.

DMAMA is set to the address of the first word in the block to be transferred. This is the lowest numbered address; after each transfer DMAMA is automatically incremented by the IOC. Bit 15 of DMAMA specifies input or output (relative to the processor); a zero specifies input and a one specifies output.

DMA Initiation

Once the three registers are set up, a "start DMA" command is given to the interface though standard programmed I/O. The "start DMA" command is an output I/O Bus Cycle with a particular combination of $\overline{IC1}$, $\overline{IC2}$, (and perhaps) a particular bit pattern in the transmitted word. The patterns themselves are subject to agreement between the firmware designer and the interface designer. Sophisticated peripherals using DMA in both directions will have two start commands, one for input and one for output. It's also possible that other information could be encoded in the start command (block size, for instance).

Data Request and Transfer

The interface exerts $\overline{DMAR}$ low whenever it is ready to exchange a word of data. When $\overline{DMAR}$ goes low the IOC requests control of the IDA Bus. When granted the Bus, the IOC initiates an I/O Bus Cycle with the PA lines controlled by DMA Peripheral Address, and does a memory cycle. (The order of these two operations depends upon the direction of the transfer.)

Next the IOC increments DMA Memory Address and decrements DMA Count.

DMA Termination

There are two automatic termination mechanisms, each usable only when the block size is known in advance, and each based on the count in DMAC going negative. Recall that at the start of the operation part of DMAC is set to n−1, where n is the size of the transfer in words.

During the transfer of the nth word, the IOC will signal the interface by temporarily exerting $\overline{IC2}$ high during the I/O Bus Cycle for that exchange. The interface can detect this and cease DMA operations.

The other means of automatic termination is detection by the interface of a signal called Count Minus ($\overline{CTM}$). $\overline{CTM}$ is generated by the IOC; it means that the count in the least significant 15 bits of DMAC has gone negative. $\overline{CTM}$ is a steady-state signal, given as soon as, and as long as, the count in DMAC is negative. $\overline{CTM}$ is generated by the IOC but is not utilized in the configuration employed in the hybrid microprocessor. That is, $\overline{CTM}$ never leaves the IOC.

For DMA transfers of unknown block size, the interface determines when the transfer is complete, and flags or interrupts the processor.

The Pulse Count Mode

The Pulse Count Mode is a means of using the DMA hardware to acknowledge, but do nothing about, some number of leading DMA requests. The Pulse Count Mode is initiated by a PCM, and resembles the DMA Mode, but without the memory cycle. The activities of the three registers, DMAPA, DMAC and DMAMA remain as described for DMA Mode operation. The only difference is that no data is exchanged with memory; no memory cycle is given. (The IOC even requests the IDA Bus, but when granted it, releases it without doing the memory cycle.)

A dummy I/O Bus Cycle is given, and DMAC decremented. Also, the automatic termination mechanisms still function; in fact, they are the object of the entire operation. The Pulse Count Mode is intended for applications like the following: Suppose it were desired to move a tape cassette a known number of files. The firmware puts the appropriate number into DMAC, gives PCM, and instructs the cassette to begin moving. The cassette would give a DMA Request each time it encounters a file header. In this way the DMA hardware and the automatic termination mechanism count the number of files for the cassette. PCM calcels DMA and DDR. Both DMA and DDR cancel PCM.

Extended Bus Grant

Two of the signals of the IDA Bus are Bus Request ($\overline{BR}$) and Bus Grant (BG). These two signals are used, for instance, during a DMA transfer. The IOC requests the IDA Bus (in order to do the necessary memory cycle) by grounding $\overline{BR}$. When BG is given the IOC then knows to proceed.

Other entities can also request the IDA Bus. All chips in the system listen to Bus Request, and Bus Grant cannot go high until all chips consent to it; a 'wired and' does that. If two chips request the IDA Bus at the same time, the winner of BG is specified, and the loser is kept waiting by a daisy-chain priority scheme for the routing of Bus Grant. This is depicted in FIG. 124.

As FIG. 124 shows, the IOC is the initial receiver of Bus Grant; if it's not who is requesting the Bus, then the tester gets Bus Grant next. If the tester is not requesting the Bus, then the next device in the chain has the chance to use Bus Grant. A device gives the next device its chance by passing along the signal EXBG (Extended Bus Grant). The requesting device understands EXBG as a Bus Grant, and refuses to send EXBG any further.

IOC Machine Instructions

Assembly language machine instructions are three-letter mnemonics. Each machine instruction source statement corresponds to a machine operation in the object program produced by an assembler.

Notation used in representing source statement is explained below:

| | |
|---|---|
| reg 0–7 | Register location. |
| reg 4–7 | Register location. |
| I | Increment indicator (for place and withdraw instructions); for BPC memory reference instructions it is an indirect addressing indicator. |
| D | Decrement indicator for place and withdraw instructions. |
| ,I/,D | The slash indicates that either item (but not both) may be used at this place in the source statement. |
| [ ] | Brackets indicate that the item contained within them is optional. |

Stack Group

The stack group manages first-in, last-out firmware stacks. The "place" instruction puts a word or a byte into a stack pointed at by C or D. The item that is placed is reg 0-7. The "withdraw" instructions remove a word or a byte from a stack pointed at by C or D. The removed item is written into reg 0-7.

After each place or withdraw instruction the stack pointer is either incremented or decremented, as specified in the source text by the optional I or D, respectively. In the absence of either an I or a D, the assembler defaults to I for place instructions, and D for withdraw instructions.

Place instructions increment or decrement the stack pointer prior to the placement, and withdraw instructions do it after the withdrawal. In this way the pointer is always left pointing at the top of the stack.

For byte operations bit 15 of the pointer register (C or D) indicates left or right half (one=left, zero=right). Stack instructions involving bytes toggle bit 15 at each increment or decrement; but the lower bits of the pointer increment or decrement only every other time.

The values of C and D for place-byte and withdraw-byte instructions must not be the address of any internal register for the BPC, EMC, or IOC. The place and withdraw instruction can also initiate I/O operations, so they are also listed under the I/O group. The stack group instructions are listed below.

PWC reg 0-7 [,I/,]

Place the entire word of reg into the stack pointed at by C.

PWD reg 0-7 [,I/,D]

Place the entire word of reg into the stack pointed at by D.

PBC reg 0-7 [,I/,D]

Place the right half of reg into the stack pointed at by C.

PBD reg 0-7 [,I/,D]

Place the right half of reg into the stack pointed at by D.

WWC reg 0-7 [,I/,D]

Withdraw an entire word from the stack pointed at by C, and put it into reg.

WWD reg 0-7 [,I/,D]

Withdraw an entire word from the stack pointed at by D, and put it into reg.

WBC reg 0-7 [,I/,D]

Withdraw a byte from the stack pointed at by C, and put it into the right half of reg.

WBD reg 0-7 [,I/,D]

Withdraw a byte from the stack pointed at by D, and put it into the right half of reg.

I/O Group

The states of $\overline{IC1}$ and $\overline{IC2}$ during the I/O Bus Cycles initiated by the instructions listed hereinafter depend upon which register is the operand of the instructions as shown in Table 5 below.

TABLE 5

| | $\overline{IC1}$ | $\overline{IC2}$ |
|---|---|---|
| R4 | 1 | 1 |
| R5 | 1 | 0 |
| R6 | 0 | 1 |
| R7 | 0 | 0 |

mem. ref. inst. reg 4–7 [,I]

Initiate an I/O Bus Cycle. Memory reference instructions 'reading' from reg cause input I/o Bus Cycles; those 'writing' to reg cause output I/O Bus Cycles. In either case the exchange is between A or B and the interface addressed by the PA register (Peripheral Address Register - $11_8$); reg 4-7 do not really exist as physical registers within any chip on the IDA Bus.

stack inst. reg 4-7 [,I/,D]

Initiate an I/O Bus Cycle. Place instructions 'read' from reg, therfore they cause input I/O Bus Cycles. Withdraw instructions 'write' into reg, therefore they cause output I/O Bus Cycles. In either case the exchange is between the addressed stack location and the interface addressed by PA.

Interrupt Group

The interrupt group instructions are listed below.

EIR

Enable the interrupt system. This instruction cancels DIR.

DIR

Disable the interrupt system. This instruction cancels EIR.

DMA Group

The DMA group instructions are listed below.

DMA

Enable the DMA mode. This instruction cancels PCM and DDR.

PCM

Enable the Pulse Count Mode. This instruction cancels DMA and DDR.

DDR

Disable Data Request. This instruction cancels the DMA Mode and the Pulse Count Mode.

IOC Machine-Instruction Bit Patterns

FIGS. 125A–C depict the bit patterns of the IOC machine-instructions.

Internal Description of the IOC

The IOC may be understood with reference to the detailed block diagram of FIGS. 126A–C. A DMP IDA micro-instruction provides communication from the IDA Bus to the internal $\overline{IDC}$ Bus in the IOC. A SET IDA micro-instruction provides communication from the IOC to the IDA Bus; SET IDA drives the IDA Bus according to the contents of the O Register, which in turn is set with a SET O micro-instruction.

As in the BPC, an Address Decode section and associated latches detect the appearance of an IOC-related register address. Such an event results in the address being latched and sent to the Bus Control ROM as qualifier information.

There are two main ROMs in the IOC. These are the Bus Control ROM and the Instruction Control ROM. The Bus Control ROM is responsible for generating and responding to activity between the IOC and IDA and $\overline{IOD}$ busses. This class of activity consists of memory cycles, I/O Bus cycles, interrupt polls, interrupt requests, and requests for DMA. The Instruction Control ROM is responsible for recognizing fetched IOC machine-instructions, and for implementing the algorithms that accomplish those instructions. Frequently, the Bus Control ROM will undertake activity on the behalf of the Instruction Control ROM. These two ROMs are physically merged, and share a common set of decodable micro-instructions.

However, each of the two ROMs has its own state-counter. For each ROM, the next state is explicitly decoded by each current state.

The I Register serves a function similar to that of the I Register of the BPC. It serves as a repository to hold the fetched machine-instruction and to supply that instruction to Instruction Decode. Instruction Decode generates Asynchronous Control Lines that are similar in function to those of the BPC. Instruction Decode also generates Instruction Qualifiers that represent the machine-instruction to the ROM mechanism.

The W Register is used primarily in conjunction with the execution of the place and withdraw machine-instructions. Each such instruction requires two memory cycles; one to get the data from the source, and one to transmit it to the destination. W serves as a place to hold the data in between those memory cycles.

The DMP W function is complex, and is implemented by a DMP W and Crossover Network. If the place or withdraw operation is for the entire word, the crossover function is not employed, and the pairs of signals OLB, DLB, and, OMB, DMB, work together to implement a standard 16-bit DMP W. However, a byte oriented place or withdraw instruction involves the dumping of only a single byte of W onto the $\overline{IDC}$ Bus. This is done in the following combinations: least-significant byte of W to most-significant half of the $\overline{IDC}$ Bus; least-significant byte of W to least-significant half of the $\overline{IDC}$ Bus; and, most-significant byte of W to least-significant half of the $\overline{IDC}$ Bus. The exact mode of operation during a DMP W is determined by W Register Control on the basis of the Asynchronous Control Lines from Instruction Decode.

Another use of W occurs during an interrupt. During an interrupt poll the response of the requesting peripheral(s) is loaded into the least-significant half of W. These eight bits represent the eight peripherals on the currently active (or enabled) level of interrupt. Each peripheral requesting interrupt service during the poll will have a one in its corresponding bit. This eight-bit pattern is fed to a Select Code Priority Resolver and 3 LSB Interrupt Vector Generator. That circuitry identifies the highest numbered select code requesting service (should there be more than one) and generates the three least-significant bits of binary code that correspond to that peripheral's select code. The next most-significant bit corresponds to the level at which the interrupt is being granted, and it is avilable from the interrupt circuitry in the form of the signal $\overline{PHIR}$.

The interrupt vector is made up of the three least-significant bits from W, as encoded by the priority resolver, the bit corresponding to $\overline{PHIR}$, and the 12 bits contained in the Interrupt Vector Register (IV). Thus, when an interrupt is granted the complete interrupt vector is placed on the $\overline{IDC}$ Bus by simultaneously giving the following micro-instructions: EPR, DMP ISC, UIG, and DMP IV.

The C and D Registers are the pointer requests used for place and withdraw operations. Each of these registers is equipped with a 15-bit increment and decrement network for changing the value of the pointer. Whether to increment or decrement is controlled by the C and D Register Control circuit according to the Asynchronous Control Lines.

The DMA Memory Address (DMAMA) and DMA Count (DMAC) Registers are similar to the C and D Registers, except that DMAMA always increments, and that DMAC always decrements. In addition, the decrement for DMAC is a 16-bit decrement. These two registers are used in conjunction to identify the destination or source address in memory of each DMA transfer, and to keep a count of the number of such transfers so far.

Two separate mechanisms are provided for the storage of peripheral select codes. The DMAPA Register is a four-bit register used to contain the select code of any peripheral that is engaged in DMA.

The other mechanism is a three-level stack, also four bits wide, whose uppermost level is the Peripheral Address Register (PA). It is in this stack the peripheral select codes for both standard I/O and interrupt I/O are kept. The stack is managed by the interrupt circuitry.

The Peripheral Address Lines (PA Lines) reflect either the contents of DMAPA or PA, depending upon whether or not the associated I/O Bus cycles are for DMA or not, respectively. This selection is controlled by the DMA circuitry, and is implemented by the Peripheral Address Bus Controller.

Three latches control whether or not the Interrupt System is active or disabled, whether or not the DMA Mode is active or disabled, and, whether or not the Pulse Count Mode is active or disabled. Those latches are respectively controlled by these machine-instructions; EIR and DIR for the Interrupt System, and, DMA, PCM, and DDR for DMA-type operations.

The interrupt circuitry is controlled by a two-bit state-counter and ROM. The state-count is used to represent the level of interrupt currently in use. Requests for interrupt are made into qualifiers for the ROM of the interrupt controller. If the interrupt request can be granted it is represented by a change in state of that ROM, as well as by instructions decoded from that ROM and sent to the Interrupt Grant Network. This circuitry generates the $\overline{INT}$ signal used to cause an interrupt of the BPC, and, generates an INTQ qualifier that represents the occurrence of an interrupt to the main ROM mechanism in the IOC so that an interrupt poll can be initiated.

The DMA circuitry is similar in its method of control. It has a ROM controlled by a three-bit state-counter.

Description of the EMC

The Extended Math Chip (EMC) executes 15 machine-instructions. Eleven of these operate of BCD-Coded three-word mantissa data. Two operate on blocks of data of from 1 to 16 words. One is a binary multiply and one clears the Decimal Carry (DC) register.

Unless specified otherwise, the contents of the registers A, B, SE and DC are not changed by the execution of any of the EMC's instructions. The EMC communicates with other chips along the IDA Bus in a way similar to how the IOC communiccates via the Bus.

Notation

A number of notational devices are employed in describing the operation of the EMC.

The symbols <....> denote a reference to the actual contents of the named location.

$A_{0-3}$ and $B_{0-3}$ denote the four least significant bit-positions of the A and B registers, respectively. Similarly, $A_{4-15}$ denotes the 12 most-significant bit-positions of the A register. And by the previous convention, $<A_{0-3}>$ represents the bit pattern contained in the four least-significant bit-positions of A.

AR1 is the label of a four-word location in R/W memory: 77770$_8$ through 77773$_8$.

AR2 is the label of a four-word arithmetic accumulator register located within the EMC, and occupying register addresses 20$_8$ through 23$_8$.

SE is the label of the four-bit shift-extend register, located within the EMC. Although SE is addressable, and can be read from, and stored into, its primary use is as internal intermediate storage during those EMC instructions that read something from, or put something into, $A_{0-3}$. The address of SE is 24$_8$.

DC is the mnemonic for the one-bit decimal-carry register located within the EMC. DC is set by the carry output of the decimal adders of the ENC. Sometimes, in the illustrations of what the EMC instructions do, DC is shown as being part of the actual computation, as well as being a repository for overflow. In such cases the initial value of DC affects the result. However, DC will usually be zero at the beginning of such an instruction. The firmware sees to that by various means.

DC does not have a register address. Instead, it is the object of the BPC instructions SDS and SDC (Skip if Decimal Carry Set and Skip if Decimal Carry Clear), and the EMC instruction CDC (Clear Decimal Carry).

Data Format

The EMC can perform opertions on twelve-digit, BCD-encoded, floating point numbers. Such numbers occupy four words of memory, and the various parts of a number are put into specific portions of the four words. FIG. 127 depicts this format.

The twelve mantissa digits are denoted by $D_1$ through $D_{12}$. $D_1$ is the most-significant digit, and $D_{12}$ is the least-significant digit. It is assumed that there is a decimal point between $D_1$ and $D_2$. $E_s$ and $M_s$ each represent positive and negative (signs) by zero and one, respectively.

EMC Machine Instructions

Assembly language EMC machine-instructions are three-letter mnemonics. Each machine instruction source statement corresponds to a machine operation in the object program produced by an assembler.

Notation used in representing source statements is explained below:

N: Constant whose vlue is restricted to the range: $1 \leq N \leq 20_8 = 16_{10}$

The Four-Word Group

The four-word group instructions are listed below.

CLR N

Clear N words. This instruction clears N consecutive words, beginning with location <A>. Recall that: $1<N>16_{10}$.

| |
|---|
| 0 → location < A > |
| 0 → location < A > + 1 |
| o |
| o |
| o |
| 0 < location < A > + N-1 |

XFR N

Transfer N words. This instruction transfers the N consecutive words beginning at location <A> to those beginning at <B>. Recall that: $1 \leqq N \geqq 16_{10}$.

| |
|---|
| location < A > → location < B > |
| location < A > +1 → location < B > +1 |
| o |
| o |
| o |
| location < A > + N-1 → location < B > + N-1 |

The Mantissa Shift Group

The mantissa shift group instructions are listed below.

MRX

Mantissa right shift of AR1 r times, $r=<B_{0-3}>$, and $0 \leqq r \leqq 17_8 = 15_0$.

1st shift: $<A_{0-3}> \rightarrow D_1; \ldots <D_i> \rightarrow D_{i+1}; \ldots D_{12}$ is lost jth shift: $0 \rightarrow D_1; \ldots <D_i> \rightarrow D_{i+1}; \ldots D_{12}$ is lost rth shift: $0 \rightarrow D_1; \ldots <D_i> \rightarrow D_{i+1}; \ldots <D_{12}> \rightarrow A_{0-3}$; $0 \rightarrow DC$; $0 \rightarrow A_{4-15}$ Notice:

(1) The first shift does not necessarily shift in a zero; the first shift shifts in $<A_{0-3}>$.

(2) The last digit shifted out ends up as $<A_{0-3}>$.

(3) If only one digit-shift is done, (1) and (2) happen together.

(4) After (2), SE is the same as $<A_{0-3}>$.

(5) Any more than eleven shifts is wasteful.

MRY

Mantissa right shift of AR2 $<B_{0-3}>$-times. Otherwise identical to MRX.

MLY

Mantissa left shift of AR2 one time.

$<A_{0-3}> \rightarrow D_{12}; \ldots <D_i> \rightarrow D_{i-1}; \ldots <D_1> \rightarrow A_{0-3}$; $0 \rightarrow DC$; $0 \rightarrow A_{4-15}$ At the conclusion of the operation SE equals $<A_{0-3}>$.

DRS

Mantissa right shift of AR1 one time.

$0 \rightarrow D_1; \ldots <D_i> \rightarrow D_{i+1}; \ldots <D_{12}> \rightarrow A_{0-3}$; $0 \rightarrow DC$; $0 \rightarrow A_{4-15}$ At the conclusion of the operation SE equals $<A_{0-3}>$.

NRM

Normalize AR2. The mantissa digits of AR2 are shifted left until $D_1 \neq 0$. If the original $D_1$ is non-zero, no shifts occur. If twelve shifts occur, then AR2 equals zero, and no further shifts are done. The number of shifts is stored as a binary number in $B_{0-3}$.

i. $0 \rightarrow B_{4-15}$; # of shifts $\rightarrow B_{0-3}$ ii. For $0 \leqq <B_{0-3}> \leqq 11$; $0 \rightarrow DC$ iii. If $<B_{0-3}> = 12$; $1 \rightarrow DC$

The Arithmetic Group

The arithmetic group instructions are listed below.

CMX

Ten's complements of AR1. The mantissa of AR1 is replaced with its ten's complement, and DC is set to zero.

CMY

Ten's complement of AR2. The mantissa of AR2 is replaced with its ten's complement, and DC is set to zero.

CDC

Clear Decimal Carry. Clears the DC register; $0 \rightarrow DC$.

FXA

Fixed-point addition. The mantissas of AR1 and AR2 are added together, along with DC (as a $D_{12}$-digit), and the result is placed in AR2. If an overflow occurs, DC is set to one, otherwise, DC is set to zero at the completion of the addition.

During the addition the exponents are not considered, and are left strictly alone. The signs are also left completely alone.

| | | |
|---|---|---|
| < AR1 > = | $D_1\ D_2\ D_3 \cdots D_{12}$ | |
| < AR2 > = | $D_1\ D_2\ D_3 \cdots D_{12}$ | |
| + | < DC > | ← initial value of DC |
| (overflow)→"$D_0$" | $D_1\ D_2\ D_3 \cdots D_{12} \rightarrow$ AR2 | |
| | DC (final value of DC) | |

MWA

Mantissa Word Add. <B> is taken as four BCD digits, and added, as $D_9$ through $D_{12}$, to AR2. DC is also added in as a $D_{12}$. The result is left in AR2. If an overflow occurs, DC is set to one, otherwise, DC is set to zero at the completion of the addition.

During the addition the exponents are not considered, and are left strictly alone, as are the signs. MWA is intended primarily for use in rounding routines.

| | | |
|---|---|---|
| < B > = | —— $D_9\ D_{10}\ D_{11}\ D_{12}$ | |
| < AR2 > = | $D_1 \cdots D_9\ D_{10}\ D_{11}\ D_{12}$ | |
| | < DC > | ← initial value of DC |
| (overflow)→ "$D_0$" | $D_1 \cdots D_9\ D_{10}\ D_{11}\ D_{12} \rightarrow$ AR2 | |
| | DC (final value of DC) | |

FMP

Fast multiply. The mantissas of AR1 and AR2 are added together (along with DC as $D_{12}$) $\langle B_{0-3} \rangle$-times; the result accumulates in AR2.

The repeated additions are likely to cause some unknown number of overflows to occur. The number of overflows that occurs is returned in $A_{0-3}$.

FMP is used repeatedly to accumulate partial products during BCD multiplication. FMP operates strictly upon mantissa portions; signs and exponents are left strictly alone.

$$\langle AR2 \rangle + ((\langle AR1 \rangle) \cdot (\langle B_{0-3} \rangle)) + DC \rightarrow AR2$$

| | |
|---|---|
| DC doesn't enter into these repeated additions except for the first one as shown at right. 0 → DC immediately after each overflow | Represents the initial value of DC. |

$$0 \rightarrow DC,\ 0 \rightarrow A_{4-15},\ \#\ \text{of overflows} \rightarrow A_{0-3}$$

MPY

Binary Multiply Using Booth's Algorithm. The 8binary9 signed two's complement contents of the A and B registers are multiplied together. The thirtytwo bit product is also assigned tow's complement number, and is stored back into A and B. B receives the sign and most-significant bits, and A the least-significant bits.

$$\langle A \rangle \cdot \langle B \rangle \rightarrow \widehat{\langle B \rangle \langle A \rangle}$$

FDV

Fast Divide. The mantissas of AR1 and AR2 are added together until the first decimal overflow occurs. The result of these additions accumulates into AR2. The number of additions without overflow(n) is placed into B.

$$\langle AR2 \rangle + \langle AR1 \rangle + \langle DC \rangle \rightarrow AR2 \text{ (repeatedly until overflow)}$$

then $$0 \rightarrow DC,\ 0 \rightarrow B_{4-15},\ n \rightarrow B_{0-3}$$

FDV is used in floating-point division to find the quotient digits of a division. In general, more than one application of FDV is needed to find each digit of the quotient.

As with the other BCD instructions, the signs and exponents of AR1 and AR2 are left strictly alone. FIGS. 128A–C depict the bit patterns of the EMC machine-instructions. Internal Description of the EMC FIGS. 129A–C depict the internal block diagram of the EMC. The micro-instructions SET IDA and DMP IDA are the communication link between the external IDA bus and the internal $\overline{\text{IDM}}$ bus. An instruction is fetched by the BPC and placed on the IDA Bus. All chips connected to the bus decode it and act accordingly.

If the fetched instruction is not an EMC instruction, or if an interrupt request is made, the EMC ignores the instruction. Upon completion of the instruction by another chip or upon completion of the interrupt, the EMC examines the next instruction. If the instruction is an EMC instruction, it is executed and data effected by it are transferred via the IDA bus. At the appropriate point during the execution of the instruction, SYNC is given to indicate to other chips that it has finished using the IDA Bus and consequently to treat the next data that appears on IDA as an instruction.

The Word Pointer Shift Register points to the register to be effected by the DMPX/SETX or DMPY/SETY micro-instructions and the registers to be bussed to the Adder. It is also employed as a counter in some instructions.

Once data is on the $\overline{\text{IDM}}$ Bus, it can then be loaded into one of several registers by issuing the appropriate micro-instruction. The data paths between IDM and the X and Y registers can be controlled in two ways. One way is by issuing an explicit micro-instruction, e.g., $\underline{\text{SET}}$ Y2 would set the Y2 Register with the data on $\overline{\text{IDM}}$. Another way of accomplishing the same thing would be to issue a SET Y for a word pointer equal two.

The X Registers are used for all shifting operations, the direction being instruction dependent.

The Shift Extend Register is a four-bit addressable register used to hold a digit to be shifted into the X register or one that has been shifted out of X.

The Arithmetic Extend Register is a four-bit addressable (read-only) register used to accumulate a decimal digit for the FMP and FDV instructions and serves as a number-of-shifts accumulator in the NRM instruction.

The N Counter is used to indicate the number of words involved in the CLR and XFR instructions, the number of shifts in MRX, MRY, MLY and DRS, the multiplier digit in FMP, and a loop counter in MPY.

The Adder is capable of either binary or BCD addition with the complementer being capable of either one's or nine's complementation of the Y Register inputs. A carry-in signal is available from three sources for generating two's or ten's complement arithmentic.

The Decimal Carry Register is a one-bit register that can hold the carry-out of the Adder. ADR1 is the address of the AR1 operand; its two least significant bits are determined by the word pointer, e.g., WPØ=>00,WP1=>01, etc.

The Address Decode ROM generates the control signals used for reading from or writing into a register in either the Extended Register Access (ERA) mode or the normal addressing mode of operation. Miscellaneous hardware has been added to enhance the execution of the two's complement binary multiply instruction (MPY).

BUS CONTROL

The direction of data flow on the IDA bus is controlled by the bus control circuit of FIGS. 16 and 130. Gate U19 provides the basic definition of the direction of data flow. The direction of data flow is normally from the microprocessor to the memory since address is the first data on the IDA bus when the memory cycle starts. This condition is controlled by the STM signal into gate U19 being logically false. Once the memory cycle starts the Processor Driving (PDR) signal indicates that data flow is from processor to memory. In some instances, such as during direct memory access (DMA) operation, the PDR signal does not indicate the direction of data flow on the IDA bus. For this case, the Write (WRIT) signal is ANDed into U19 to decide bus direction. Also, since the first thirty-two memory addresses are actually registers within the microprocessor, the Register Access Line (RAL) is used to prevent bus conflict when accessing register information. Finally, the Monitor Buffer Control (MBC) signal is also ANDed in to define bus direction during testing. The resulting output of U19 is called the Stay Off Bus (SOB) signal since it indicates those times when the memory section is not allowed to be on the IDA bus. The bus control circuit also controls the direction of the bidirectional data buffer located within the hybrid microprocessor (processor buffer out, PBO, signal). Since the microprocessor buffer and the memory buffers normally operate in tandem (i.e., when the microprocessor buffer points out, the memory buffer points into memory, and when the memory buffer points out, the microprocessor buffer points into the microprocessor) the SOB signal is inverted by U17A and used to control the microprocessor's buffer.

Figure 6:
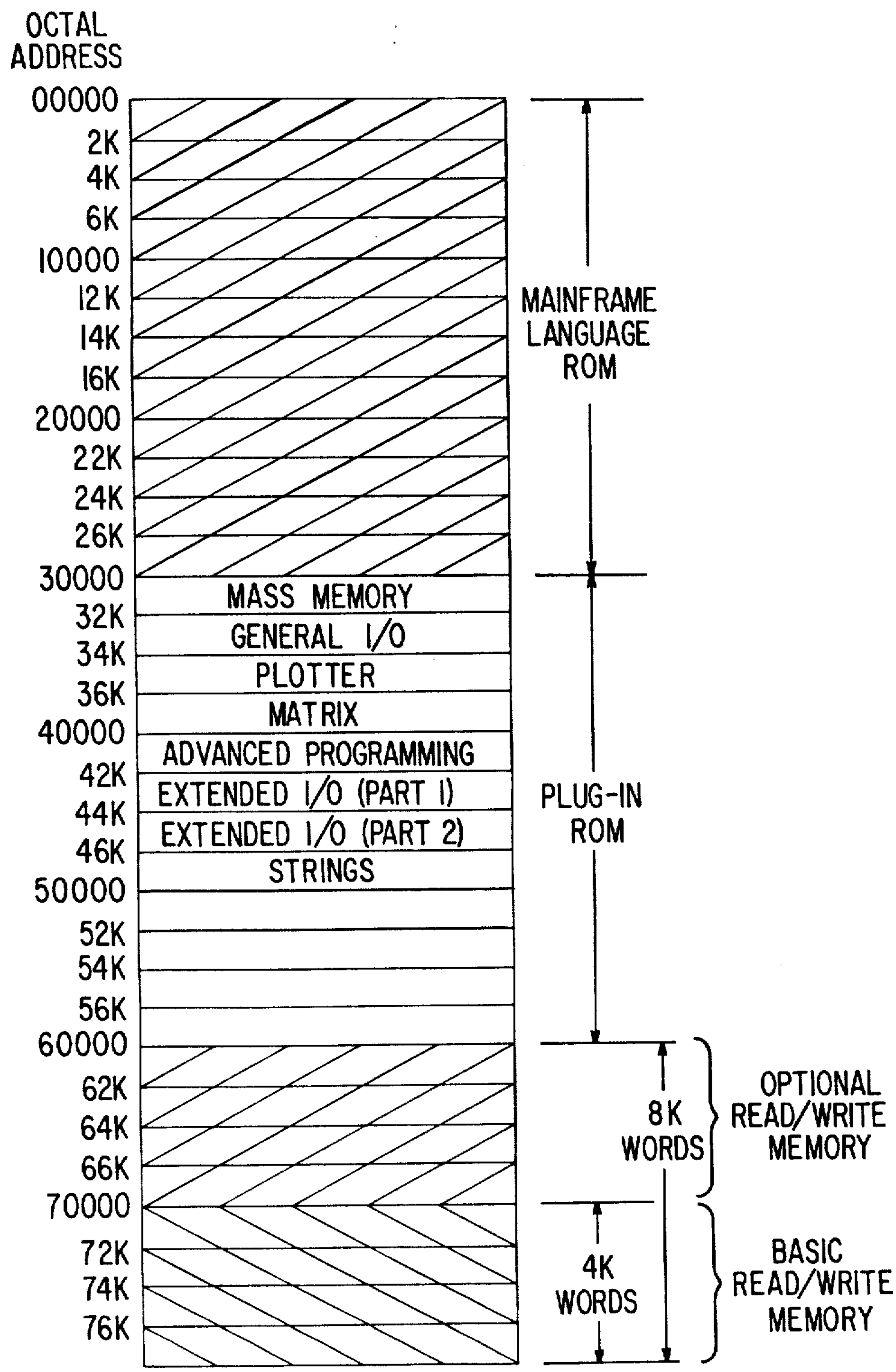
FIG. 6 is a memory map showing the format of the various read-write and read-only memories within the calculator memory section of FIG. 4.

The bus control circuit also decodes the upper three bits of the IDA bus (IDA12 through IDA14) using a dual open-collector output 2-line to 4-line decoder (Texas Instruments device SN74LS156 or equivalent) as a one-of-eight decoder. The memory space is thus broken into 4096-word divisions. The memory map of FIG. 6 shows allocation of read-only and read/write memory in the memory space. The first three outputs of the decoder are wire-ORed together to indicate that the mainframe language ROM memory section is being accessed. The next three outputs of the decoder are also wired-ORed together with the two-pole switch S1 determining whether or not the upper two outputs are to be included in the wire-ORing. The resulting output determines which portion of the memory space is taken by the optional plug-in ROM memory section. The balance of the address space is assumed to be read/write memroy. The boundary between the plug-in ROM and the read/write memory is determined by switch S1 which is set according to the amount of optional read/write memory that the calculator contains. The STM (Start Memory) signal is used to latch the outputs of the decoder into the latches U16A and U16B for the balance of the memory cycle since address information is only present on the IDA bus at the beginning of the memory cycle. The output of the latches is gated with the Stay Off Bus (SOB) signal to prohibit the memory section from placing data onto the IDA bus until permitted to do so. If the data to be read is located in the mainframe language ROM memory section, the bus control circuit releases the mainframe ROM buffer control (MFRBC) signal to allow the ROM to place data on the IDA bus and point the bidirectional buffer associated with the ROM from the memory to the microprocessor. Likewise, if the data to be read is located in the plug-in ROM memory section, the bus control circuit releases the plug-in ROM buffer control (PIRBC) signal. If the data, instead, is to be read from the read/write memory sections, the bus control simply removes the Stay Off Bus signal to allow the read/write memory to place the data on the IDA bus at its discretion.

MEMORY TIMING AND CONTROL

Figure 109:
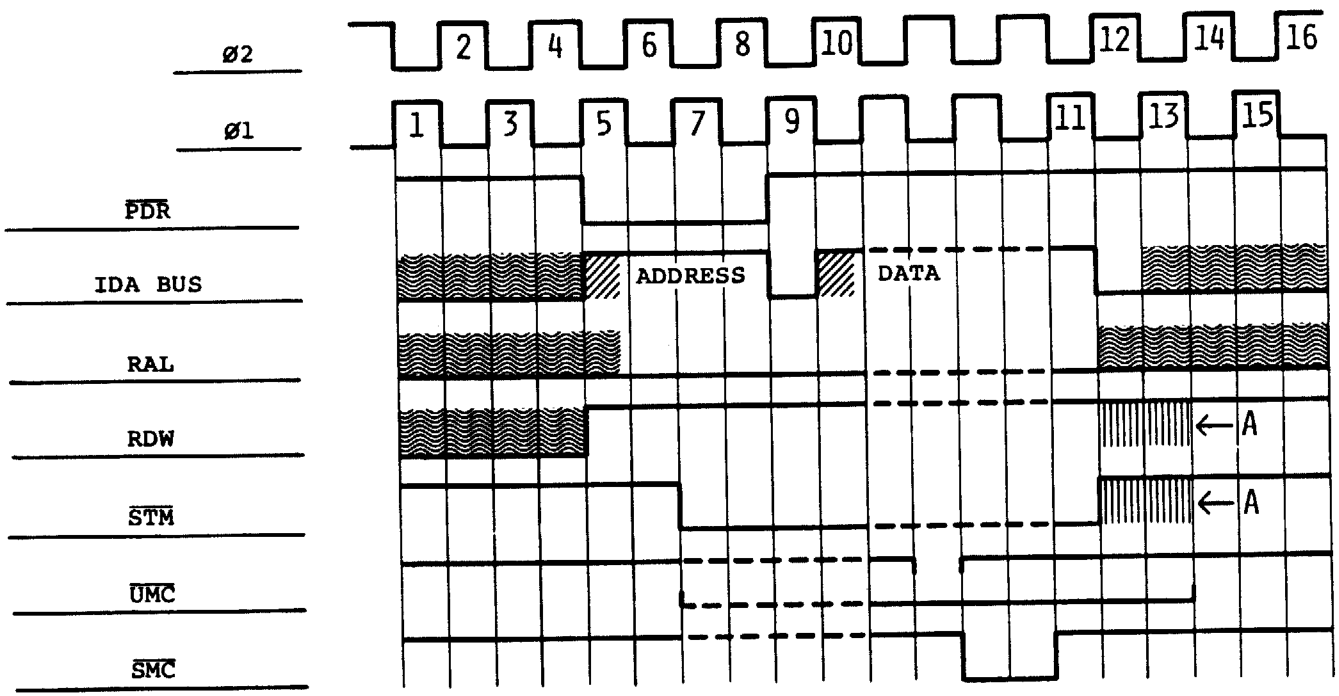
FIG. 109 is a wavegform diagram illustrating a generalized BPC-originated read memory cycle.
Figure 110A:
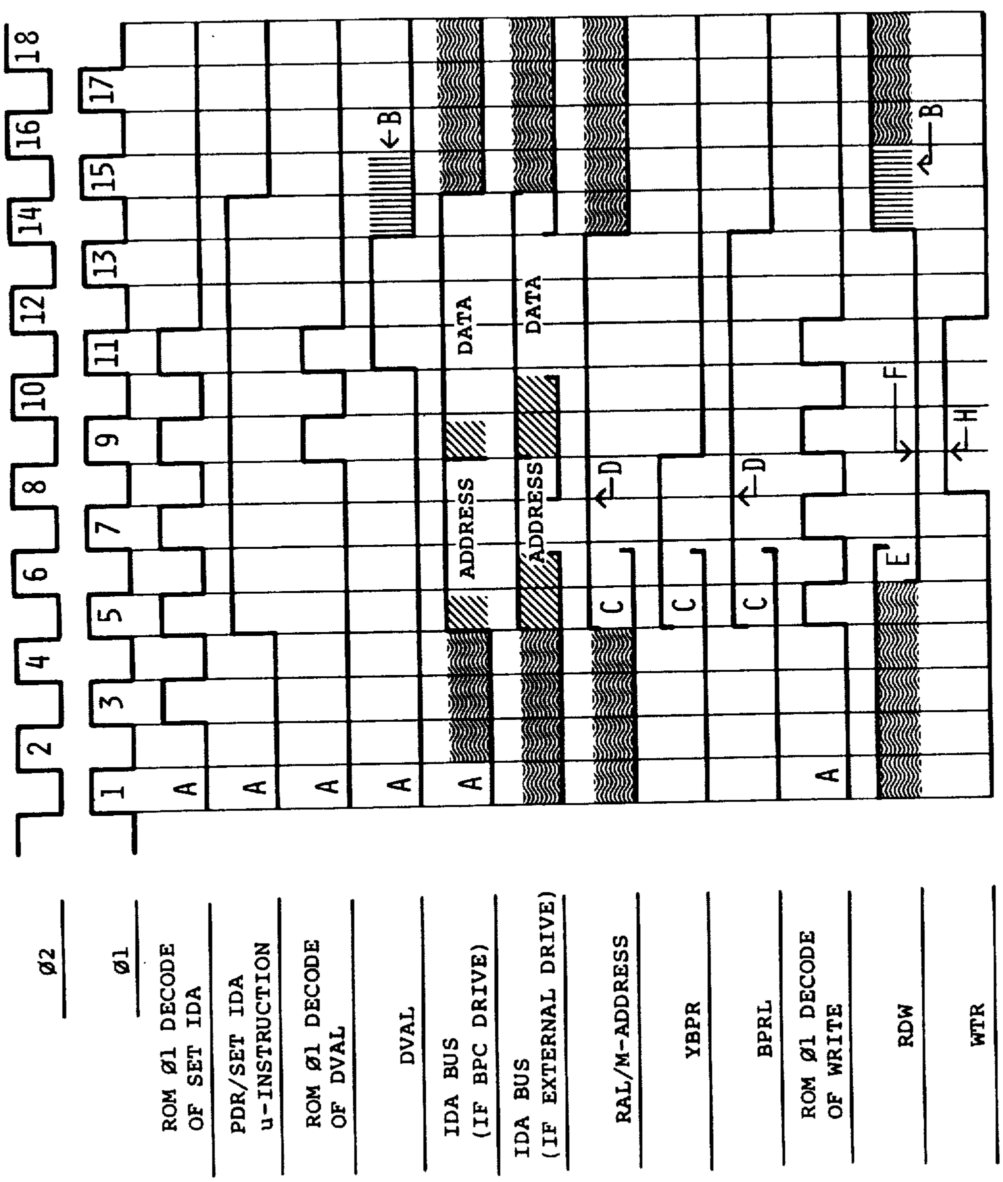
Figure 110B:
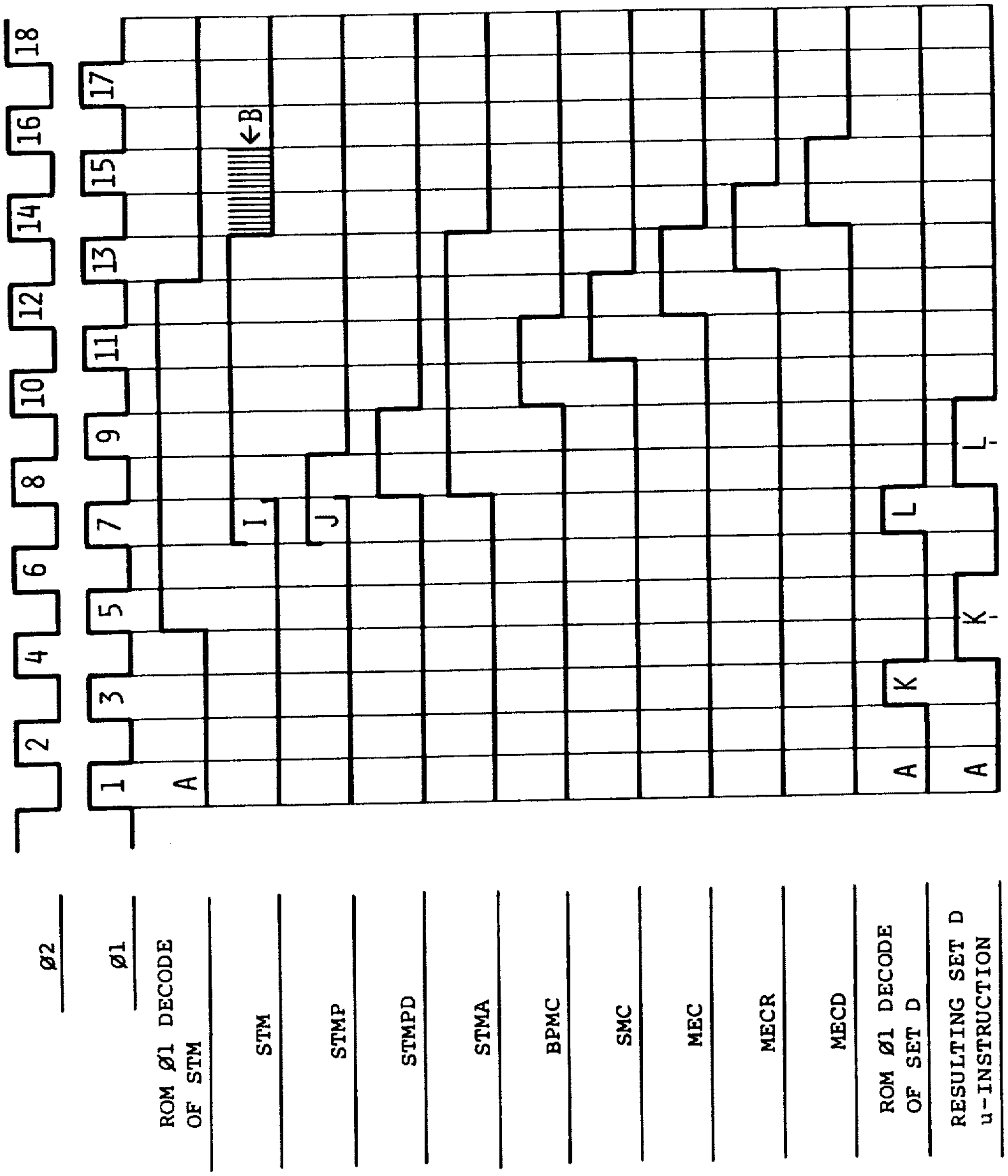
Figure 110C:
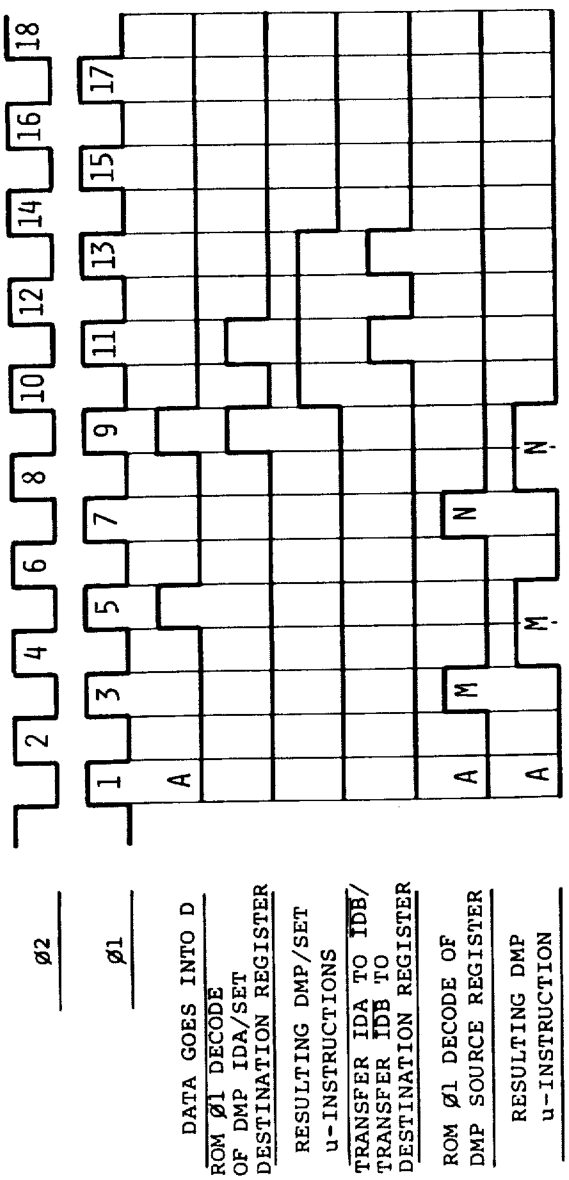
Figure 111A:
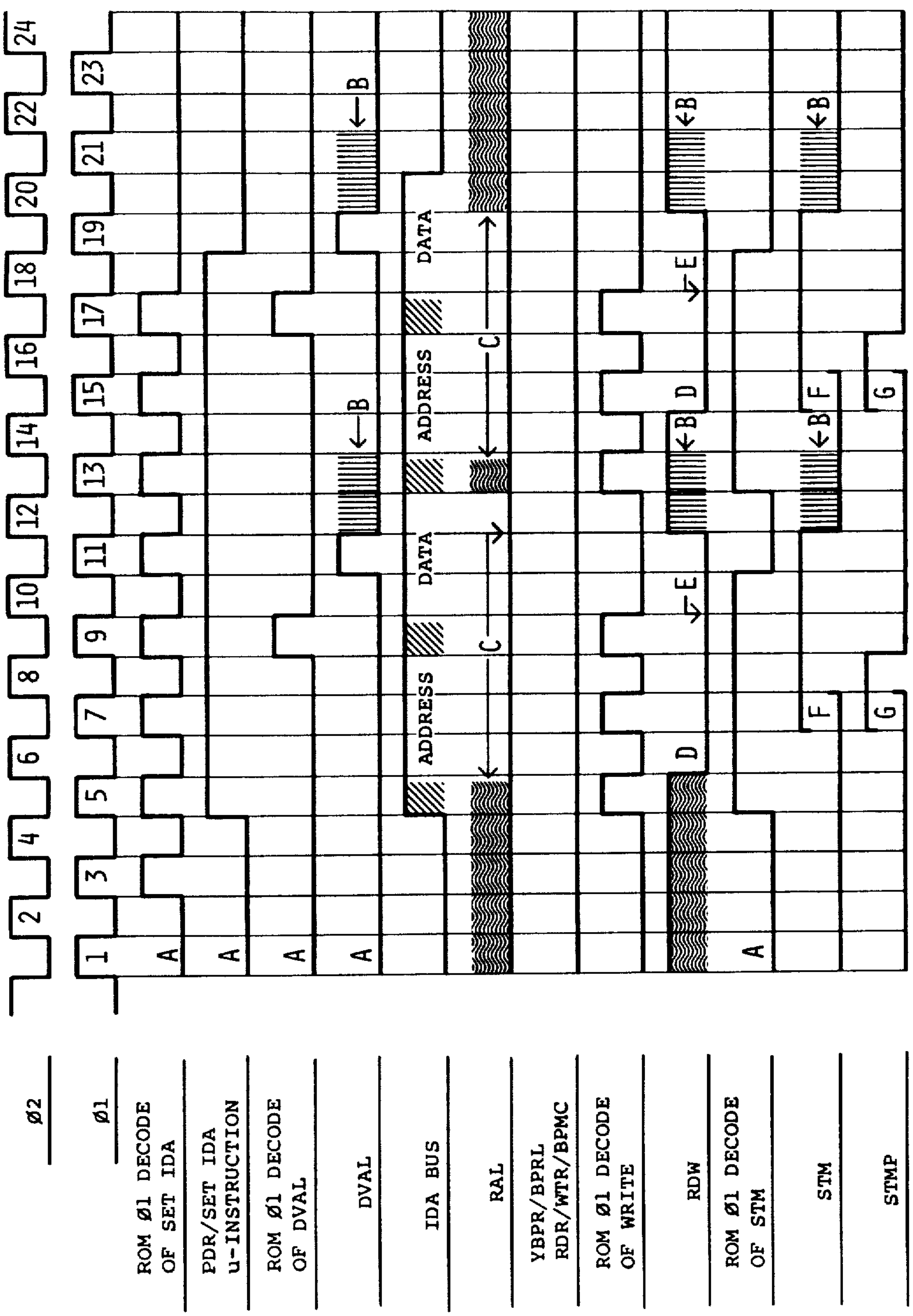
Figure 111B:
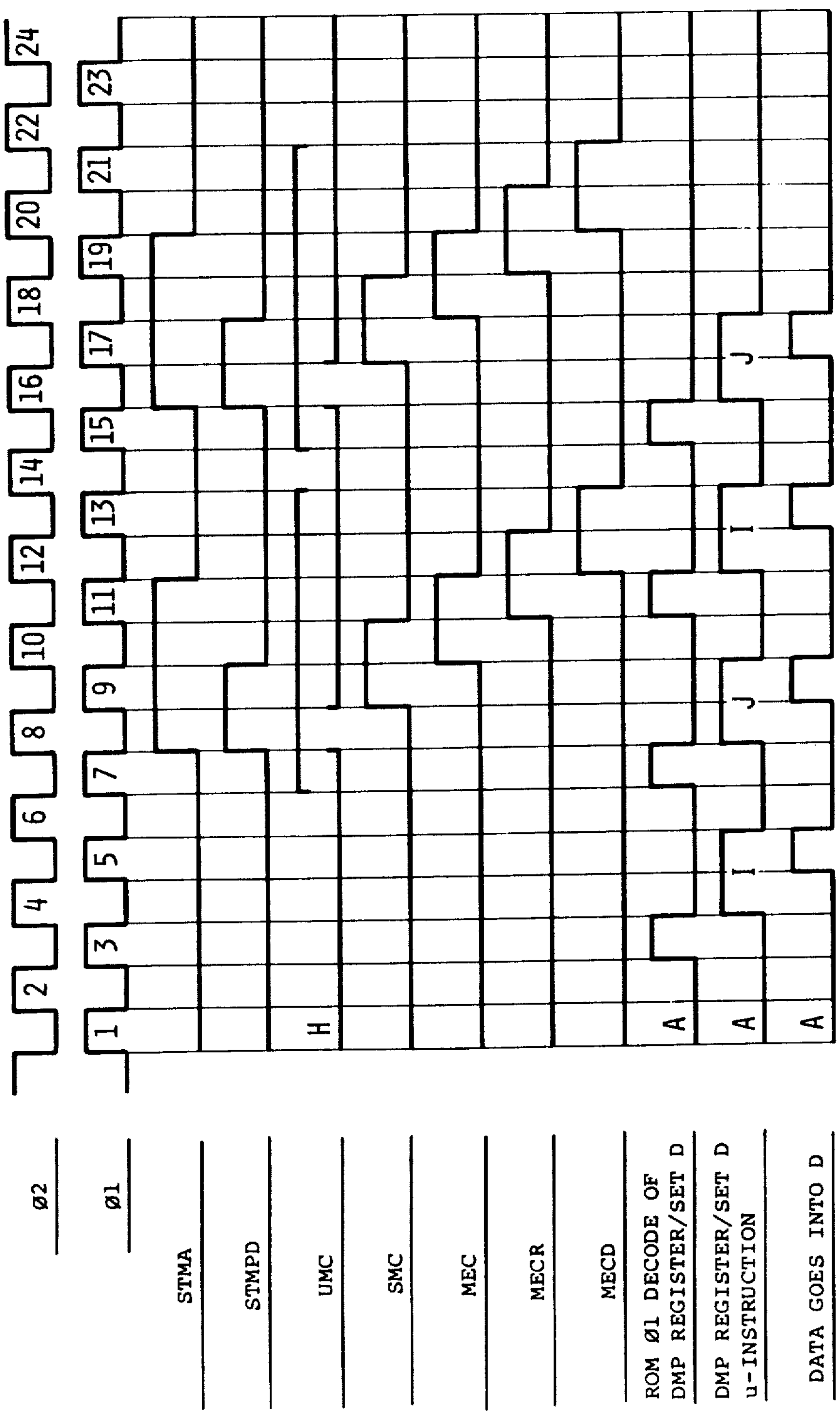
Figure 112:
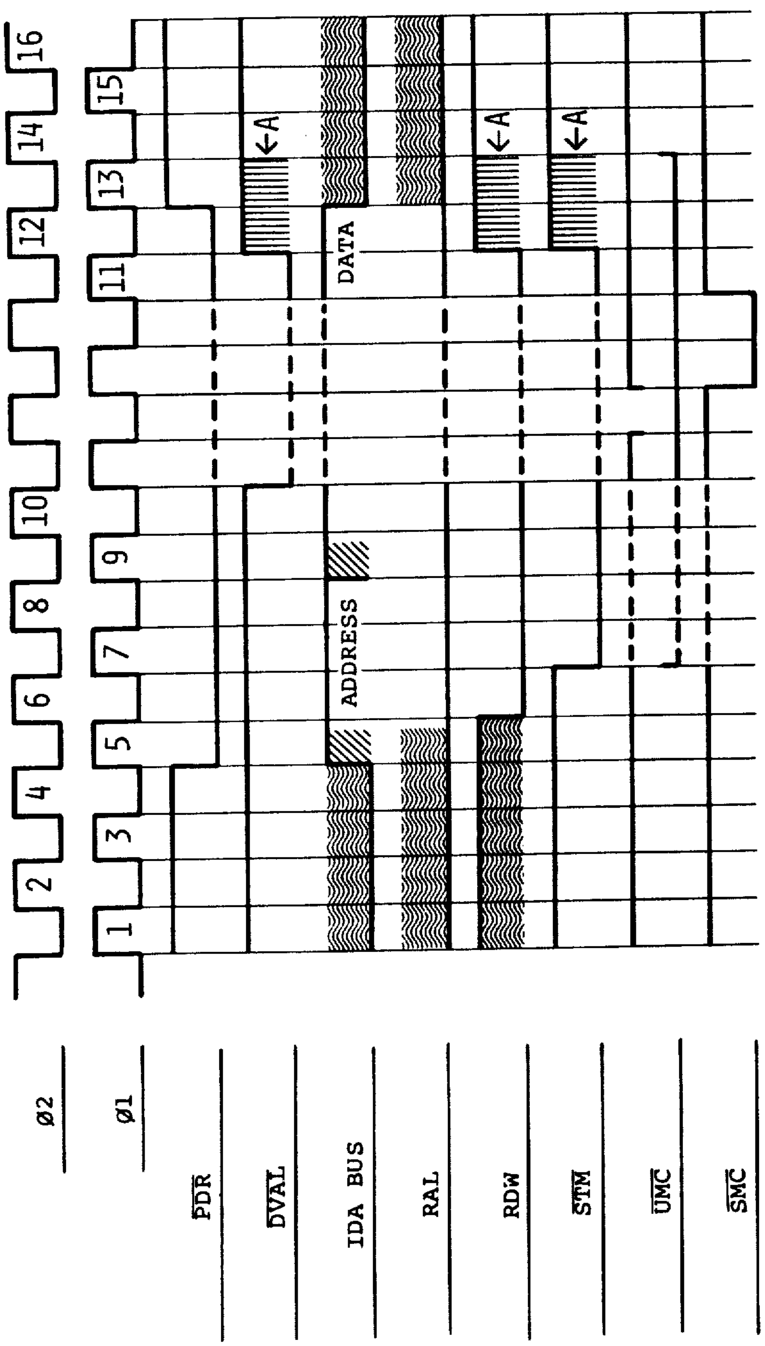
FIG. 112 is a waveform diagram illustrating a generalized BPC-originated write memory cycle not involving handshake.
Figure 113:
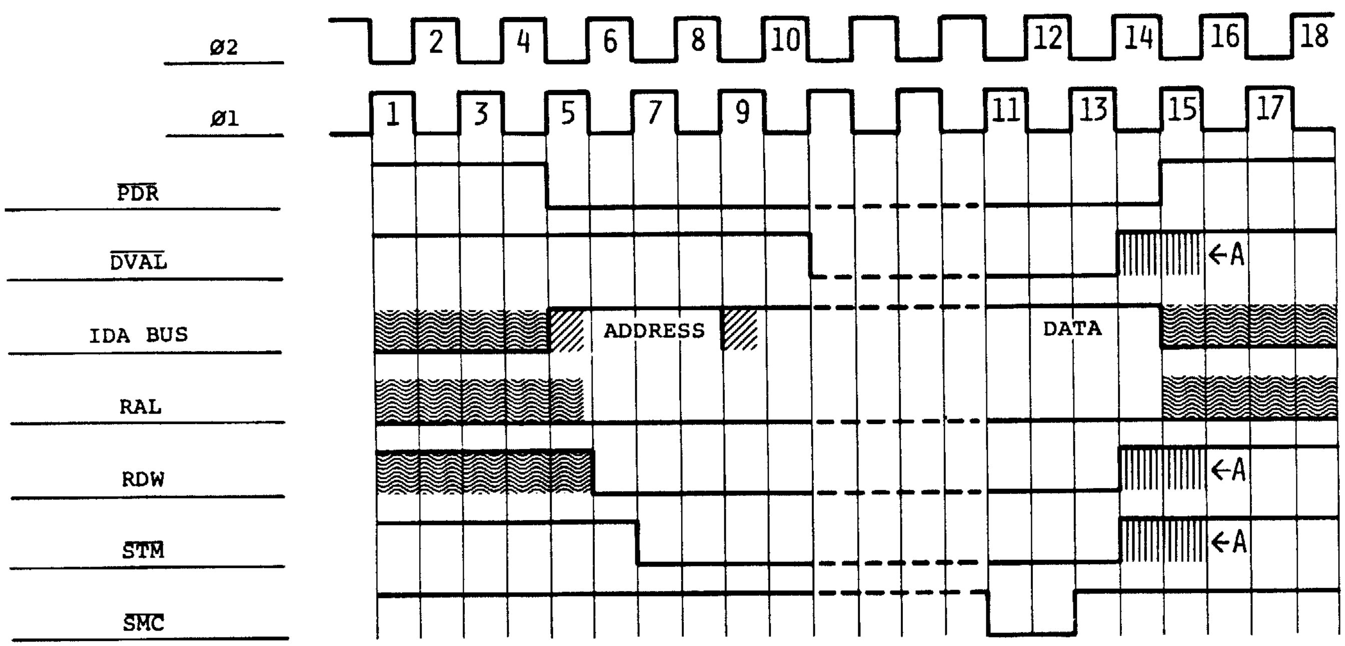
FIG. 113 is a waveform diagram illustrating a generalized 5-state BPC-originated write memory cycle with handshake.
Figure 114:
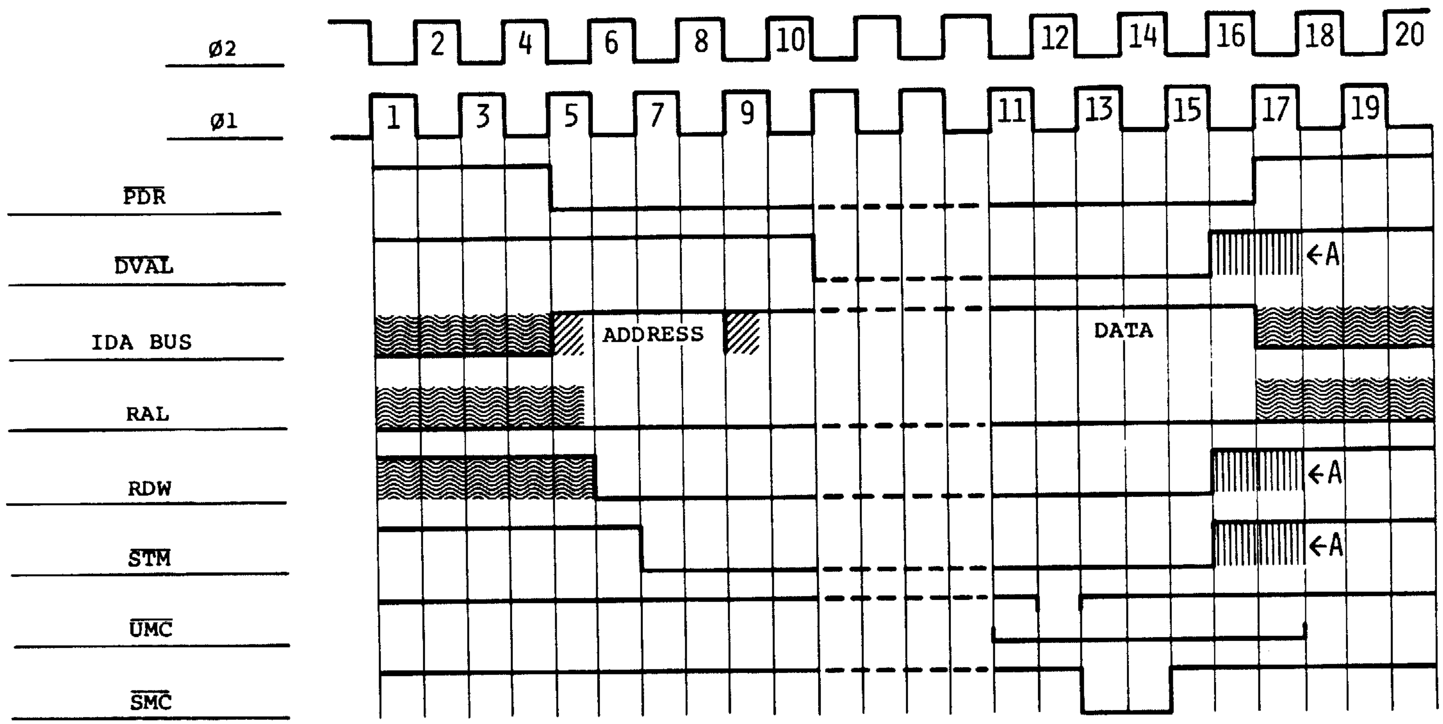
FIG. 114 is a waveform diagram illustrating a generalized 6-state BPC-originated write memory cycle with handshake.
Figure 115A:
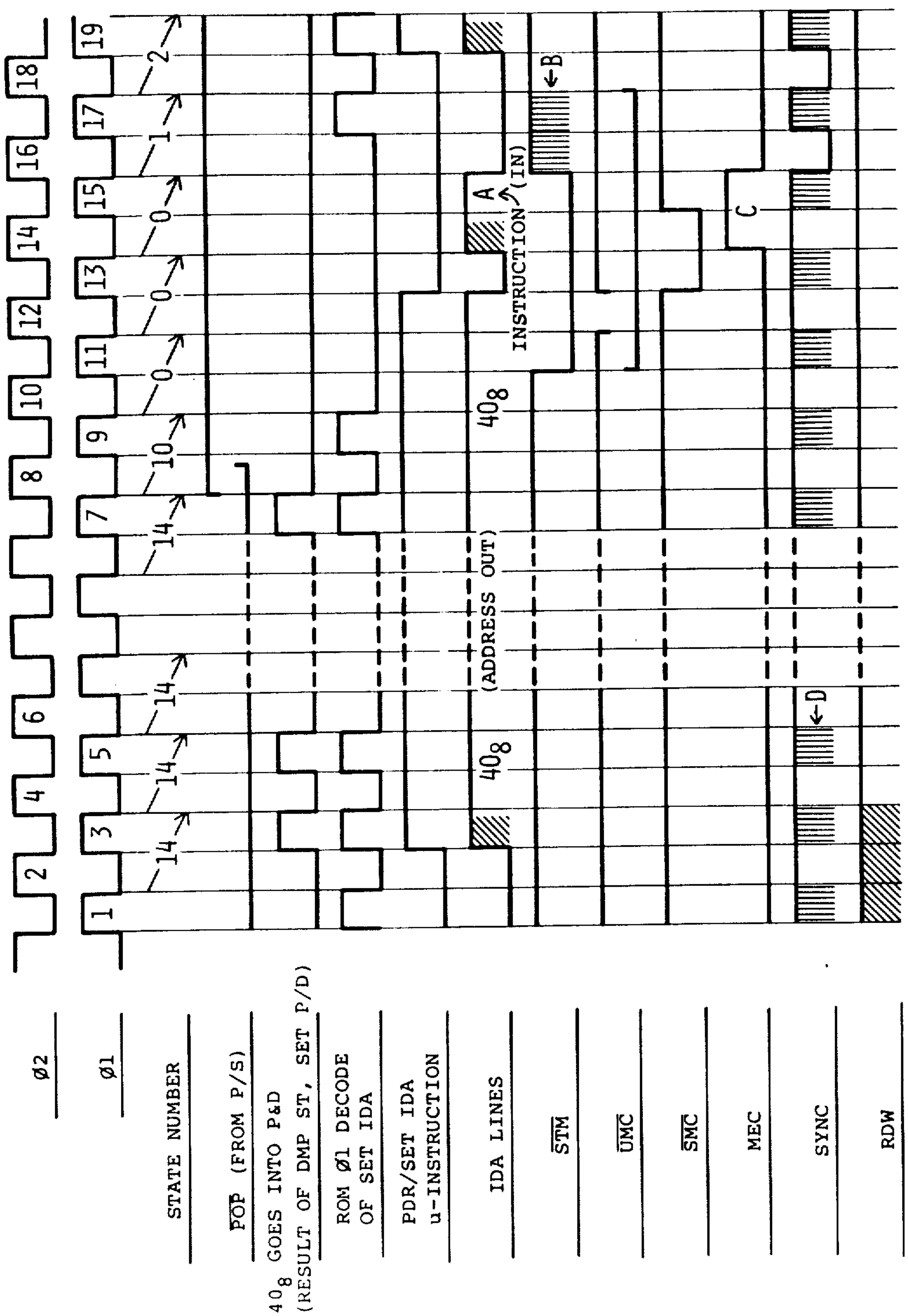
Figure 115B:
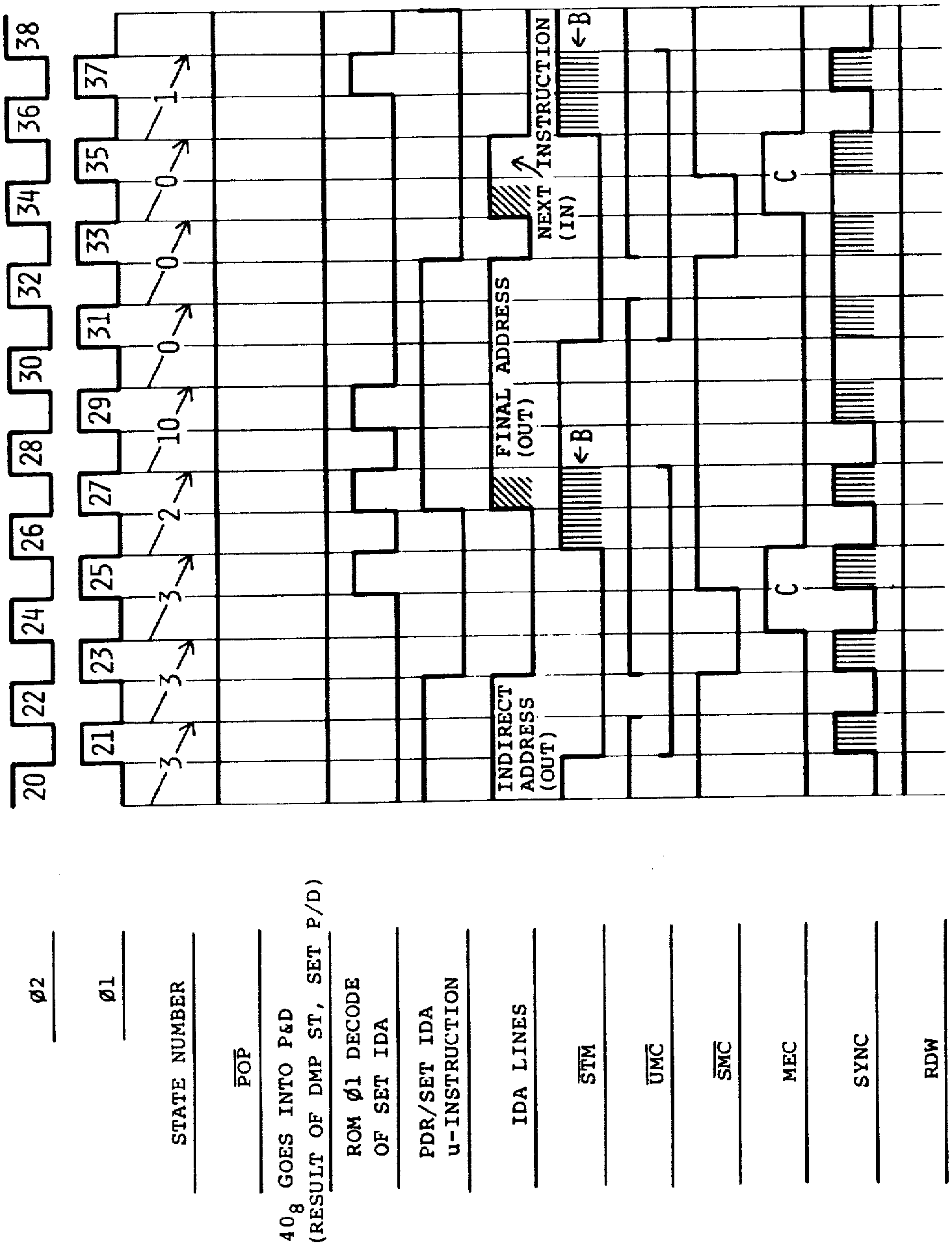

The Momory Timing and Control block of FIG. 16 may be understood with reference to the detailed schematic diagram of FIG. 131. This block comprises a small state counter, U21, which counts the number of states in the memory cycle. The counter initiates its sequence when the STM signal occurs if the memory cycle is referencing addresses located in the memory section (indicated by the RAL signal not being true). The counter is clocked on the rising edge of the phase two clock. On the first clock after the STM occurs, flip-flop U21A changes state and the STMROM signal is generated. Thus, the STM signal to the ROM is delayed by one-half of a state time to allow more address setup time as required by the ROM. On the next state time, the second flip-flop U21B is set provided that the Memory Busy (MEB) signal is not true. The Memory Busy signal is used to suspend the sequencing should the read/write memory be addressed and not be able to participate in the memory cycle immediately (such as being in a refresh cycle when the memory cycle starts). When the second flip-flop is set, the Unsynchronized Memory Complete (UMC) signal is generated to indicate to the microprocessor that the memory cycle is complete. FIG. 109 illustrates the timing associated with the memory cycle.

READ-ONLY MEMORY

Both the plug-in ROM memory section and the mainframe language ROM memory section shown in the block diagram of FIG. 4 are composed of a number of N-channel MOS sixteen-kilobit integrated circuits. These devices are organized as 1024 words of 16 bits and contain their own dynamic address latches and mask-programmable address decode circuits. The organization of the read-only memory section is shown in FIG. 132. The mainframe language ROM memory section contains twelve such devices. The plug-in ROM modules contain either two or four such devices depending on the features which the ROM module contains. An example of the ROM circuitry used in all the read-only memory sections is shown in FIG. 133. The 16-bit IDA bus input/outputs are used for receiving the address information from the microprocessor and for outputting the data accessed. When the STM input is not true, the ROM assumes that memory address information is on the IDA bus and continually inspects IDA bits 10 through 14 to determine if it has been addressed. The device is designed such that power consumption when not addressed is approximately one-tenth the consumption when addressed. Therefore, the power consumption in the calculator is reduced by applying the power to the device only when it is addressed. Consequently, each ROM device has an associated "power pulse" circuit 211 which is turned on by the ROM address decode circuit (powered separately from the +12 volts input) only when the ROM is addressed. If the ROM detects its address, it exerts the power pulse (PWP) output which swithces on the transistor and applies +12 volts to the voltage switch (VSW) input that powers the balance of the ROM circuit. The ROM latches the address information and starts its data access when the STM signal (STMROM) is exerted. The accessed data is placed on the IDA bus as soon as it is accessed (approximately 300 ns) provided the output drivers are not disabled (Output Data Disable, ODD) by the bus control circuit.

READ/WRITE MEMORY

Both the basic read/write memory section and the optional read/write memory section shown in the block diagram of FIG. 4 are identical in structure. As shown in the detailed schematic diagram of FIG. 134, each section contains an address decoder U1 which examines the upper three bits of the address (IDA12 through IDA14) and generates one of three outputs depending on whether the address is 70K, 60K, or 50K octal. A jumper is used to select which address the memory section responds to thereby defining the memory section as the basic read/write section or the optional read/write section. The output of the address decoder is latched in U5 along with the balance of the address (U12, U14, U16) when the Start Memory (STM) signal occurs. The output of U5 is gated with the STM signal to generate the Request for service (REQ) signal which is sent to the read/write memory control circuit. The output of the address latches goes directly to the read-write memory devices with the exception of the lower six bits which first traverse a two-to-one data selector (U17 and U18). The other input of the data selector comes from the refresh address counter (U20 and U21). The lower six bits of the address are selected by a read/-write memory control circuit (DATA SELECT) as determined by the read/write cycle being either a refresh cycle or a normal memory cycle. At the start of the refresh cycle, the read/write control circuit first increments the refresh address counter to advance it to the next memory address to be refreshed.

The read/write memory control circuit is shown in the detailed schematic diagram of FIG. 135. The state of the memory control is determined by the four flip-flops of devices U6 and U7. The flip-flops of U7 indicate that a refresh cycle is in progress. The waveforms associated with the control circuitry are shown in FIG. 136. The flip-flops are clocked on the positive-going edge of the phase two clock. When the STM signal occurs, flip-flop U6A will be set via U4A and U4B on the next clock provided neither flip-flop of U7 is set. The read/-write memory devices are enabled (Cen) via U9A whenever either U6A or U6B are set. Whether the read/write memory devices perform a read or write operation is determined by gate U2A (RW). If the RW signal is a logical high, the read/write devices are in the read mode. To generate the write mode, three conditions are necessary: the Write WRIT) signal from the microprocessor must be logically true, a refresh cycle must not be in progress (U7A and U7B are not set); and the latch composed of gates U3C and U3D must be set (U3C output high). The latch is cleared by the Request (REQ) signal not being true. The latch is set at the beginning the next phase two clock following the setting of flip-flop U6B. If the memory cycle is a read cycle, the Output Buffer Enable (OBC) signal, which allows the output of the read/write memory devices to be placed on the IDA bus, is generated via U2C when the memory timing and control circuit removes the Stay Off Bus (SOB) signal.

The refresh cycle is initiated via gate U4B when the monostable U21 delay period has expired provided that the microprocessor is not requesting use of the memory. When the cycle is initiated, flip-flop U7A will be set which causes the read/write cycle by setting U6B via U4A and U4B on the next state time. secondly, flip-flop U7A also generates the Memory Busy (MEB) signal via U2B and U3B to notify the memory timing and control circuit should the microprocessor start a memory cylce while the refresh cycle is in progress. Thirdly, flip-flop U7A also drives the RW signal. via U8B, to the read logic level as required by the read/write memory devices during the refresh cycle. The second flip-flop of the refresh cycle, U7B will be set the state time following the setting of flip-flop U6A to sustain the conditions required for the refresh cycle. When the read/write cycle has expired, indicated by flip-flop U6B resetting, the next state time flip-flop U7B resets thus terminating the refresh cycle.

The read/write memory devices, Texas Instruments devices TMS 4030 or equivalent, are shown in FIG. 137. The devices are organized as 4096 addresses of one bit. The read/write (RW) control signal determines if the operation is a read (RW jogj) or a wriete operation. If the cycle is a write cycle, the data written is accepted from the Data In (DIN) inputs. If the cycle is a read cycle, the data is presented at the Data Out (DOUT) outputs and will be placed onto the IDA bus when the Output Buffer Enable (OBE) signal is generated by the read/write memory control. The read/write cycle is started when the Chip Enable (CEN) signal occurs provided that the devices have been selected by the chip Select (CS) signal. The memory section is capable of byte operation as determined by flip-flop U5 and gates U8C and U8D. The memory bus control signal Byte (BYTE) from the microprocessor indicates if the memory operation is to be a byte operation. If the Byte signal does not occur, both bytes are enabled. If the byte signal does occur, the address bit IDA15, latched in U5B when STM occurs, will determine which byte is being referenced.

KDP CONTROL

Referring now to FIG. 138, there is shown a detailed schematic diagram of an I/O interface included within the KDP control block of FIG. 4. When the Initialize (INIT) signal on the I/O bus occurs, the power-up (PUP) signal is generated by the I/O interface and used throughout the KDP control circuitry to initialize the various flip-flops and counters. The I/O interface section contains the I/O operation decoder composed of the two three-to eight decoders U21 and U29. The decoders are enabled whenever the KDP's peripheral address is detected by gate U17. Decoder U21 generates the read register 4 (R4) and read register 5 (R5) signals. The R4 signal is used to send the keycode information to the microprocessor. The R5 signal is used to send the KDP status information to the microprocessor. The status latch U53 as well as the gates to place the data on the I/O bus is located in the I/O interface section. Bit Ø indicates that the LED display unit contains 32 alphanumeric positions. Bit 1 indicates if the printer is out of paper. Bit 2 indicates that the printer is busy printing. Bit 3 indicates that the reset key on the keyboard has been depressed. Bit 4 indicates that the keyboard section is exerting the interrupt request signal (IRL).

The other decoder, U29, generates four register strobe signals, R4SB, W4SB, W5SB, and W6SB. The R4SB signal indicated to the keyboard scan control circuitry that the pending keycode has been accepted by the microprocessor. The W4SB signal loads the display character code from the microprocessor into the data register in the KDP memory section, causes the timing generator circuitry to generate the signals to store the character code in the read/write memory in the memory section, and causes the display control section to terminate displaying until all the new data has been received. The W6SB signal also loads the data register in the memory section with the printer character code, and causes the timing generator section to transfer the code fto the read/write memory in the memory section. New printer data is not sent to the KDP control until the printer busy bit in the KDP status indicates to the microprocessor that the printer is no longer busy. The W5SB signal updates the "command register" of the KDP control. Bit Ø of the I/O command word generates the print (PRT) signal via gate U57A which sets the print command flip-flop located in the print control section. Bit 1 generates the display DSP) signal via gate U51B which, similarly, sets the display command flip-flop located in the display control section. Bit 2 is used to turn on an astable multivibrator (gates U30A and U30B) which produces the audio "beep" sound of the calculator. Bits 3 and 4 control the command register "run light" flip-flop U31A which turns on and off the "run light" located on the left side of the LED display unit. Since the flip-flop is a JK type flip-flop, if both bits 3 and 4 are set, the run light will toggle to the opposite state, If bit 3 only is set, the run light will be turned off. If bit 4 only is set, the run light will be turned on. Similarly, bits 5 and 6 control the command register cursor flip-flop U31B which determines which type of cursor, insert or replace, symbol can be displayed in the LED display unit. If bit 5 only is set, the cursor will be the insert cursor. If bit 6 only is set the cursor will be the replace cursor.

The switches used on the calculator keyboard are single-pole, single-throw switches. The circuitry included within the KDP control block of FIG. 4 which scans for keyboard input and sends the information to the microprocessor via the I/O bus is shown in the detailed schematic diagram of FIG. 139. The keyboard scan counter U65A and U65B determines which key is being examined for closure. The counter is clocked at approximately a 2.5 KHz rate by an oscillator made of gates U37A and U37B and associated components. The lower four bits of the counter is decode by U48 to select one of sixteen column select lines to the keyboard. The upper three bits of the counter are used by U57 to select one of eight row scan lines from the keyboard. Should the selected keyswitch be depressed, the column select output will be connected to the row select input and the output of the row selector (U57) will go to the logic low state indicating that a keyswitch closure has been detected.

When a key closure has been detected, flip-flop U27A will be set via inverter U36B. The complement output of flip-flop U27A inhibits the key-board scan counter from counting further thereby saving the keycode for the key closure that was detected. The flip-flop also causes flip-flop U27B to become set via U39C. The output of flip-flop U27B then sets the latch U62 provided that an interrupt poll is not in progress (U56C). The output of the latch causes the low priority interrupt request (IRL) signal to the microprocessor to be set, therby indicating that a key closure has been detected and that interrupt service is required. At the microprocessor's convenience the service routine is performed. The first operation of the service routine is to perform an interrupt poll to determine which I/O device is requesting service. The fact that the interrupt poll is taking place is indicated to the keyboard scan circuit by the Interrupt (INT) signal being exerted when peripheral address bit 3 (PA3) is logically false (poll of low level interrupt I/O devices). The keyboard scan circuit, since it has generated an interrupt request, responds by exerting the I/O bus data bit Ø (IODØ ) which corresponds to its peripheral address via gate U61C. Upon determining that the keyboard scan circuit is interrupting, the microprocessor executes the keyboard service routine. During the service routine, an I/O cycle which reads R4 occurs. When the I/O cycle occurs, the keycode from the keyboard scan counter is placed on the I/O bus via the eight gates of U58 and U59. The I/O cycle also causes the Read Register 4 Strobe (R4SB) which via U37C resets flip-flop U27B. The output of U27B will, in turn, set U27A, provided that the debounce counter U28 declares the key no longer closed, and thus allows the keyboard scanning to resume. The debounce counter is reset whenever a key closure occurs. As the key is released, the debounce counter will be reset each time a key bounce occurs until finally no further key bounce occurs and the debounce counter counts to the point that it enables gate U37D.

The keyboard scan circuit also has the automatic key repeat feature. The latch, composed of gates U39A and U39B is reset whenever no key closure is detected. Likewise, the repeat counter U47 is held reset as long as no key closure is detected. When a key closure is detected, the repeat counter is allowed to start counting (but starts counting over again each time that a key bounce occurs as the key is closing). When the repeat counter's output pin 1 goes high, the latch composed of gates U39A and U39B is set and the repeat feature is enabled by enabling gate U39D. Thereafter each time U47 output pin 12 goes high, gate U39D will set flip-flop U27B thereby causing another interrupt requiest to occur. The delay time from the time the key is depressed to the time automatic repeating starts is determined by the time it takes after key closure, with no further bouncing, for U47 output pin 1 to go high followed by output pin 12 going high. The frequency of key repeat is determined by the frequency at which U47 output pin 12 toggles.

The keyboard also contains the Reset key which is handled separately from the keyboard scanning. When the Reset key is depressed, the KRST signal goes low and, after a time delay for key bounce caused by C22, R49, and R50, the input to inverter U40B goes low. The positive-going transition of inverter output U40B is differentiated by C21 and R47 to produce a pulse which becomes the I/O bus Reset (RESET9 signal that reinitializes the microprocessor and I/O section. The output of the inverter, before the pulse formation, is sent to the KDP's status latch which the microprocessor can interrogate to determine if the initialization is a power-on initialization or a Reset key initialization.

The Shift and Shift Lock keys on the keyboard are handled separately from the scanning circuit. When either of the shift keys on the keyboard is depressed, the SHIFT signal resets the latch composed of gates U46A and U45C and sets flip-flop U56B which is turn will set I/O data bit 7 (IOD7) thereby indicating to the microprocessor that the shift key is depressed. If the shift lock key is depressed, the latch composed of gates U46A and U45C will be set to indicate that all further keycodes are shifted keycodes. The latch remains set until on the shift keys is depressed.

A KDP control timing generator included within the KDP control block of FIG. 4 is shown in the detailed schematic diagram of FIG. 140. The 6 MHZ clock from the I/O bus is divided by four by flip-flops U66A and U62A to produce the KDP clock and the gated T clock generated at the output of gates U56A and U7C. The gated clock is disabled via gate U54B whenever either flip-flops U63B or U64B are set. Flip-flop U63B is set on the next KDP clock after a printer data word (indicated by W6SB) is sent to the KDP control. Simiarly, flip-flop U64B is set on the next KDP clock after a display data word (indicated by W4SB) is sent to the KDP control. The two flip-flops disable the T clock for only one state time since the output of each flip-flop clears flip-flops U63A and U63B, respectivelly. During the state time that the T clock is disabled, the R/W signal (gate U55C) goes low during the second half of the state time and is used by the memory section to store the data just received into the KDP read/write memory. The three signals PLC (printer load clock), DLC (display load clock), and SPA (select printer address) is used by the printer control, display control, and memory sections to produce the correct address for storing the data just received into the KDP read/write memory. When new display or printer data is not being received, the PR (printer) signal is used to control the SPA signal so that either display or printer data can be read from the KDP memory.

The upper portion of FIG. 140 shows the circuitry which generates the basic timing signals used by the printer control, display control, and memory sections. The waveforms generated by this circuitry is shown in the waveform timing diagram of FIG. 141. Device U35 is a four-bit binary counter with a synchronous load control input (Texas Instruments device SN74S163). The PR (printer) signal is present for eight state times and absent for six state times. The last state time before each transition of PR, the P7 signal is generated by gate U46C for the full state time and the T7 signal is generated by gate U56B during the last half of the state time. Each time that P7 occurs, the binary counter will be loaded with the data on the A through D inputs on the next state time. If the PR signal is not true, the counter will be set to zero the next state time. If the PR signal is true, the counter will be set to a decimal ten on the next state. The use of these timing signals will be discussed in the following sections.

A read/write memory section of the KDP control block of FIG. 4 is shown in the detailed schematic diagram of FIG. 142. Central to the memory section is the KDP read/write memory which stores the display data. By designing the display control section to automatically refresh the display, the capability to inform the calculator user of what the calculator program is doing via display messages while the program is running is possible. More importantly, the design provides the basic requirement of live keyboard, i.e., displaying keyboard actions and results while a program is running. The read/write memory device U38 is Signetics device 82S09 which is capable of storing sixty-four 9-bit words. The memory is divided into two halfs by the select printer address (SPA) signal on the A5 input of the device. Thus the lower half of the memory stores the 32-character codes for the LED display unit and the upper 16 locations of the upper half stores the 16-character codes for the thermal printer unit. The data from the I/O data bus to be stored in the memory is first saved in the register composed of U43 and U52. The timing section then generates the R/W and SPA signals as necessary to transfer the data from the register into the proper location in the memory. When the KDP control is not receiving information from the I/O bus, the display and printer data in the read/write memory are alternately assessed to refresh the display. The printer data is only printed the one time after the print command is received by the I/O interface section. The address for the read/write memory is selected by the two-to-one data selector composed of U13 and U14. The two inputs to the data selector are the display character address and character column select and the printer character address and character row select. The character address information is used to address the read/write memory. The column and row select is used to address the dot pattern read-only memory U23. The read-only memory is comprised of devices that are organized as 2048 words of eight bits. The dot patterns for both the display and the printer are stored in the ROM. The most significant bit of the address (PR) is used to select whether the dot pattern is for the display or for the printer. The next seven bits of address select one of 128 possible symbols. The lowest three bits of address select the desired column or row of the symbol. Column data is needed for the display unit; row information is needed for the printer unit. The timing section is designed such that when a printer character is being processed by the printer control section, the address to the read/write memory is the next display character to be processed and vice versa. As shown in the timing diagram of FIG. 141, during the state times that the P7 signal occurs, the ROM is enabled (input CE of U23) and, as explained in the read-only memory section, the power pulse circuit composed of Q3 and associated components applies +12 volts to the main section of the ROM device. During the second half of the state time the T clock occurs and the ROM accesses the dot data addressed and presents it at the D outputs for use. At the end of the P7 state time the dot data is parallel loaded into the parallel-in/serial-out shift register composed of U22 and U18. During the following state times the dot data (DD) is shifted out of the shift register for use by the display or printer control sections. If the dot data is printer row data only five dot data bits are defined (five by seven printer matrix). For the display dot data, all seven bits are defined since the data is column information.

The most significant bit of the read/write memory is not used. The next most significant bit is used to inform the display control section that the cursor (CURSOR) is to be flashed in that character position. The outputs of the read/write memory are open-collector and require the external pull-up resistors to obtain the logic high state. This fact is used to advantage to generate the symbol for the insert cursor (character code zero). If the display symbol being accessed in the read/write memory is to have the cursor superimposed (read/write output bit 07 true), the display control section, if required, will cause the cursor enable (CE) signal to go high thereby switching off transistor Q4 and causing the output of the read/write memory to become the character code zero for the insert cursor.

A display control section of the KDP control block of FIG. 4 is shown in the detailed schematic diagram of FIG. 143. When the first data character of a new group of display data is sent to the KDP control, the W4SB associated with the transaction is used to trigger one-shot U16. The output of U16 via gate U9A clears binary counters U3 and U6 thereby initializing the counters to the first display character address of the read/write memory in the memory section. Also, via gate U7A, the output clears flip-flops U15B and U15A. In turn, the output of flip-flop U15A disables the column scan decoder U2 which blanks the display, disables gate U4A which enables gate U10D and allows the display load clock (DLC) from the timing section to increment the binary counter to the next display character address each time that a new display data character is received, and disables the one-shot U16 from being triggered again on the next data transfer. The display control section remains in the mode of receiving display data with the display blanked until the DSP signal is received.

When the DSP signal, part of the command word, is received from the I/O interface section, the binary counters U3 and U6 are again cleared to start the display scan at the first display character address. Also, the DSP signal sets flip-flop U15B which clears flip-flops U12B and U32B thereby re-starting the flash cycle for the cursor and allows flip-flop U15A to be set on the next T7 clock. Once flip-flop U15A is set, the display control switches from the mode of receiving new data to the mode of displaying the data. Assume for the moment that the cursor is not displayed, in which case gate U5A is enabled to pass the serial display dot data (DD) through to the display connector and hence to the display. The LED display unit is composed of eight display devices that contain four display dot matrices per device. A detailed block diagram of the display unit of FIG. 4 is shown in FIG. 144. The serial-in/parallel-out shift register (332) shifts in a new dot data bit each time that the clock signal occurs. When one column of dots for each character position has been received (244 bits), the scan line corresponding to the column data is enabled to cause the dots selected on those columns to light or not light according to the data in the shift register. The cycle is then repeated with each column in sequence. Counter U1 and decoder U2 determine which column is selected. The timing relationship between the waveforms that result from a display of all LED columns is shown in FIG. 145. Since binary counter U3 starts with a count of zero at the beginning of the display cycle, both gates U5B and U9C will enable gate U4B. Gate U9B allows the T clock to become the series of display clocks shown in the first three lines of FIG. 145. The display size (SIZE) signal via gate U5B will disable the last sixteen series of display clocks (shown on line two) if the display is only a sixteen character display. The upper three bits of the binary counter U3 and decoding gate U9C further allow the display clocks only when the three bits are zeros. The balance of the time the column scan decoder U2 is allowed to operate. The divide-by-five column counter U1 determines which column is being scanned. It is not initialized as it makes no difference which column is scanned first since all columns will eventually be scanned. Each time that counter U3 "rolls over", the column counter U1 will be incremented to the next column.

The display cursor logic is shown at the upper left portion of FIG. 143. The cursor flash frequency is determined by the astable multivibrator composed of gates U8A, U8B, and U8C which is divided by four by flip-flops U12B and U32B. When the Q-not output of flip-flop U32B is a logical high, the cursor symbol is enabled for displaying. The command register in the I/O interface section enables either gate U11A or U11B depending on whether the insert (INS) or replace (RPL) cursor is selected. As discussed in the memory section above, the cursor (CURSOR) output from the read/write memory indicates when the particular character being accessed from the read/write memory is to also have the flashing cursor. If the insert cursor is selected, the cursor enable (CE) signal is generated which forces the output of the read/write memory to assume the insert cursor code. If the replace cursor is selected, the flip-flop U12A is used to save the cursor signal so that it will be available when the character dot pattern is sent to the display unit. The replace cursor lights all dots in each column of the character matrix which is achieved by gate U11B disabling U5A when the cursor is to be displayed thereby forcing the serial display data to the state that lights all dots on the column.

A printer control section of the KDP control block of FIG. 4 is shown in the detailed schematic diagram of FIG. 146A. Assume as an initial condition that flip-flops U44A and U44B and binary counter U33 have just been cleared by gate U54C. Since the output of flip-flop U44B is a low, decimal counters U24, U25, and U26 and flip-flop U32A will be cleared, printer scan decoder U41 will be disabled, printer paper advance (ADV) solenoid will be de-energized via gate U7B, and gate U17B will be disabled thereby enabling gate U10B to pass the printer load clock (PLC). Hence, no printing action will occur and the printer control is in the data receiving mode. The binary counter U33 provides the printer character address to the read/write memory in the memory section. Each time that printer data is received by the KDP control, the timing section produces the printer load clock (PLC) to advance the binary counter U33 (via gate U10B) to the next printer character address so that the next address will be ready when the next printer character code is received. The PLC clock also clocks the other binary counters U26, U25, and U24 as well as flip-flop U32A but since the counters are connected in cascade (ripple carry output to enable inputs of next stage) none of the counters will change state because flip-flop U32A is clear. The printer control section will remain in the data receiving mode until the PRT command signal is received from the I/O interface section.

When the PRT signal is received, flip-flop U44A will be set and at the end of the next T7 clock flip-flop U44B will be set indicating that the printer control section is in the print mode. To understand the timing that the printer control section generates, it is first necessary to understand the requirements of the thermal printer unit. A block diagram of the thermal printer of FIG. 4 is shown in FIG. 147. The print head circuit comprises an off-the-shelf twenty-bit serial-in/parallel-out shift register whose inputs are DATA and CLOCK. The output of each group of five bits goes to a 5-of-20 demultiplexer. Each demultiplexer routes its five input bits to one of four print head positions. Each print head position contains five dot resistors which "burn" the paper to produce the printing. The four input scan signals (S1 through S4) determine which of the head positions the demultiplexer selects. The sequence of operation is for the printer control to send the dot information for the first, fifth, ninth, and thirteenth character positions and generate the first scan signal which "burns" the paper for the proper length of time. The procedure is then repeated for each of the other scan signals in sequence. When the four scans are completed, the paper advance solenoid which as been energized ("cocked") during the four scan operations is de-energized and a fifth time period is required to allow the paper to advance and settle.

Returning now to the printer control circuitry, FIGS. 148A-B show the timing relationship of various waveforms associated with the printer control circuitry of FIg. 146A. Binary counter U33 counts the sixteen character positions. Outputs QB and QC of decimal counter U25 determines which scan is taking place via scan decoder U41. Notice that the counter's output also goes to integrated circuit U34. Device U34 is a four-bit magnitude comparator which generates a positive-true output at output A=B whenever the four bits input at the A inputs is equal to the four bits input at the B inputs. The output is used to enable the T clocks to pass through gate U5C to become the printer clocks. Notice that inputs AØ and A1 are tied to a logic one. Consequently, inputs BØ and B1 can be used to shut off the clocks to the printer. The four gates U19A, U19B, U19C, and U7D combine logically with inputs BØ and B1 to form a disable function such that if any input to U19A, U19B, or U19C is a logic high, the clocks to the printer are disabled. Therefore, let each input to gates U19A, U19B, and U19C be taken to form a counter whose decimal count is shown in FIG. 148B. The state number associated with each count is shown immediately above the decimal count. The outputs which define the decimal count are the output from flip-flop U32A, the four outputs of U26, and the QA output of U25. Notice that the feedback generated by gates U5D and U46B causes the counting sequence to change from decimal count 11 to 16 during state numbers 12 and 13 and again from count 43 to 48 during state numbers 28 and 29. Note also that counter U26 is a decimal counter which causes the count to change from count 19 to 32 during state numbers 16 and 17 and again from count 43 to 48 during state numbers 28 and 29. Thus, the total number of states for one scan is 32.

Only during the first state (decimal count zero) are the T clocks allowed to pass through gate U5C to become the printer clocks. Binary counter U33 counts the sixteen character positions of the printer. For the first scan, inputs B2 and B3 of comparator U34 are both zero. Therefore, as the character counter U33 counts through the sixteen character positions, only the first, fifth, ninth, and thirteenth characters are sent to the printer. For the next scan, only the second, sixth, tenth, and fourteenth characters are sent to the printer. A similar pattern occurs for scans three and four. These waveforms for each scan are shown in FIG. 148A. After the character counter has counted through sixteen counts, flip-flop U32A will be set and via gate U19A further clocks to the printer will be disabled.

The scan signals are shown in FIG. 148B. The scan decoder U41 is enabled by flip-flop U44B, QD output of U24, and the burn control output (BCO). A printer burn control circuit within the KDP control block of FIg. 4 is shown in the detailed schematic diagram of FIG. 146B. Devices U50D, U50C, and associated components form an oscillator whose duty cycle depends on the unregulated +20 volts. The output of the oscillator turns switch Q4 on and off which in turn charges capacitor C27 through resisitors R66 and R67. The higher the +20 volts, the slower that capacitor C27 will be charged. Devices U50B, Q15, Q16, and associated components form another oscillator which operates at a frequency of approximately one-tenth that of the U50D oscillator. The purpose of this oscillator is to discharge capacitor C27. The voltage C27 is input through R67 to the non-inverting input of comparator U50A. The other input of the comparator is a reference voltage. The reference voltage can be modified by the print intensity adjustment, the print head thermister, and resistor R63 which is switched in when FET Q12 is turned-on. The output of the comparator U50A is the burn control output (BCO) signal which alternately switches the printer scan signals on and off. The BCO signal is a negative-true signal whose duty cycle is inversely proportional to approximately the square of the unregulated +20 volts, thereby providing an almost constant power dissipation for the print head resistors. The print temperature control (PTC) signal from gate U7D of the printer control section modifies the duty cycle of the burn control to allow a fast rise time for the temperature of the print head resistors during state numbers 1 through 12 of the scan time followed by an approximately constant temperature for the print head resistors during the second portion of the scan period.

When the fourth scan is completed, the QD output of U25 will become set. The output disables the scan decoder U41, disables the current drive to the advance solenoid, and disables the counter feedback gate U46B. The paper then advances to the next line. The time allowed for the advance (40 state times) is longer than the scan time due to the disabling of the feedback gate U46B.

Decimal counter U24 is used to determine which row of the character is selected. For the first row, the dot information read out of the read/only memory section is all spaces. The next seven rows are the seven rows of the five-by-seven dot matrix. The last two rows are again all spaces to provide the separation between the characters on successive lines. For the last two rows, output QD of decimal counter U24 (counts eight and nine) will be a high thereby disabling the scan decoder during those two rows. At the end of the tenth row, the QD output will return to a logic low which via capacitor C16 clears flip-flops U44A and U44B ending the print mode.

CASSETTE CONTROL

The cassette control circuitry of FIG. 4 provides the interface between the microprocessor and the cassette transport hardware. The control circuitry can be divided into four sections. One section is the I/O interface section which provides the interface between the I/O bus and the rest of the cassette control circuitry. Another section is the tape section which provides the motor drive electronics that causes the movement of the magnetic tape. A third section is the read electronics section which detects flux transitions on the magnetic tape and decodes it into bit serial digital data which is sent to the microprocessor. The delta distance code is used to represent digital information on the magnetic tape. This code represents a zero on the magnetic tape by a short distance between flux transitions and a one by a long distance between flux transitions. The fourth section is the write electronics section which encodes bit serial digital data from the microprocessor into a series of flux transitions on the magnetic tape.

The cassette control I/O interface section is shown in the detailed schematic diagram of FIGS. 149A-C. The I/O interface section contains an I/O operation decoder composed of a dual three-to-eight decoder U3 and associated gates. The decoder is enabled whenever the peripheral address lines indicate peripheral address one and an interrupt (INT) poll is not occurring. One section of the decoder decodes the I/O read operations; the other section decodes the I/O write operations. A write to memory address seven (W7) clears the servo-fail flip-flop U7B and the cartridge out flip-flop U7A as shown in FIG. 149C. The servo-fail flip-flop is set by the servo section. The cartridge out flip-flop is set when the cartridge-in microswitch opens due to the cartridge being removed from the transport assembly. A write to memory address six (W6), which occurs during the last I/O DMA operation, sets the search complete flip-flop U9A and clears the DMA request enable flip-flop U9B.

A write to memory address five (W5) latches the primary command information from the microprocessor into the eight-bit command latch U1 shown in FIG. 149B. The command latch is also cleared to its initial state by the Initialize (INIT) signal when the calculator is turned on. The figure shows the information assigned to each bit. A write to memory address four (W4) causes the bit serial data to be written on the magnetic tape (sent on I/O bus line IODØ) to be latched into flip-flop U13A and clears the flag flip-flop U13B.

A read of R6 (R6SB) causes the beginning/end of tape flip-flop U15A to be cleared. The flip-flop is set whenever a hole is detected in the magnetic tape as shown in FIG. 150. A hole is detected by allowing light to pass through the hole to reach a phototransistor. The signal from the phototransistor is applied to an op-amp U4 which compares the signal to a level which is approximately 30% of the peak level. The transistor Q4 changes the op-amp output to volate levels compatible with the input requirements of the beginning/end of tape flip-flop.

Figure 49:
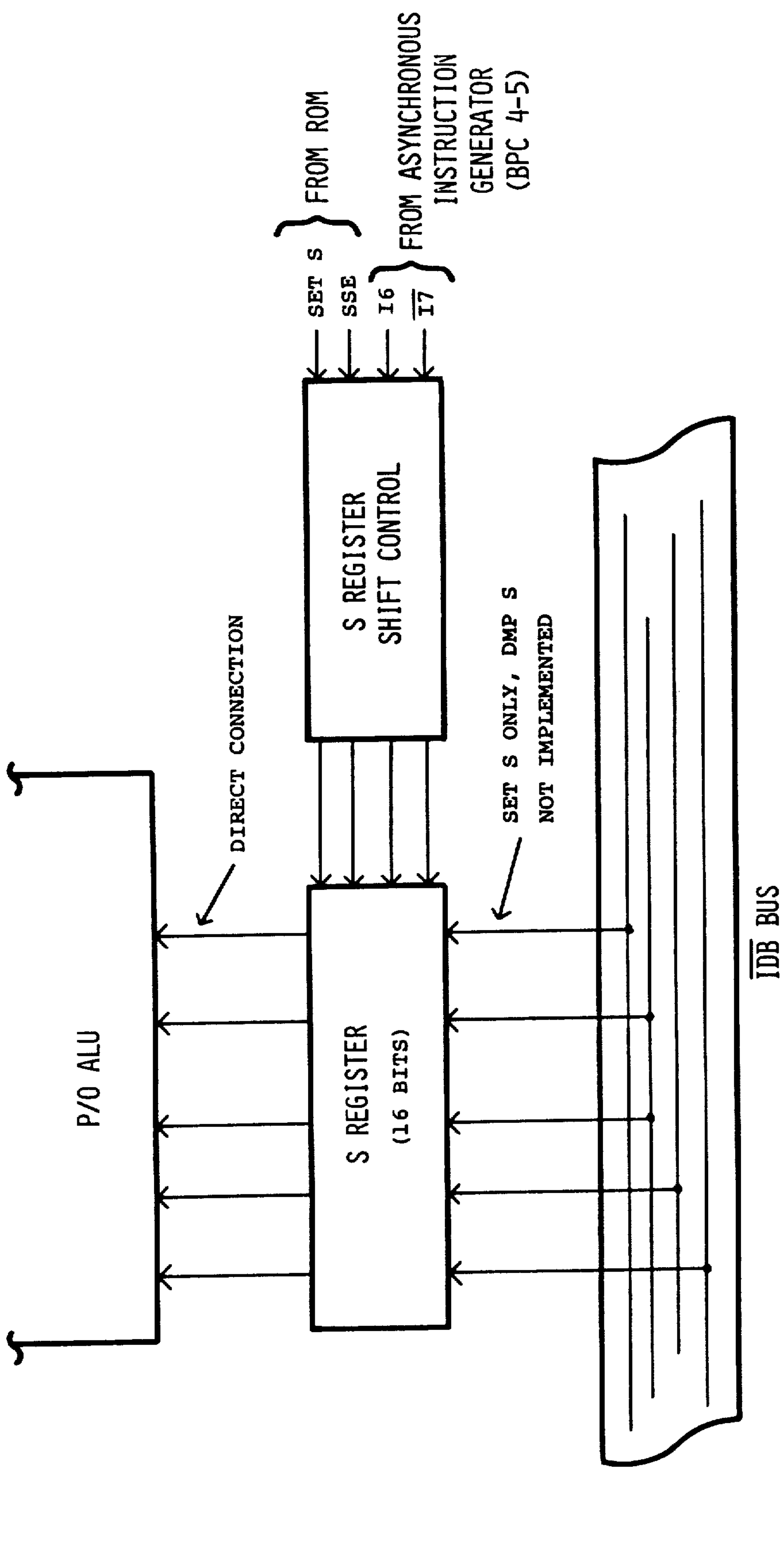
FIG. 49 is a detailed block diagram of the S register and the S register shift control block of FIGS. 25A–B.
Figure 50:
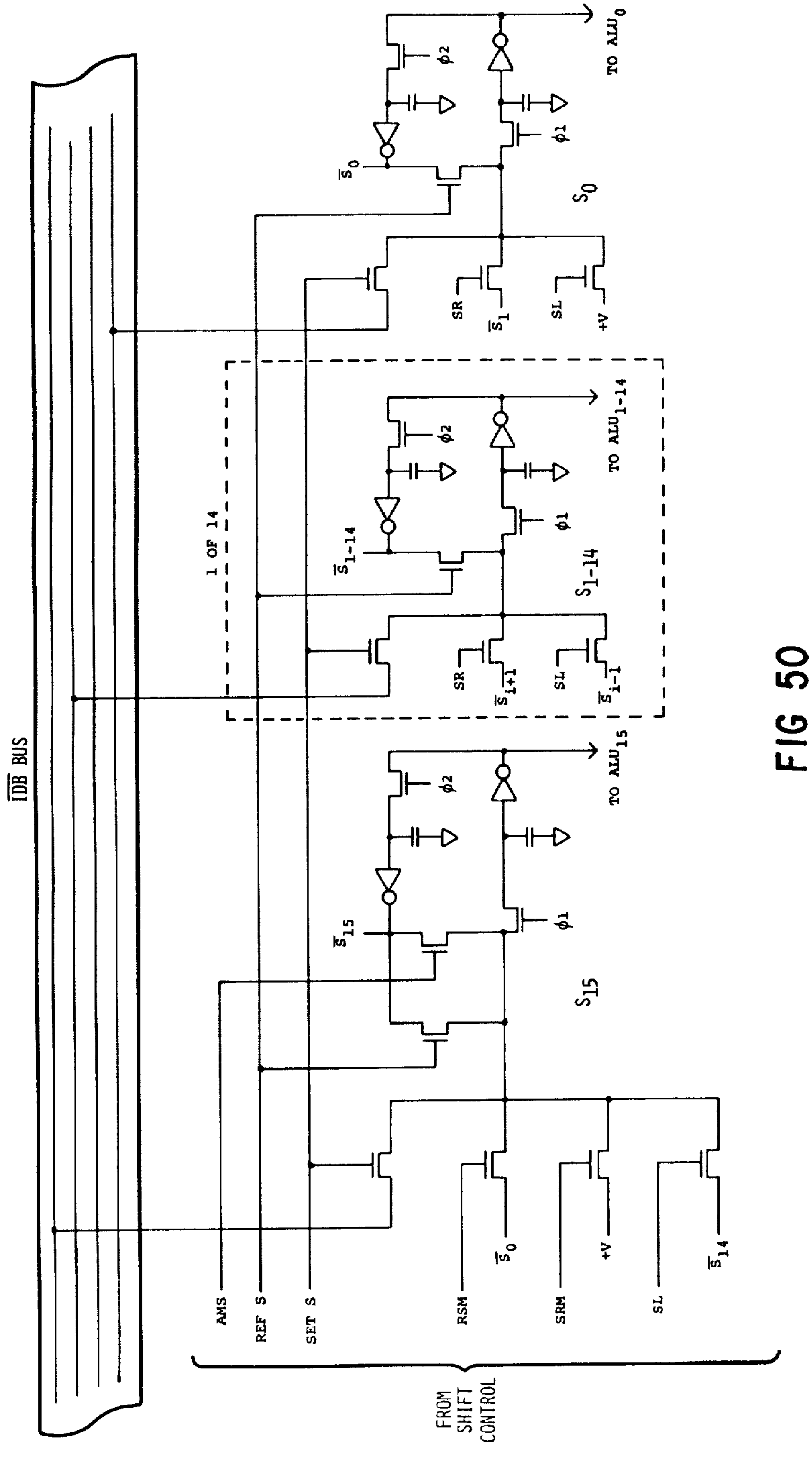
FIG. 50 is a detailed schematic diagram of the S register of FIG. 49.
Figure 5I:
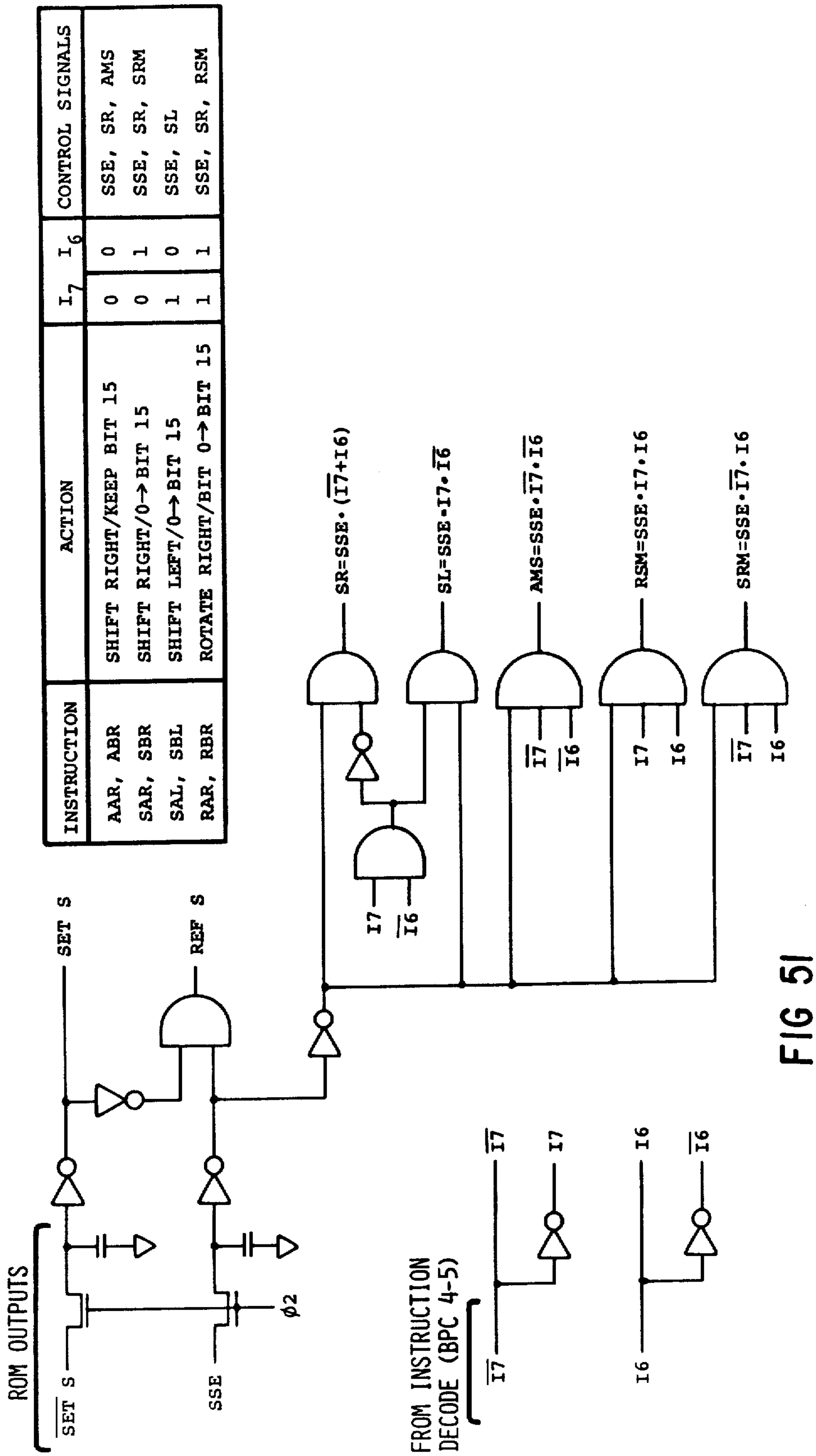
Figure 52:
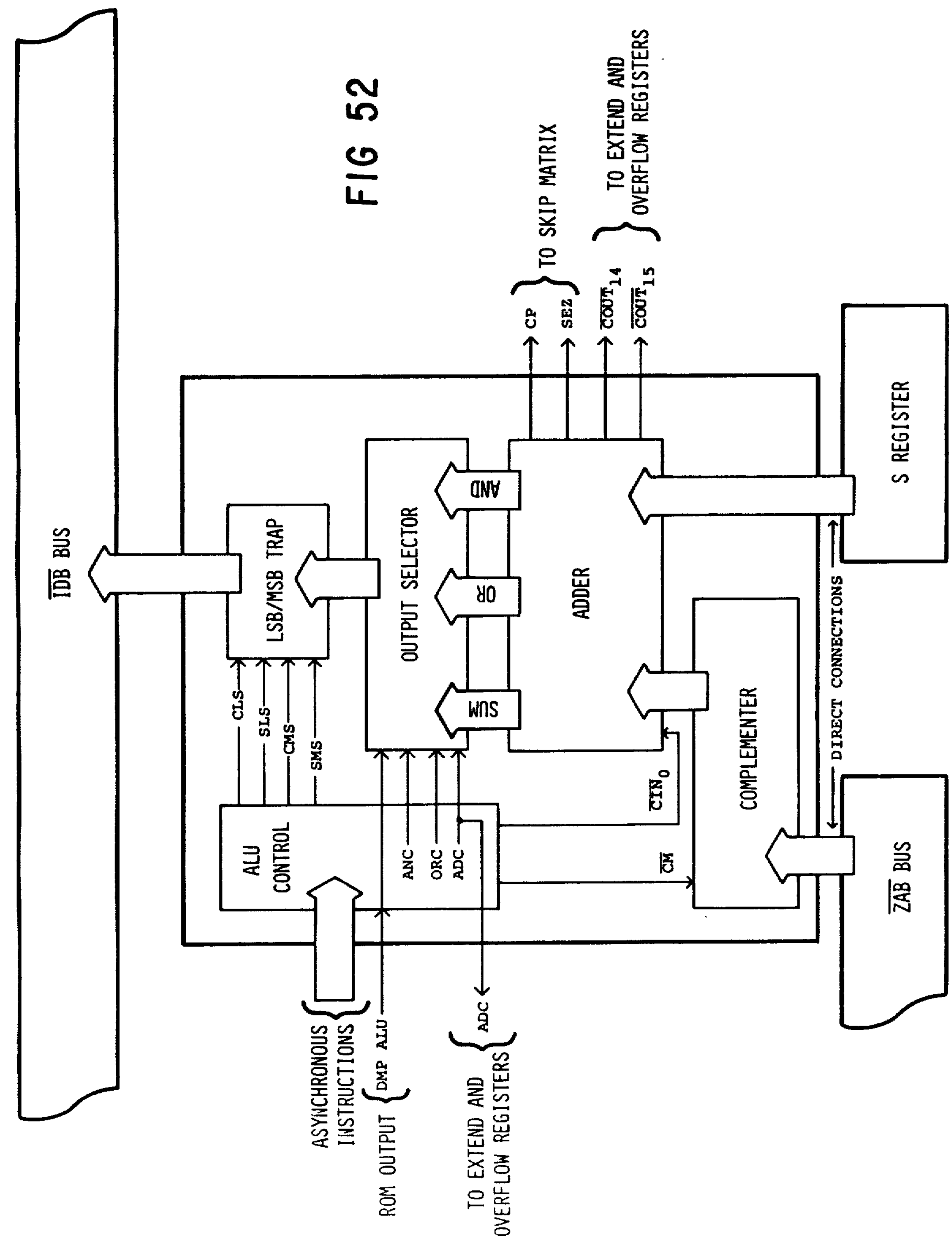
FIG. 52 is a detailed schematic diagram of the ALU of FIGS. 25A–B.
Figure 53:
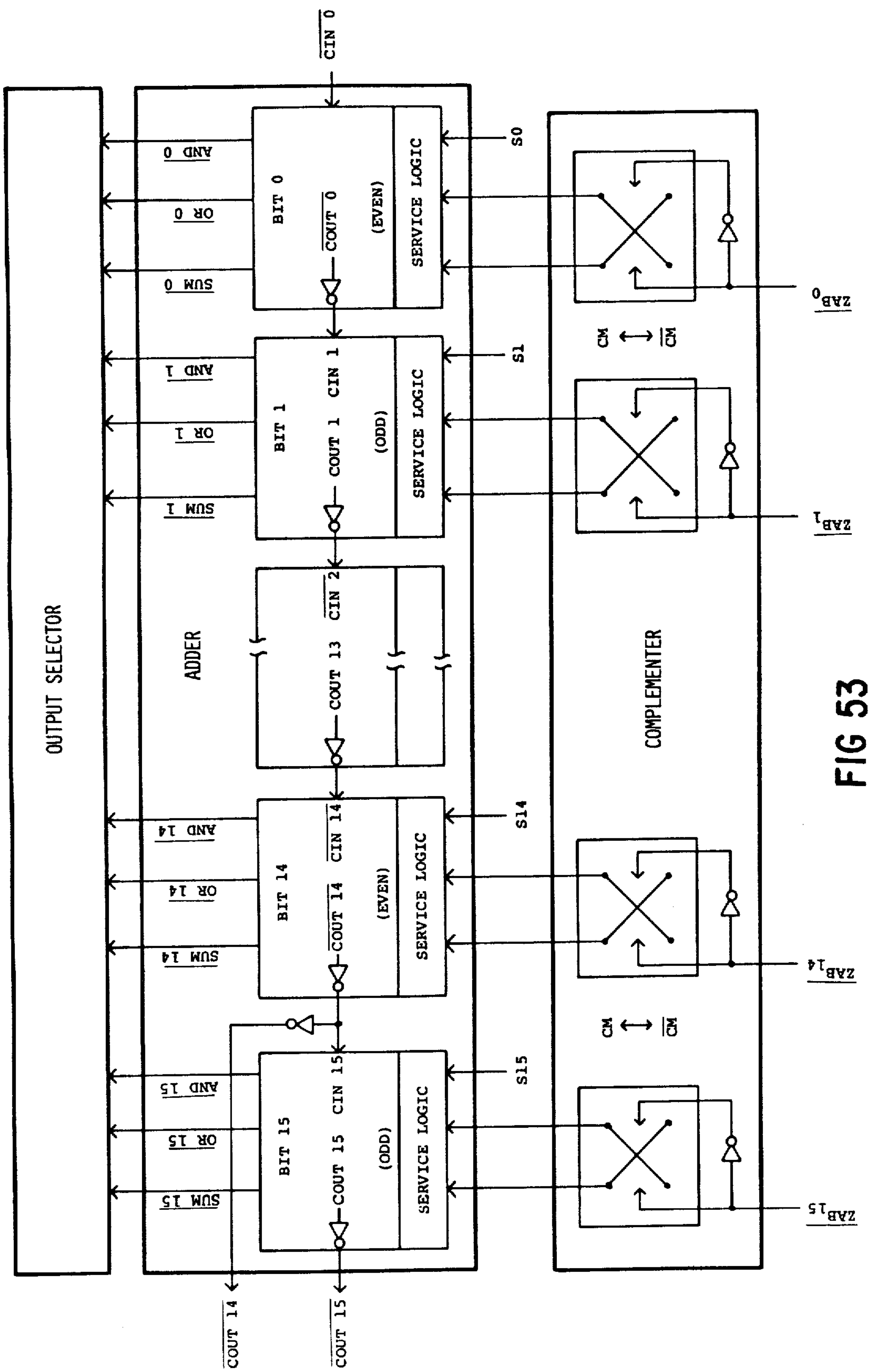
FIG. 53 is a detailed block diagram of the adder and complementer of FIG. 52.
Figure 54:
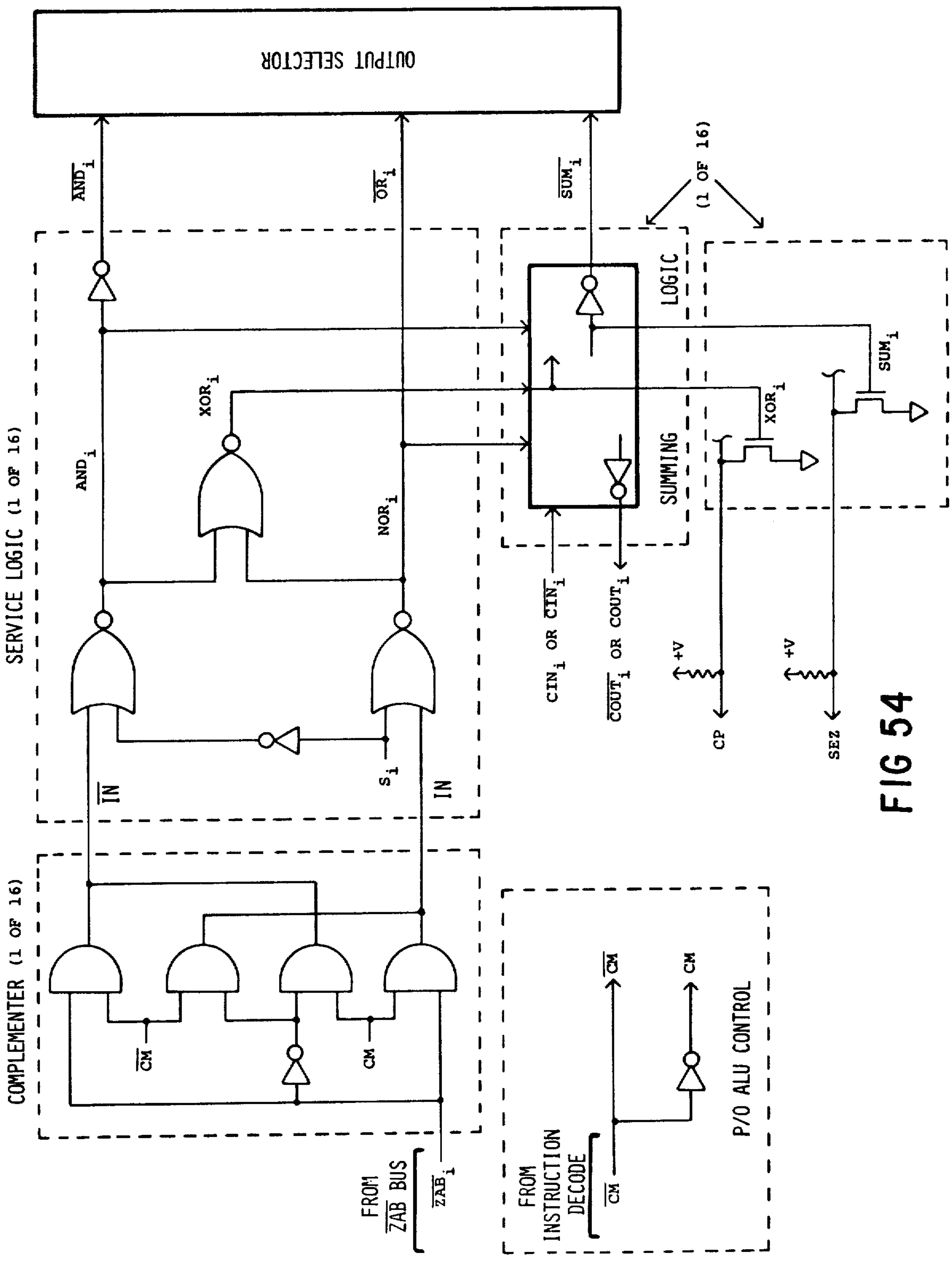
FIG. 54 is a detailed schematic diagram of the complementer of FIG. 53 together with its associated circuitry.
Figure 56:
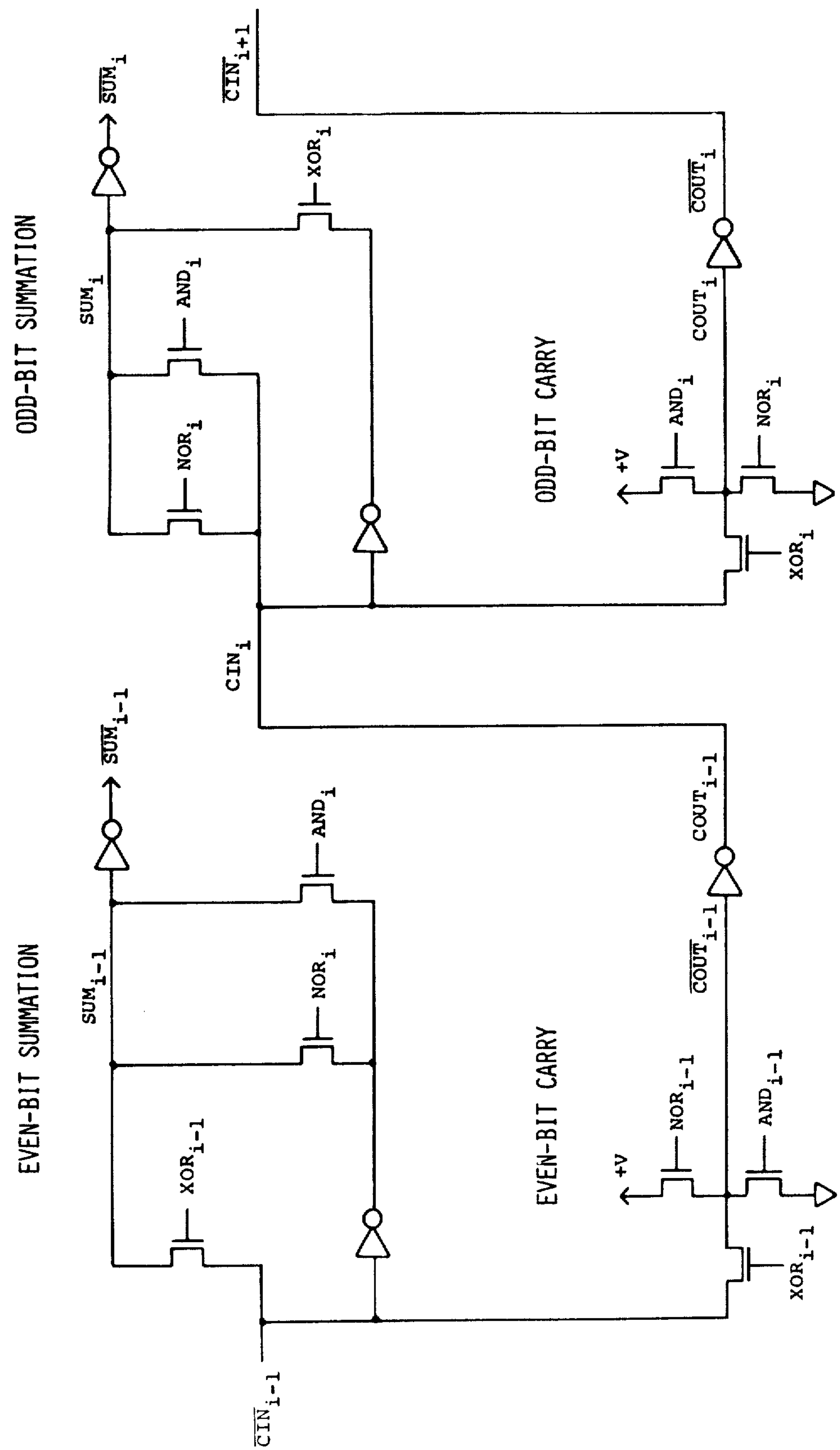
FIG. 56 is a detailed schematic diagram of a portion of the circuitry within the adder of FIG. 53.
Figure 57:
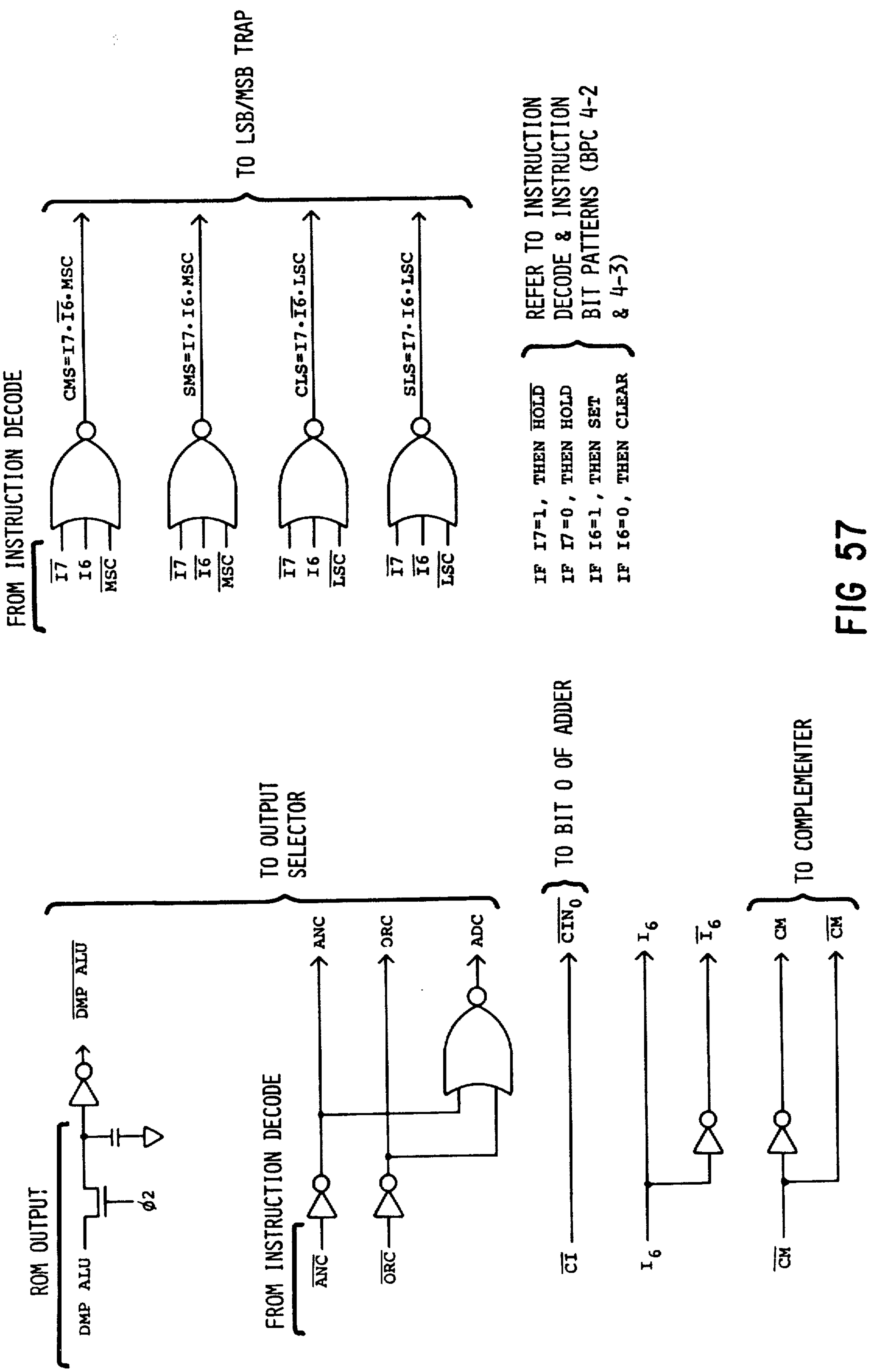
FIG. 57 is a detailed schematic diagram of the ALU control block of FIG. 52.
Figure 58:
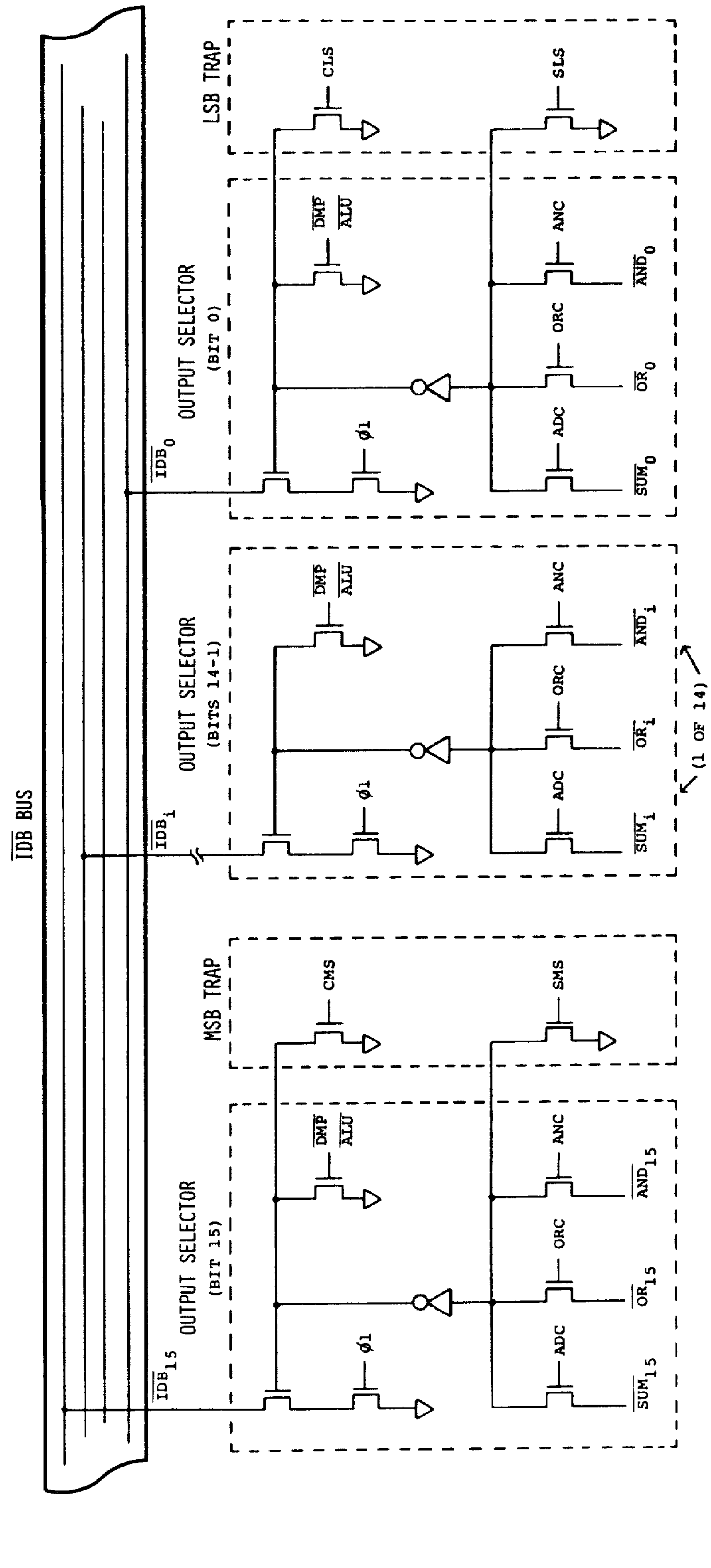
FIG. 58 is a detailed schematic diagram of the output selector and LSB/MSB trap blocks of FIG. 52.
Figure 59:
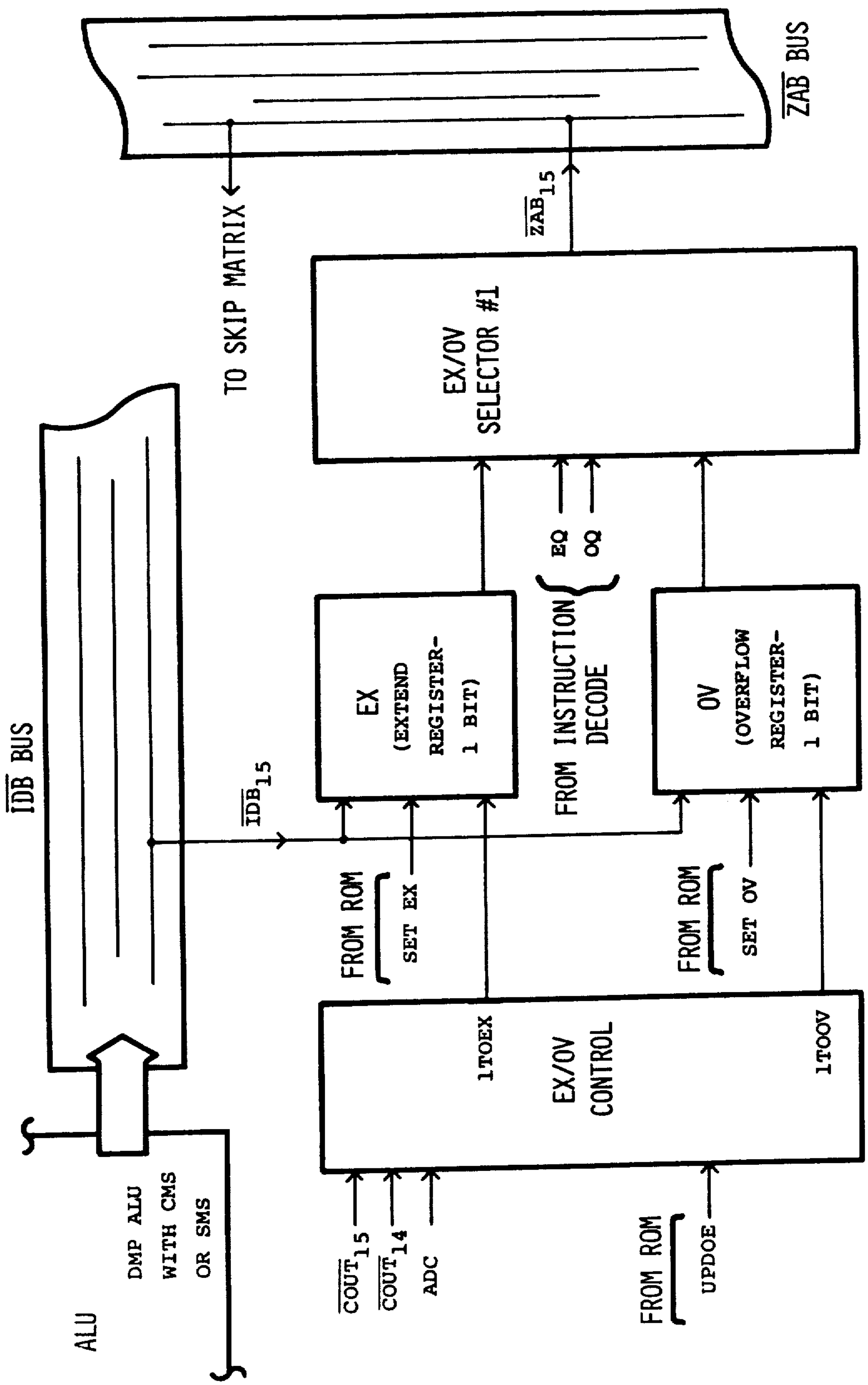
FIG. 59 is a detailed block diagram of the extend and overflow registers of FIGS. 25A–B connected in a non-ERA mode.
Figure 60:
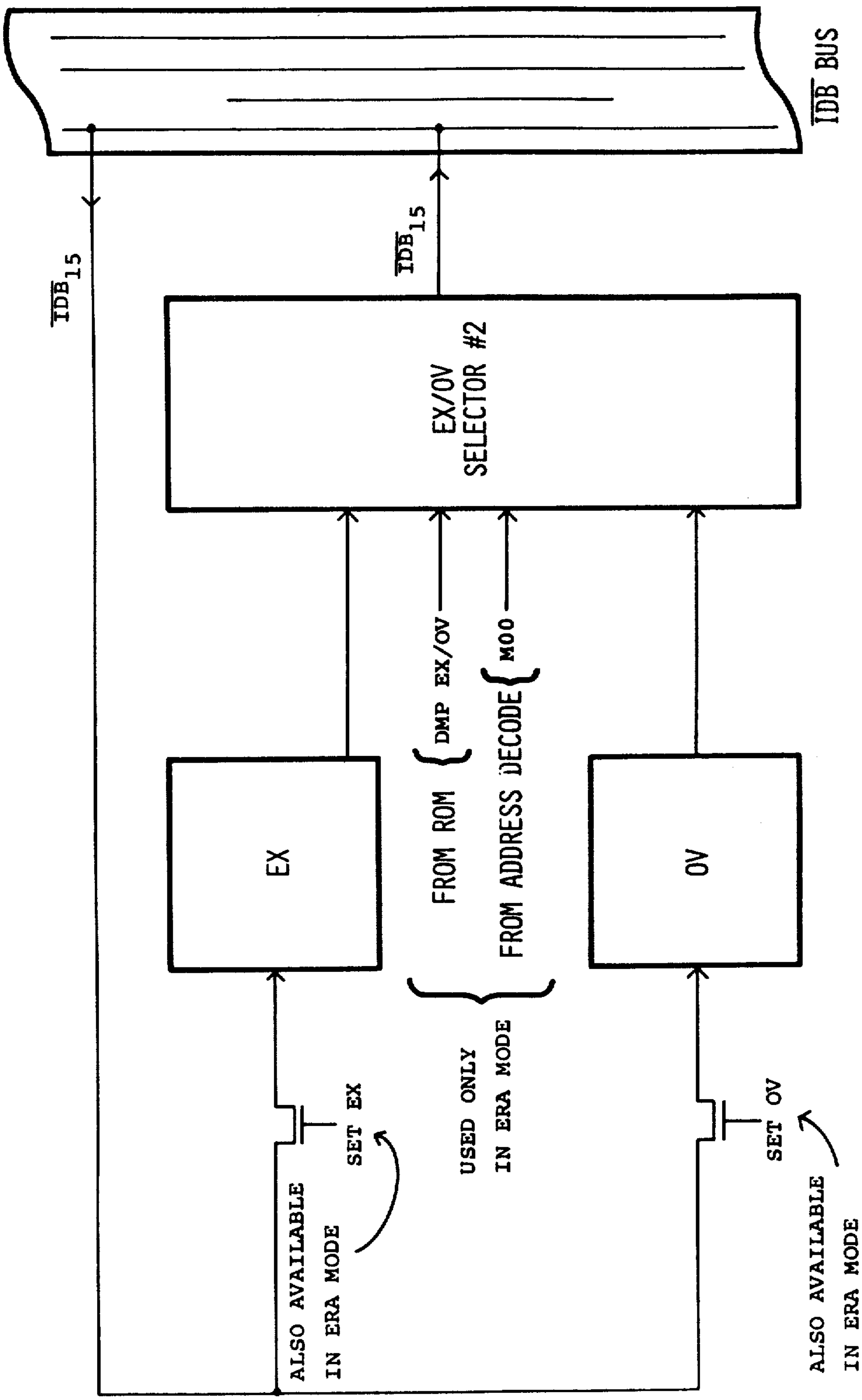
FIG. 60 is a detailed block diagram of the extend and overflow registers of FIGS. 25A–B connected in an ERA mode.
Figure 61:
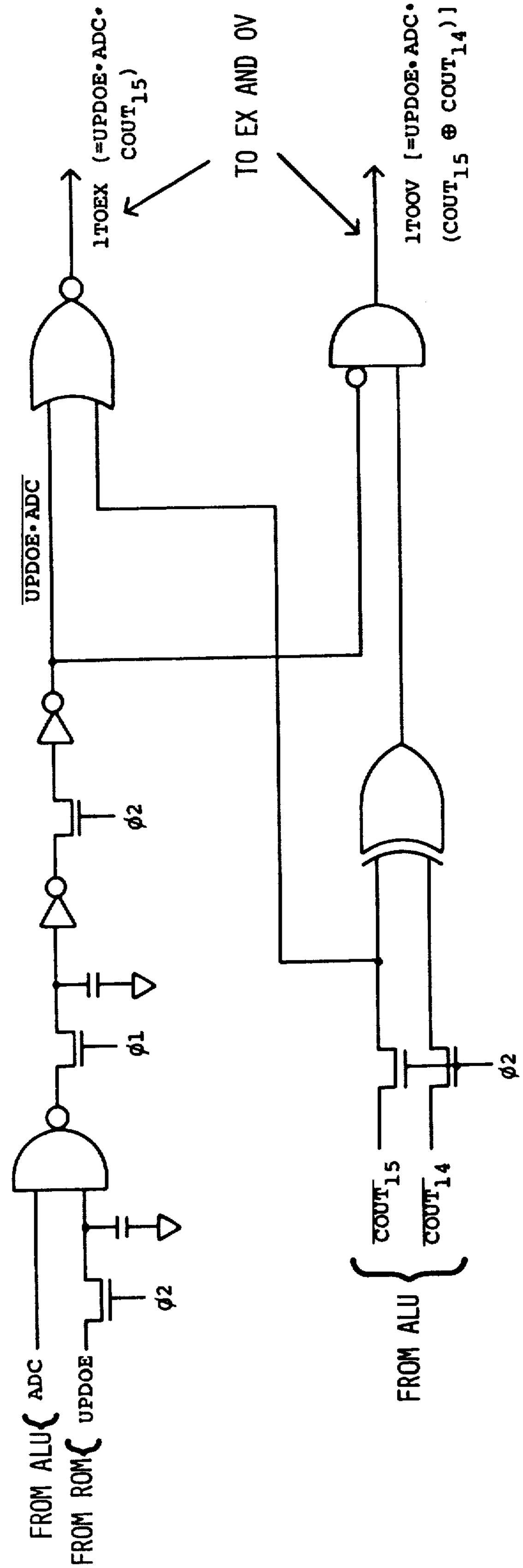
FIG. 61 is a detailed schematic diagram of the EX/OV control block FIG. 59.
Figure 62:
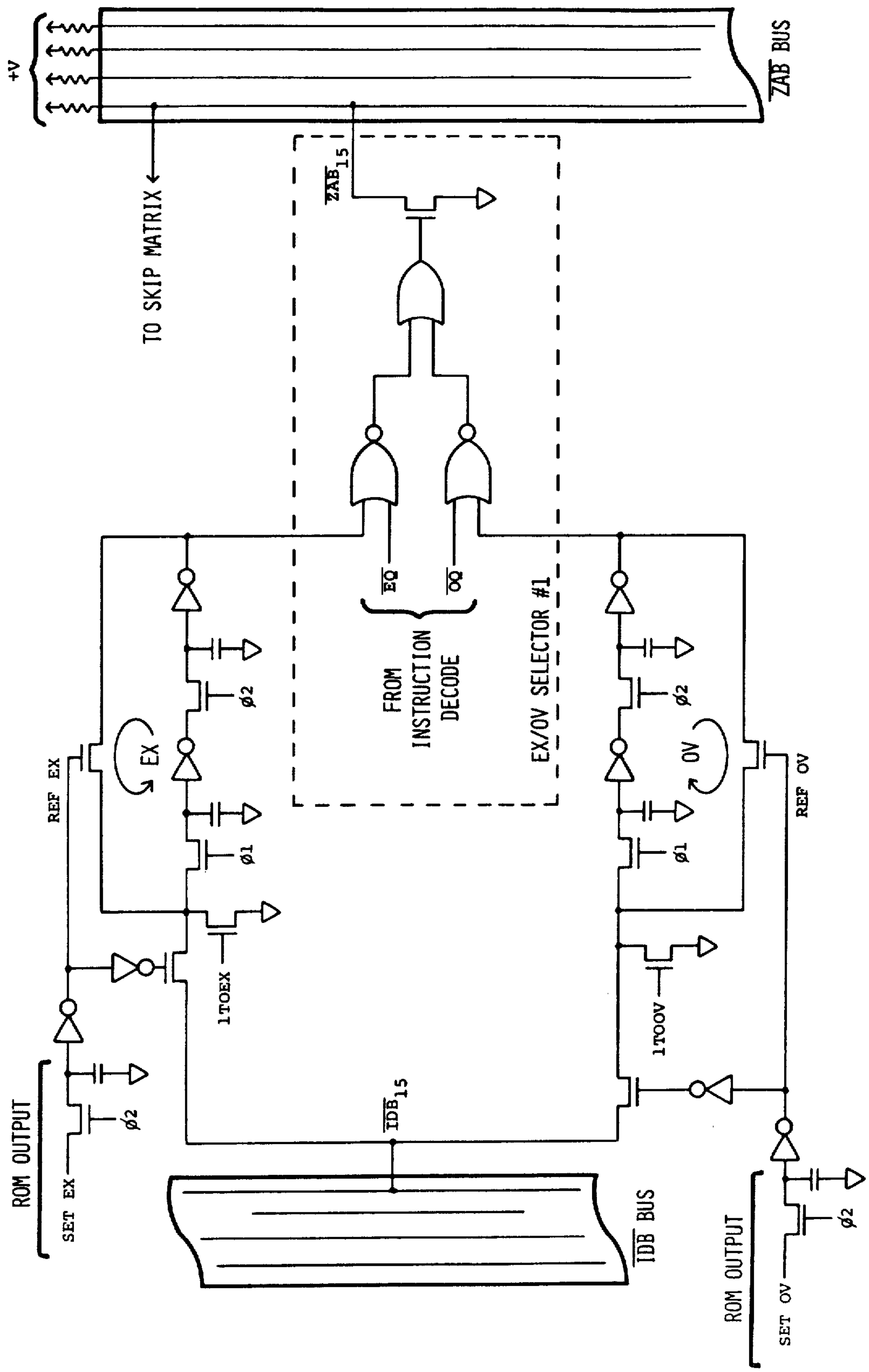
FIG. 62 is a detailed schematic diagram of the extend, overflow, set EX, set OV, and EX/OV selector #1 blocks of FIG. 59.
Figure 63:
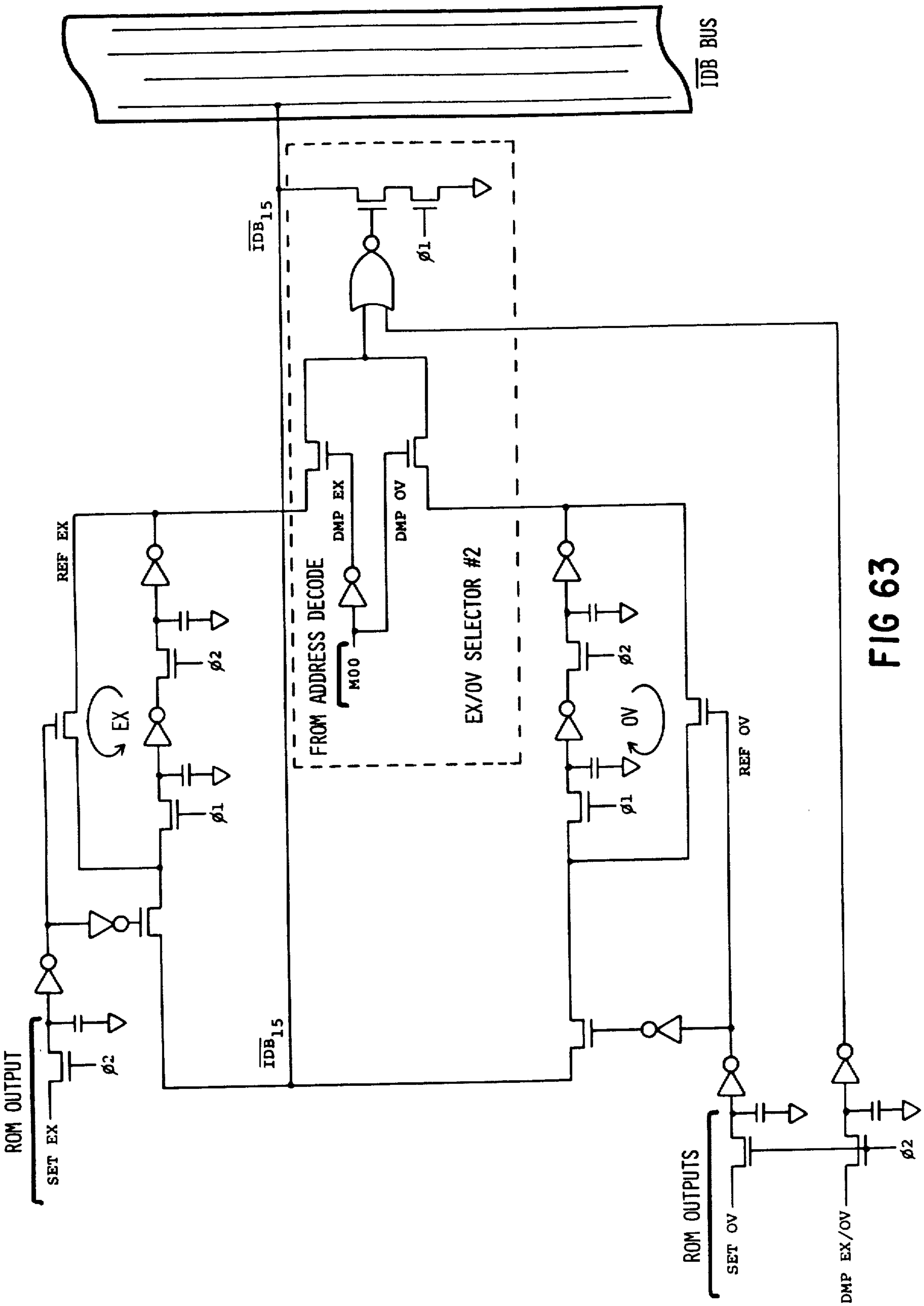
FIG. 63 is a detailed schematic diagram of the EX, OV, and EX/OV selector #2 blocks of FIG. 60.
Figure 64:
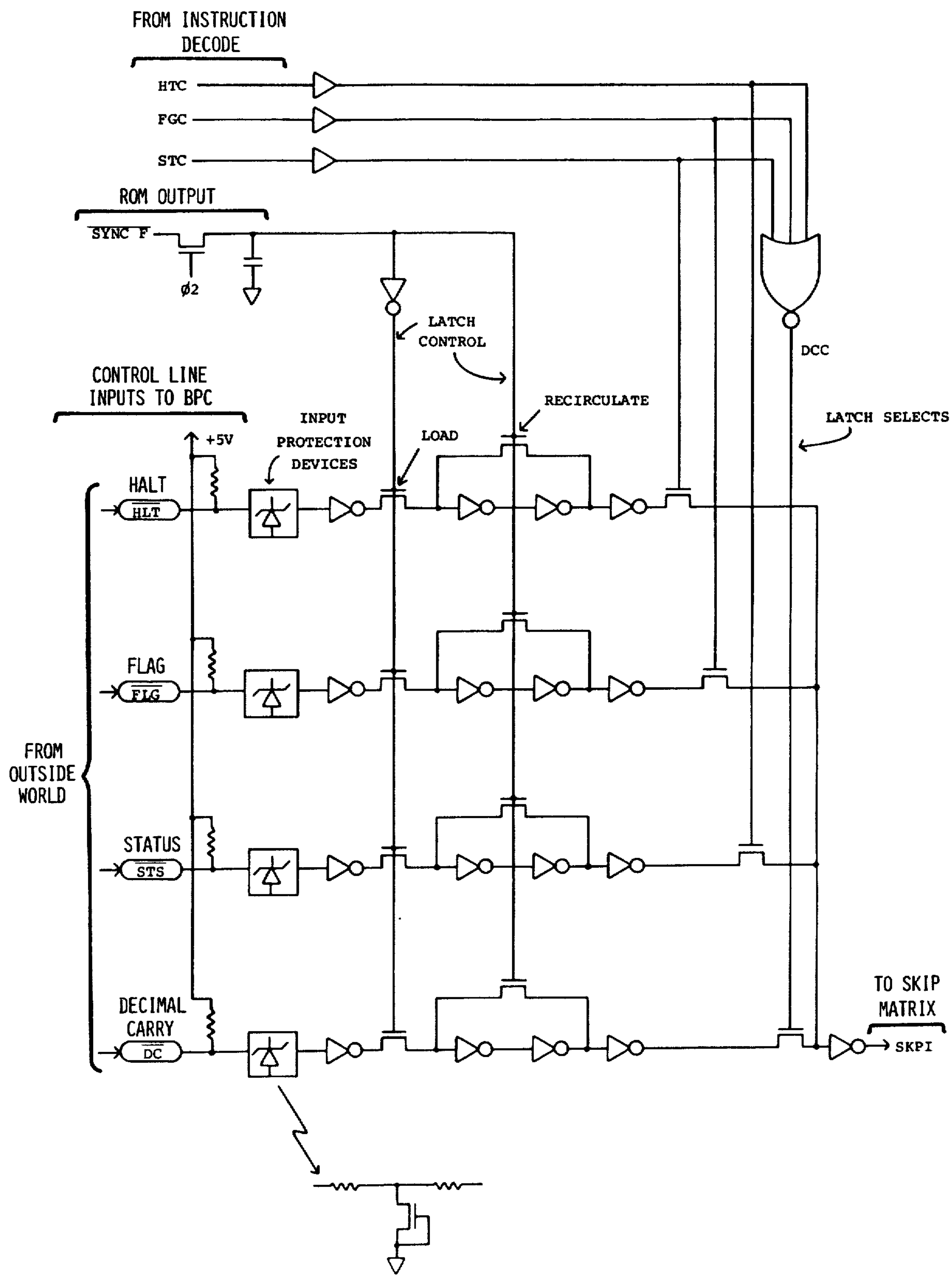
FIG. 64 is a detailed schematic diagram of the flag multiplexor of FIG. 25A–B.
Figure 65:
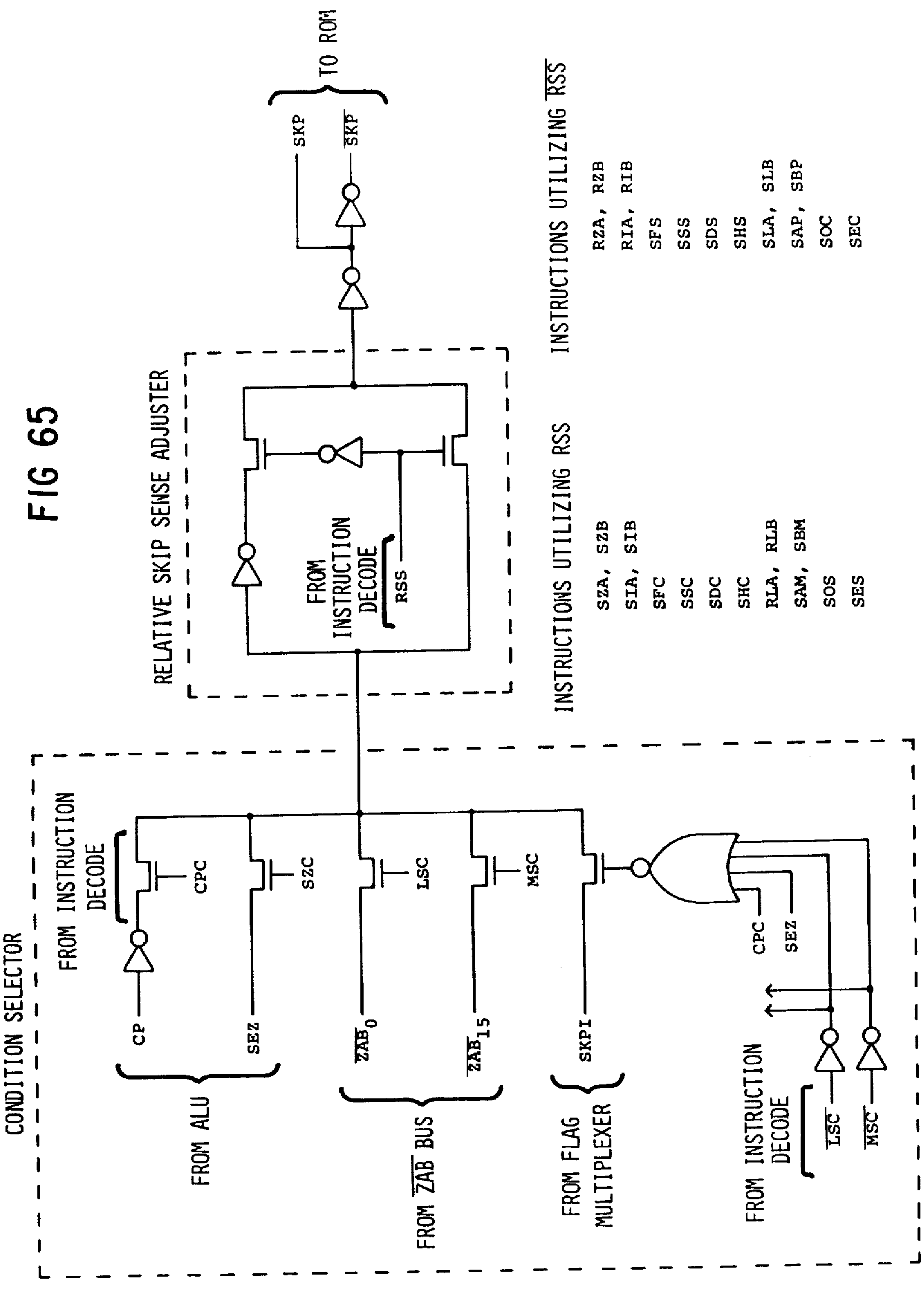
FIG. 65 is a detailed schematic diagram of the skip matrix of FIGS. 25A–B.
Figure 66:
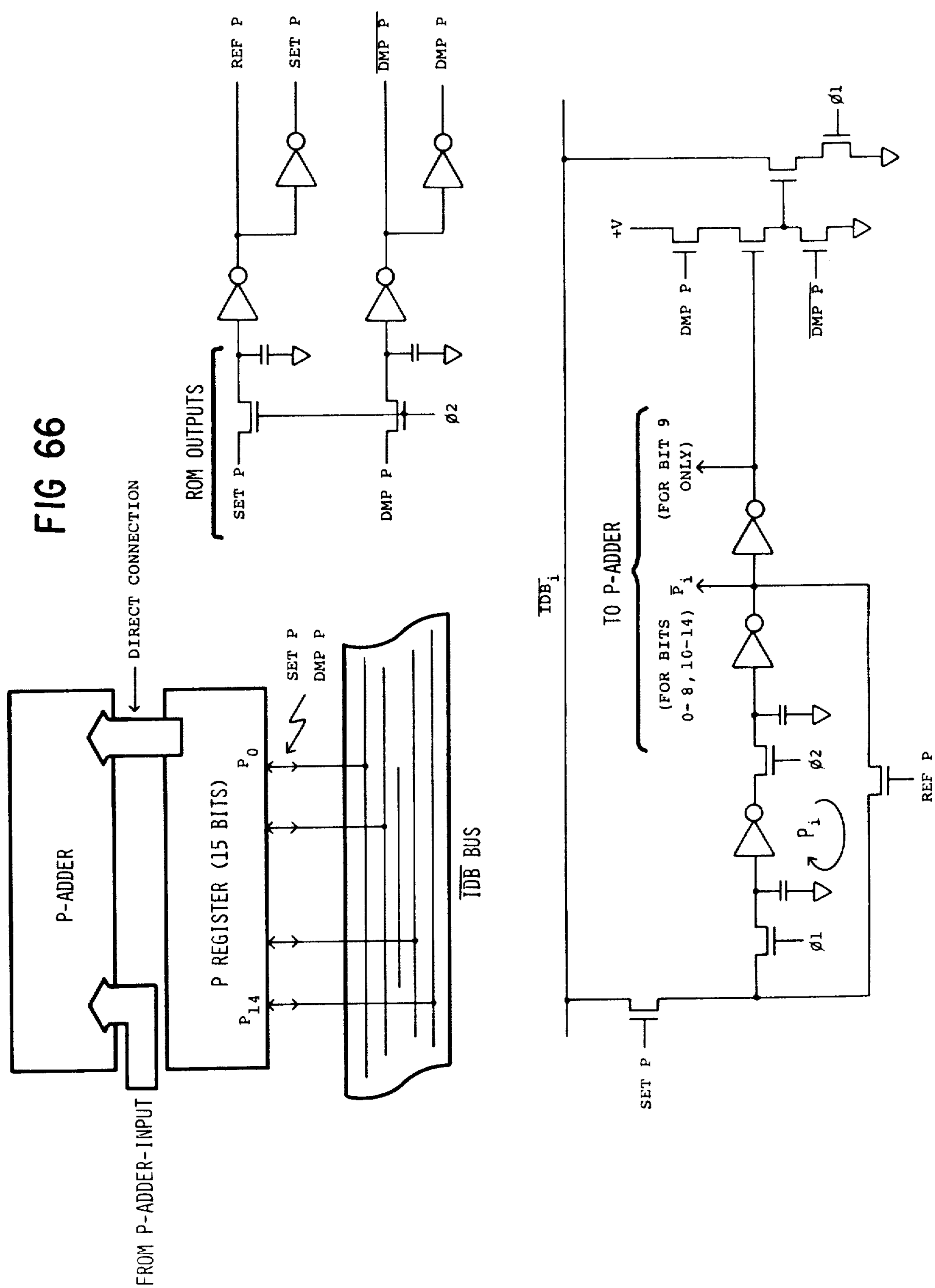
FIG. 66 is a detailed schematic diagram of the P register of FIGS. 25A–B.
Figure 67:
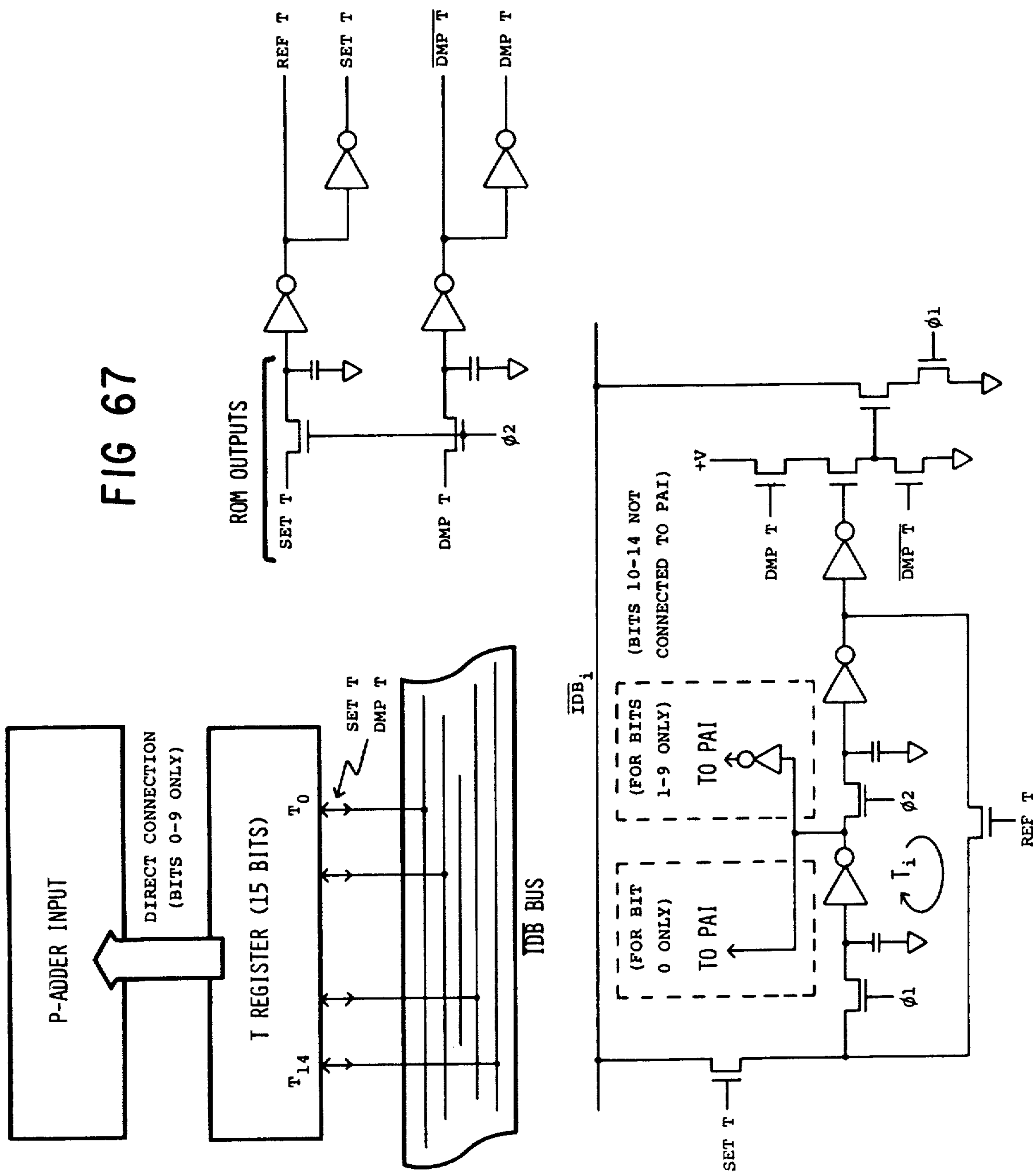
FIG. 67 is a detailed schematic diagram of the T register of FIGS. 25A–B.
Figure 68:
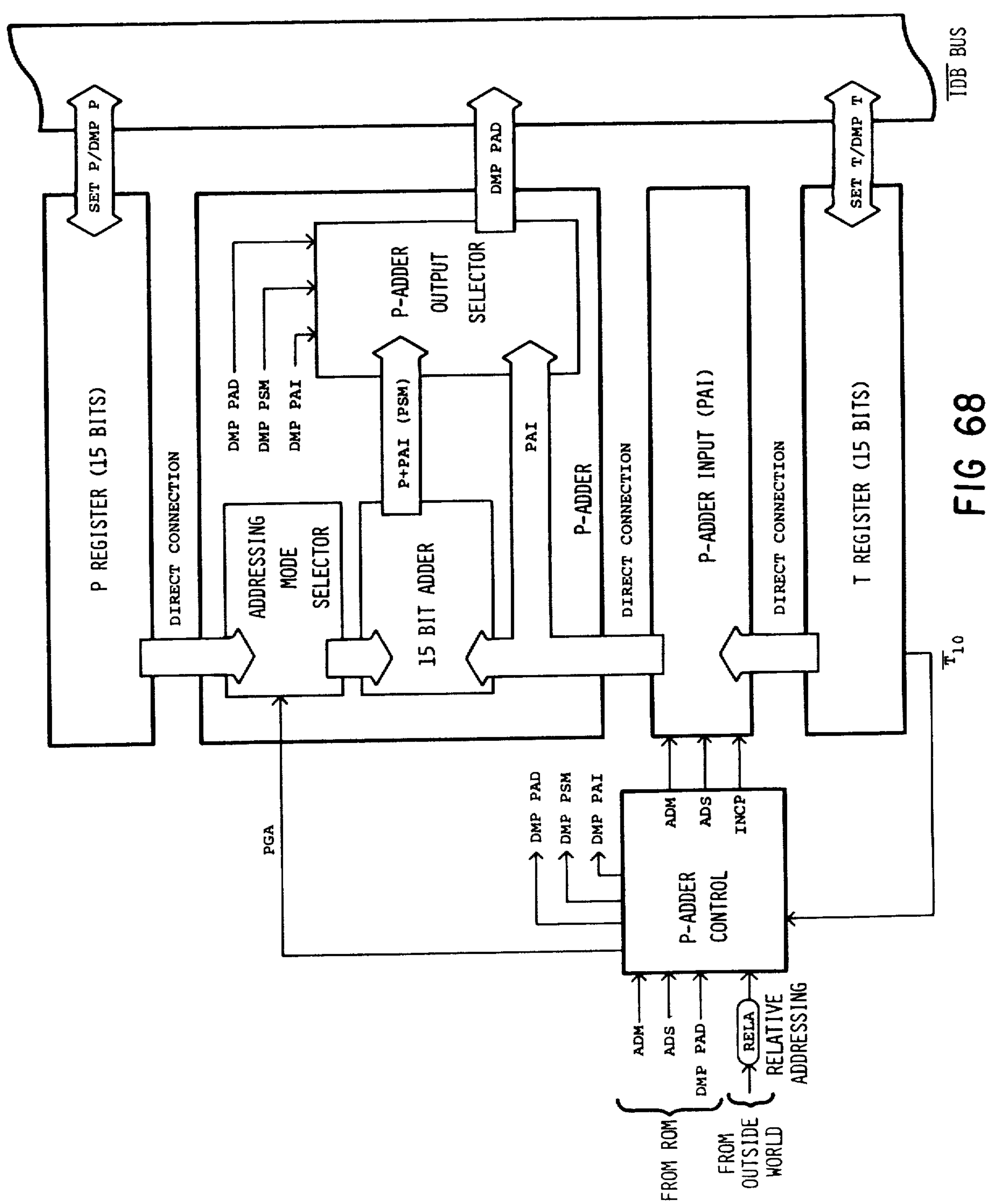
FIG. 68 is a detailed block diagram of a portion of the overall block diagram of FIGS. 25A–B that comprises a program adder section.
Figure 69:
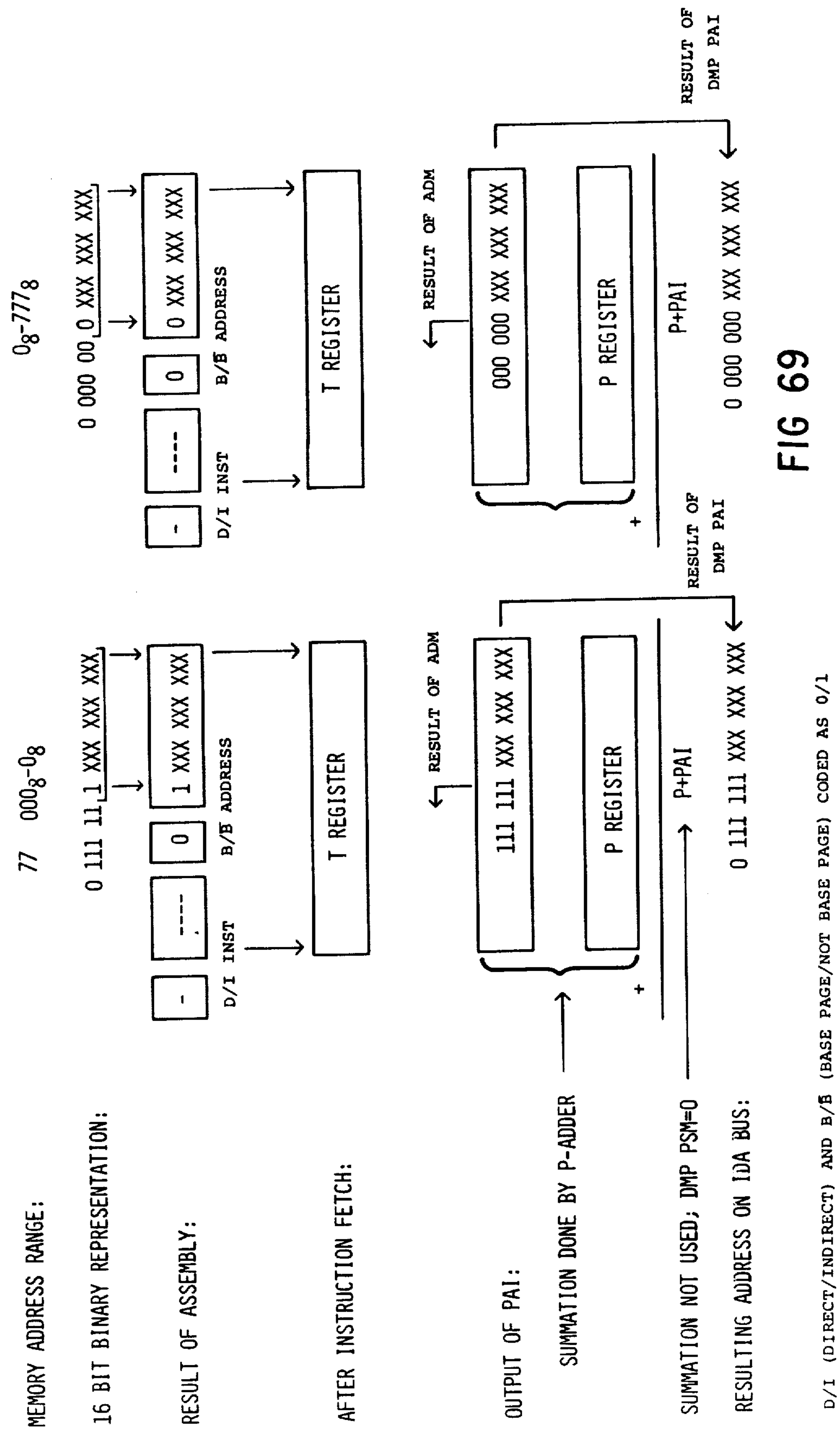
FIG. 69 is a diagram illustrating how the program adder section of FIG. 68 generates a 15-bit base page address from the 10-bit field of a memory reference instruction.

A read of R5 (R5) causes the cassette status data, held stable by latch U16 of FIG. 149B, to be sent to the microprocessor. The data assigned to each bit is shown in the figure. A read of R4 (R4SB) causes the data decoded from the magnetic tape (RDT) to be sent to the microprocessor (gate U12F) and clears the flag flip-flop U13B shown in FIG. 49C. The flag flip-flop is used to indicate the presence of either servo tach information (output of flip-flop U15B) or the presence of read data (RWF) from the magnetic tape as selected by the command bit 3 (TAC) of the command latch U1. Similarly, the I/O status (STS) signal is used to indicate either the presence of a gap on the magnetic tape (when in the normal mode as indicated by serach/normal bit of the command latch U1) or the fact that the search operation has ended when in the search mode. The search operation is terminated (indicated by gate U6A) by either having a servo-fail signal (flip-flop U7B) or a cartridge out signal (flip-flop U7A) or a beginning/end of tape encounter (flip-flop U15A) or a normal completion caused by an I/O write operation to R6 setting the search complete flip-flop U9A. Conversely, if none of the four conditions have occurred and the run command (command bit 7) is true, the GO signal is generated via gate U5B which informs the servo section that the motor is to run.

The cassette control servo section is shown in the detailed schematic diagram of FIGS. 151A-C. The servo system is designed to provide tape speeds of +/−22 ips and +/−90 ips at +/−5%. The transition between these speeds is at a constant acceleration of +/−1200 in/sec/sec which corresponds to approximately 18 ms to accelerate from 0 to 22 ips. In addition to speed control, the servo section provides the tape moving (MVG), tachometer pulses (TAC), and servo-fail detect (SFD) signals as status information for the microprocessor. The input signals from the I/O interface section are the GO signal which indicates that tape movement is to occur, the Fast (FST) signal which indicates the higher speed is desired, and the REVerse signal which indicates the direction of tape movement.

Referring to FIG. 151A, the reference generator composed of the input circuitry associated with U25A converts the digital input signals GO, FST, and REV to analog voltages for input to the controlled-slew-rate amplifier composed of U25A and U25B. The slew rate is a function of the voltage of the zeners diodes CR7 and CR8, resistor R49, and capacitor C29. The slew rate is approximately 100 v/sec. The steady-state voltage gain of the amplifier is either +1.5 or −1.5 as determined by the digital input REV signal. The steady state output voltage is 0, +/−2, or +/−7 volts depending, respectively, on whether GO is logically false, GO is true and FST is false, or GO is true and FST is true. The output voltage will be referred to as the "forcing function (Vff)". It is applied via R79 to the summing junction of the servo loop which is at the inverting input of U28B. The forcing function is also applied to the dead-band detector circuit.

The dead-band detector circuit is composed of the two voltage comparators U21C and U21D and associated components. Since these comparators operate from 0 to 5 volts, the forcing function is first level-shifted to provide compatibility with the comparators. If the shifted level is above the reference of U21D, the moving reverse (MRV) signal is generated. If the shifted level is below the reference level of U21C, the moving forward (MFD) signal is generated. If either the MRV or MFD signals are generated, the moving (MVG) signal is also generated. This signal indicates that the forcing function is indicating a motor speed of greater than 2 ips. The moving signal is used to light the run LED on the transport assembly which indicates to the user that the motor is operating and is sent to the status latch in the I/O interface section for use by the microprocessor. Also, the absence of the moving signal is used to turn off the drive to the motor to prevent the motor from creeping due to small offset voltages in the system.

The feedback voltage Vfb from the tachometer associated with the motor is also applied via R78 to the servo loop summing junction, as shown in FIG. 151B. The feedback voltage is proportional to the angular velocity of the motor and is generated by an optical tachometer, as shown in FIG. 151C. The optical tachometer consists of a light source, a 1000 line disk and a phototransistor. A signal (23 KHz @22 ips) is amplified by the op-amp U3 and applied to the bidirectional one-shop (Signetics device 8T20 or equivalent shown in FIG. 151B) which generates 2 us pulses. These pulses occur on both polarities of the waveform such that the repetition rate of the output pulses is twice the input frequency (46 KHz @22 ips). The pulses are applied to a second-order low pass filter, composed of L2 and C42, which has a bandpass of 2.25 KHz. The output of the filter is a positive DC voltage which is proportional to the angular velocity of the motor. (The ripple of the DC voltage does not have an adverse effect upon the motor speed since its frequency components are much higher than the bandwidth of the system.) The output of the filter is amplified by U28A with a gain of either +3 or −3 in a circuit configuration similar to the configuration used to generate the forcing function. The polarity of the gain in this case is determined by the MRV (moving reverse) and MFD (moving forward) signals generated by the dead-band detector circuit.

The feedback from the summing junction op-amp U28B is also applied to the summing junction. The feedback provides most of the open loop gain and introduces a zero at 5 Hz that matches the mechanical pole of the motor. The closed loop gain of Vfb/Vff is 0.6 with a bandwidth of approximately 200 Hz. The motor driver amplifier, composed of transistors Q3, Q4, Q9, and Q10 and associated components (shown in FIG. 151C), provides a voltage gain of 2.46 as determined by the feedback resistors R62 and R61. As mentioned earlier, the moving (MVG) signal from the dead-band detect circuit is used to disable the drivers if the moving signal is logically false to prevent the motor from creeping due to small offset voltages in the system as well as to insure stability during the zero speed crossover region. Also, the INIT signal is used to disable the drivers to prevent spurious movement of the tape during calculator turn-on and turn-off. The maximum average powr dissipated from either darlington driver is 13 watts. This assumes a worse case duty cycle of 80% and a maximum average supply voltage of 23 volts.

The servo-fail detect circuit, composed of U21 and associated components, senses both the voltage to and current through the motor. Both the voltage and current sense inputs are filtered such that an overload condition is not detected during acceleration. The output of the circuit sets the servo-fail flip-flop in the I/O interface section which in turn causes the GO input signal to be removed thereby protecting the motor from overload.

The write electronics section of the cassette control block of FIG. 4 is shown in the detailed schematic diagram of FIG. 152. The inputs to the section come from the I/O interface section and are the bit to be encoded (BSD), the write command (WRT), the track to written on (TRKB), and the mode command (MOD). Outputs from the section are the flux transitions on the magnetic tape, and the read/write flag (RWF) to I/O interface flag flip-flop which indicates that another bit of data may be sent.

The encoder portion of the write electronics section is composed of flip-flops U30A and U30B, astable multivibrator U29, and one-shot U31B with associated gates. The section is initialized whenever the WRT signal is flase. Both the data bit flip-flop U30A and the write data flip-flop U30B are preset by the WRT signal. Also, via gate U35C and open-collecter inverter U34D, the WRT signal discharges the timing capacitor C50 associated with the astable multivibrator U29. The one-shot U31B is shared between the encoder and the decoder. Its other input (input A) is forced to the enable state during write operations by the WRT signal. When the WRT signal becomes true and the MOD signal is false, the output of the astable multivibrator is allowed to oscillate. The period of the first oscillation of the multivibrator is determined by C50, R87, and R88. When the first oscillation is complete, the one-shop U31B will be triggered which signals the end of a data bit time. The output of the one-shot causes a flux transition on the magnetic tape by toggling the write data flip-flop U30B, loads the next data bit on the BSD line into data bit flip-flop U30A, and sets the I/O interface section flag flip-flop to indicate that another bit may now be sent by the microprocessor. The output of data bit flip-flop U30A determines the time constant of the astable multivibrator by either switching in or switching out resistor R88. The period of the astable is short if the flip-flop contains a zero and long if the flip-flop contains a one.

The output of the write data flip-flop U30B is sent to the magnetic tape read/write circuitry. The read/write head provides for two tracks on the tape; track A and track B. A high-voltage open-collector output BCD-to-decimal decoder U1 (Texas Instruments device SN7445 or equivalent) is used as a one-of-eight decoder to select the track, whether a read or write operation is to occur, and, if a write operation is selected, which direction current flow through the head is to occur. Hence, the decoder inputs are TRB (track B), WRT (write), and WDT (write data). The TRB signal determines the track by enabling outputs 4, 5, 6, and 7 or outputs 0, 1, 2, and 3. The WRT signal selects the "write" outputs 2, 3, 6, and 7 rather than the read outputs 0, 1, 4, and 5. Since the "read" outputs are not enabled, the four FET switches Q1 through Q4 are turned off and the read circuitry is disconnected from the tape head. (The regulated turn off bias for the switches is generated by a voltage doubler circuit located in the servo section.) When the WRT signal goes high, transistor Q5 is turned on which, in turn, turns on the current source composed of Q6 and associated resistors. The direction of current flow through the head from the current source to the decoder output is determined by the write data (WDT) signal input to the decoder. Each time the WDT signal changes levels the direction of the flux on the magnetic tape is reversed due to the current flow through the head changing directions. The Initialize (INIT) signal is logically ORed with the WRT signal (via CR4) to turn off the current source and prevent spurious write currents through the head during calculator turn-on or turn-off.

The read electronics section of the cassette control block of FIG. 4 is shown in the detailed schematic diagram of FIGS. 153A–B. The inputs to the read electronics is the TRB (track B) signal which determines which track is to be read, the WRT (write) signal which disables the write section and enables the read section, the analog signal from the magnetic tape head, and the FST (fast) and MOD (mode) signals which determine the threshold levels associated with the analog head signal. The outputs are the bit serial read data (RDT) to the I/O interface and the read/write flag (RWT) to the I/O interface flag flip-flop.

When information on the tape is being read, the BCD-to-decimal decoder U1 of FIG. 152 selects outputs Ø or 1 or outputs 4 or 5 thereby turning on FET switches Q1 and Q2 or switches Q3 and Q4, respectively. The appropriate tape read head is then connected to the pre-amplifier U2. The preamp provides a nominal gain of −20. Since the output from the read head can vary as much as +/−25%, the gain is adjusted by selecting R5 such that the output of the preamp is 300 mV PP. The bandwidth of the preamp is at least 110 KHz. The read waveform from the magnetic head contains predominate frequencies of 10.6 KHz and 17.6 KHz when the tape speed is at 22 ips for one's and zero's, respectively. A significant amount of information is contained in the 3rd harmonics of these waveforms. The frequency is increased to 72 KHz when the tape speed is at 90 ips. However, at 90 ips, only gap information (the absence of flux transitions) is being searched for and no data is recovered at that speed. The signal from the preamp is applied to the input of an active second-order Butterworth low pass filter composed of U17 and associated components. The filter has a bandwidth of 55 KHz which limits the noise susceptibility but at the same time does not increase the peak shift excessively. The filter has a gain of 6.7 which produces a nominal output of 2 Vpp. The output of the filter is applied to a differentiator (C14 and R5) and a threshold detector composed of U22 and associated components. The differentiator attenuates the signal (10.6 KHz) by a factor of 9, while the following amplifier U18 provides a gain of 9 and a low impedance output. The output of U18 is applied to a dual comparator U19 which detects a zero crossing condition. The two comparators are only enabled during the appropriate +/− threshold to increase the noise immunity. The output from the zero crossing detector is applied to the clock input of a D-type flip-flop U27 while the clear and D inputs are connected to the threshold (THD) signal from the threshold detector. This configuration prevents a glitch (multiple transitions) from occurring on the output of the flip-flop since the only way possible for the output to go high is for the clock input to go high while the THD signal is high. The only way for the output to go low is for the clear and D inputs to go low. The positive-going transition of the output of the flip-flop U27 indicates that a flux transition (FTR) has occurred.

The input to the threshold detector is the amplified and filtered signal from active Butterworth filter. The threshold detector produces an output when the absolute value of the waveform exceeds either 10%, 45% or 30% of the nominal peak signal. The 10% level is used for reading at 22 ips, the 45% level is used for write verification and gap detection, and the 30% level is used for high speed gap search. Which level is selected is determined by the FST and MOD inputs at inverters U20E and U20F, respectively. The two transistors Q1 and Q2 connected in cascade perform the function of filtering the output of the threshold detector and insuring that the THD signal remains high for at least 100 ns thereby preventing noise from causing false outputs on the flux transition (FTR) signal out of flip-flop U27.

The output of the threshold detector (THD) is also used to retrigger one-shots U43A and U43B shown in FIG. 153B. The first one-shot, U43A, has a period of approximately 125 us. If no flux transitions are detected for 125 us, the one-shot expires and sets the latch composed of gates U39A and U39B. The output of the latch (GAP) indicates to the microprocessor, via the I/O status control signal, that a gap condition exists. The output of the latch also inhibits the InterRecord Gap (IRG) one-shot U43B from being retriggered. The period of the interrecord gap one-shot is approximately 2.5 ms. If the latch has not been reset or if a flux transition after the latch is reset has not occurred by 2.5 ms, the one-shot expires and aninterrecord gap condition is declared. The gap one-shot U43A also clears the four-bit binary counter U42. To prevent the possibility of noise in the system erroneously ending the gap condition, the latch is not allowed to reset until four flux transitions have been detected and counted by the binary counter U42. The gap one-shot also clears flip-flop U38A whose output is used to initialize the read decode circuitry. The first twelve flux transitions after a gap occurs always correspond to a digital zero on the magnetic tape. Hence the flip-flop U38A is not set again until twelve flux transitions have been counted by the binary counter U42.

The decoder is required to reliably retrieve information stored in the form of delta distance code from a tape which exhibits speed variations. The input to the decoder is a stream of pulses corresponding to flux transitions detected on the magnetic tape (FTR). The time between the pulses indicates whether the distance between flux transitions was a "long" or a "short" distance. Decoding the time between pulses into ones and zeros could be accomplished on an absolute basis if one were willing to allow the ratio between zero and one to be large enough that a zero would always be less than a specified time and a one would always be greater than a specified time when all possible variations in the system have been accounted for. This approach would reduce the amount of information which could be stored on the tape and is not acceptable. Instead, the decoder eliminates dependence upon the absolute time required for the tape to move a long or short distance by "tracking" the average tape speed. The ratio of the "long" time to the "short" time, not the actual time, is used in decoding the information. The decoder uses the time between previous FTR pulses to develop a reference voltage which is used for decoding. The reference voltage is developed across C59.

To understand how the reference voltage is established, a description of the decoder circuit configuration is first necessary. When the GAP signal occurs, flip-flop U38A is cleared and its output, the decoder initializing signal, clears the read data flip-flop U38B and turns on FET switch U33A to short out resistor R111. The reference capacitor C59 is driven by U36 which is part of the sample and hold circuit formed by FET switches U33B and U33D and sample and hold capacitor C58. The input to the sample and hold circuit comes from the ramp generator circuit formed by U32 and associated components. Notice that the output of the ramp generator can be applied directly to the sample and hold capacitor C58 via FET switch U33D but is first attenuated by the resistor divider R108 and R107 before it can be applied to the sample and hold capacitor via FET switch U33B. Notice, further, that the read data output (RDT) of the read data flip-flop U38B enables the attenuated signal FET switch U33B to update the sample and hold capacitor when RDT is a one or, similarly, enables the direct signal FET switch U33D when RDT is a zero. The ramp generator (U32) output, which is the signal sampled, is reset to zero by switch U33C whenever one-shot U31B is triggered.

When the end of a gap occurs, the following initializing action is generated. The positive-going edge of the first flux transition pulse (FTR) triggers the one-shot U31A which has a pulse width of approximately one microsecond. The one-shot pulse and the fact that the read data flip-flop U38B is being held clear by the decoder initializing signal U38A causes FET switch U33D to turn on and charge the sample and hold capacitor C58 to the voltage of the ramp generator output. In turn, the reference capacitor C59 will also be charged to the voltage of the sample and hold capacitor via U36 since the FET switch U33A is turned on by the decoder initializing signal. For the first flux transition, the ramp generator will be at its maximum valve due to the long time of the gap signal. On the trailing edge of the one-shot U31A pulse, the second one-shot U31B is triggered and generates a four microsecond pulse which turns on FET switch U33C and resets the ramp generator. After the pulse terminates, the output of the ramp generator proceeds to become a ramp. The next flux transition occurs after a "short" time (twelve "short" times always follow a gap) and again the sample and hold capacitor is updated with the voltage of the ramp generator. This time the voltage of the ramp generator correctly corresponds to the "short" time or a digital zero on the magnetic tape. After twelve flux transitions the reference capacitor C59 has been initialized and the decoder initializing signal is terminated.

The time between the flux transitions now varies according to whether digital ones or zeros ("longs" or "shorts") are recorded on the magnetic tape. When a flux transition occurs, one-shot U31A is triggered and its output clocks the read data flip-flop U38B. The read data flip-flop is updated with the results of the comparison of the reference voltage to the attenuated output of the ramp generator by comparator U37. The output of the ramp generator is attenuated by R105 and R106 to produce a "short" voltage less than the reference voltage and a "long" voltage greater than the reference voltage. The read data output is used to select which FET switch, U33B for a "long" or U33D for a "short", updates the sample and hold capacitor C58. The ramp generator output is attenuated for the "long" time to produce the same sample and hold voltage as for the "short" time. The reference capacitor C59 voltage is allowed to track only the low frequency changes caused by tape speed variations since resistor R111 and capacitor C59 now filter the short term changes in the voltage of the sample and hold capacitor. The read data output is sent to the I/O interface section to become the bit serial data to the microprocessor. Each time that one-shot U31B resets the ramp generator, it also generates the read/write flag which sets the I/O interface flag flip-flop to indicate to the microprocessor that the bit serial data is ready.

POWER SUPPLIES

The power supplies in the calculator consist of five regulated supplies, +12, +7, +5, −5, and −12 volts, and two unregulated supplies, +/−20 volts. These power supplies may be understood with reference to the block diagram of FIG. 4 and the detailed schematic diagrams of FIGS. 154A–C.

For the +12 volt supply of FIG. 154C, a reference voltage appears a pin 4 of U3 when a voltage of 10 to 40 volts is applied between pins 8 and 5. The reference voltage is also applied to the non-inverting input of the amplifier in U3. The output voltage from the supply is sensed by R9, R10, and R11 and applied to the inverting input of the amplifier in U3. Capacitor C11 is used to limit the frequency response of the U3 amplifier. The output of the U3 amplifier is further amplified by Q4. The outut current of the supply is dropped across R13 and sensed by pins 10 and 1 of U3 to limit the output current to approximately 2.75 amps.

For the +7 volt supply, device U1 (National device LM309 or equivalent) is used. The device is designed to provide +5 volts between pins 3 and 2 when a voltage of +7 to +35 is applied between pins 1 and 2. By using a resistor divider R5 and R6, the terminal normally connected to ground is connected to a point which is at 2 volts, thus giving an output of +7 volts from the device. Resistor R8 is used to limit the power dissipation in U1.

The five volt supply of FIG. 154B is a switching regulator. The non-inverting input (pin 1) of the amplifier is U4 is connected via R15 to a +5 reference voltage developed from the +12 volt supply by resistors R14 and R16. The inverting input (pin 2) to the amplifier is connected to the supply ouptut at L2. If the supply output voltage, as sensed at the inverting input of U4, falls below the reference voltage on the non-inverting input, the output of U4, amplified by Q6 and Q3, applies +20 volts to inductor L2. The tap on inductor L2 via R22 allows both Q3 and Q6 to saturate thereby increasing efficiency. When Q3 turns on, the reference voltage to the non-inverting input of U3 is raised by approximately 50 millivolts by resistor divider R17 and R15. When the output voltage at the inverting input of the U4 amplifier reaches the reference voltage at the non-inverting input, the amplifier turns off Q6 and Q3. Turning off Q3 causes the reference voltage on the non-inverting input of the amplifier to drop by about 20 millivolts. This hysterisis voltage introduces about 70 millivolts of ripple on the +5 volt supply which is filtered out by L1, C4, and C15. The current used to turn on Q6 and Q3 is limited by sensing the voltage across R19. If the +5 volt supply is suddenly pulled more than a diode and an emitter-base voltage drop below the reference voltage, transistor Q5 turns on and shuts off the drive transistor in U4. As long as there is any current flow out of the +5 volt supply, Q5 remains on and keeps the +5 volt supply shut down.

The −12 volt supply is developed by device U2 (National LM 320-12 or equivalent) in a manner similar to the +7 volt supply. The −5 volt supply is a zener regulated supply consisting of resistor R7 and zener CR8.

CALCULATOR FIRMWARE

Operation of the calculator firmware may be understood with reference to FIGS. 5–15, the calculator firmware listing of routines and subroutines stored within the calculator read-only memory, and the flow charts of these routines and subroutines illustrated in FIGS. 155–182B.

Figure 5:
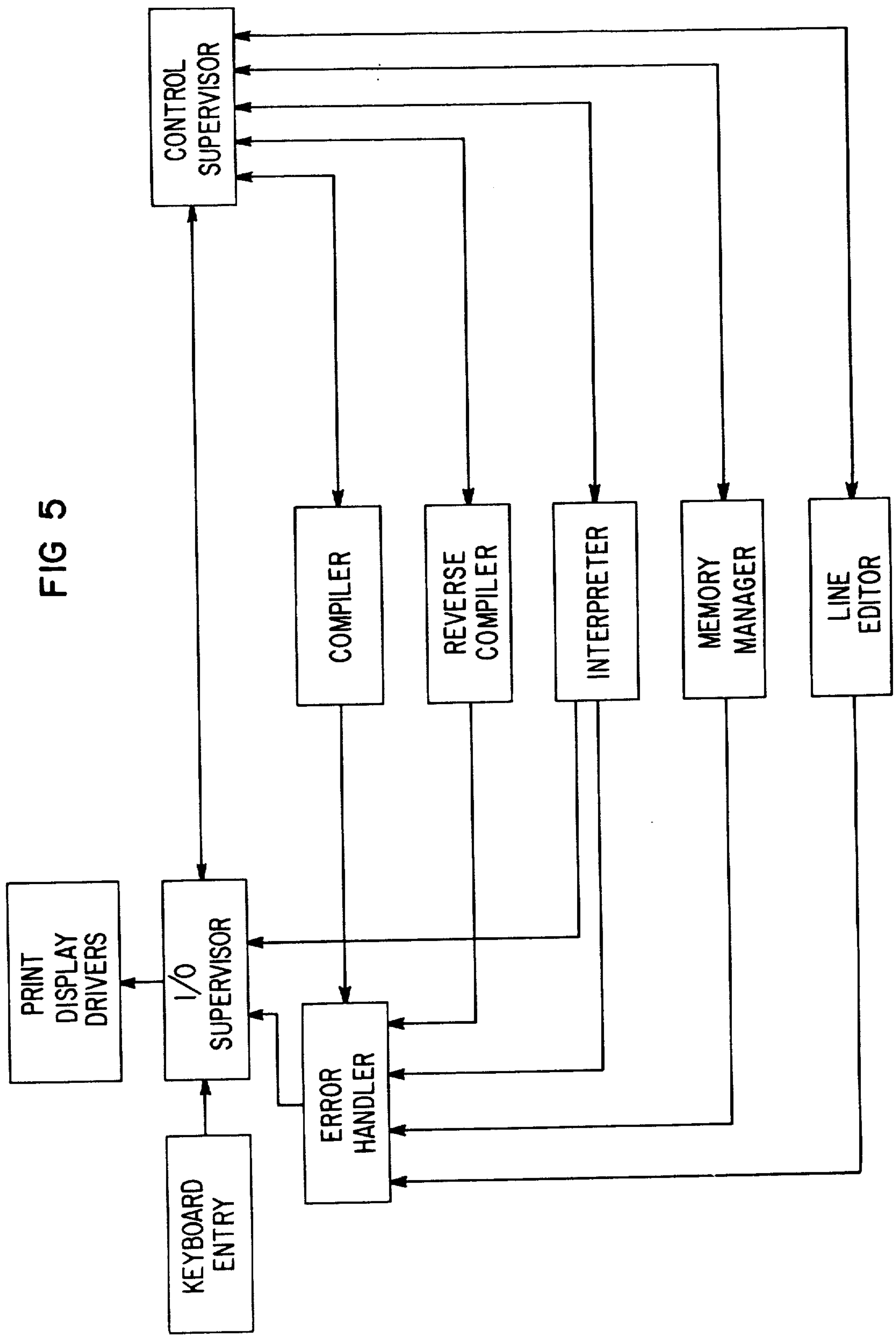
FIG. 5 is a simplified block diagram of the firmware associated with the calculator of FIG. 1.

Referring to FIG. 5, there is shown an overall block diagram of the portion of the calculator firmware residing in the mainframe language ROM 210 of FIG. 4. The address structure of the mainframe language ROM is depicted in FIG. 6 in relation to the remainder of the calculator memory. The location of each of the firmware components of FIG. 5 within the twelve individual ROM chips comprising the mainframe language ROM is shown in FIG. 7. The remaining portion of the calculator firmware resides in the various plug-in ROMs 230 of FIG. 4 that may be employed by the user for increasing the functional capability of the calculator.

A detailed listing of the routines and subroutines of instructions stored in the mainframe language ROM together with a listing of the routines and subroutines that may be stored in a general I/O plug-in ROM are provided hereinafter. In addition, as a preface to the listing of the routines and subroutines stored in read-only memory, a listing of the base page read-write memory is given. This listing of the base page read-write memory may be understood with reference to the memory map of FIG. 15. It will be seen that the base page portion of the read-write memory is employed for storing several words of information used by the calculator firmware. Included are all the working registers of the calculator, scratch pad locations used by the floating point math routines, locations for storing information regarding the current status of the magnetic tape cassette unit, and locations for storing information regarding the current position of the visual cursor associated with the output display unit.

A detailed listing of routines and subroutines of instructions was submitted as part of the specification but has not been printed.

Figure 3:
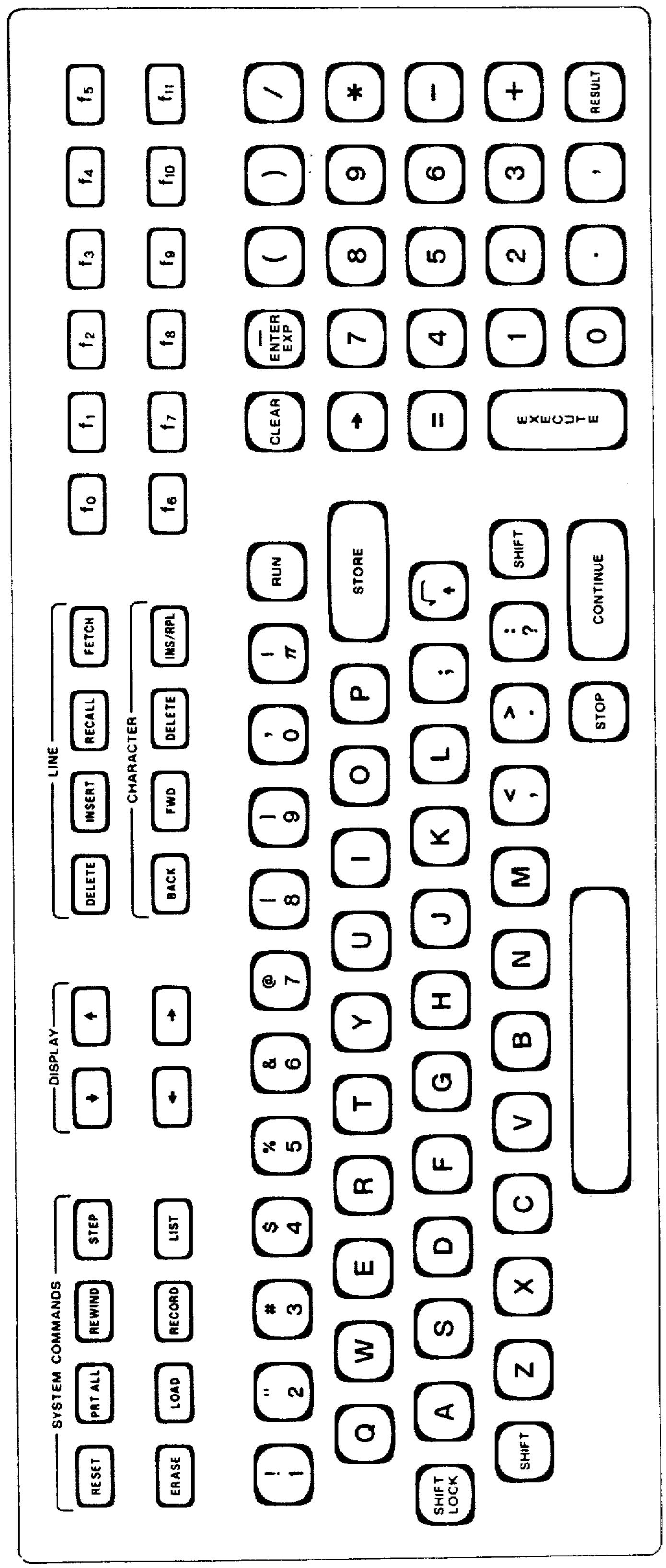
FIG. 3 is a plan view of the keyboard input unit employed in the programmable calculator of FIG. 1.

Referring to FIG. 3, there is shown a calculator keyboard. The standard Alphanumeric keys having upper and lower cases are used to enter numbers, commands, and statements. The rest of the keyboard is divided into System Command keys, Display Control keys, Line and Character editing keys, Special function keys having upper and lower case functions and Calculator Control keys.

SYSTEM COMMAND KEYS

Referring to the upper left portion of FIG. 3, the System Command keys are shown. A RESET key returns the calculator and I/O cards to the power-on state without erasing programs or variables. RESET is executed automatically when it is pressed. All calculator activity is aborted and the line number of the current location in a program is displayed if a program is running. The RESET key is used to reset the calculator when no other key will bring the calculator to a ready state. Referring to FIG. 155, a flow chart illustrating the RESET subroutine is shown.

A print all key labelled PRT ALL, sets a print all mode on or off. When it is pressed once, the word "on" appears in the display. When it is pressed again, the word "off" appears in the display. In print all mode, executed lines and stored lines are printed. Displayed results are also printed. While a program is running in print all mode, all displayed messages and error messages are printed.

A REWIND key rewinds the tape cartridge to its beginning. Other statements and commands can be executed immediately without waiting for a cassette to completely rewind. If REWIND is pressed while a program is running or while a line is executing from the keyboard, the cartridge rewinds at the end of the current line.

A STEP key is used for stepping through a program, one line at a time. Each time it is pressed, another program line is executed. The line number of the next line to be executed is displayed. The first time STEP is pressed after running a program, the line number of the line to be executed is displayed. The next time STEP is pressed, that line is executed.

An ERASE key is used to erase all or part of the read/write memory, for example:

| | |
|---|---|
| ERASE A EXECUTE | Erases the entire calculator memory. |
| ERASE V EXECUTE | Erases the variables only. |
| ERASE K EXECUTE | Erases all the special function keys. |
| ERASE EXECUTE | Erases the program and variables. |
| ERASE fn | Erases the special function key represented by "n." |

A LOAD key is used to load programs and data from the tape cartridge. For example:

| | |
|---|---|
| LOAD 3 EXECUTE | Loads the program from file 3 into the calculator. |

The display shows ldf (for "load file") when this key is pressed.

A RECORD key is used to record programs and data on the tape cartridge. Before recording on the tape cartridge, files must be marked. Assuming, for example that the files have been marked, a user actuates the sequence

| | |
|---|---|
| RECORD 6 EXECUTE | To record the calculator program on file 6 of the tape cartridge. |

A LIST key is used to list programs, sections of programs, all special function keys, or individual special function keys. For example:

| | |
|---|---|
| LIST EXECUTE | Lists the entire program. |
| LIST K EXECUTE | Lists all defined special function keys in numerical order. |
| LIST $f_4$ | Lists special function key, "$f_4$." |
| LIST 9 , 1 3 EXECUTE | Lists the program from line 9 to 13, inclusive. |

A flow chart illustrating the LIST subroutine is shown in FIGS. 156A-B.

DISPLAY CONTROL KEYS

Referring to the top central portion of FIGS. 156A-B, the Display Control keys are shown. An Up Arrow key ↑ moves the line with the next lower-valued line number into the display. If a stop is executed from a program, or if a line number is in the display, Up Arrow brings that line into the display. After a program error, the Up Arrow key ↑ brings the line containing the error into the display for editing. This key is used in live keyboard mode, explained in greater detail hereinafter, to display the line being typed-in for about one second. By holding Up Arrow down, the display remains.

A Down Arrow key ↓ moves the line with the next higher-valued line number into the display. If there are no more lines in the program, Down Arrow clears the display and allows new program lines to be appended to the end of the program. This key is also used to display the line being typed-in for about one second in live keyboard mode. By holding Down Arrow down, the display remains.

A Left Arrow key ← moves the line in the display to the left. A Right Arrow key → moves the line to the right. These allow all the characters in a line to be displayed. Each time one is pressed, the displayed line moves a quarter of the display size, 8 characters for a 32-character display, for example. If a cursor is in the display, it remains in the same place when the Left Arrow key is pressed.

EDITING KEYS

Referring to the top central portion of FIG. 3, the Editing keys are shown. There are two types of editing keys; Line Editing keys and Character Editing keys.

Line Editing Keys

A FETCH key is used to bring program lines into the display and to fetch special functions keys. For example:

| | |
|---|---|
| FETCH 2 0 EXECUTE | Brings line 20 into the display. |
| FETCH $f_4$ | Accesses special function key $f_4$. If $f_4$ is defined, its definition is displayed. Otherwise, "$f_4$" is displayed. |

A line DELETE key is used to delete the program line in the display from the read/write memory. If no program line is in the display, the calculator beeps and the DELETE key is ignored. To delete a program line, a user fetches the line into the display and presses DELETE. When a line is deleted from a program, the address of all relative and absolute go to and go sub statements are renumbered to reflect the deletion.

The INSERT line key is used to insert a new line in front of a fetched line. The fetch command, the Up Arrow, or Down Arrow keys are used to fetch a line into the display. For example:

| | |
|---|---|
| Press: FETCH 2 0 EXECUTE | Brings line 20 into the display. |
| Type-in: prt "A+", 35 | |
| Press: INSERT | This inserts the typed-in line in place of old line 20. All higher numbered lines and old line 20 are incremented by one. |

When a line is inserted into a program, the branching addressing of all relative and absolute go to and go sub statements are renumbered to reflect the insertion. The line number assigned to the new line is the same line number used in the fetch command.

A RECALL key is used to bring back into the display, one of the two previous keyboard entries. Recall can be used in live keyboard mode, and in an enter (ent) statement. Recall also can be used after errors resulting from a keyboard operation to recall the line containing the error. For many errors, a flashing cursor indicates the location of the error in the line.

Referring to FIG. 157 a flow chart illustrating the positioning of the flashing cursor at the location of a syntax error is shown. When the user enters a line to be stored or executed, the line is read from left to right. If an error is detected, the reading process is stopped at the location of the error.

There are cases where the pointer used by the reading process is pointing to a blank space. In this event, an attempt is made to move the error cursor to some non-blank character. First the cursor is moved to the right until a non-blank character or the end of the line is found. If the end of the line is found, the cursor is moved back to the left until a non-blank character is found.

Referring to FIG. 158A, double buffering allows the user to observe the last two lines that were stored or executed from the keyboard. These lines are stored in a two level stack and are brought into the display by the RECALL key. Pressing the RECALL key recalls the most recent keyboard line, and a consecutive RECALL brings the previous keyboard line into the display. Additional RECALL's cause the two keyboard lines to be displayed alternately.

Referring to FIG. 158B, there is shown a diagram of the buffering scheme employed. As characters are typed, they are entered into the I/O buffer and displayed. When the line is executed, the KBD buffer is transferred to the REB buffer and the I/O buffer is transferred to the KBD buffer. The result of the executed line is placed in the I/O buffer and displayed.

When the RECALL key is pressed, the KBD buffer is transferred to the I/O buffer and displayed. Consecutive pressings of the RECALL key causes the KBD and KEB buffers to be swapped, and the new contents of the KBD buffer to be transferred to the I/O buffer and displayed.

Referring to FIG. 158B, consecutive pressings of the EXECUTE, STORE or INSERT line keys cause the line in the KBD buffer to be re-executed or stored, but the buffers are not transferred. Also, if one of these keys are pressed after a line has been recalled, the contents of the KBD buffer are executed or stored, and the buffers are again not transferred. The buffering scheme thereby stacks the last two different lines that were executed or stored.

The Character Editing Keys

Lines which are fetched into the display using the ↑ Up Arrow, ↓ Down Arrow, RECALL or FETCH command, and lines which are typed into the display can be edited using the character editing keys. Two flashing cursors are associated with these keys: the replace cursor and the insert cursor.

A BACK key moves the flashing replace cursor or the flashing insert cursor from its current position in the line in the display toward the beginning (left) of the line. If the cursor is not visible, BACK causes the cursor to appear on the right-most character in the line.

A forward key labelled FWD moves the flashing replace cursor or the flashing insert cursor from its current position in the line in the display, towards the last character in the line. For a line which has just been fetched into the display, pressing FWD causes the flashing cursor to appear on the left-most character in the display.

A character delete key, labelled DELETE, is used to delete individual characters which are under the insert or replace cursor. This is not the same key as the line delete key explained previously.

An insert/replace key labeled INS/RPL is used to change the flashing replace cursor to a flashing insert cursor and vice versa. When the insert cursor is flashing, any characters entered from the keyboard are inserted to the left of the cursor.

When the replace cursor is flashing, any character entered replaces the existing display character at the location of the cursor.

Referring to FIGS. 195A–L, a detailed flow chart illustrating the line editing subroutines is shown. The user can type and edit 80-character lines from the keyboard as described hereinbefore. As the keys are typed, they are placed in the I/O buffer at a position indicated by the I/O buffer pointer. This buffer is displayed after each keystroke, so that the new characters can be seen.

Figure 159A:
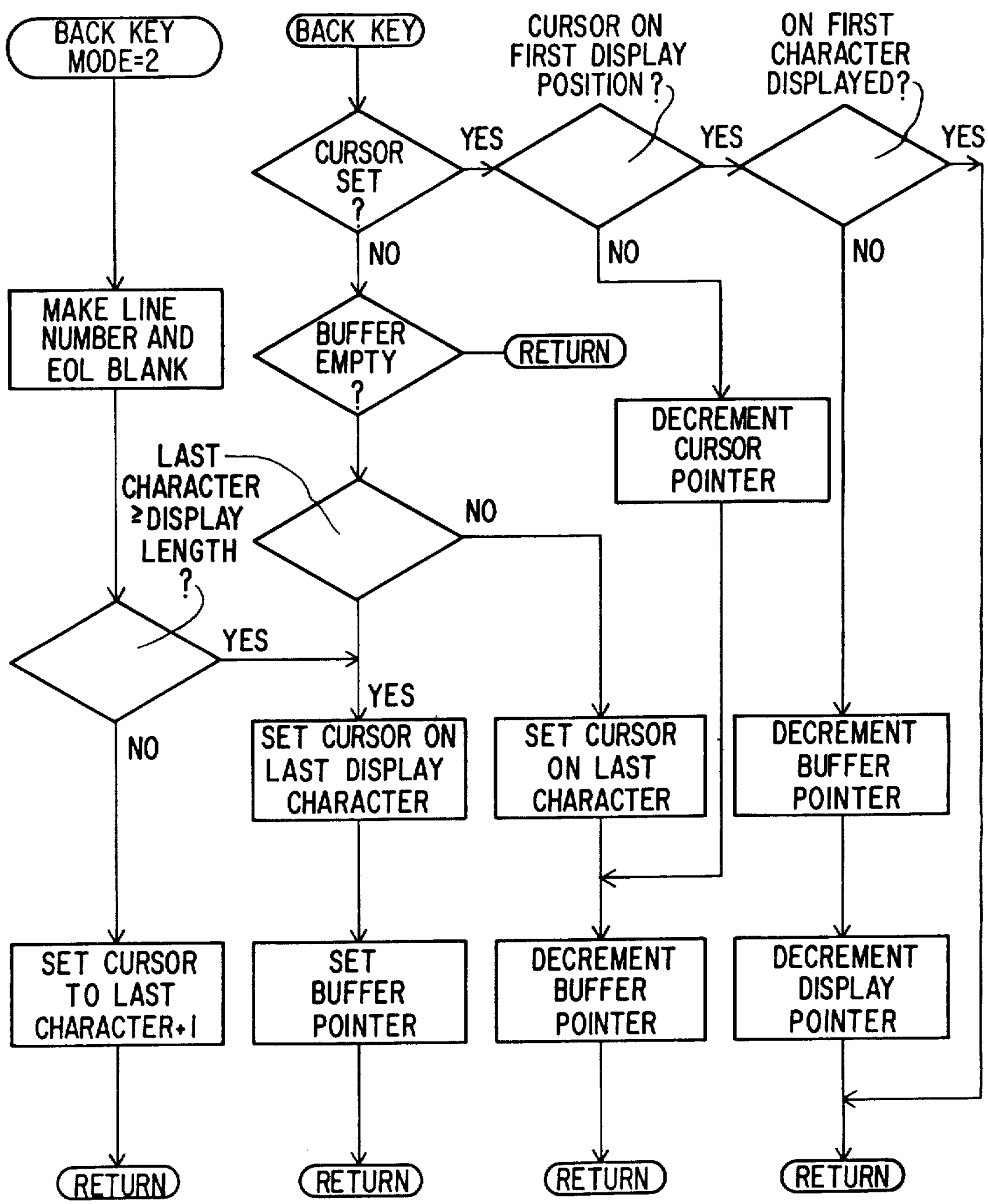
Figure 159B:
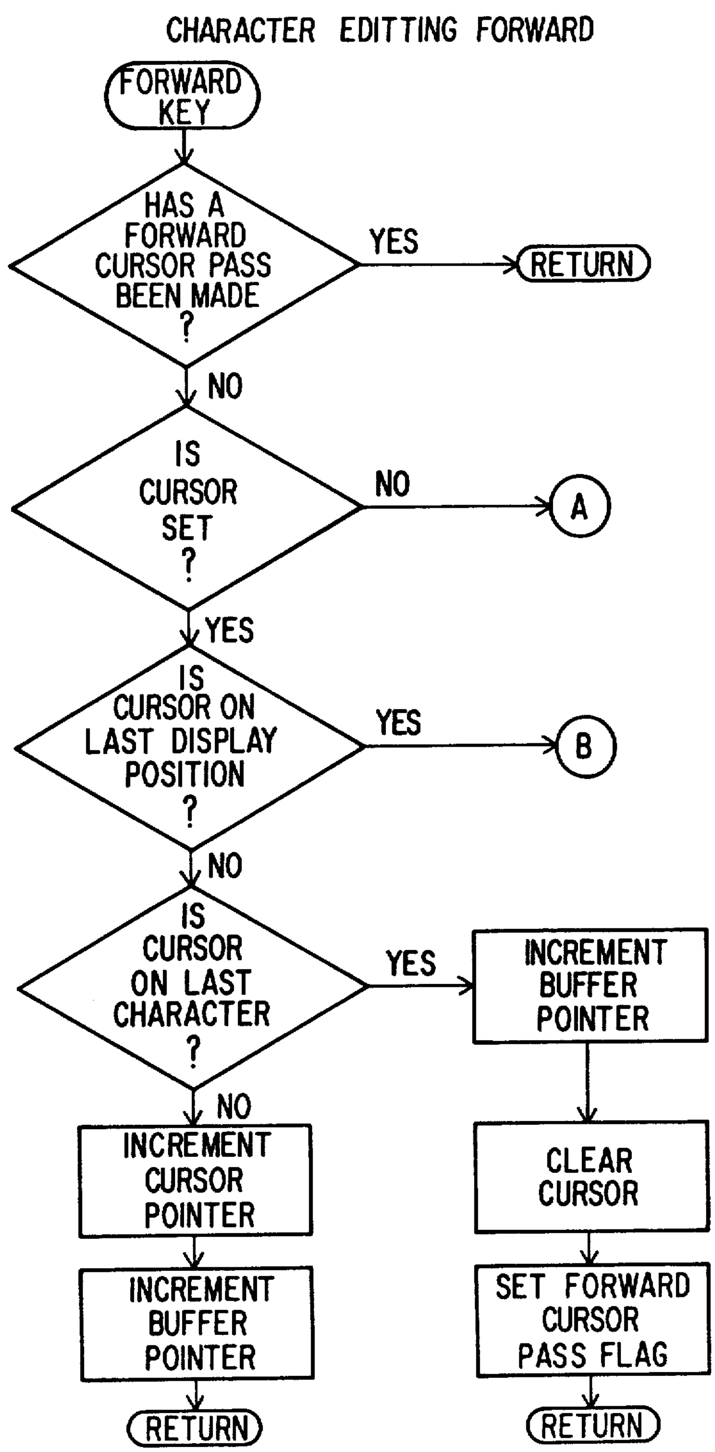
Figure 159C:
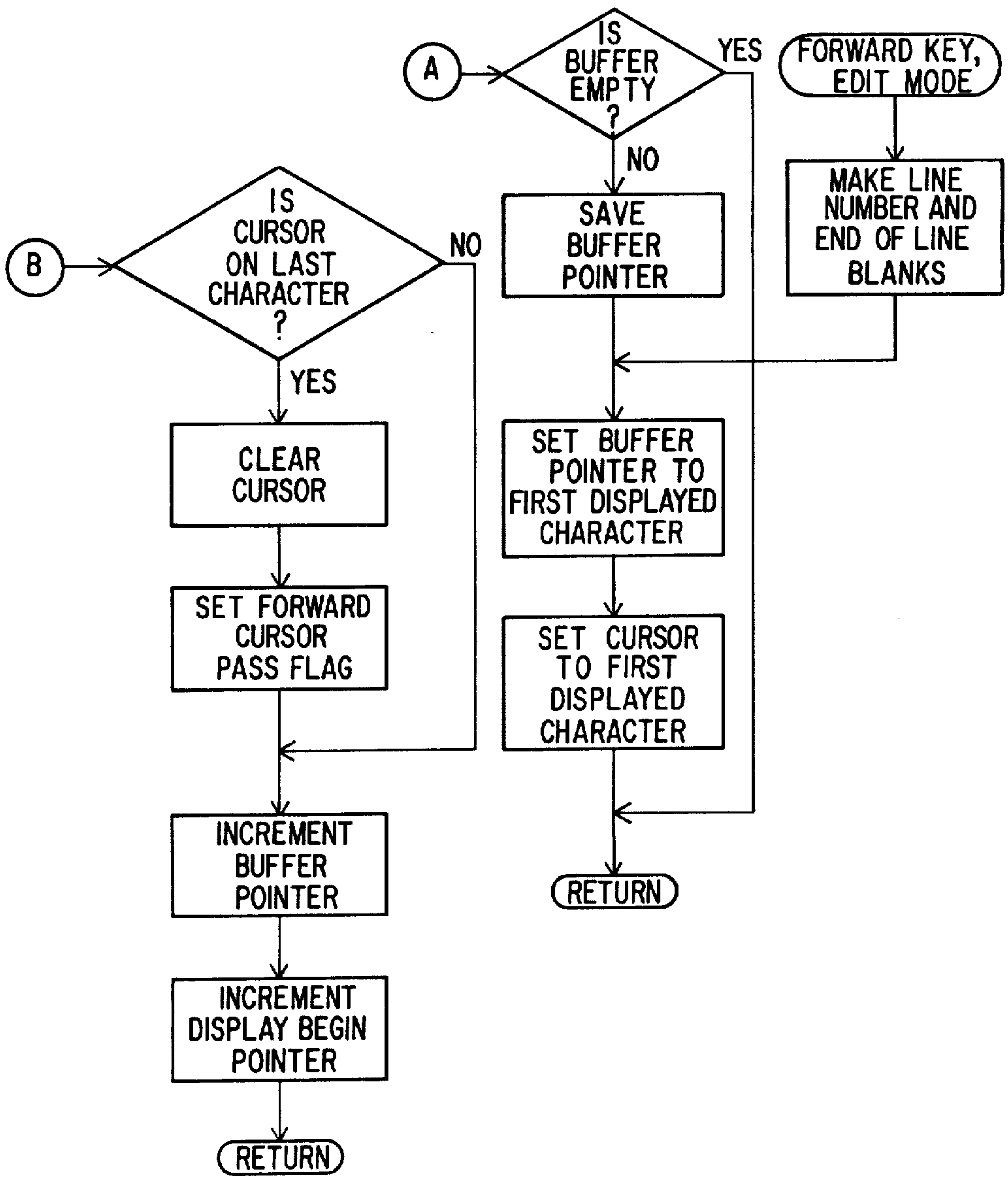
Figure 159D:
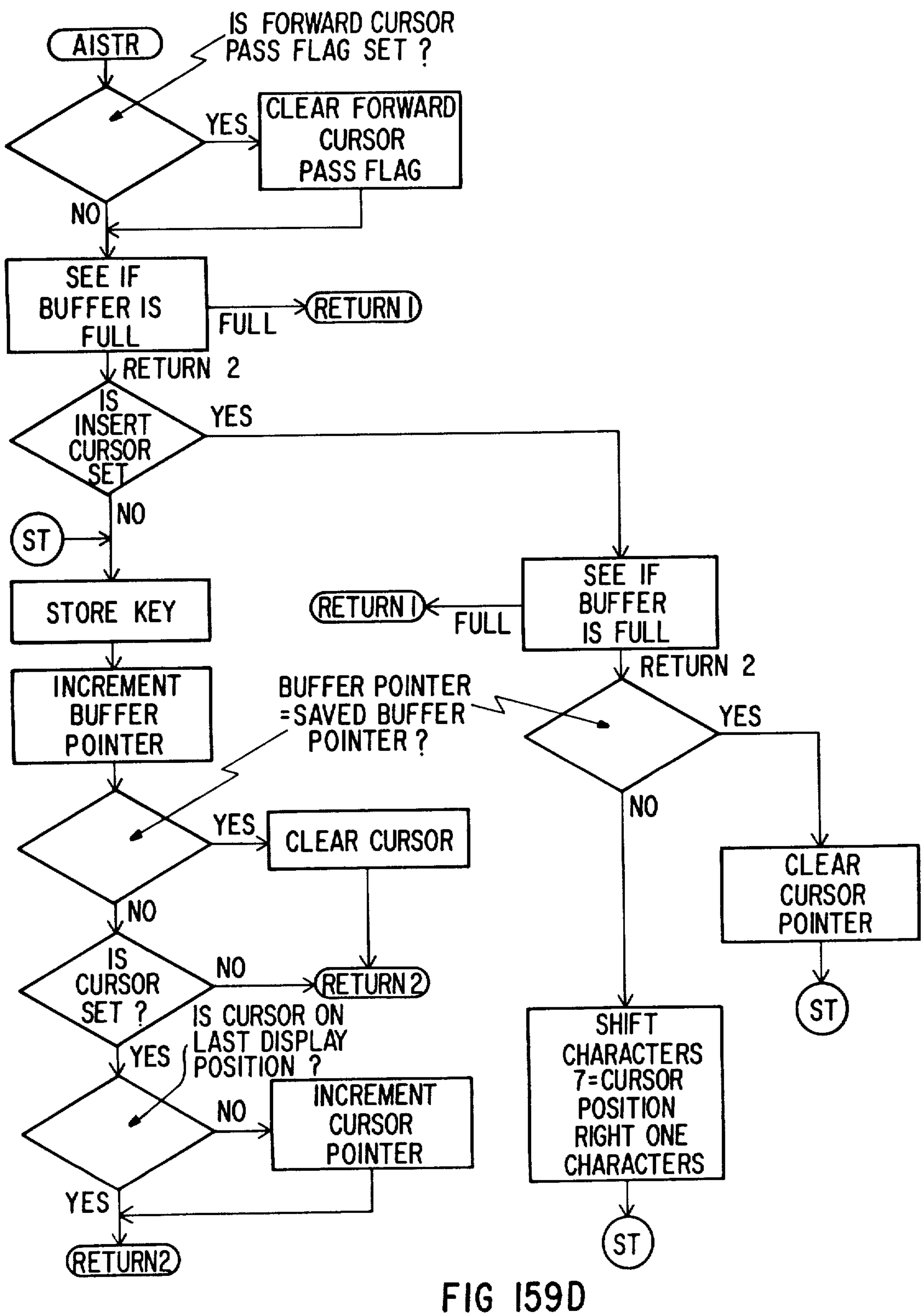
Figure 159E:
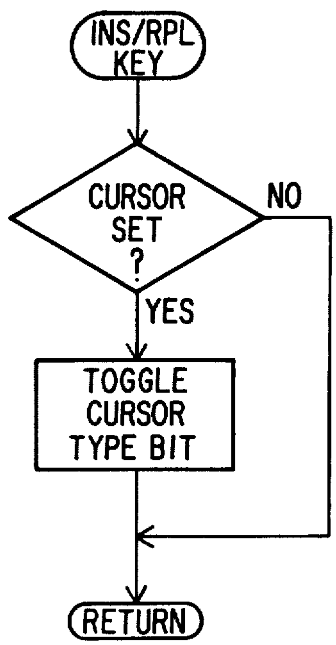

Referring to FIG. 159A, if the back key is pressed, the I/O buffer pointer is decremented and the cursor pointer is set to the position indicated by the buffer pointer. Referring to FIGS. 195B–D, pressing the forward key causes these two pointers to be incremented. The INS/RPL key toggles the cursor type flag as shown in FIG. 195E. The displayed cursor is then changed from the replace to the insert cursor or vice-versa.

Figure 159F:
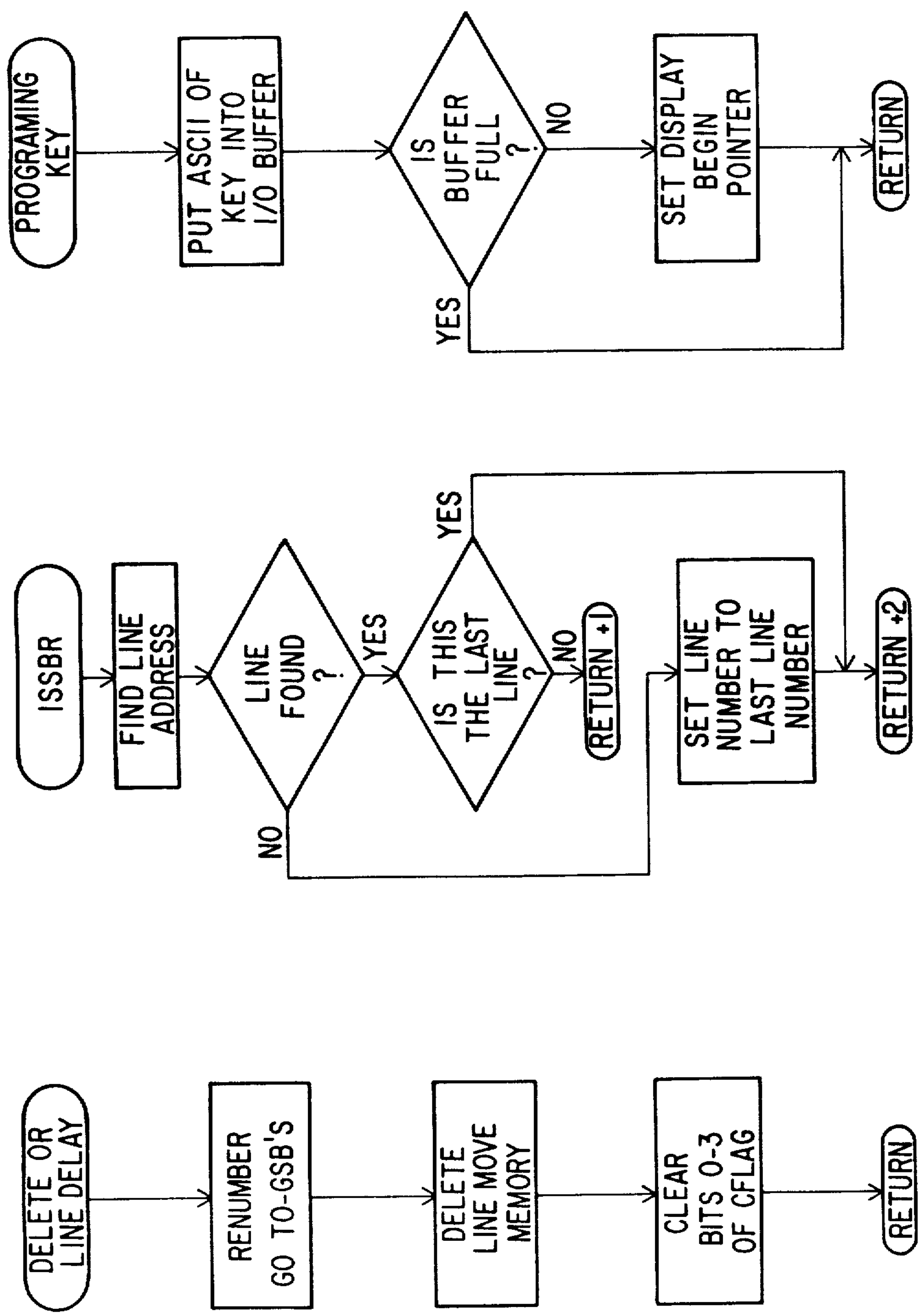

Referring to FIG. 159F, if a programming key is pressed when the replace cursor is set, the key is placed in the I/O buffer at the position of the buffer pointer, and both the buffer and the cursor pointers are incremented. If the insert cursor was set, the character at the position of the buffer pointer and those to the right of the pointer are shifted right one character position. A normal replace sequence is then performed.

Figure 159G:
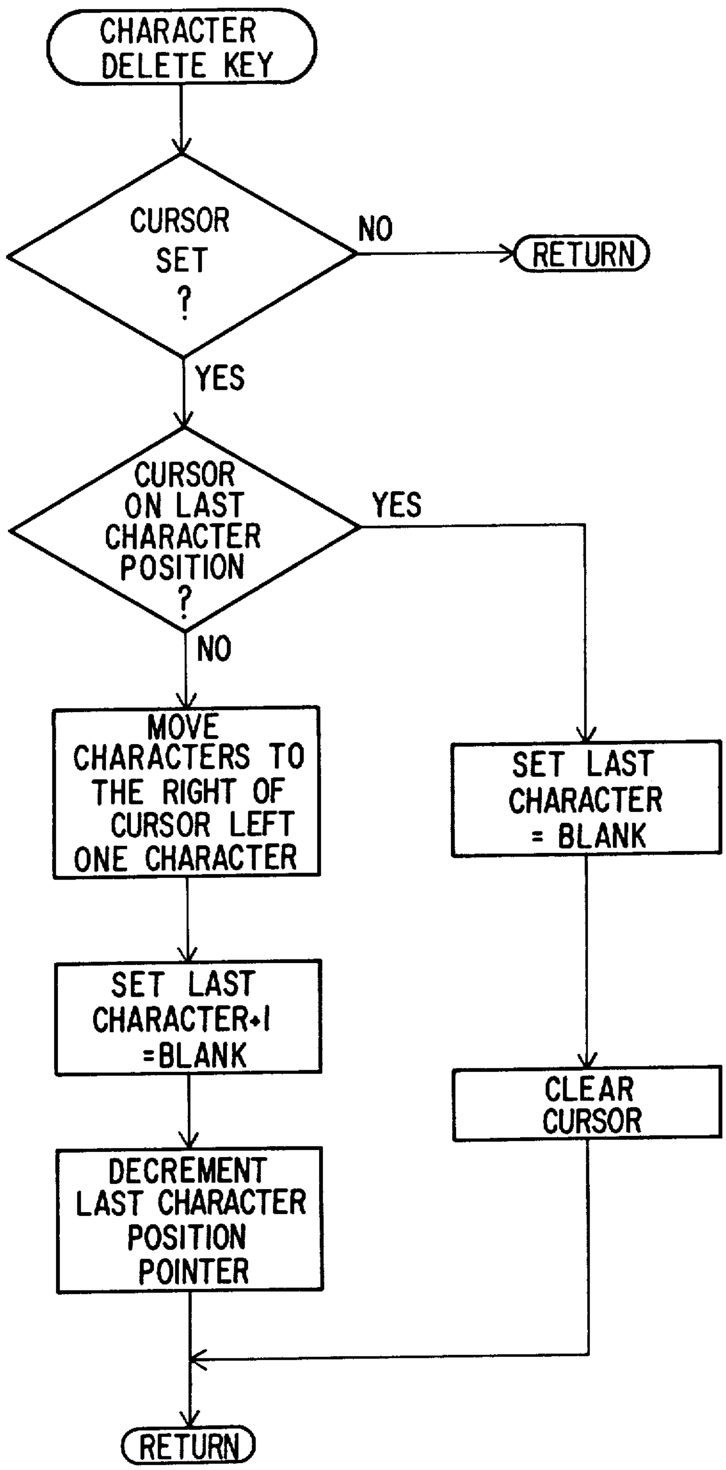

The delete character key routine illustrated by a flow chart in FIG. 159G shifts the characters to the right of the cursor pointer left one character. This shift overwrites the character under the cursor thereby deleting it from the display.

Figure 159H:
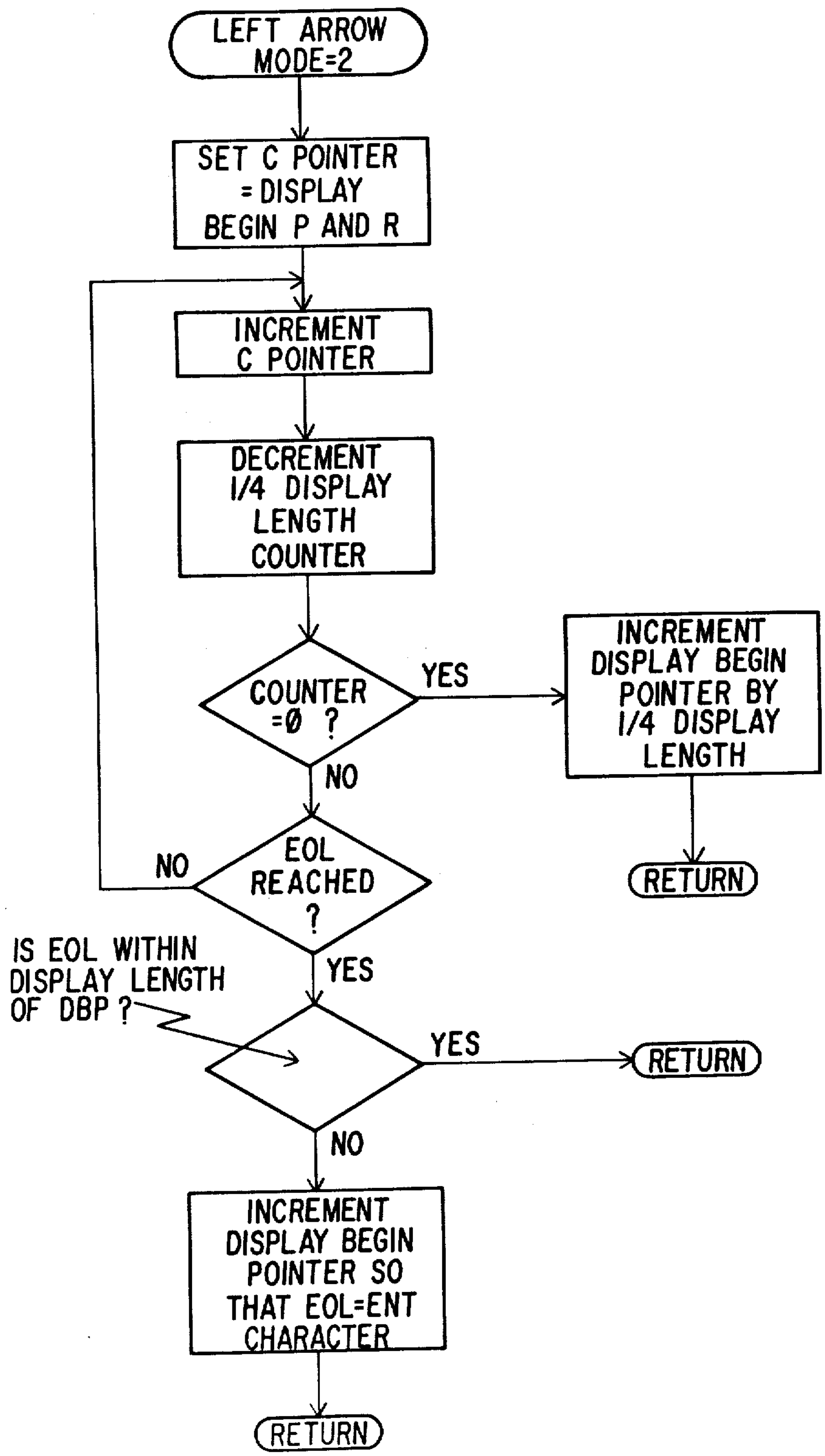
Figure 159I:
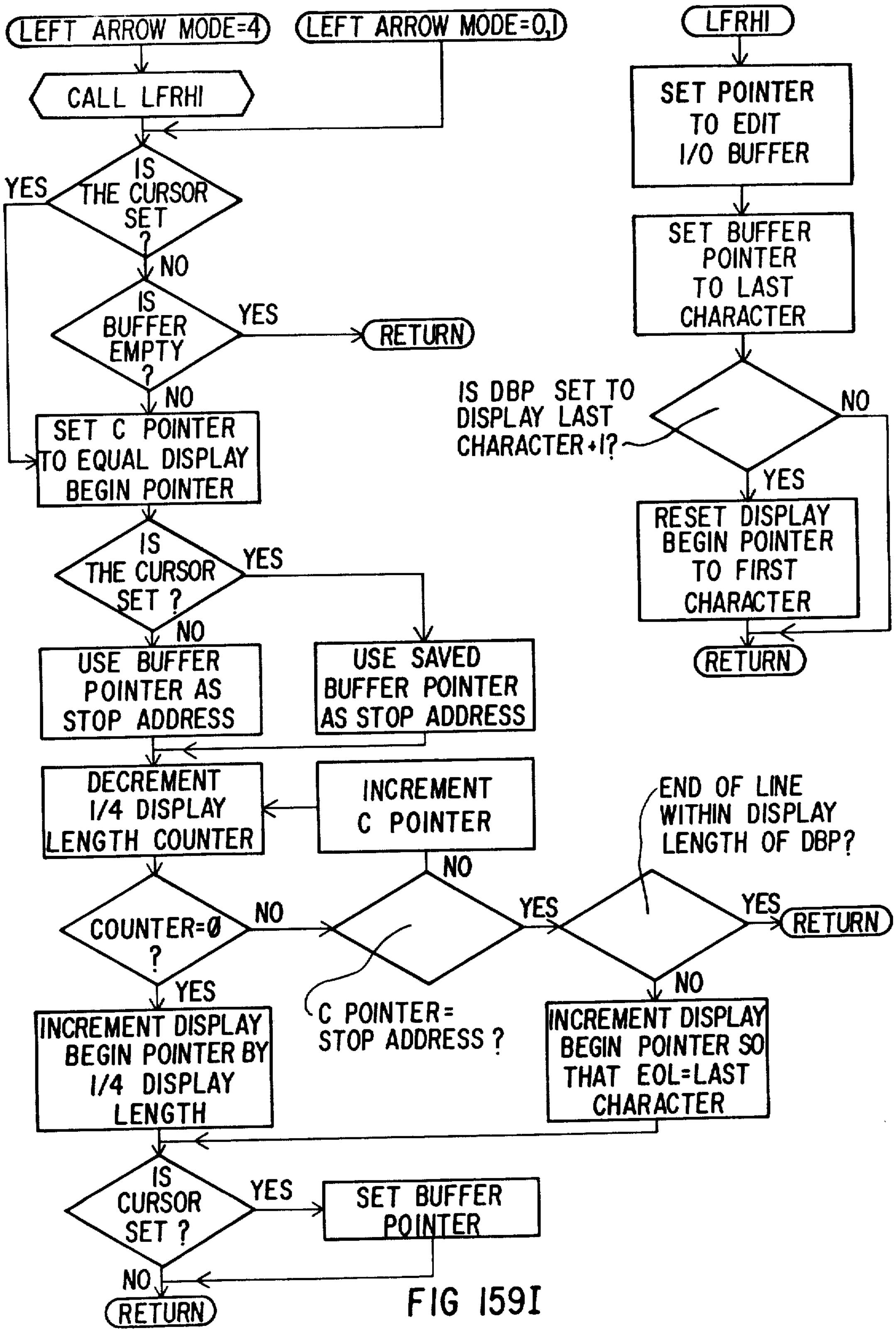
Figure 159J:
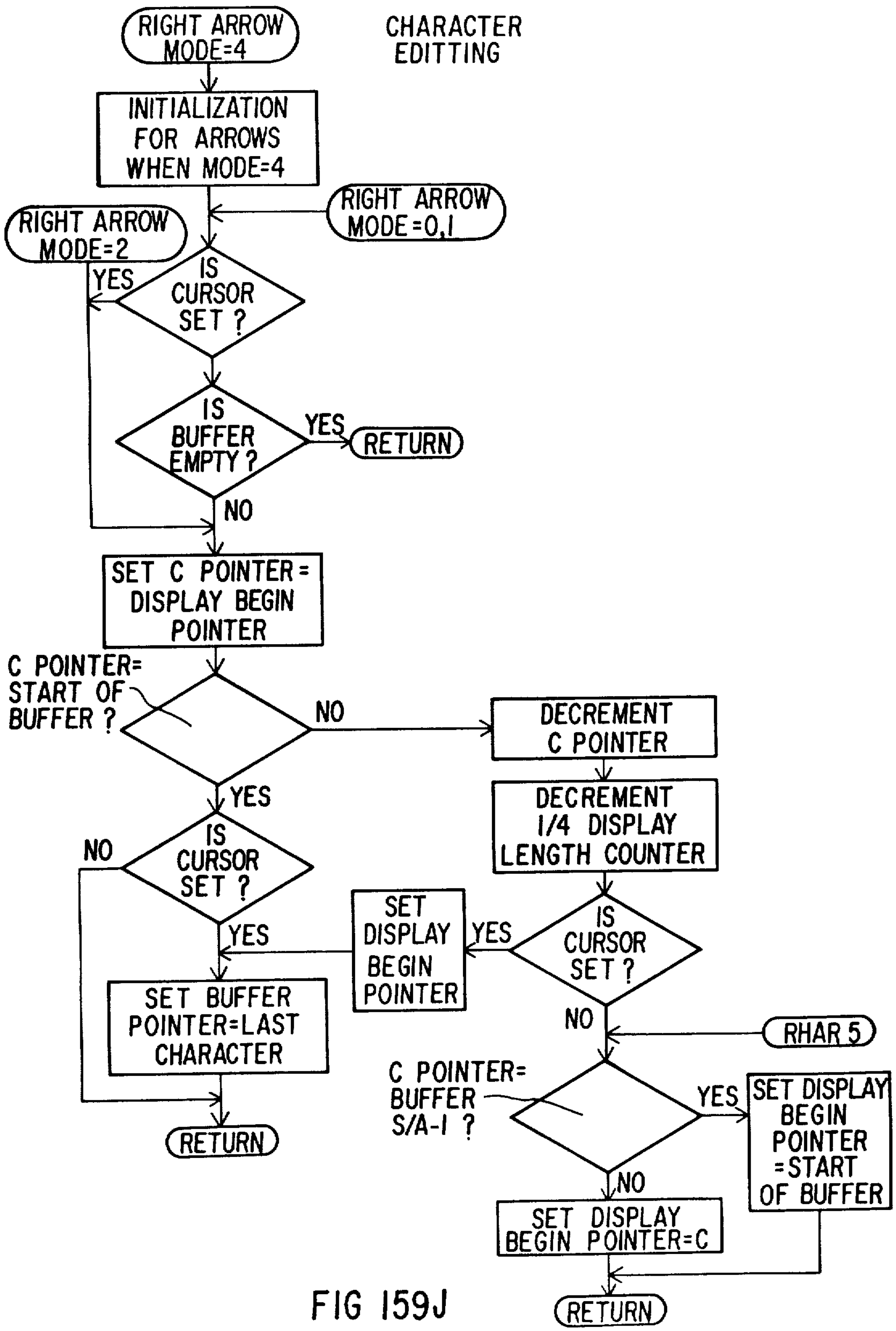

Referring to FIGS. 159H and 159I, left arrow routines illustrated therein increment the buffer pointer and the display begin pointer by one-fourth of the display size. Referring to FIG. 159J, the right arrow routines illustrated therein decrement these pointers by the same amount.

Figure 159K:
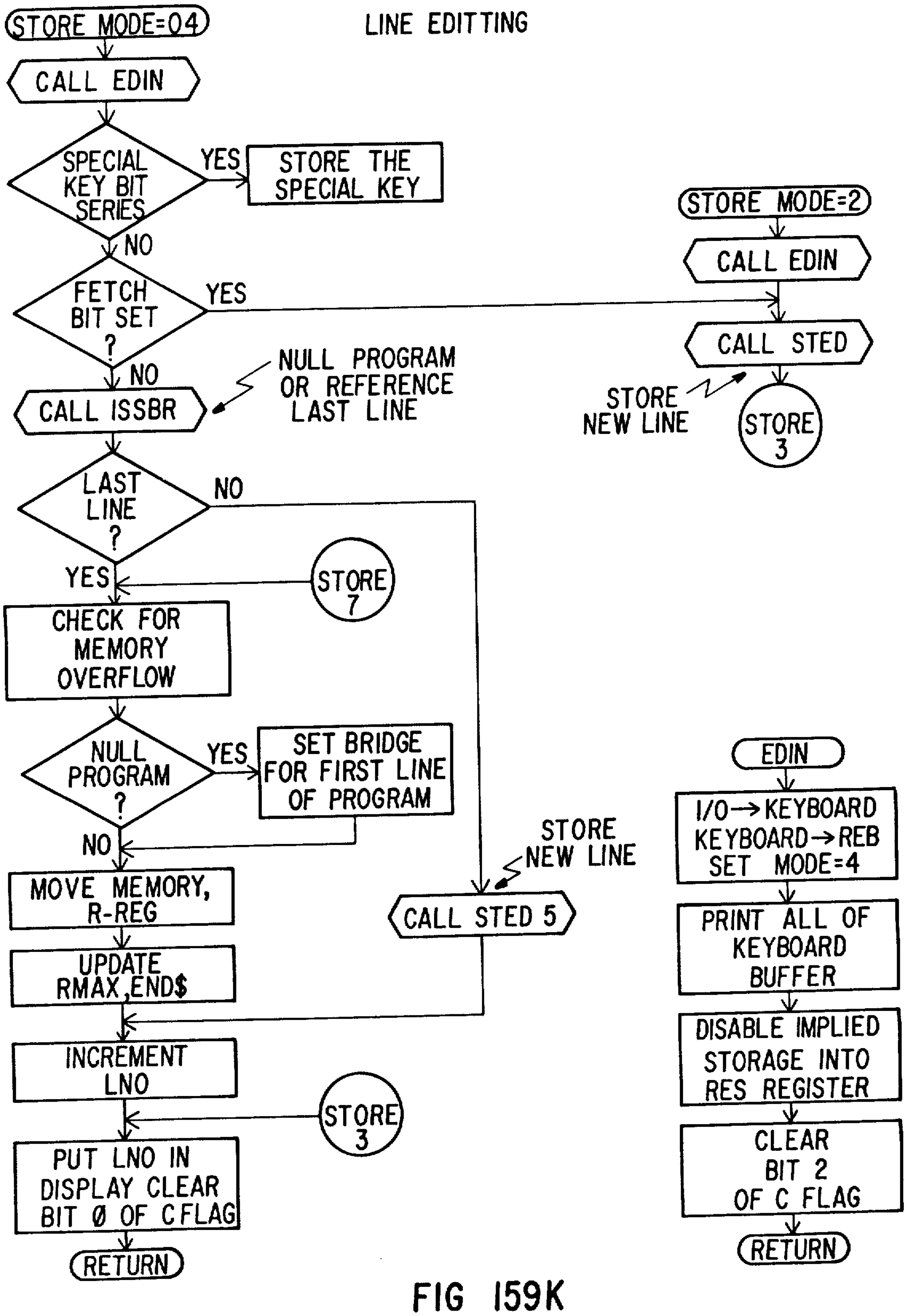
Figure 159L:
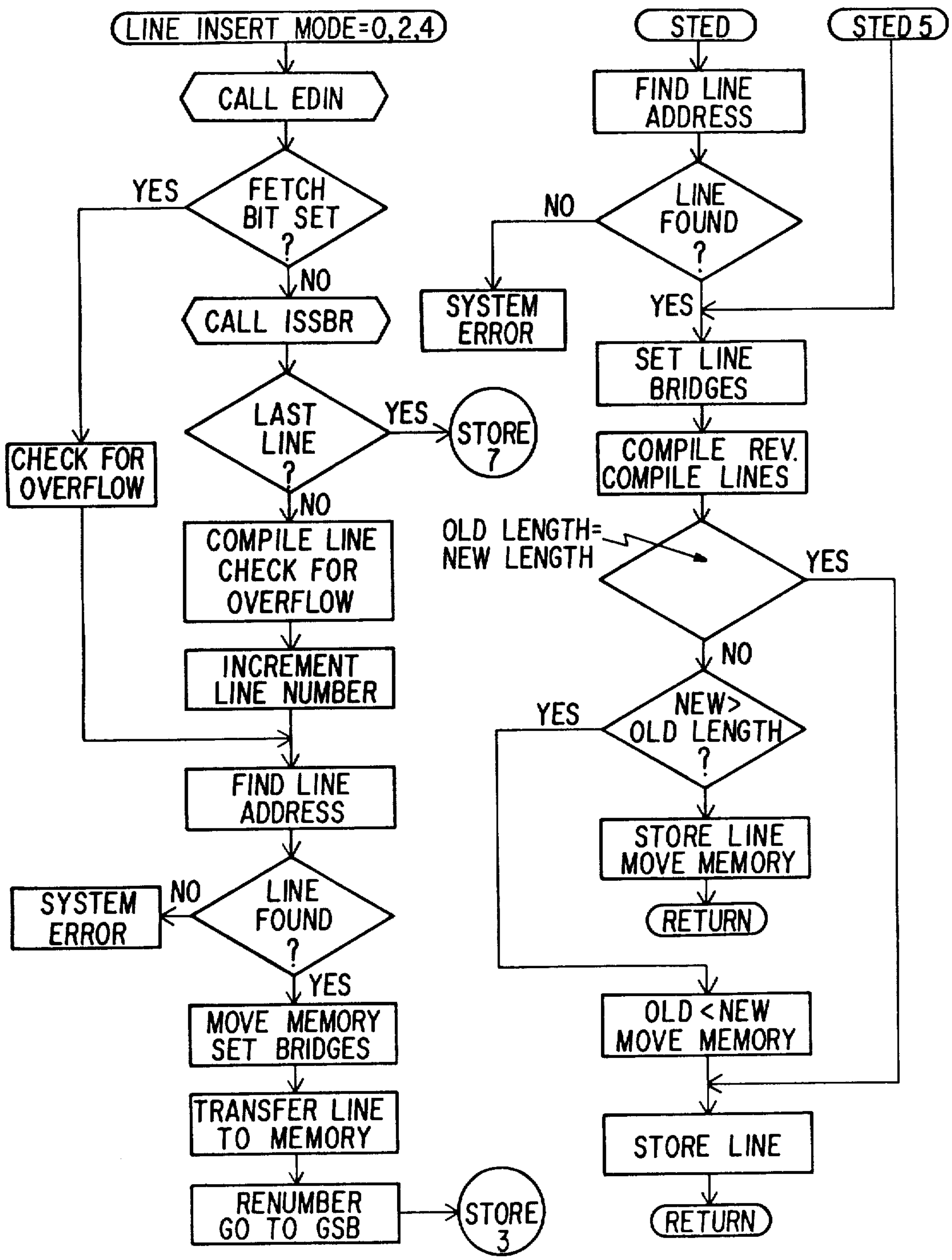

Referring to FIG. 159K, once a program has been stored, the line editing keys are used to insert, delete, or modify lines in the program. To modify a line, the line must first be brought into the display by the fetch command, or the up or down arrow keys. The user then edits the line and stores it thereby replacing the old line. Referring to FIG. 159L, in order to insert a line in the program, the line that is to follow the inserted line is fetched. The new line is then typed. This line is inserted into the program by pressing the line insert key.

Lines can be deleted from the stored program by the delete command or the line delete key. To delete a line using the line delete key, the line must first be brought into the display. The pressing of the line delete key will then delete this line from the program.

CALCULATOR CONTROL KEYS

Referring to the lower left and lower central portions of FIG. 3, the Calculator Control keys are shown. A RUN key runs the program in the calculator from line zero. This key is an immediate execute key which means that "run" is executed automatically when the key is pressed. All variables, flags, and subroutine pointers are cleared when the run key is pressed. A red indicator at the left end of the display indicates a running program.

A STORE key stores individual program lines. Also, when a special function key is fetched and defined, STORE is used to store the key's definition. A program line can be a single statement or several statements separated by semicolons. When an error occurs in storing a line, RECALL brings that line into the display. A flashing cursor usually shows where the error was encountered in the line.

THE SHIFT or SHIFT LOCK keys shown in the lower left portion of FIG. 3 are used to obtain shifted keyboard characters such as #, √ and the like. When SHIFT LOCK is pressed, a small light above the shift lock key lights. To release SHIFT LOCK a user presses SHIFT.

Referring to the lower central portion of FIG. 3, a STOP key terminates the execution of a program at the end of the current line. The number of the next line to be executed in the program is displayed. When STOP is pressed, enter, list, tlist, and wait statements are aborted but the rest of the line is executed. When STOP is pressed in an enter statement, flag 13 is set and the enter statement is terminated.

If STOP is pressed while doing a live keyboard operation, the operation is stopped, but the program continues. Pressing STOP a second time stops the program.

Referring to the right lower portion of FIG. 3, an EXECUTE key executes the single or multi-statement line which is in the display. The two most recently executed (or stored) keyboard entries are temporarily stored and can be recalled by pressing RECALL once or twice. The result of a numeric keyboard operation which is not assigned to a variable is stored in Result. Pressing EXECUTE displays the result, and stores the result in Result. Pressing the execute key again repeats the same operation.

Although multiple expressions are allowed, only the result of the last expression in the line is stored in Result. In print-all mode, both results are printed.

Referring to the lower central portion of FIG. 3, a CONTINUE key is used to automatically continue a program from where it was stopped. When a line number is in the display, CONTINUE continues from that line number, except after RESET has been pressed, or after editing the program. In an enter statement, CONTINUE is pressed after entering data. If no data is entered and CONTINUE is pressed, the variable maintains its previous value and flag 13 is set. When an error occurs in a program, pressing CONTINUE causes the program to continue execution at program line zero.

Referring to the lower right portion of FIG. 3, a RESULT key is used to access the result of a numeric keyboard operation which was not assigned to a variable. A value which is stored in result is also displayed.

The value in result can be assigned to variables. For example:

| | |
|---|---|
| res→A EXECUTE | Store result in A. |
| 5/res→B EXECUTE | Store 5 divided by result in B. |

In a program, values cannot be assigned to result; but the value in result can be assigned to variables or used in computations. For example:

| | |
|---|---|
| 1: res + 2 → A | This assigns the value of result +2 to a variable, A. |

Referring to the central right portion of FIG. 3, a clear key is shown. The CLEAR key clears the display. If the CLEAR key is pressed while in the enter mode, a question mark (?) appears in the display, indicating that an entry is still expected. If this key is pressed after a special function key has been fetched, the key number (e.g., $f_8$) appears in the display.

The Assignment Operator key is located below the CLEAR key and is used to assign values to variables. The Assignment Operator key is labelled → but is not the same as the similarly labelled right arrow key used for display control described hereinbefore. For example:

| | |
|---|---|
| √5 → X EXECUTE | This stores the square root of 5 in x. |

To enter the approximate value of π the Π key located to the immediate left of the RUN key is pressed. The value entered is 3.14159265360.

The ENTER EXP key located to the immediate right of the RUN key enters a lower case e, into the display, representing an exponent of base 10. The unshifted E key can also be used in place of ENTER EXP.

SPECIAL FUNCTION KEYS

There are 24 special function keys, 12 unshifted and 12 shifted. Referring to the upper right portion of FIG. 3, the special function keys are labelled $f_0$ through $f_{11}$ and can be used as typing aids, one line immediate execute keys or as immediate continue keys.

To define a special function key a user presses the FETCH key and the special function key to be defined. Then he enters a line in the display. He presses the STORE key to store the definition of the key and to exit key mode.

If a user decides that he is not going to store anything under a key, the STOP key can also be used to exit key mode. For example:

| | |
|---|---|
| Press: FETCH $f_0$ | "$f_0$" is displayed if the key was not previously defined. |
| Type-in: prt | Enters "prt" in the display. |
| Press: STORE | This stores "prt" under $f_0$, for use as a typing aid. |

Immediate Execute Keys

If a line which is stored under a special function key is preceded by an asterisk, it is an immediate execute key. The asterisk key is shown in the right portion of FIG. 3. When the key is pressed, the contents corresponding to the special function key are appended to the display and the line in the display is executed automatically. For example:

| | |
|---|---|
| Press: FETCH SHIFT $f_1$ | Accesses $f_{13}$ (shifted $f_1$). |
| Type-in: *prt "π", π | The asterisk makes this an immediate execute key. |
| Press: STORE | This stores the line entered in the display under $f_{13}$. |

Whenever SHIFT $f_1$ is pressed and the display is clear, the literal "π", followed by its approximate value is printed automatically.

Immediate Continue Keys

If a line to be stored as a special function key is preceded by a slash (/), it is an immediate continue key for use with the enter statement. The slash key is shown in the right portion of FIG. 3. When the slash key is pressed, the contents of the key are appended to the display and the continue command is executed automatically. Immediate continue keys are used to enter often used values in enter statements. For example:

| | |
|---|---|
| Press: FETCH $f_5$ | Fetches special function key $f_5$. |
| Type-in: /2.71828182846 | This enters the approximate value of e, the base of the natural logarithms, into the display. |
| Press: STORE | This stores the line in the display under $f_5$. |

Whenever an enter statement is waiting for a value and the $f_5$ key is pressed, the approximate value for e (i.e., 2.71828182846) is entered and the program continues.

Keys with Multiple Statements

By separating statements using semicolons, several statements are stored under one special function key. As an example, suppose a user wants to convert inches to centimeters. The following line is stored under special function key, $f_1$.

Press: FETCH $f_1$
Type-in: *→R; dsp R, "in.+", 2.54R, "cm."
Press: STORE
Then key-in a number, such as 6, and press $f_1$. The display will show:

6.00 in.+15.2 cm.

PROGRAMMING STATEMENTS, FUNCTIONS, AND OPERATORS

The statements, functions, and operators explained herein are all programmable and can also be executed in calculator mode.

Statements can be programmed or executed. Operators and functions must be part of a statement in order to be programmed. This means that operations, such as 10+32 or $\sqrt{63}$, which can be executed from the keyboard, must be part of a statement in order to be programmed. Thus 10+32→X or $\sqrt{63}$→B, are valid statements.

SYNTAX CONVENTIONS

The instructions explained hereinafter use the syntax conventions shown in the table below.

| FORMAL SYNTAX CONVENTIONS | |
|---|---|
| array | The array name with an asterisk in brackets specifies an entire array (i.e.: R[*]). |
| brackets [ ] | items within brackets are optional. |
| coloring | colored items or colored items in dot matrix must appear as shown. |
| character | a letter, a number, or a symbol. |
| constant | a number within the storage range of the calculator. |
| expression | a constant (like 16.4), a variable (i.e.: X or B[8] or r3) or an expression such as (8 ↑ 4 or 6<A+B). |
| integer | an integer constant from −32768 through 32767 (i.e.: −10 or 301). |
| letter | an alphabetic character from a through z and from A through Z. |
| line number | an integer from 0 through 32767. |
| n | an integer from 0 through 15. |
| text | a series of characters within quotation marks. |
| variable | a simple variable (i.e.: A or Q), an array variable (i.e.: E[5]), or an r-variable (i.e.: r12). |
| absolute or labelled go sub | gsb line number or label. |
| absolute or labelled go to | gto line number or label. |
| absolute value | abs expression |
| addition | expression + expression |
| and | expression and expression |
| arccosine | acs expression |
| arcsine | asn expression |
| arctangent | atn expression |
| assignment | expression → variable |
| auto verify disable | avd |
| auto verify enable | ave |
| base ten logarithm | log expression |
| beep | beep |
| clear flag | cfg [n][ , n]... |
| complement flag | cmf [n][ , n]... |
| continue | cont [line number or label] |
| cosine | cos expression |
| degrees | deg |
| delete | del line number [ , line number][ ,* ] |
| digit rounding | drnd (expression , expression) |
| dimension | dim |
| display | dsp [text or expression [ , text or expression]...] |
| division | expression / expression |
| end | end |
| enter | ent [text , ] variable [ ,[text , ] variable...] |
| enter print | enp [text , ]variable[,[text , ] variable...] |
| equal to | expression = expression |
| erase | erase [a or k or v or special function key] |
| erase tape | ert expression |
| exclusive or | expression xor expression |
| exponential | exp expression |
| exponentiation | expression ↑ expression |

-continued

| FORMAL SYNTAX CONVENTIONS | |
|---|---|
| fetch | fetch [line number] |
| find file | fdf [expression] |
| fixed | fxd [expression] |
| flag | flg n |
| float | flt [expression] |
| fraction | frc expression |
| grads | grad |
| greater than | expression > expression |
| greater than or equal to | expression > = expression<br>expression = > expression |
| identify file | idf [variable[ , variable[ , variable [ ,variable[ , variable]]]]] |
| implied multiply | ( expression ) ( expression ) |
| integer | int expression |
| jump | jmp expression |
| less than | expression < expression |
| less than or equal to | expression < = expression<br>expression = < expression |
| list program | list [line number[ , line number] |
| list special function key | list special function key |
| list special function keys | list k |
| live keyboard disable | lkd |
| live keyboard enable | lke |
| load binary | ldb [expression] |
| load file (data) | ldf [expression[ , variable[ , variable...]]] |
| load file (program) | ldf [expression[ , expression[ , expression]]] |
| load keys | ldk [expression] |
| load memory | ldm [expression] |
| load program | ldp [expression[ , expression[ , expression]]] |
| mark | mrk expression, expression [ , variable] |
| maximum value | max (expression or array[ , expression or array]...) |
| minimum value | min (expression or array[ , expression or array]...) |
| modulus | expression mod expression |
| multiplication | expression * expression |
| natural logarithm (base e) | ln expression |
| normal | nor [line number[ , line number]] |
| not | not expression |
| not equal to | expression # expression<br>expression < > expression<br>expression > < expression |
| or | expression or expression |
| power of ten rounding | prnd ( expression , expression ) |
| print | prt [text or expression[ , text or expression]...] |
| radians | rad |
| random number | rnd [ — ] expression |
| record file (data) | rcf [expression[ , variable[ , variable...]]] |
| record file (program) | rcf [expression[ , constant[ , expression]]] |
| record keys | rck [expression] |
| record memory | rcm [expression] |
| relative go sub | gsb + line number<br>gsb − line number |
| relative go to | gto + line number<br>gto − line number |
| return | ret |
| rewind | rew |
| run | run [line number or label] |
| set flag | sfg [n][ , n]... |
| set select code | ssc expression |
| sign | sgn expression |
| sine | sin expression |
| space | spc [expression] |
| square root | √ expression |
| stop | stp [line number[ , line number]] |
| subtraction (negative) | [expression] − expression |
| tangent | tan expression |
| tape list | tlist |
| ten to the power | tn ↑ expression |
| trace | trc [line number[ , line number]] |
| track | trk expression |
| units (angular) | units |
| verify | vfy [variable] |

-continued

| FORMAL SYNTAX CONVENTIONS | |
|---|---|
| wait | wait expression |

The calculator uses three types of variables: simple variables, array variables, and r-variables. As variables are allocated, they are initially assigned the value 0.

Simple Variables

There are twenty-six simple variables, A through Z. A simple variable must appear in upper case. Each simple variable can be assigned one value. Simple variables may appear in a dimension (dim) statement to reserve memory for them, but this is not required.

| | |
|---|---|
| Examples: | |
| Ø: dim A | Reserves 1 memory location for the simple variable A. This line is not required. |
| 1: 12 → A | Assigns the value 12 to A. |
| 2: prt A | Prints the value of A on the printer. |

Array Variables

There are twenty-six arrays, named A through Z. Array names are followed by square brackets which enclose the subscripts of the array.

An array must be declared in a dimension statement. This reserves memory for the array, and initializes all elements in the array to zero. Each subscript of an array can be specified either by specifying the upper bound, in which case the lower bound is assumed to be one, or by specifying both the upper and lower bounds as more fully described hereinafter.

An array can have any size and any number of subscripts within the limits of the calculator memory size and line length.

| | |
|---|---|
| Example 1: | |
| Ø: dim Q[1Ø,1Ø] | Reserves 100 memory locations for array Q. |
| 1: 3→[1,1] | Q[1,1] is assigned the value 3. |
| 2: 5→Q | The value 5 is assigned to the simple variable [. There is no connection between the simple variable Q and array Q[10,10]. |
| 3: 2→Q[l,Q] | Q[l,Q] is assigned the value 2. |
| Example 2: | |
| Ø: 7→Z | 7 is assigned to Z. |
| 1: dim X[−4:Ø,Z] | X is dimensioned by a 5 by 7 array. The lower and upper bound of the first array dimension are specified. |
| 2: 3.4→X[−4,1] | Assigns values. |
| 3: Ø→X[Ø,Z] | |

r-variables r-variables are specified by a lower case r followed by a value or expression. When an r-variable is encountered, memory is reserved for all lower-valued r-variables which have not been allocated. As r-variables are allocated, they are assigned the value Ø. Thus if r10 is assigned a value, rØ through r9 are automatically allocated and assigned the value zero if they have not been previously allocated.

r-variables are stored in a different area in memory which is not contiguous with array or simple variables. Due to this, r-variables cannot be mixed with simple or array variables in record file (rcf) and load file (ldf) statements, rcf and ldf statements being more fully described hereinafter. Also, r-variables cannot appear in a dimension statement.

| Examples | |
|---|---|
| ∅: 4→r∅ | 4 is assigned to r-variable 0. |
| 1: 2→rr∅ | 2 is assigned to r-variable 4. r∅=4, therefore 2 → r4. This is known as indirect storage. |

Figure 160A:
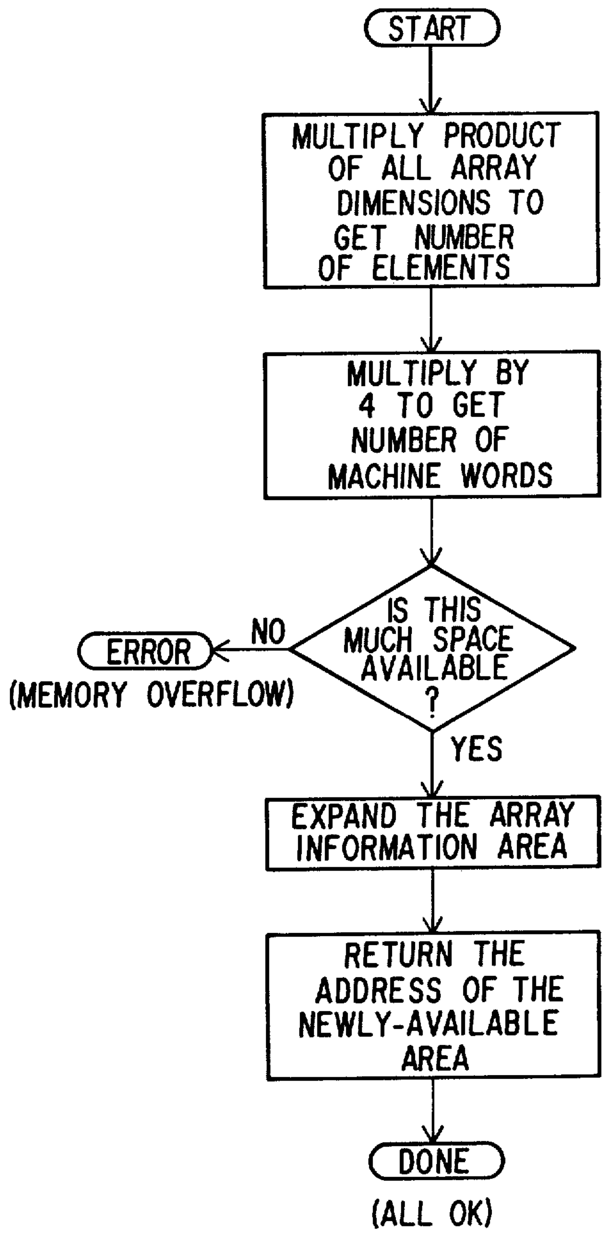

Arrays are allocated dynamically by providing an expandable region in read-write-memory to hold the array information. Referring to FIG. 160A, the total space requirements for the new array are calculated and checked against available unused read-write-memory at the time the calculator user's program requests that the array be made present. If the new array will fit, the region designated to hold array information is expanded and the new space thus obtained is reserved for the new array or an error message is emitted.

MULTI-DIMENSIONAL ARRAYS, VARIABLE BOUNDS

Since read-write-memory is essentially a one-dimensional storage medium, the elements of a multi-dimensional array are mapped into a linear sequence of consecutive storage locations.

The bounds being specifiable at run-time falls out naturally, because the DIM statement is executed as part of the program as opposed to being statically examined before the program is run.

Algorithm for Subscript Address Calculations

Let the array have the declaration:

dim $A[L_1{:}U_1, L_2{:}U_2, \ldots, L_N{:}U_N]$

Define $D_k = U_k - L_k + 1$ $Q_k = -L_k$

Figure 160B:
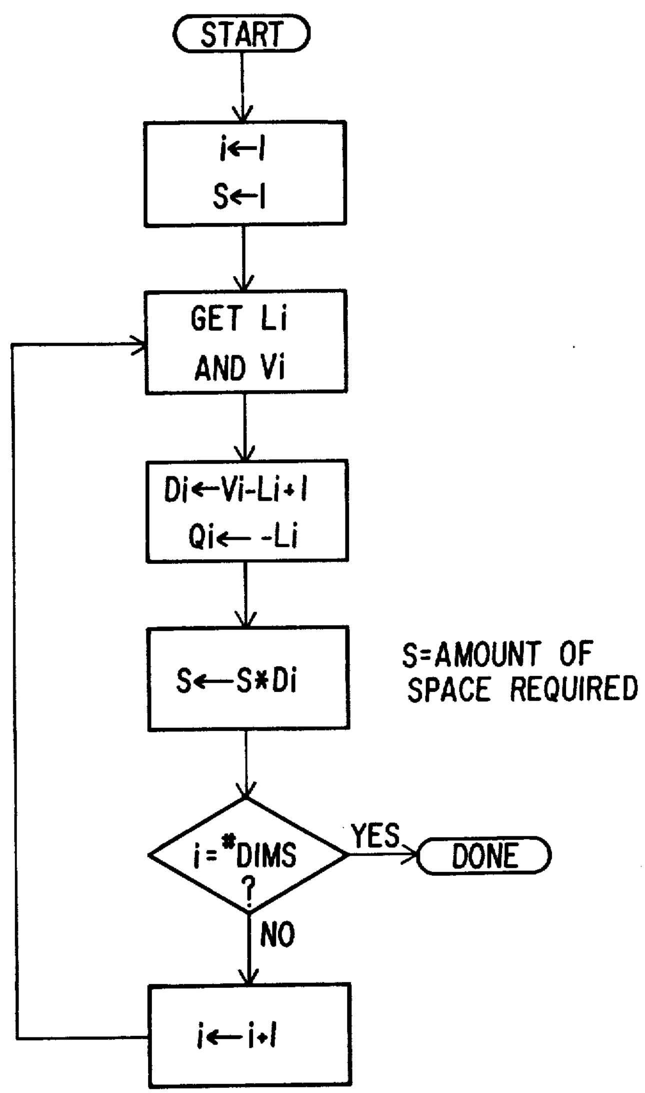

Then $$S = \pi_{i=1}^{N} D_i$$

is the number of elements. FIG. 160B is a flow chart illustrating the subroutine for calculation of $D_k$ and $Q_k$.

Let the reference be of the form:

$A[X_1, X_2, \ldots, X_N]$

Figure 160C:
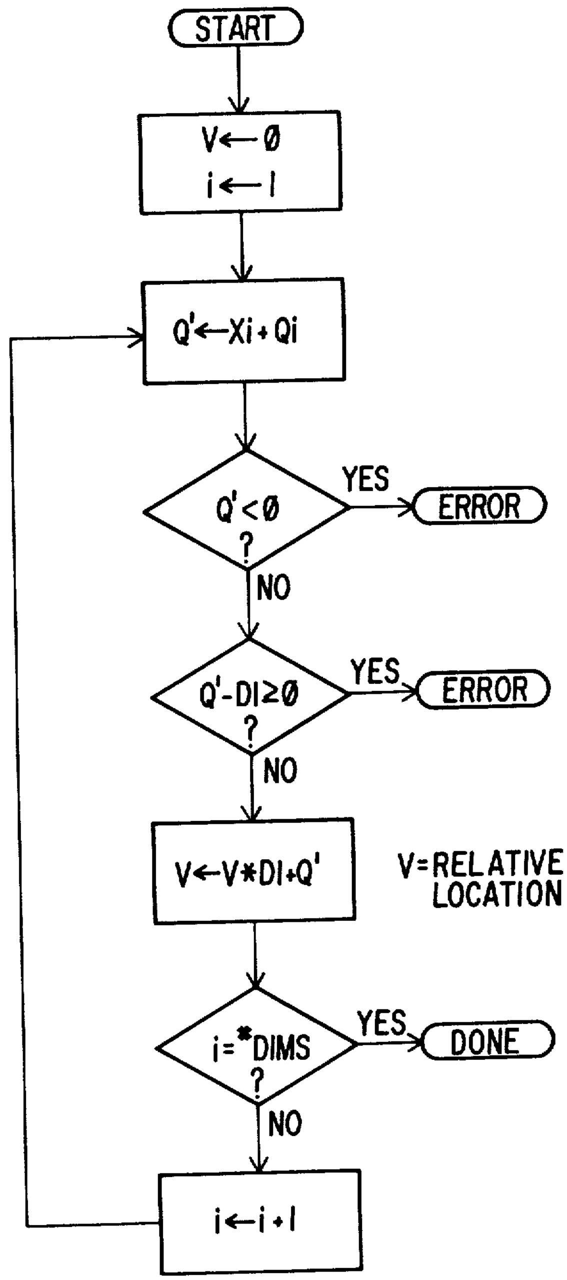

Then the iterative calculation:

V=∅
FOR I=1 to N
$Q' = X_I + Q_I$
2F $Q' < \emptyset$ or $Q' - D_I \geqq \emptyset$ Then out-of-bounds
$V = V^* D_I + Q'$
NEXT I will calculate the relative location of the element. FIG. 160C is a flow chart of the subroutine for calculating the relative location of $[X_1, X_2 \ldots, X_N]$.

Due to the fact that the $X_I$ are stacked in order of increasing I, the optimum algorithm will process them in order of decreasing I. This has the same effect as the leftmost subscript varying the most rapidly. This is consistent with IBM Fortran IV and HP 2100-series Fortran IV.

Figure 160D:
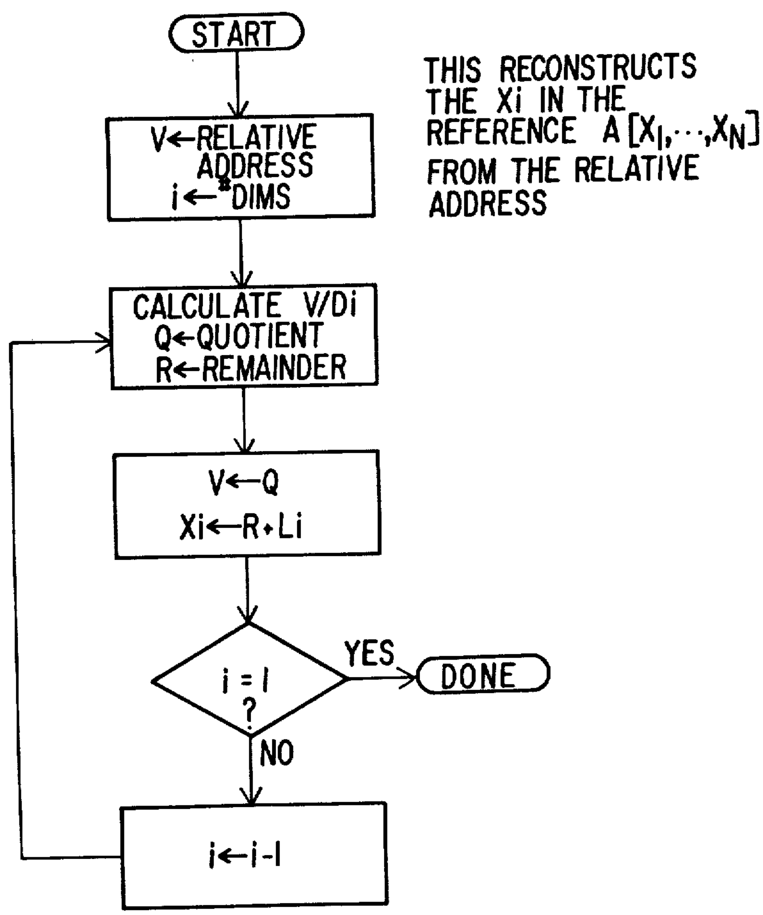

In the case of a simple variable, the address and the variable correspond uniquely, so the name of the variable is known immediately. In the case of an array variable, the actual subscripts of the array must be reconstructed from the address given. Since the address was arrived at originally from a simple iterative calculation, the inverse of this iteration reproduces the desired subscripts. Referring to FIG. 160D, a flow chart of the subroutine for reconstructing the $X_i$ in the reference $A[X_I, \ldots X_N]$ from the relative address is shown. The subscript address iteration is of the form:

$$V_{new} = V_{old}{}^* D_I + (X_I - L_I)$$

$V_{new}, D_I, L_I$ is known and $V_{old}$ and $X_I$ is to be determined.

The division algorithm gives:

$$V_{new}/D_I = V_{old} + (X_I - L_I)/D_I$$

hence the quotient is the $V_{old}$, and since it is known that the starting $V_{new}$ was in-bounds, from the bounds conditions:

$$(S_I - L_I) = Q'_I,\ Q'_I \geqq O,\ Q'_I < D_I$$

the remainder is the $(X_I - L_I)$. The algorithm is

V=relative element
FOR I=N to 1
calculate $V/D_I$=Quotient+Remainder/$D_I$
V←Quotient
subscript=Remainder+$L_I$
Next I

NUMBER FORMATS

Numbers can be displayed or printed in floating-point format (scientific notation) or in fixed format. The calculator's internal representation of numbers is unaffected by number formats, therefore, accuracy is not changed.

When the calculator is turned on, RESET is pressed, or erase a is executed, the number format is fixed 2 (fxd2), except for very large numbers. Then, the calculator temporarily reverts to float 9.

THE FIXED STATEMENT

Syntax:

fxd number of decimal places

The fixed (fxd) statement sets the format for printing or displaying numbers. In fixed format, the number of digits to appear to the right of the decimal point is specified. Fixed ∅ through fixed 11 can be specified.

When a number is too large to fit in the fixed format, the number format temporarily reverts to the previously set floating-point format. Thus, for any number A:

$$A = N^* 10^E$$

where: $1 \leqq N < 10$, or $N = 0$

The number reverts to the previously set floating format if:

$$D + E \geqq 14$$

where:

D=Number of dcimal places specified in the fixed statement.

E=exponent of the number.

For numbers too small to fit in the fixed format setting, zeros are printed or displayed for all decimal places with a minus sign if the number is negative.

Two distinct rounding functions are available to the user. prnd is used to round a number to a specified power of ten. For example, dollar figures can be rounded to the nearest penny or $10^{-2}$. The user specifies the number to be rounded and the power of ten is the argument list as follows:

prnd (43.271, −2) which results in a value of 43.27.

The other rounding function, drnd, is used to round a number to a specified precision indicated by the number of digits to be retained. The number to be rounded is represented as:

$$\pm D1.D2\ D3 \ldots D12 * 10^{exponent}$$

The user specifies the argument and the number of digits to be retained in the argument list as follows:

drnd (−127.3276,6) which results in a value of −127.328.

In each rounding function one or both arguments may be any valid arithmetic expression. Referring to FIG. 161, a flow chart of the prnd and drnd function is given.

THE FLOAT STATEMENT

Syntax:

flt number of decimal places

The float (flt) statement sets floating point format which is scientific notation. When working with very large or very small numbers, floating point format is most convenient. Float 519 through float 11 can be specified.

A number output in floating point format as the form:

−D.D. . .D e−DD

The first non-zero digit of a number is the first digit displayed. If the number is negative, a minus sign precedes this digit; if the number is positive or zero, a space precedes this digit. A decimal point follows the first digit; except in flt O. Some digits may follow the decimal point; the number of digits being determined by the specified floating point format (e.g., in float-5, five digits follow the decimal point).

When the character "e" appears, followed by a minus sign or space (for non-negative exponents) and two-digits, the two digits represent the exponent as a positive or negative power of ten.

ROUNDING

A number is rounded before being displayed or printed if there are more digits to the right of the decimal point than the number format allows. The rounding is performed as follows: The first exess digit is checked; if its value is 5 or greater, the digit immediately preceding it is incremented by one; if its value is less than 5, the digit is truncated.

THE DISPLAY STATEMENT dsp [any combination of text or expressions]

The display (dsp) statement displays values or text on the calculato display. Commas are used to separate variables or text. The number of characters that can be viewed at one time is limited by the display size but all characters can be displayed and viewed using the display control keys, Left Arrow key and Right Arrow key.

Values and text which are displayed remain in the display until another display operation clears it, or until a print statement is executed.

Displaying Quotes

Quotes are used to indicate text. To display quotes within text, it is necessary to press the quote key twice for each quote to be displayed.

Example 1

Enter: dsp "Say" "Hi" "to her."

Press: EXECUTE

Display: Say "Hi" to her.

FIG. 162 is a flow chart of the quote recognition subroutine which allows a user to place a quote mark inside a string delimited by quote marks.

THE PRINT STATEMENT

Syntax:

prt [any combination of text or expressions]

The print (prt) statement is used to rpint values or text on the calculator printer.

Examples

| Statement | Output | |
|---|---|---|
| prt 6 | | 6.ØØ |
| prt "One",1 | One | 1.ØØ |
| prt "This one" | This one | |

If an expression is to be printed, such as:

prt 6*7→X the expression is evaluated and the equivalent value is printed (and also stored in X in this example).

If no value or text is specified, such as:

prt then no operation takes place.

When printing lines of text and values, the printout follows this format:

A literal followed by a numeric is printed on the same line if it fits; otherwise the literal is printed and the number is printed on the next line.

Literals separated by commas begin on a new line and fold over on successive lines if they are longer than 16 characters.

Numerics separated by commas are printed one per line unless the format is flt 10 or flt 11 which require two lines.

THE ENTER STATEMENT

Syntax: ent [prompt, ] variable [, [prompt , ] variable. . .]

The enter (ent) statement is used to assign values to variables from the keyboard as a program runs. The variable can be a simple variable, array variable, or an r-variable.

When an enter statement is encountered in a program, a user keys in a number and presses CONTINUE.

When many items are entered from the keyboard, it is often helpful to have a message called a "prompt" displayed representing the variable being assigned a value. For instance:

| Example | Display |
|---|---|
| ∅: ent "Amount", A | Amount |
| 1: ent "Temperat ure",T | Temperature |

If no literal prompt is given, the calculator uses the name of the variable as the prompt.

If a null quote field is given as a prompt, such as 10: ent"",A the calculator retains any previously displayed message, unless a print operation is between the display statement and the enter statement. This is useful for variable prompts using the display statement. For example:

```
6:
7: 1974→Y;fxd ∅
8: dsp "Aug,",Y
9: ent "",A
10:
```

The display shows Aug, 1974 when a value is to be entered for 37 A".

A user can calculate values from the keyboard while the program waits in the enter statement. This is done simply by entering the calculation and pressing the EXECUTE key. If the value to be entered is the result of the "execute" operation, a user presses RECALL or RESULT (for numerics) then presses CONTINUE. Pressing EXECUTE immediately followed by pressing CONTINUE causes a default condition as if CONTINUE were pressed without entering a value.

A user can also enter expressions such as √5, and press CONTINUE. The calculation is performed automatically before the reuslt is entered.

Complex lines can be entered as the response to an enter statement. For example, assume the following program is entered by a user.

```
0: ent B
1: ent A
2: prt A
3: end
```

When the display is "B?" a user enters a value for B. Then when the display is "A?" a user enters 20; if B>20; 40. The user then presses CONTINUE. If the value that is entered for B is greater than 20, then "40" is printed, otherwise "20" is printed.

If CONTINUE is pressed without entering a value, the variable maintains its previous value and flag 13 is set.

To terminate a program during an enter statement, a user presses STOP. The program line is completed before the calculator stops.

Commands are not allowed during an enter statement.

Referring to FIGS 163A-F, the string constant prompts and the addresses of the enter variables are placed on the execution stack and the pre-enter routines are called when the statement is executed by the interpreter. These routines take the information off the stack and calculate the prompt that should be displayed. When the interpreter executes an enterprint statement (enp), it sets a bit in CFLAG so that the pre-enter routine will print as well as display the prompt.

After the prompt is constructed and placed in the I/O buffer, control is transferred back to the main idle loop. The user can then type characters using the normal I/O buffer editing routines. If the execute key is pressed, the normal execution loop is used to execute the line in the I/O buffer.

When the continue key is pressed, the post-enter routines are called to interpret the entered line and assign the resulting value to the enter variable. If nothing is entered, or if no result is obtained from the line, the enter variable is left unchanged and flag 13 is set. After the line is processed, the next enter variable is taken from the execution stack, and the process is repeated. After the parameter list is exhausted, control is transferred back to the interpreter to continue processing the rest of the user program.

THE ENTER PRINT STATEMENT

Syntax:

enp [prompt , ]variable [, [prompt , ]variable. . .]

The enter print (enp) statement is the same as the enter statement except that prompts and the entered values are printed and displayed as they are encountered.

For example, assume the following short program is entered to calculate the area of a circle:

```
0: enp "radius",
R
1: πRR→A
2: prt "area",A
3: end
```

If 2 is entered for R when the program is run, the printout will be:

```
radius
2
area 12.57
```

THE SPACE STATEMENT

Syntax:

spc [number of lines]

The space (spc) statement causes the printer to output the number of blank lines indicated by the expression. The number of lines can be an expression with a range of 0 through 32767. If no parameter is specified, one blank line is output.

| Examples: | |
|---|---|
| spc A + B | Space the number of lines specified by A + B. |
| spc 5 | Space 5 lines. |
| spc | Space one line. |

THE BEEP STATEMENT

Syntax:

beep

The beep statement causes the calculator to output an audible sound.

Example

The claculator normally beeps, displays error 67, and stops when the argument of the square root (√) function is negative. In the following short program the value entered for A is tested. If it is negative, the calculator still beeps and displays a message, but the program continues entering values.

```
0: fxd 4
1: "beg.":ent
"Argument",A
2: if A<0;gto
"error"
```

3: prt rA;gto
"beg."
4: "error":beep
5: dsp "r of
neg. no."
6: wait 2000
gto "beg."

THE WAIT STATEMENT

Syntax:
wait number of milliseconds

The wait statement causes a program to pause the specified number of milliseconds. The wait statement is often used with the display or enter statements to display a message for a specified time. The number of milliseconds can be an expression.

Since the wait statement takes time to be executed, small values in the wait statement are actually longer than a millisecond.

The maximum wait is around 32 seconds which is specified by the value of 32767.

| Examples: | |
|---|---|
| wait 2000 | pause for 2 seconds |
| wait (2*I) | pause for (2*I) milliseconds |

BINARY I/O OPERATIONS

Binary I/O operations are available to read and write individual data characters, and to transmit or receive control information using interface status lines. Binary I/O operations do not reference format or conversion statements. The data I/O modes and status line meanings are determined by the interface card.

THE WRITE BINARY STATEMENT

Syntax:
wtb select code, $expression_1$, $expression_2$, . . .

This statement outputs the 16-bit binary-equivalent result of each expression in the list. The usable range for each expression is an integer from 32767 through −32768. If the interface handles data in an 8-bit fashion, such as the HP-IB Interface or the byte mode with the HP 98032A, only the eight least-significant bits of each integer are output.

THE READ BINARY FUNCTION

Syntax:
rdb [select code]

Read binary is a function that inputs one 16-bit character and stores its integer-decimal value. If the interface handles data in an 8-bit fashion, only the eight least-significant bits are read.

Referring to FIG. 164, a flow chart of the read binary subroutine is shown. A user places the calculator in a special input mode in which the next key pressed, except for the RESET key, terminates the mode and returns the key code for that key to the program. Using the select code O for the calculator keyboard and display, as discussed hereinafter, the syntax is rdb (O). The keycode for the next user actuated key is returned for the value of the function therby allowing a user to redefine one or more of the keyboard keys.

THE READ STATUS FUNCTION

Syntax:
rds [select code]

This function reads the current status information transmitted from the specified device and returns a decimal equivalent number.

KDP Status Bits

Status information from the calculator's keyboard, display and printer is combined into an 8-bit byte. Although most of the bits are primarily for internal use only, two bits, bits 1 and 2, have programming uses in that Bit 1 indicates "1" whenever the printer is out of paper and Bit 2 indicates "1" whenever the printer is busy.

THE WRITE CONTROL STATEMENT

Syntax:
wtc (select code), expression

This statement ouputs a binary number to control functions on the Interface Card. One number is allowed with each statement. Control bits ∅, 1 and 5 are used to drive interface output lines CTL∅, CTL 1, and RESET. CTL∅ and CTL1 are optional peripheral control lines, while RESET is used to initialize the peripheral to its power-up state. A preset signal is automatically given when the calculator is switched on or when RESET is pressed. The interface ignores bits 2 and 3. Bits 4, 6 and 7 are usable when the Extended I/O ROM is in use.

HP INTERFACE BUS

The HP Interface Bus, HP-IB hereafter, is described in U.S. Pat. No. 3,810,103 and in the January, 1975, Hewlett-Packard Journal, Vol. 26, Number 5. It has a serial-byte bus structure which permits bi-directional communication between multiple devices. When a controller such as a calculator is used, up to 14 HP-IB compatible devices can be controlled via one interface card.

Instruments are controlled or programmed and data transmitted between devices on the bus. This is possible since each device connected to the bus has the potential of being a "talker" (sends data) or a "listener" (receives data) and has a unique talk and/or listen address by which a controller interrogates or communicates with the instrument. A unique threewire handshake technique allows the communication to take place at a speed determined only by the specific instruments being addressed. Slower devices will not slow down the communication speed of the bus as long as they are not addressed.

The interface system consists of 16 lines which are used to carry all data and control information. The bus structure is organized into three sets of signal lines: data bus, 8 signal lines; handshake or control, 3 signal lines; and general interface management, 5 signal lines.

The data bus carries 8-bit data and control messages in bit parallel, byte serial form. The messages are transmitted bi-directionally and asynchronously. The handshake and management lines are used to control data tranfer and timing on the bus. When the General I/O ROM is used, the handshake and management lines are controlled automatically, permitting the calculator to communicate with one instrument at a time. For complete control of all bus functions, the Extended I/O ROM is required.

THE STOP STATEMENT

Syntax:

stp

The stop statement stops program execution at the end of the line in which it is executed. Executing the stop statement in a keyboard line stops the keyboard line only.

When the stop statement is executed in a program, the line number of the next line to be executed is displayed. Pressing the CONTINUE key continues the program from the line number in the display. Pressing the STEP key "steps" from the displayed line number one line at a time. If any editing is performed after the program stops, pressing the CONTINUE key causes the program to continue from line O.

The stop statement can also be used for editing.

THE END STATEMENT

Syntax:

end

The end statement is usually the last line in a program. It causes the program to stop. The end statement resets the program line counter to line O and resets all go sub return pointers as explained more fully hereafter. The end statement cannot be executed during an enter statement, nor can it be executed in live keyboard mode.

HIERARCHY

In a statement containing functions, arithmetic operations, relational operations, logical operations, imbedded assignments, or flag operations, there is an order in which the statement is executed. This order is called the hierarchy, which is for the preferred embodiment:

| | |
|---|---|
| highest priority | functions, flag references, r-registers |
| | ↑ (exponentiation) |
| | implied multiply |
| | unary minus |
| | * / mod |
| | + − |
| | all relational operators (=,>,<,<=,>=,#) |
| | not |
| | and |
| lowest priority | or xor |

Expressions within parenthesis are given highest prority. Expressions within innermost parenthesis are evaluated first. If an assignment is within parenthesis, this rule does not always hold true. If operations are on the same level in the hierarchy, then they are evaluated from left to right as in : A*B*C*D.

SIGNIFICANT DIGITS

All numbers are stored internally with 12 significant digits regardless of the number format being used.

OPERATORS

The four groups of mathematical or logical symbols, called operators, are: the assignment operator, arithmetic operators, relational operators, and logocal operators.

Assignment Operator

Syntax:

expression→variable

The assignment key, labelled→and shown below the CLEAR key in FIG. 3, is used to assign values to variables.

| Examples: | |
|---|---|
| 1.4→A | The value 1.4 is assigned to the variable A. |
| B→A | The value of B is assigned to the variable A. |

To assign the same value to many variables, the assignment operator is used as in this example:

32→A→B→X→r4

Multiple assignments can also take the form:

(25→A) +1→B which is the same as 25→A ;
A+1→B

It should be noted that 25→A→1→B is not allowed; parenthesis are required for imbedded assignments.

Assignments can be imbedded within a statement such as if (A+1→A)<5. This allows the assignment and the comparison to be made in a single statement.

Arithmetic Operators

The six arithmetic operators are given below:

| Key label | Function | Example |
|---|---|---|
| + | Add (if unary, no operation) | A+B or +A |
| − | Subtract (if nuary, change sign) | A−B or −A |
| * | Multiply | A*B |
| / | Divide | A÷B |
| ↑ | Exponentiate | $A^B$ |
| mod | Modulus | A mod B is the remainder of A÷B when A and B are integers. A −int (A/B)*B |

In addition to the "*" symbol for multiplication, implied multiplication is also possible. In the following instance, implied multiplication takes place:

Two variables together (i.e.: AB).

A variable next to a value (i.e.: 5A).

A variable or value next to parenthesis [i.e.: 5(A+B)].

Parenthesis next to parenthesis [i.e.: (A+B)(X+Y)].

A variable, value, or parenthesis preceding a function name (i.e.: 32 sinA).

For example:

| | |
|---|---|
| AB → X | A times B is stored in X. |
| 2C → R | 2 times C is stored in R. |
| X5 → Y | X times 5 is stored in Y |
| (5)5 → X | 5 times 5 is stored in X. |
| A(B+C) → B | A times the sum B+C is stored in B. |
| (D+F)(R+T) → T | The sum of D+F times the sum of R+T is stored in T. |
| 5 abs B | 5 times the absolute value of B. |

Relational Operators

There are six relational operators shown in the following table.

| Key label | Function |
|---|---|
| = | equal to |
| > | greater than |
| < | less than |
| => or >= | greater than or equal to |
| =< or <= | less than or equal to |
| # or < > or > < | not equal to |

The result of a relational operation is either a one if the relation is true or a zero if it is false. Thus if A is less than B, then the relational expression A<=B, is true and results in a value of one. All comparisons are made to 12 significant digits.

The relational operators can be used in assignment statements, if statements and other statements which allow expressions as arguments. For example:

| | |
|---|---|
| A=B → C | Assignment statement. If A and B are equal, a 1 is stored in C; otherwise, a 0 is stored in C. |
| if A>B; . . . | If statement. If A is greater than B, then continue in the line; but if A is less than or equal to B, go to the next line. |
| jmp 3 | Jump statement. If A is greater than 3, jump 1 line, otherwise jump to the beginning of the line (jmp 0). |
| prt A*(A>B)+ B*(A<B) | Print statement. If A is greater than B, A is printed. If A is less than B, then B is printed. If A equals B, then "0" is printed. |

Logical Operators

The four logical operators, AND, OR, XOR (exclusive or), and NOR, are useful for evaluating Boolean expressions. Any value other than zero, false, is evaluated as true. The result of a logical operation is either zero or one as shown in the table below.

| Operation | Syntax | truth table | | |
|---|---|---|---|---|
| AND | expression and expression | A | B | A and B |
| | | F | F | 0 |
| | | F | T | 0 |
| | | T | F | 0 |
| | | T | T | 1 |
| OR | expression or expression | A | B | A or B |
| | | F | F | 0 |
| | | F | T | 1 |
| | | T | F | 1 |
| | | F | F | 1 |
| XOR (exclusive OR) | expression xor expression | A | B | AxorB |
| | | F | F | 0 |
| | | F | T | 1 |
| | | T | F | 1 |
| | | T | T | 0 |
| NOT | not expression | A | not A | |
| | | F | 1 | |
| | | T | 0 | |

MATH FUNCTIONS AND STATEMENTS

Simple or complex problems are solved using the nineteen math functions and four math statements which are explained hereinafter and the six math operators explained hereinbefore.

Parenthesis are necessary when a "+" or "−" sign precedes the argument. In the following examples of Functions, parenthesis are shown only where they are required.

| Syntax | Description | Examples (fxd 5) |
|---|---|---|
| √ expression | The square root function returns the square root of an expression which is non-negative. | √64 = 8.00000<br>√π = 1.77245 |
| abs expression | The absolute value function determines the absolute value of the expression. | abs (−3.09) − 3.09000<br>abs 330.1 − 330.10000 |
| sgn expression | The sign function returns a −1 for negative expression, 0 if the expression equals 0, and 1 for a positive expression. | sgn (−18) = −1.00000<br>sgn 0 = 0.00000<br>sgn 34 = 1.00000 |
| int expression | The integer function returns the largest integer less than or equal to the expression. This is often referred to as the "floor" integer value of the expression (see programming hints). | int 2.718 = 2.00000<br>int (−3.24) = 04.00000 |
| frc expression | The fraction function gives the fractional part of a number. It is defined by: <expression> −int <expression> | frc 2.718 = .71800<br>frc (−3.24) = .76000 |
| prnd (expression, rounding specification) | The power-of-ten rounding function returns the value of the argument rounded to the power-of-ten position indicated by the rounding specification. The argument remains unchanged. | prnd (127.375, −2) = 127.38000<br>127.375 is rounded to the nearest hundredth ($10^{-2}$). |
| drnd (expression, number of digits) | The digit round function rounds the argument to the number of digits specified. The leftmost significant digit is digit number 1. The argument remains unchanged. | drnd (73.0625,5 = 73.06300<br>drnd (−65023,1) = −70000.00000<br>drnd (.055,1) = 0.06000 |
| min (list of | The min function returns | 0: dim A[3];2→A[1] |

-continued

| Syntax | Description | Examples (fxd 5) |
|---|---|---|
| expressions and arrays) | the smallest value in the list. An entire array can be specified by using an asterisk, such as B[*]. | 1: 9→A[2];3→A[3]<br>min (A[*]) = 2.00000<br>min (2, −3, −3,4) = 3.00000 |
| max (list of expressions and arrays) | The max function returns the largest value in the list. An entire array can be specified by using an asterisk, such as B[*]. | 0: dim A[3]; 2→A[1]<br>1: 9.→A [2]; 3→A[3]<br>max (A[*]) = 9.00000<br>max (5,4, −3,8) = 8.00000 |
| rnd expression | The random number function generates a pseudo-random number in the range 0≦ rnd expression <1. The starting seed for the function is π/180 (which is .0174532925200). This seed is initialized when the calculator is turned on, erase a is executed, or RESET is pressed. If the expression is negative, then the expression becomes the new seed. To obtain other good seeds, use an expression between 0 and −1: The more non-zero digits in the value, the better. Last digits of 1,3,7 or 9 are preferable. | rnd 1 = .67822<br>rnd (−.827) = .50700 |

Exponential and Logarithmic Functions

The math errors and default values associated with the log, and ln (natural log) functions are explained in detail hereinafter in the section on Math Errors.

| Syntax | Description | Examples (fxd 5) |
|---|---|---|
| ln expression | The natural logarithm function calculates the logarithm (base e) of a positive valued expression. | ln 8001 = 8.98732<br>ln .0026 = −5.95224 |
| exp expression | The exponential function raises the constant, naperian $e_1$ to the power of the computed expression. The range of the argument is from −227.95 through 230.25. | exp 1 = 2.71828<br>exp (−3) = .04979 |
| log expression | The common logarithm function calculates the logarithm (base 10) of a positive valued expression. | log 305.2 = 2.48458<br>log .0049 = −2.30980 |
| tn ↑ expression | The ten to the power function raises the constant, 10, to the power of the computer expression. The range of the argument is from −99.0000000002 through 99.9999999997. This function executes faster than 10 ↑ expression. | 5 tn ↑ 2 = 500.00000<br>tn ↑ (−3) = .00100 |

Trigonometric Functions and Statements

The six trigonometric functions are all calculated in the currently set angular units. Three trigonometric statements explained in this section are used to set the angular units. Math errors and default values associated with the tan, asn, and acs functions are covered in detail hereinafter in the section on Math Errors.

Referring to FIG. 165, a flow chart illustrating how the calculator prescales trigonometric arguments is shown. The calculator reduces arguments to the first octant (0–45 degrees) from any original value. The argument is reduced in its own units, that is in degrees, radians, or grads. First the argument is reduced to the unit circle (0–360 degrees) by eliminating all full multiples of 360. The remainder is then reduced to the first octant and converted to radians.

Degrees are set when the calculator is switched on, erase a is executed, or RESET is pressed. To change the angular units, a user executes one of the following statements;

| Syntax | Description |
|---|---|
| deg | Specifies degrees for all calculations which involve angles. A degree is 1/360th of a circle. |
| rad | Specifies radians for all calculations which involve angles. There are 2π radians in a circle. |
| grad | Specifies grads for all calculations which involve angles. A grad is 1/400th of a circle. |

-continued

| units | Displays the current angular units. | |
|---|---|---|
| Syntax | Description | Examples (fxd 5) |
| sin expression | The sine function determines the sine of the angle represented by the expression in the current angular units. | deg; sin 45 = 0.70711<br>rad; sin (π/6) = 0.50000<br>grad; sin (−70) = −0.891 |
| cos expression | The cosine function determines the cosine of the angle represented by the expression in the current angular units. | deg; cos 45 = .70711<br>rad; cos (π/6) = .86603<br>grad; cos (−70) = .45399 |
| tan expression | The tangent function determines the tangent of the angle represented by the expression in the current angular units. | deg; tan 45 = 1.00000<br>rad; tan (π/4) = 1.00000<br>grad., tan 50 = 1.00000 |
| asn expression | The arc sine function returns the principal value of the arcsine of the expression in the current angular units. The range of the argument is −1 through +1. The range of the result is −π/2 to +π/2(radians). | deg: asn .8 = 53.13010<br>rad; asn .8 = 0.92730<br>grad; asn .8 = 59.03345 |
| acs expression | The arccosine function returns the principal value of the arccosine of the expression in the current angular units. The range of the argument is −1 through +1. The range of the result is 0 to π (radians). | deg; acs (−.4) = 113.57818<br>rad; asn .8 = 1.98231<br>grad; acs (−.4) = 126.19798 |
| atn expression | The arctangent function calculates the principal value of the arctangent of the expression in the current angular units. The range of the result is −π/2 to +π/2 (radians). | deg; atn 20=87.13759<br>rad; atn 20=1.52084<br>grad; atn 20=96.81955 |

MATH ERRORS

The numerals 66 through 76 are automatically displayed in response to the occurrence of a math error and flag 15 is set. When flag 14 is set, math operations which normally cause an error to be displayed, result in a default value.

When printing, displaying or storing default values of ±9.99999999999 e511, the value is automatically converted to ±9.99999999999e99.

66 is displayed in response to division by zero. The default value is 9.99999999999e511 if the dividend is negative. For example:

−9.5/0=−9.99999999999e511

A mod B with B equal to zero. The default value is 0. For example.

32 mod 0=0

67 corresponds to the square root of a negative number. The default value is √(abs(argument)). For example:
√(−36)=6.

68 corresponds to the: tangent of (n*π/2 radians; tangent of (n*90 degrees); tangent of (n*100 grads); where n is an odd integer. The default value is 9.99999999999e511 if n is positive; and −9.99999999999e511 if n is negative.

69 corresponds to ln or log of a negative number. The default is in (abs(argument)) or log (abs(argument)), respectively. For example:

ln (−301)=5.70711 log (0.001)=−3.00000

70 corresponds to ln or log of zero. The default value is −9.99999999999e511.

71 corresponds to asn or acs of a number less than −1 or greater than 1. The default value is (asn (sgn(argument)) or acs (sgn(argument)), respectively. For example (in degrees):

asn (−10)=asn (−1)=−90 acs (1.6)=acs (1)=0

72 corresponds to a negative base to a non-integer power. The default value is (abs(base)) ↑ (non-integer power). For example:

(−36) ↑ (0.5)=6

73 corresponds to zero to the zero power (O ↑ O). The default value is 1.

74 represents full-precision overflow. The default value is 9.99999999999e99 or −9.99999999999e99.

75 represents full-precision underflow. The default value is zero. For example (1e-66)*(4e-35)→A A will equal 0

76 represents an intermediate result underflow. The default value is 9.99999999999e511 or −9.99999999999e511. For example:

(1e 99) ↑ 6 = 9.99999999999e511

(−13 99) ↑ 6 = −9.99999999999e511

77 represents an intermediate result underflow. The default value is zero. For example:

(1e-10) ↑ 60 = 0

BRANCHING STATEMENTS

There are three statements used for branching: the go to (gto) statement, the jump (jmp) statement, and the go sub (gsb) statement.

The following three types of branching may be used for both go to and go sub statements:

Absolute Branching—branch to a specified line number (such as gto 10).

Relative Branching—branch forward or backward in the program a specified number of lines relative to the current line (such as gsb - 3).

Labelled Branching—branch to an indicated label (such as gto "First").

Line Renumbering

Line numbers are automatically renumbered when a program line is inserted or deleted. As lines are inserted or deleted in a program, the line number of any relative or absolute go to or go sub statements is changed to reflect the insertion or deletion. The entire program is checked before any deletion is made. If the line being deleted is the destination of a relative or absolute go to or go sub statement, an error is displayed and no deletion occurs unless an asterisk (*) is used in the delete command, the delete command being more fully described hereinafter.

Labels

Labels are characters within quotes located at the beginning of a line, after a gto or gsb statement, or after a run or continue command. Labels at the beginning of a line must be followed by a colon.

Labels are used for branching, the label in the gto or gsb statement is compared to the line labels in the program until a match is found. Then, at the end of the line, a branch is made to the line containing the label. When a branch is made to a label, the program is scanned beginning at line O until a matching label is found.

THE GO TO STATEMENT

The go to (gto) statement causes program control to transfer to the location indicated. There are three types of branching used with the gto statement, absolute, relative, and labelled.

Absolute Go To

Syntax:

gto line number

An absolute go to statement is used to branch to the indicated line number. The line number must be a number. Inserting an absolute go to statement at line zero causes the line number of the go to statement to be incremented by one.

When an absolute go to statement is executed from the keyboard, the program line counter is set to the specified line number. To view the line, a user presses the ↑ Display key.

Relative Go To

Syntax:

gto + number of lines gto − number of lines

A relative go to statement is used to branch forward (+) or backward (−) the specified number of lines, relative to the current line number. The line number must be a value.

Labelled Go To

Syntax:

gto label

A labelled go to statement is used to branch to the indicated label (see section on labels). This is the most convenient type of branching since no line numbers have to be considered.

Example:

gto "beg." go to the line labelled by "beg."

Multiple Go To Statements

Multiple go to statements in a line are used for N-way branching, described hereinafter, when used with an if statement.

THE JUMP STATEMENT

Syntax:

jmp number of lines

The jump (jmp) statement allows branching from the current line number by the number of lines specified. This statement is similar to the relative go to statement except that the number of lines can be an expression. If the number of lines is positive, the branch is forward in the program. If the number of lines is zero, the branch is to the beginning of the current line. If the number of lines is negative, the branch is backward in the program. If the number of lines is not an integer, then it is rounded as follows:

The value is rounded to the next greater integer if the fractional part is 0.5 or larger.

The fractional part is truncated if its value is less than 0.5.

The jump statement executes slower than the go to statement.

The jump statement can only be at the end of a line, otherwise error Ø7 is displayed.

THE GO TO SUBROUTINE AND RETURN STATEMENTS

The go to subroutine (gsb) statement allows branching to subroutine portions of a program. A return pointer is set up when the go sub statement is executed. The return pointer points to the line below the line containing the go sub statement. The return (ret) statement returns the program execution to the pointer location. The return statement must be the last statement executed in the subroutine and must be the last statement in a line. The depth of go sub nesting is limited only by the amount of available memory.

There are three types of go sub statements: absolute, relative, and labelled.

Absolute Go Sub

Syntax:

gsb line number

An absolute go sub statement is used to go to the subroutine at the specified line number. The line number must be a number.

Inserting a gsb line number at line zero causes the line number of the go sub statement to be incremented by one.

Relative Go Sub

Syntax:
gsb +number of lines
gsb −number of lines

A relative go sub statement provides forward (+) or backward (−) subroutine branching the specified number of lines, relative to the current line number. The number of lines must be a number.

Labelled Go Sub

Syntax:
gsb label

A labelled go sub statement is used to branch to the subroutine at the indicated label. This is the most convenient form of go sub branching since no line numbers need to be considered.

When branching to a label, a comparison is made on all characters in the label.

Multiple Go Sub Statements

Multiple go sub statements in a line are used for N-way branching when used with the if statement, described hereinafter.

The gsb statement is useful where the same routine will be done many times in a program and called from different places in the main program.

Calculated Gosub Branching

Using the jump statement and the go sub statement, calculated branching to subroutine is possible. This form of subroutine branching is called the calculated go sub and has the form:

gsb line number, number of lines, or label; jmp expression

The line number or label in the gsb is ignored and the calculator branches to the subroutine designated by the computed jump expression. If a 3 is entered in line zero of the following program, for example, the program branches to the subroutine at line 4.

```
Ø: ent N
1: gsb "X";jmp N
2: prt "end"
3: "X":end
4: prt "subl";
ret
5: prt "sub2";
ret
6: prt "sub3";
ret
```

The calculator automatically adjusts the gto and gsb destinations when program lines are inserted or deleted so that gto xx or gsb xx statement line number (xx) always point at the same line regardless of lines being inserted or deleted in the program.

This feature is desirabe since all line numbers in a program are implicit. Therefore if a line is inserted, all lines after that line are associated with a line number one greater than before the insert.

This feature operates under the following editing operations:

| | |
|---|---|
| 1 | FETCH line no.<br>EXECUTE<br>enter line from keyboard<br>INSERT |
| 2 | FETCH line no.<br>DELETE |
| 3 | del <line no. 1>[,line no. 2][,*]<br>EXECUTE |

Referring FIG. 166, detailed flow charts are given illustrating the manner in which the calculator adjusts gto and gsb destinations. If an attempt is made to delete lines, the first step is to prescan the program to be sure that none of the gto or gsb statements reference the deleted lines. If the deleted lines are referenced, an error is given and the delete operation is terminated before any lines are deleted or any gto/gsb's are adjusted.

If the lines that are to be deleted are not gto/gsb destinations, then the adjustment is made and the deletion takes place. If the deletion is "del line no. 1,*"or" del line no. 1, line no. 2,*", no prescan is made nor are any errors generated. All gto/gsb's whose destination are deleted have their destinations adjusted to point at the first line after the deleted section.

THE IF STATEMENT

Syntax:
if expression

The if statement is used to branch based on a logical decision. When an if statement is encountered, the expression following it is evaluated. If the computed expression is zero (false), program control resumes at the next program line (unless the preceding statement was a go to or go sub statement as explained hereinafter under n-way branching. If the computed expression is any other value, it is considered true, and the program continues in the same line. The if statement is most often used with expressions containing relational operators or flags.

N-WAY BRANCHING

The if statement used with a go to or go sub statement makes it possible to branch to any of several locations. This type of branching is referred to as n-way branching, and has the following forms:

gto . . . ; if . . . ; gto . . .

or gsb . . . ; if . . . ; gsb . . .

If the first if statement is false, then the branch is determined by the first go to or go sub statement. If the first if statement is true, the second go to or go sub statement determines the branch.

FLAGS

Flags are programmable indicators that can have a value of one or zero. When a flag is set, its value is one; when it is cleared, its value is zero. A flag's value can be complemented by the complement flag (cmf) statement. There are 16 flags, numbered Ø through 15. The following flags can have special meanings:

Flag 13—is automatically set if the continue key is pressed without entering data in an enter statement or if the stop key is pressed in an enter statement. Flag 13 is automatically cleared when data is supplied in an enter statement.

Flag 14—when flag 14 is set, the calculator ignores math errors such as division by zero and supplies a default value.

Flag 15—is automatically set whenever a math error occurs, regardless of the state of flag 14.

THE SET STATEMENT

Syntax:

sfg [flag number, . . .]

The set flag (sfg) statement sets the value of the specified flags in the list to one. The flag number can be a value or an expression. If sfg is executed alone, all flags (0 through 15) are set.

| Examples: | |
|---|---|
| sfg 2 | Set flag 2. |
| sfg (A+1) | Set the flag designated by (A+1). |
| sfg 1,X | Set flag 1 and the flag designated by X. |

THE CLEAR STATEMENT

Syntax:

cfg [ flag number, . . .]

The clear flag (cfg) statement clears the specified flags in the list to zero. The flag number can be a value or expression. If cfg alone is executed, all flags (Ø through 15) are cleared.

| Examples: | |
|---|---|
| cfg 14 | Clear flag 14. |
| cfg (flg 2) | Clear the flag designated by the value of flag 2 (either flag one or flag zero will be cleared). |
| cfg 11, 12 | Clear flags 11 and 12. |

THE COMPLEMENT FLAG STATEMENT

Syntax:

cmf [ flag number, . . .]

The complement flag (cmf) statement changes the value of the flags specified. If a set flag is complemented, its new value is zero. If a cleared flag is complemented, its new value is one. A value or expression can be used for the flag numer. To complement flags Ø through 15, the complement flag statement without parameters is executed.

| Examples: | |
|---|---|
| cmf 1 | Complement flag 1. |
| cmf (X−1) | Complement the flag designated by (X−1). |
| cmf 3,4,5 | Complement flags 3,4, and 5. |

THE FLAG FUNCTION

Syntax:

flg flag number

The flag (flg) function is used to check the value of a flag. The result of the flag function is zero or one. One indicates a set flag; zero indicates a cleared flag.

| Examples: | | |
|---|---|---|
| 4: | if flg2;jmp 5 | If flag 2 is set, jump 5 lines. |
| 5: | flg15→A | If flag 15, is set 1→A; if flag 15 is cleared, 0→A. |

THE DIMENSION STATEMENT dim item [ , item, . . .]

item may be: simple variable array variable [subscript [ , subscript, . . .]]

The dimension (dim) statement reserves memory for simple and array variables, and initializes the indicated variables to zero. r-variables are not allowed in a dimension statement.

Variables in the list allocate memory in the order that they appear if they have not already been allocated. Thus, all the variables dimensioned in any one dimension statement are stored in a contiguous block of memory.

In the dimension statement, the subscripts of an array can be specified by an expression. For example:

```
Ø: ent N,I,r2
1: dim A[N,I],
B[r2],C[3,2*N]
```

Dimension statements may appear anywhere in a program but the same dimension statement can only be executed once. The number of dimension statements is limited by memory size. The number of subscripts and the size of subscripts is limited by memory size and line length.

Specifying Bounds for Subscripts

The upper and lower bounds for the subscripts of an array can be specified. The lower bound must be specified before the upper bound and separated by a colon. For example:

```
Ø: dim S[−3:Ø,
4:6]
```

The above statement reserves the same amount of memory as:

```
Ø: dim X[4,3]
```

The elements of array, S, are referenced as:

| | | |
|---|---|---|
| S[−3,4] | S[−3,5] | S[−3,6] |
| S[−2,4] | S[−2,5] | S[−2,6] |
| S[−1,4] | S[−1,5] | S[−1,6] |
| S[0,4] | S[−,5] | S[0,6] |

If a lower bound is not specified, as in X[4,3], it is assumed to be 1, the same as X[4,1:3].

THE CLEAR SIMPLE VARIABLES STATEMENT

Syntax:

csv

The clear simple variables (csv) statement clears any allowed simple variables from A through Z to zero. The clear simple variables statement does not de-allocate variables. Therefore, an error results when the following line is executed:

7→A; CSV; dim A

THE LIST STATEMENT

Syntax:

list [line number 1 [,line number 2]]

list special function key list k

The list statement is used to obtain a printed listing of a program, section of a program, or special keys. If no parameter follows the list statement, the entire program is listed. If one line number is specified, the program is listed from that line to the end. If two line numbers are specified, then the program segment between the two line numbers, inclusive, is listed. To list all the special function keys, execute lisk k (for list keys). When list is followed by pressig an individual special function key, then only that key is listed. The list statement must be stored as the last statement in a line.

| Examples: | |
|---|---|
| list | Lists the entire program. |
| list 10,15 | List lines 10 through 15. |
| list 4,4 | List line 4. |
| list k | List the special function keys. |
| list f12 | List special function key $f_{12}$ (shift $f_0$). |

At the end of a listing, a checksum is printed. This checksum is useful for detecting interchanged or omitted lines and characters. This is because any difference in the programs generates a different checksum. In the following two programs, only the characters "rt" in line 1 are interchanged. Note that the checksums are different, the checksums being the bottom five digit numbers preceded by an asterisk.

```
ø: ent N          ø: ent N
1: prt "sprt.     1: prt "sptr.
of ",N            of",N
2: prt "          2: prt "
is",rN            is",rN
3: end            3: end
*3ø418            *3ø414
```

Used and Remaining Memory

After a list operation, two values are displayed. The first value is the total length of the program in bytes where a byte is 8 bits. To store the program, a file must be marked at least that long. The second value is the remaining memory in bytes.

EDITING

The first step in editing is to find the lines which require changes. This is done in several ways. One way is to step through a program by pressing the step key one time for each line to be executed and checking the results after each executed program line.

Another way is to use the trace (trc), stop (stp) and normal (nor) statements. When program lines are traced, variables and flags which are assigned values are printed. This allows a user to monitor program activity in individual program lines. Using the stop statement, the program is stopped whenever a specified program line is encountered. The normal statement is used to terminate tracing and stopping. More information on the stop, trace and normal statements is explained hereinafter under editing statements.

To modify characters within a line, a user presses the FETCH key followed by the line number of the line requiring the change and then presses the execute key. The line will appear in the display. A user next presses either BACK if the change is closer to the end of the display or FWD if the change is closer to the front. Once a flashing cursor is over the location needing correction, a user either inserts characters, deletes characters, or writes over the existing characters. To insert characters, the INS/RPL key is pressed. This changes the flashig cursor to a flashing insert cursor. Characters are inserted at the left of this cursor. To delete characters, the DELETE key is pressed for each character to be deleted.

To modify lines within a program, the FETCH key or the ↑ and ↓ keys are used to bring the line into the display. To delete the line, the line DELETE key is pressed.

If the line being deleted is a line referenced by a relative or absolute go to or go sub statement, an error 36 will occur. A user can either execute the delete (del) command with the optional asterisk (*) parameter, explained more fully hereinafter, or adjust the line reference in the go to or go sub statement accessing that line.

To insert a line, a user fetches the line where the inserted line is to be located, types the line into the display and presses the line INSERT key to store it. All the lines from the fetched line on are automatically renumbered (incremented by one). the line reference of go to or go sub statements are also incremented if necessary.

EDITING STATEMENTS

The trace (trc) statement, stop (stp) statement, and normal (nor) statement are also used for editing programs. The three statements have dual roles in that their action depends upon whether any parameters are specified.

THE TRACE STATEMENT

Syntax: trc [beginning line number[, ending line number ]]

The trace (trc) statement monitors the activity of a running program. In trace mode, line numbers, any value assignments, and flags are printed as encountered in a running program.

An entire program, sections of a program, or individual lines in a program can be traced. To trace an entire program, the first line number is set to 0 and the second line number is set greater than or equal to the line number of the last line in the program. To trace a block of line numbers, trc followed by the beginning and ending line number in the block is executed. To trace a single line, trc followed by that one line number is executed.

The trace statement, when followed by parameters, sets a trace flag at each indicated line of the program. When the normal (nor) statement is executed without parameters, these line trace flags remain set, but trace mode is disabled. By executing the trace statement again, those flagged lines again are traced. To clear the line flags, the normal statement followed by the line numbers of the lines which are traced is used.

Example: Assume the following program is entered.

| | |
|---|---|
| ø: trc 1,12 | Traces lines 1 through 12. |
| nor | Disables tracing. |
| trc | Traces lines 1 through 12. |
| nor 3 | Clears trace flag at line 3; and tracing continues on lines 1, 2, and 4–12. |
| nor | Disables tracing. |

THE STOP STATEMENT

Syntax:

stp line number [, line number]

This stop (stp) statement is used to set stop flags at the beginning of program lines. When a program reaches a line with a stop flag set (and when the master flag is set), the program stops at the beginning of that line.

When only the first line number is specified, a stop flag at the beginning of that line is set. If the program reaches the beginning of that line, execution stops. When a block of line is specified by two line numbers, the stop flags at the beginning of all the lines in that block are set. If execution reaches any line in that block the program stops at the beginning of that line.

The normal statement followed by a line number or two line numbers clears the individual line stop flags.

THE NORMAL STATEMENT

Syntax:

nor [line number 1 [, line number 2]]

The normal (nor) statement clears stop and trace flags. Tracing and stopping are terminated if nor is executed without line numbers, but individual stop and trace flags are not cleared on the program lines. The trace or stop flag at a line is cleared and overall tracing continues if nor is followed by the line number. When nor is followed by two line numbers, the trace and stop line flags of all the lines in the block are cleared.

All the trace and stop line flags are cleared if nor is followed by the beginning and ending line numbers of the program.

OPERATION OF TRACE, STOP, AND NORMAL

To effectively use the trace, stop, and normal statements, the intenal operation should be understood. There is one master flag which enables and disables overall tracing and stopping. In addition, each line has two flags. The trace flag enables and disables tracing of the line. The stop flag enables and disables selective stopping at the line.

Executing any of the following statements sets the master flag which enables tracing and selective stopping:

stp with parameters
trc with parameters
trc without parameters

The normal (nor) statement without parameters clears the master flag which disables tracing and stopping.

The line trace flags are set by executing trc with parameters. The line stop flags are set by executing stp with parameters. The line trace and stop flags are cleared by executing nor with parameters.

The trace and stop flags are recorded on the tape cartridge by including the optional debug ("DB") parameter in the record file (rcf) statement as explained more fully hereinafter.

COMMANDS

Commands differ from statements in that they can only be executed from the keyboard. Commands cannot be stored as part of a program.

THE RUN COMMAND

Syntax: run [line number or label]

The run command clears all variables, flags, and return pointers to go subs, then starts program execution. If a line number is specified, the program begins execution at the specified line number. If a label is specified, execution begins at the specified label in the program.

THE CONTINUE COMMAND

Syntax:

cont [line number or label]

The continue (cont) command continues the program without altering variables, flags, or go sub return pointers. If no line number is specified, the program continues from the current position of the program line counter. If a line number is specified, the program continues at that line. If an edit or error has taken place since a previous "run" or "continue", continue without parameters causes execution at line Ø.

THE DELETE LINE COMMAND

Syntax:

del line number 1[, line number 2][,*]

The delete (del) command is used to delete lines or sections of programs. When one line number is specified, only that line is deleted. When two line numbers are specified, all lines in the block are deleted. del 0, 9999 is executed to delete an entire program, and leave the variables.

| Examples: | |
|---|---|
| del 28 | Delete line 28. |
| del 13, 20 | Delete lines 13 through 20. |
| del 18, 9999 | Delete program from line 18 to the end (this does not affect variables). |

If the optional asterisk (*) parameter is specified, any go to or go sub statements which reference deleted lines are adjusted to reference the first line after the deleted section.

THE ERASE COMMAND

Syntax:

erase [a or v or k or special function key]

The erase command is used to erase programs, variables, and special function keys as shown below.

| Command | Meaning |
|---|---|
| erase | Erases program and variables when executed. |
| erase a | Erases all when executed. |
| erase v | Erases all variables when executed. |
| erase k | Erases all special function keys when executed. |
| erase fn | Erases the special function key indicated by fn. |

THE FETCH COMMAND

Syntax:

fetch [line number or special function key]

The fetch command brings individual program lines into the display. This is useful for editing lines or for viewing individual program lines. Fetching a special function key displays the definition of the key or "f" followed by the key number if the key is undefined. Executing fetch alone, fetches line 0.

LIVE KEYBOARD

The calculator's live keyboard mode provides additional power for executing single or multi-statement lines while a program is running. Among other things, a user can peform math operations, monitor program activity, and alter program flow in live keyboard mode. Two statements described hereinafter permit the live keyboard mode to be turned on or off. While a program is running, a live keyboard operation is executed by keying the live keyboard operation into the display and pressing the execute key. At the end of the current program line, the live keyboard line is executed, the live keyboard operation being executed entirely before the program continues.

If the running program uses the display, keys which are pressed in live keyboard mode will disappear from the display but the line which is typed in is saved and is viewed by pressing RECALL.

If the running program continually uses the display, keys which are typed in will keep disappearing, even if RECALL is pressed. A user presses either ↑ or ↓ to view the line for about one second. When either of these keys is held down, the display remains and the running program halts until the key is released. For example, assume the following program is running in the calculator:

```
0: dsp "Live Keyboard"; wait 100
1: gto 0
```

When the following line is entered from live keyboard, it will not be visible:

```
prt(√25→A)
```

By pressing ↑ or ↓ the line will be displayed for about one second.

when the execute key is pressed, the line will be executed and 5 will be stored in A and printed.

Results of calculations performed in live keyboard disappear from the display if a running program uses the display. A special function key can be defined to preserve the displayed result long enough to be viewed as in this examnple:

press: FETCH $f_0$
type-in: *; wait 1000
press: STORE

If a user, for example, types in a calculation such as **5*65**, and presses $f_0$ instead of the execute key, the result of the calculation remains in the display for about one second.

LIVE KEYBOARD MATH

Any math operations can be executed from live keyboard. Thus, when a program is running and a few figures need to be calculated, a user merely keys in the operation and presses execute.

STATEMENTS IN LIVE KEYBOARD

If a user desires a listing of the current program, he presses the LIST key then presses execute.

To check a variable in the program, a user keys in the variable name, such as A or B[4] and presses execute. The value of the variable will be displayed.

To change a variable from live keyboard, one enters the new value and assigns it to the variable to be changed. For example, to reset a counter such as C+1→C to 0, a user keys in 0→C and presses execute.

SUBROUTINES FROM LIVE KEYBOARD

Parts of a program can be executed from live keyboard as subroutines using the gsb statement. For example, the following section of a running program is used to calculate the factorial of a number, N.

```
11: "factorial":
12: if frc(N)>Ø
or N>Ø;prt N,
"no factorial";
ret
13: if N=Ø;prt
N,"factorial=",
1;ret
14: 1→C→F
15: if C=N+1;
prt N,"factoria
1=",F;ret
16: C*F→F;C+1→C;
gto 15
```

By assigning a value to N (such as 4→N), and then executing gsb "factorial" and live keyboard, the values of N and N factorial are printed, and the program continues.

Control is returned to the display in live keyboard mode whenever return (ret), stop (stp), including stop flags, or end is executed after the gsb statement, but the main program continues running. A second stop will stop the main program.

SPECIAL FUNCTION KEYS IN LIVE KEYBOARD

Although the special function keys $f_0$ through $f_{23}$ *cannot be defined from live keyboard, they can be used from live keyboard. In the following example, the special function keys are used to alter the flow of a running program.*

Assume, for example, the special function keys are defined as follows:

| f0 : | f1 : | f2 : |
|---|---|---|
| *1 → F | *2 → F | *3 → F |

Assume further that the program is:

```
Ø"wait":dsp
"waiting";wait
5ØØ;jmp F
1: gto "first"
2: gto "second"
3: gto "third"
4: "first":prt
"first";Ø→F;
gto "wait"
5: "second":prt
"second";Ø→F;
gto "wait"
6: "third":prt
"third";Ø→F;
gto "wait"
```

When the program is run, "waiting" is displayed until one of the immediate execute special functin keys is pressed and the program then branches to the line where either "first", "second", or "third" is printed. Although this is a simple example, it shows how program flow is altered in live keyboard mode.

ERRORS IN LIVE KEYBOARD

Commands are not allowed in live keyboard mode. Commands executed in live keyboard cause error 3 to be displayed. Also, the following keys cause an audible beep when pressed and are ignored in live keyboard mode:

| STEP | LINE DELETE | INSERT | RUN | STORE | CONTINUE |
|---|---|---|---|---|---|

The go to and end statements cause error 9 to be displayed in live keyboard mode. The following cartridge statements, described more fully hereinafter, are not allowed in live keyboard mode: load program (ldp), load key (ldk), and load file (ldf) of a program file.

THE LIVE KEYBOARD ENABLE STATEMENT

Syntax:

lke

Live keyboard enable (lke) turns on the live keyboard. The calculator is in live keyboard mode when it is turned on and when RESET is pressed. To disable live keyboard, the live keyboard disable (lkd) statement is used.

| Example: | |
|---|---|
| lke | Enable live keyboard. |

THE LIVE KEYBOARD DISABLE STATEMENT

Syntax:

lkd

The live keyboard disable (lkd) turns off the live keyboard. This is useful when a program is running which the user doesn't want disturbed. A user can execute a live keyboard enable (lke) statement from a program to enable live keyboard when this statement is executed.

Referring to FIGS. 167A–B, the keys typed by the user during live keyboard are entered into the KBD buffer under interrupt control. The normal mal I/O buffer editing routines are utilized by setting editing pointers to edit the KBD buffer during the processing of the live keyboard key. The use of the KBD during live keyboard allows the running program to use the I/O buffer for normal programmed I/O without interfering with the live keyboard line that is being edited.

Referring to FIGS. 168A–B, any error that occurs during the processing of alive keyboard key is trapped using the error by-pass link, so that the normal operation of the running program is not affected.

Referring to FIGS. 169A–B, a bit is set in the interpreter communication word (XCOMM) if the live keyboard key was the execute key, or a special key with an immediate execute character. At the end of each program line, the interpreter checks XCOMM and returns if any bit is set. AXCMM is then called to process the bits in XCOMM. If the live keyboard bit is set (bit 14), the live keyboard execution routines are called. These routines save the necessary pointers to enable the resumption of the current user program, and call the interpreter to execute the line in the KBD buffer. After the line is executed, the pointers are restored and the execution of the running program is resumed.

Errors encountered during the execution of a live keyboard line are detected by the error routines. Live keyboard execution clean-up is performed when an error occurs so that the user program is not affected by live keyboard errors.

GSB IN LIVE KEYBOARD MODE

The user can execute a line that contains a subroutine call from the keyboard while a program is running. The processing of this line is the same as the normal live keyboard execution except that the interpreter changes the state of the system during the execution of the subroutine. The state of the system is indicated by the word CSTAT. The values that CSTAT can have are as follows:

0. idle or key entry
1. execution of a keyboard line
2. running a program
3. live keyboard execution
4. enter statement-waiting or key entry
5. execution of a line during an enter statement
6. execution of a subroutine from live keyboard.

The state is changed from 2 to 3 by the live keyboard processing routines and from 3 to 6 by the interpreter when it encounters a subroutine call.

Referring to FIG. 169B, the live keyboard execution routines utilize an interpret (AINTK)-XCOMM service routine (AXCMM) loop similar to that of the normal execution loop. Thus, the execution of a live keyboard subroutine is essentially the same as the execution of a user program, except that the state is 6 rather than 2. This state value of 6 is used by the error routines to trap the live keyboard errors and by the keyboard interrupt service routine to disable live keyboard.

TAPE CARTRIDGE OPERATIONS

Figure 170A:
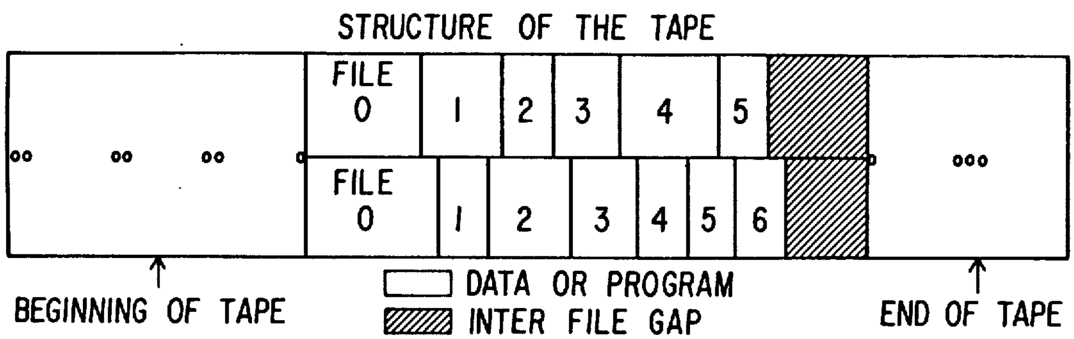
Figure 170B:
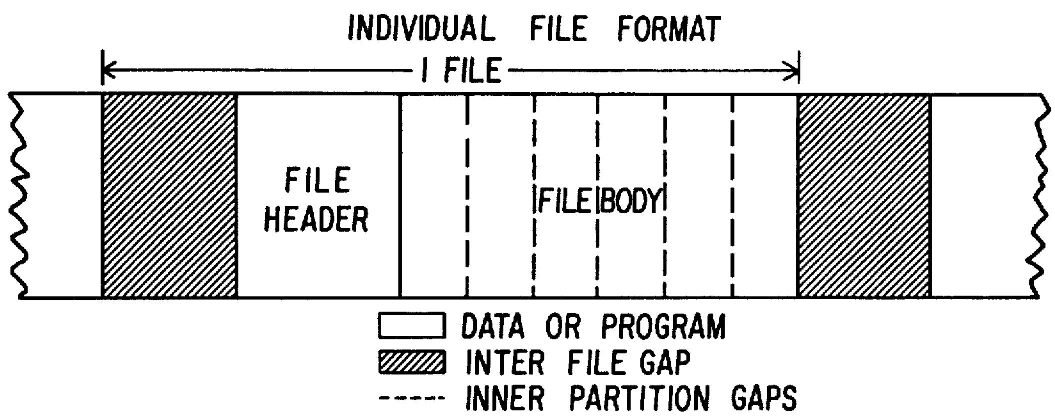

Referring to FIGS. 170A–D, the informatin structure of a tape is shown. FIG. 170A shows the format for an individual file on the tape. All files that are recorded are made up of partitions of length greater than or equal to 256 bytes to allow a user recovery of at least part of his file if a read error occurs on attempting to read the file.

The following file types have partitions of length 256 bytes exactly: (1) key files, (2) memory files, (3) binary program files, (4) and data files, including numeric data or string data.

User program files are unique in that the partition length is such that a partition is always made up of some integral number of complete program lines. This feature allows the user to recover complete program lines from those partitions that are correctly read if a read error occurs.

Figure 70:
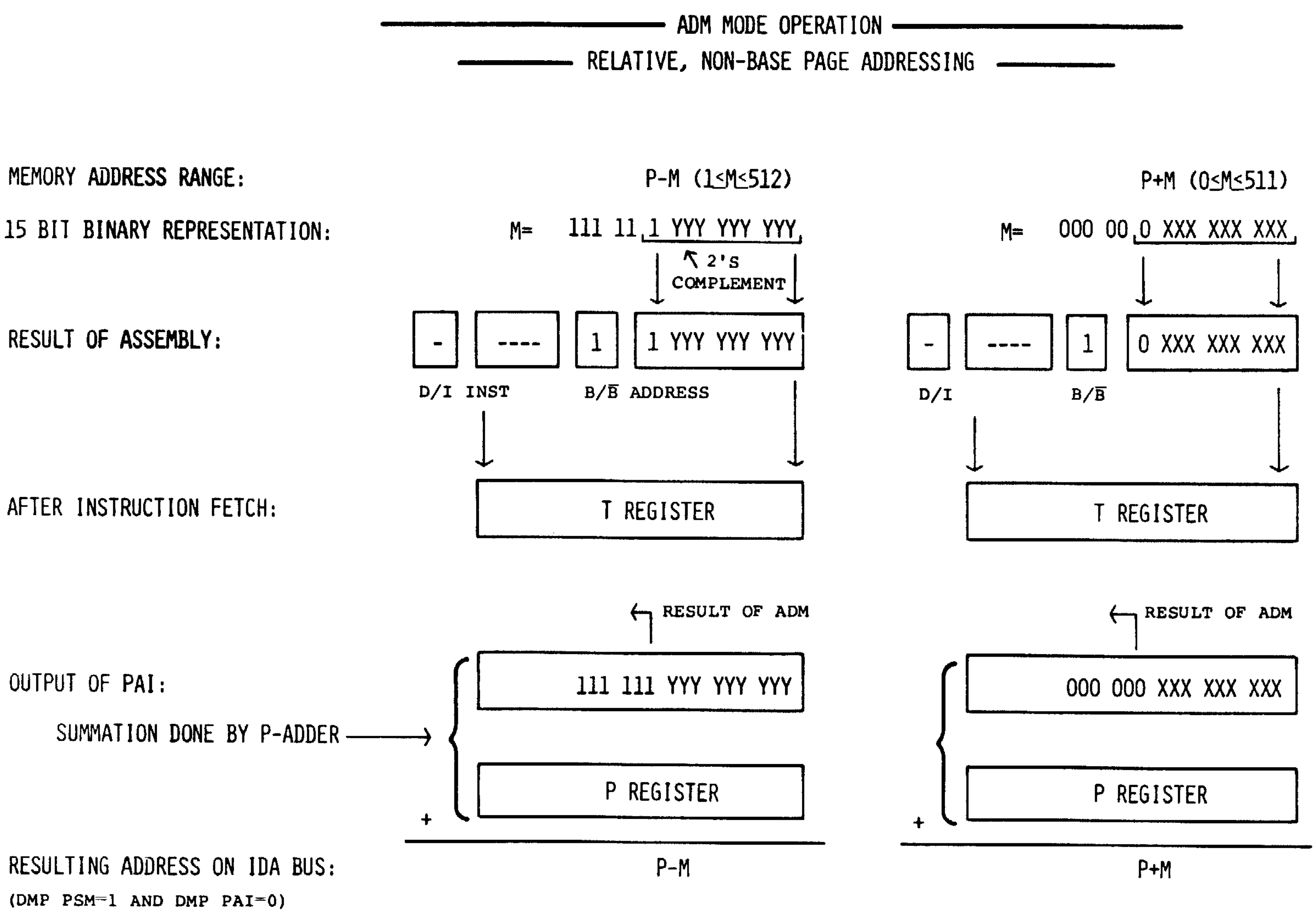
FIG. 70 is a diagram illustrating how the program adder section of FIG. 68 generates a 15-bit relative current page address from the 10-bit memory reference instruction.
Figure 71:
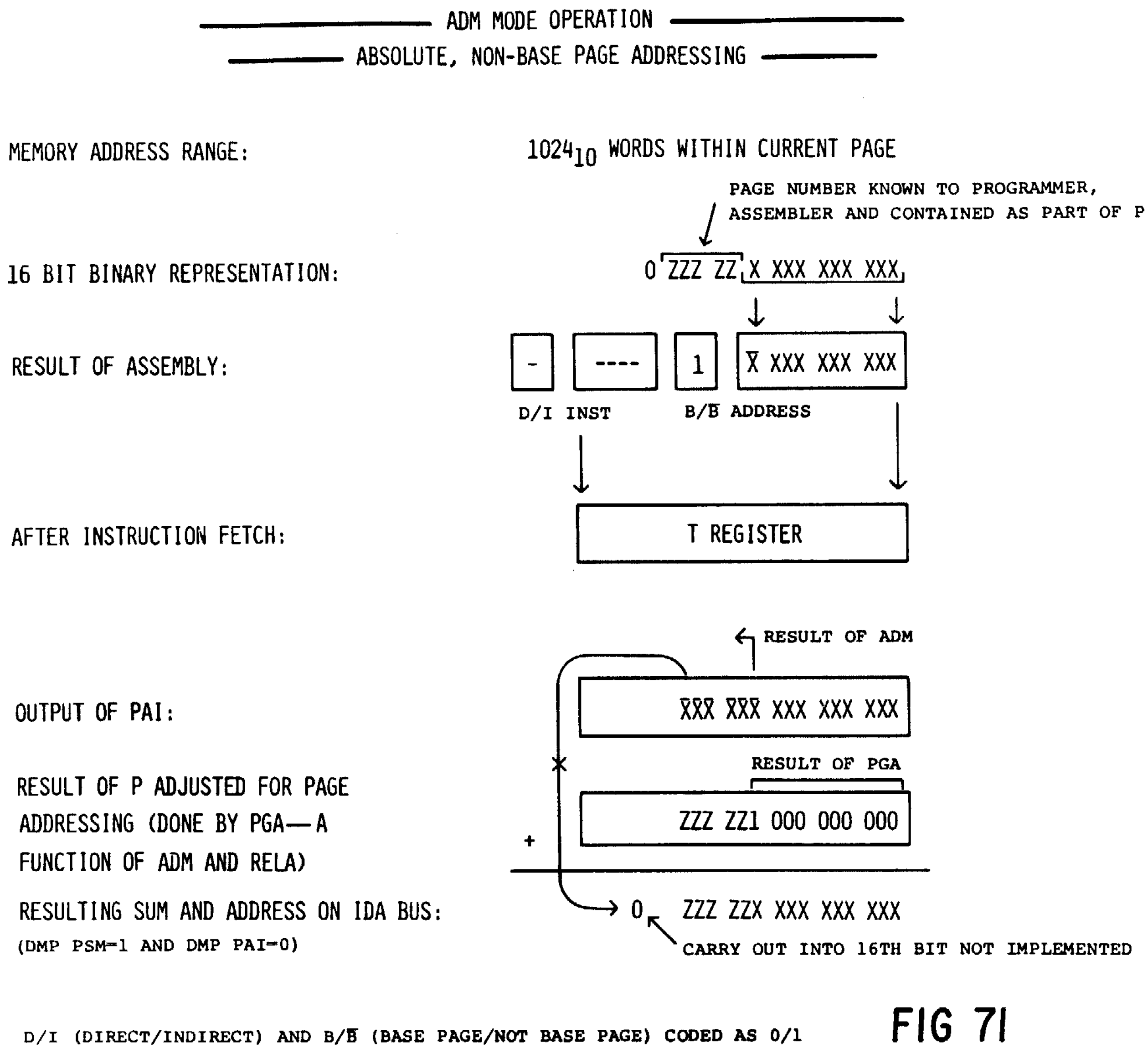
FIG. 71 is a diagram illustrating how the program adder section of FIG. 68 generates a 15-bit absolute current page address from the 10-bit field of a memory reference instruction.
Figure 72:
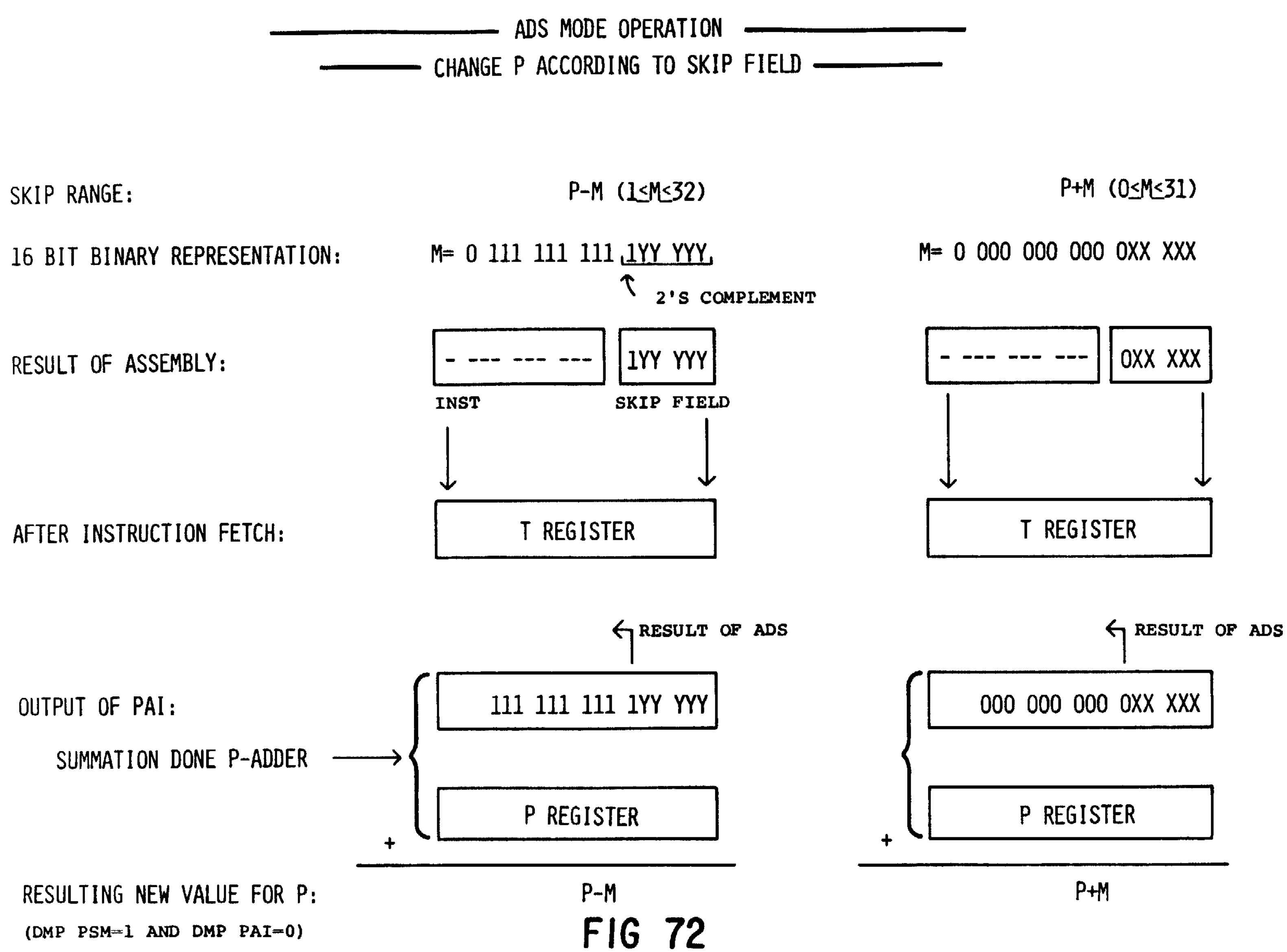
FIG. 72 is a diagram illustrating how the program adder section of FIG. 68 generates a 15-bit memory address from the 6-bit field of a skip instruction.
Figure 73:
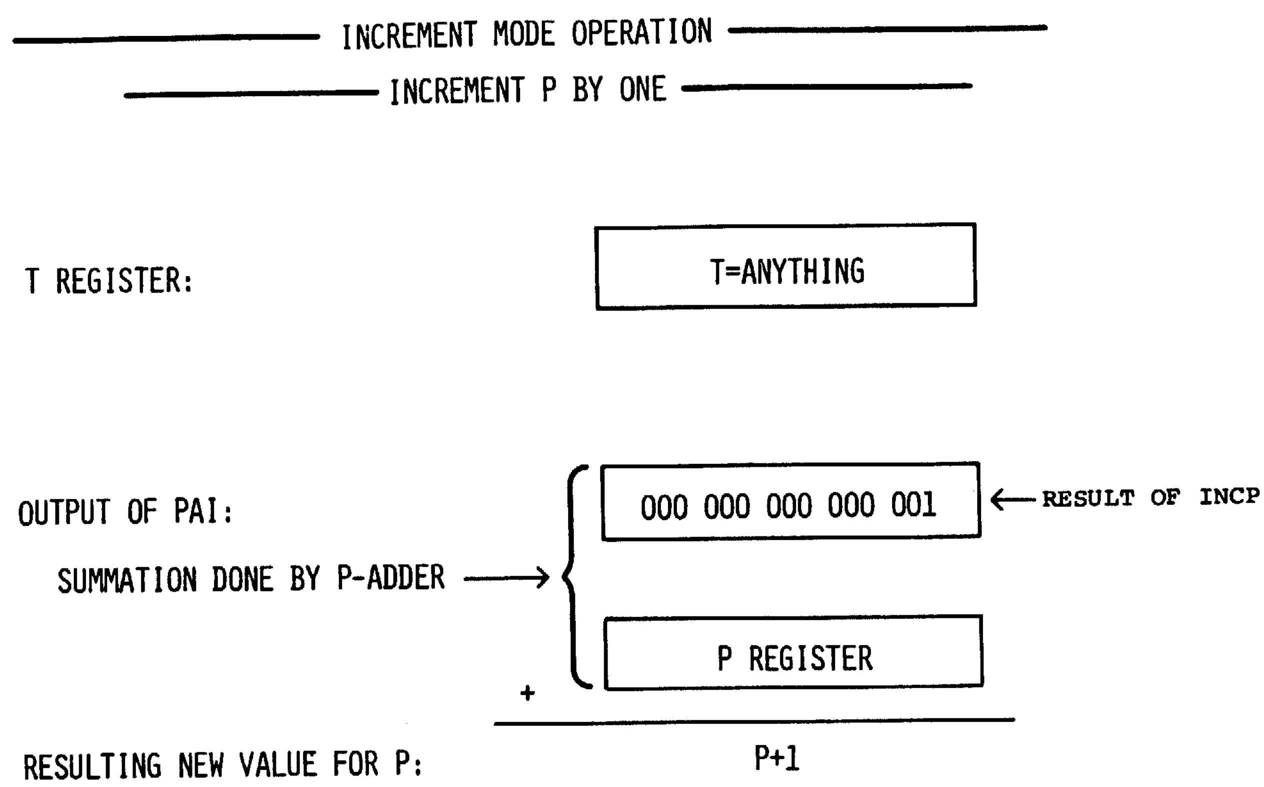
FIG. 73 is a diagram illustrating the increment P mode of operation of the program adder section of FIG. 68.
Figure 74:
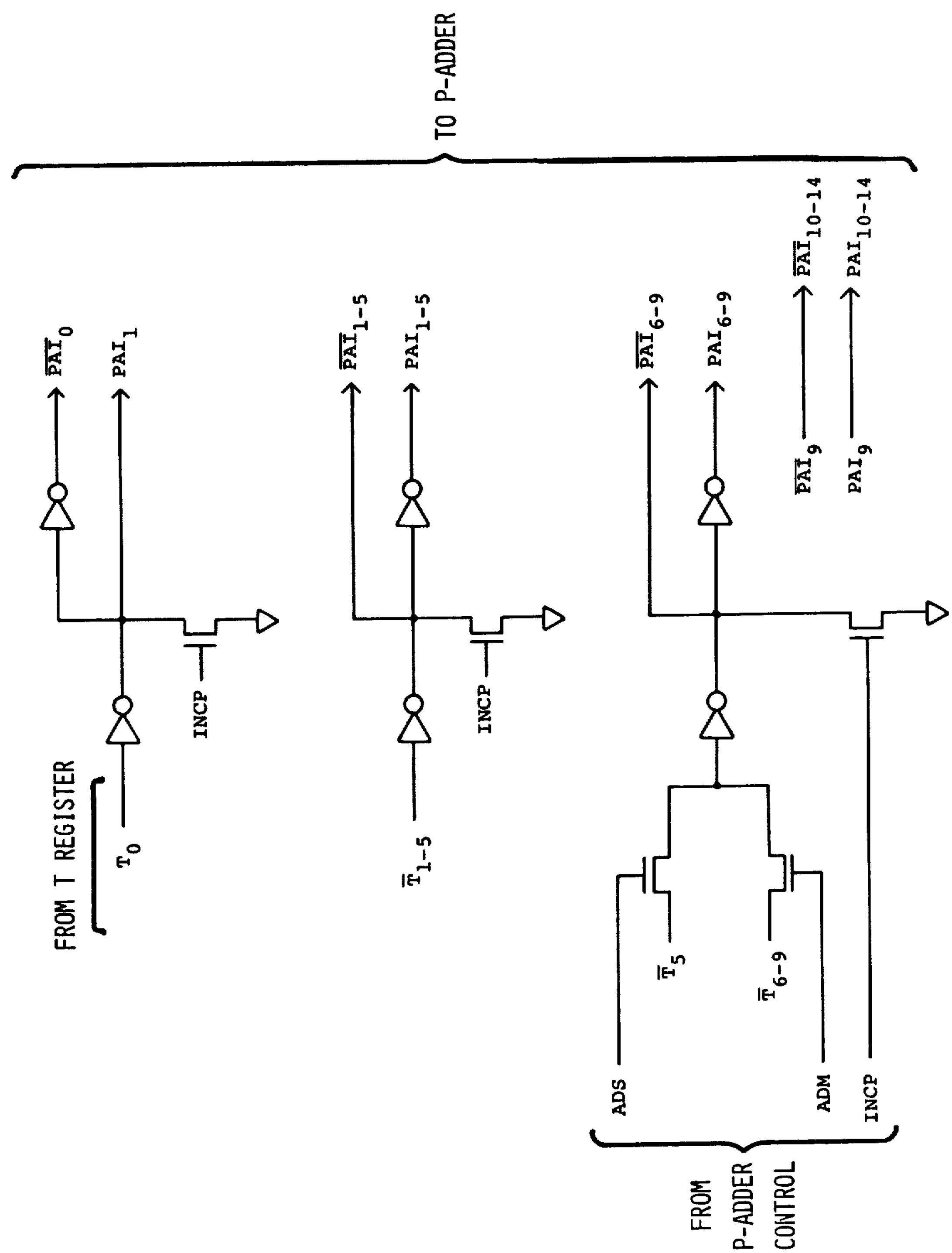
FIG. 74 is a detailed schematic diagram of the P-adder input (PAI) of FIG. 68.
Figure 75:
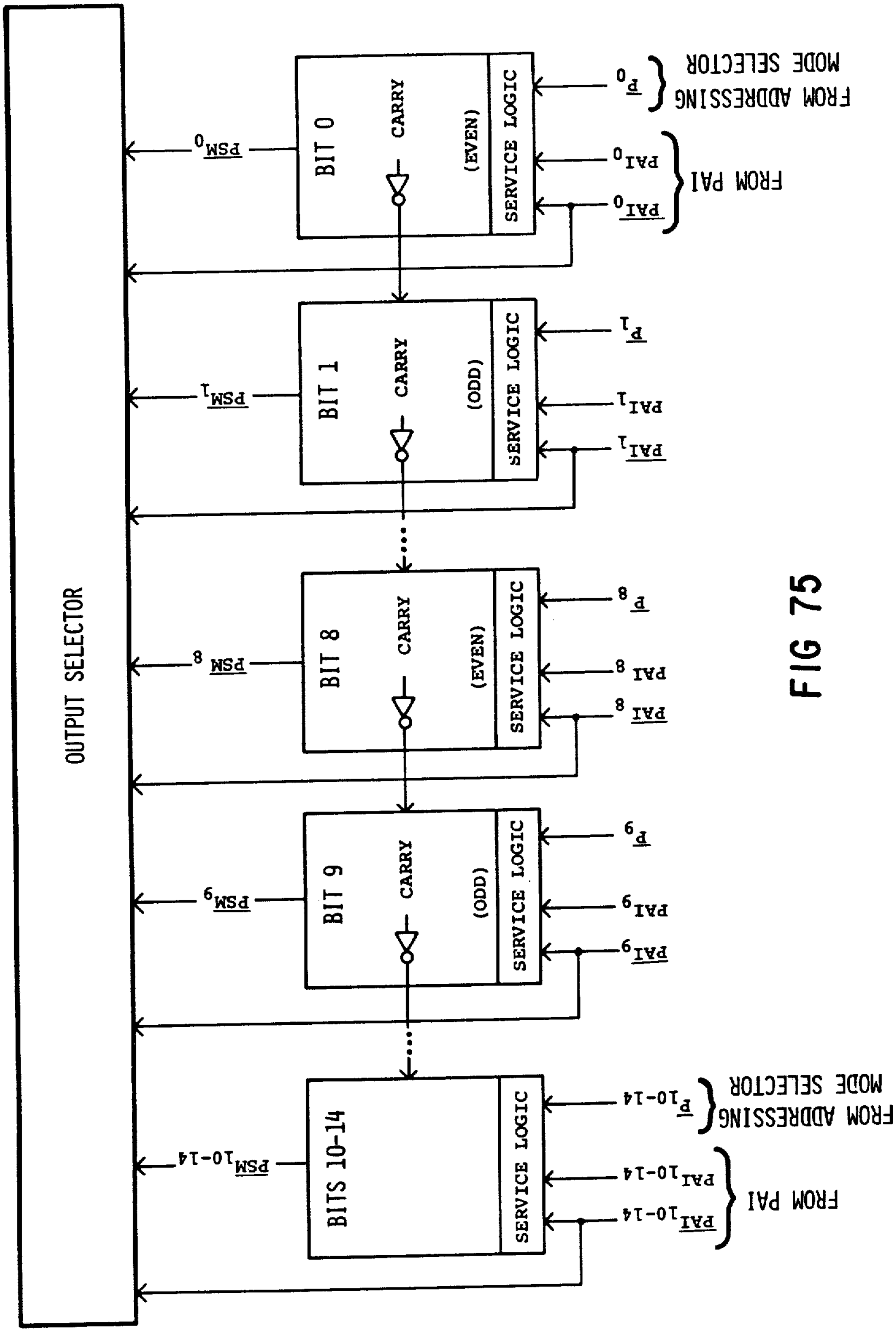
FIG. 75 is a detailed block diagram of the P-adder of FIG. 68.
Figure 76:
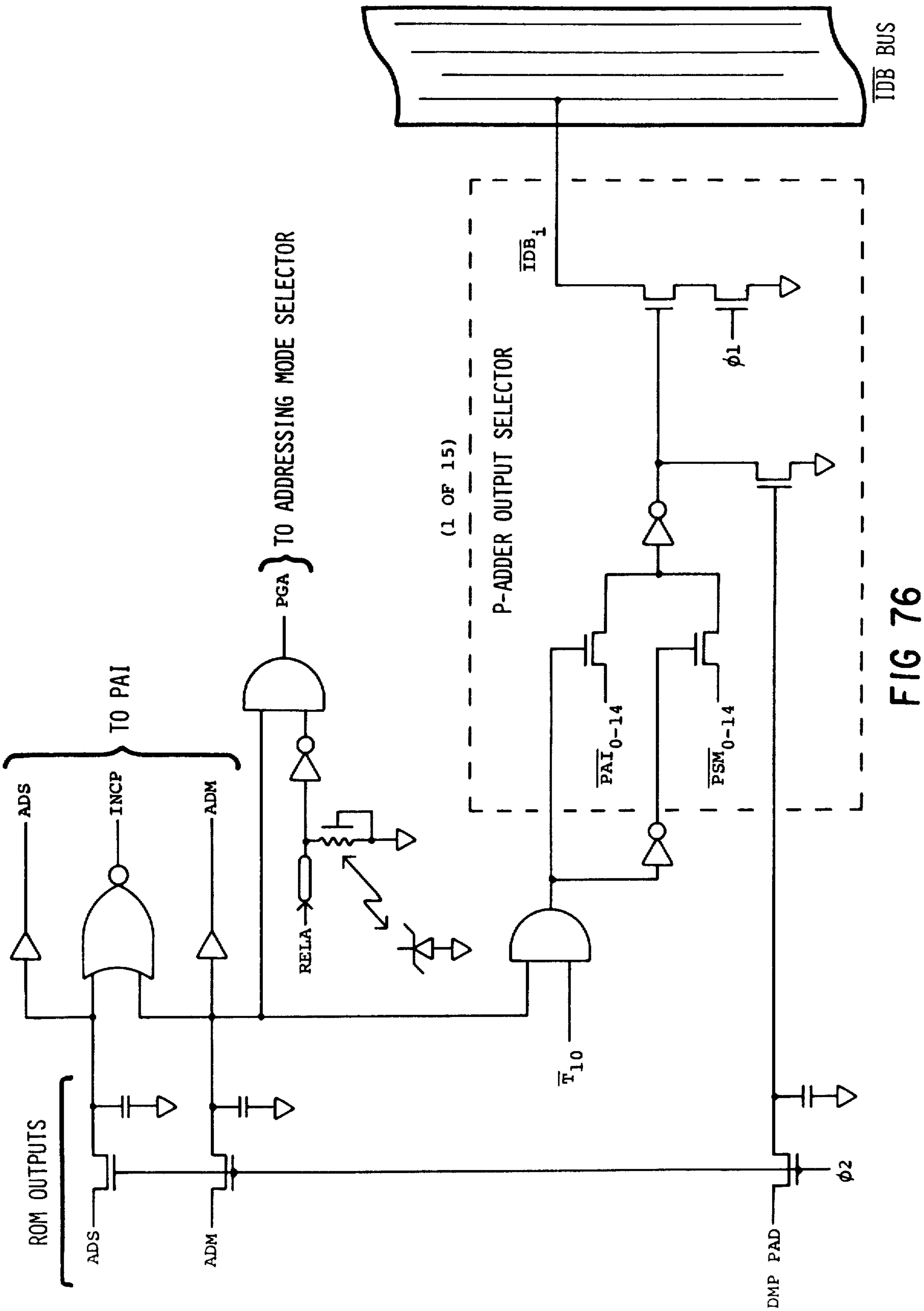
FIG. 76 is a detailed schematic diagram of the P-adder control and the P-adder output selector blocks of FIG. 68.
Figure 77:
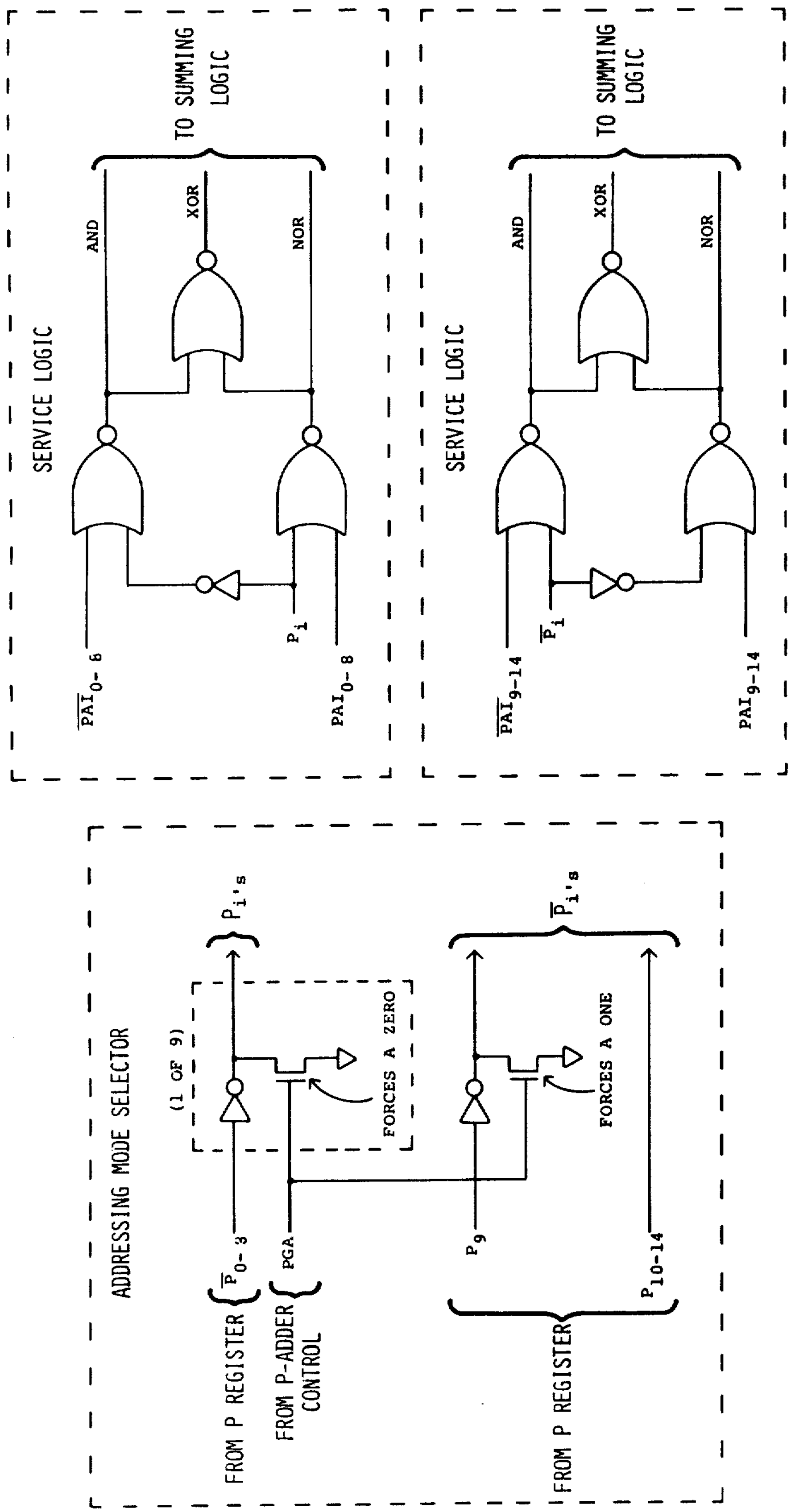
FIG. 77 is a detailed schematic diagram of the addressing mode selector of FIG. 68 and the service logic of FIG. 75.
Figure 78:
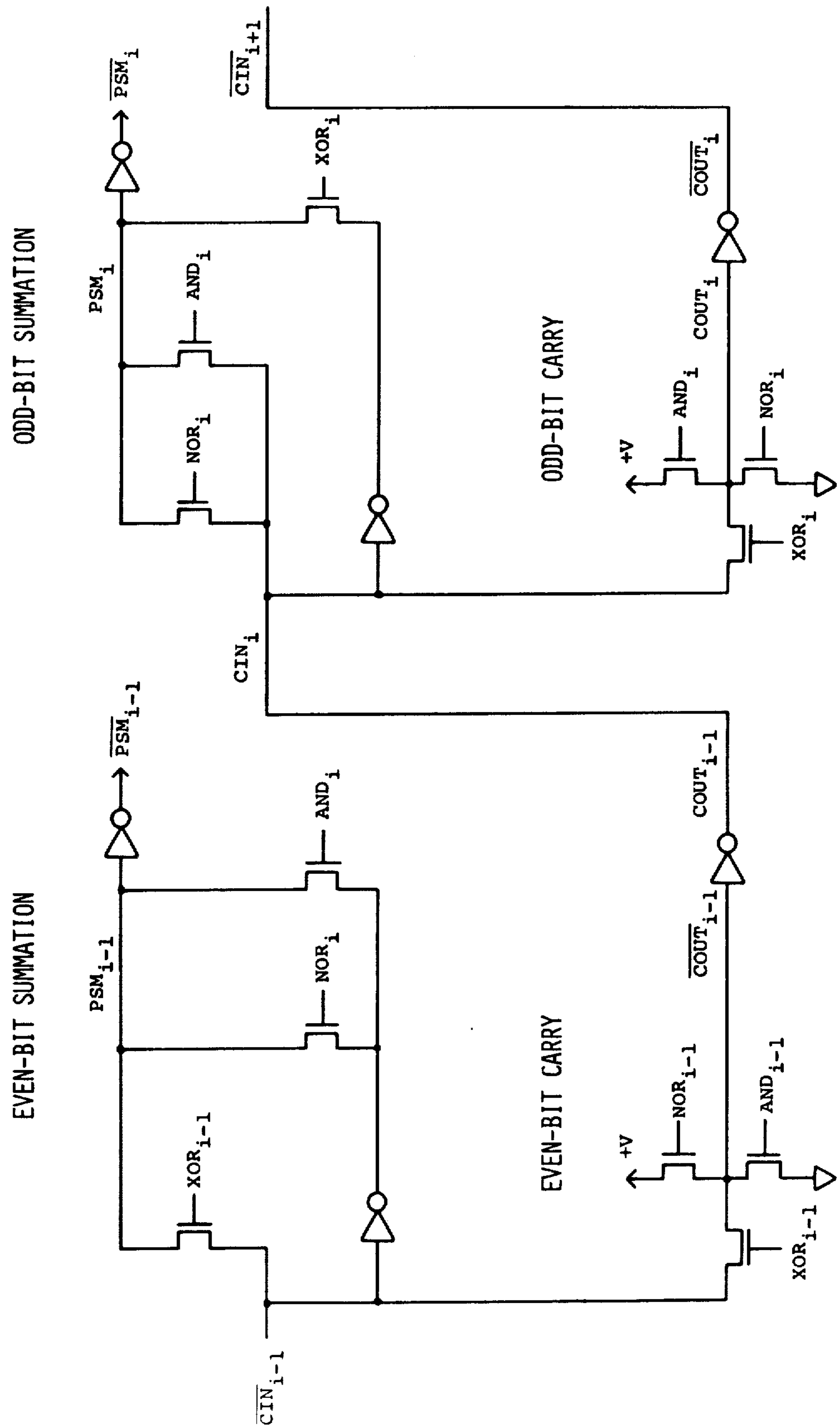
FIG. 78 is a detailed schematic diagram of the P-adder of FIG. 75.
Figure 79:
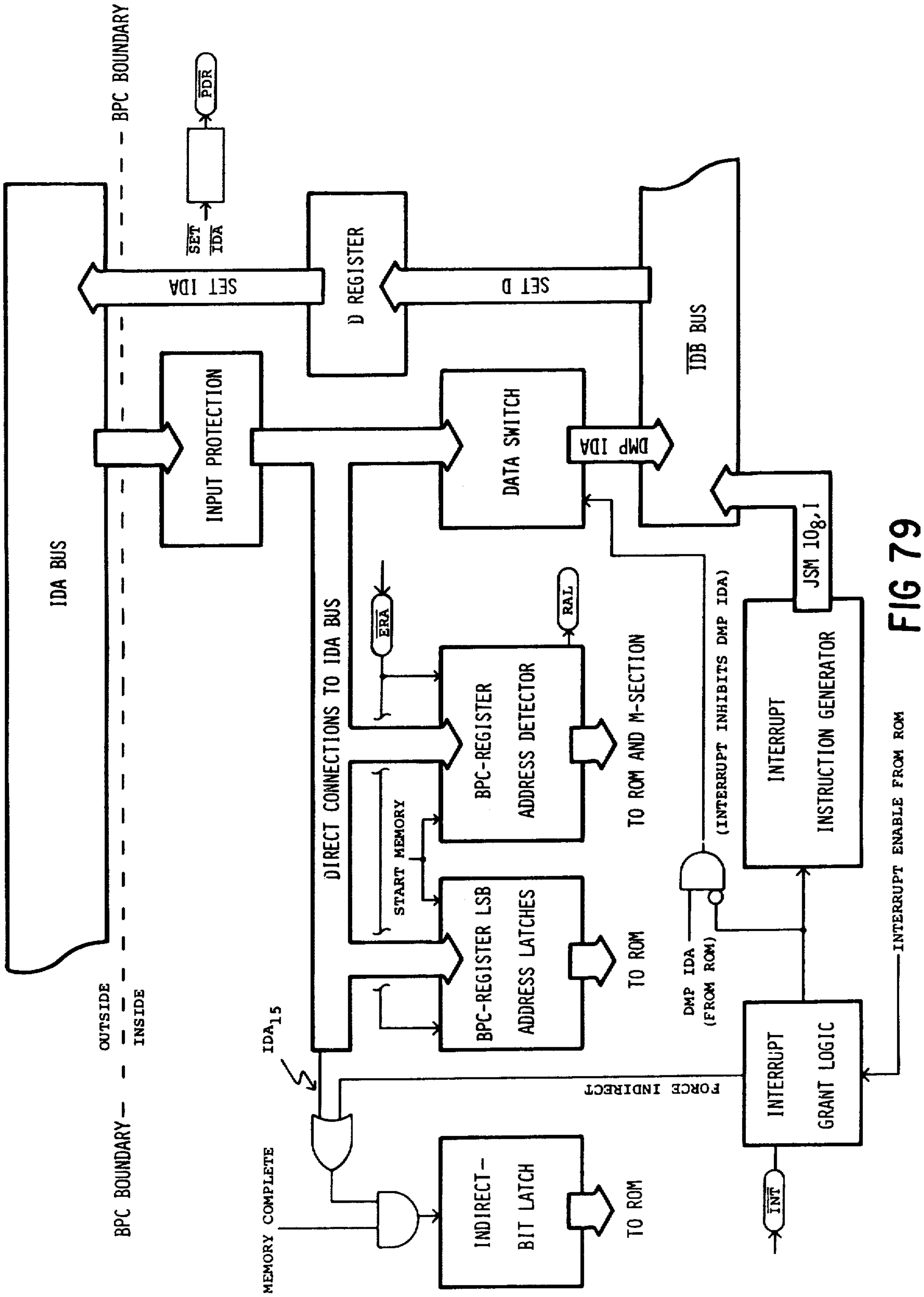
FIG. 79 is a detailed block diagram of the BPC register detection and address latches block and the indirect circuit of FIGS. 25A–B.
Figure 80:
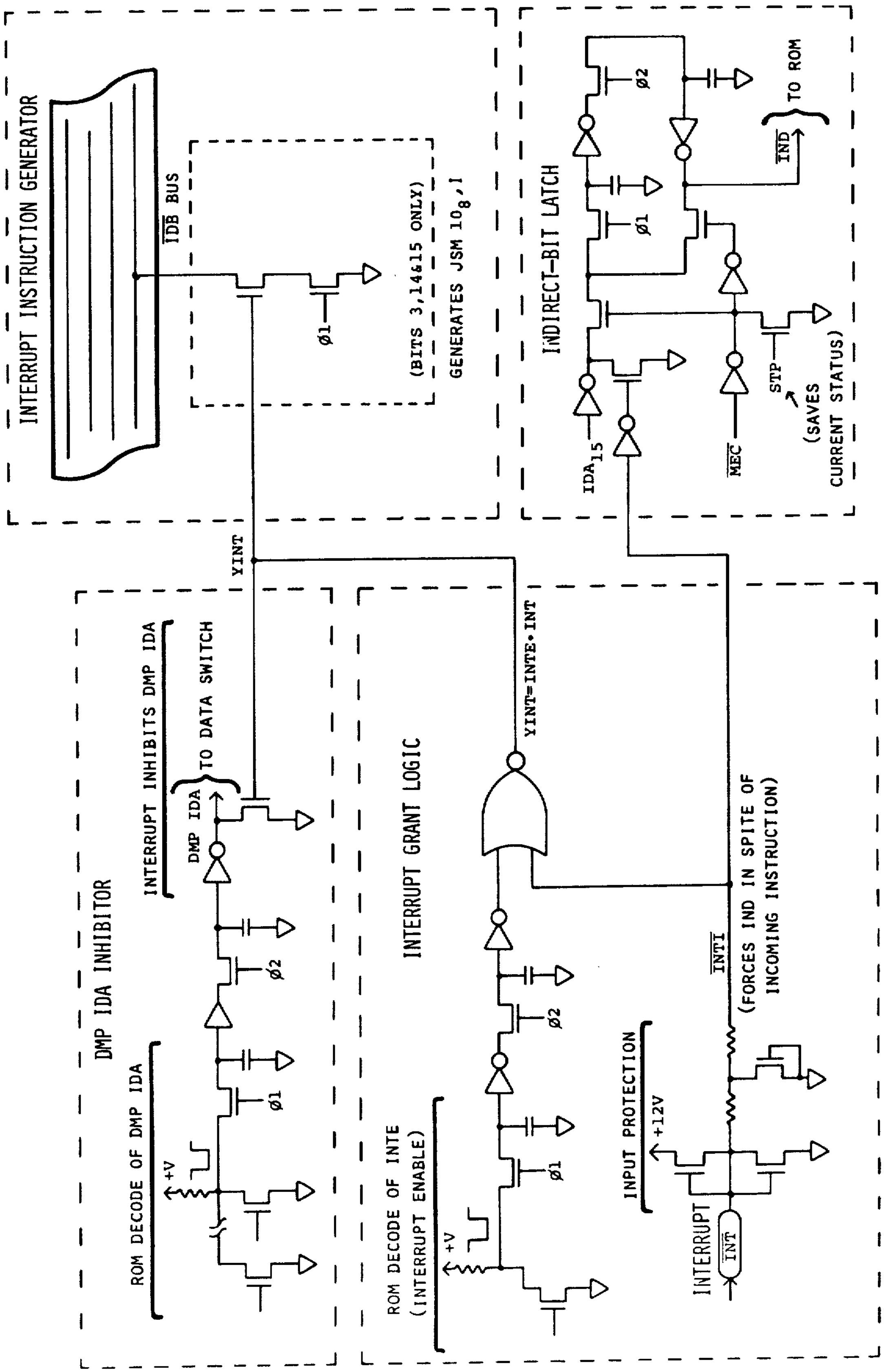
FIG. 80 is a detailed schematic diagram of a portion of the circuitry of FIG. 79.
Figure 8I:
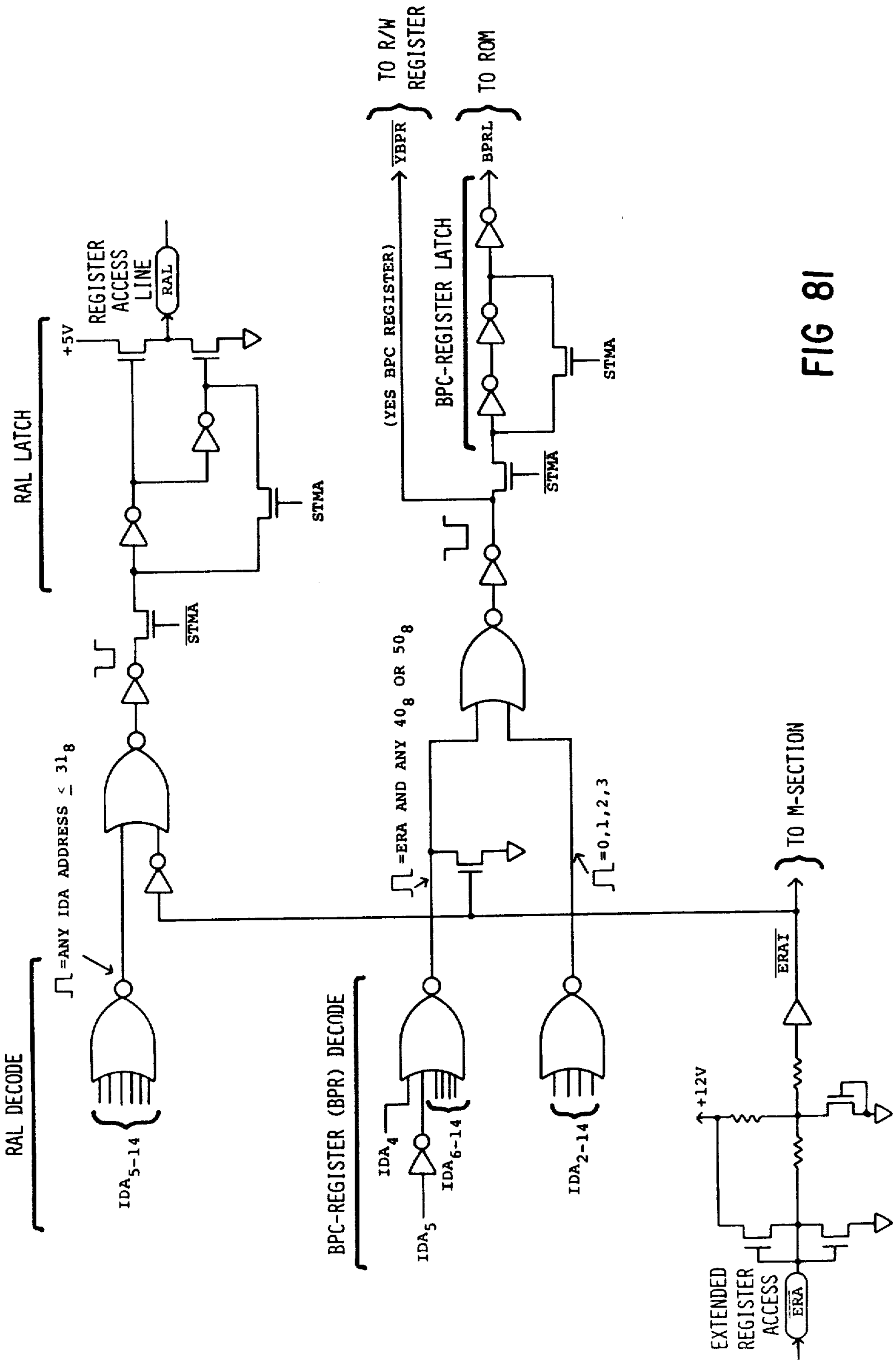
Figure 82:
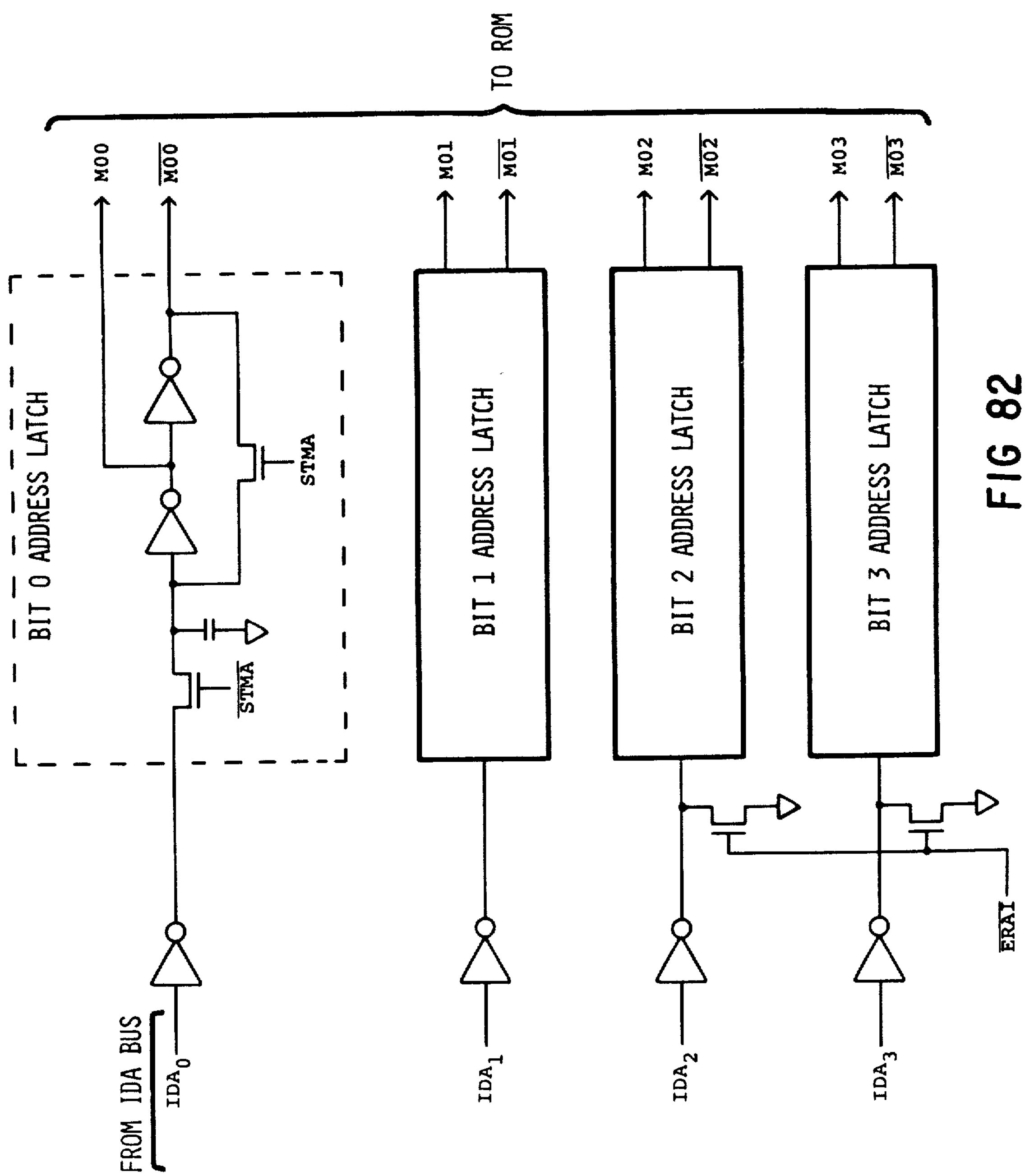
FIG. 82 is a detailed schematic diagram of the BPC-register LSB address latches of FIG. 79.
Figure 83A:
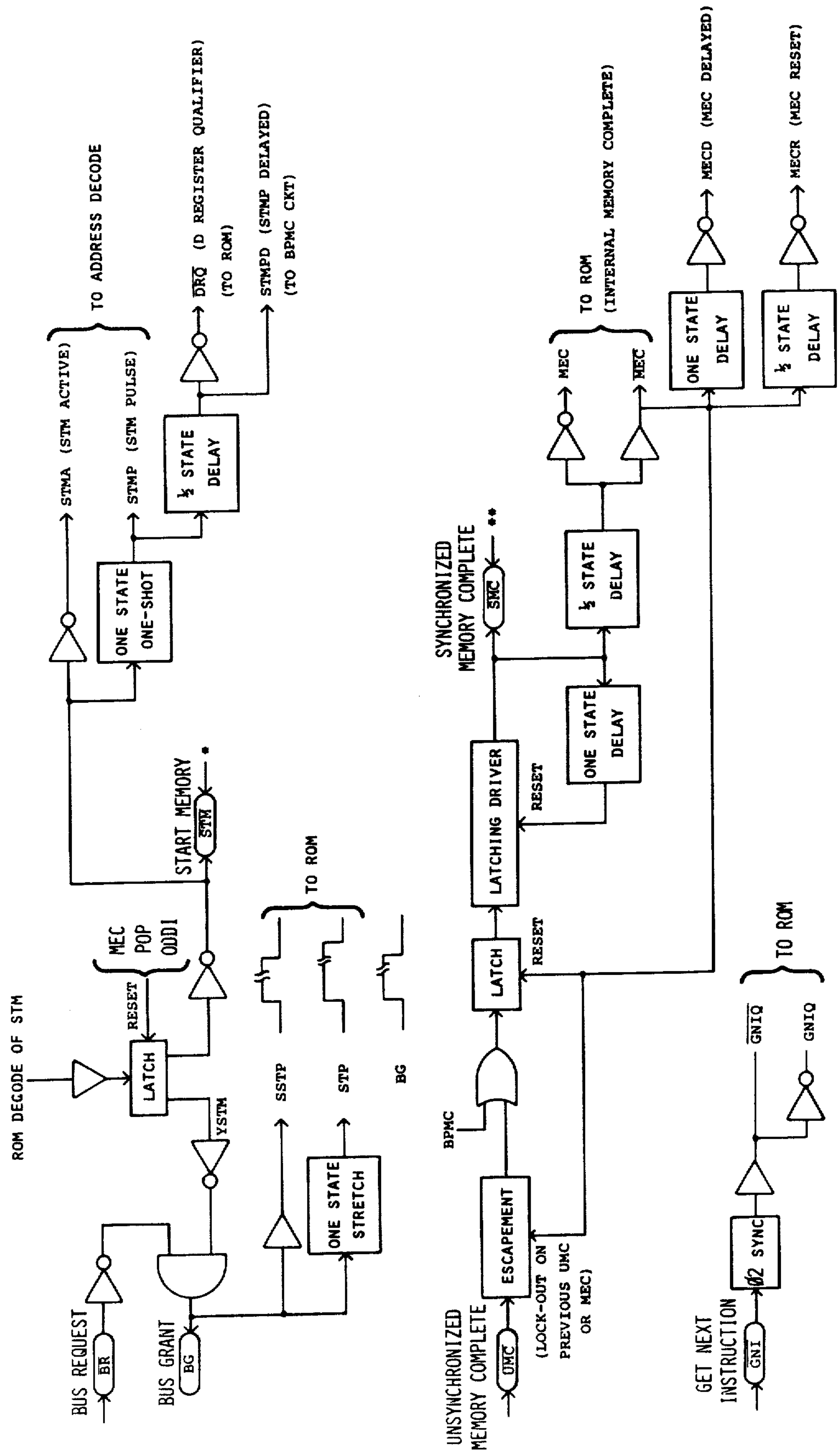
FIGS. 83A–B are a detailed block diagram of the M-section of FIGS. 25A–B.
Figure 83B:
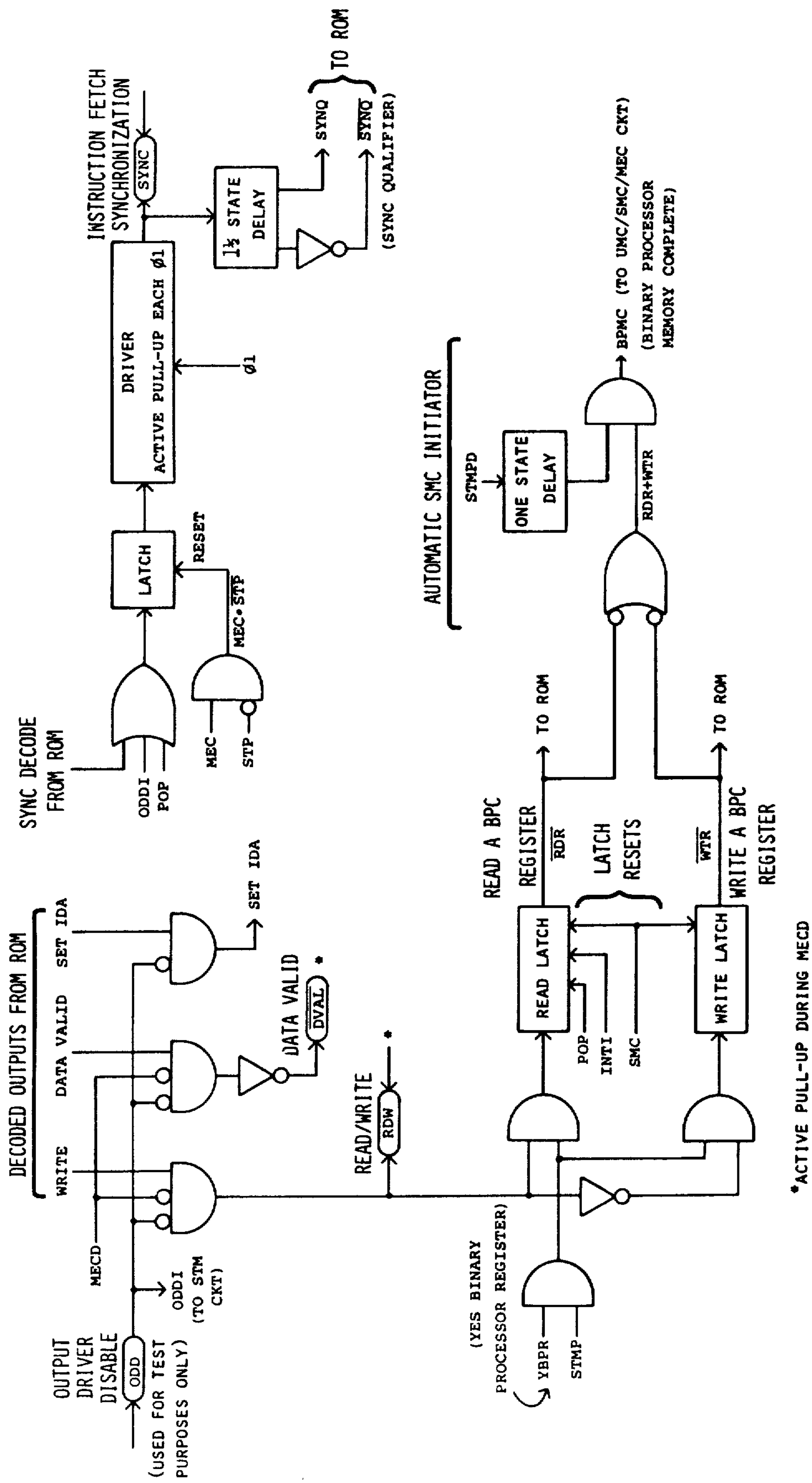
Figure 84:
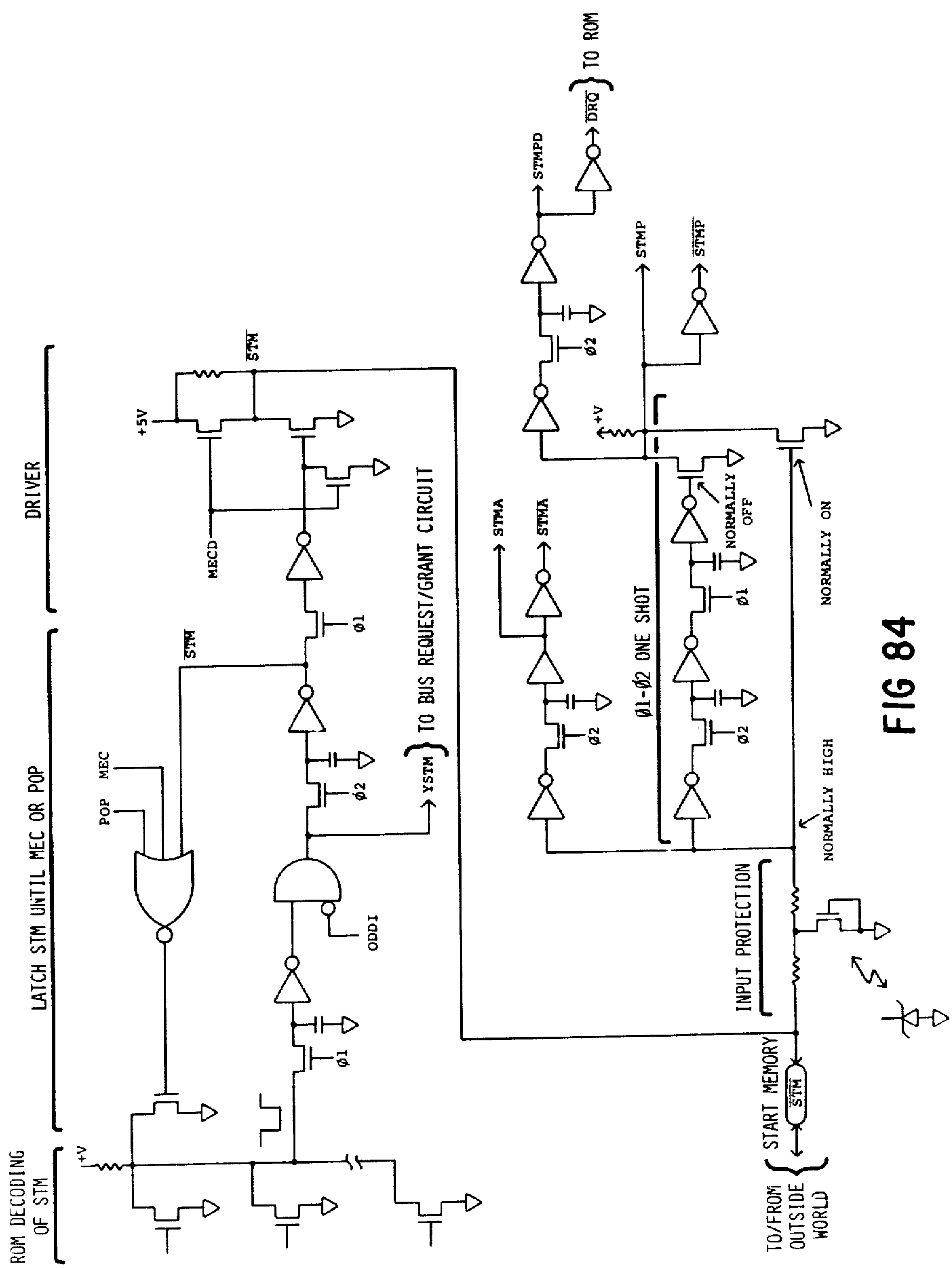
FIG. 84 is a detailed schematic diagram of a portion of the circuitry of FIG. 83A.
Figure 85:
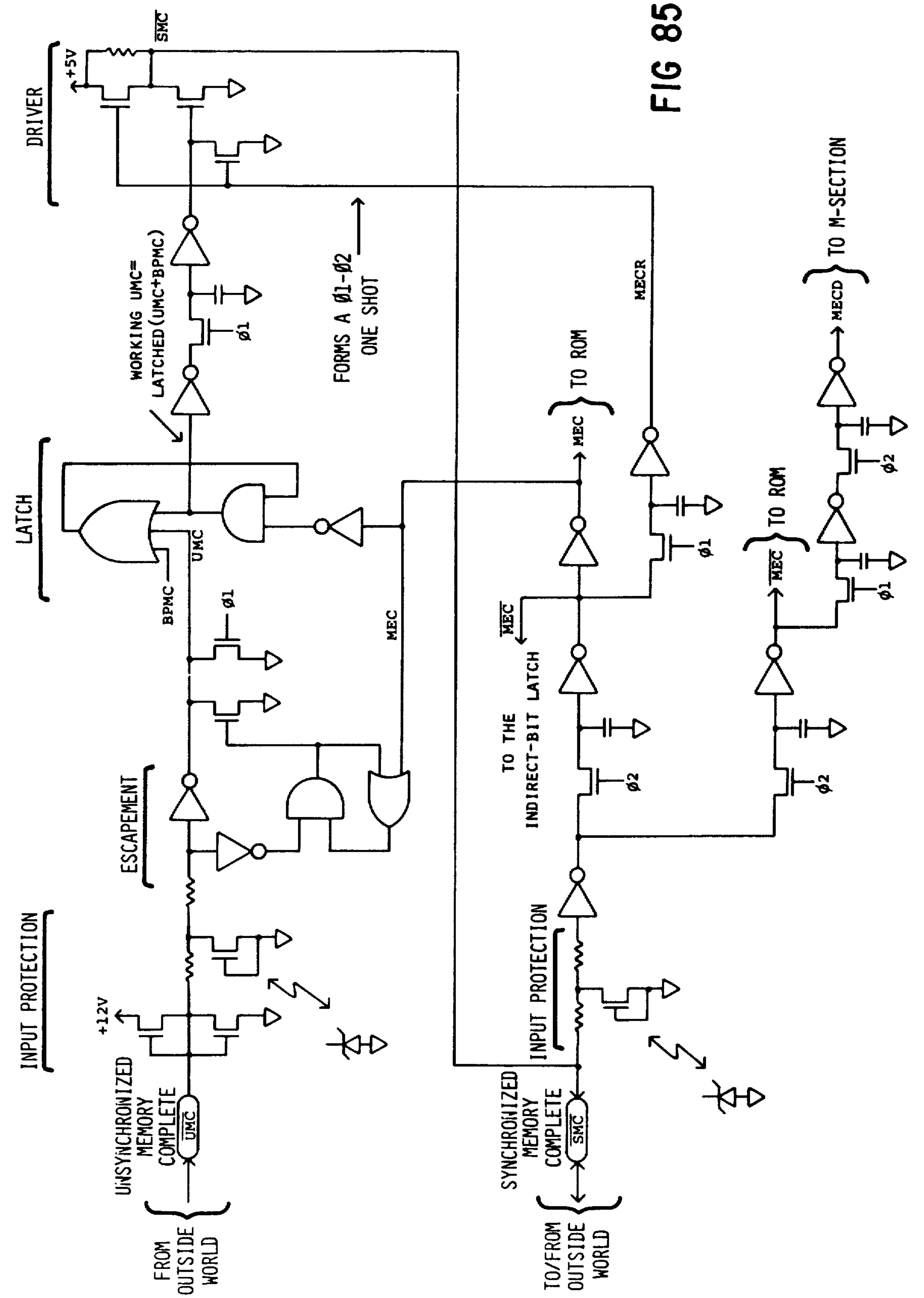
FIG. 85 is a detailed schematic diagram of a portion of the circuitry of FIG. 83A.
Figure 86:
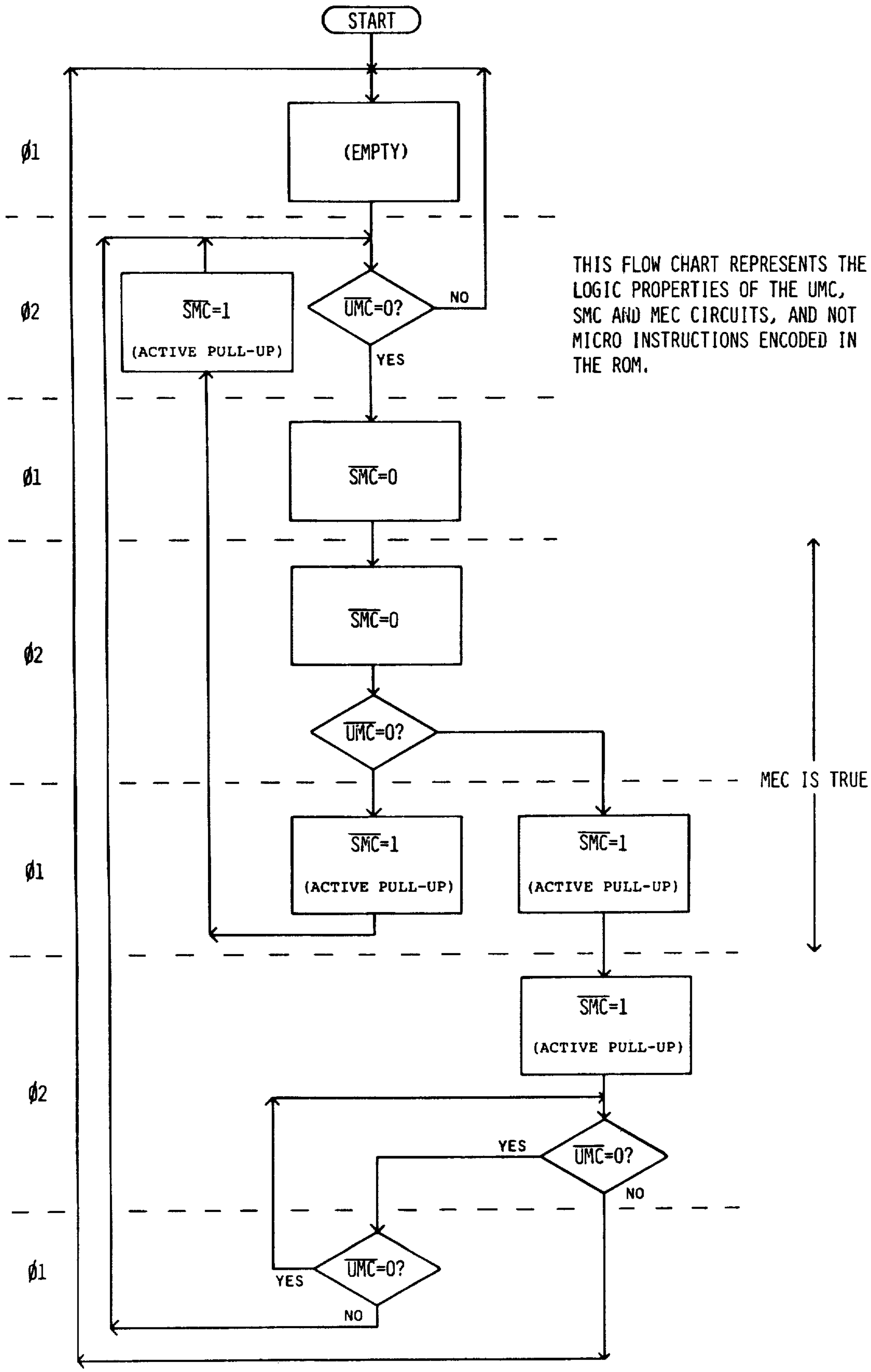
FIG. 86 is a flow chart illustrating the logic flow of the circuitry of FIGS. 84 and 85.
Figure 87:
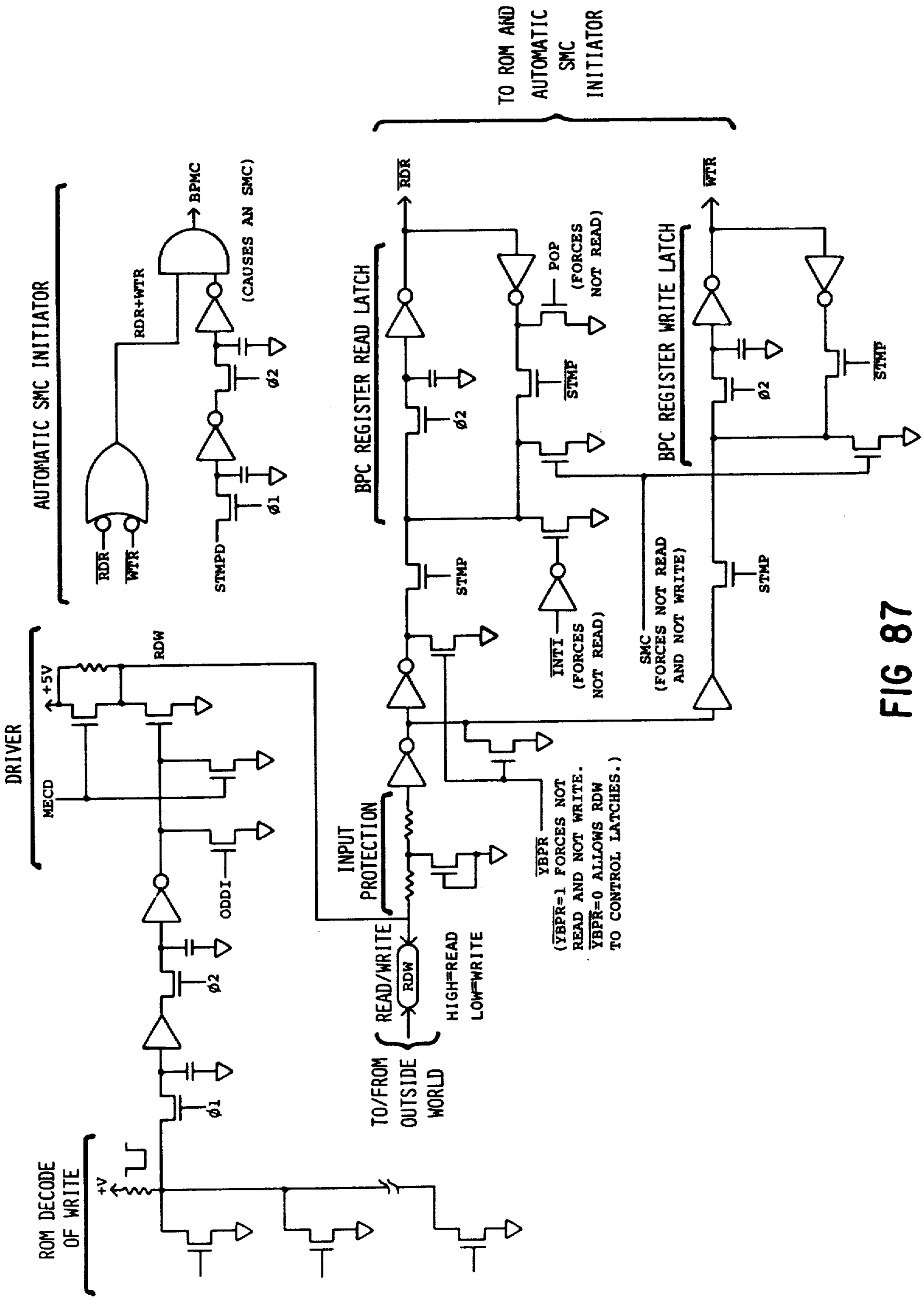
FIG. 87 is a detailed schematic diagram of a portion of the circuitry of FIG. 83B.
Figure 88:
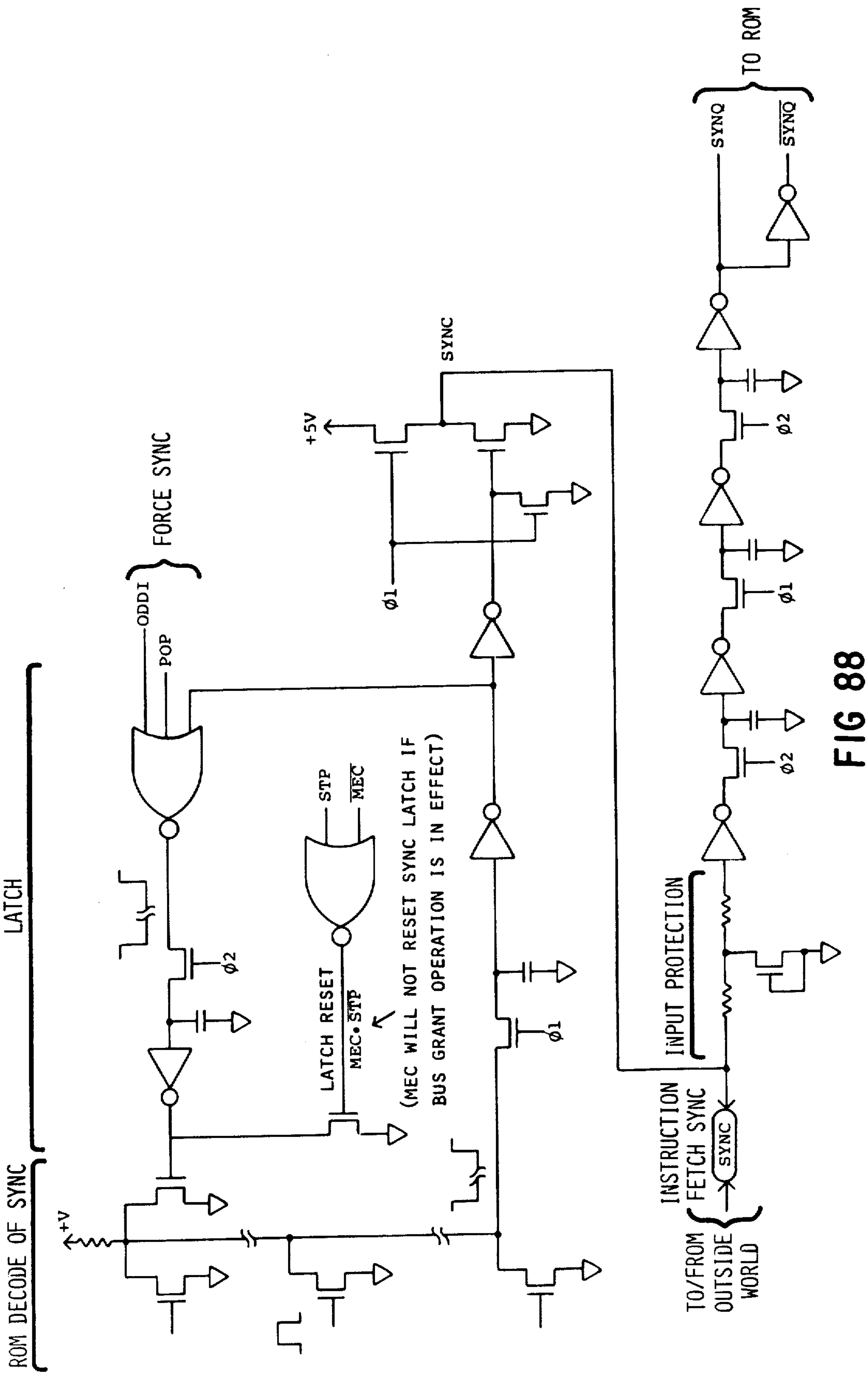
FIG. 88 is a detailed schematic diagram of a portion of the circuitry of FIG. 83B.
Figure 89:
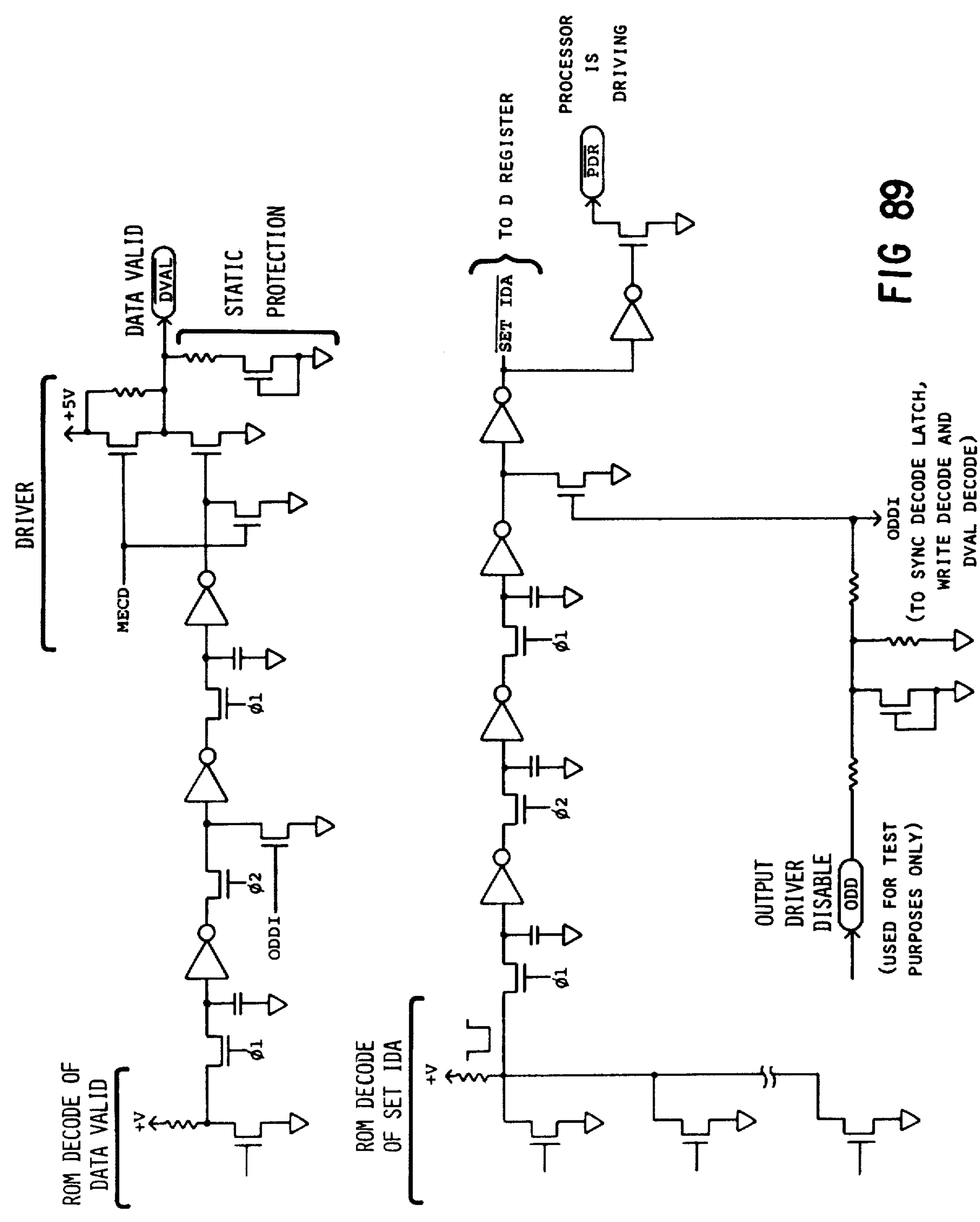
FIG. 89 is a detailed schematic diagram of a portion of the M-section of FIGS. 25A–B.
Figure 90:
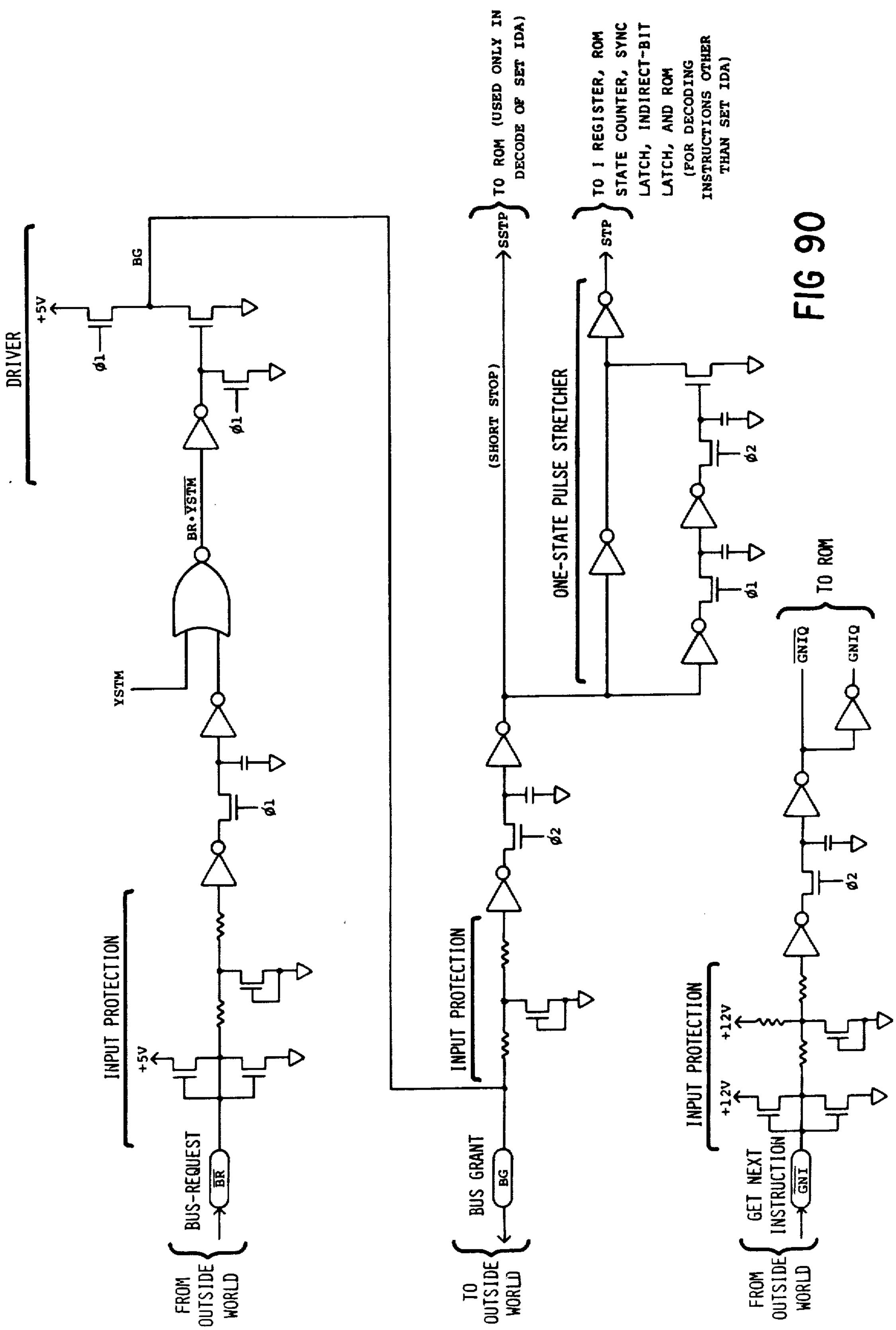
FIG. 90 is a detailed schematic diagram of a portion of the circuitry of FIG. 83A.
Figure 92:
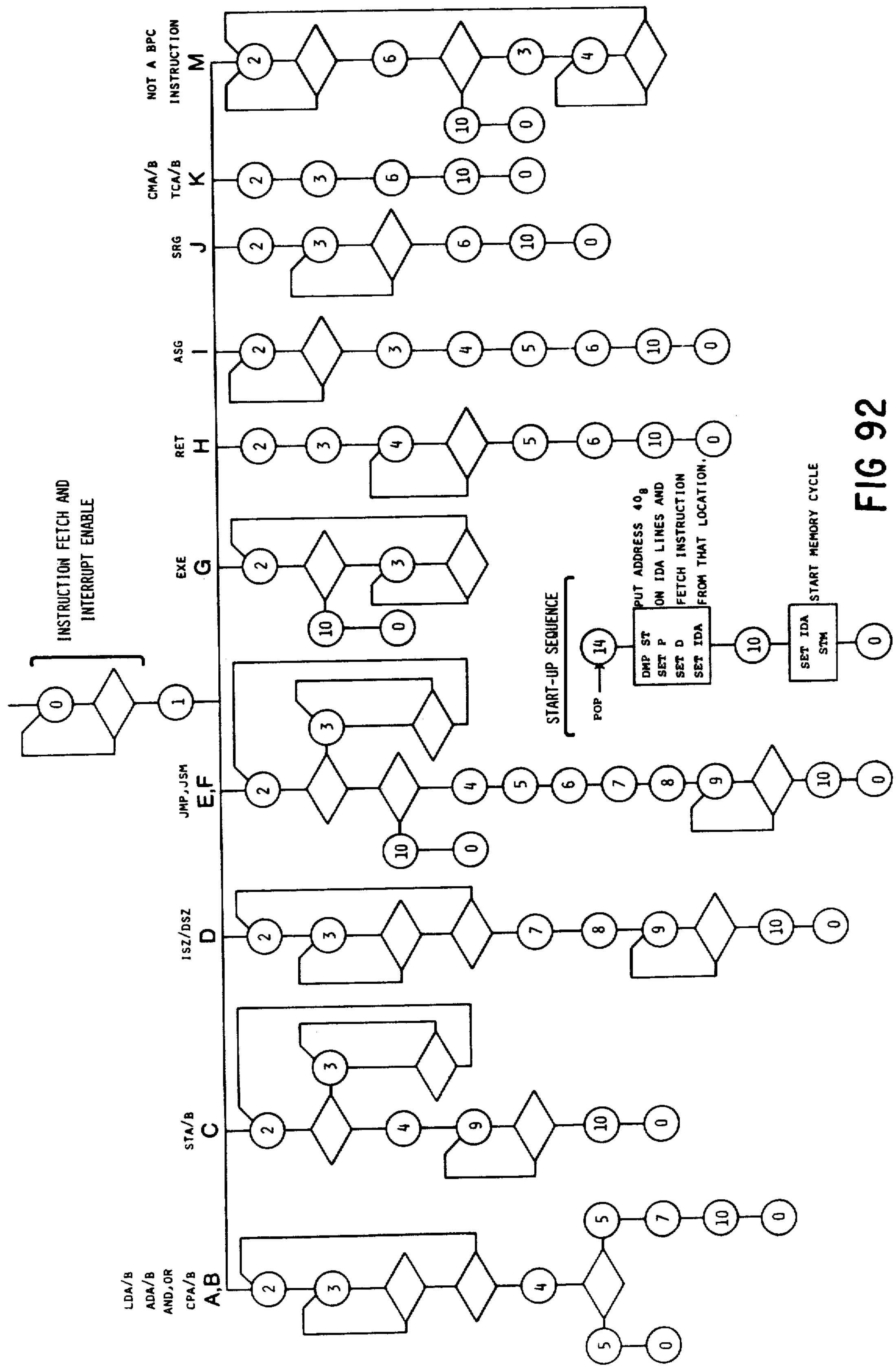
FIG. 92 is a diagram showing the overall relationship of the flow chart segments of FIGS. 93–103.
Figure 93:
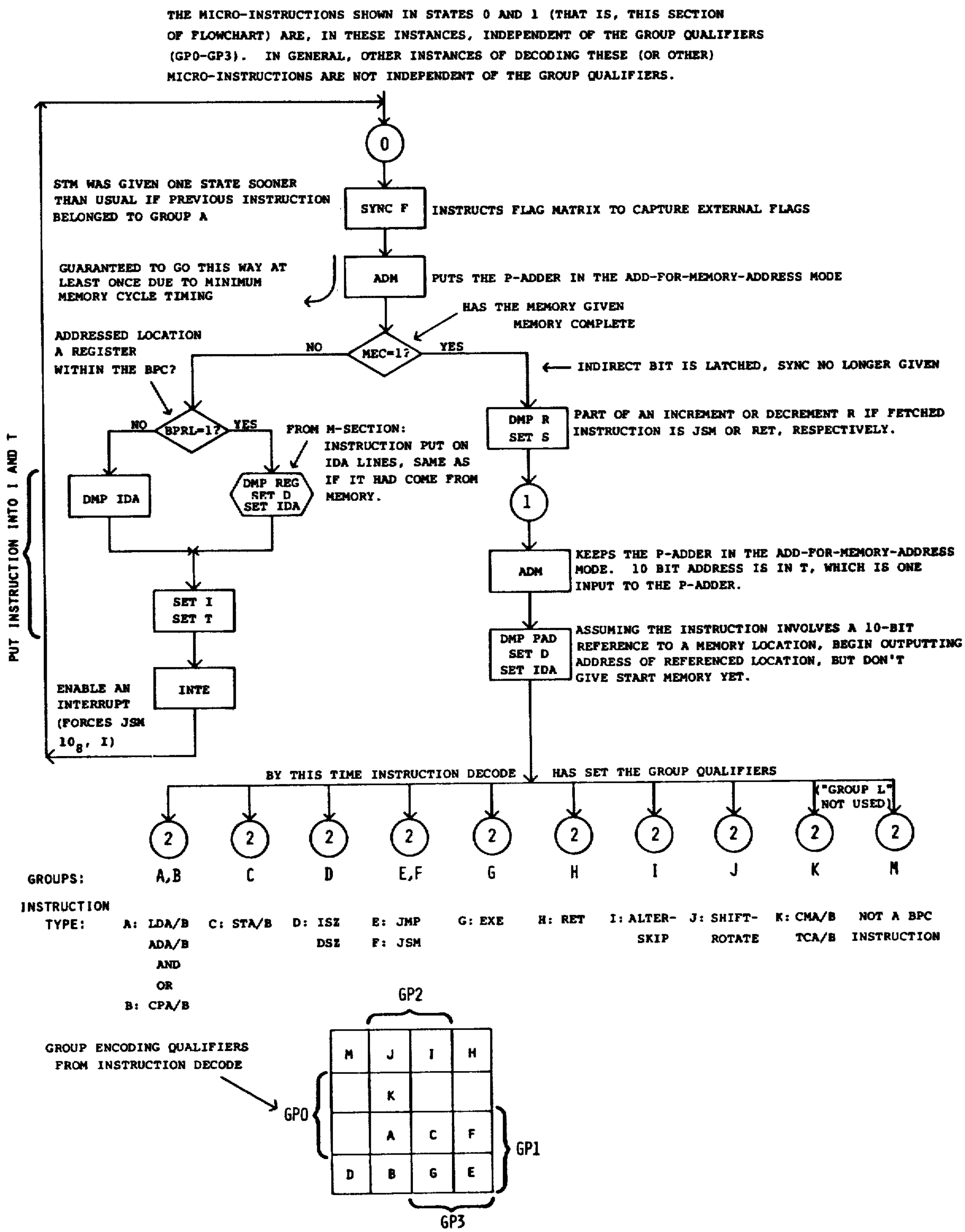
FIG. 93 is a flow chart segment of the instruction fetch and fanout activity of the BPC of FIG. 19.
Figure 94:
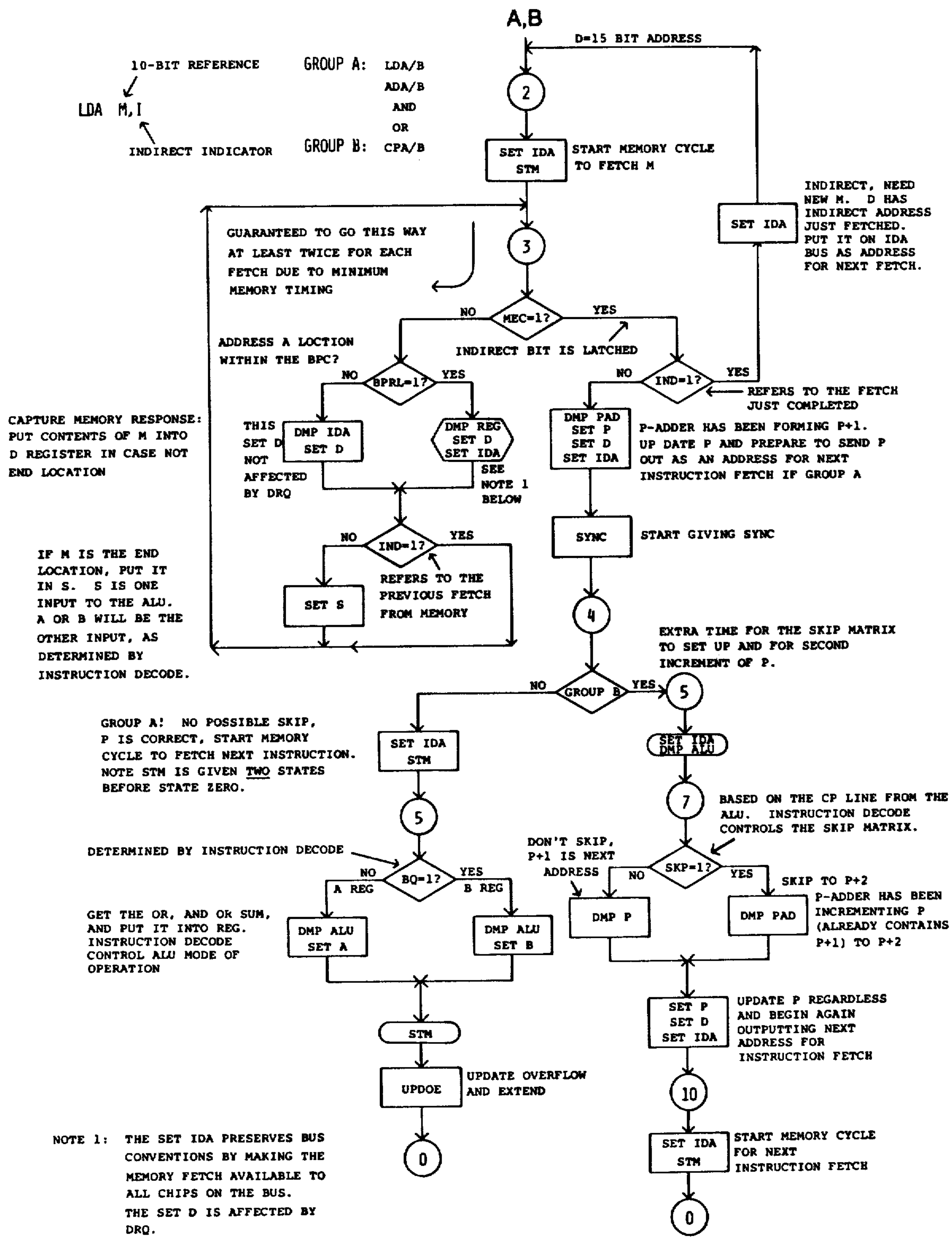
FIG. 94 is a flow chart segment of the load, add, and, or, and compare machine instructions executed by the BPC of FIG. 19.
Figure 95:
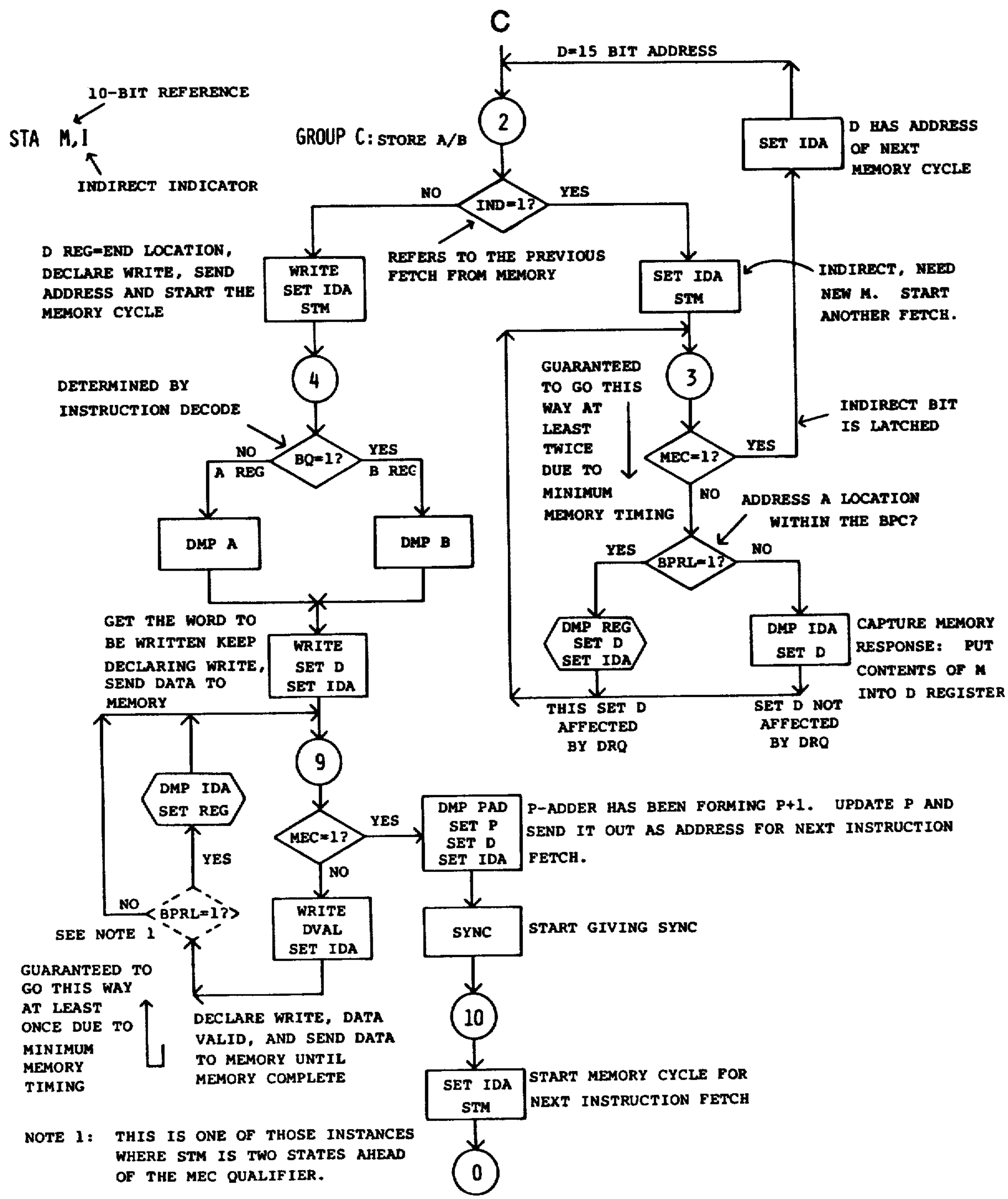
FIG. 95 is a flow chart segment of the STA and STB machine instruction executed by the BPC of FIG. 19.
Figure 96:
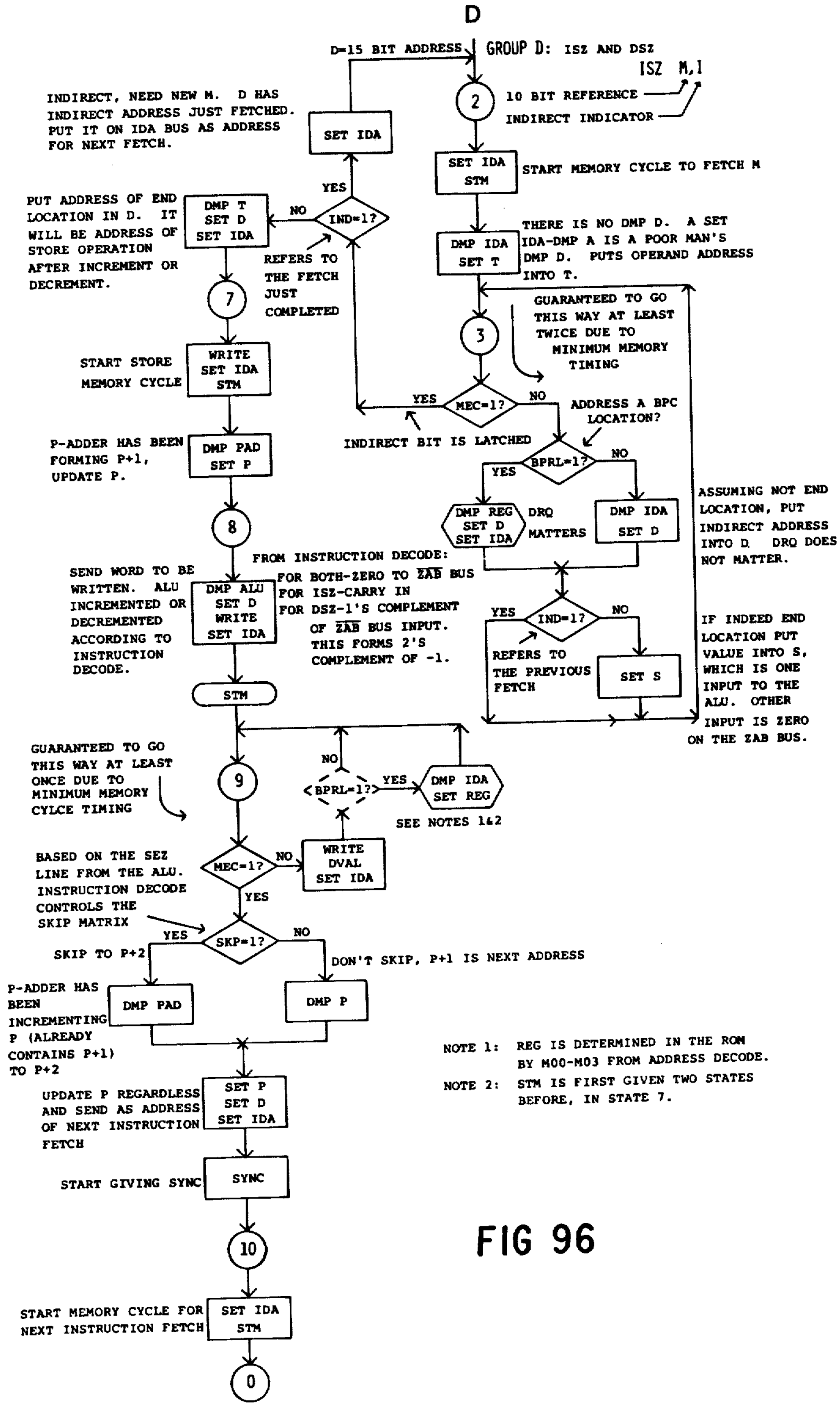
FIG. 96 is a flow chart segment of the ISZ and DSZ machine instructions executed by the BPC of FIG. 19.
Figure 97:
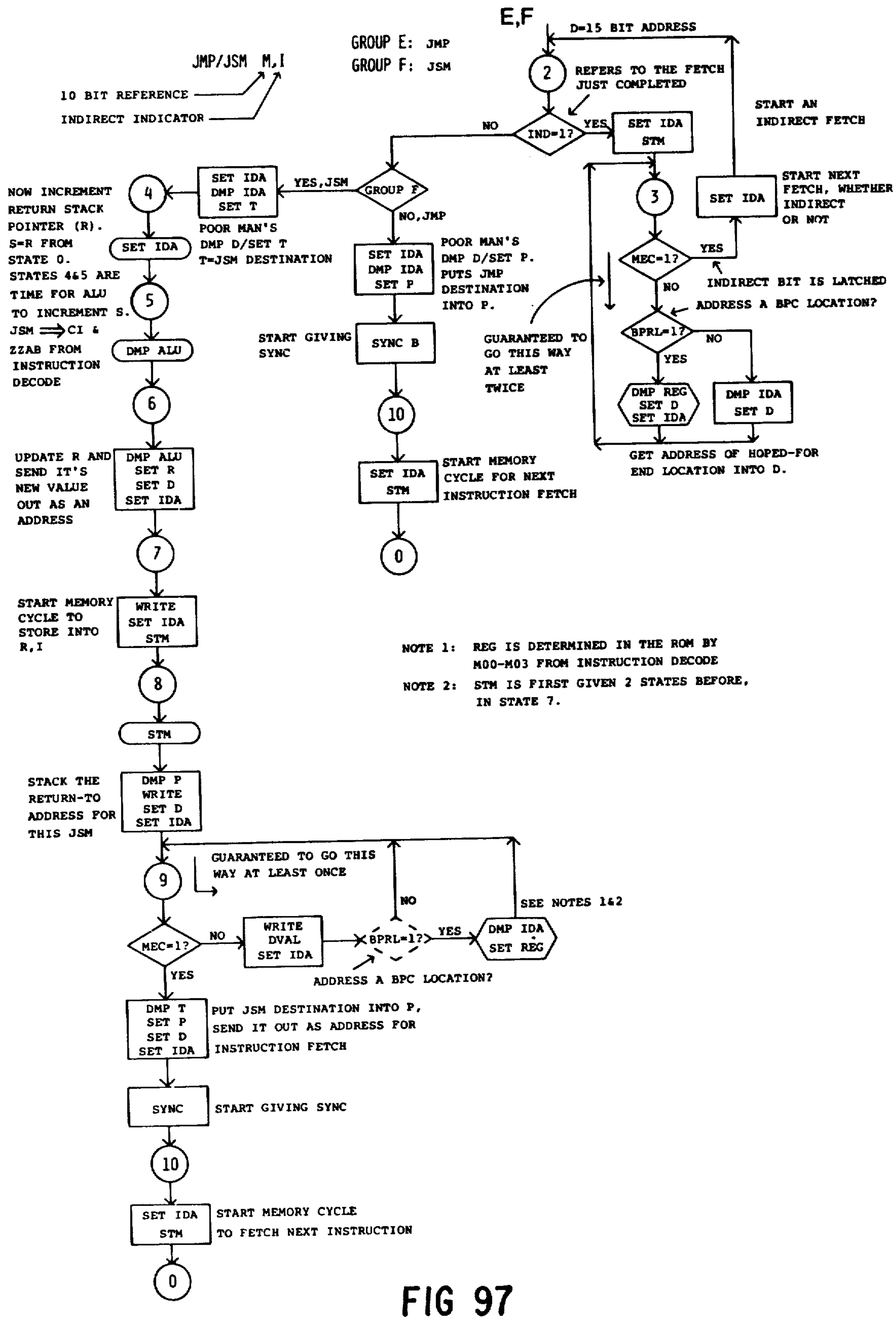
FIG. 97 is a flow chart segment of the JMP and JSM machine instructions executed by the BPC of FIG. 19.
Figure 98:
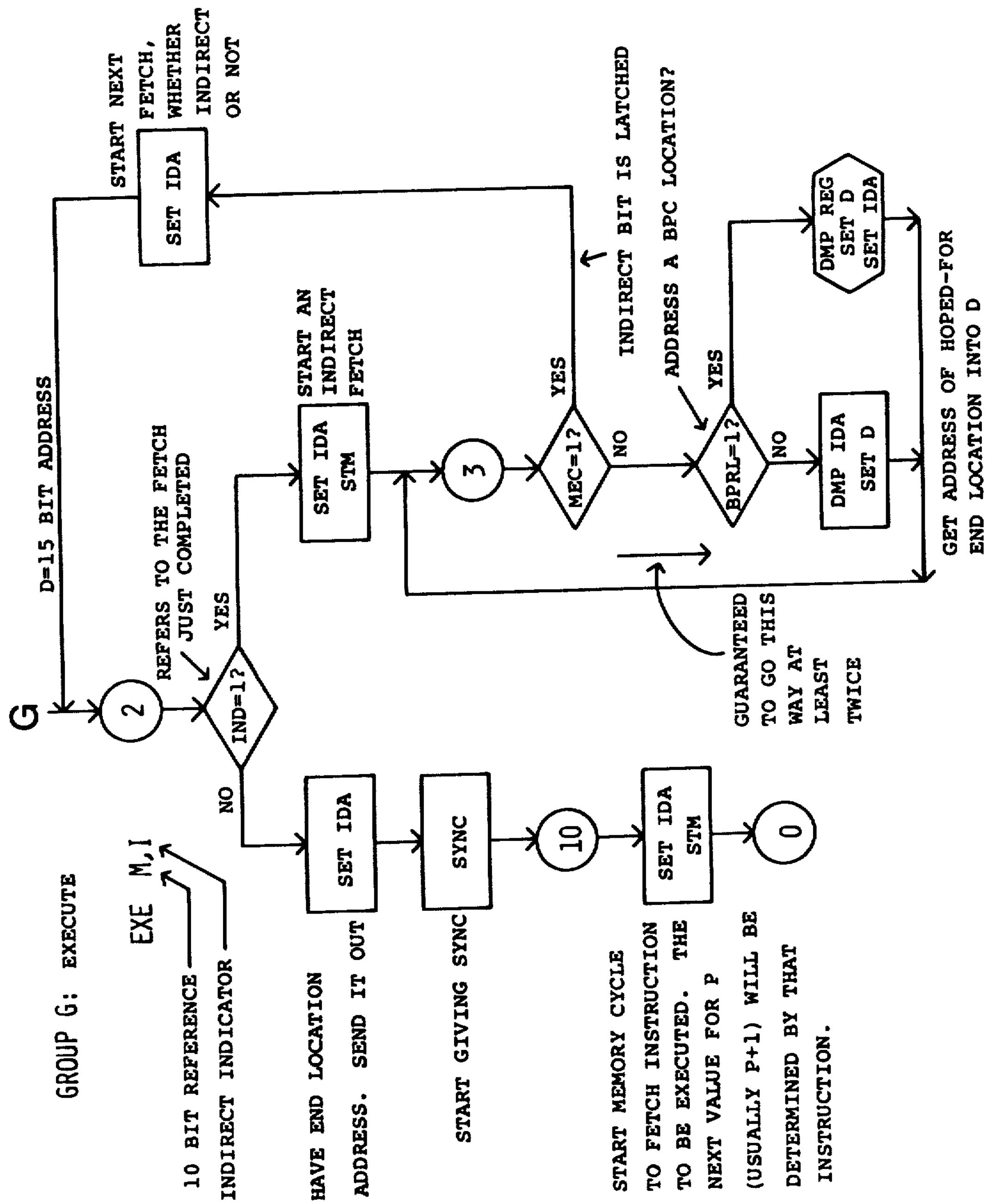
FIG. 98 is a flow chart segment of the EXE machine instruction executed by the BPC of FIG. 19.
Figure 99:
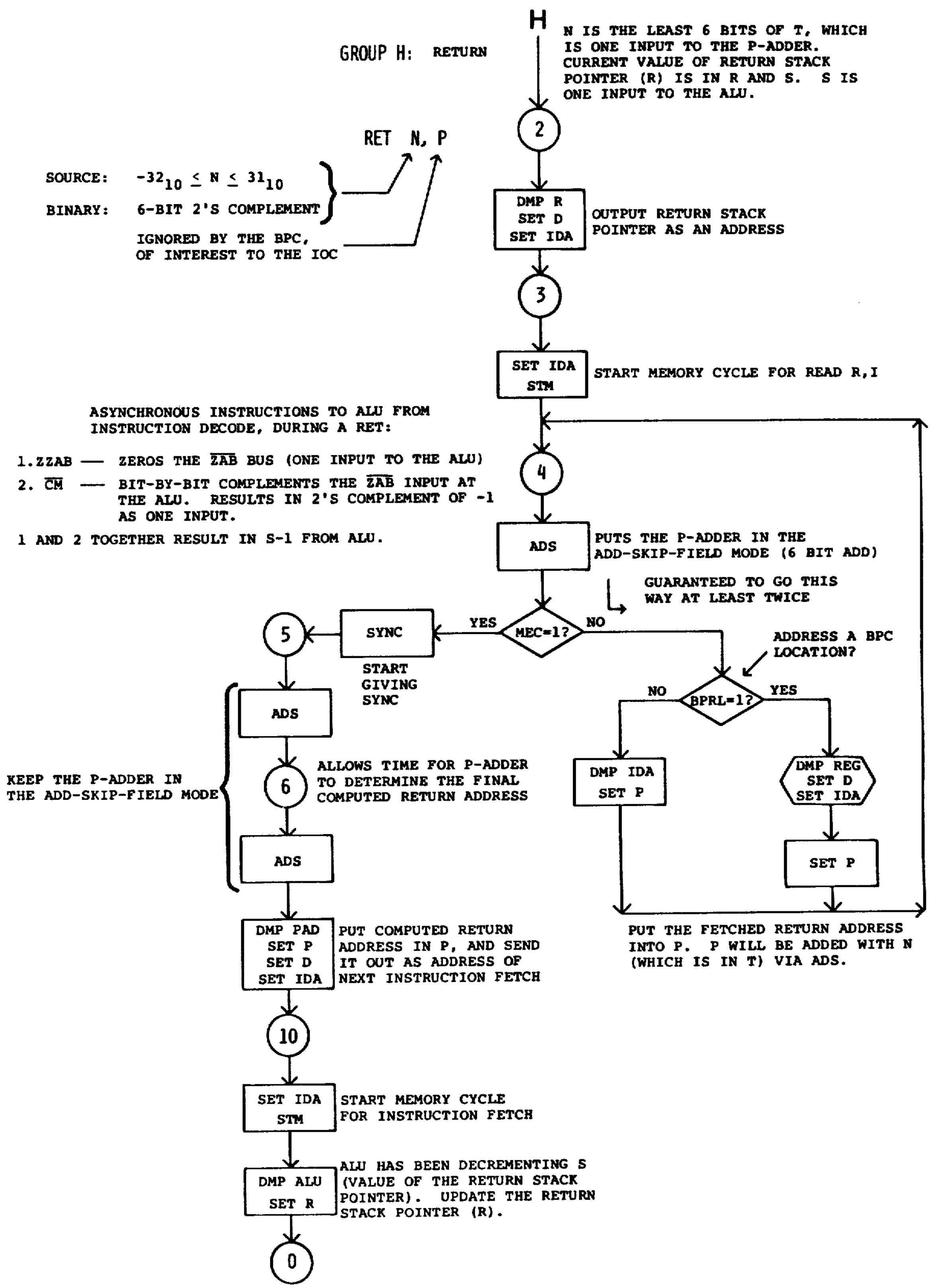
FIG. 99 is a flow chart segment of the RET machine instruction executed by the BPC of FIG. 19.
Figure 100:
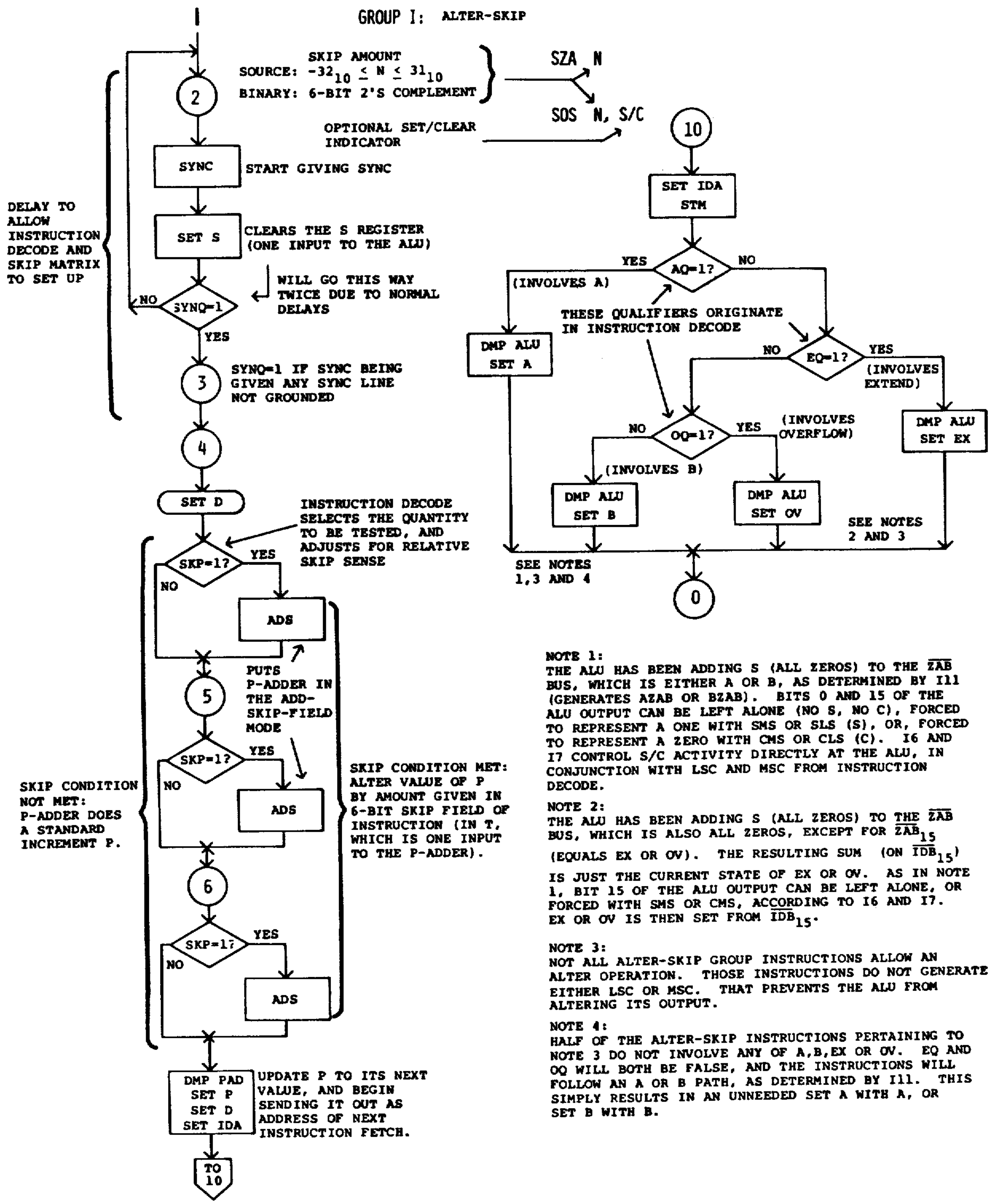
FIG. 100 is a flow chart segment of the alter-skip group of machine instructions executed by the BPC of FIG. 19.
Figure 102:
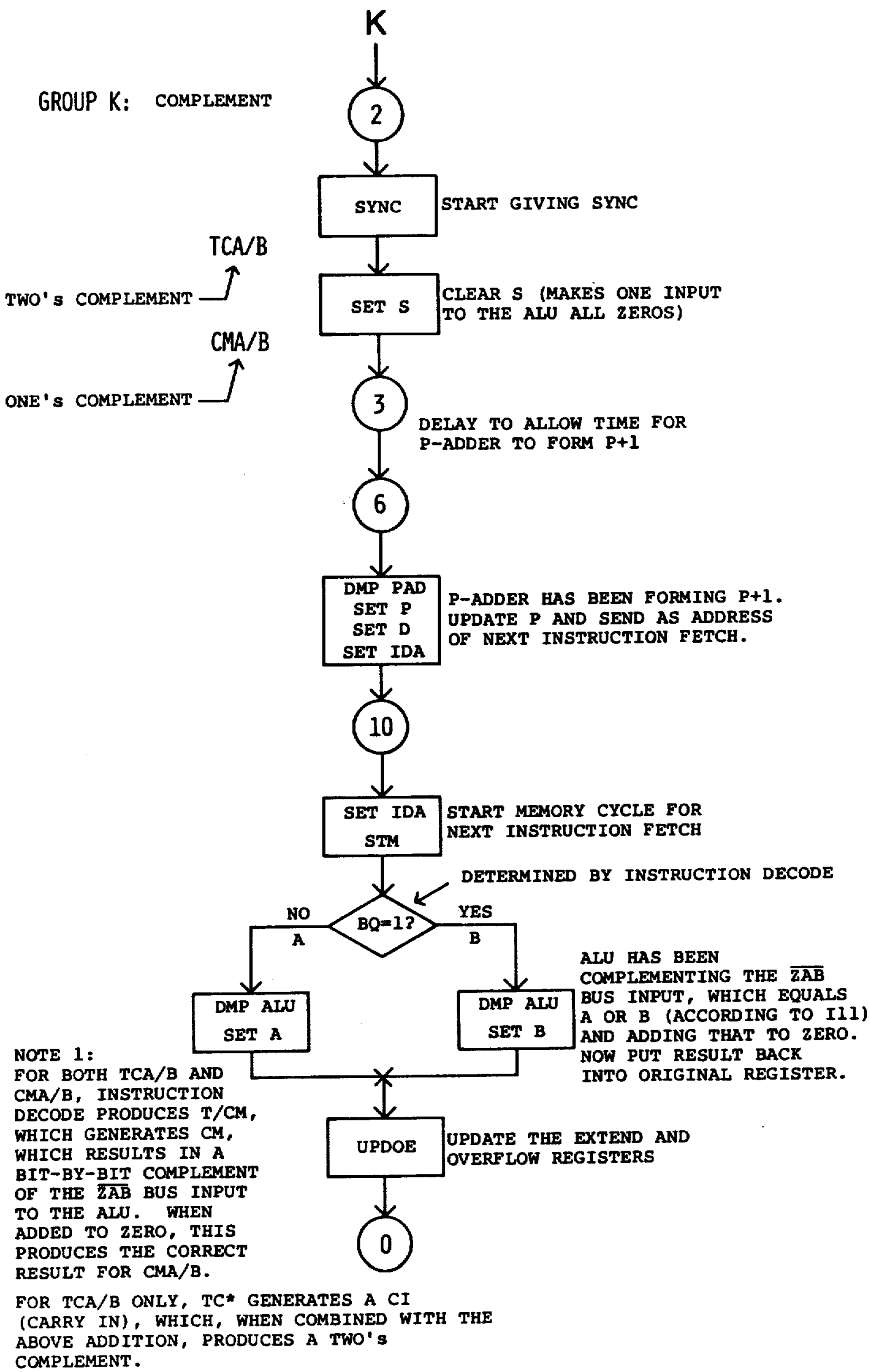
FIG. 102 is a flow chart segment of the complement group of machine instructions executed by the BPC of FIG. 19.
Figure 103:
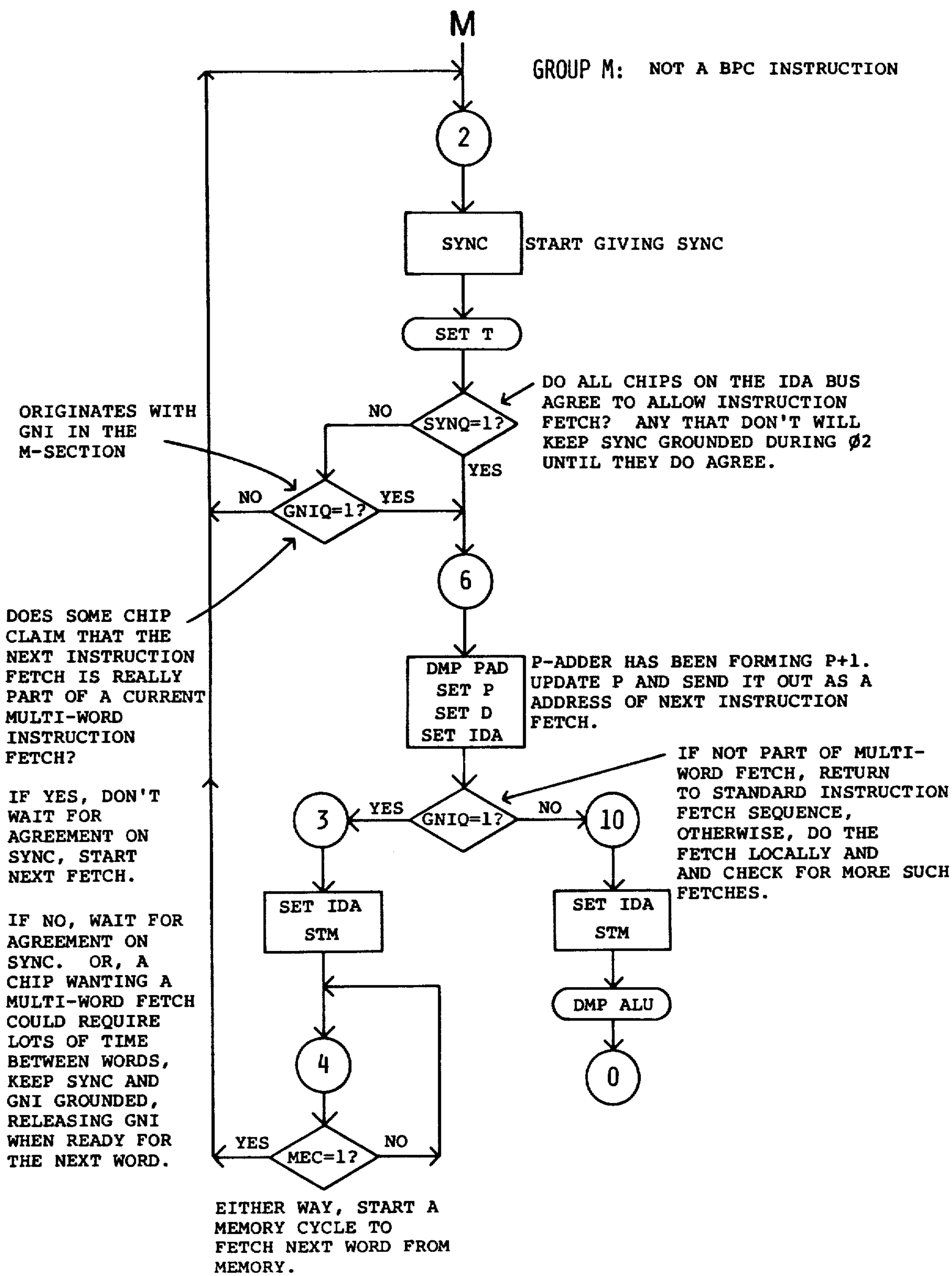
FIG. 103 is a flow chart segment illustrating the response of the BPC of FIG. 19 to a request for execution of a non-BPC machine instruction.
Figure 104:
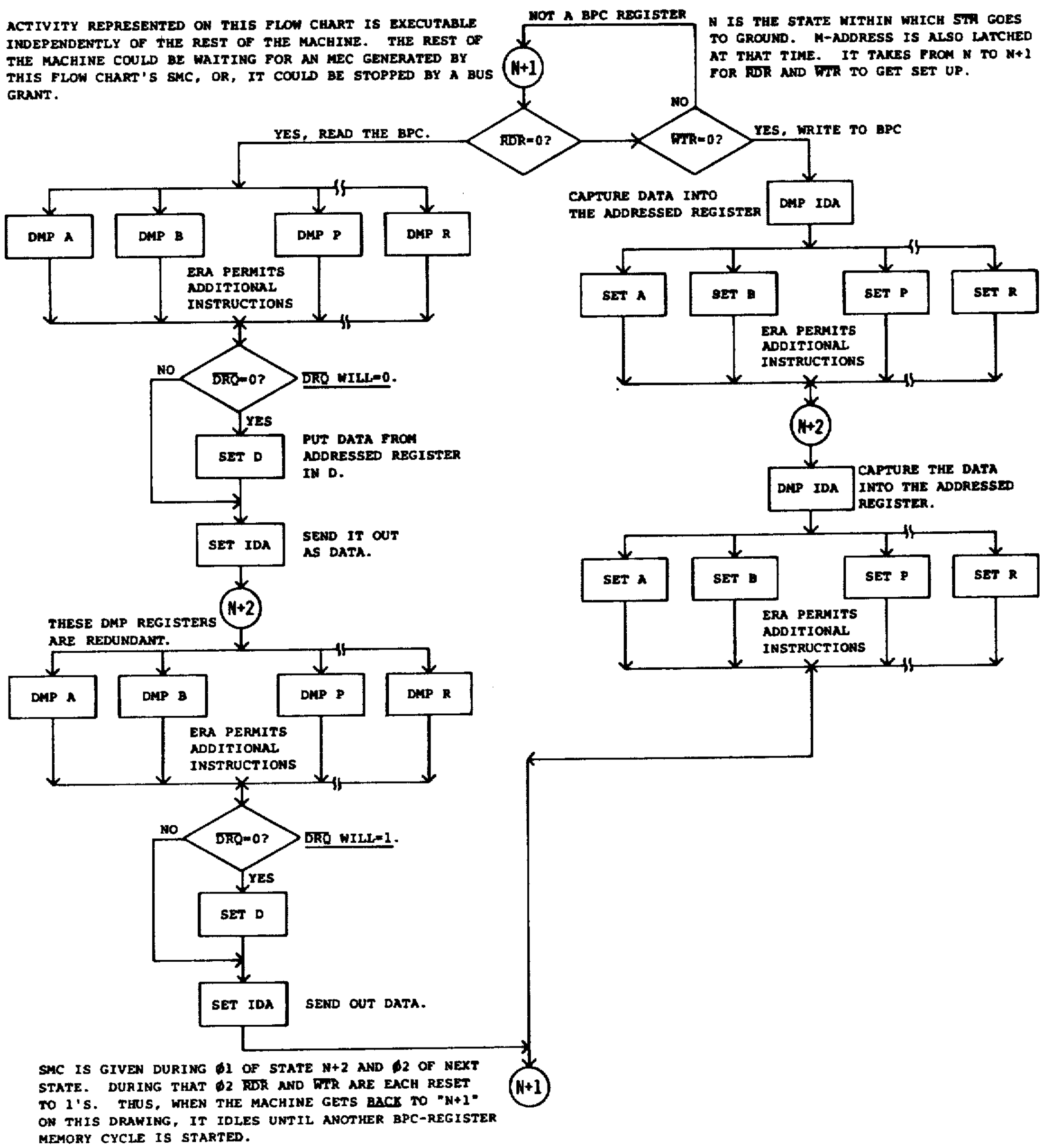
FIG. 104 is a flow chart of memory cycle operation initiated by the M-section of FIGS. 25A–B.
Figure 107A:
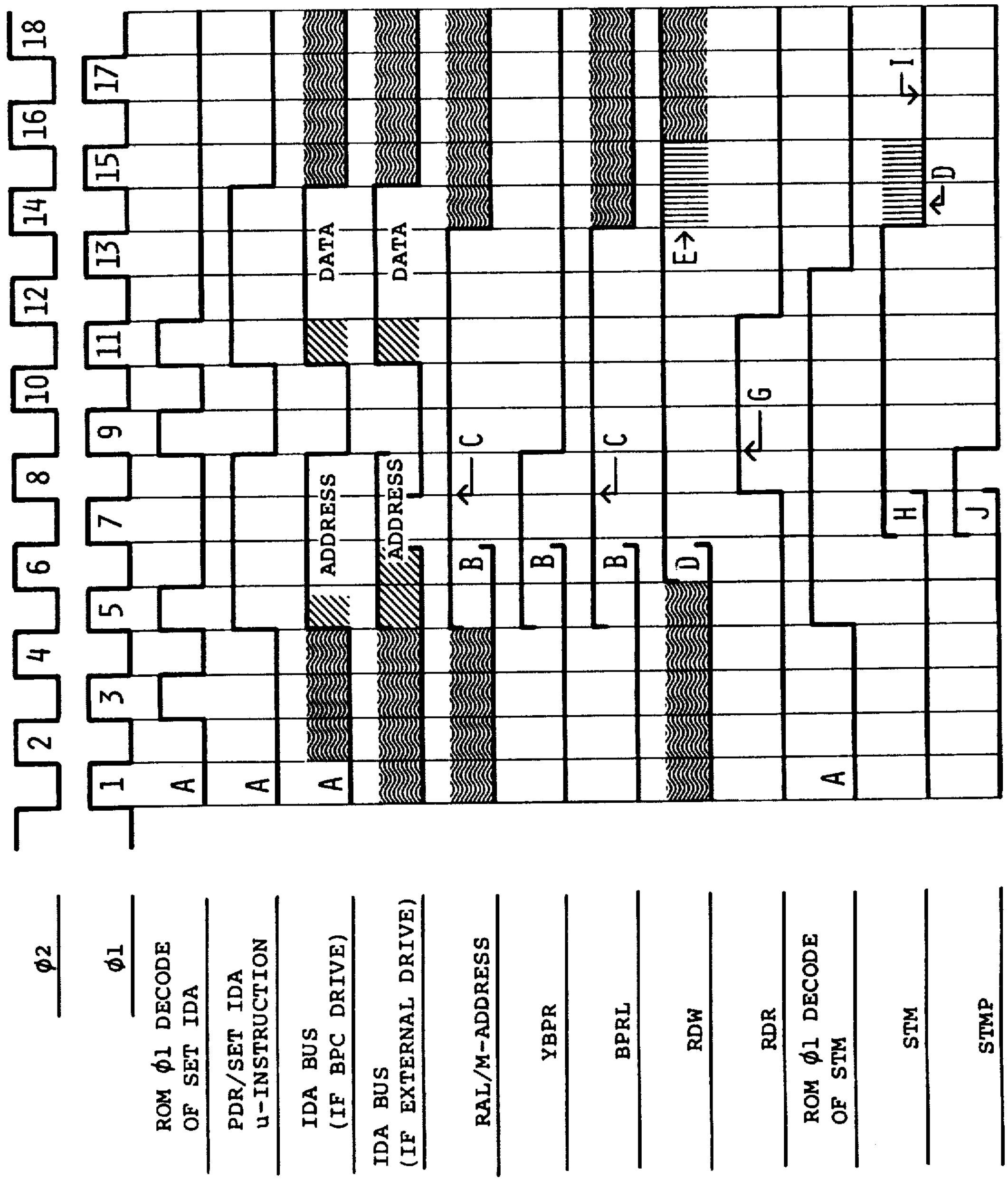
Figure 107B:
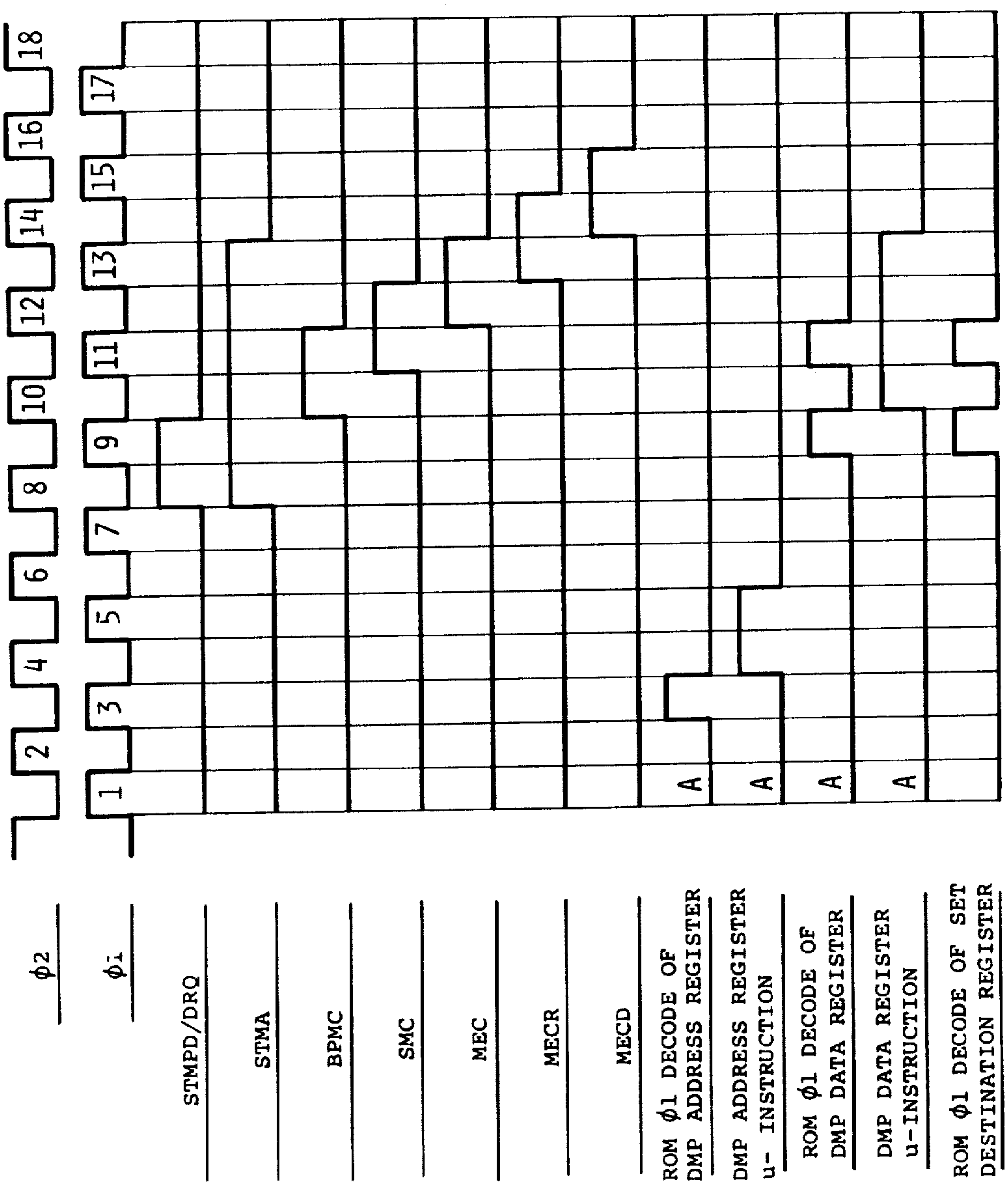
Figure 108A:
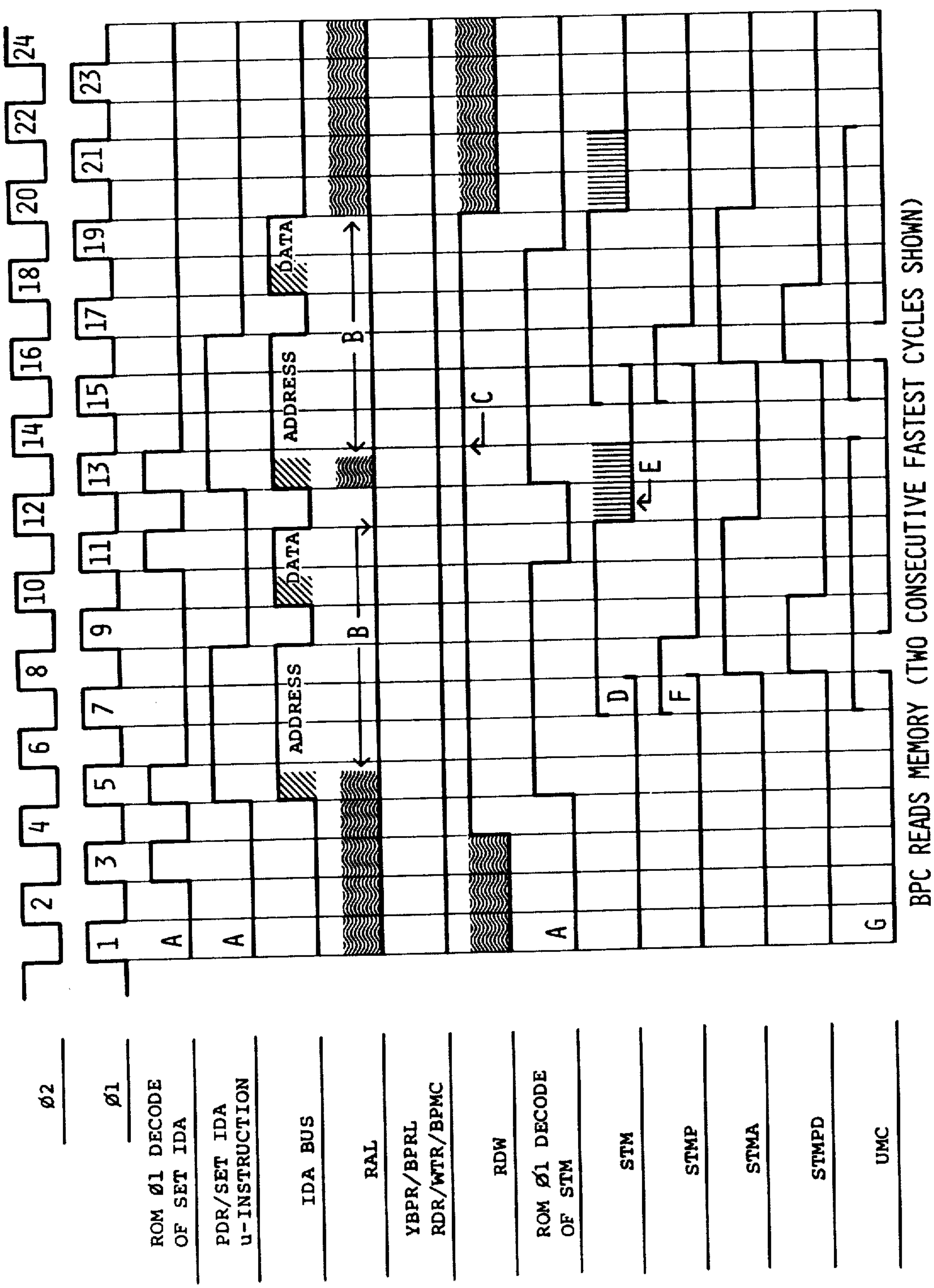

While a file is being recorded, a routine illustrated by the flow charts shown in FIGS. 171A–B is called as the cassette hardware writes the inner partition gaps illustrated in FIG. 70B. The length of the next partition is calculated in bytes and the last partition is determined. This routine execution is simply a matter of returning 256 in all cases except program (user) files. If the file is user programmed, the partition length is calculated by adding line lengths until the count is ≧256 bytes.

Referring to the flow chart shown in FIGS. 172A–B, in loading there are two special cases. One is numeric data in which the first single floating point number in a partition is filled with code that will list or display ?.?????????eØØ, if the calculator is in flt 11, for example, thereby indicating that this partition of data is questionable if an error occurs in the partition.

The other special case is user programming. An entire partition of lines is replaced in memory by a single line of stars, "*******", if an error is detected while loading that particular partition. Thus a user can determine from the lines surrounding this line of stars which lines need to be replaced.

At the end of an erroneous load a routine is invoked which determines where the end of the program is, since the current size information in the file header is useless in an error situation. This routine then goes on to patch up line bridges, illustrated in FIG. 173, that are also in error since several lines have been replaced by a single line of stars and the program itself has shrunk.

The following program is run to initialize a new tape cartridge:

```
Ø: trk Ø;rew;
mrk 1,1;ert Ø
1: trk 1; rew;
mrk 1,1ert Ø
2: end
```

This program marks one null file on track 0 and track 1 as file 0. Then, each track is erased except for the single null file on each track. This insures that no residue noise from the manufacturing process remains on the tape.

POSITIONING THE TAPE

The tape position is unknown whenever a tape cartridge is inserted into the tape drive, the track changed, RESET pressed, or erase a executed. Any tape cartridge statement except identify file (idf) (without parameters) and mark (mrk) will position the tape for the system. Once the tape is positioned, both mrk and idf can be used. The lowest file number on each track is file zero.

THE REWIND STATEMENT

Syntax:

rew

The rewind (rew) statement is used to rewind the tape cartridge to its beginning. This statement has the same function as the rewind key.

Rewinding the tape is a parallel process and other operations can take place while the tape rewinds.

THE TRACK STATEMENT

Syntax:

trk track number

The track (trk) statement ses track 0 or track 1 of the tape cartridge. When the track statement is executed, any following cassette operations are performed on that track. Track 0 is automatically set whenever the machine is switched on, RESET is pressed, or erase a is executed. The track does not change when the cartridge is removed. The track number can be an expression with a value of 0 or 1.

Unless a subsequent track statement specifies track 1, cassette operations will be performed on track 0.

THE ERASE TAPE STATEMENT

Syntax:

ert file number

The erase tape (ert) statement is used to erase everything on the current track starting from the file number specified following a mark statement, described hereinafter. After the erase operation, the tape is positioned at the file specified and one null file is marked. The null file is used as a starting point when marking more files.

The file number can be an expression.

Figure 170C:
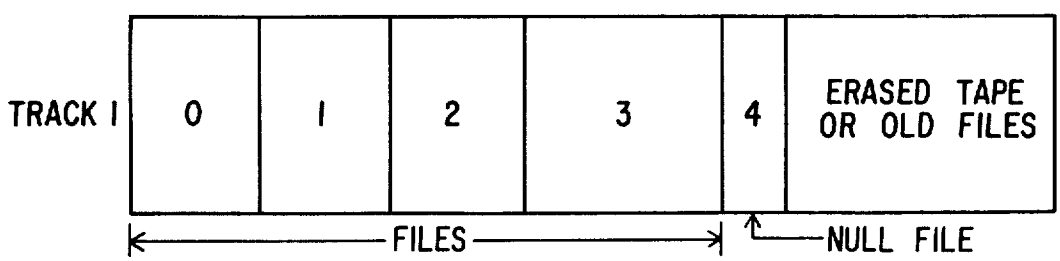

Example:

Assume a cassette has the structure shown in FIG. 170C on track 1:

To erase everything on track 1 beginning at file 3 to the end, the following program is used:

```
Ø: trk 1
1: ert 3
2: end
```

Figure 170D:
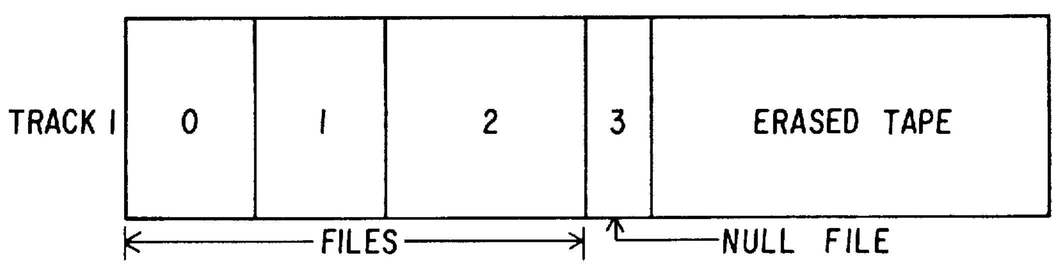

After running this program, the tape's structure is as shown in FIG. 170D.

Track 0 is not altered.

THE IDENTIFY FILE STATEMENT

Syntax:

idf [file number[, file type[, current file size [, absolute file size [, track number ]]]]]

The identify file (idf) staement is used to identify the parameters of the next file in the forward direction. All five of the parameters are return variables shereby a value is returned to the variable specified when the statement is executed. All of the parameters are optional. If one variable is specified, such as: idf A, then only the file number is returned. Two variables must be specified to get the file type; three variables to get the current file size in bytes; four variables to get the absolute file size in bytes; and five variables to get the track number.

The file type can be one of the following:

| | |
|---|---|
| 0 | null file |
| 1 | binary program |
| 2 | numeric data |
| 3 | string or string and numerics (String ROM required) |
| 4 | memory file (from rcm statement) |
| 5 | key file |
| 6 | program file |

The return parameters can be any variable type (simple, array, or r-variable). If the tape position is unknown, at least one return variable must be specified or error 45 will occur. At the end of the identify file statement, the tape is positioned before the file's header.

| Example: | |
|---|---|
| idf A,B,C,D,E | Identify the current file and return the file number, file type, current file size, absolute file size, and track number to A,B,C,D, and E, respectively. |

THE FIND FILE STATEMENT

Syntax:

fdf [file number ]

The find file (fdf) statement is used to find the specified file on the current track of the tape cartridge. The tape is positioned at the beginning of the file specified. The file number can be an expression. the find file statement without parameters finds file 0. If a file number which does not exist is specified, the next cartridge statement executed ([except find file (fdf) or rewind (rew)]results in error 65.

Other statements can be executed while the find file statement is executing.

| Examples: | |
|---|---|
| fdf 8 | Find file 8. |
| fdf A[3] | Find the file specified by the value of A[3]. |

THE SET SELECT CODE STATEMENT

Syntax:

ssc select code

The set select code (ssc) statement is used to specify the select code of an external tape drive. Select code 1 specifies the select code of the internal tape drive, which is automatically set when the power is switched on, erase a is executed or RESET is pressed.

THE TAPE LIST STATEMENT

Syntax:

tlist

The tape list (tlist) statement is used to identify the files on the tape cartridge. The tape's current position and tract, file number, file type, current file size in bytes, and absolute file size are automatically printed. The file type can be one of the following.

| | |
|---|---|
| 0 | null file |
| 1 | binary program |
| 2 | numeric data |
| 3 | string or mixed string and numeric data (the String ROM must be present or loading this file will display error 50.) |
| 4 | memory file (from rcm statement) |
| 5 | key file |
| 6 | program file |

If the stop key is pressed while a tlist is being executed, the tlist terminates. Otherwise it will half when the null file is reached.

A convenient way to determine the current track setting is to execute "tlist" then press the STOP key.

THE MARK STATEMENT

Syntax:

mrk number of files, file size in bytes [, return variable]

The mark (mrk) statement reserves file space on the tape cartridge. One file more than the number of files specified is marked. This file is the null file and is used as the starting point when making more files. The null file has an absolute size of zero. Although it is not required, it is a good idea to execute the erase tape (ert) statement following the mark statement to clear the current track beginning at the null file. This should be done to avoid problems with accidental access of invalid files on the tape cartridge. The file size is specified in bytes. If an odd number of bytes is specified, one more byte is automatically marked. For example, if 111 bytes are specified, 112 bytes are marked.

In order to mark files, the position of the tape must be known. If the position is unknown, execute a find file (fdf) statement to position the tape where you are going to start marking.

The number of files and the file size can both be expressions. If a return variable is specified, the file number of the last usable file marked is stored in it. If the value of the return variable is positive, all the files specified are marked. If the value is negative, an end-of-tape (eot) condition occurred before all the requested files were marked.

Example:

A tape is to be re-marked for 3 files with a length of 320 bytes each on tract 0. The following short program performs this operation.

| | |
|---|---|
| Ø: rew | Rewind the cassette. |
| 1: trk ØSet to track 0. | |
| 2: mrk 3,32Ø,X | Mark 3 files, 320 bytes long. |
| 3: ert X+1 | Erase the rest of track 0. |
| 4: end | End the program. |

DETERMINING SIZE TO MARK A FILE when marking a file for a program which is currently in the calculator, a user executes a "list 9999." The number in the left hand portion of the display is exectly the number of bytes needed to record the program. It is advisable to mark the file lager so that any future program changes that may increase the program size can still be accommodated on the file.

Data files require 8 bytes for each data element to be recorded. For example, to record data which is stored in the variables A and B, mark a file 16 bytes long.

Special function key files require 1 byte for each character under the keys, plus 2 bytes for each defined key. If the number of bytes for each key is odd, a user adds one byte. the sum is the minimum size to mark the file.

For a memory file (using rcm) a user marks the file for the size of available calculator memory.

THE RECORD FILE STATEMENT

The record file (rcf) statement is used to store both data and programs. The syntax for each is explained below.

RECORDING PROGRAMS syntax:

rcf [file number[, beginning line number[, ending line number ]]][, "SE" or "DB"]

To record a program or a section of a program the record file (rcf) statement is used. The file is assumed to be file zero if no file number is specified. The entire program is recorded on the specified file if no line numbers are specified. The program from a line number to the end is recorded if the beginning line number is specified. A program section is recorded from the first line number to the second line number, inclusive, if both line numbers are specified.

the file number and ending line number parameters can both be expressions, but the beginning line number must be a number. If "SE" (for secure) follows at the end of a statement, the program is secured when stored on tape. When the secured program is loaded back into the calculator, the program cannot be listed or displayed, but can be re-recorded on a tape cartridge.

When "DB" (for debug) follows at the end of a statement, any trace or stop flags are stored with the program.

The tape file must be marked before recording a program. The file size must be greater than or equal to the size of the program being recorded.

| Example: | |
|---|---|
| 7: rcf 8,3 | Record the program on file 8, starting at line 3 through the end. |

RECORDING DATA syntax:

rcf file number, data list the record file (rcf) statement is used to record data. The list can consist of simple variables, array variables, or r-variables. But, r-variables cannot be mixed with simple and array variables in the same statement. The file number can be an expression.

To record an entire array, the array name is followed by an asterisk in brackets. For example:

S[*] Refers to the entire S array.

Simple and array variables must be contiguous in the calculator memory. That means that they must appear in the data list in the same order as allocated. If the variables appear in a dimension (dim) statement, they must appear in the same order in the rcf statement.

| Example: | |
|---|---|
| Ø: dim A[1Ø,1Ø] | The array A is allocated 100 variables (800 bytes). |
| 1: Ø→X | The variable X is allocated 1 variable (8 bytes). |
| 2: X+1→X | Doesn't affect memory allocated to X. |
| 3: 1→I | The variable I is allocated 1 variable (8 bytes). |
| 4: rcf 5,A[*],X, * | The array A, and variables X and I are recorded in the same order as allocated (contiguously) on file 5 (total of 102 numbers or 816 bytes). |

If r-variable is specified in the data list, all r-variables from $r_0$ to that r-variable are recorded. If two r-variables are specified, all r-variables from the first through the second are recorded.

Consideratins for Recording Data the variables listed must be listed in the same order as they are allocated in memory when recording data on a tape cartridge.

| Example |
|---|
| 0: ent A<br>1: 2*A→B<br>2: dim C,X,Y,Z,<br>.<br>.<br>.<br>15: rcf A,B,C,X,<br>Y,Z |

In the above example program, the variables A and B are allocated outside a dimension statement. Variables C,X,Y, and Z are allocated in a dimension statement. Line 15 would cause error 56 to be displayed if B were allocated before A in the program since the variables must be listed in the same order as they are allocated. It is sometimes difficult to know the order in which variables are allocated because lines are not necessarily executed in numerical order. It is strongly recommended that when variables are to be recorded on a single file they be allocated in a dimension statement.

THE LOAD PROGRAM STATEMENT

Syntax:

ldp [file number[, line number$_1$ [, line number$_2$]]]

The load program (ldp) dtatement is used to load a program from a specified file on the current track and run it automatically. The automatic run implies that all variables are erased, all go sub return pointers are cleared, and all flags are cleared.

when a file number only is given, the program is loaded from that file, beginning at line zero, and the program automatically runs from line zero. When the file number and the first line number are specified, the program is loaded from that file, beginning at the specified line number and runs from that line number. When all three parameters are specified, the program is loaded from the specified file number beginning at the first specified line number and begins running at the second specified line number. If no parameters are specified, zeros are assumed for all three. All three parameters can be expressions.

This statement is not allowed in live keyboard mode or during an enter statement.

| Examples: | | |
|---|---|---|
| ldp 2 | EXE-CUTE | Load the program from file 2 beginning at line 0 and run from line 0. |
| ldp 8,2 | EXE-CUTE | Load the program from file 8 beginning at line 2 and run from line 2. |
| ldp 16,3,0 | EXE-CUTE | Load the program from file 16 beginning at line 3 and run from line 0. |

THE LOAD FILE STATEMENT

The load file (ldf) statement is used to load both data and program files into the calculator memory.

LOADING PROGRAMS

Syntax:

ldf [file number[, line number$_1$ [, line number$_2$]]]

The load file (ldf) statement loads programs from a specified file on the current track into the calculator memory.

This statement is executed from the keyboard as follows. The program on file zero is loaded, beginning at line 0 if no parameters are given.

The file identified by a file number is loaded beginning at line 0 when the file number is given. If the file number and a line number are specified, then that file is loaded beginning at the specified line number. When all three parameters are given, the specified file is loaded beginning at the first line number, and the program automaticlay continues at the second line number with all variables being preserved.

This statement is executed in a program as folows: When no parameters are specified, the program on file zero is loaded beginning at line zero and the program automatically continues at line zero. When the file number is specified, then the program is loaded from the specified file beginning at line zero and continues at line zero. When the file number and a line numbe are given, the specified file is loaded beginning at the specified line number and the program continues from that line number. When all three parameters are given, the statement is executed the same as from the keyboard. That is, a "continue" is performed from the second line number. All three parameters can be expressions.

This statement is not allowed in live keyboard to load a program file or during an enter statement.

LOADING DATA

Syntax:

ldf [file number[, data list ]]

the load file (ldf) statement loads data from the specified file on the current track. The data list contains the names of variables separated by commas. Simple and array variables cannot be in the same ldf statement as r-variables.

If no list is specified, data begins filling the r-variables from $r_0$ until all the data has been loaded. If one r-variable is specified, the data begins filling r-variables from that r-variable until all the data has been loaded into higher r-variables. If two r-variables are specified, the data starts filling from the first location specified (lower r-variable) to the second, higher, r-variable. If there is more data than available or specified r-variables, no data is loaded.

When simple or array variables are specified, data begins filling the first variable until all variables have assigned values. If there is more data than variables, no data is loaded. If there is less data than variables, the data is loaded until all data is used. Variables must be contiguous.

| Examples: | |
|---|---|
| ldf 4,r0,r10 | Load data file 4 starting from $r_0$ to $r_{10}$. |
| ldf r12,a,b[*] | Load the data file designated by $r_{12}$ into the variable A and array B. |

While that part of memory to be recorded or loaded is uniquely specified by the rcf or ldp statements, the ldf statement will cause loading into program area or variable area depending on the file accessed, not on the ldf statement itself.

Array and r-variable Storage r-variables are recorded in the opposite order of array variables. Thus, if r-variables are recorded, then loaded back into an array, they will be in the opposite order.

THE RECORD KEYS STATEMENT

Syntax:

rck [file number]

The record keys (rck) statement is used to record all the special function keys on the specified file on the current track. If the file numberis omitted, file zero is assumed. The file number can be an expression. The specified file must be marked before the record keys statement is executed.

| Examples: | |
|---|---|
| rck 2 | Record the special function keys on file 2. |
| rck A[12] | Record the special function keys on the file designated by the 12th element of array A. |

THE LOAD KEYS STATEMENT

Syntax:

ldk [file number]

The load keys (ldk) statement is used to load the special function keys exactly as they were recorded from the specified file on the current track. If the file number is omitted, file zero is assumed. The file number can be an expression. Executing the load keys statement from the keyboard causes go sub return pointers to be reset and causes the program counter to reset to line zero.

This statement is not allowed in live keyboard or during an enter statement.

| Example: | |
|---|---|
| ldk 4 | Load the special function keys from file 4. |

THE LOAD MEMORY STATEMENT

Syntax:

ldm [file number]

The load memory (ldm) statement is used to load a previously recorded memory file. When the load operation is complete, the calculator is inthe same state it was in when memory was recorded.

If a program was running when the record memory (rcm) statement was executed, that program will continue with the next statement after the record memory (rcm) statement when the load memory statement is executed.

The record memory and load memory statements are especially useful when executed from live-keyboard or from a special function key to "freeze" the state of the system without interrupting the running program.

The file number can be an expression.

Referring to FIG. 174, a flow chart of the ldm subroutine is shown.

THE RECORD MEMORY STATEMENT

Syntax:

rcm [file number]

The record memory (rcm) statement records the entire read-write memory in its current state or the specified file on the current track of the tape cartridge.

If the file number is omitted, file 0 is assumed. The file number can be an expression.

Referring to FIG. 175, a flow chart of the rcm subroutine is shown. The record memory statement records all user read/write memory space, variable area, and enough system and optional memory to insure that the calculator system can be brought back to the state it was at rcm upon the execution of the corresponding ldm statement. Also recorded is a special "ROM present" indicator to allow the ldm statement to guarantee that the option ROMs are the same. Likewise, the ldm statement loads the enter read/write memory space and places the calculator system in the same state it was at rcm.

The statements rcm and ldm are executable in all calculator states, i.e. during program execution, idle (keyboard entry), live keyboard, and when a program stops for an ent statement.

This feature is particularly useful to provide a backup of the system periodically during a long program execution for example, or in case of power failure or the like. It is also convenient if done during live keyboard to "freeze" the system state at a particular point during execution.

At the termination of the execution of ldm the calculator is in the same execution state as it was at the end of the corresponding rcm statement that created the tape file.

On ldm, a check is made by the calculator of all option ROMs present on the system to be sure they are the same as the option ROMs on the system when the rcm statement was executed. If this test fails, the user is told via one of two displayed error messages. One of these says that the ROM whose load number is displayed is present now but was not at rcm time. The other message says that the ROM whose load number is displayed was present at rcm time but is not present now. This is accomplished by requiring each ROM to set a bit in a rom-word (ROMWD) when they are initialized. This rom-word is recorded in a special word in the record head of the memory file at rcm time. At ldm time the rom-word in the record head is compared, bit by bit, against the corresponding rom-word in memory to determine the presence or absence of ROMs. If a difference is encountered, the operation is aborted. This guarantees that the calculator will work properly after ldm.

THE LOAD BINARY PROGRAM STATEMENT

Syntax:

ldb [<file number>]

The load binary program (ldb) statement loads binary programs, a binary program being a machine language program which cannot be listed or displayed, into the calculator's read/write memory from the specified file on the current track of the tape cartridge. Binary programs can be loaded over other binary programs of equal or greater length at any time.

If no file number is specified, file 0 is assumed. The file number can be an expression.

| Example: | |
|---|---|
| ldb 2 | Load the binary program from file 2. |

Certain rules must be followed when loading binary programs since binary programs occupy a special place in memory.

Any binary program can be loaded at any time from the keyboard or a running program if no simple or array variables are allocated provided there is room in memory for it.

Once simple or array variables are allocated, a binary program cannot be loaded unless space has been allocated for it by a previous binary program load.

It is suggested that before any simple or array variables are referenced, the largest binary program file that the program will need be loaded so that variables can be allocated and binary programs loaded without concern about room for the binary program.

FILE VERIFICATION

File verification is used to compare a tape file against the calculator memory to detect recording errors without losing the information in memory.

File verification requires a stronger tape signal than load thereby increasing confidence that a file will load properly at a later time.

The calculator returns to automatic file verification when the calculator is turned on, erase a executed, or RESET pressed. The auto verify disable (avd) statement turns file verification off and the auto verify enable (ave) statement turns automatic file verification on. The verify (vfy) statement allows one to verify files repeatedly under program control.

When the calculator is in auto-verify mode, all record statements are followed by an automatic verify operation.

THE VERIFY STATEMENT

Syntax:

vfy [return variable]

The verify (vfy) statement is used to compare tape files with the calculator memory. The value of the return variable is 0 after the operation if the calculator memory is identical to the tape file. The return variable one if the two are different. Error 44 occurs if the memory and tape file are not identical and no return variable is specified.

The return variable can be either a simple, array, or r-variable.

The verify statement provides added user confidence in a recording, even though a record operation is usually followed by an automatic verification.

This statement is also useful when a badly worn tape is being used. In this case, a user preferably turns off auto-verify and uses the verify statement. If the verify fails, the user performs the record operation again.

TAPE CARTRIDGE ERRORS

When an error 46 is displayed, a user should first clean the tape head and drive wheel and execute the statement which caused the error again a few times. If an error still occurs, the next step depends on the type of file being loaded.

If an error 46 is displayed while loading a program file, one or more program lines may be lost. The place where this error occurred is indicated by a line of asterisks (*) inserted in the program at the place where the program lines are missing. These lines can be replaced by referring to a previous listing. Go to and go sub statement addresses are adjusted during this editing. Thus, it may be necessary to readjust the go to and go sub addresses after inserting the lost lines.

If an error 46 is displayed while loading numeric data, the partitions in question are marked by a single number in that partition being replaced by "?.???" (in float 11 format). A partition in a numeric data file always contains 32 numbers. With one entry replaced by "?.???", there are 31 numbers remaining which may be incorrect. For r-variables, the 31 higher numbered r-variables may be incorrect. For simple and array variables, a user should determine the order in which the variables in question were allocated. From the element that is replaced by "?.???", a user preferably searches from right to left in the dimension statement to locate the error. For an array, the first element in the lost partition will have the largest subscripts. Decreasing the leftmost subscript first for an array reveals the missing values.

File Header Read Error

If a file head read error (error 47) occurs, a user should preferably procede as follows:

1. Clean the tape head and drive wheel.
2. Execute the statement that caused the error again.
3. If, after steps 1 and 2, the error still occurs, a user should remark the tape-file header. Remarking a file header, however, is a "last resort" operation. All data and programs on a file with a re-marked header is lost and that file can no longer be used.

To remark the head of file N (file which cannot be loaded) a user executes:

| | |
|---|---|
| fdf N-1 | Positions the tape. |
| mrk 0,0 | Re-marks file header. |
| For file 0, execute: | |
| rew | Positions the tape. |
| mrk 0,0 | Re-marks file header. |

After the file header has been re-marked the absolute size of the file is 2 bytes.

Error Messages

When an error occurs, the calculator makes a soft beep and the word "error" followed by a number appears in the display. The number references an error message that will help pinpoint the cause of the error.

If an error message is displayed during an attempt to run a program, the program line number where the error occurs is referenced.

A complete list of the error messages is given in the Table below.

ERRORS

An error in a program resets the program counter to line 0. Pressing CONTINUE will continue the program from line 0.

00 System error.
01 Unexpected peripheral interrupt. Only occurs when a peripheral is being used. Press reset key to recover.
02 Unterminated text. The line of text must have an ending quote. This error results in a cursor being displayed showing the location of the error.
03 Mnemonic is unknown. This error is usually caused by typing errors, such as go to instead of gto; or by executing a command in live-keyboard mode or in an enter statement. This error results in a cursor being displayed showing the location of the error.
04 System is secured. This error is generally caused by trying to list or fetch lines in a secured program.
05 Operation not allowed - line cannot be stored or executed with line number. This can be caused by pressing execute, store, or line insert with a fetched line in the display.
06 Syntax error in number. A cursor showing the location of the error is displayed.
07 Syntax error in input line. For example: gto prt 5. A cursor showing the location of the error is displayed.
08 Internal representation of the line is too long (gives cursor sometimes).
09 The go to (gto), go sub (gsb) or end statement is not allowed in the present context. For example, executing an end statement during an ent statement.
10 The go to or go sub statement requires an integer. For example:
gto 23.4 is not allowed
A cursor showing the location of the error is displayed.
11 Integer out of range or integer required. Must be between −32768 or +32767. For example:
spc 50000 integer out of range
del A integer required.
12 The line cannot be stored. It can only be executed. For example:
2 + 2 EXECUTE is OK, but
2 + 2 STORE is not allowed
A cursor showing the location of the error is displayed.
13 Enter (ent) statement is not allowed in present context. For example, ent X is not allowed from the keyboard; only from a program.
14 Program structure destroyed. This can be caused by pressing the reset key while a program is being modified or shifted. It is advisable to record data then execute erase a to recover.
15 Printer out of paper or printer failure.
16 The String ROM is not present for a string comparison or an argument in a relational comparison is not allowed. For example, if the String ROM is not in the calculator:
if "B" < "A"
results in error 16.
17 Parameter is out of range. For example:
wait −5
fxd 15
18 Parameter is not allowed. For example:
erase Z
19 Bad line number. For example:
del 10,5
20 A ROM is missing. As a result, the line cannot be reconstructed. This error usually occurs when FETCH ↑, ↓ or list is executed.
21 Line is too long to store. This can occur when blanks or parenthesis are automatically added. For example, parenthesis are automatically added when storing the line: tan 2 → A, which will appear in a listing as: tan (2) → A.
22 Dimension specification is not allowed. For example, this error occurs when the lower bound of an array is greater than the upper bound. If the String ROM is not in the calculator and a string is dimensioned, this error results.
23 The simple variable has already been allocated. For example:
2 → X; dim A[5], X
24 The array has already been dimensioned. For example:

-continued dim A[4], B[5], A[6]
25 Dimensions of array disagree with subscripts. For example:
dim X[2,7]; 1 → X[5]
26 Subscripts of array are out of bounds. For example:
dim A[12]; 2 → A[58]
27 Undefined array. The array must first appear in a dimension (dim) statement.
28 The return (ret) statement has no matching gsb statement.
29 The line cannot be executed because a ROM is missing. For example; the plt statement is attempted with no Plotter ROM present in the calculator.
30 Special function key has not been defined.
31 Nonexistent program line. For example, gto 900 in a 5 line program.
32 The data type is not allowed. A number is required.
33 Data types don't match in an assignment statement.
34 Display overflow due to pressing a special function key. Only 80 characters can be entered into the display.
35 Flag reference not allowed. There is no such flag. For example:
sfg 18
36 Attempt to delete the destination of a gto or gsb statement. Operation not performed.
37 Display buffer overflow caused by display (dsp) statement.
38 Insufficient memory for go sub (gsb) statement.
39 Insufficient memory for variable allocation or binary program. No allocation takes place.
40 Insufficient memory for operation as in, for example, storing a line with insufficient memory.
41 No cartridge is in the tape transport.
42 Tape cartridge is write protected. A user should slide record tab to other position for recording.
43 Unexpected Beginning-Of-Tape (BOT) marker, or End-Of-Tape (EOT) marker encountered; or a tape transport failure.
44 File verification has failed.
45 Attempted execution of idf statement without parameters when tape position is unknown, or mrk statement when tape position is unknown.
46 Read error of file body. The partition containing the error is lost.
47 Read error of file head.
48 The End-Of-Tape (EOT) was encountered before the specified number of files were marked.
49 File is too small.
50 The ldf statement for a program file must be the last statement in the line.
51 A ROM is present but was not when the record memory (rcm) statement was executed. A user should remove the ROM indicated by one of the numbers below and re-execute the load memory (ldm) statement.

| Number | ROM |
|---|---|
| 1 | Binary Program |
| 6 | String |
| 8 | Extended I/O |
| 9 | Advanced Programming |
| 10 | Matrix |
| 11 | Plotter |
| 12 | General I/O |

52 The ROM indicated by a number from the previous table was present when the record memory (rcm) statement was executed, but is now missing. A user should insert the indicated ROM and re-execute the load memory (ldm) statement.
53 File number or mrk parameter is negative. For example:
mrk -12,300
54 Binary program to be loaded is larger than the allocated memory for the present binary program and variables.
55 Illegal or missing parameter in one of the cartridge statements.
56 Data list is not contiguous in memory for one of the cartridge statements.
57 Improper file type. For instance, this can occur when trying to load a program from a data file or key file.
58 Invalid parameter on rcf statement; "SE" or "DB" expected.
59 Attempt to record a program, data, or special function keys which do not exist.
60 Attempt to load an empty file or the null file (type=0).
61 Parameter out of range in the track (trk) or set select code (ssc) statements. Track 0 or 1, and select codes 1 through 15 are allowed.
62 Specified memory space is smaller than cartridge file size.
63 Cartridge load operation would overlay gsb return address in program; load not executed.

-continued

| | |
|---|---|
| 64 | Attempt to execute ldk, ldf (program file), or ldp during live keyboard or enter statement. |
| 65 | File not found. File specified in the previous find file (fdf) statement does not exist. |
| 66 | Division by zero. Default = + or −9.99999999999e511. A mod B with B equal to zero. Default = 0. |
| 67 | Square root of a negative number. Default = √ (abs(argument)). |
| 68 | Tan (n*π/2 radians); Tan (n*90 degrees); Tan (n*100 grads); where n is an odd integer. Default= +9.99999999999e511, for n>0. Default= −9.99999999999e511, for n<0. |
| 69 | ln or log of a negative number. Default = ln (abs(argument)) or log (abs(argument)). |
| 70 | ln or log of zero. Default = −9.99999999999e511. |
| 71 | adn or acs of number less than −1 or greater than +1. Default = asn (sgn(argument)) or acs (sgn(argument)). |
| 72 | Negative base to a non-integer power. Default = (abs(base)) ↑ (non-integer power). |
| 73 | Zero to the zero power (0 ↑ 0). Default = 1. |
| 74 | Full-precision overflow. Default = + or − 9.99999999999e99). |
| 75 | Full-precision underflow. Default = Ø. |
| 76 | Intermediate result overflow. Default = + or −9.99999999999e511. |
| 77 | Intermediate result underflow. Default = Ø. |

FORMATTED I/O OPERATIONS

Referring to FIG. 4, the I/O Bus transfers data between the calculator processor and peripheral devices. All incoming data is transferred through the processor before it is stored in memory.

As shown in FIG. 4 each external device is connected to the calculator via an appropriate interface card and cable. An interface card plugs into any of the I/O slots in the calculator's back panel. Plug-in ROM cards become a part of the calculator's memory.

ROMs which can be used with the calculator include, for example, a String ROM, an Advanced Programming ROM, a Matrix ROM, a Plotter ROM, a General I/O ROM and an Extended I/O ROM.

The String ROM enables the calculator to recognize and operate on letters and words ("strings") in much the same way that it recognizes and operates on numbers. Some of the capabilities which are provided include: single strings and string arrays, numerical value of a string of digits, concatenation, displaying or printing all special characters, and packing and unpacking floating point numbers in strings.

The Advanced Programming ROM extends the programming capabilities of the Calculator. For/next looping, split and integer precision number storage, multiparameter functions and subroutines, and the cross reference statement are some of the operations provided by the Advanced Programming ROM.

The Matrix ROM extends the language to include statements for manipulating matrices and arrays. Addition, subtraction, multiplication, and division of arrays, as well as inversion, transposition, and determinants of matrices are some of the capabilities provided by this ROM.

The Plotter ROM enables the Calculator to control a plotter. Axes can be drawn and labelled; functions can be plotted; and with a unique "typewriter" mode, characters of varying size can be printed. More than one plotter can be operated at the same time.

The General I/O ROM provides basic I/O capability with formatting. Peripherals can be controlled using this ROM. Basic control of the HP-Interface Bus, explained in greater detail hereinafter and referred to hereafter as HP-IB, and status checking are also provided.

The Extended I/O ROM extends the I/O capability of the calculator by providing complete HP-IB control. Features include Bit manipulation and testing, autostarting, error trapping, and interrupt service routines.

GENERAL I/O ROM

The General I/O ROM operations are given below:

| Operation | Description |
|---|---|
| Write | Output data or character strings to specified device. |
| Read | Request and input data or character strings. |
| Format | Specify numeric specs and edit specs for both read and write statements. |
| Conversion | Set up a character conversion table for read and write statements. |
| Write Binary | Output 16-bit binary numbers. |
| Read Binary | Input 16-bit binary numbers. |
| Write Control | Output binary status codes via an Interface Card. |
| Read Status | Check interface or peripheral status information. |
| List | Output program listings to external device. |

External devices share the same I/O bus used by internal peripheral devices and internal peripherals respond to some General I/O operations in addition to their specific commands. Since all external devices are "party-lined" on the same bus, each device is assigned a unique address, or select code, so that the correct device responds to each I/O operation.

For all external peripherals, the select code is an integer number from 2 through 15 which is specified in each I/O operation and decoded by the corresponding interface card. Two digits are added to the select code parameter to address peripherals via a Hewlett-Packard Interface Bus, described for example in the January, 1975, Hewlett-Packard Journal, Vol. 26, Number 5, and in U.S. Pat. No. 3,810,103 entitled Data Transfer Control Apparatus, issued May 7, 1974. Each interface card has a switch permitting the user to set any one of the codes. A list of preferred assignment codes for use with typical peripheral devices is given below.

| SELECT CODE | ASSIGNMENT | EXAMPLE HEWLETT-PACKARD PERIPHERAL DEVICES |
|---|---|---|
| 0 | Calculator Keyboard and Display | — |
| 1 | Calculator Tape Drive | — |
| 2 | Paper Tape Punch | HP 9884A,98032A Interface |
| 3 | Paper Tape Reader | HP 9883A |
| 4 | Digitizer | HP 9864A |
| 5 | Plotter | HP 9862A |
| 6 | Printer | HP 9866B, HP 9871A |
| 7 | HP-Interface Bus | HP 98034A Interface |
| 8 through 15 | Unassigned | special peripherals |
| 16 | Calculator Printer | — |

Each internal peripheral has a fixed select code which is automatically specified by standard calculator statements (display, print, etc.). Both the display and the keyboard respond to select code Ø, the tape drive responds to select code 1, and the printer responds to select code 16.

The select code can be specified in the form of either a constant, a variable, or an expression.

Input-Output Format

The I/O bus connecting the processor with internal and external peripherals contains 16 lines. Data is transmitted in a 16-bit parallel, character-serial fashion at certain times, while interface or peripheral status codes are transmitted at other times. The I/O operations send and receive data in standard 8-bit ASCII code. The calculator sends and receives one 8-bit character at a time. The parity (most-significant) bit is not used with formatted I/O operations.

Peripheral Interrupt

Since the General I/O ROM is intended for use in systems where the calculator is the controlling device, there is no provision for peripheral interrupt operation, for example whereby, an external device can call for an I/O operation, or the like. The calculator must be in complete control of each device while that device is involved in data transfer.

THE WRITE STATEMENT

Syntax:

wrt select code [.format no.], $parameter_1$, $parameter_2$, . . .

The write statement outputs the characters, signs, and decimal point of each parameter to the peripheral specified by the select code. Each parameter in the list can consist of either a numeric expression, text, or a string name (when the String ROM is in use). The value of each parameter is output in a free-field format, unless a format statement is in effect. The format number parameter can be an integer from 0 to 9 and references a similarly numbered format statement, described hereinafter.

Delimiters

A delimiter is a character that is used to either separate one expression from another inside a list or to terminate a list. The space (sp) and the carriage-return line-feed (CR/LF) are delimiters that are automatically output during the execution of each write statement. The space is used to separate items within the list, and the CR/LF is used to terminate the list.

Free-Field (Default) Format

The free-field output format is automtically set whenever either the calculator is switched on, or RESET is pressed. Each write statement references the free-field format until a format statement is executed and then the specifications in the format statement override free-field.

The free-field format causes each numeric expression to be output and right justified in an 18-character field. A CR/LF is given after each four expressions are output and again after the last parameter is output. The form in which expressions appear is determined by the current fixed or float setting. A number that is too large to be output under the current fixed-point specification is output under the previous floating-point specification. Characters within quotes and strings are output as "free text" wherein the 18-character fields are not used.

THE READ STATEMENT

Syntax:

red select code [.format no.], $parameter_1$, $parameter_2$, . . .

The read statement inputs and stores data from a specified peripheral. The calculator keyboard can not be used to input data with the read statement. The number of parameters in the list indicates how many data items to read. Each parameter consists of either a variable name or a string variable name if the String ROM is in use. Each numeric data item consists of the digits 0 through 9, plus and minus signs, a decimal point, and an "E" character. All other characters are treated as input delimiters. The data item itself assumes the same form as any number entered from the keyboard.

The format number parameter can be used to reference any of ten format statements. If a format number is not specified, and if a format statement has not been previously executed, a free-field input format is automatically used.

Free-Field Format

The free-field input format is set whenever either the calculator is switched on or RESET is pressed. Using free-field allows reading numerical data in virtually any form, provided that each item is followed by at least one non-numeric character delimiter. For each parameter in the list, the calculator ignores all input non-numeric character delimiters until one of the characters listed above is read. Then, after reading the data item, reading any non-numeric character terminates and stores the data item.

The calculator cannot input non-numeric characters unless a string variable is specified when free-field is used. All characters are input until either the dimensional string length is filled or a CR/LF is read. Reading a CR/LF automatically terminates the read operation. All non-numeric characters preceding a data item (except "E") are ignored.

Reading successive commas causes the corresponding variable to be skipped and flag 13 to be set. A SKP (HT) causes the calculator to skip all characters until a LF has been read. Whenever a LF is read (and it does not correspond to a preceding HT) the statement is terminated and flag 13 is set. An upper- or lower-case "E" character, when part of any of the following forms, causes the preceding data item to be raised by the power of 10 indicated: (data item)E(one or two digits); (data item)E(a + or − and one or two digits); (data item)E(a space and one or two digits). For example, any of the following data items will be read as the number "1234".

1.234E3

1.234E 3

1.234E+3

The CR is always ignored (skipped over) during a read operation.

FORMAT STATEMENTS

Use of format statements provides the most-flexible and complete control of write and read statements. A format statement must be programmed before the I/O statement referencing it and provides a list of specifications for use by the I/O statement. As the I/O statement is executed, it references the last-encountered unnumbered format statement rather than free-field.

The Format Syntax

Syntax:

fmt [format no.,] $spec_1$,$spec_2$, . . .

The format number parameter is used to identify the statement for successive write or read statements. Each format number must be an integer from 0 to 9. If the format number is not specified, format number 0 is assumed.

Output Numeric Specifications

Numeric specifications determine the form in which each numeric parameter is output. A numeric specification determines whether the number is output in fixed point or floating point, the number of digits to the right of the decimal point, and the field width in which the number appears.

These numeric specifications are available:

Syntax:

| | |
|---|---|
| [r]fw.d | Specifies fixed-point format. |
| [r]ew.d | Specifies exponential (scientific) format. |
| [r]fzw.d | Specifies fixed-point format with leading zeros in each field. |

w indicates total field width (in characters). If w is omitted, leading spaces are deleted from the field.

d indicates the number of digits to the right of the decimal point.

If d is omitted, the current fxd or flt setting is used.

r is an optional repeat factor.

(w,d, and r must be constants.)

A numeric specification such as f8.2 specifies a fixed-point number with two digits to the right of the decimal point. The number appears (right-justified) in an eight-character field. If d is 0, the decimal point is not output. A number output under a numeric specification is always rounded according to the number of decimal places specified.

Some guidelines should be observed in selecting w and d. Signs, decimal points, and exponents are part of the number and must fit in the field width specified by w. For floating-point outputs, w should be greater than or equal to d+7.

In general, if a fixed-point specification cannot be met, either because w is not large enough or because the number is simply too large, the field is filled with dollar signs.

Output Edit Specifications

Edit specifications are used to control the placement of output data and to output character strings:

Syntax:

| | |
|---|---|
| [r]X | Outputs a blank character space. |
| [r]/ | Outputs a CR/LF for a printer. |
| [r]"text" | Outputs the ASCII characters within quotes. |
| Z | Suppresses the automatic CR/LF output after each write statement. |
| [r]b | Outputs the binary equivalent of the corresponding decimal number in the write statement. |
| [r]cw | Specifies the field width for a string variable to be output. |

Any combination of specifications can appear in the same format statement when each item is separated by a comma. Most of the specifications can be duplicated r number of times by using the repeat factor.

Input Numeric Specifications

Numeric specifications are used to determine which characters are input from a data input string, and in what form the data will appear. When a format statement is referenced by a read statement, the read operation is not terminated until a LF character is read (unless the edit specification Z is used as discussed above). A general input conversion specification syntax is:

| | |
|---|---|
| [r] f w | r is the number of consecutive times the specification is to be used (if r is 1 it may be omitted). w is the width of the data field to be read. |

A numeric specification such as f1Ø for example calls for reading ten numeric characters; all non-numerics which precede a numeric are counted but not entered. If an "E" is read, a number of the form 1E dd is entered.

Input Edit Specifications

The following edit specifications can be used to increase input format flexibility:

Automatic Delimiter Syntax fmt z, f w

This spec causes the calculator to read only the number of characters specified in the next conversion spec. The READ operation is automatically terminated after the characters are read, without the need of a LF character.

Skip Character Syntax fmt [r] x

This spec causes the calculator to skip (not count) r number of characters.

Skip Data Syntax fmt [r]/

The calculator skips all data which precedes r number of CR/LF characters.

Input Strings Syntax fmt [r] c w

The calculator inputs w number of characters into a specified string variable (String ROM). All characters are entered until either the string is filled, or w characters are read, or a LF is read.

THE CONVERSION STATEMENT

Syntax:

conv [$code_1$,$code_2$[,$code_3$,$code_4$]], . . .

The conversion statement sets up a character replacement table for use with read and write statements. Up to 10 pairs of decimal codes can be specified at a time. Each new conversion statement cancels the previous table and sets up the new one. A conversion statement with no parameters cancels any previous table.

THE LIST STATEMENT

A select code parameter can be used with the list statement when the General I/O ROM is plugged in, enabling program listings on a peripheral output device. The new list syntax is:

list [#select code][,line no.]

THE BUS CARD

The Interface provides HP-IB capability for the Calculator. The bus card buffers all data and control instructions between the calculator and instruments on the bus. The interface is preset to respond to select code 7.

Each instrument on the bus is connected, for example, through a 16-wire cable.

HP-IB ADDRESSES

The General I/O ROM provides simplified control of instruments via the HP-IB by using a select code parameter containing a three- or four-digit integer. Referring to FIG. 176, a flow chart for the HP-IB Transparency Routine is given. The first one or two digits specifies the bus card select code, while the last two digits represent the address of the instrument on the bus.

Instruments having HP-IB capability are assigned unique 7-bit ASCII characters for talker and listener addresses. The calculator uses the address characters to indicate which instrument is to talk (send data) or listen (receive data). For example, here are the addresses preferably assigned for some Hewlett-Packard instruments:

| Hewlett-Packard Instrument Type | HP-IB Address | |
|---|---|---|
| | Talker | Listener |
| 98034A Interface | U | 5 |
| 3490A Multimeter | V | 6 |
| 9871A (Opt. 001) Printer | | ! |
| 59309A Digital Clock | P | ∅ |

The 9871A Printer is only a listener; it does not transmit data, so it has no talker address.

Using an ASCII table the five least-significant bits of each character's binary form are converted to a decimal value:

| Hewlett-Packard Instrument | Address | |
|---|---|---|
| | Character | 5-bit Value |
| 98034A Interface | U | 21 |
| | 5 | 21 |
| 3490A Multimeter | V | 22 |
| | 6 | 22 |
| 9871A Printer | ! | 1 |
| 59309A Clock | P | 16 |
| | ∅ | 16 |

The 5-bit value for talker-listener instruments is the same number.

These numbers are used as the HP-IB address code in select code parameters of General I/O operations. The HP-IB address code must always contain two digits; if the 5-bit value is a one-digit number (e.g., 9), a leading zero must be used (e.g., 09).

This addressing method permits using General I/O operations via the HP-IB.

Instruments designated as listeners on the bus are controlled by using write and write binary statements. The address-code parameter just described must be used in each I/O operation.

For most applications, read and format statements are used to input data via the HP-IB. The format statement must be appropriate to the data string that the device sends to the calculator.

Many devices output leading non-numeric characters in their output data strings. The format statement must account for any leading non-numeric characters so that the read statement can interpret the numeric information.

GENERAL I/O ERROR MESSAGES
In case of error, the calculator displays one of the following error messages

| | |
|---|---|
| error G1 | Incorrect Format Numbers:<br>. Format number in format statement >9.<br>. Referenced format number not set. |
| error G2 | Referenced Format Statement has an error:<br>. Incorrect format specification.<br>. Numeric overflow in format statement. |
| error G3 | Incorrect I/O Parameters:<br>. Parameter not number or string.<br>. Negative parameter with fZ numeric specification.<br>. Numeric parameter with c edit specification.<br>. Binary parameter >(± 32767).<br>. More than one parameter for read binary or read status function.<br>. Missing a non-numeric parameter for write control statement. |
| error G4 | Incorrect Select Code:<br>. Select code is non-numeric or >4 digits.<br>. Select code is >2 digits for read status.<br>. Select code is not in range from 0 through 16.<br>. Select code 1 allowed only for read status.<br>. HP-IB address not in range from 0 through 31.<br>. Read from select code ∅ not allowed. |
| error G5 | Incorrect Read Parameter:<br>. Constant in read list.<br>. String not filed by read operation.<br>. Numeric parameter references c format specification. |
| error G6 | Incorrect Numeric (format) Specification. |
| error G7 | Unacceptable Input Data:<br>. More than one decimal point or "E" read.<br>. 511 characters read without LF.<br>. E with no leading digit.<br>. More than 158 numeric characters read. |
| error G8 | Peripheral Device Down:<br>. Incorrect status bits.<br>. STOP cancelled operation. |
| error G9 | Interface Hardware Problem:<br>. Improper HP-IB operation.<br>. Empty I/O slot. |

-continued

| | |
|---|---|
| | . Wrong select code set on 98032A card. |
| | . Write Control addressed to wrong card. |

GENERAL I/O SYNTAX

The following are the general Syntax Conventions used:

| | |
|---|---|
| brackets [ ] | Items within brackets are optional. |
| coloring | Colored items must appear as shown. |
| expression | A constant (like 16.4), a variable (like X or B[8] or r3) or an expression like (8 ↑ 4 or 6<A+B). |
| select code format | cc[dd] cc = device or interface select code. dd = optional HP-IB address code (Must be two digits). |
| text | A series of characters within quotation marks. |
| variable | A simple variable (e.g., A or Q), an array variable (e.g., E[5]), an r-variable (e.g., 412), or a string variable name (A$). |

| Statement | Syntax |
|---|---|
| Conversion | conv[code$_1$, code$_2$[,code$_3$,code$_4$]], . . . Ten pairs of ASCII-decimal codes are allowed. |
| Format | fmt[format no.,] spec$_1$[,spec$_2$],]]] C≦ format no. ≦ |
| List | list[#select code] Other list parameters remain as defined. |
| Read | red select code [,format no.],variable$_1$ [,variable$_2$], . . . |
| Read Binary (function) | rdb(select code) |
| Read Status (function) | rds(select code) |
| Write | wrt select code [,format no.],expression or text$_1$ [,expression or text$_2$], . . . |
| Write binary | wtb select code,expression$_1$[,expression$_2$], . . . |
| Write Control | wtc select code,expression |

We claim:

1. An electronic calculator comprising:

keyboard input means for entering one or more lines of one or more alphanumeric statements each into the calculator;

memory means for storing alphanumeric information, including one or more programs, each program comprising a plurality of lines of one or more alphanumeric statements entered from the keyboard input means;

processing means, coupled to said keyboard input means and said memory means, for processing a said program of lines of one or more alphanumeric statements stored in said memory means;

output display means, coupled to said processing means, for visually displaying alphanumeric information, including the results of alphanumeric statements processing by said processing means, to a user; and magnetic tape reading and recording means for transferring alphanumeric information between the memory means and an external magnetic tape;

said keyboard input means including record memory control means for initiating the recording of the contents of said memory means onto said external magnetic tape and load memory control means for initiating the loading of the previously recorded contents of said memory means back into said memory means;

said processing means including logic means responsive to actuation of said record memory control means, during processing of a program stored in said memory means, for halting processing of that program and for causing the contents of said memory means to be recorded onto said external magnetic tape, said logic means thereafter being responsive to actuation of said load memory control means for causing the previously recorded contents of said memory means then stored on the external magnetic tape to be loaded into said memory means, said logic means being operative, following loading into the memory means of the previously recorded contents of said memory means, for causing said processing means to commence processing of the program, processing of which was halted in response to actuation of the record memory control means, at the point in said program at which processing was halted.

2. An electronic calculator as in claim 1 further comprising:

buffer storage means for storing a single line of one or more alphanumeric statements entered from said keyboard input means;

said record memory control means being operative for entering a record memory statement into said buffer storage means during processing of a program stored in said memory means;

said load memory control means being operative for entering a load memory statement into said buffer storge means;

said keyboard input means including an execute control key for initiating processing by said processing means of the single line of one or more alphanumeric statements stored in said buffer storage means;

said logic means being responsive to processing of a record memory statement, stored in said buffer storage means, initiated by said execute control key during processing of a program stored in said memory means, for halting processing of that program and for causing the contents of said memory means to be recorded onto said external magnetic tape, said logic means thereafter being responsive to processing of a load memory statement, stored in said buffer storage means, for causing the previously recorded contents of said memory means then stored on the external magnetic tape to be loaded into said memory means, said logic means being operative, following loading into the memory means of the previously recorded contents of said memory means, for causing said processing means to commence processing of the program, processing of which was halted in response to processing of the record memory statement, at the point in said program at which processing was halted.

3. An electronic calculator as in claim 2 wherein:

said keyboard input means includes program entry control means operative with said record memory control means for entering a record memory statement and for storing that statement as part of a program in said memory means; and said logic means being responsive to processing of a record memory statement, encountered during processing of a program stored in said memory means, for halting processing of that program and for causing the contents of said memory means to be recorded onto said external magnetic tape, said logic means thereafter being responsive to processing of a load memory statement, stored in said buffer storage means, for causing the previously recorded contents of said memory means then stored on the external magnetic tape to be loaded into said memory means, said logic means being operative, following loading into the memory means of the previously recorded contents of said memory means, for causing said processing means to commence processing of the program, processing of which was halted in response to processing of the record memory statement, at the statement next following the record memory statement.

4. An electronic calculator as in claim 3 wherein:

said keyboard input means includes tape partitioning control means;

said processing means being responsive to actuation of said tape partitioning control means for electronically partitioning said external magnetic tape into a specified number of files;

said record memory control means being operative for entering a record memory statement that includes specification of a particular one of the files of said external magnetic tape; and said logic means being responsive to processing of a record memory statement that includes specification of a particular file on said external magnetic tape for causing the contents of said memory means to be recorded in the specified file.

* * * * *

UNITED STATES PATENT AND TRADEMARK OFFICE

CERTIFICATE OF CORRECTION

PATENT NO. : 4,437,156

DATED : March 13, 1984

INVENTOR(S) : Chris J. Christopher et al.

It is certified that error appears in the above-identified patent and that said Letters Patent is hereby corrected as shown below:

Column 4, line 7, "a alphanumeric" should be --alphanumeric--;

Column 5, line 47, "viw" should be --view--;

Column 7, line 21, "FIG. 24A-B" should be --FIG. 25A-B--;

Column 7, line 50, "bits addition" should be --bits during addition--;

Column 8, line 4, "Fig." should be --Figs.--;

Column 8, line 20, "10-bit memory" should be --10-bit field of a memory--;

Column 9, line 45, "wavegform" should be --waveform--;

Column 9, line 47, "illustating" should be --illustrating--;

Column 9, line 64, "etch" should be --fetch--;

Column 14, line 7, "UBA" should be --U8A--;

Column 14, line 28, "tate" should be --state--;

Column 14, line 35, "calculator synchronization" should be --calculator requiring synchronization--;

Column 14, line 39, "present" should be --preset--;

Column 14, line 48, "poweer-on" should be --power-on--;

Column 15, line 2, "bidiectional" should be --bidirectional--;

UNITED STATES PATENT AND TRADEMARK OFFICE

CERTIFICATE OF CORRECTION

PATENT NO. : 4,437,156

DATED : March 13, 1984

INVENTOR(S) : Chris J. Christopher et al.

It is certified that error appears in the above-identified patent and that said Letters Patent is hereby corrected as shown below:

Column 15, line 7, "circuis" should be --circuits--;

Column 15, line 35, "member" should be --memory--;

Column 15, line 59, "resiter" should be --register--;

Column 15, line 61, "addressable register" should be --addressable registers--;

Column 16, line 1, "elow" should be --below--;

Column 17, line 5, "addresses on" should be --addresses appear on--;

Column 17, line 24, "particulr" should be --particular--;

Column 17, line 41, "referenc" should be --reference--;

Column 17, line 44, "thus" should be --Thus--;

Column 17, line 68, "diviced" should be --divided--;

Column 18, line 2, "the" should be --The--;

Column 18, line 14, "$512_{1:0}$" should be --$512_{10}$--

Column 18, line 16, "snd" should be --and--;

Column 19, line 4, "complate" should be --complete--;

Column 21, line 26, "Program resumes" should be --Program execution resumes--;

Column 23, line 8, "ing H)," should be --ing $\bar{H}$),--;

UNITED STATES PATENT AND TRADEMARK OFFICE

CERTIFICATE OF CORRECTION

PATENT NO. : 4,437,156

DATED : March 13, 1984

INVENTOR(S) : Chris J. Christopher et al.

It is certified that error appears in the above-identified patent and that said Letters Patent is hereby corrected as shown below:

Column 23, line 9, "instruction" should be --instructions--;

Column 23, line 33, "Skip is A" should be --Skip if A--;

Column 25, line 32, "the O register" should be --the 0 register--;

Column 25, line 55, "valve" should be --value--;

Column 26, line 17, "COmplement" should be --complement--;

Column 26, line 49, "cause" should be --causes--;

Column 26, line 58, "encounted" should be --encountered--;

Column 28, line 32, "th" should be --the--;

Column 28, line 37, "avaiable" should be --available--;

Column 29, line 29, "vetored" should be --vectored--;

Column 29, line 33, "he" should be --the--;

Column 29, line 65, "microporcessor" should be --microprocessor--;

Column 30, line 31, "microporcessor" should be --microprocessor--;

Column 30, line 39, "has" should be --had--;

Column 30, line 44, "giv es" should be --gives--;

Column 30, line 45, "microporcessor" should be --microprocessor--;

UNITED STATES PATENT AND TRADEMARK OFFICE
CERTIFICATE OF CORRECTION

PATENT NO. : 4,437,156

DATED : March 13, 1984

INVENTOR(S) : Chris J. Christopher et al.

It is certified that error appears in the above-identified patent and that said Letters Patent is hereby corrected as shown below:

Column 31, line 1, "brough" should be --brought--;

Column 31, line 33, "Bys" should be --Bus--;

Column 31, line 44, "refernce" should be --reference--;

Column 31, line 55, "memory" should be --Memory--;

Column 31, line 64, "cirtical" should be --critical--;

Column 32, line 52, "now" should be --new--;

Column 33, line 32, "If" should be --It--;

Column 33, line 41, "right as" should be --right half as--;

Column 34, line 10, "ever" should be --every--;

Column 34, lines 60-61, "interrupt routine" should be --interrupt service routine--;

Column 38, line 12, "though" should be --through--;

Column 38, line 65, "registers," should be --registers--;

Column 39, line 14, "calcels" should be --cancels--;

Column 41, line 11, "I/o" should be --I/O--;

Column 43, line 1, "avilable" should be --available--;

Column 43, line 11, "requests" should be --registers--;

UNITED STATES PATENT AND TRADEMARK OFFICE
CERTIFICATE OF CORRECTION

PATENT NO. : 4,437,156

DATED : March 13, 1984

INVENTOR(S) : Chris J. Christopher et al.

It is certified that error appears in the above-identified patent and that said Letters Patent is hereby corrected as shown below:

Column 43, line 33, "the peripheral" should be --that peripheral--;

Column 43, line 68, "of BCD-" should be --on BCD---

Column 44, line 34, "ENC" should be --EMC--;

Column 44, line 67, "vlue" should be --value--;

Column 45, line 9, "$1 < N > 16_{10}$" should be --$1 \le N \le 16_{10}$"--;

Column 46, line 64, requires a plus sign --+-- directly under equal signs (=) in lines 62 and 63;

Column 47, line 22, "8bina-" should be --(bina---;

Column 47, line 23, "ry9" should be --ry)--;

Column 47, line 24, "thirtytwo" should be --thirty-two--;

Column 47, line 25, "tow's" should be --two's--;

Column 49, line 32, "memroy" should be --memory--;

Column 51, line 37, "WRIT)" should be --(WRIT)--;

Column 51, line 38, "true," should be --true;--;

Column 51, line 55, "secondly," should be --Secondly,--;

Column 51, line 58, "cylce" should be --cycle--;

Column 51, line 60, "signal." should be --signal,--;

UNITED STATES PATENT AND TRADEMARK OFFICE

CERTIFICATE OF CORRECTION

PATENT NO. : 4,437,156

DATED : March 13, 1984

INVENTOR(S) : Chris J. Christopher et al.

It is certified that error appears in the above-identified patent and that said Letters Patent is hereby corrected as shown below:

Column 52, line 5, "jogj" should be --high--;

Column 52, line 5, "wriete" should be --write--;

Column 52, line 14, "chip" should be --Chip--;

Column 52, line 62, "fto" should be --to--;

Column 53, line 3, "DSP)" should be --(DSP)--;

Column 53, line 12, "state," should be --state.--;

Column 53, line 19, "set" should be --set,--;

Column 53, line 30, "decode" should be --decoded--;

Column 54, line 23, "requiest" should be --request--;

Column 54, line 38, "(RESET9" should be --(RESET)--;

Column 54, line 48, "is" should be --in--;

Column 54, line 57, "MHZ" should be --MHz--;

Column 54, line 64, "Simiarly," should be --Similarly,--;

Column 55, line 21, "SN74S163)" should be --SN74LS163)--;

Column 58, line 63, "FIg." should be --FIG.--;

Column 59, line 45, "FIg." should be --FIG.--;

Column 59, line 57, "voltage C27" should be --voltage across C27--;

UNITED STATES PATENT AND TRADEMARK OFFICE

CERTIFICATE OF CORRECTION

PATENT NO. : 4,437,156

DATED : March 13, 1984

INVENTOR(S) : Chris J. Christopher et al.

It is certified that error appears in the above-identified patent and that said Letters Patent is hereby corrected as shown below:

Column 61, line 19, "volate" should be --voltage--;

Column 61, line 28, "49C" should be --149C--;

Column 63, line 9, "powr" should be --power--;

Column 66, line 49, "valve" should be --value--;

Column 67, line 32, "appears a pin" should be --appears at pin--;

Column 67, line 40, "outut" should be --output--;

Column 67, line 54, "is U4 is" should be --in U4 is--;

Signed and Sealed this

*First* Day of *October 1985*

[SEAL]

*Attest:*

DONALD J. QUIGG

*Attesting Officer*

*Commissioner of Patents and Trademarks—Designate*